US009418193B2

(12) United States Patent
Dowski, Jr. et al.

(10) Patent No.: US 9,418,193 B2
(45) Date of Patent: Aug. 16, 2016

(54) ARRAYED IMAGING SYSTEMS HAVING IMPROVED ALIGNMENT AND ASSOCIATED METHODS

(71) Applicant: Omnivision Technologies Inc., Santa Clara, CA (US)

(72) Inventors: Edward R. Dowski, Jr., Lafayette, CO (US); Paulo E. X. Silvieri, Boulder, CO (US); George C. Barnes, IV, Westminster, CO (US); Vladislav V. Chumachenko, Louisville, CO (US); Dennis W. Dobbs, Boulder, CO (US); Regis S. Fan, Saint Paul, MN (US); Gregory E. Johnson, Boulder, CO (US); Miodrag Scepanovic, Louisville, CO (US); Satoru Tachihara, Boulder, CO (US); Christopher J. Linnen, Erie, CO (US); Inga Tamayo, Erie, CO (US); Donald Combs, Auburn, NH (US); Howard E. Rhodes, San Martin, CA (US); James He, San Jose, CA (US); John J. Mader, Boston, MA (US); Kenneth Kubala, Boulder, CO (US); Mark Meloni, Longmont, CO (US); Brian Schwartz, Boulder, CO (US); Robert Cormack, Boulder, CO (US); Michael Hepp, San Jose, CA (US); Gary L. Duerksen, Ward, CO (US)

(73) Assignee: OmniVision Technologies, Inc., Santa Clara, CA (US)

( * ) Notice: Subject to any disclaimer, the term of this patent is extended or adjusted under 35 U.S.C. 154(b) by 30 days.

(21) Appl. No.: 14/093,802

(22) Filed: Dec. 2, 2013

(65) Prior Publication Data

US 2014/0220713 A1 Aug. 7, 2014

Related U.S. Application Data

(62) Division of application No. 12/297,608, filed as application No. PCT/US2007/009347 on Apr. 17, 2007, now Pat. No. 8,599,301.

(60) Provisional application No. 60/792,444, filed on Apr.17, 2006, provisional application No. 60/802,047, filed on May 18, 2006, provisional application No.

(Continued)

(51) Int. Cl.
*G02B 13/16* (2006.01)
*H04N 5/225* (2006.01)

(Continued)

(52) U.S. Cl.
CPC ........... *G06F 17/5081* (2013.01); *B24B 13/06* (2013.01); *B24B 49/00* (2013.01);

(Continued)

(58) Field of Classification Search
CPC .. G02B 3/0062; G02B 3/0068; G02B 3/0075; H01L 27/14625; H01L 27/14627
USPC ....................... 348/335, 340, 294; 250/208.1
See application file for complete search history.

(56) References Cited

U.S. PATENT DOCUMENTS 5,007,708 A 4/1991 Gaylord et al.
5,694,247 A 12/1997 Ophey et al.

(Continued)

FOREIGN PATENT DOCUMENTS

CN 1682377 10/2005
EP 1420453 5/2004

(Continued)

OTHER PUBLICATIONS

European Application No. 07 835 728.2 Communication pursuant to Article 94(3) EPC, Jul. 29, 2010, 5 pages.

(Continued)

*Primary Examiner* — Ngoc-Yen Vu
(74) *Attorney, Agent, or Firm* — Lathrop & Gage LLP

(57) ABSTRACT

Arrayed imaging systems include an array of detectors formed with a common base and a first array of layered optical elements, each one of the layered optical elements being optically connected with a detector in the array of detectors.

24 Claims, 291 Drawing Sheets

Related U.S. Application Data

60/814,120, filed on Jun. 16, 2006, provisional application No. 60/832,677, filed on Jul. 21, 2006, provisional application No. 60/836,739, filed on Aug. 10, 2006, provisional application No. 60/839,833, filed on Aug. 24, 2006, provisional application No. 60/840,656, filed on Aug. 28, 2006, provisional application No. 60/850,678, filed on Oct. 10, 2006, provisional application No. 60/850,429, filed on Oct. 10, 2006, provisional application No. 60/865,736, filed on Nov. 14, 2006, provisional application No. 60/871,920, filed on Dec. 26, 2006, provisional application No. 60/871,917, filed on Dec. 26, 2006.

(51) Int. Cl.

| | |
|---|---|
| ***G06F 17/50*** | (2006.01) |
| ***B24B 13/06*** | (2006.01) |
| ***B24B 49/00*** | (2012.01) |
| ***G02B 3/00*** | (2006.01) |
| ***G02B 7/02*** | (2006.01) |
| ***G02B 13/00*** | (2006.01) |
| ***G02B 27/00*** | (2006.01) |
| ***H01L 27/146*** | (2006.01) |

(52) U.S. Cl.

CPC ........... *G02B 3/0025* (2013.01); *G02B 3/0031* (2013.01); *G02B 3/0068* (2013.01); *G02B 3/0075* (2013.01); *G02B 7/022* (2013.01); *G02B 13/006* (2013.01); *G02B 13/0025* (2013.01); *G02B 13/0085* (2013.01); *G02B 27/0025* (2013.01); *H01L 27/14618* (2013.01); *H01L 27/14625* (2013.01); *H01L 27/14627* (2013.01); *H01L 27/14632* (2013.01); *H01L 27/14685* (2013.01); *H01L 27/14687* (2013.01); *H04N 5/2257* (2013.01); *G06F 2217/12* (2013.01); *H01L 2924/0002* (2013.01)

(56) References Cited

U.S. PATENT DOCUMENTS

| | | | | |
|---|---|---|---|---|
| 5,748,371 | A | 5/1998 | Cathey, Jr. et al. | |
| 5,877,090 | A | 3/1999 | Padmapani et al. | |
| 6,124,974 | A * | 9/2000 | Burger ................. | G02B 3/0056 359/621 |
| 6,366,335 | B1 | 4/2002 | Hikmet et al. | |
| 6,381,072 | B1 | 4/2002 | Burger | |
| 6,587,276 | B2 * | 7/2003 | Daniell .................. | G02B 3/005 348/E13.028 |
| 6,597,509 | B2 * | 7/2003 | Takakuwa ............ | G02B 3/0031 356/401 |
| 6,649,008 | B2 * | 11/2003 | Feldman .............. | G02B 6/4214 156/250 |
| 6,717,738 | B2 | 4/2004 | Yamada et al. | |
| 6,940,654 | B1 * | 9/2005 | Tang .................... | G02B 3/0012 257/233 |
| 6,954,311 | B2 | 10/2005 | Amanai | |
| 7,469,202 | B2 | 12/2008 | Dowski, Jr. et al. | |
| 7,795,577 | B2 | 9/2010 | Olsen et al. | |
| 8,022,352 | B2 | 9/2011 | Kaluzhny | |
| 8,049,806 | B2 | 11/2011 | Feldman et al. | |
| 2002/0162944 | A1 | 11/2002 | Huang et al. | |
| 2003/0169944 | A1 | 9/2003 | Dowski, Jr. et al. | |
| 2004/0003689 | A1 | 1/2004 | Bryan | |
| 2004/0027675 | A1 * | 2/2004 | Wu ........................ | B82Y 30/00 359/619 |
| 2004/0223071 | A1 | 11/2004 | Wells et al. | |
| 2004/0228005 | A1 | 11/2004 | Dowski, Jr. et al. | |
| 2005/0018962 | A1 | 1/2005 | Cho et al. | |
| 2006/0044450 | A1 | 3/2006 | Wolterink et al. | |
| 2006/0269150 | A1 * | 11/2006 | Lee ........................ | G02B 27/46 282/232 |
| 2007/0275505 | A1 | 11/2007 | Wolterink et al. | |

FOREIGN PATENT DOCUMENTS

| | | |
|---|---|---|
| JP | 60-60757 | 4/1985 |
| JP | 03-283572 | 12/1991 |
| JP | 2004-088713 | 3/2004 |
| JP | 2005-539276 | 12/2005 |
| JP | 2006-018199 | 1/2006 |
| KR | 10-2005-0048635 | 5/2005 |
| KR | 10-2006-0009310 | 1/2006 |
| WO | WO 2004/027880 | 4/2004 |

OTHER PUBLICATIONS

Kuiper, S & Hendriks, B.H.W., Variable focus liquid lens for miniature cameras, Applied Physics Letters, vol. 85, No. 7, Aug. 16, 2004, pp. 1128-1130.

Lim, et al. in "Spatially Varying Color Correction Matrices for Reduced Noise" HP Laboratories Palo Alto Jun. 2, 2004, pp. 1-15.

Office Action issued by Israeli Patent Office, dated Feb. 1, 2012 in related Israeli Patent Application No. 194792, 1 page, with concise statement of relevance.

Office Action issued in related Chinese Patent Application No. 200780022655.7, dated Mar. 5, 2012, 7 pages.

Office Action issued in related European Patent Application No. 07835728.2, dated Dec. 14, 2012, 6 pages.

Office Action issued in related Israeli Patent Application No. 194792, dated Aug. 14, 2012, 3 pages.

Office Action issued in related Israeli Patent Application No. 194792, dated Jan. 13, 2013, 3 pages.

Office Action issued in related Japanese Patent Application No. 2009-506540 dated Aug. 24, 2012, 10 pages.

PCT/US2007/009347, International Preliminary Report on Patentability, Feb. 19, 2009, 17 pages.

PCT/US2007/009347, International Search Report & Written Opinion mailed Aug. 1, 2008, 28 pages.

PCT/US2007/009347, Invitation to Pay Additional Fees mailed May 6, 2008, 8 pages.

Response to Communication pursuant to Article 94(3) EPC in European Patent Application No. 07835728.2, filed Jul. 29, 2010, 99 pages.

Response to Feb. 1, 2012 Office Action issued in related Israeli Patent Application No. 194792 filed Jun. 3, 2012, 2 pages.

Response to Mar. 5, 2012 Office Action in related Chinese Patent Application No. 200780022655.7 filed on Jul. 18, 2012, 13 pages.

Decision of Refusal issued in related European Patent Application No. 07835728.2, dated Mar. 13, 2014.

English translation of Amended Claims corresponding to Japanese Patent Application No. 2009-506540, filed Sep. 27, 2013, 7 pages.

Office Action issued in related Japanese Patent Application No. 2009-506540, mailed Jun., 27 2013, 4 pages—English Translation only.

Office Action issued in related Japanese Patent Application No. 2009-506540, mailed Mar. 31, 2014, 3 pages—English Translation only.

Office Action issued in related Korean Patent Application No. 10-2008-7028083, dated Jan. 16, 2014, 11 pages—with English Translation.

Response to Dec. 14, 2012 Office Action issued in related European Patent Application No. 07835728.2 filed Jun. 24, 2013, 16 pages.

Response to Jan. 16, 2014 Office Action issued in related Korean Patent Application No. 10-2008-7028083 filed Mar. 10 2014, 23 pages—with English Translation.

* cited by examiner

160

450

452

Filter coefficients

| | | | | | | | | |
|---|---|---|---|---|---|---|---|---|
| -0.00491 | -0.01003 | -0.00054 | -0.01324 | -0.01767 | -0.00214 | -0.00617 | -0.00656 | -0.00293 |
| -0.01003 | -0.00276 | -0.01525 | 0.020352 | 0.022271 | -0.01004 | -0.00386 | -0.01293 | -0.0023 |
| -0.00054 | -0.01525 | 0.014771 | -0.12134 | -0.1728 | -0.01045 | 0.006181 | -0.01775 | 0.002525 |
| -0.01324 | 0.020352 | -0.12134 | 0.011048 | 0.406219 | -0.32266 | 0.057064 | -0.01387 | -0.00806 |
| -0.01767 | 0.022271 | -0.1728 | 0.406219 | 3.073736 | -0.81984 | 0.138178 | -0.03947 | -0.00799 |
| -0.00214 | -0.01004 | -0.01045 | -0.32266 | -0.81984 | -0.15032 | 0.068884 | -0.02814 | 0.001738 |
| -0.00617 | -0.00386 | 0.006181 | 0.057064 | 0.138178 | 0.068884 | -0.01524 | -0.01033 | -0.00079 |
| -0.00656 | -0.01293 | -0.01775 | -0.01387 | -0.03947 | -0.02814 | -0.01033 | -0.01462 | 0.000267 |
| -0.00293 | -0.0023 | 0.002525 | -0.00806 | -0.00799 | 0.001738 | -0.00079 | 0.000267 | -0.00479 |

658

660

| | | | | | | | | | | | | | | | | | | |
|---|---|---|---|---|---|---|---|---|---|---|---|---|---|---|---|---|---|---|
| 0.015 | -0.002 | -0.014 | -0.001 | 0.008 | -0.005 | 0.008 | 0.004 | -0.047 | 0.075 | -0.048 | 0.005 | 0.009 | -0.009 | 0.005 | 0.000 | -0.010 | 0.007 | 0.012 |
| -0.002 | -0.019 | -0.001 | 0.013 | 0.004 | -0.011 | 0.002 | 0.012 | -0.043 | 0.098 | -0.061 | 0.005 | 0.005 | -0.011 | 0.002 | 0.012 | -0.009 | -0.012 | 0.008 |
| -0.014 | -0.001 | 0.019 | 0.000 | -0.014 | 0.001 | 0.001 | 0.006 | -0.029 | 0.088 | -0.048 | -0.009 | 0.009 | -0.002 | -0.011 | 0.010 | 0.010 | -0.011 | -0.010 |
| -0.001 | 0.013 | 0.000 | -0.023 | -0.004 | 0.029 | -0.010 | -0.022 | -0.016 | 0.054 | -0.017 | -0.029 | 0.012 | 0.016 | -0.020 | -0.015 | 0.016 | 0.013 | -0.007 |
| 0.008 | 0.004 | -0.014 | -0.004 | 0.020 | 0.013 | -0.029 | -0.012 | 0.030 | 0.056 | 0.005 | -0.044 | -0.005 | 0.017 | 0.006 | -0.019 | -0.011 | 0.006 | 0.006 |
| -0.005 | -0.011 | 0.001 | 0.029 | 0.013 | -0.024 | -0.013 | 0.019 | 0.011 | 0.081 | -0.028 | -0.015 | -0.007 | -0.019 | 0.019 | 0.018 | -0.010 | -0.012 | -0.001 |
| 0.008 | 0.002 | 0.001 | -0.010 | -0.029 | -0.013 | 0.024 | -0.017 | -0.136 | 0.126 | -0.162 | 0.009 | 0.054 | -0.023 | -0.007 | 0.022 | 0.007 | 0.002 | 0.007 |
| 0.004 | 0.012 | 0.006 | -0.022 | -0.012 | 0.019 | -0.017 | -0.042 | -0.050 | 0.529 | -0.202 | -0.077 | 0.025 | -0.032 | -0.051 | -0.017 | 0.007 | 0.013 | 0.001 |
| -0.047 | -0.043 | -0.029 | -0.016 | 0.030 | 0.011 | -0.136 | -0.050 | 0.148 | 0.921 | -0.288 | -0.325 | -0.090 | 0.020 | 0.002 | -0.040 | -0.056 | -0.046 | -0.020 |
| 0.075 | 0.098 | 0.088 | 0.054 | 0.056 | 0.081 | 0.126 | 0.529 | 0.921 | 1.632 | 0.199 | -0.197 | -0.209 | -0.181 | -0.146 | -0.091 | -0.039 | -0.037 | -0.057 |
| -0.048 | -0.061 | -0.048 | -0.017 | 0.005 | -0.028 | -0.162 | -0.202 | -0.288 | 0.199 | -0.350 | -0.152 | 0.059 | 0.067 | 0.037 | 0.016 | 0.004 | -0.001 | 0.013 |
| 0.005 | 0.005 | -0.009 | -0.029 | -0.044 | -0.015 | 0.009 | -0.077 | -0.325 | -0.197 | -0.152 | 0.087 | 0.110 | 0.003 | 0.000 | 0.023 | 0.016 | 0.009 | 0.010 |
| 0.009 | 0.005 | 0.009 | 0.012 | -0.005 | -0.007 | 0.054 | 0.025 | -0.090 | -0.209 | 0.059 | 0.110 | 0.021 | -0.030 | 0.009 | 0.022 | 0.003 | 0.007 | 0.011 |
| -0.009 | -0.011 | -0.002 | 0.016 | 0.017 | -0.019 | -0.023 | -0.032 | 0.020 | -0.181 | 0.067 | 0.003 | -0.030 | 0.025 | 0.037 | 0.006 | -0.011 | 0.001 | 0.008 |
| 0.005 | 0.002 | -0.011 | -0.020 | 0.006 | 0.019 | -0.007 | -0.051 | 0.002 | -0.146 | 0.037 | 0.000 | 0.009 | 0.037 | -0.008 | -0.019 | 0.013 | 0.021 | 0.004 |
| 0.000 | 0.012 | 0.010 | -0.015 | -0.019 | 0.018 | 0.022 | -0.017 | -0.040 | -0.091 | 0.016 | 0.023 | 0.022 | 0.006 | -0.019 | 0.004 | 0.025 | 0.005 | -0.007 |
| -0.010 | -0.009 | 0.010 | 0.016 | -0.011 | -0.010 | 0.007 | 0.007 | -0.056 | -0.039 | 0.004 | 0.016 | 0.003 | -0.011 | 0.013 | 0.025 | 0.004 | -0.014 | 0.001 |
| 0.007 | -0.012 | -0.011 | 0.013 | 0.006 | -0.012 | 0.002 | 0.013 | -0.046 | -0.037 | -0.001 | 0.009 | 0.007 | 0.001 | 0.021 | 0.005 | -0.014 | 0.001 | 0.016 |
| 0.012 | 0.008 | -0.010 | -0.007 | 0.006 | -0.001 | 0.007 | 0.001 | -0.020 | -0.057 | 0.013 | 0.010 | 0.011 | 0.008 | 0.004 | -0.007 | 0.001 | 0.016 | 0.005 |

TELE

WIDE

1440

1442

TELE

WIDE

MIDDLE

1670

1672

1740

1802

| | | | | | | | | | | |
|---|---|---|---|---|---|---|---|---|---|---|
| 7.413E-05 | -4.417E-05 | -3.708E-04 | -8.735E-04 | -1.316E-03 | -9.576E-04 | -1.272E-03 | -8.791E-04 | -3.571E-04 | -4.742E-05 | 8.185E-05 |
| -4.417E-05 | -1.184E-04 | -1.037E-04 | 2.210E-04 | 3.565E-04 | -1.217E-03 | 3.288E-04 | 2.543E-04 | -9.551E-05 | -9.984E-05 | -4.742E-05 |
| -3.708E-04 | -1.037E-04 | 2.939E-03 | 9.073E-03 | 1.617E-02 | 2.332E-02 | 1.625E-02 | 9.091E-03 | 2.974E-03 | -9.551E-05 | -3.571E-04 |
| -8.735E-04 | 2.210E-04 | 9.073E-03 | -2.155E-02 | -2.981E-02 | -4.194E-02 | -2.979E-02 | -2.147E-02 | 9.091E-03 | 2.543E-04 | -8.791E-04 |
| -1.316E-03 | 3.565E-04 | 1.617E-02 | -2.981E-02 | -1.128E-01 | -1.545E-01 | -1.124E-01 | -2.979E-02 | 1.625E-02 | 3.288E-04 | -1.272E-03 |
| -9.576E-04 | -1.217E-03 | 2.332E-02 | -4.194E-02 | -1.545E-01 | 2.279E+00 | -1.545E-01 | -4.194E-02 | 2.332E-02 | -1.217E-03 | -9.576E-04 |
| -1.272E-03 | 3.288E-04 | 1.625E-02 | -2.979E-02 | -1.124E-01 | -1.545E-01 | -1.128E-01 | -2.981E-02 | 1.617E-02 | 3.565E-04 | -1.316E-03 |
| -8.791E-04 | 2.543E-04 | 9.091E-03 | -2.147E-02 | -2.979E-02 | -4.194E-02 | -2.981E-02 | -2.155E-02 | 9.073E-03 | 2.210E-04 | -8.735E-04 |
| -3.571E-04 | -9.551E-05 | 2.974E-03 | 9.091E-03 | 1.625E-02 | 2.332E-02 | 1.617E-02 | 9.073E-03 | 2.939E-03 | -1.037E-04 | -3.708E-04 |
| -4.742E-05 | -9.984E-05 | -9.551E-05 | 2.543E-04 | 3.288E-04 | -1.217E-03 | 3.565E-04 | 2.210E-04 | -1.037E-04 | -1.184E-04 | -4.417E-05 |
| 8.185E-05 | -4.742E-05 | -3.571E-04 | -8.791E-04 | -1.272E-03 | -9.576E-04 | -1.316E-03 | -8.735E-04 | -3.708E-04 | -4.417E-05 | 7.413E-05 |

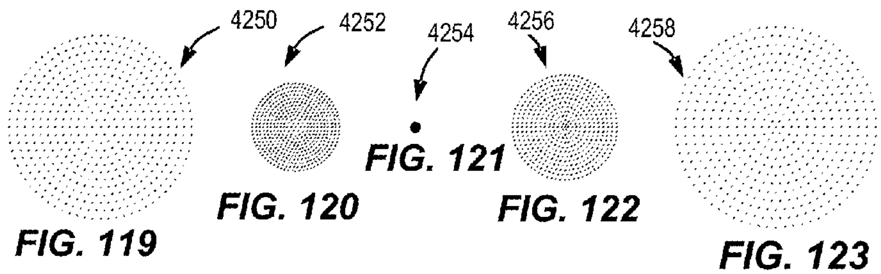
FIG. 119
FIG. 120
FIG. 121
FIG. 122
FIG. 123
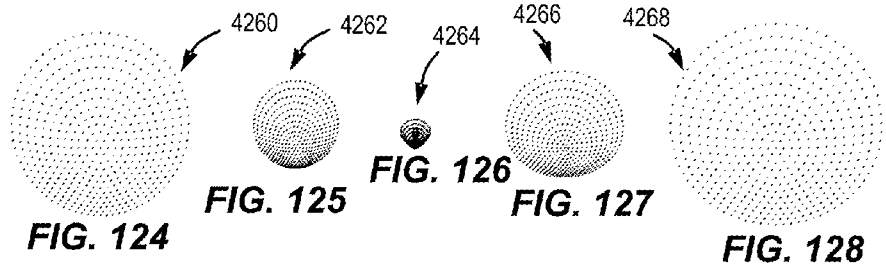
FIG. 124
FIG. 125
FIG. 126
FIG. 127
FIG. 128
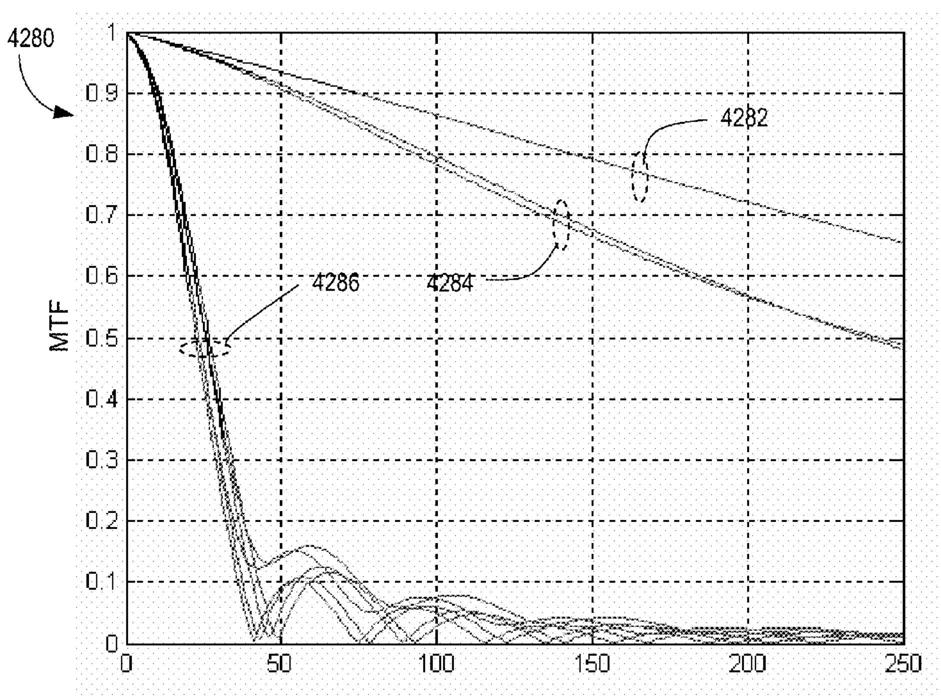
FIG. 129 Spatial Frequency (cycles / millimeter)

4470

5452

5454

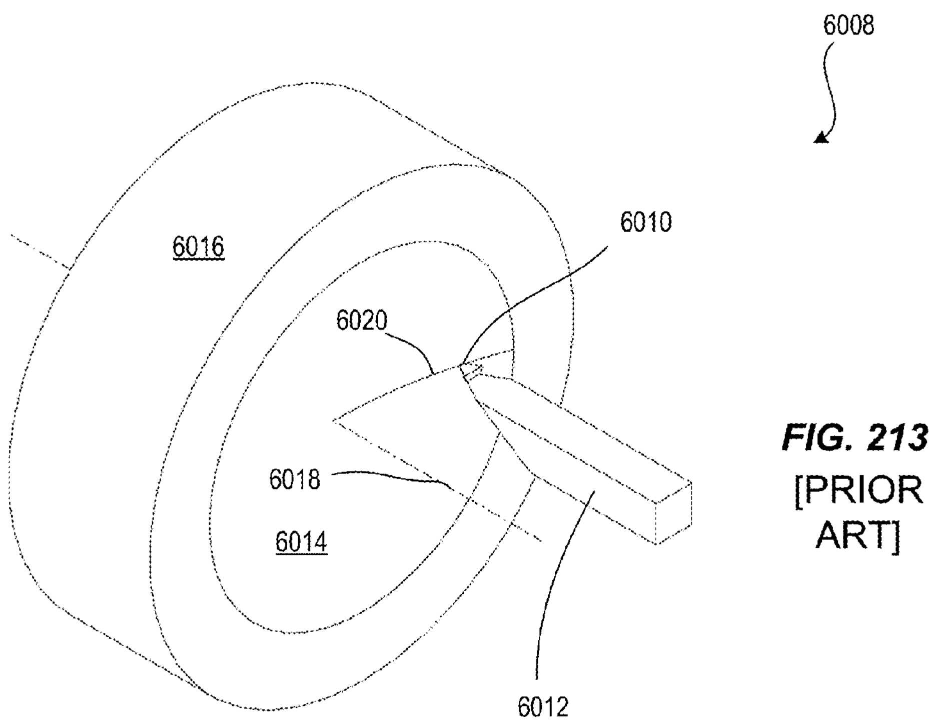
FIG. 213
[PRIOR ART]
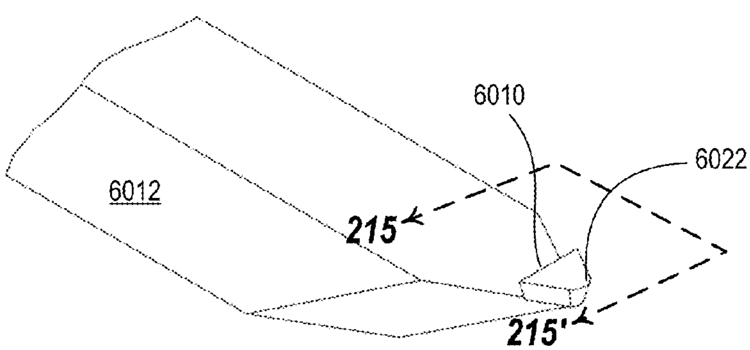
FIG. 214
[PRIOR ART]
FIG. 215
[PRIOR ART]
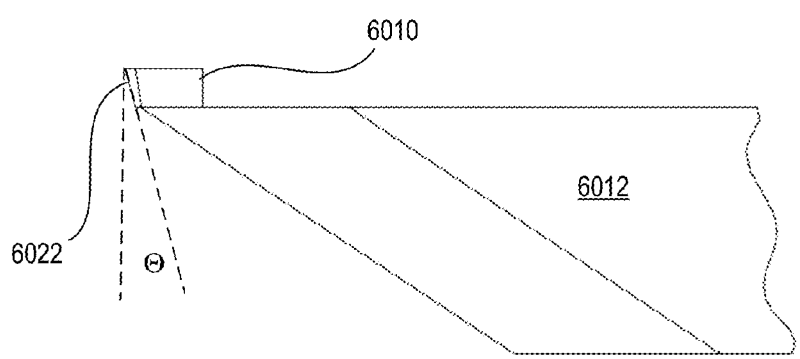

FIG. 395A
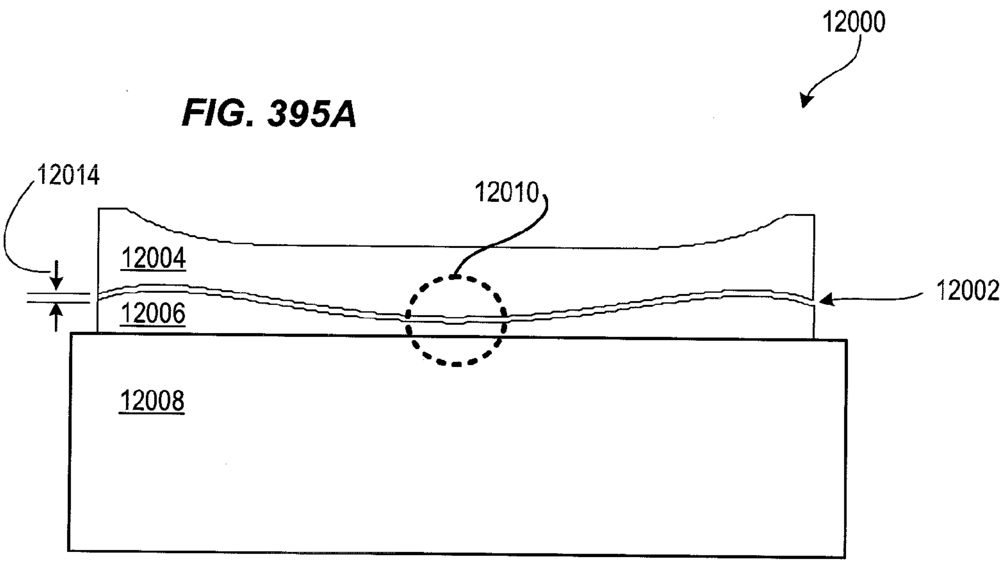
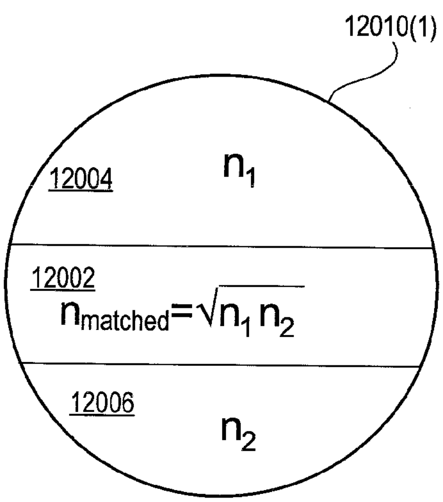
FIG. 395B
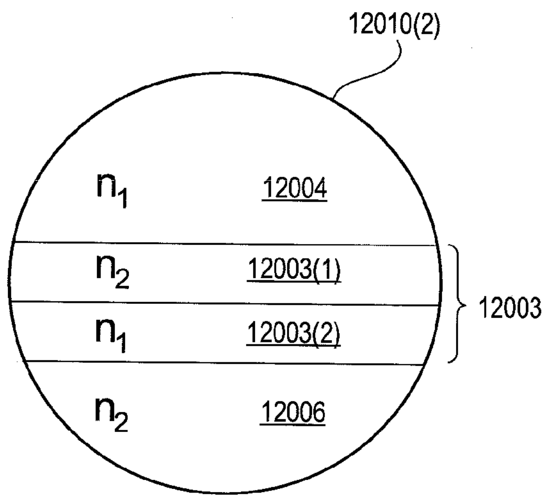
FIG. 395C

ARRAYED IMAGING SYSTEMS HAVING IMPROVED ALIGNMENT AND ASSOCIATED METHODS

CROSS-REFERENCE TO RELATED APPLICATIONS

This application is a division of U.S. application Ser. No. 12/297,608, filed Oct. 17, 2008 which is a 371 of international application no. PCT/US2007/009347 filed Apr. 17, 2007 which claims priority to U.S. provisional application Ser. No. 60/792,444, filed Apr. 17, 2006, entitled IMAGING SYSTEM WITH NON-HOMOGENEOUS WAVEFRONT CODING OPTICS; U.S. provisional application Ser. No. 60/802,047, filed May 18, 2006, entitled IMPROVED WAFER-SCALE MINIATURE CAMERA SYSTEM; U.S. provisional application Ser. No. 60/814,120, filed Jun. 16, 2006, entitled IMPROVED WAFER-SCALE MINIATURE CAMERA SYSTEM; U.S. provisional application Ser. No. 60/832,677, filed Jul. 21, 2006, entitled IMPROVED WAFER-SCALE MINIATURE CAMERA SYSTEM; U.S. provisional application Ser. No. 60/850,678, filed Oct. 10, 2006, entitled FABRICATION OF A PLURALITY OF OPTICAL ELEMENTS ON A SUBSTRATE; U.S. provisional application Ser. No. 60/865,736, filed Nov. 14, 2006, entitled FABRICATION OF A PLURALITY OF OPTICAL ELEMENTS ON A SUBSTRATE; U.S. provisional application Ser. No. 60/871,920, filed Dec. 26, 2006, entitled FABRICATION OF A PLURALITY OF OPTICAL ELEMENTS ON A SUBSTRATE; U.S. provisional application Ser. No. 60/871,917, filed Dec. 26, 2006, entitled FABRICATION OF A PLURALITY OF OPTICAL ELEMENTS ON A SUBSTRATE; U.S. provisional application Ser. No. 60/836,739, filed Aug. 10, 2006, entitled ELECTROMAGNETIC ENERGY DETECTION SYSTEM INCLUDING BURIED OPTICS; U.S. provisional application Ser. No. 60/839,833, filed Aug. 24, 2006, entitled ELECTROMAGNETIC ENERGY DETECTION SYSTEM INCLUDING BURIED OPTICS; U.S. provisional application Ser. No. 60/840,656, filed Aug. 28, 2006, entitled ELECTROMAGNETIC ENERGY DETECTION SYSTEM INCLUDING BURIED OPTICS; and U.S. provisional application Ser. No. 60/850,429, filed Oct. 10, 2006, entitled ELECTROMAGNETIC ENERGY DETECTION SYSTEM INCLUDING BURIED OPTICS. All of the aforementioned applications are incorporated herein by reference in their entireties.

BACKGROUND

Wafer-scale arrays of imaging systems within the prior art offer the benefits of vertical (i.e., along the optical axis) integration capability and parallel assembly. FIG. 154 shows an illustration of a prior art array 5000 of optical elements 5002, in which several optical elements are arranged upon a common base 5004, such as an eight-inch or twelve-inch common base (e.g., a silicon wafer or a glass plate). Each pairing of an optical element 5002 and its associated portion of common base 5004 may be referred to as an imaging system 5005.

Many methods of fabrication may be employed for producing arrayed optical elements, including lithographic methods, replication methods, molding methods and embossing methods. Lithographic methods include, for example, the use of a patterned, electromagnetic energy blocking mask coupled with a photosensitive resist. Following exposure to electromagnetic energy, the unmasked regions of resist (or masked regions when a negative tone resist has been used) are washed away by chemical dissolution using a developer solution. The remaining resist structure may be left as is, transferred into the underlying common base by an etch process, or thermally melted (i.e., "reflown") at temperatures up to 200° C. to allow the structure to form into a smooth, continuous, spherical and/or aspheric surface. The remaining resist, either before or after reflow, may be used as an etch mask for defining features that may be etched into the underlying common base. Furthermore, careful control of the etch selectivity (i.e., the ratio of the resist etch rate to the common base etch rate) may allow additional flexibility in the control of the surface form of the features, such as lenses or prisms.

Once created, wafer-scale arrays 5000 of optical elements 5002 may be aligned and bonded to additional arrays to form arrayed imaging systems 5006 as shown in FIG. 155. Optionally or additionally, optical elements 5002 may be formed on both sides of common base 5004. Common bases 5004 may be bonded directly together or spacers may be used to bond common bases 5004 with space therebetween. Resulting arrayed imaging systems 5006 may include an array of solid state image detectors 5008, such as complementary-metal-oxide-semiconductor (CMOS) image detectors, at the focal plane of the imaging systems. Once the wafer-scale assembly is complete, arrayed imaging systems may be separated into a plurality of imaging systems.

A key disadvantage of current wafer-scale imaging system integration is a lack of precision associated with parallel assembly. For example, vertical offset in optical elements due to thickness non-uniformities within a common base and systematic misalignment of optical elements relative to an optical axis may degrade the integrity of one or more imaging systems throughout the array. Also, prior art wafer-scale arrays of optical elements are generally created by the use of a partial fabrication master, including features for defining only one or a few optical elements in the array at a time, to "stamp out" or "mold" a few optical elements on the common base at a time; consequently, the fabrication precision of prior art wafer-scale arrays of optical elements is limited by the precision of the mechanical system that moves the partial fabrication master in relation to the common base. That is, while current technologies may enable alignment at mechanical tolerances of several microns, they do not provide optical tolerance (i.e., on the order of a wavelength of electromagnetic energy of interest) alignment accuracy required for precise imaging system manufacture. Another key disadvantage of current wafer-scale imaging system integration is that the optical materials used in prior art systems cannot withstand the reflow process temperatures.

Detectors such as, but not limited to, complementary metal-oxide-semiconductor (CMOS) detectors, may benefit from the use of lenslet arrays for increasing the fill factor and detection sensitivity of each detector pixel in the detector. Moreover, detectors may require additional filters for a variety of uses such as, for example, detecting different colors and blocking infrared electromagnetic energy. The aforementioned tasks require the addition of optical elements (e.g., lenslets and filters) to existing detectors, which is a disadvantage in using current technology.

Detectors are generally fabricated using a lithographic process and therefore include materials that are compatible with the lithographic process. For example, CMOS detectors are currently fabricated using CMOS processes and compatible materials such as crystalline silicon, silicon nitride and silicon dioxide. However, optical elements using prior art technology that are added to the detector are normally fabricated separately from the detector, possibly in different facilities, and may use materials that are not necessarily compatible with certain CMOS fabrication processes (e.g., while organic dyes may be used for color filters and organic polymers for lenslets, such materials are generally not considered to be compatible with CMOS fabrication processes). These extra fabrication and handling steps may consequently add to the overall cost and reduce the overall yield of the detector fabrication. Systems, methods, processes and applications disclosed herein overcome disadvantages associated with current wafer-scale imaging system integration and detector design and fabrication.

SUMMARY

In an embodiment, arrayed imaging systems are provided. An array of detectors is formed with a common base. The arrayed imaging systems have a first array of layered optical elements, each one of the layered optical elements being optically connected with a detector in the array of detectors.

In an embodiment, a method forms a plurality of imaging systems, each of the plurality of imaging systems having a detector, including: forming arrayed imaging systems with a common base by forming, for each of the plurality of imaging systems, at least one set of layered optical elements optically connected with its detector, the step of forming including sequential application of one or more fabrication masters.

In an embodiment, a method forms arrayed imaging systems with a common base and at least one detector, including: forming an array of layered optical elements, at least one of the layered optical elements being optically connected with the detector, the step of forming including sequentially applying one or more fabrication masters such that the arrayed imaging systems are separable into a plurality of imaging systems.

In an embodiment, a method forms arrayed imaging optics with a common base, including forming an array of a plurality of layered optical elements by sequentially applying one or more fabrication masters aligned to the common base.

In an embodiment, a method is provided for manufacturing arrayed imaging systems including at least an optics subsystem and an image processor subsystem, both connected with a detector subsystem, by: (a) generating an arrayed imaging systems design, including an optics subsystem design, a detector subsystem design and an image processor subsystem design; (b) testing at least one of the subsystem designs to determine if the at least one of the subsystem designs conforms within predefined parameters; if the at least one of the subsystem designs does not conform within the predefined parameters, then: (c) modifying the arrayed imaging systems design, using a set of potential parameter modifications; (d) repeating (b) and (c) until the at least one of the subsystem designs conforms within the predefined parameters to yield a modified arrayed imaging systems design; (e) fabricating the optical, detector and image processor subsystems in accordance with the modified arrayed imaging systems design; and (f) assembling the arrayed imaging systems from the subsystems fabricated in (e).

In an embodiment, a software product has instructions stored on computer-readable media, wherein the instructions, when executed by a computer, perform steps for generating arrayed imaging systems design, including: (a) instructions for generating an arrayed imaging systems design, including an optics subsystem design, a detector subsystem design and an image processor subsystem design; (b) instructions for testing at least one of the optical, detector and image processor subsystem designs to determine if the at least one of the subsystem designs conforms within predefined parameters; if the at least one of the subsystem designs does not conform within the predefined parameters, then: (c) instructions for modifying the arrayed imaging systems design, using a set of parameter modifications; and (d) instructions for repeating (b) and (c) until the at least one of the subsystem designs conforms within the predefined parameters to yield the arrayed imaging systems design.

In an embodiment, a multi-index optical element has a monolithic optical material divided into a plurality of volumetric regions, each of the plurality of volumetric regions having a defined refractive index, at least two of the volumetric regions having different refractive indices, the plurality of volumetric regions being configured to predeterministically modify phase of electromagnetic energy transmitted through the monolithic optical material.

In an embodiment, an imaging system includes: optics for forming an optical image, the optics including a multi-index optical element having a plurality of volumetric regions, each of the plurality of volumetric regions having a defined refractive index, at least two of the volumetric regions having different refractive indices, the plurality of volumetric regions being configured to predeterministically modify phase of electromagnetic energy transmitted therethrough; a detector for converting the optical image into electronic data; and a processor for processing the electronic data to generate output.

In an embodiment, a method manufactures a multi-index optical element, by: forming a plurality of volumetric regions in a monolithic optical material such that: (i) each of the plurality of volumetric regions has a defined refractive index, and (ii) at least two of the volumetric regions have different refractive indices, wherein the plurality of volumetric regions predeterministically modify phase of electromagnetic energy transmitted therethrough.

In an embodiment, a method forms an image by: predeterministically modifying phase of electromagnetic energy that contribute to the optical image by transmitting the electromagnetic energy through a monolithic optical material having a plurality of volumetric regions, each of the plurality of volumetric regions having a defined refractive index and at least two of the volumetric regions having different refractive indices; converting the optical image into electronic data; and processing the electronic data to form the image.

In an embodiment, arrayed imaging systems have: an array of detectors formed with a common base; and an array of layered optical elements, each one of the layered optical elements being optically connected with at least one of the detectors in the array of detectors so as to form arrayed imaging systems, each imaging system including at least one layered optical element optically connected with at least one detector in the array of detectors.

In an embodiment, a method for forming a plurality of imaging systems is provided, including: forming a first array of optical elements, each one of the optical elements being optically connected with at least one detector in an array of detectors having a common base; forming a second array of optical elements optically connected with the first array of optical elements so as to collectively form an array of layered optical elements, each one of the layered optical elements being optically connected with one of the detectors in the array of detectors; and separating the array of detectors and the array of layered optical elements into the plurality of imaging systems, each one of the plurality of imaging systems including at least one layered optical element optically connected with at least one detector, wherein forming the first array of optical elements includes configuring a planar interface between the first array of optical elements and the array of detectors.

In an embodiment, arrayed imaging systems include: an array of detectors formed on a common base; a plurality of arrays of optical elements; and a plurality of bulk material layers separating the plurality of arrays of optical elements, the plurality of arrays of optical elements and the plurality of bulk material layers cooperating to form an array of optics, each one of the optics being optically connected with at least one of the detectors of the array of detectors so as to form arrayed imaging systems, each of the imaging systems including at least one optics optically connected with at least one detector in the array of detectors, each one of the plurality of bulk material layers defining a distance between adjacent arrays of optical elements.

In an embodiment, a method for machining an array of templates for optical elements is provided, by: fabricating the array of templates using at least one of a slow tool servo approach, a fast tool servo approach, a multi-axis milling approach and a multi-axis grinding approach.

In an embodiment, an improvement to a method for manufacturing a fabrication master including an array of templates for optical elements defined thereon is provided, by: directly fabricating the array of templates.

In an embodiment, a method for manufacturing an array of optical elements is provided, by: directly fabricating the array of optical elements using at least a selected one of a slow tool servo approach, a fast tool servo approach, a multi-axis milling approach and a multi-axis grinding approach.

In an embodiment, an improvement to a method for manufacturing an array of optical elements is provided, by: forming the array of optical elements by direct fabrication.

In an embodiment, a method is provided for manufacturing a fabrication master used in forming a plurality of optical elements therewith, including: determining a first surface that includes features for forming the plurality of optical elements; determining a second surface as a function of (a) the first surface and (b) material characteristics of the fabrication master; and performing a fabrication routine based on the second surface so as to form the first surface on the fabrication master.

In an embodiment, a method is provided for fabricating a fabrication master for use in forming a plurality of optical elements, including: forming a plurality of first surface features on the fabrication master using a first tool; and forming a plurality of second surface features on the fabrication master using a second tool, the second surface features being different from the first surface features, wherein a combination of the first and second surface features is configured to form the plurality of optical elements.

In an embodiment, a method is provided for manufacturing a fabrication master for use in forming a plurality of optical elements, including: forming a plurality of first features on the fabrication master, each of the plurality of first features approximating second features that form one of the plurality of optical elements; and smoothing the plurality of first features to form the second features.

In an embodiment, a method is provided for manufacturing a fabrication master for use in forming a plurality of optical elements, by: defining the plurality of optical elements to include at least two distinct types of optical elements; and directly fabricating features configured to form the plurality of optical elements on a surface of the fabrication master.

In an embodiment, a method is provided for manufacturing a fabrication master that includes a plurality of features for forming optical elements therewith, including: defining the plurality of features as including at least one type of element having an aspheric surface; and directly fabricating the features on a surface of the fabrication master.

In an embodiment, a method is provided for manufacturing a fabrication master including a plurality of features for forming optical elements therewith, by: defining a first fabrication routine for forming a first portion of the features on a surface of the fabrication master; directly fabricating at least one of the features on the surface using the first fabrication routine; measuring a surface characteristic of the at least one of the features; defining a second fabrication routine for forming a second portion of the features on the surface of the fabrication master, wherein the second fabrication routine comprises the first fabrication routine adjusted in at least one aspect in accordance with the surface characteristic so measured; and directly fabricating at least one of the features on the surface using the second fabrication routine.

In an embodiment, an improvement is provided to a machine that manufactures a fabrication master for forming a plurality of optical elements therewith, the machine including a spindle for holding the fabrication master and a tool holder for holding a machine tool that fabricates features for forming the plurality of optical elements on a surface of the fabrication master, an improvement having: a metrology system configured to cooperate with the spindle and the tool holder for measuring a characteristic of the surface.

In an embodiment, a method is provided for manufacturing a fabrication master that forms a plurality of optical elements therewith, including: directly fabricating features for forming the plurality of optical elements on a surface of the fabrication master; and directly fabricating at least one alignment feature on the surface, the alignment feature being configured to cooperate with a corresponding alignment feature on a separate object to define a separation distance between the surface and the separate object.

In an embodiment, a method of manufacturing a fabrication master for forming an array of optical elements therewith is provided, by: directly fabricating on a surface of the substrate features for forming the array of optical elements; and directly fabricating on the surface at least one alignment feature, the alignment feature being configured to cooperate with a corresponding alignment feature on a separate object to indicate at least one of a translation, a rotation and a separation between the surface and the separate object.

In an embodiment, a method is provided for modifying a substrate to form a fabrication master for an array of optical elements using a multi-axis machine tool, by: mounting the substrate to a substrate holder; performing preparatory machining operations on the substrate; directly fabricating on a surface of the substrate features for forming the array of optical elements; and directly fabricating on the surface of the substrate at least one alignment feature; wherein the substrate remains mounted to the substrate holder during the performing and directly fabricating steps.

In an embodiment, a method is provided for fabricating an array of layered optical elements, including: using a first fabrication master to form a first layer of optical elements on a common base, the first fabrication master having a first master substrate including a negative of the first layer of optical elements formed thereon; using a second fabrication master to form a second layer of optical elements adjacent to the first layer of optical elements so as to form the array of layered optical elements on the common base, the second fabrication master having a second master substrate including a negative of the second layer of optical elements formed thereon.

In an embodiment, a fabrication master has: an arrangement for molding a moldable material into a predetermined shape that defines a plurality of optical elements; and an arrangement for aligning the molding arrangement in a predetermined orientation with respect to a common base when the fabrication master is used in combination with the common base, such that the molding arrangement may be aligned with the common base for repeatability and precision with less than two wavelengths of error.

In an embodiment, arrayed imaging systems include a common base having a first side and a second side remote from the first side, and a first plurality of optical elements constructed and arranged in alignment on the first side of the common base where the alignment error is less than two wavelengths.

In an embodiment, arrayed imaging systems include: a first common base, a first plurality of optical elements constructed and arranged in precise alignment on the first common base, a spacer having a first surface affixed to the first common base, the spacer presenting a second surface remote from the first surface, the spacer forming a plurality of holes therethrough aligned with the first plurality of optical elements, for transmitting electromagnetic energy therethrough, a second common base bonded to the second surface to define respective gaps aligned with the first plurality of optical elements, movable optics positioned in at least one of the gaps, and arrangement for moving the movable optics.

In an embodiment, a method is provided for the manufacture of an array of layered optical elements on a common base, by: (a) preparing the common base for deposition of the array of layered optical elements; (b) mounting the common base and a first fabrication master such that precision alignment of at least two wavelengths exists between the first fabrication master and the common base, (c) depositing a first moldable material between the first fabrication master and the common base, (d) shaping the first moldable material by aligning and engaging the first fabrication master and the common base, (e) curing the first moldable material to form a first layer of optical elements on the common base, (f) replacing the first fabrication master with a second fabrication master, (g) depositing a second moldable material between the second fabrication master and the first layer of optical elements, (h) shaping the second moldable material by aligning and engaging the second fabrication master and the common base, and (i) curing the second moldable material to form a second layer of optical elements on the common base.

In an embodiment, an improvement is provided to a method for fabricating a detector pixel formed by a set of processes, by: forming at least one optical element within the detector pixel using at least one of the set of processes, the optical element being configured for affecting electromagnetic energy over a range of wavelengths.

In an embodiment, an electromagnetic energy detection system has: a detector including a plurality of detector pixels; and an optical element integrally formed with at least one of the plurality of detector pixels, the optical element being configured for affecting electromagnetic energy over a range of wavelengths.

In an embodiment, an electromagnetic energy detection system detects electromagnetic energy over a range of wavelengths incident thereon, and includes: a detector including a plurality of detector pixels, each one of the detector pixels including at least one electromagnetic energy detection region; and at least one optical element buried within at least one of the plurality of detector pixels, to selectively redirect the electromagnetic energy over the range of wavelengths to the electromagnetic energy detection region of said at least one detector pixel.

In an embodiment, an improvement is provided in an electromagnetic energy detector, including: a structure integrally formed with the detector and including subwavelength features for redistributing electromagnetic energy incident thereon over a range of wavelengths.

In an embodiment, an improvement is provided to an electromagnetic energy detector, including: a thin film filter integrally formed with the detector to provide at least one of bandpass filtering, edge filtering, color filtering, high-pass filtering, low-pass filtering, anti-reflection, notch filtering and blocking filtering.

In an embodiment, an improvement is provided to a method for forming an electromagnetic energy detector by a set of processes, by: forming a thin film filter within the detector using at least one of the set of processes; and configuring the thin film filter for performing at least a selected one of bandpass filtering, edge filtering, color filtering, high-pass filtering, low-pass filtering, anti-reflection, notch filtering, blocking filtering and chief ray angle correction.

In an embodiment, an improvement is provided to an electromagnetic energy detector including at least one detector pixel with a photodetection region formed therein, including: a chief ray angle corrector integrally formed with the detector pixel at an entrance pupil of the detector pixel, to redistribute at least a portion of electromagnetic energy incident thereon toward the photodetection region.

In an embodiment, an electromagnetic energy detection system has: a plurality of detector pixels, and a thin film filter integrally formed with at least one of the detector pixels and configured for at least a selected one of bandpass filtering, edge filtering, color filtering, high-pass filtering, low-pass filtering, anti-reflection, notch filtering, blocking filtering and chief ray angle correction.

In an embodiment, an electromagnetic energy detection system has: a plurality of detector pixels, each one of the plurality of detector pixels including a photodetection region and a chief ray angle corrector integrally formed with the detector pixel at an entrance pupil of the detector pixel, the chief ray angle corrector being configured for directing at least a portion of electromagnetic energy incident thereon toward the photodetection region of the detector pixel.

In an embodiment, a method simultaneously generates at least first and second filter designs, each one of the first and second filter designs defining a plurality of thin film layers, by: a) defining a first set of requirements for the first filter design and a second set of requirements for the second filter design; b) optimizing at least a selected parameter characterizing the thin film layers in each one of the first and second filter designs in accordance with the first and second sets of requirements to generate a first unconstrained design for the first filter design and a second unconstrained design for the second filter design; c) pairing one of the thin film layers in the first filter design with one of the thin film layers in the second filter design to define a first set of paired layers, the layers that are not the first set of paired layers being non-paired layers; d) setting the selected parameter of the first set of paired layers to a first common value; and e) re-optimizing the selected parameter of the non-paired layers in the first and second filter designs to generate a first partially constrained design for the first filter design and a second partially constrained design for the second filter design, wherein the first and second partially constrained designs meet at least a portion of the first and second sets of requirements, respectively.

In an embodiment, an improvement is provided to a method for forming an electromagnetic energy detector including at least first and second detector pixels, including: integrally forming a first thin film filter with the first detector pixel and a second thin film filter with the second detector pixel, such that the first and second thin film filters share at least a common layer.

In an embodiment, an improvement is provided to an electromagnetic energy detector including at least first and second detector pixels, including: first and second thin film filters integrally formed with the first and second detector pixels, respectively, wherein the first and second thin film filters are configured for modifying electromagnetic energy incident thereon, and wherein the first and second thin film filters share at least one layer in common.

In an embodiment, an improvement is provided to an electromagnetic energy detector including a plurality of detector pixels, including: an electromagnetic energy modifying element integrally formed with at least a selected one of the detector pixels, the electromagnetic energy modifying element being configured for directing at least a portion of electromagnetic energy incident thereon within the selected detector pixel, wherein the electromagnetic energy modifying element comprises a material compatible with processes used for forming the detector, and wherein the electromagnetic energy modifying element is configured to include at least one non-planar surface.

In an embodiment, an improvement is provided in a method for forming an electromagnetic energy detector by a set of processes, the electromagnetic energy detector including a plurality of detector pixels, including: integrally forming, with at least a selected one of the detector pixels and by at least one of the set of processes, at least one electromagnetic energy modifying element configured for directing at least a portion of electromagnetic energy incident thereon within the selected detector pixel, wherein integrally forming comprises: depositing a first layer; forming at least one relieved area in the first layer, the relieved area being characterized by substantially planar surfaces; depositing a first layer on top of the relieved area such that the first layer defines at least one non-planar feature; depositing a second layer on top of the first layer such that the second layer at least partially fills the non-planar feature; and planarizing the second layer so as to leave a portion of the second layer filling the non-planar features of the first layer, forming the electromagnetic energy modifying element In an embodiment, an improvement is provided in a method for forming an electromagnetic energy detector by a set of processes, the detector including a plurality of detector pixels, including: integrally forming, with at least one of the plurality of detector pixels and by at least one of the set of processes, an electromagnetic energy modifying element configured for directing at least a portion of electromagnetic energy incident thereon within the selected detector pixel, wherein integrally forming comprises depositing a first layer, forming at least one protrusion in the first layer, the protrusion being characterized by substantially planar surfaces, and depositing a first layer on top of the planar feature such that the first layer defines at least one non-planar feature as the electromagnetic energy modifying element.

In an embodiment, a method is provided for designing an electromagnetic energy detector, by: specifying a plurality of input parameters; and generating a geometry of subwavelength structures, based on the plurality of input parameters, for directing the input electromagnetic energy within the detector.

In an embodiment, a method fabricates arrayed imaging systems, by: forming an array of layered optical elements, each one of the layered optical elements being optically connected with at least one detector in an array of detectors formed with a common base so as to form arrayed imaging systems, wherein forming the array of layered optical elements includes: using a first fabrication master, forming a first layer of optical elements on the array of detectors, the first fabrication master having a first master substrate including a negative of the first layer of optical elements formed thereon, using a second fabrication master, forming a second layer of optical elements adjacent to the first layer of optical elements, the second fabrication master including a second master substrate including a negative of the second layer of optical elements formed thereon.

In an embodiment, arrayed imaging optics include: an array of layered optical elements, each one of the layered optical elements being optically connected with a detector in the array of detectors, wherein the array of layered optical elements is formed at least in part by sequential application of one or more fabrication masters including features for defining the array of layered optical elements thereon.

In an embodiment, a method is provided for fabricating an array of layered optical elements, including: providing a first fabrication master having a first master substrate including a negative of a first layer of optical elements formed thereon; using the first fabrication master, forming the first layer of optical elements on a common base; providing a second fabrication master having a second master substrate including a negative of a second layer of optical elements formed thereon; using the second fabrication master, forming the second layer of optical elements adjacent to the first layer of optical elements so as to form the array of layered optical elements on the common base; wherein providing the first fabrication master comprises directly fabricating the negative of the first layer of optical elements on the first master substrate.

In an embodiment, arrayed imaging systems include: a common base; an array of detectors having detector pixels formed on the common base by a set of processes, each one of the detector pixels including a photosensitive region; and an array of optics optically connected with the photosensitive region of a corresponding one of the detector pixels thereby forming the arrayed imaging systems, wherein at least one of the detector pixels includes at least one optical feature integrated therein and formed using at least one of the set of processes, to affect electromagnetic energy incident on the detector over a range of wavelengths.

In an embodiment, arrayed imaging systems include: a common base; an array of detectors having detector pixels formed on the common base, each one of the detector pixels including a photosensitive region; and an array of optics optically connected with the photosensitive region of a corresponding one of the detector pixels, thereby forming the arrayed imaging systems.

In an embodiment, arrayed imaging systems have: an array of detectors formed on a common base; and an array of optics, each one of the optics being optically connected with at least one of the detectors in the array of detectors so as to form arrayed imaging systems, each imaging system including optics optically connected with at least one detector in the array of detectors.

In an embodiment, a method fabricates an array of layered optical elements, by: using a first fabrication master, forming a first array of elements on a common base, the first fabrication master comprising a first master substrate including a negative of a first array of optical elements directly fabricated thereon; and using a second fabrication master, forming the second array of optical elements adjacent to the first array of optical elements on the common base so as to form the array of layered optical elements on the common base, the second fabrication master comprising a second master substrate including a negative of a second array of optical elements formed thereon, the second array of optical elements on the second master substrate corresponding in position to the first array of optical elements on the first master substrate.

In an embodiment, arrayed imaging systems include: a common base; an array of detectors having detector pixels formed on the common base, each one of the detector pixels including a photosensitive region; and an array of optics optically connected with the photosensitive region of a corresponding one of the detector pixels thereby forming arrayed imaging systems, wherein at least one of the optics is switchable between first and second states corresponding to first and second magnifications, respectively.

In an embodiment, a layered optical element has first and second layer of optical elements forming a common surface having an anti-reflection layer.

In an embodiment, a camera forms an image and has arrayed imaging systems including an array of detectors formed with a common base, and an array of layered optical elements, each one of the layered optical elements being optically connected with a detector in the array of detectors; and a signal processor for forming an image.

In an embodiment, a camera is provided for use in performing a task, and has: arrayed imaging systems including an array of detectors formed with a common base, and an array of layered optical elements, each one of the layered optical elements being optically connected with a detector in the array of detectors; and a signal processor for performing the task.

BRIEF DESCRIPTION OF DRAWINGS

The present disclosure may be understood by reference to the following detailed description taken in conjunction with the drawings briefly described below. It is noted that, for purposes of illustrative clarity, certain elements in the drawings may not be drawn to scale.

FIG. 50B shows a tabular representation of the filter kernel shown in FIG. 50A.

FIG. 78B shows a tabular representation of the filter kernel shown in FIG. 78A.

FIGS. 119-123 are a series of thru-focus spot diagrams (i.e., point spread functions or “PSFs”) for normal incidence and different values of misfocus for the GRIN lens of FIG. 118.

FIGS. 124-128 are a series of thru-focus spot diagrams, for electromagnetic energy incident at 5° away from normal, for the GRIN lens of FIG. 118.

FIG. 129 is a plot showing a series of modulation transfer functions (“MTFs”) for the GRIN lens of FIG. 118.

FIG. 147 illustrates another method by which a multi-index optical element may be manufactured, according to an embodiment.

FIG. 148 shows an optical system including an array of multi-index optical elements, according to an embodiment.

FIGS. 149-153 show optical systems including multi-index optical elements incorporated into various systems.

FIG. 154 shows a prior art wafer-scale array of optical elements.

FIG. 155 shows an assembly of prior art wafer-scale arrays.

FIG. 156 shows arrayed imaging systems and a breakout of a singulated imaging system, according to an embodiment.

FIG. 157 is a schematic cross-sectional diagram illustrating details of the imaging system of FIG. 156.

FIG. 158 is a schematic cross-sectional diagram illustrating ray propagation through the imaging system of FIGS. 156 and 157 for different field positions FIGS. 159-162 show results of numerical modeling of the imaging system of FIGS. 156 and 157.

FIG. 163 is a schematic cross-sectional diagram of an exemplary imaging system, according to an embodiment.

FIG. 164 is a schematic cross-sectional diagram of an exemplary imaging system, according to an embodiment.

FIG. 165 is a schematic cross-sectional diagram of an exemplary imaging system, according to an embodiment.

FIG. 166 is a schematic cross-sectional diagram of an exemplary imaging system, according to an embodiment.

Figure 166:
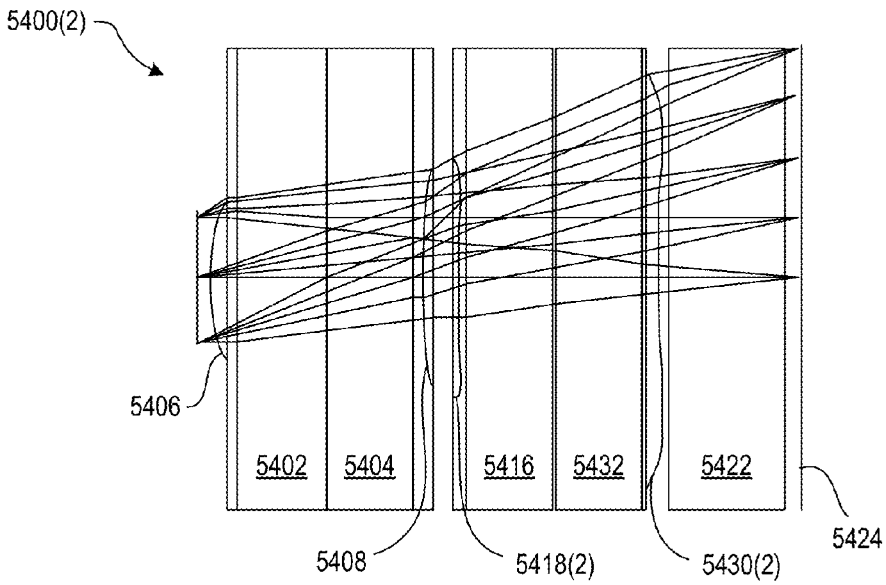

FIGS. 167-171 show results of numerical modeling of the exemplary imaging system of FIG. 166.

Figure 172:
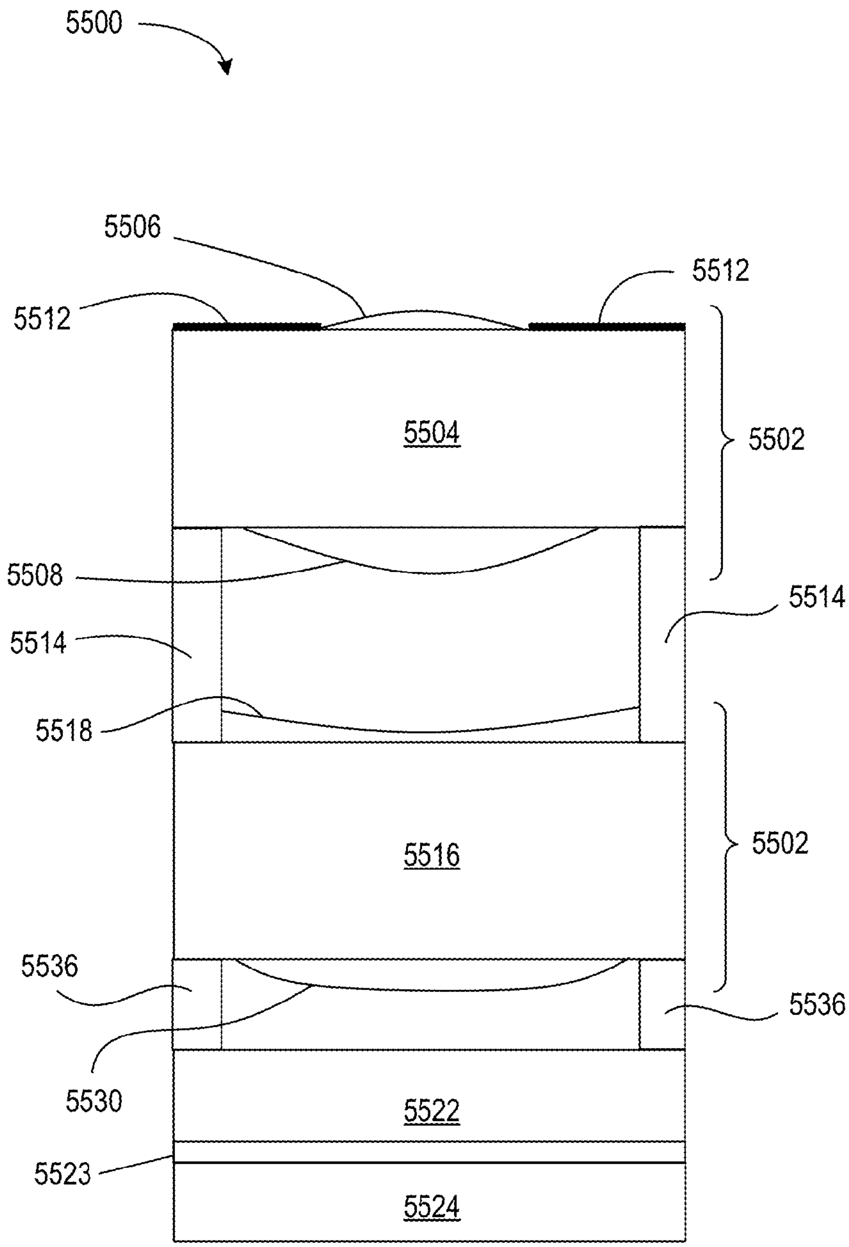

FIG. 172 is a schematic cross-sectional diagram of an exemplary imaging system, according to an embodiment.

Figure 173A:
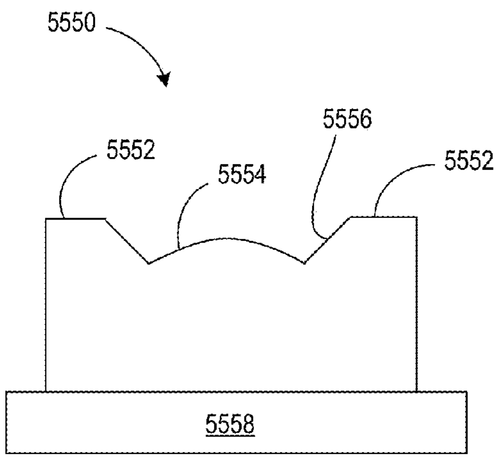
Figure 173B:
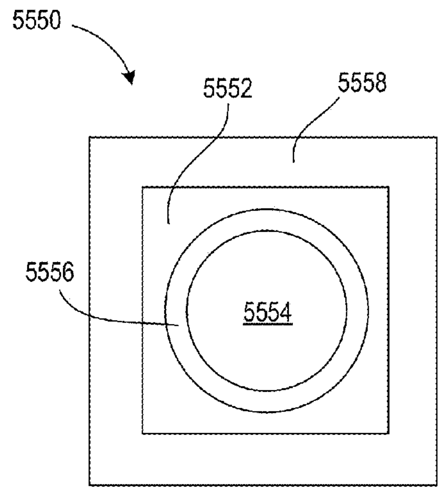

FIGS. 173A and 173B show cross-sectional and top views, respectively, of an optical element including an integrated standoff, according to an embodiment.

Figure 174A:
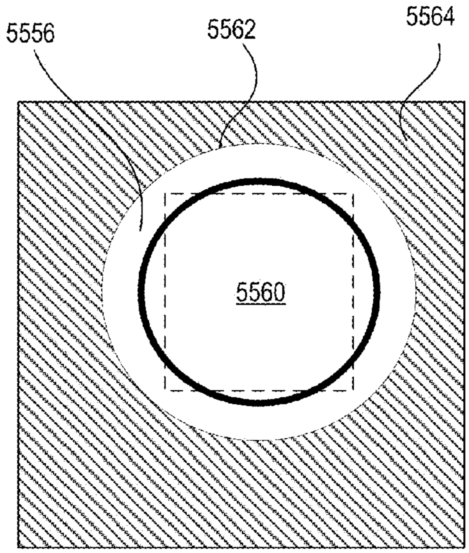
Figure 174B:
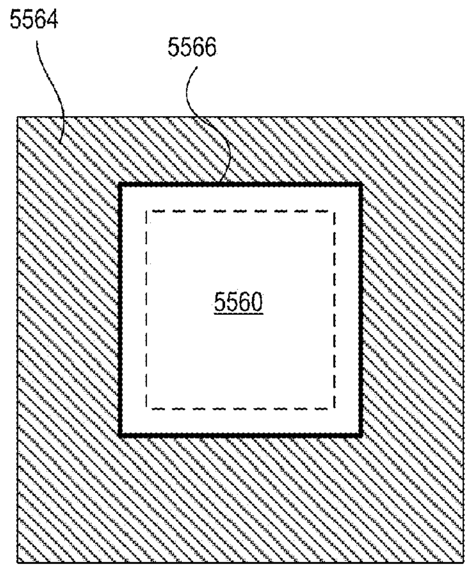

FIGS. 174A and 174B show top views of two rectangular apertures suitable for use with imaging system, according to an embodiment.

Figure 165:
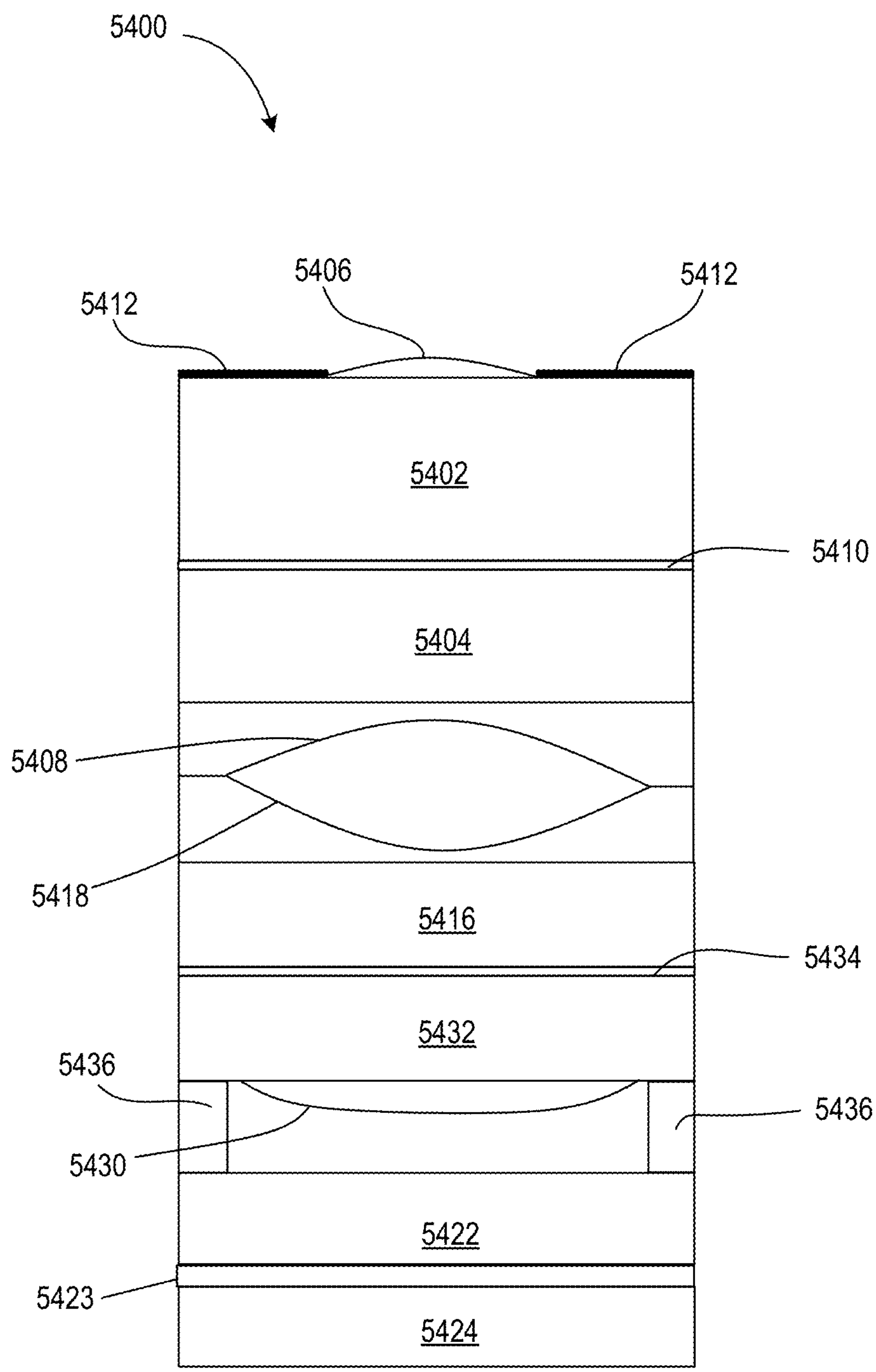
Figure 175:
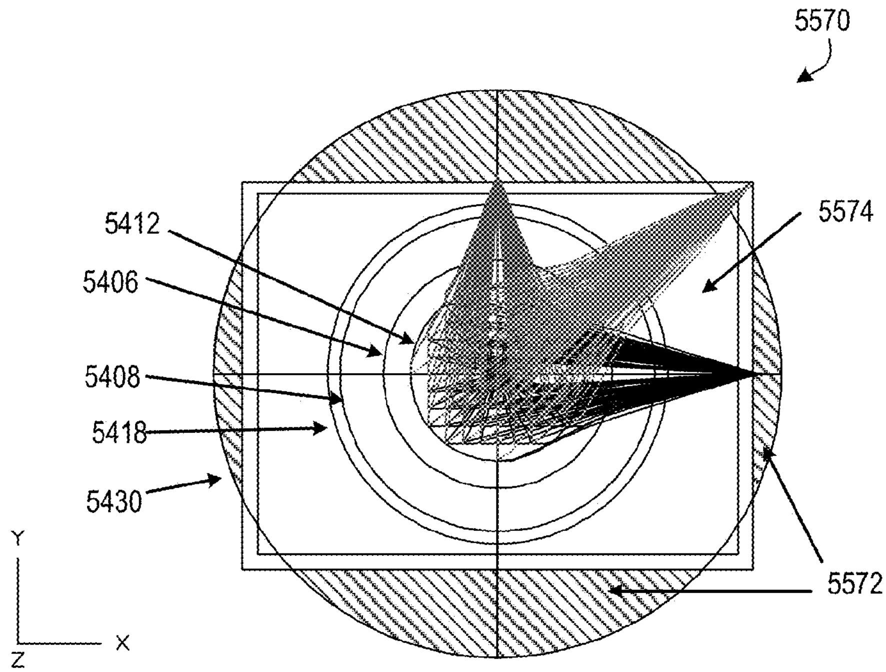

FIG. 175 shows a top view raytrace diagram of the exemplary imaging system of FIG. 165, shown here to illustrate a design with a circular aperture for each optical element.

Figure 176:
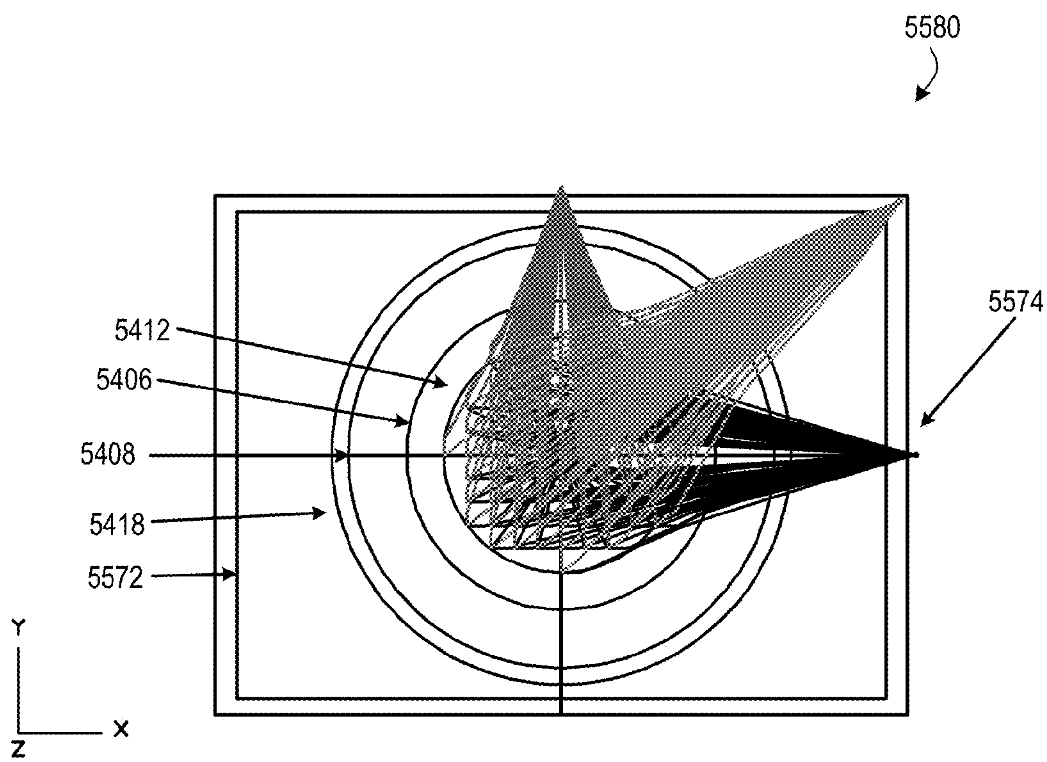

FIG. 176 shows a top view raytrace diagram of the exemplary imaging system of FIG. 165, shown here to illustrate the ray propagation through the imaging system when one optical element includes a rectangular aperture.

Figure 177:
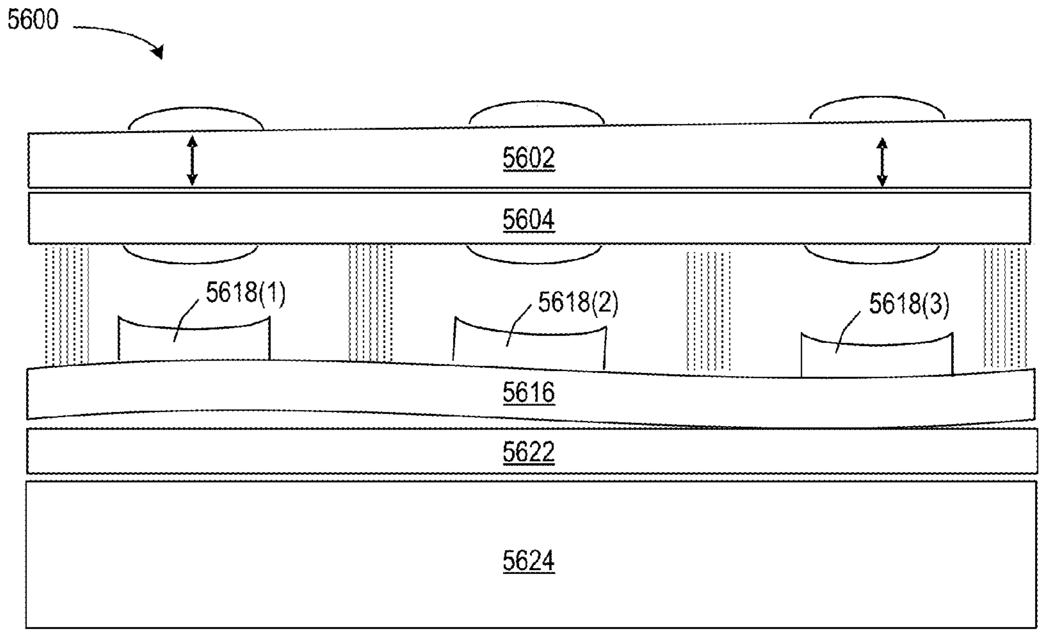

FIG. 177 shows a schematic cross-sectional diagram of a portion of an array of wafer-scale imaging systems, shown here to indicate potential sources of imperfection that may influence image quality.

Figure 178:
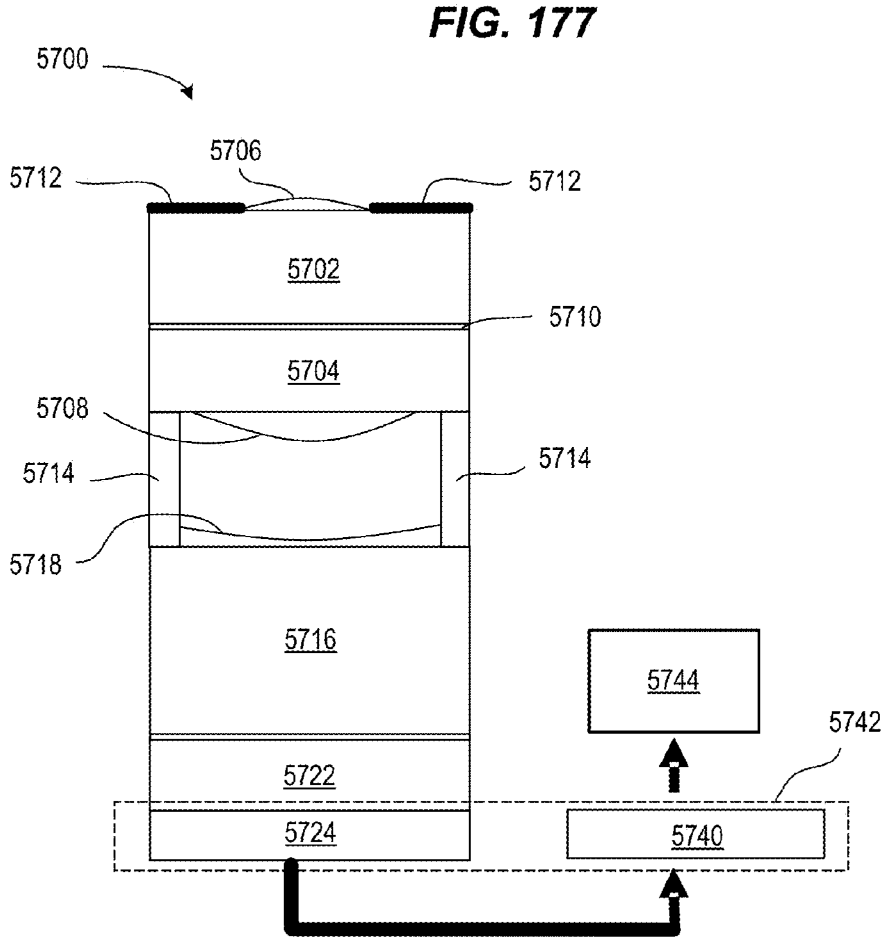

FIG. 178 is a schematic diagram showing an imaging system including a signal processor, according to an embodiment.

Figure 179:
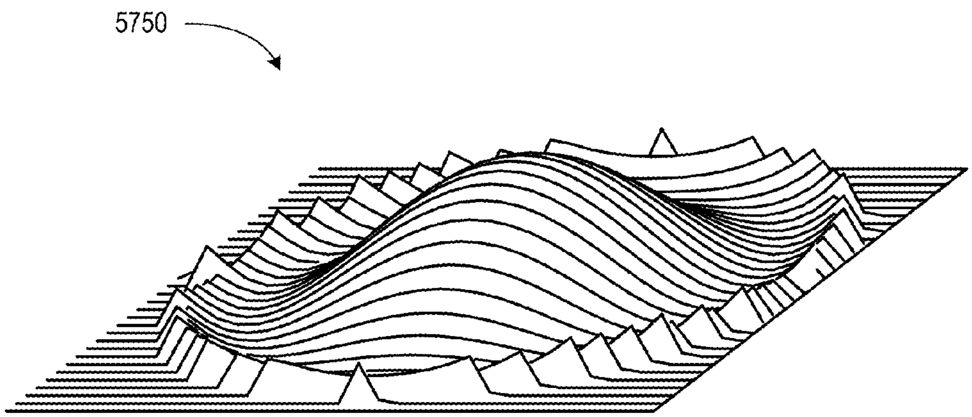
Figure 180:
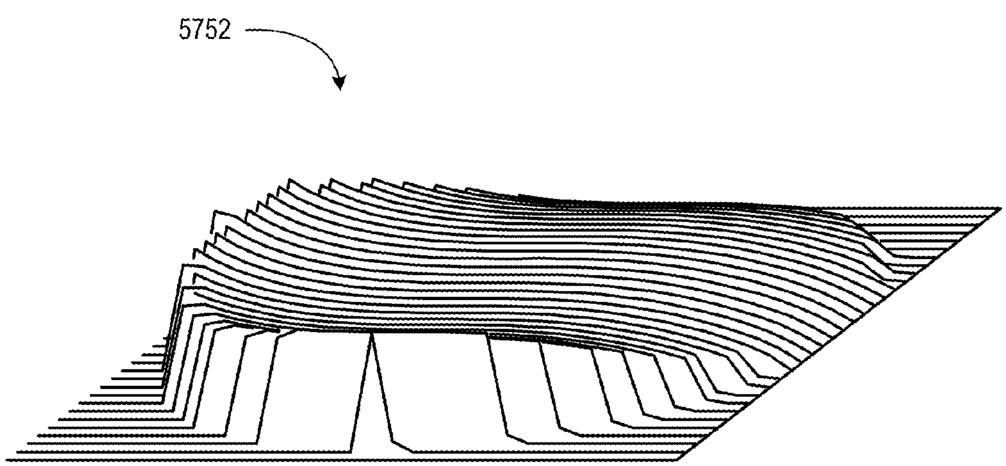

FIGS. 179 and 180 show 3D plots of the phase of exemplary exit pupils suitable for use with the imaging system of FIG. 178.

Figure 181:
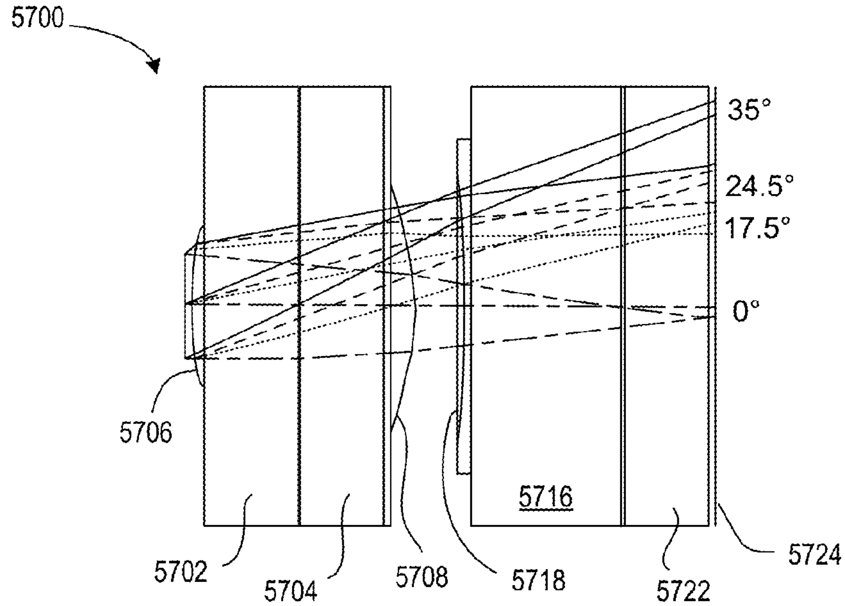

FIG. 181 is a schematic cross-sectional diagram illustrating ray propagation through the exemplary imaging system of FIG. 178 for different field positions.

Figure 182:
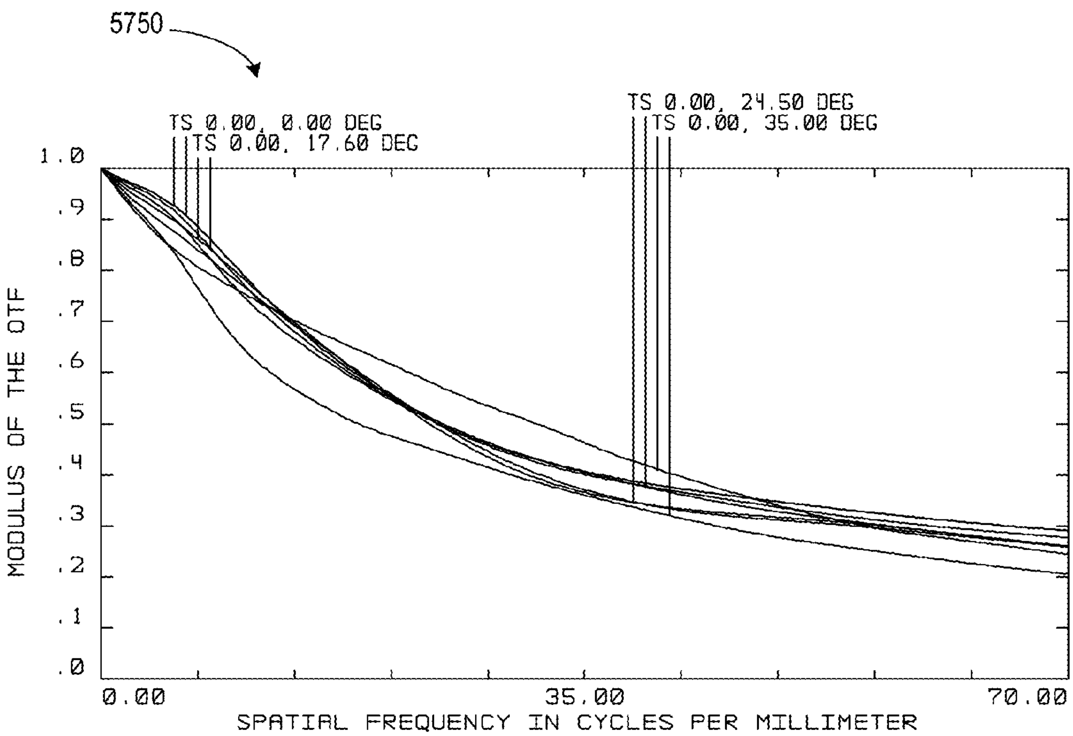
Figure 183:
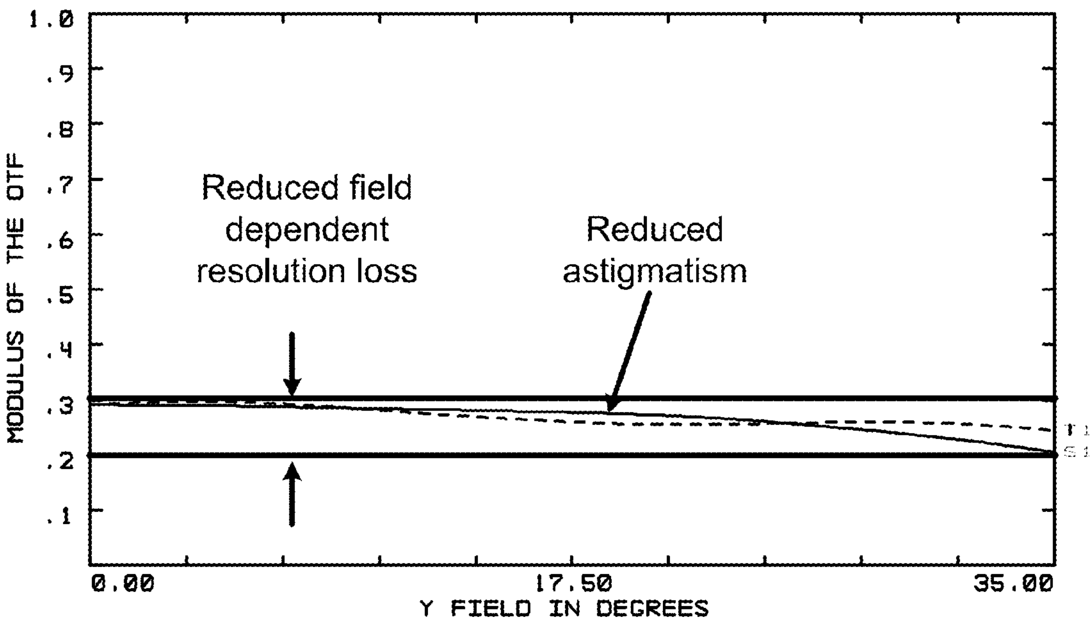

FIGS. 182 and 183 show performance results of numerical modeling without signal processing for the imaging system of FIG. 178.

Figure 158:
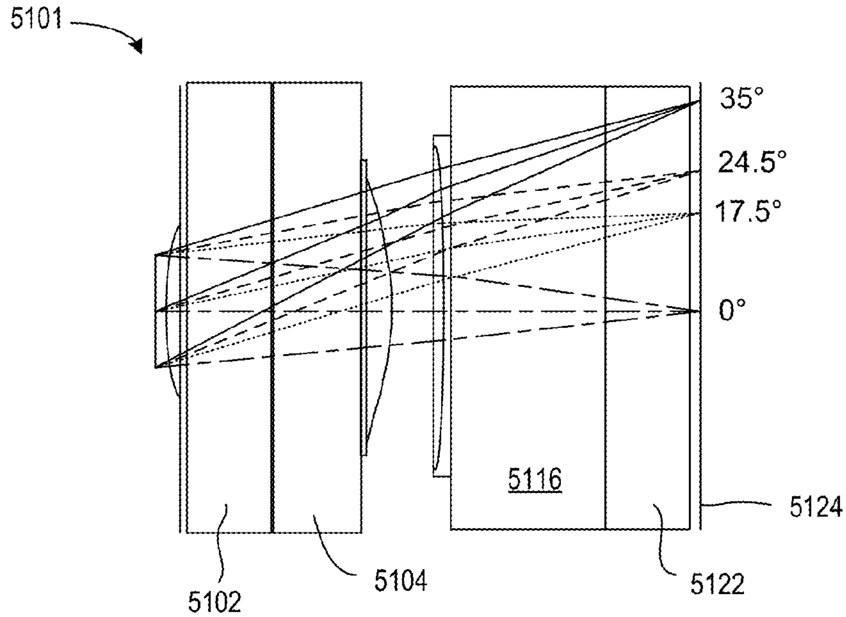
Figures 184, 185:
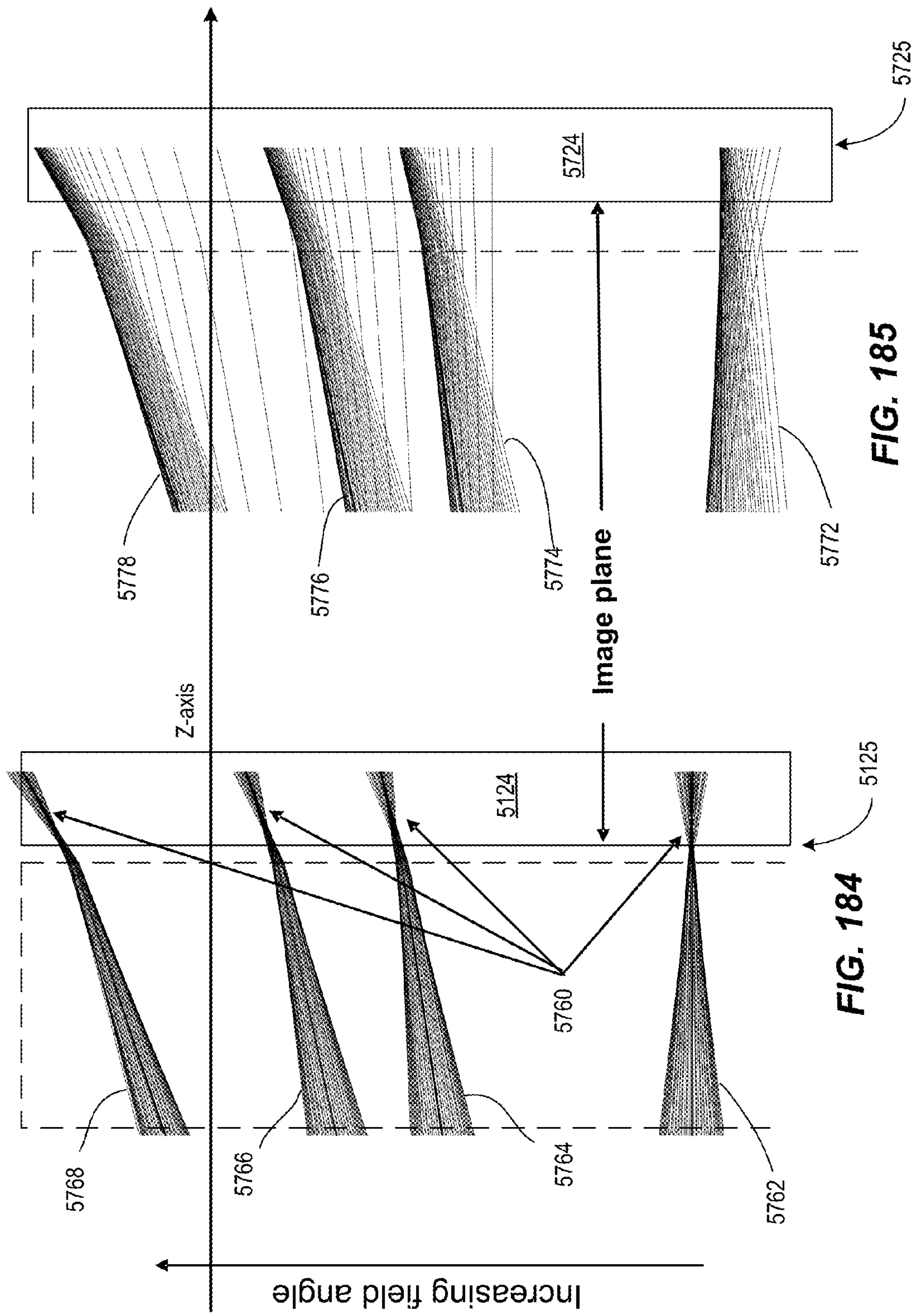

FIGS. 184 and 185 are schematic diagrams illustrating raytraces near the aperture stop of the imaging systems of FIGS. 158 and 181, respectively, shown here to illustrate the differences in the raytraces with and without the addition of a phase modifying surface near the aperture stop.

Figure 163:
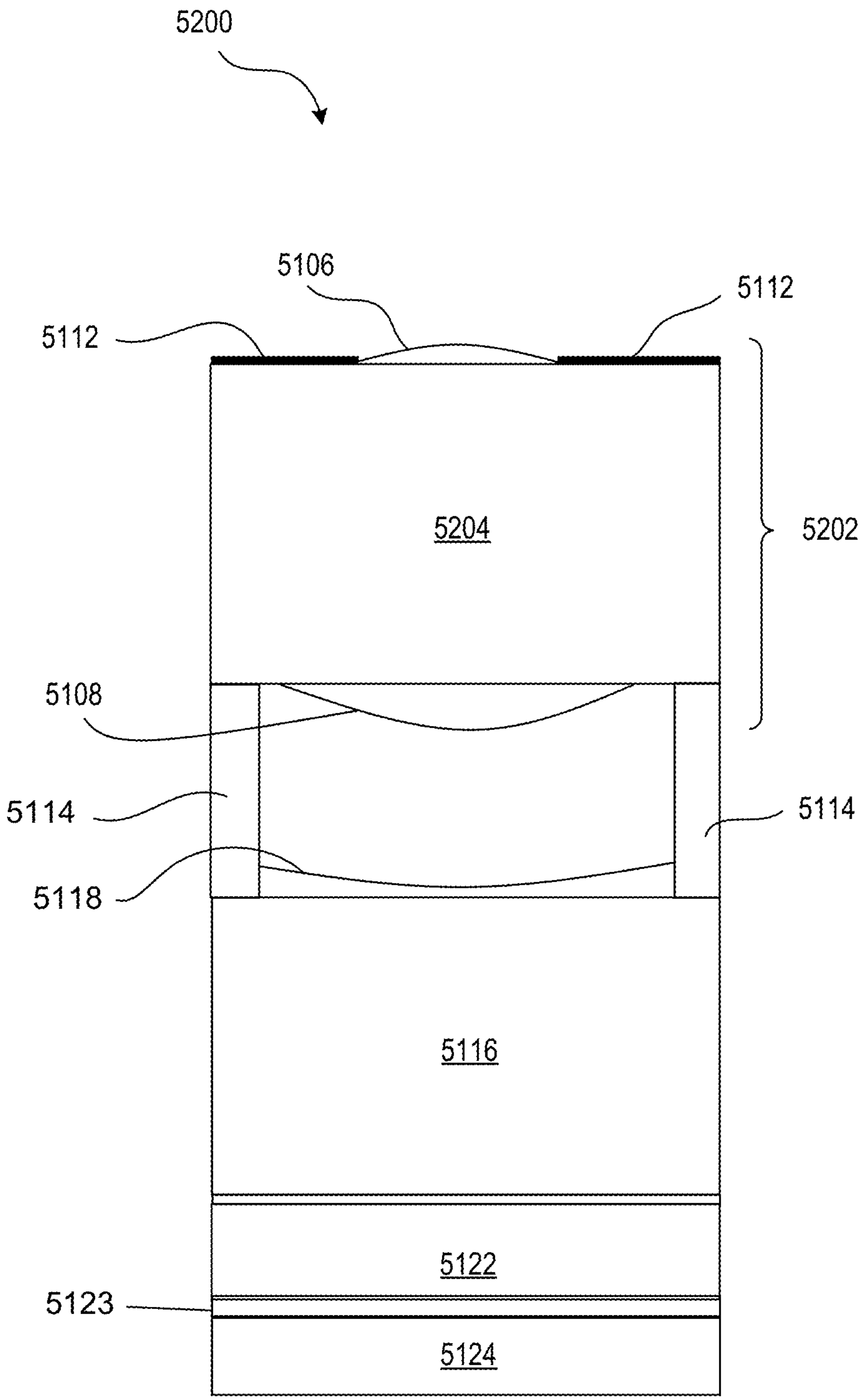
Figure 186:
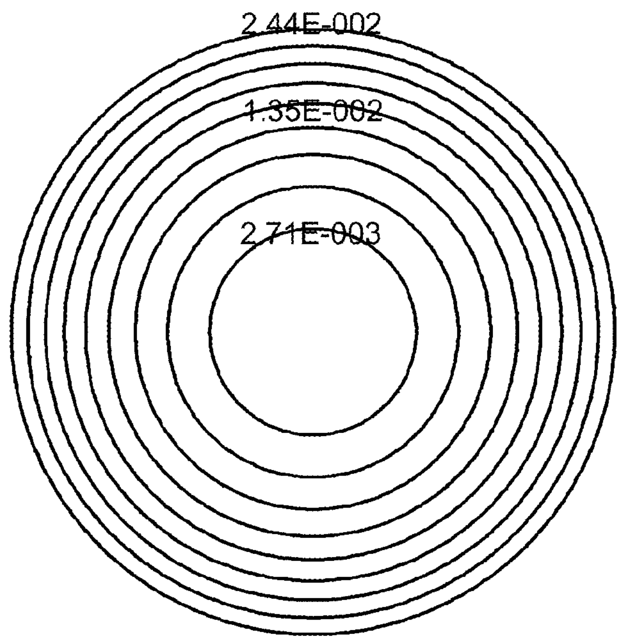
Figure 187:
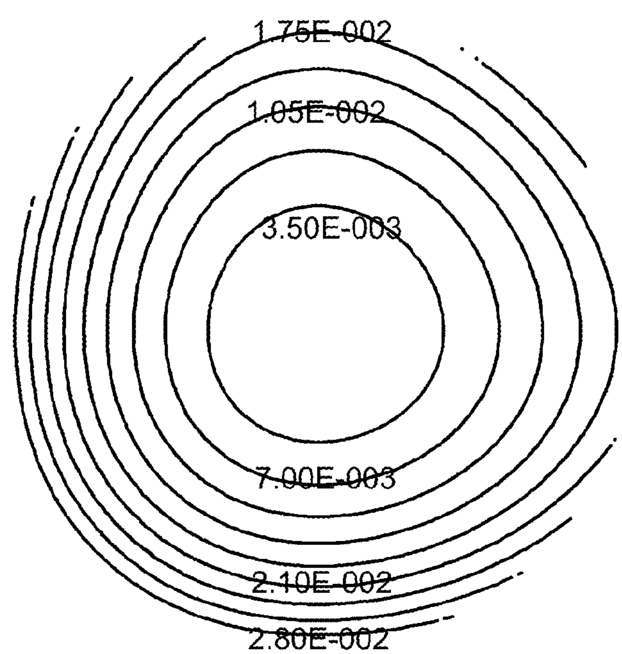

FIGS. 186 and 187 show contour maps of the surface profiles of optical elements from the imaging systems of FIGS. 163 and 178, respectively.

Figure 157:
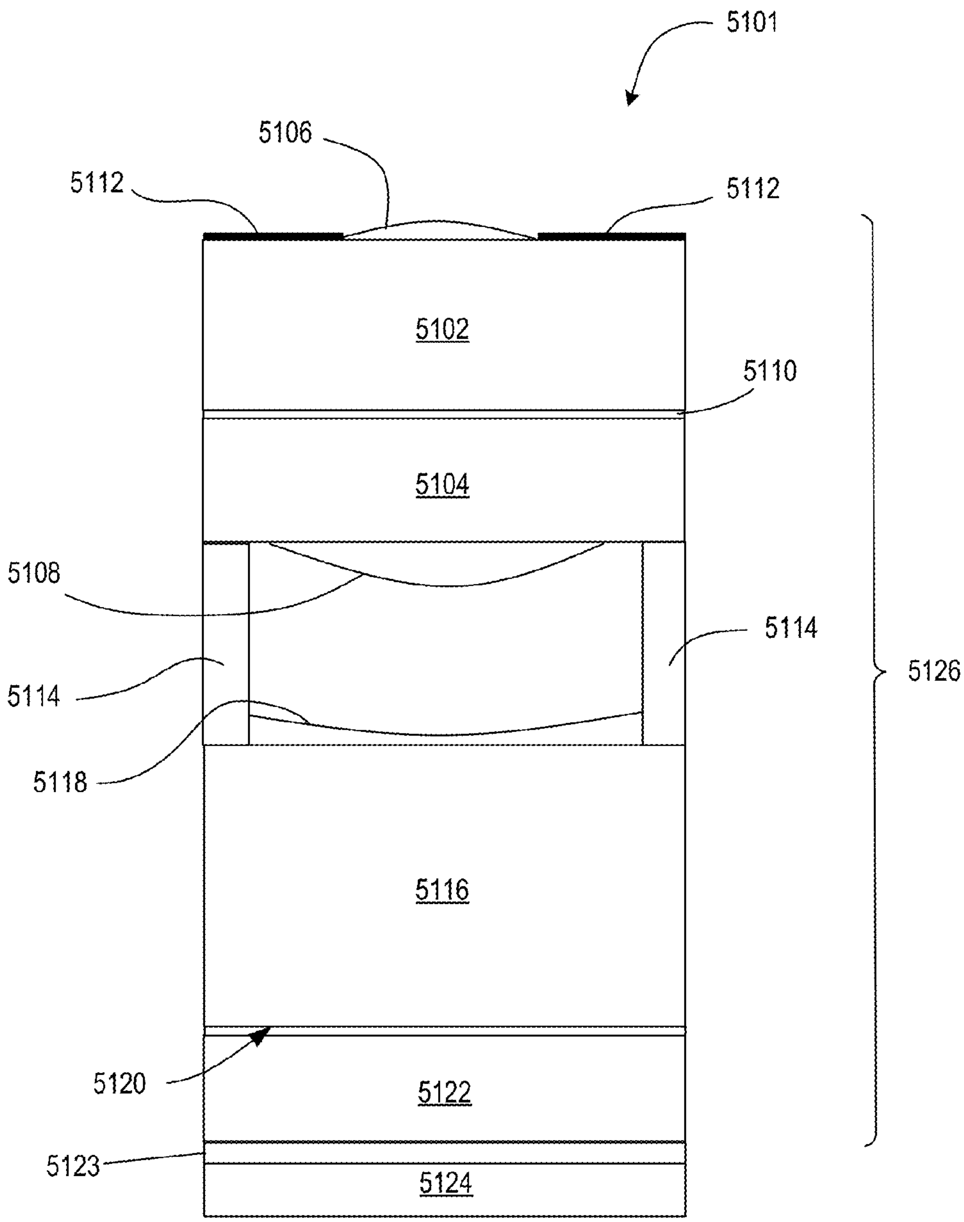
Figure 188:
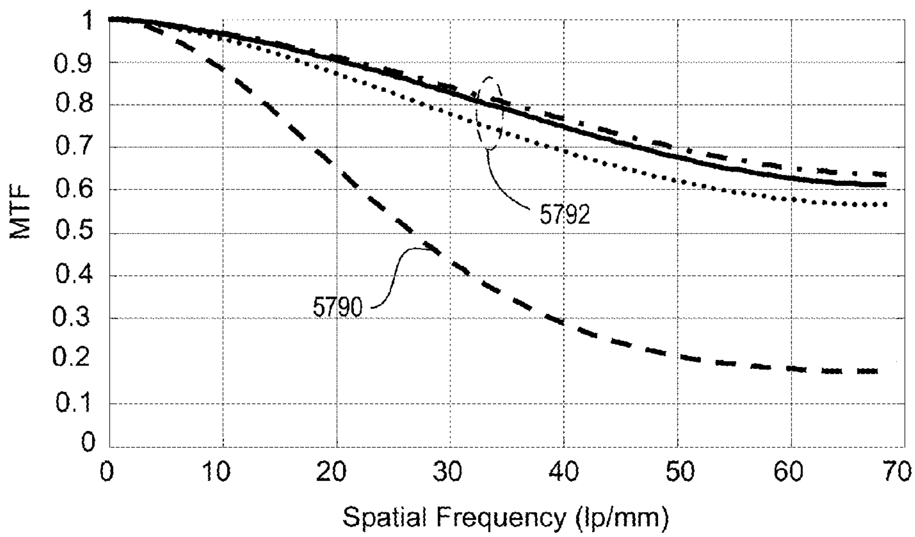
Figure 189:
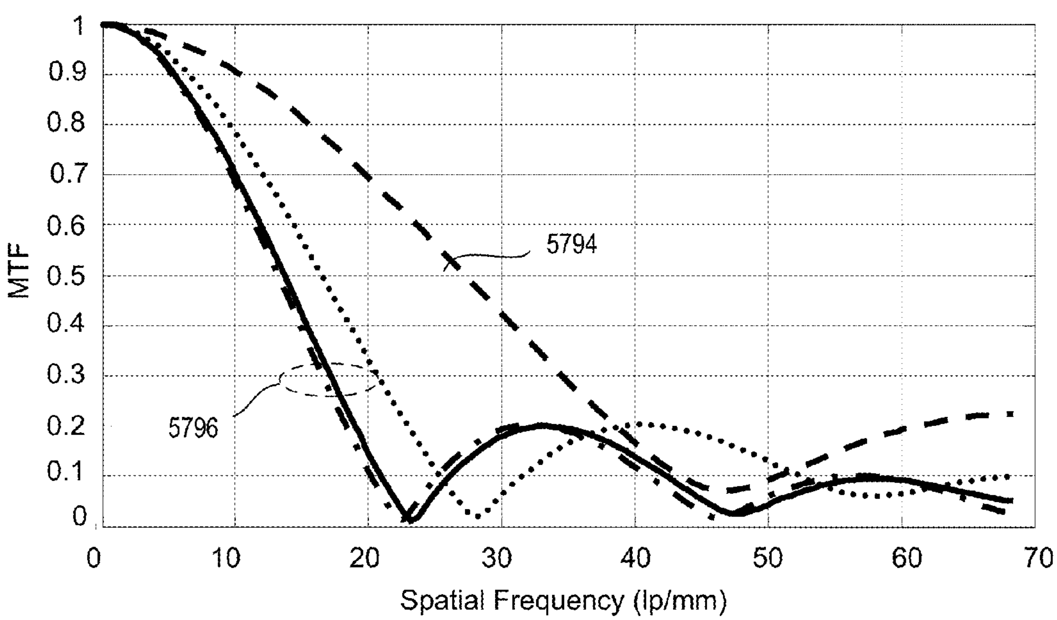

FIGS. 188 and 189 show modulation transfer functions (MTFs), before and after signal processing, and with and without assembly error, for the imaging system of FIG. 157.

Figure 190:
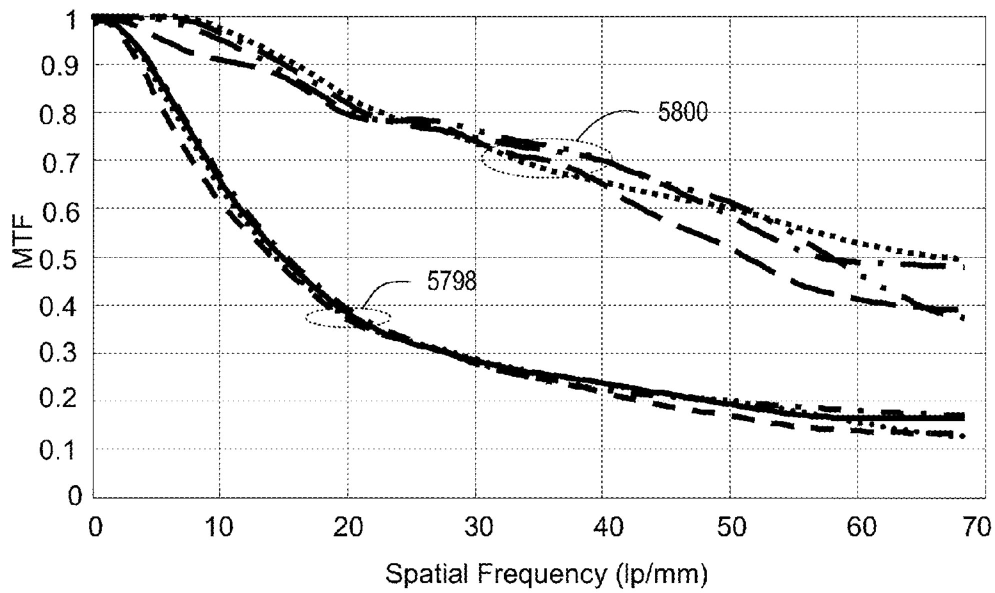
Figure 191:
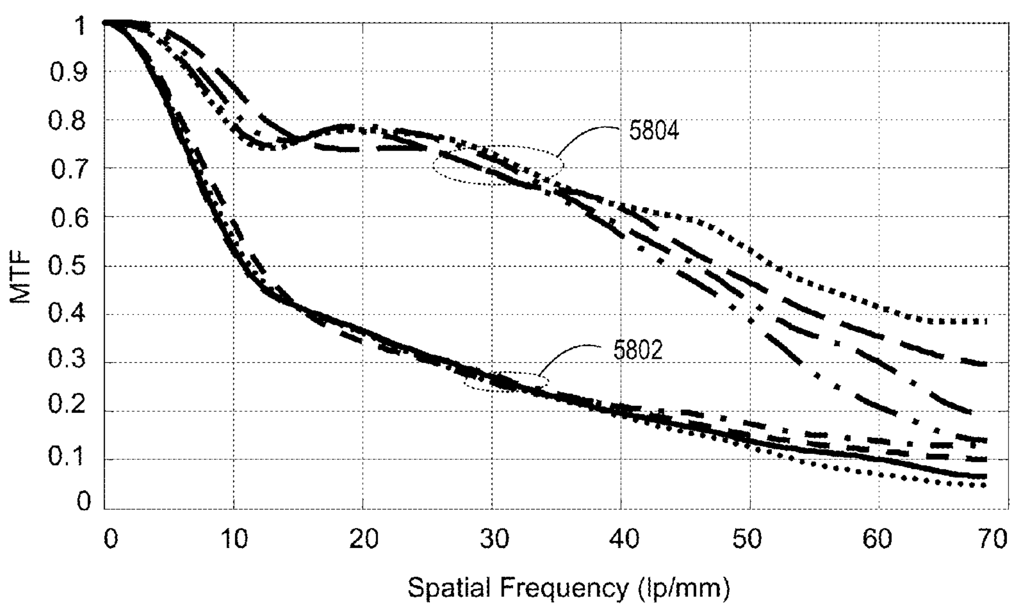

FIGS. 190 and 191 show MTFs, before and after signal processing, and with and without assembly error, for the imaging system of FIG. 178.

Figure 192:
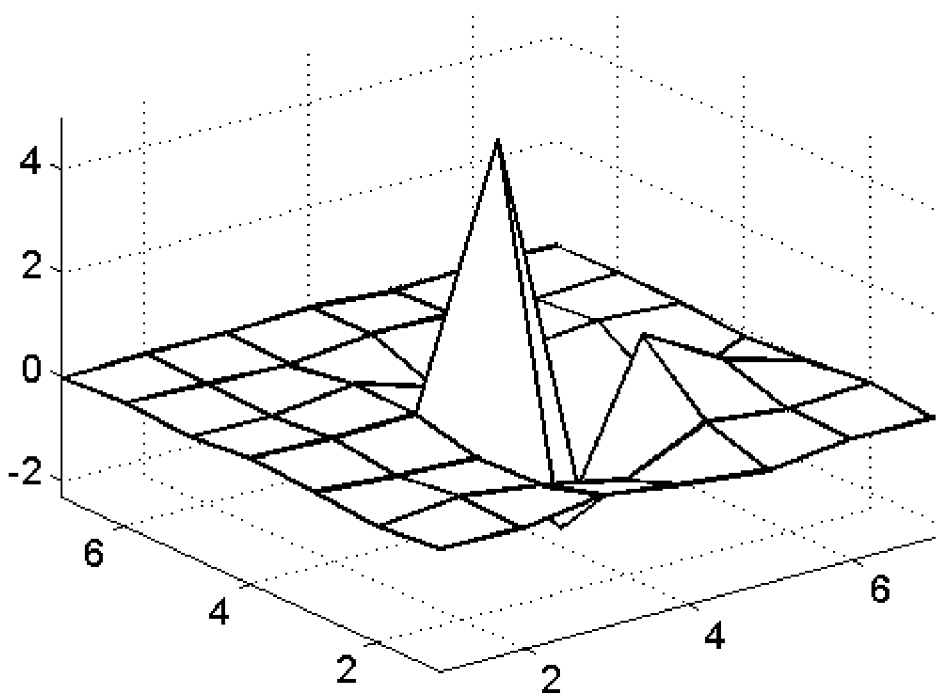

FIG. 192 shows a 3D plot of a 2D digital filter used in the signal processor of the imaging system of FIG. 178.

Figure 193:
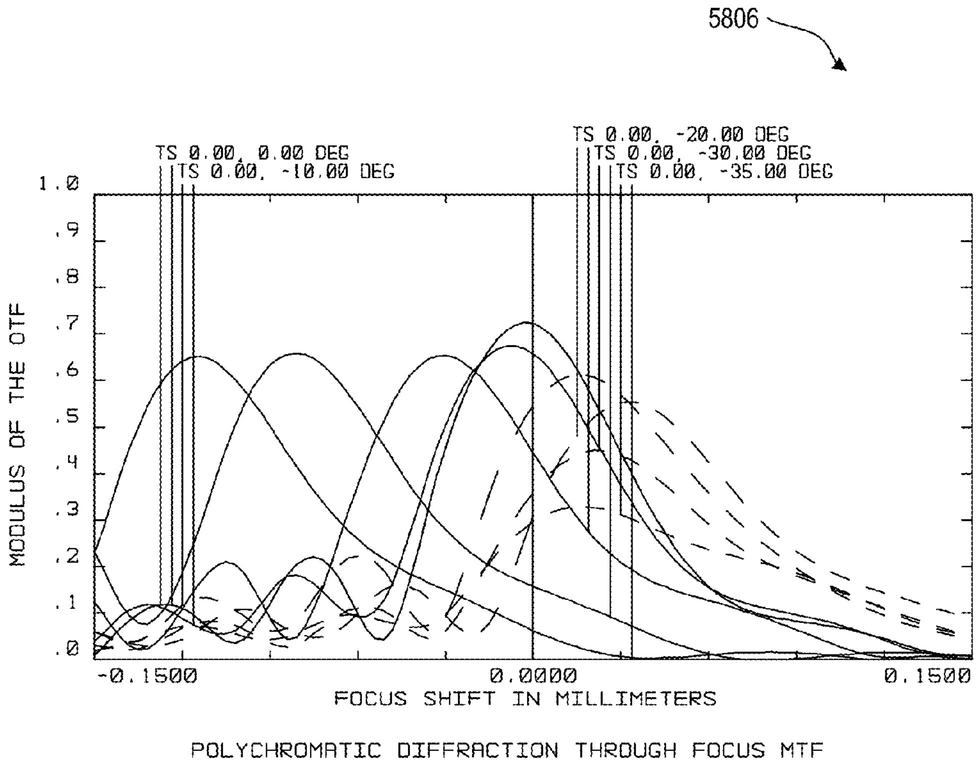
Figure 194:
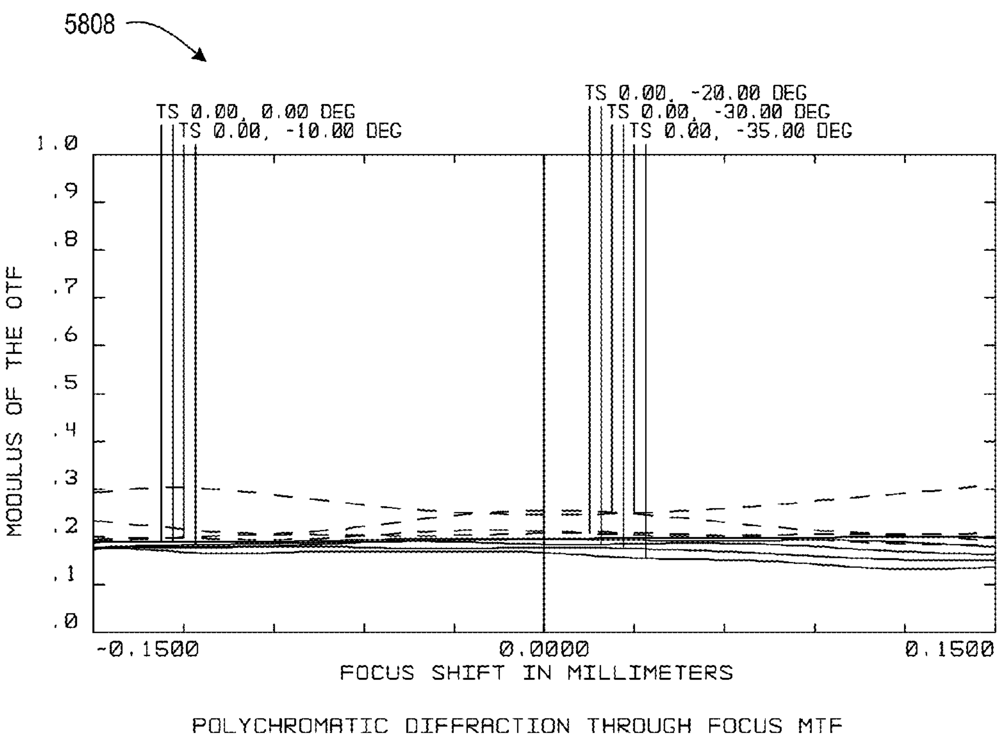

FIGS. 193 and 194 show thru-focus MTFs for the imaging systems of FIGS. 157 and 178, respectively.

Figure 195:
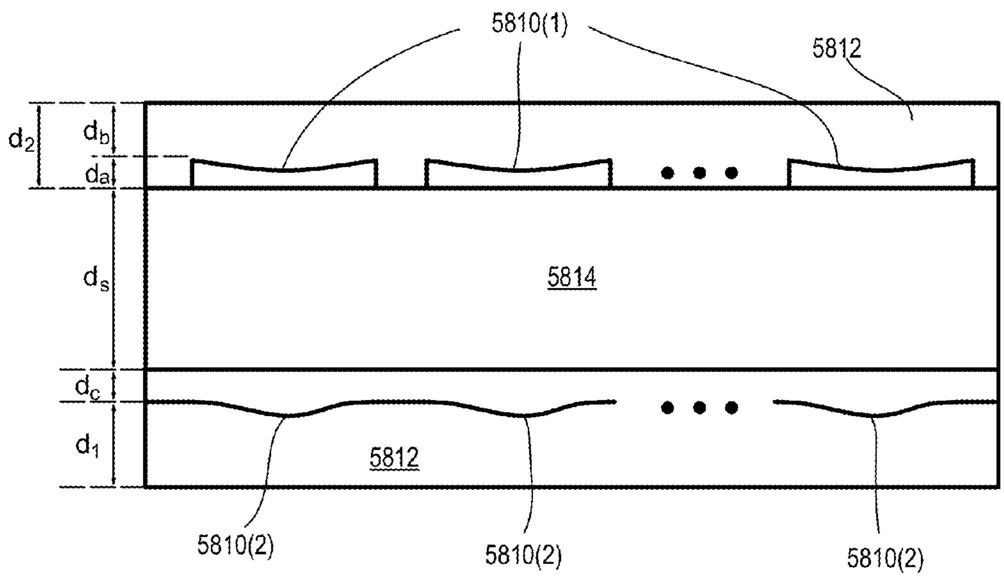

FIG. 195 is a schematic diagram of arrayed optics, according to an embodiment.

Figure 196:
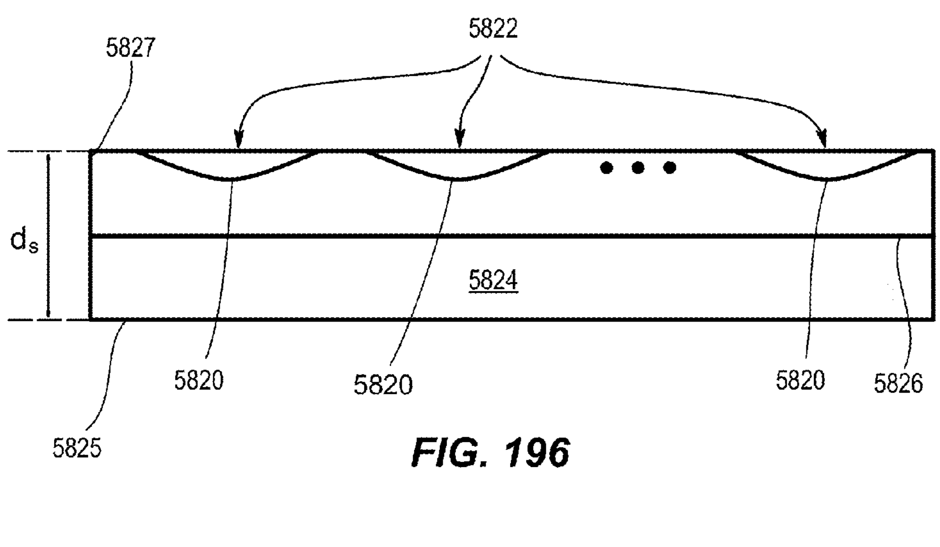

FIG. 196 is a schematic diagram showing one array of optical elements forming the imaging systems of FIG. 195.

Figure 197:
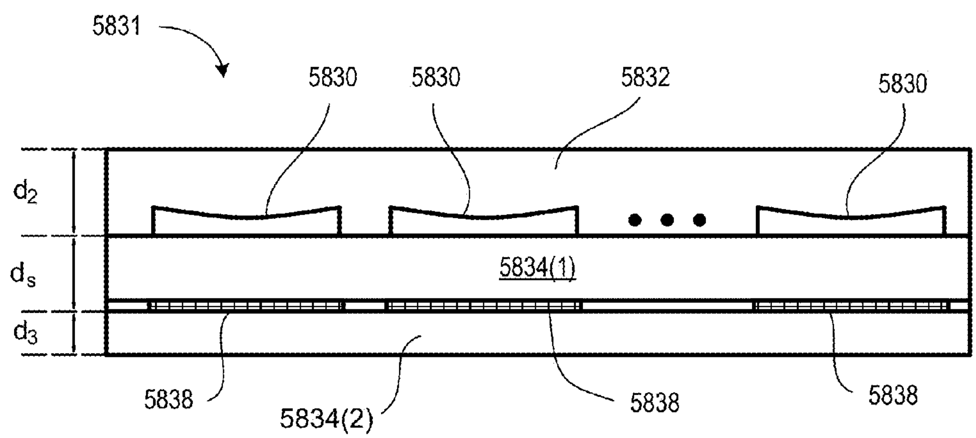
Figure 198:
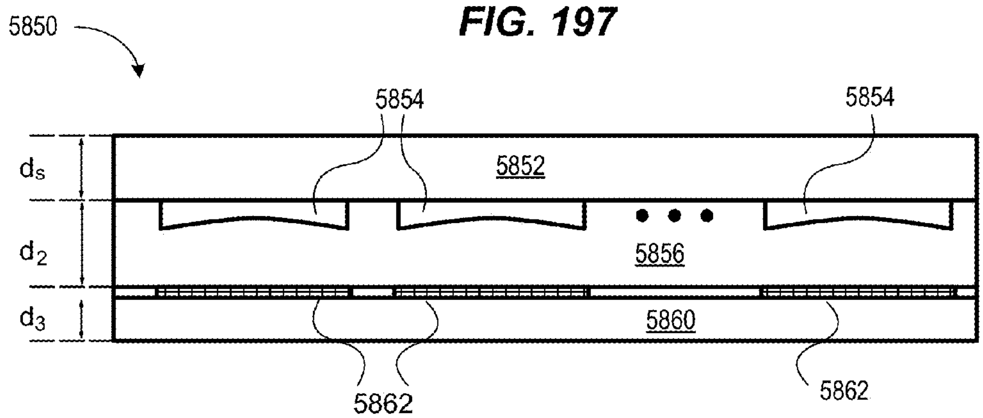

FIGS. 197 and 198 show schematic diagrams of arrayed imaging systems including arrays of optical elements and detectors, according to an embodiment.

Figure 199:
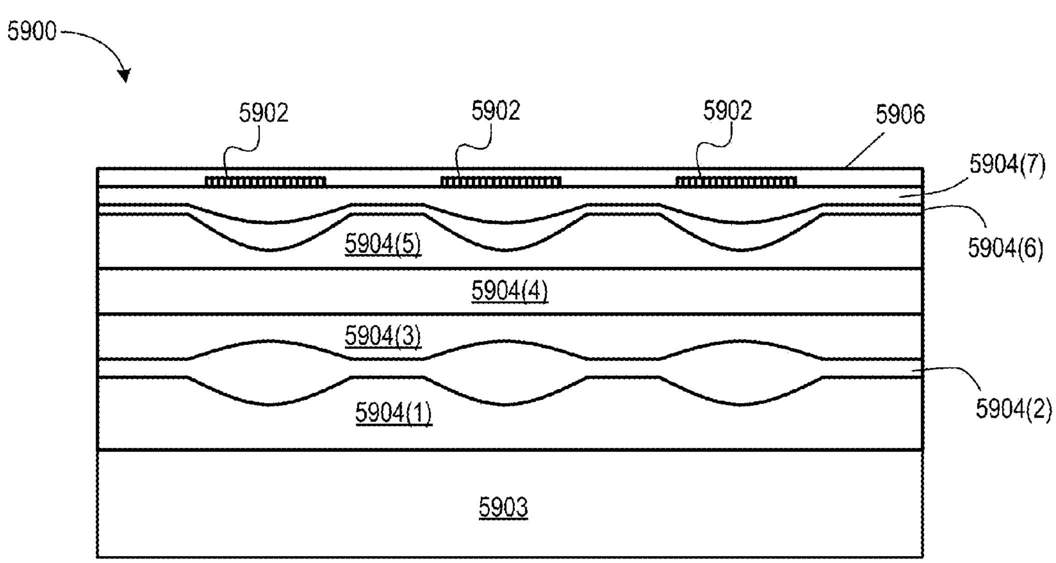
Figure 200:
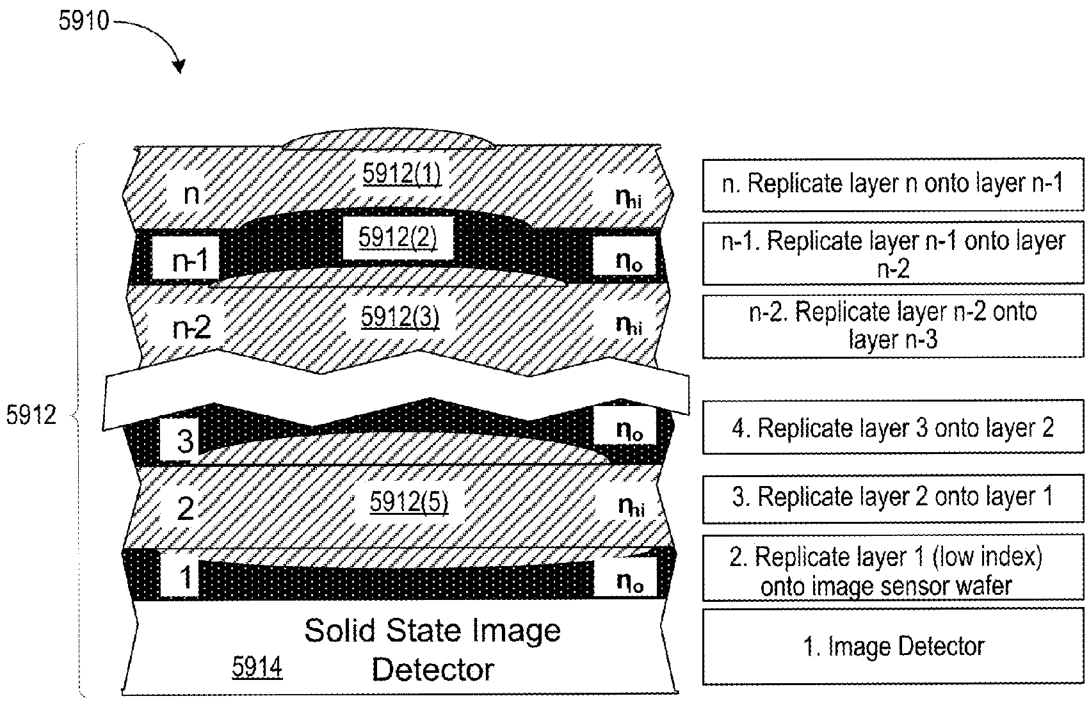

FIGS. 199 and 200 show schematic diagrams of arrayed imaging systems formed with no air gaps, according to an embodiment.

Figure 201:
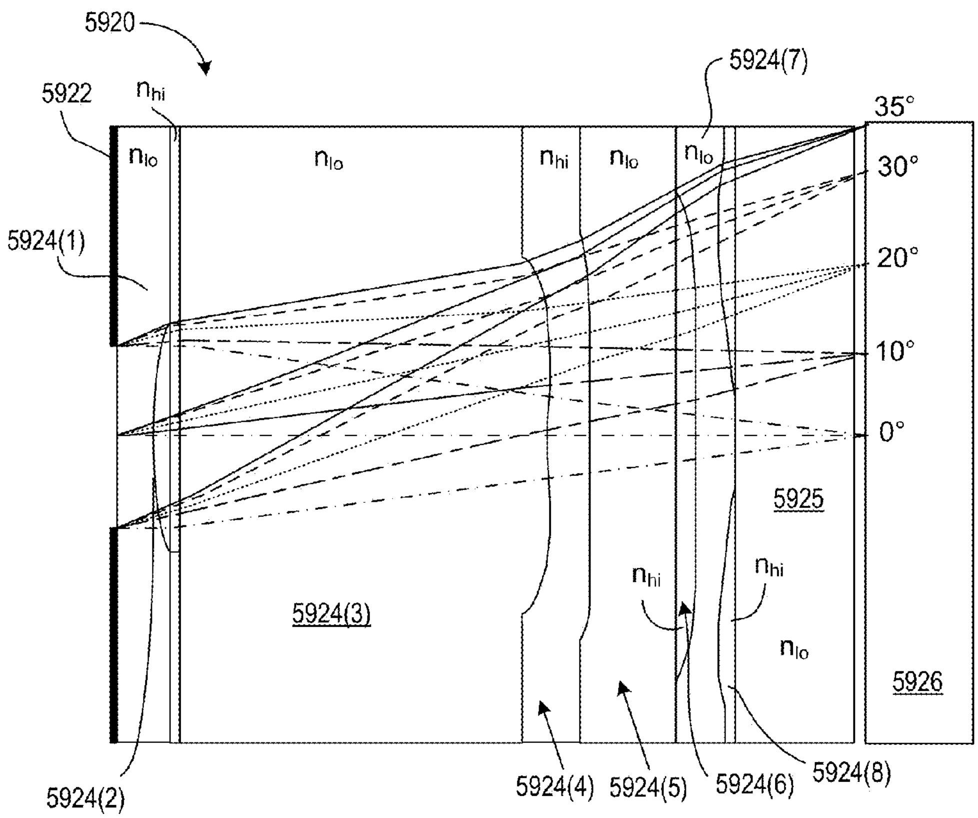

FIG. 201 is a schematic cross-sectional diagram illustrating ray propagation through an exemplary imaging system, according to an embodiment.

FIGS. 202-205 show results of numerical modeling of the exemplary imaging system of FIG. 201.

Figure 206:
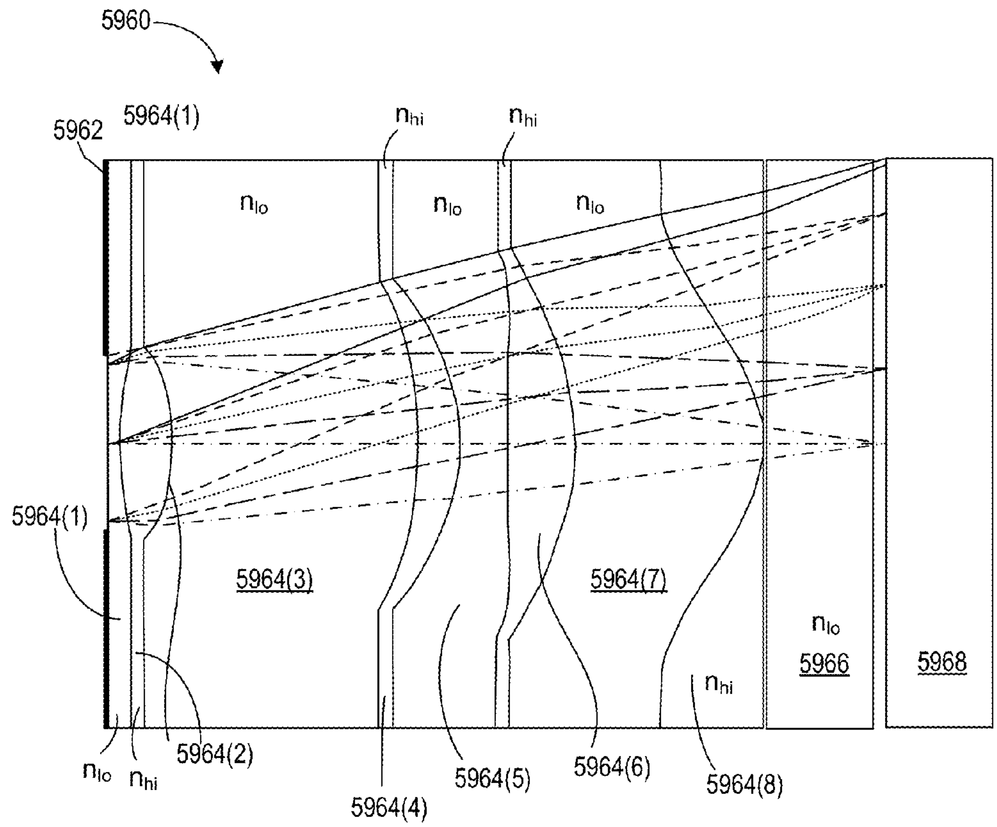

FIG. 206 is a schematic cross-sectional diagram illustrating ray propagation through an exemplary imaging system, according to an embodiment.

Figure 207:
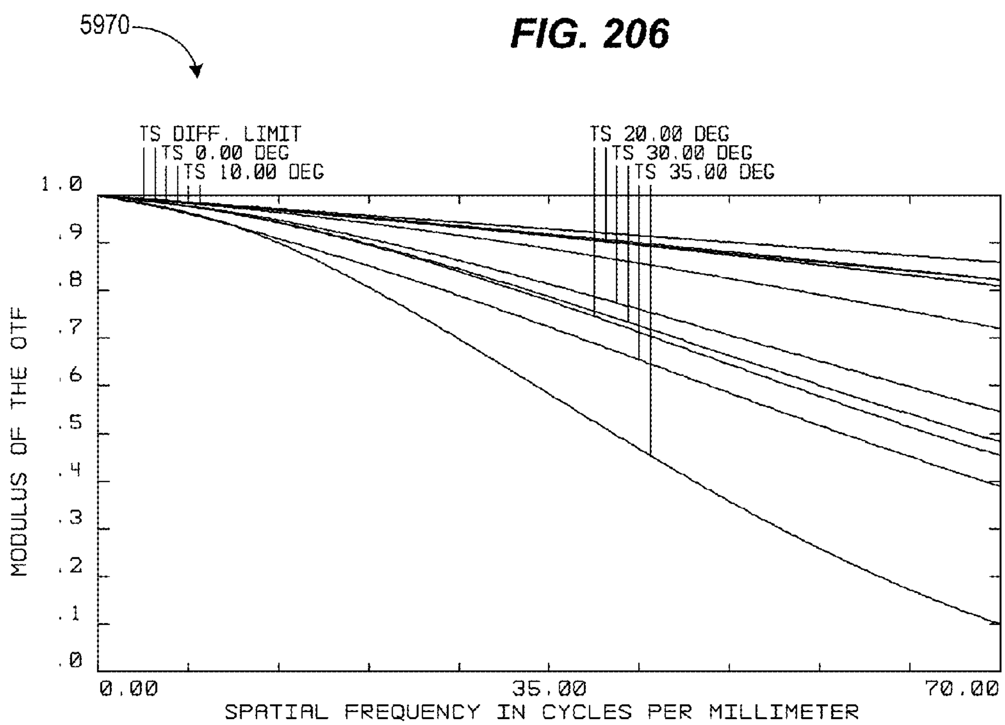
Figure 208:
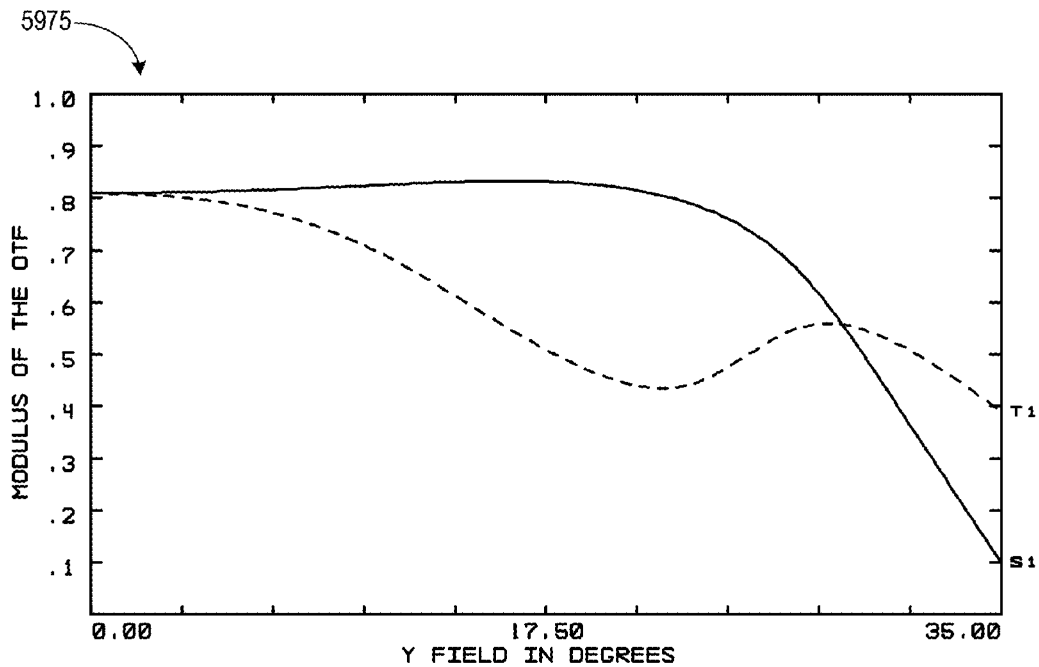

FIGS. 207 and 208 show results of numerical modeling of the exemplary imaging system of FIG. 206.

Figure 209:
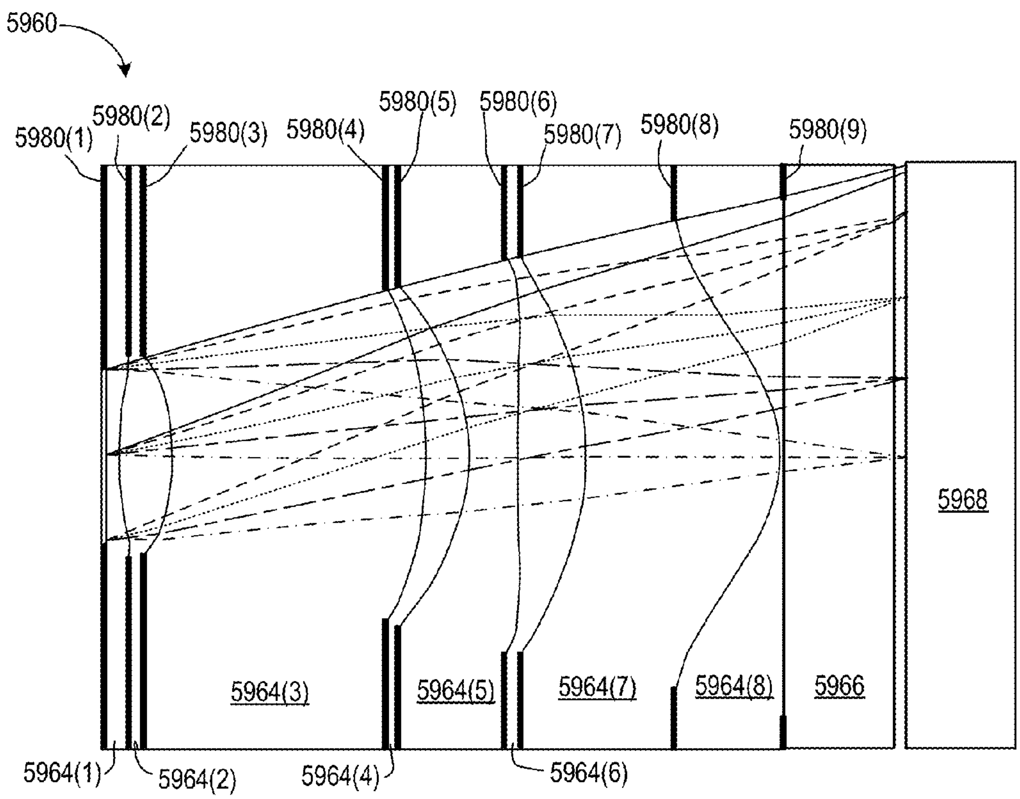

FIG. 209 is a schematic cross-sectional diagram illustrating ray propagation through an exemplary imaging system, according to an embodiment.

Figure 210:
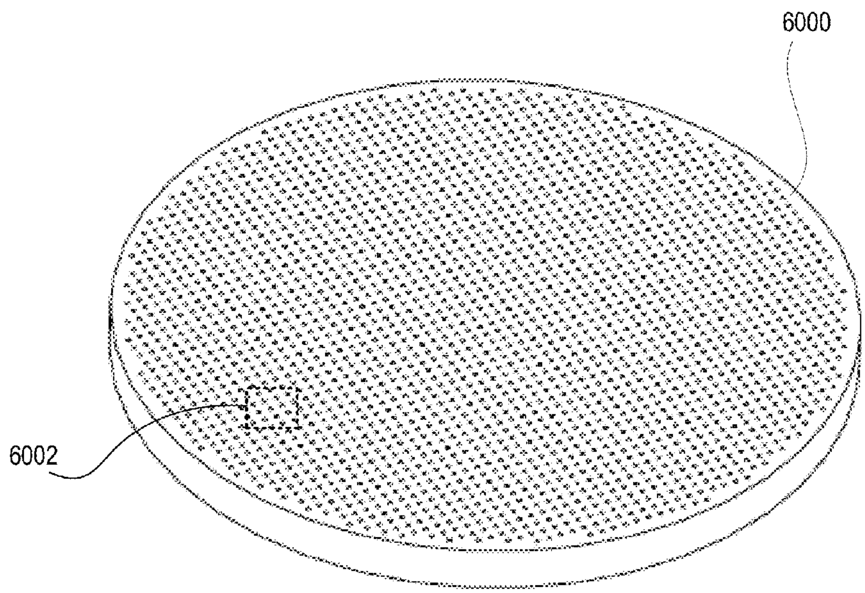

FIG. 210 shows an exemplary populated fabrication master including a plurality of features for forming optical elements therewith.

Figure 211:
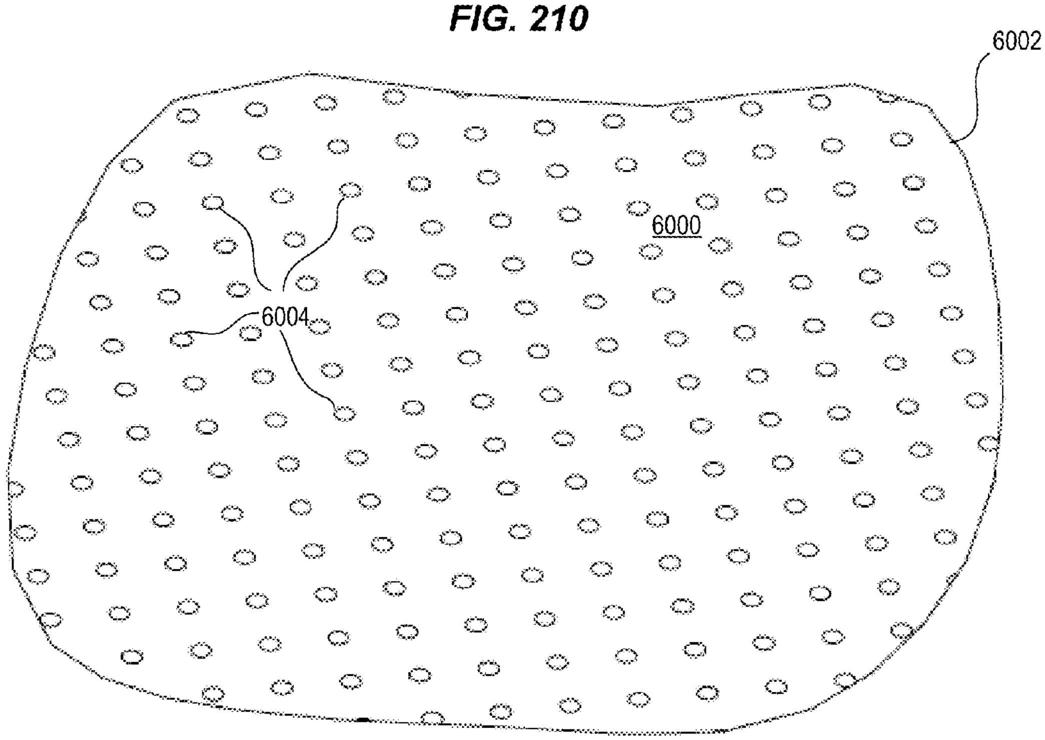

FIG. 211 shows an inset of the exemplary populated fabrication master of FIG. 210, illustrating details of a portion of the plurality of features for forming optical elements therewith.

Figure 212:
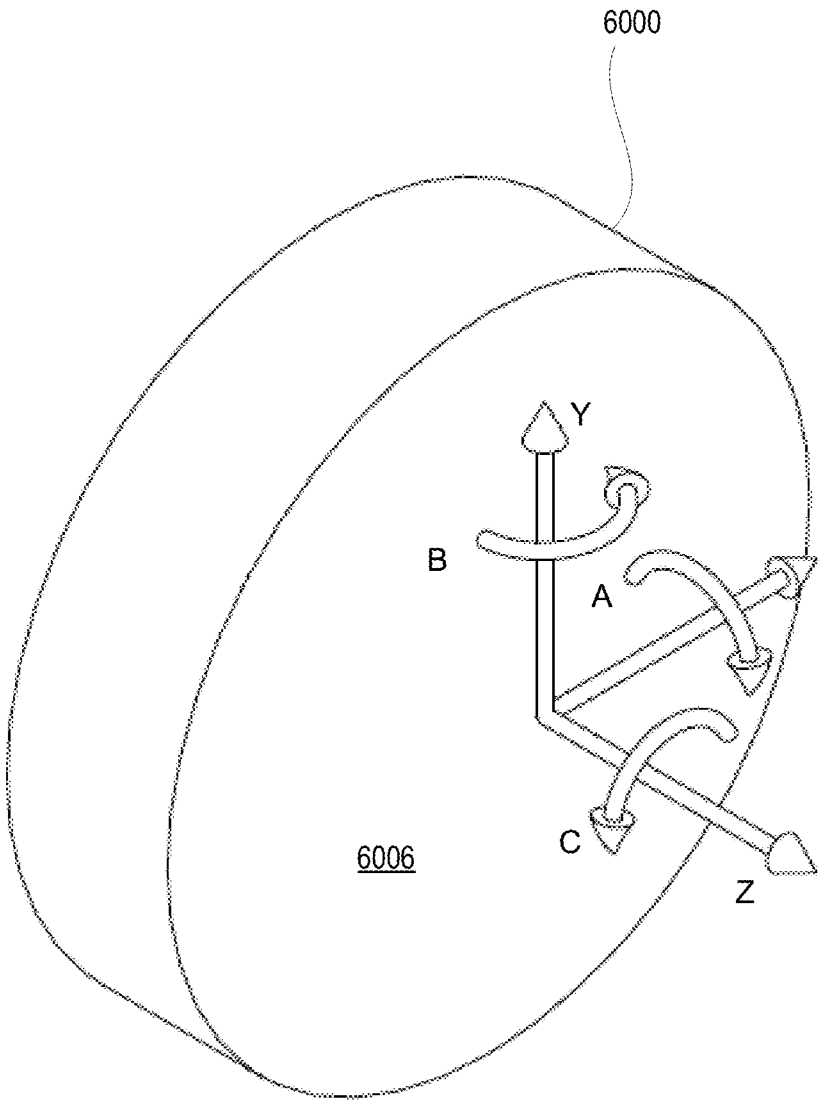

FIG. 212 shows an exemplary workpiece (e.g., fabrication master), illustrating axes used to define tooling directions in the fabrication processes, according to an embodiment.

FIG. 213 shows a diamond tip and a tool shank in a conventional diamond turning tool.

FIG. 214 is a diagrammatic illustration, in elevation, showing details of the diamond tip of FIG. 213, including a tool tip cutting edge.

FIG. 215 is a diagrammatic illustration of the diamond tip of FIG. 213, in side view according to line 215-215' of FIG. 214, showing details of the diamond tip, including a primary clearance angle.

Figure 216:
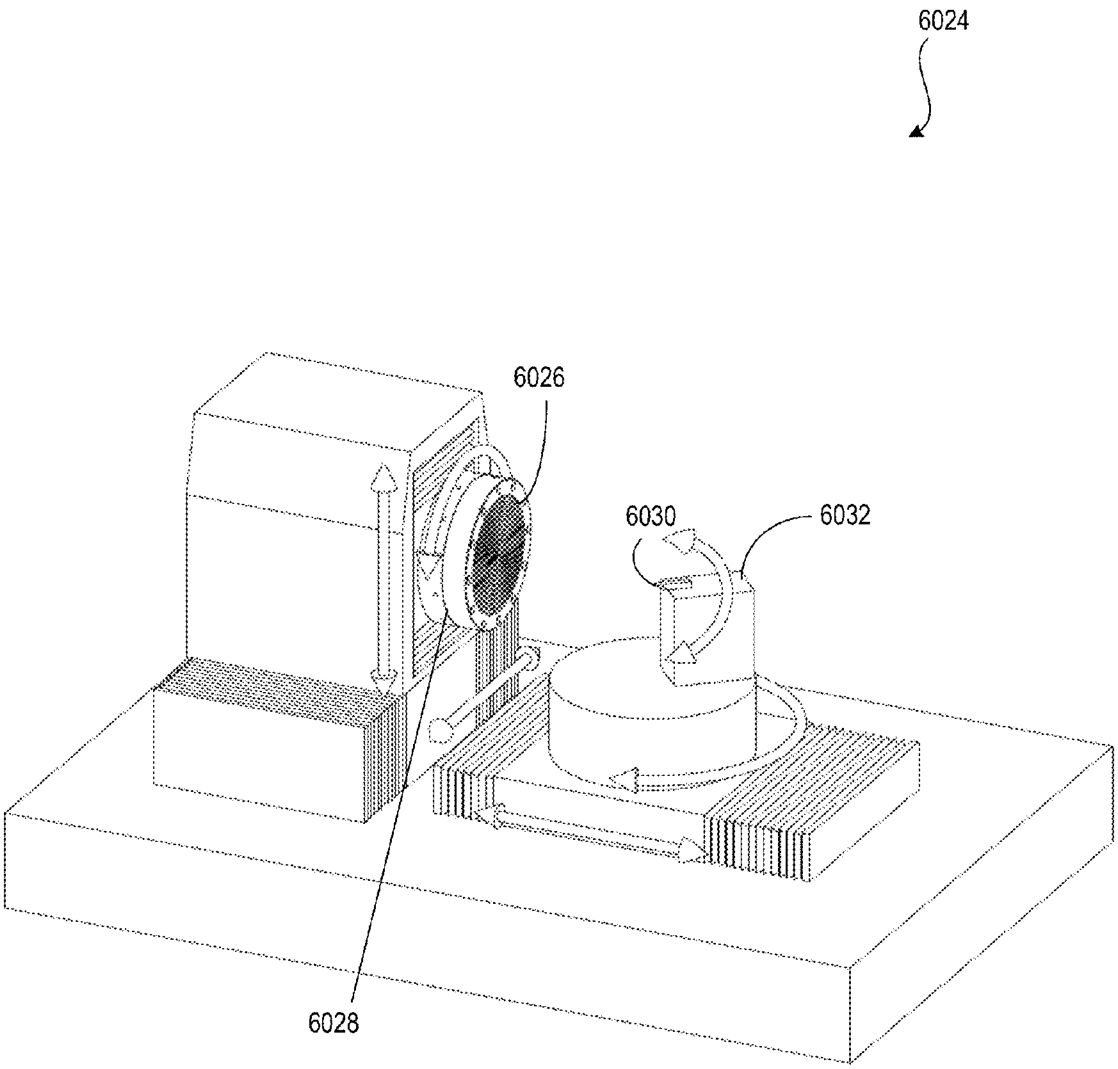

FIG. 216 shows an exemplary multi-axis machining configuration, illustrating various axes in reference to the spindle and tool post.

Figure 217:
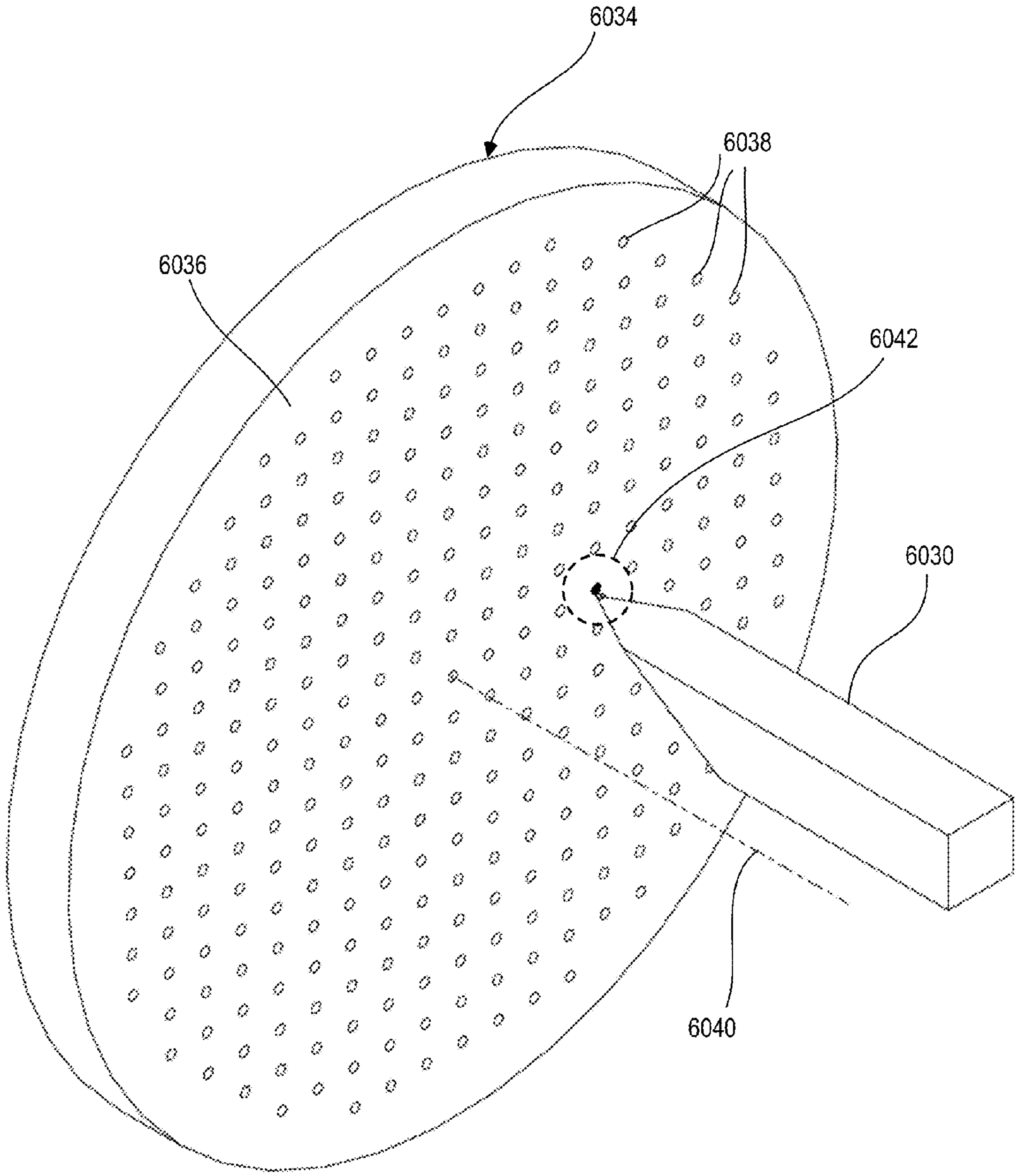

FIG. 217 shows an exemplary slow tool servo/fast tool servo ("STS/FTS") configuration for use in the fabrication of a plurality of features for forming optical elements on a fabrication master, according to an embodiment.

Figure 218:
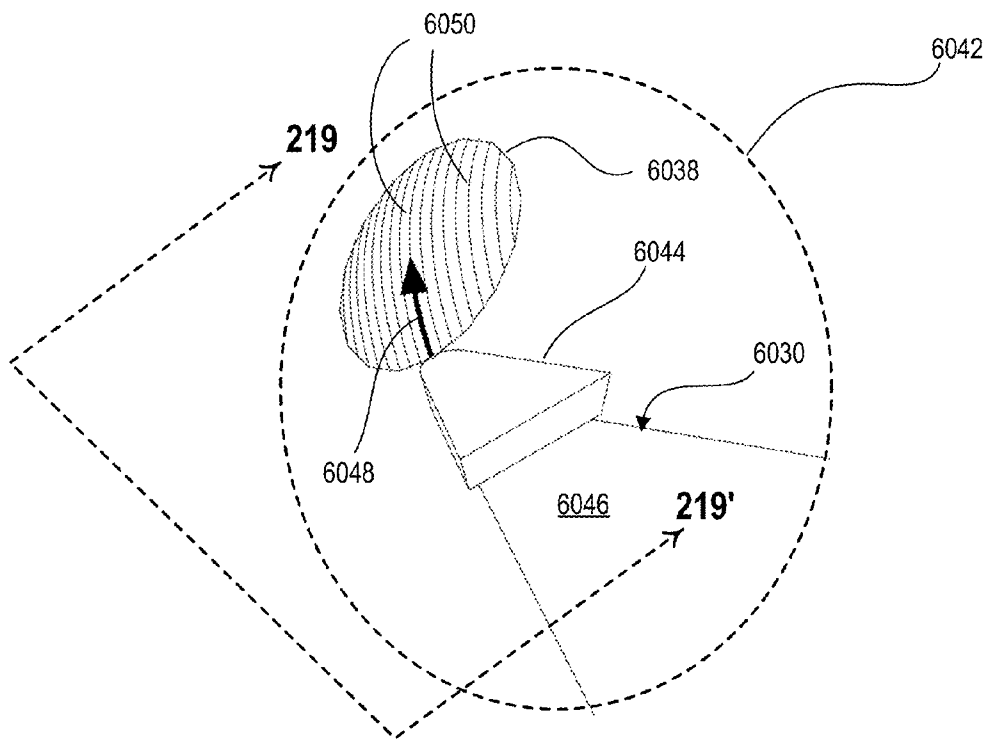

FIG. 218 shows further details of an inset of FIG. 217, illustrating further details of machining processing, according to an embodiment.

Figure 219:
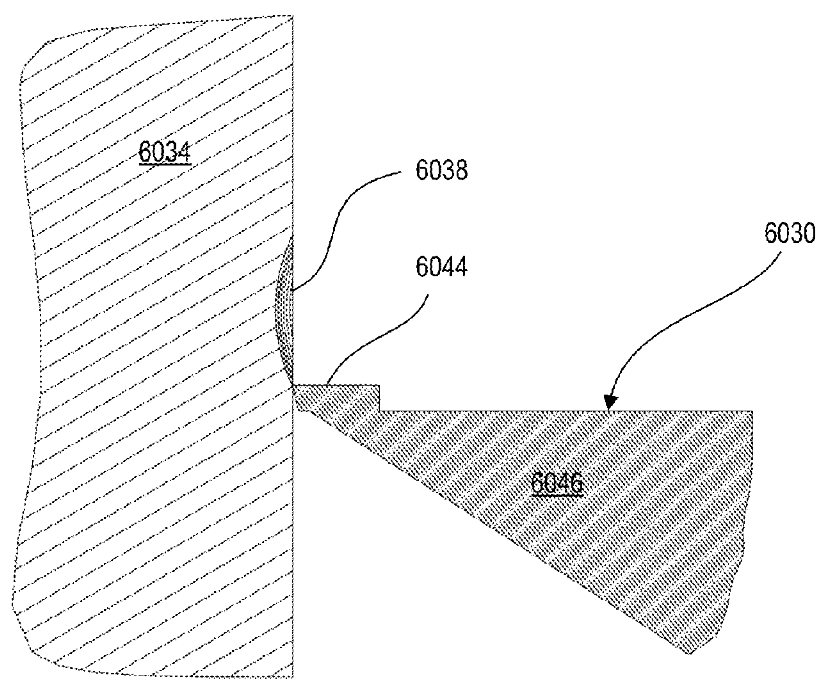

FIG. 219 is a diagrammatic illustration, in cross-sectional view, of the inset detail shown in FIG. 218 taken along line 219-219'.

Figure 220A:
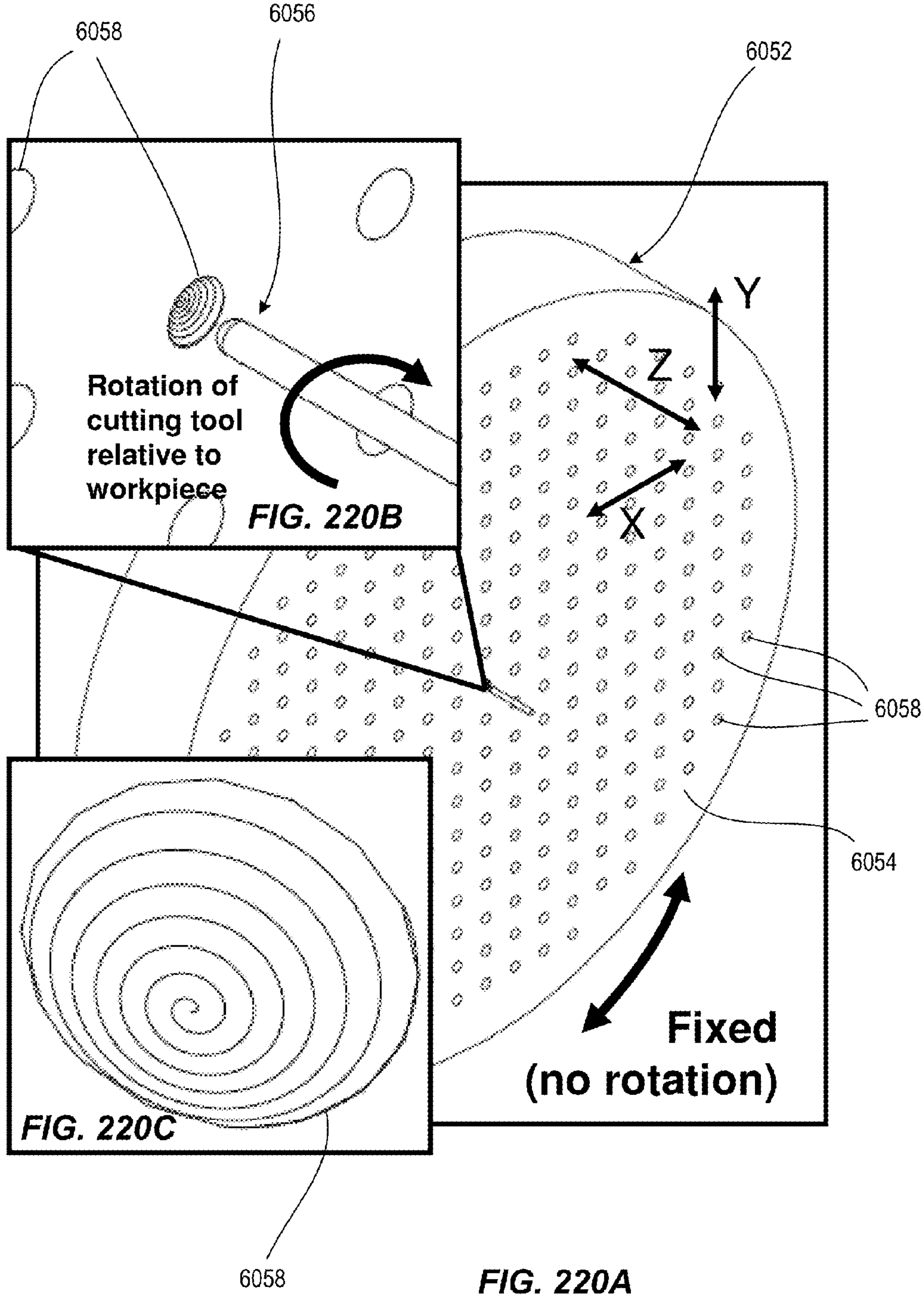

FIG. 220A shows an exemplary multi-axis milling/grinding configuration for use in fabricating a plurality of features for forming optical elements on a fabrication master, according to an embodiment, where FIG. 220B provides additional detail with respect to rotation of the tool relative to the workpiece and FIG. 220C shows the structure that the tool produces.

Figure 221A:
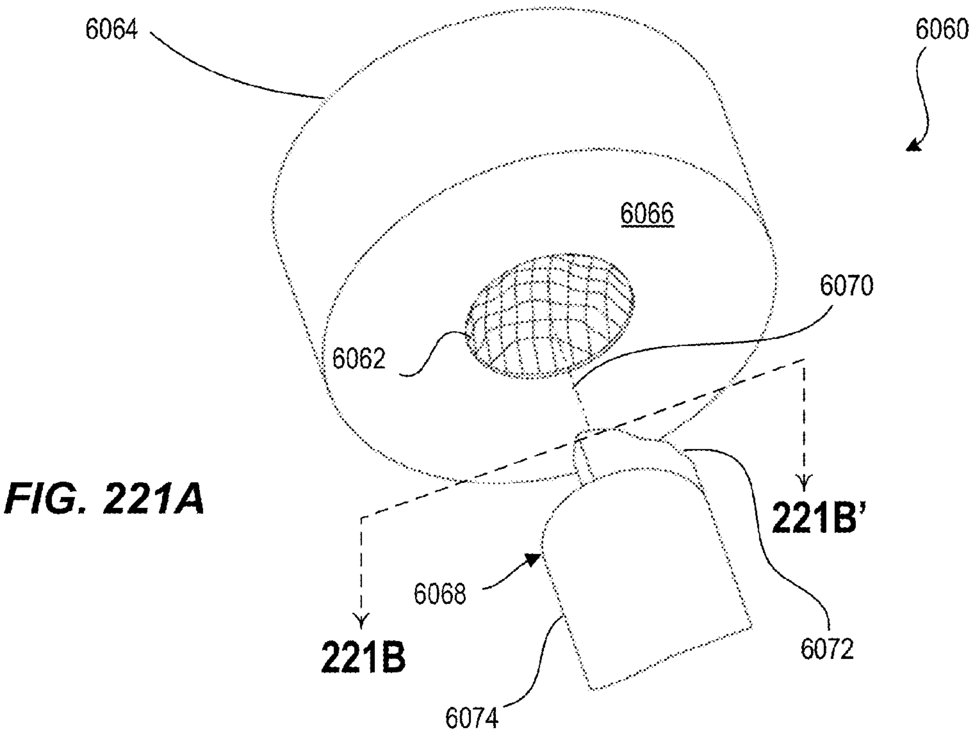
Figure 221B:
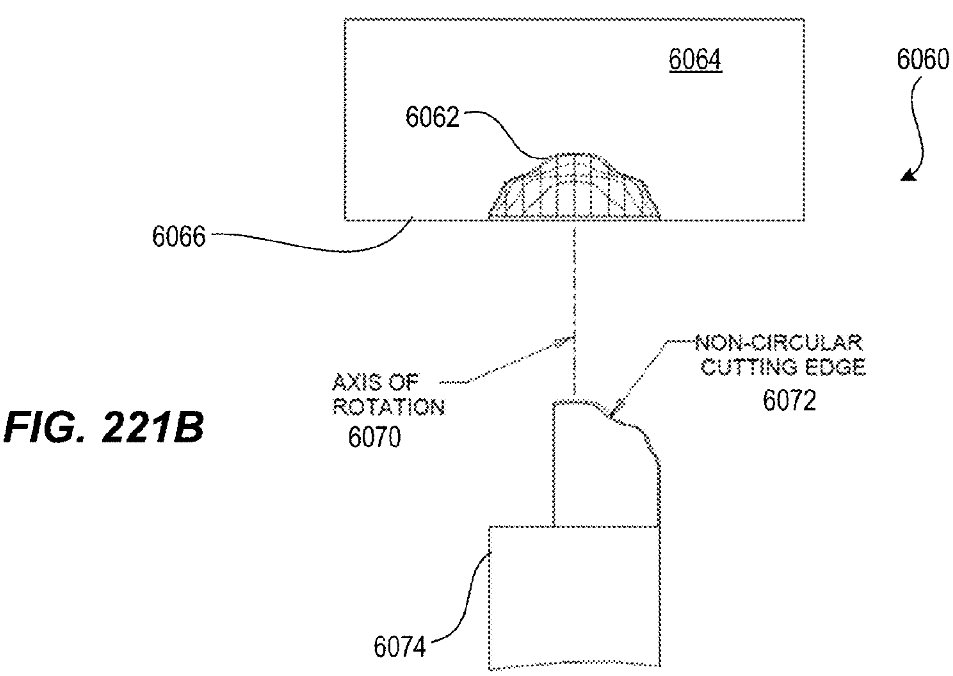

FIGS. 221A and 221B show an exemplary machining configuration including a form tool for use in fabricating a plurality of features for forming optical elements on a fabrication master, according to an embodiment, where the view of FIG. 221B is taken along line 221B-221B' of FIG. 221A.

FIGS. 222A-222G are cross-sectional views of exemplary form tool profiles that may be used in the fabrication of features for forming optical elements, according to an embodiment.

Figure 223:
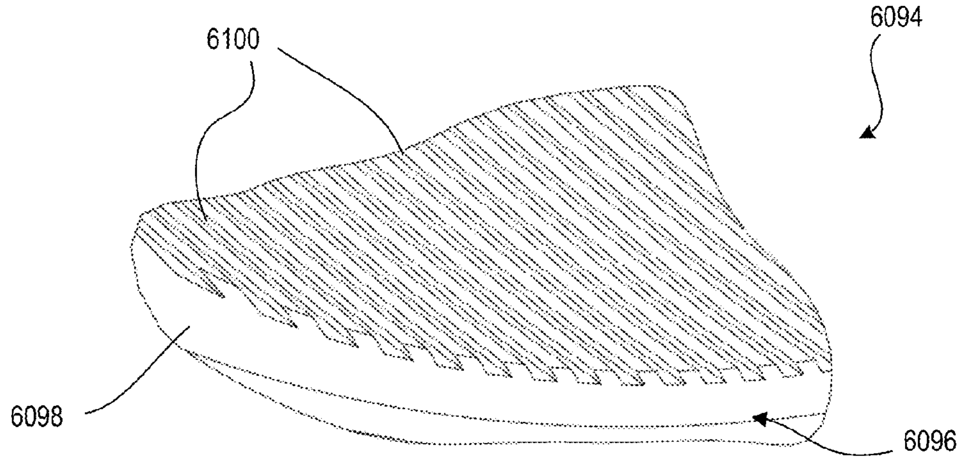

FIG. 223 shows a partial view, in elevation, of an exemplary machined surface including intentional machining marks, according to an embodiment.

Figure 224:
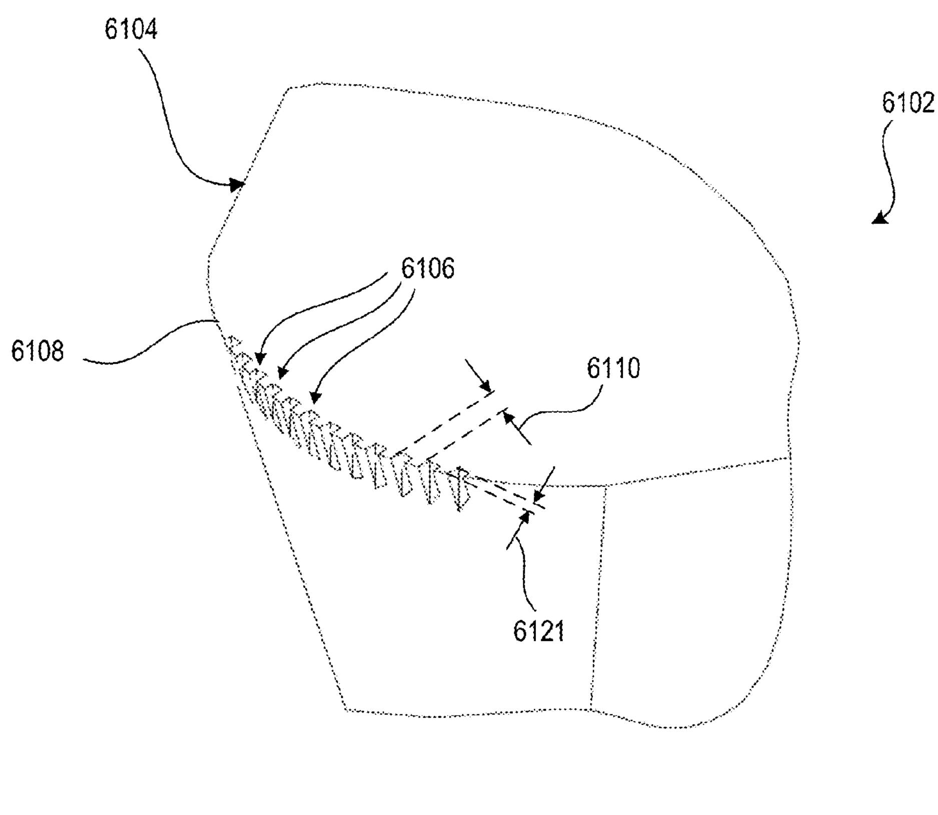

FIG. 224 shows a partial view, in elevation, of a tool tip suitable for forming the exemplary machined surface of FIG. 223.

Figure 225:
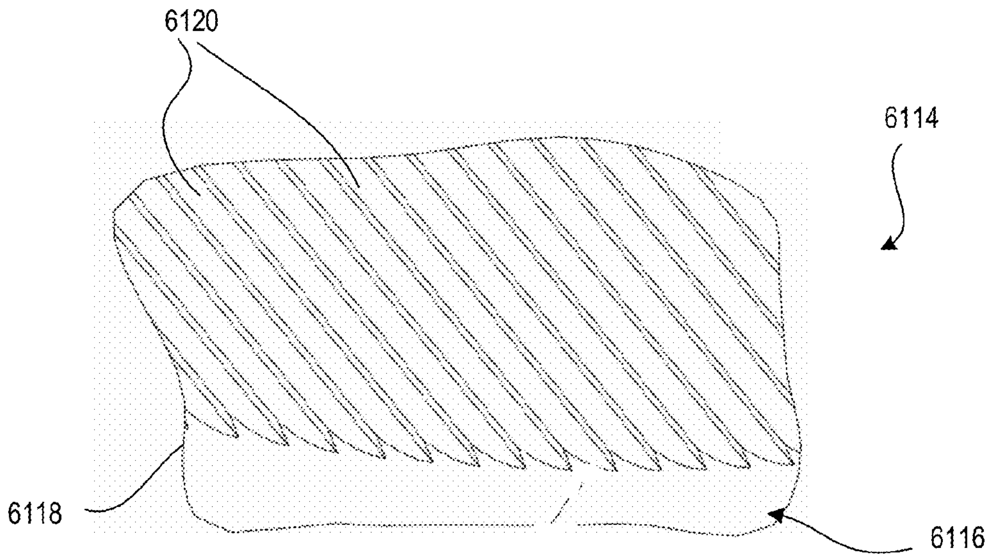

FIG. 225 shows a partial view, in elevation, of another exemplary machined surface including intentional machining marks, according to an embodiment.

Figure 226:
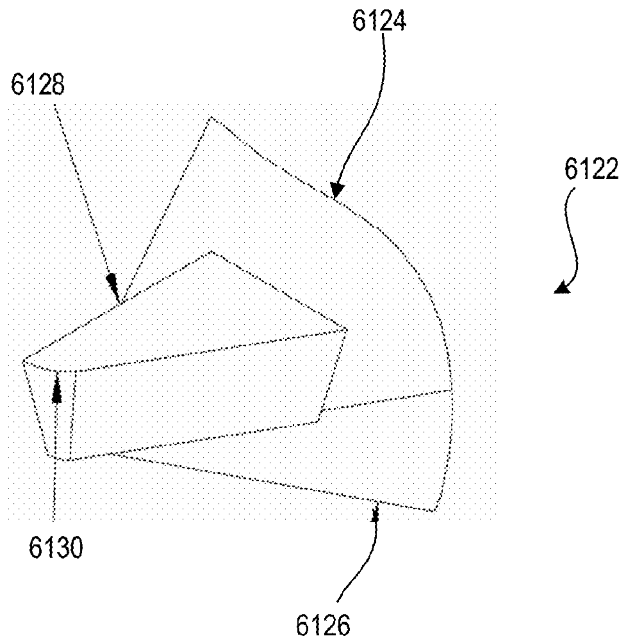

FIG. 226 shows a partial view, in elevation, of a tool tip suitable for forming the exemplary machined surface of FIG. 225.

Figure 227:
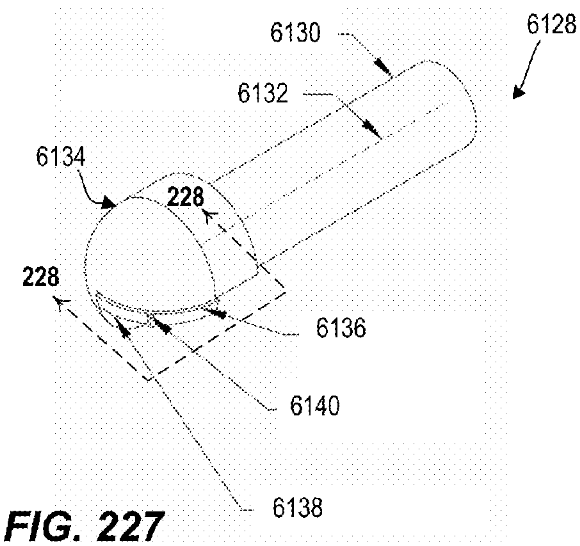

FIG. 227 is a diagrammatic illustration, in elevation, of a turning tool suitable for forming one machined surface, including intentional machining marks, according to an embodiment.

Figure 228:
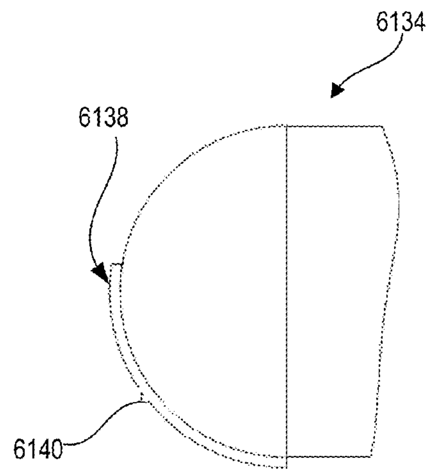

FIG. 228 shows a side view of a portion of the turning tool shown in FIG. 227.

Figure 229:
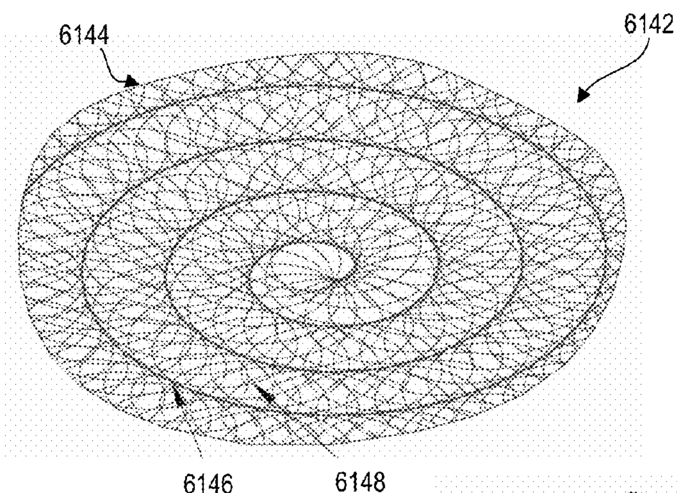

FIG. 229 shows an exemplary machined surface, in partial elevation, formed by using the turning tool of FIGS. 227 and 228 in a multi-axis milling configuration.

Figure 230:
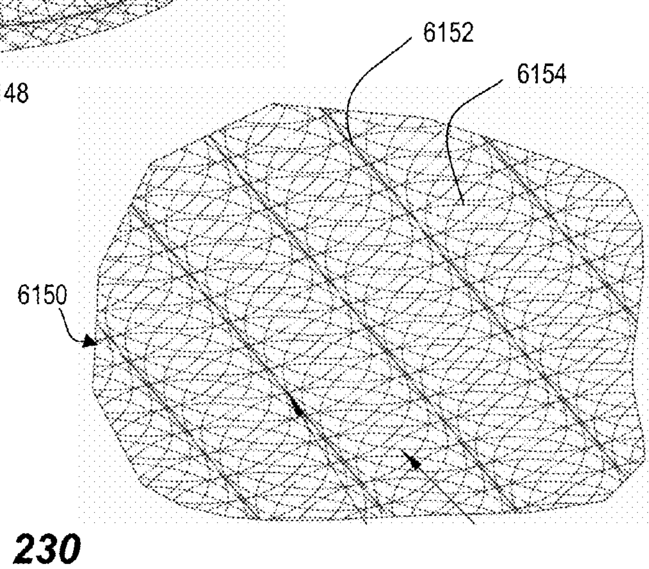

FIG. 230 shows an exemplary machined surface, in partial elevation, formed by using the turning tool of FIGS. 227 and 228 in a C-axis mode milling configuration.

Figure 231:
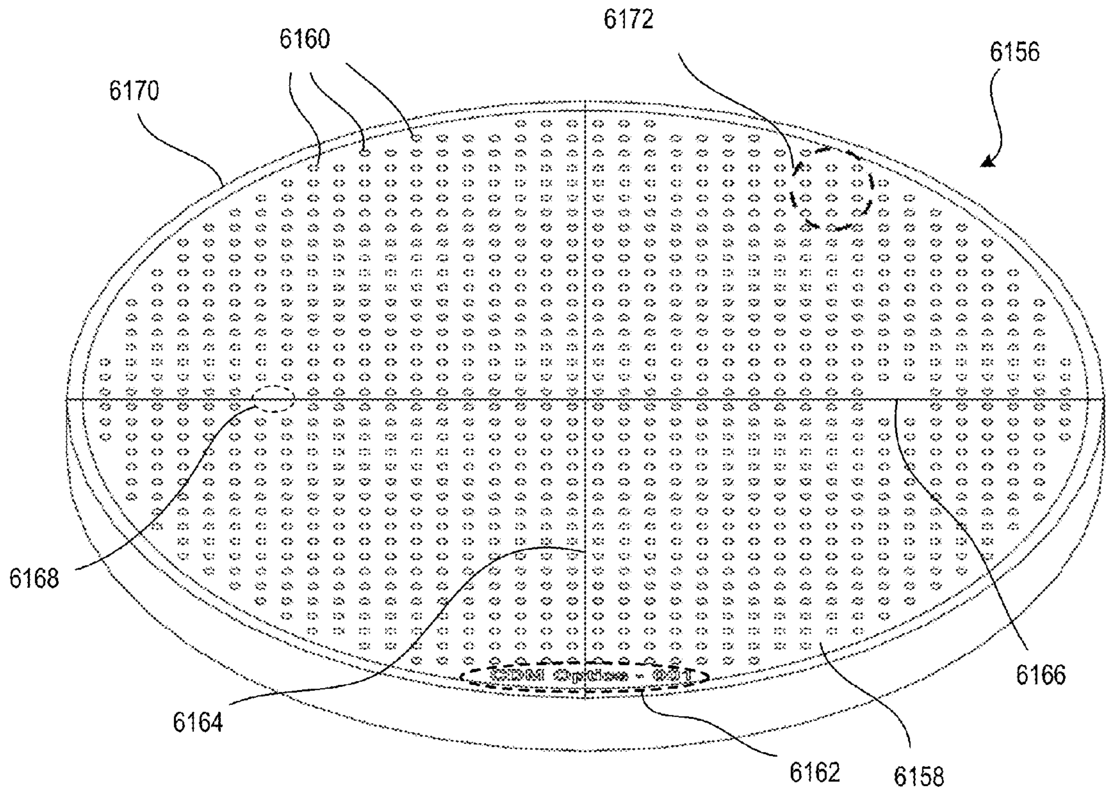

FIG. 231 shows a populated fabrication master fabricated, according to an embodiment, illustrating various features that may be machined onto the fabrication master surface.

Figure 232:
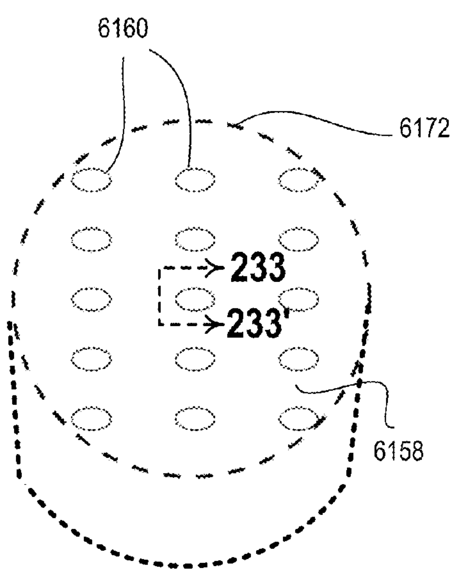

FIG. 232 shows further details of an inset of the populated fabrication master of FIG. 231, illustrating details of a plurality of features for forming optical elements on the populated fabrication master.

Figure 233:
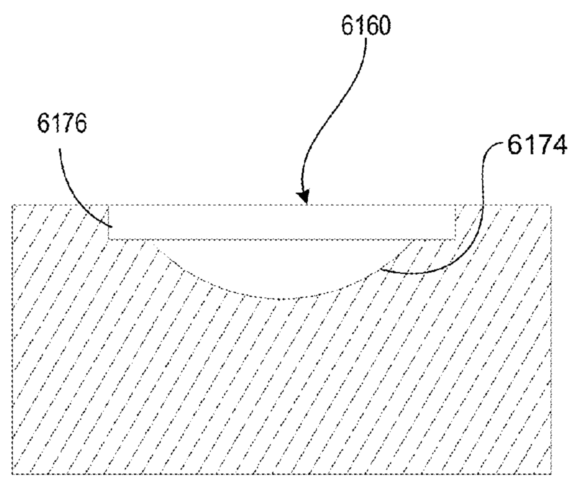

FIG. 233 shows a cross-sectional view of one of the features for forming optical elements formed on the populated fabrication master of FIGS. 231 and 232, taken along line 233-233' of FIG. 232.

Figure 234:
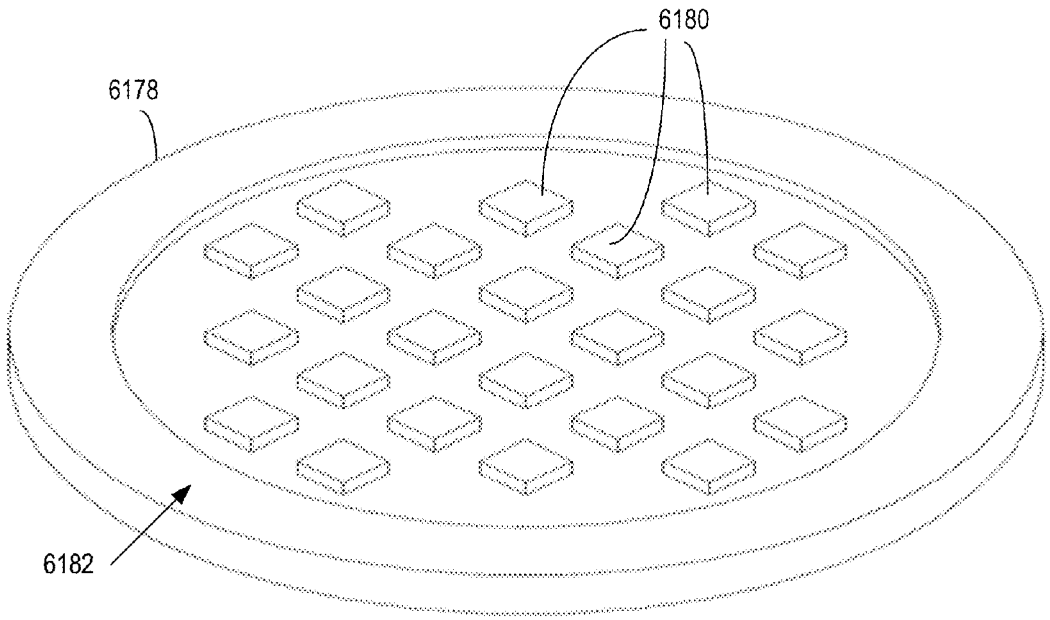

FIG. 234 is a diagrammatic illustration, in elevation, illustrating an exemplary fabrication master whereupon square bosses that may be used to form square apertures have been fabricated, according to an embodiment.

Figure 235:
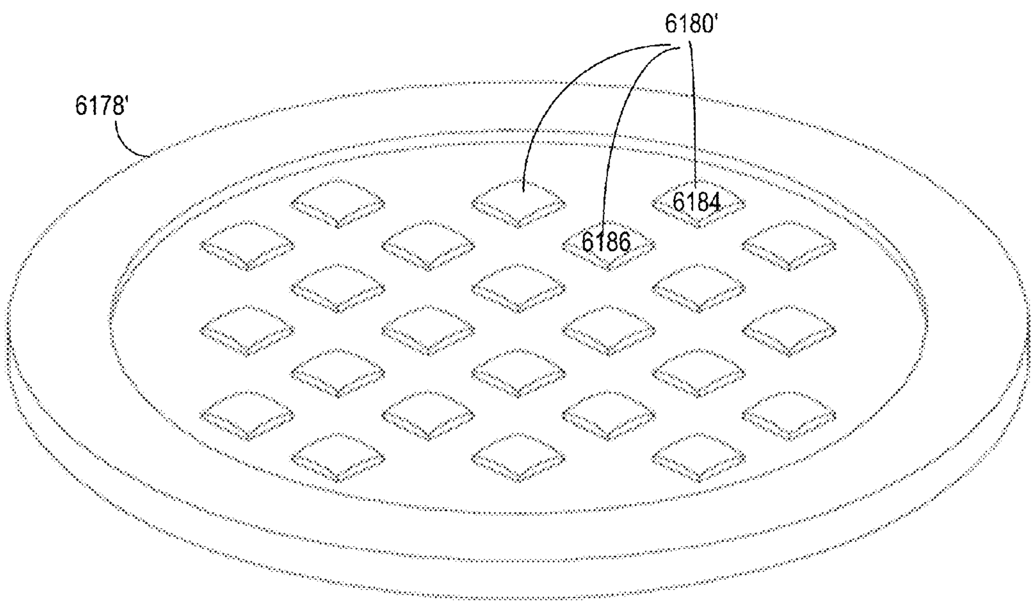

FIG. 235 shows a further processed state of the exemplary fabrication master of FIG. 234, illustrating a plurality of features for forming optical elements with convex surfaces that have been machined upon the square bosses, according to an embodiment.

Figure 236:
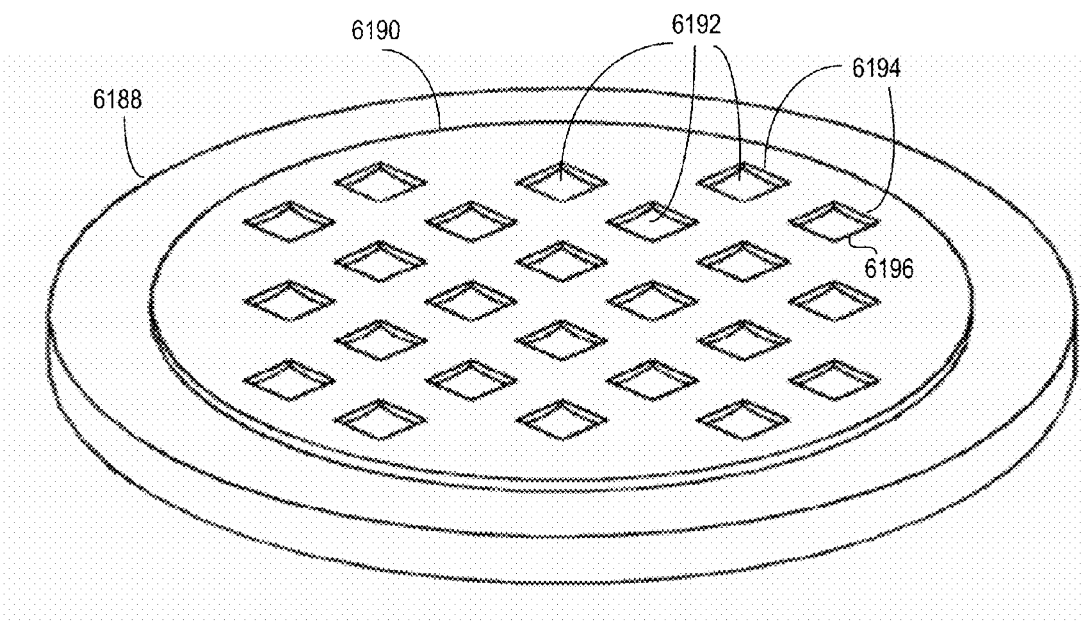

FIG. 236 shows a mating daughter surface formed in association with the exemplary fabrication master of FIG. 235.

Figure 237:
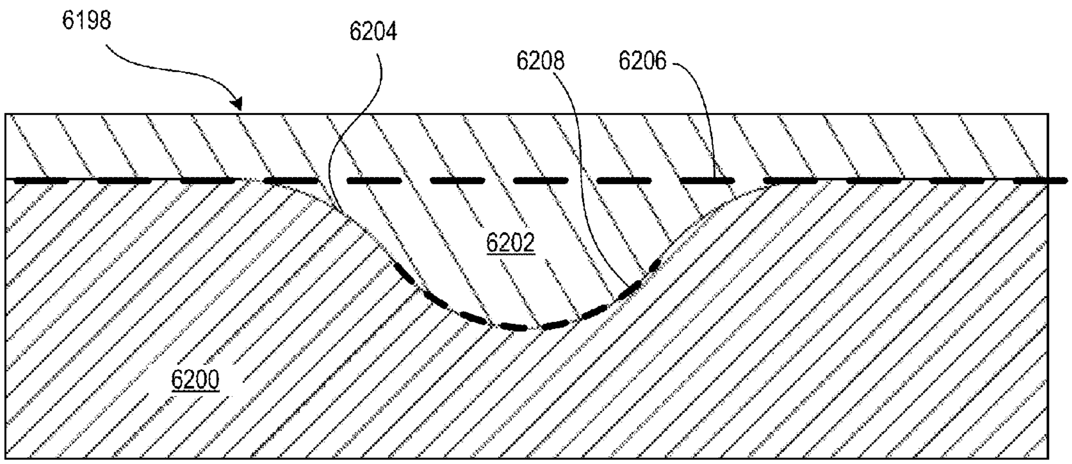
Figure 238:
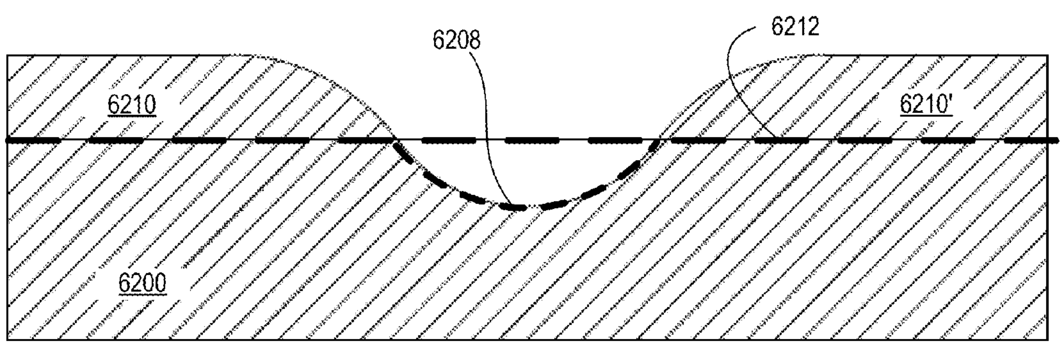
Figure 239:
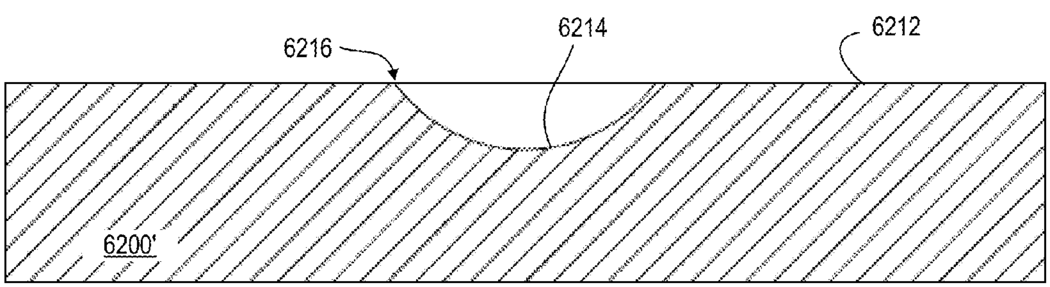

FIGS. 237-239 are a series of drawings, in cross-sectional view, illustrating a process for fabricating features for forming an optical element using a negative virtual datum process, according to an embodiment.

Figure 240:
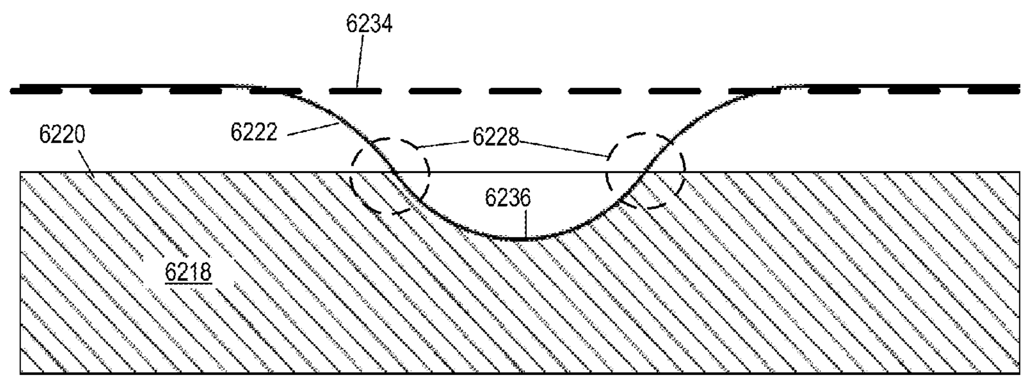
Figure 241:
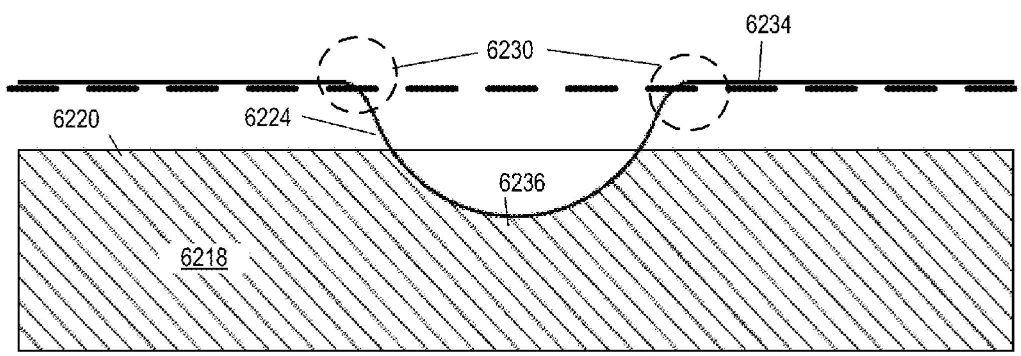
Figure 242:
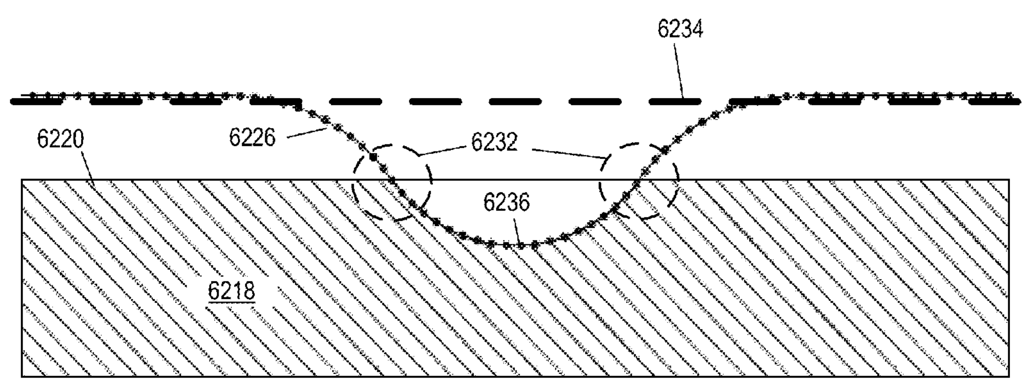

FIGS. 240-242 are a series of drawings illustrating a process for fabricating features for forming an optical element using a positive virtual datum process, according to an embodiment.

Figure 243:
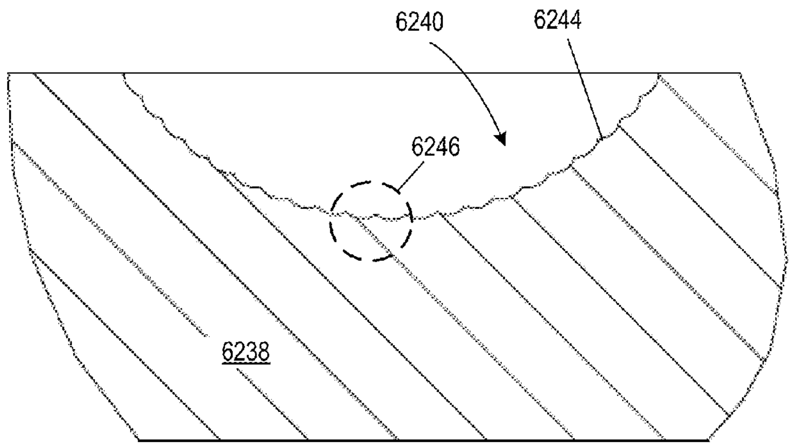

FIG. 243 is a diagrammatic illustration, in partial cross-section, of an exemplary feature for forming an optical element including tool marks formed, according to an embodiment.

Figure 244:
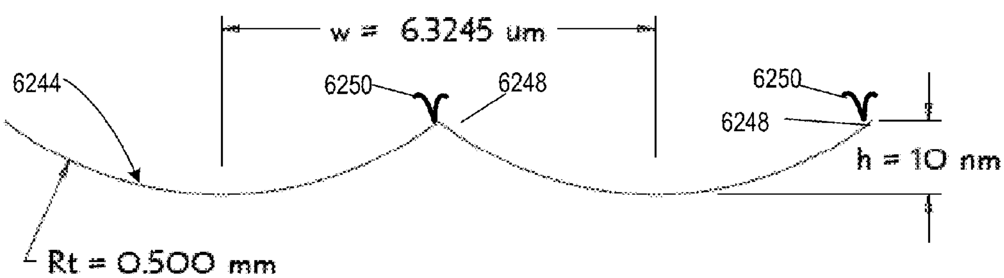

FIG. 244 shows an illustration of a portion the surface of the exemplary feature for forming the optical element of FIG. 243, shown here to illustrate exemplary details of the tool marks.

Figure 245:
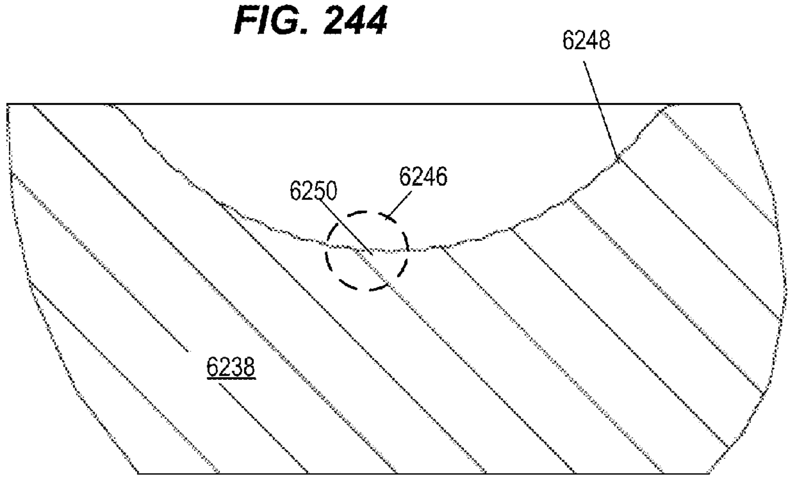

FIG. 245 shows the exemplary feature for forming the optical element of FIG. 243, after an etching process.

Figure 246:
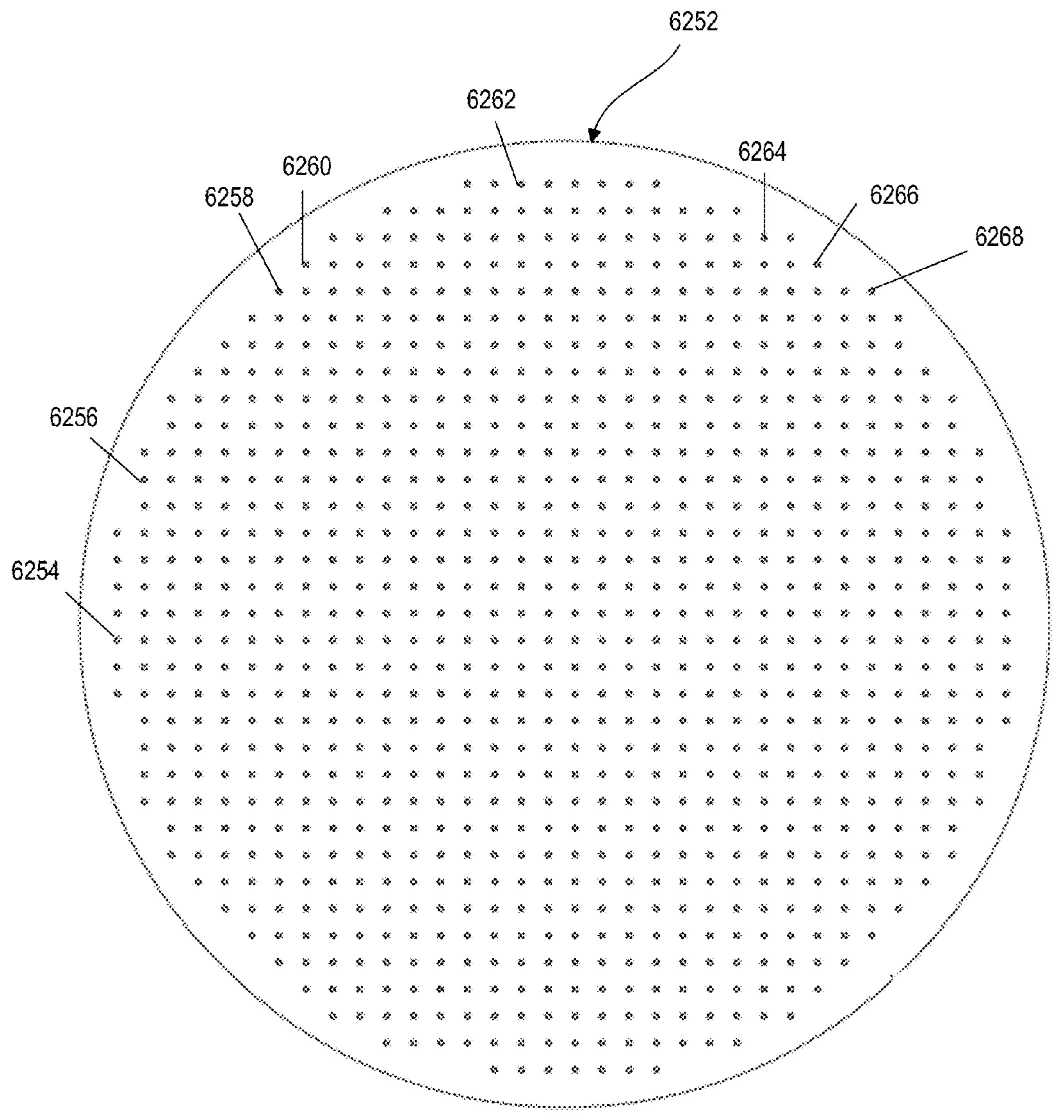
Figure 250:
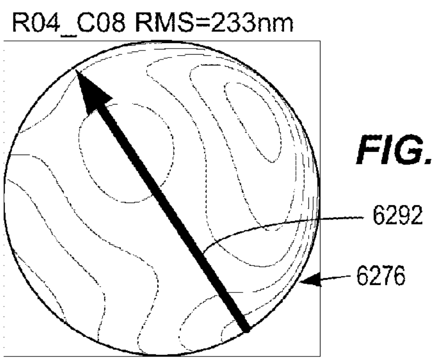
Figure 251:
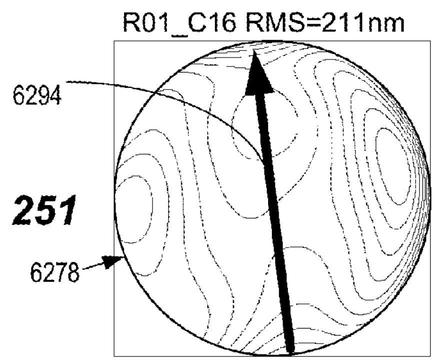
Figure 249:
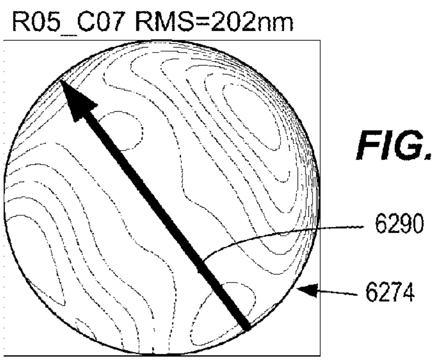
Figure 252:
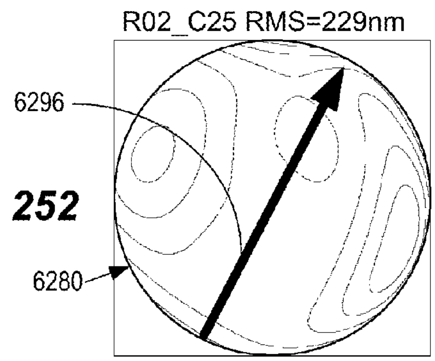
Figure 248:
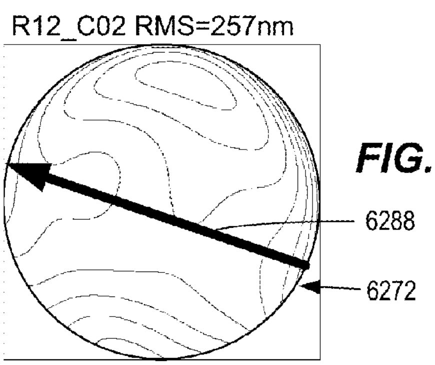
Figure 253:
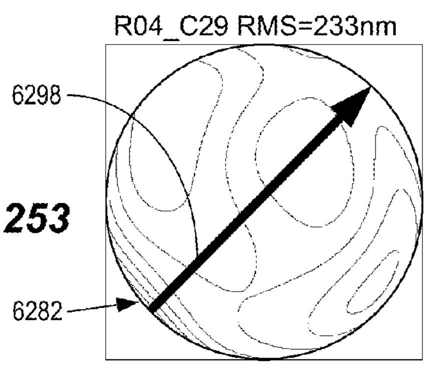
Figure 247:
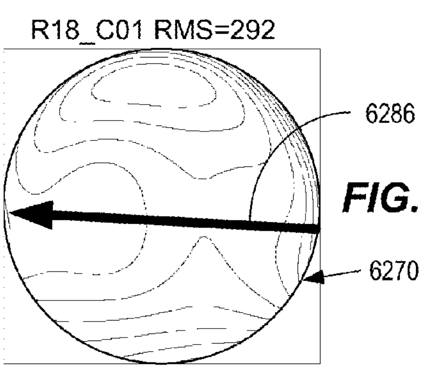
Figure 254:
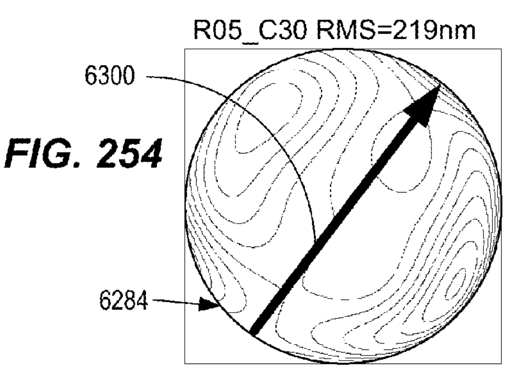

FIG. 246 shows a plan view of a populated fabrication master, formed, according to an embodiment.

FIGS. 247-254 show exemplary contour plots of measured surface errors of the features for forming optical elements noted in association with selected optical elements on the populated fabrication master of FIG. 246.

Figure 255:
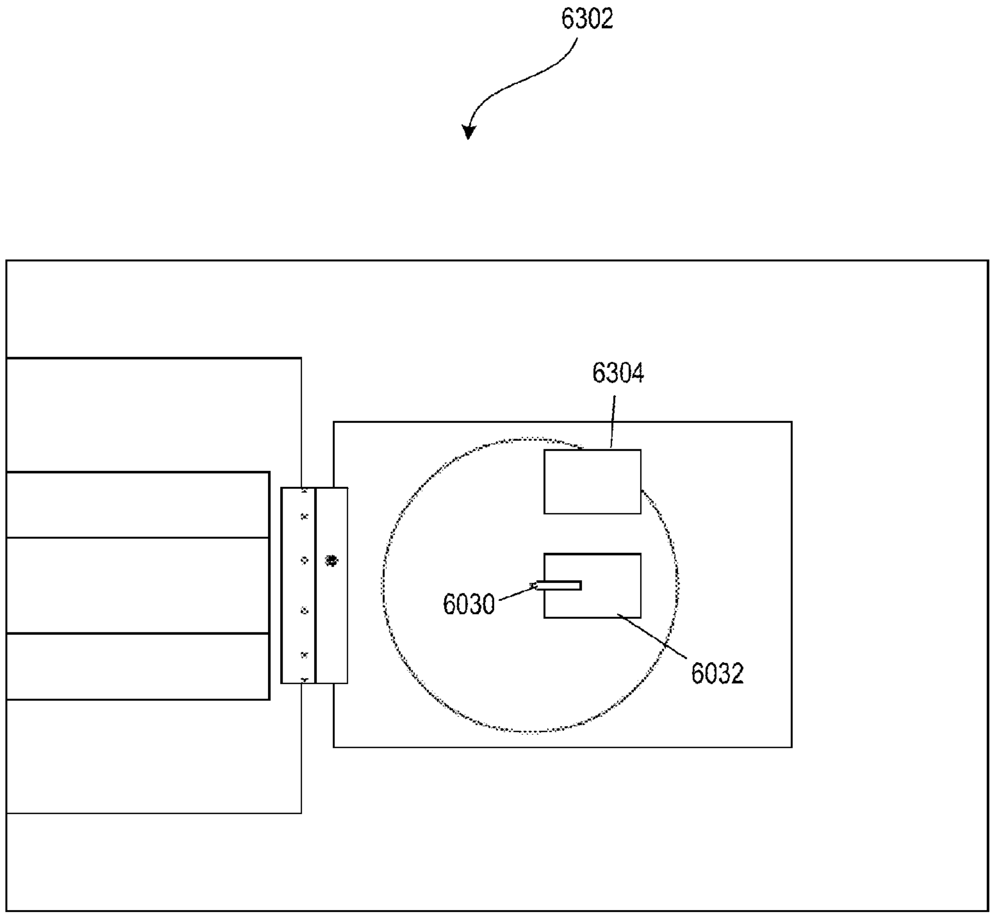

FIG. 255 shows a top view of the multi-axis machine tool of FIG. 216 further including an additional mount for an in situ measurement system, according to an embodiment.

Figure 256:
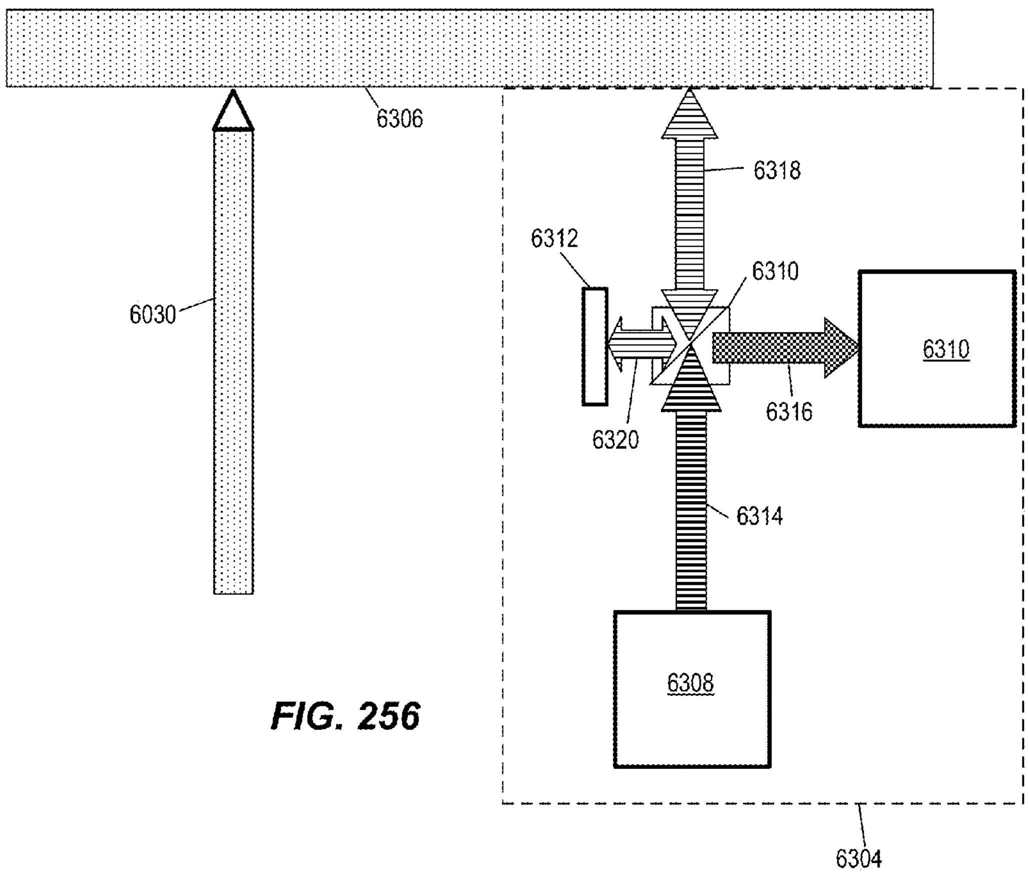

FIG. 256 shows further details of the in situ measurement system of FIG. 255, illustrating integration of an optical metrology system into the multi-axis machine tool, according to an embodiment.

Figure 257:
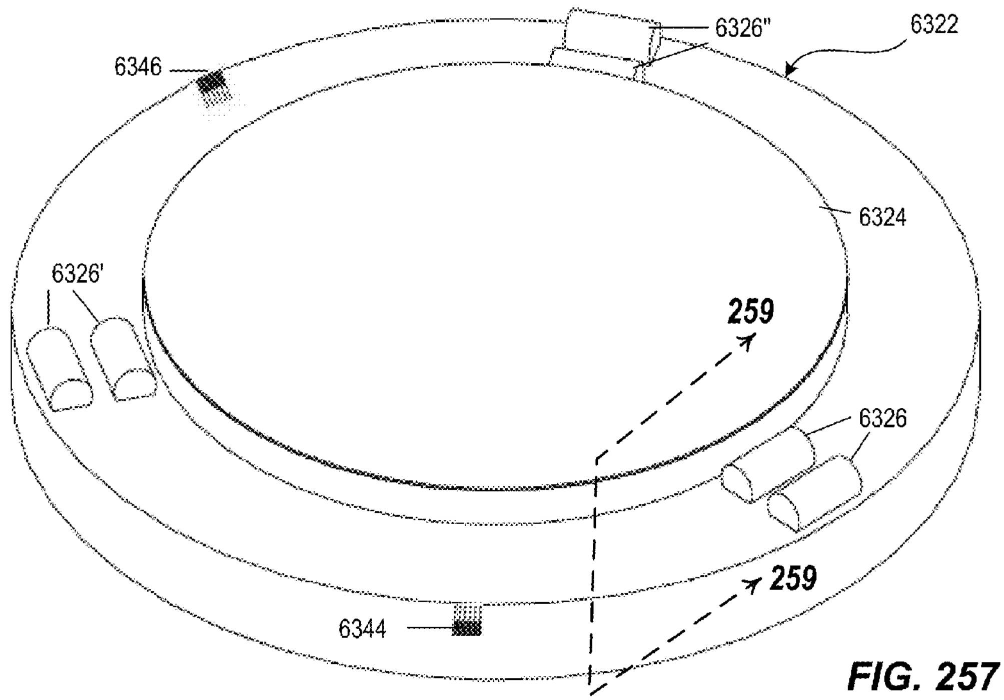

FIG. 257 is a schematic diagram, in elevation, of a vacuum chuck for supporting a fabrication master, illustrating inclusion of alignment features on the vacuum chuck, according to an embodiment.

Figure 258:
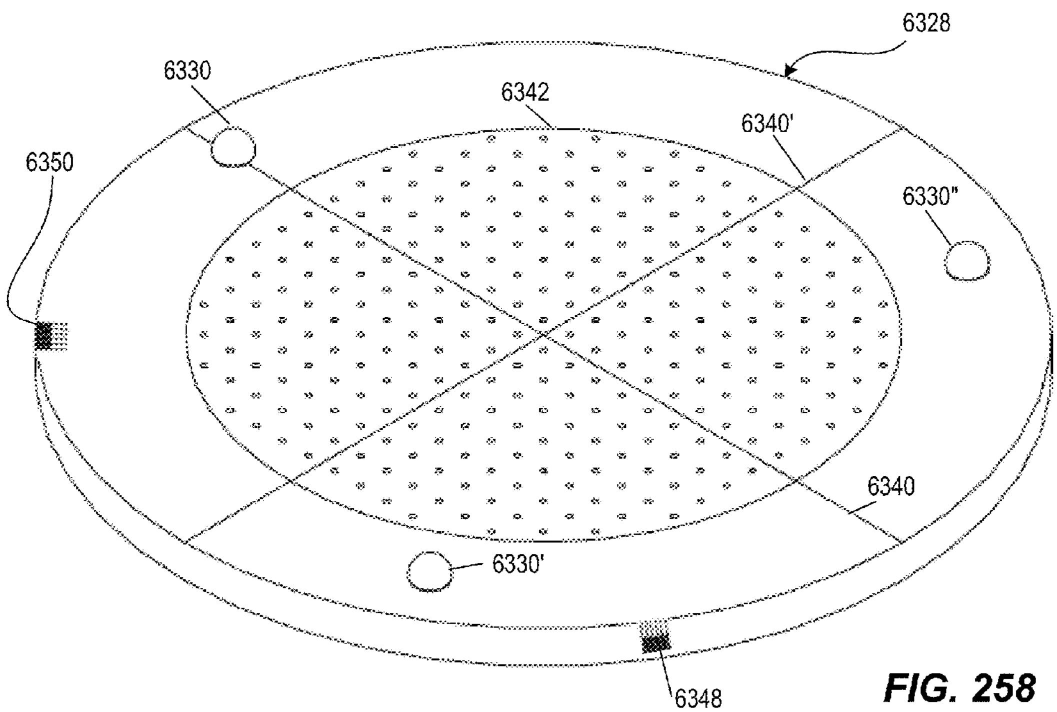

FIG. 258 is a schematic diagram, in elevation, of a populated fabrication master that includes alignment features corresponding to alignment features on the vacuum chuck of FIG. 257, according to an embodiment.

Figure 259:
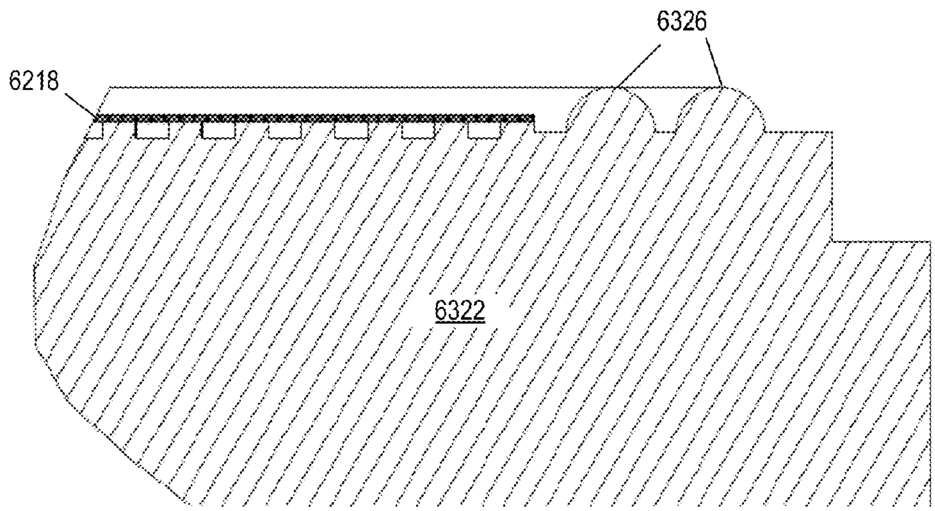

FIG. 259 is a schematic diagram, in partial cross-section, of the vacuum chuck of FIG. 257.

Figure 260:
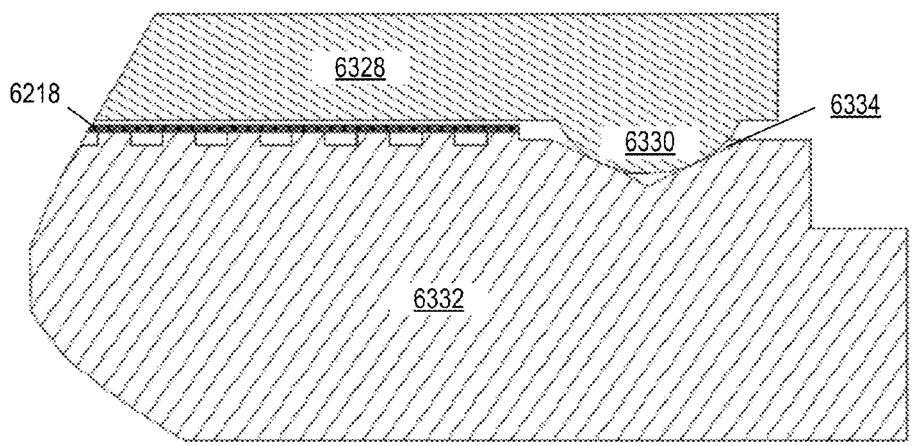
Figure 261:
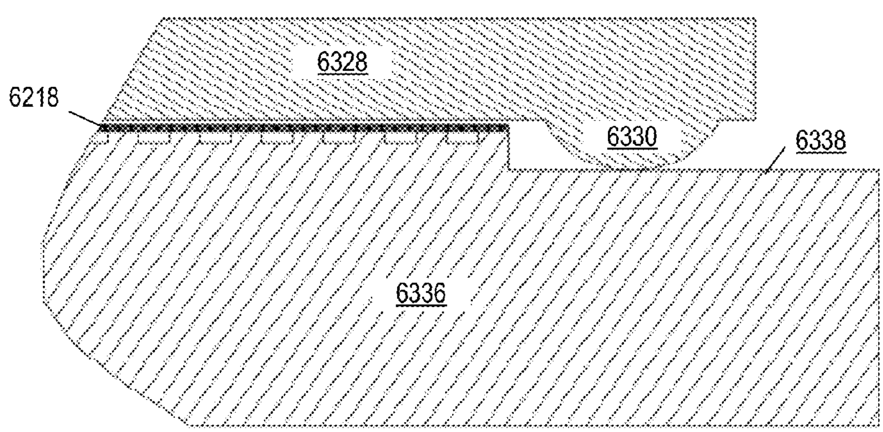

FIGS. 260 and 261 show illustrations, in partial cross-section, of alternative alignment features suitable for use with the vacuum chuck of FIG. 257, according to an embodiment.

Figure 262:
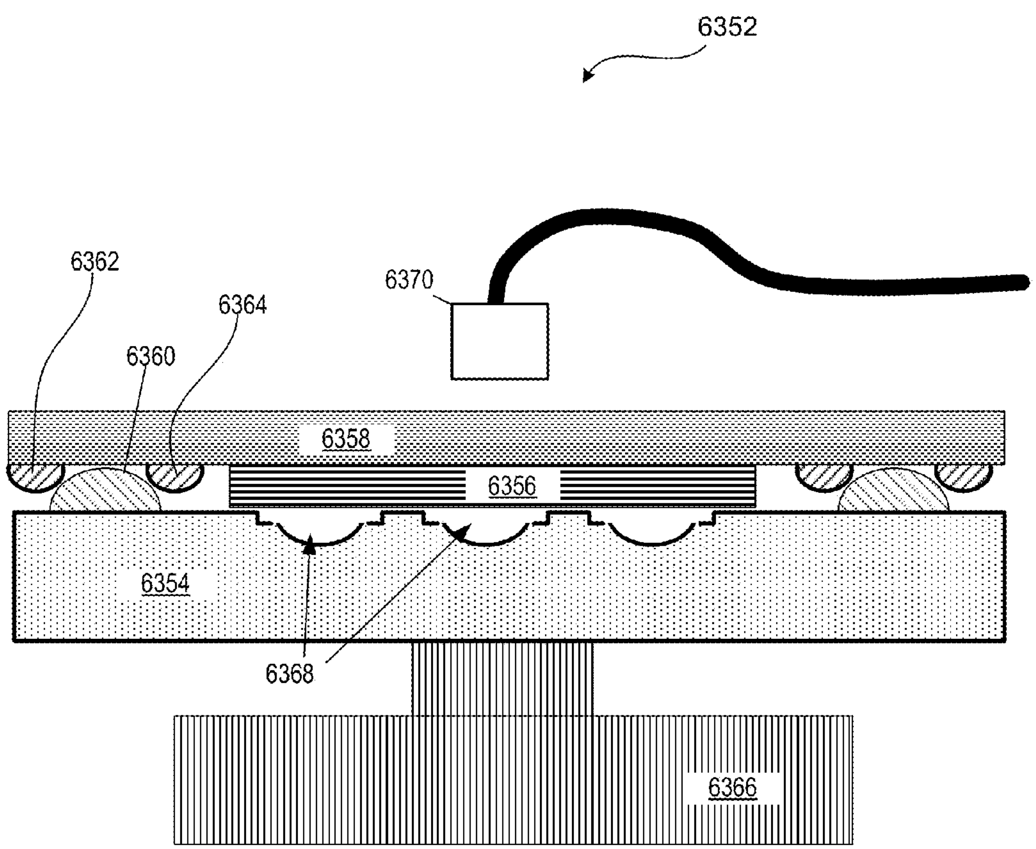

FIG. 262 is a schematic diagram, in cross-section, of an exemplary arrangement of a fabrication master, a common base and a vacuum chuck, illustrating function of the alignment features, according to an embodiment.

FIGS. 263-266 show exemplary multi-axis machining configurations, which may be used in the fabrication of features on a fabrication master for forming optical elements, according to an embodiment.

Figure 267:
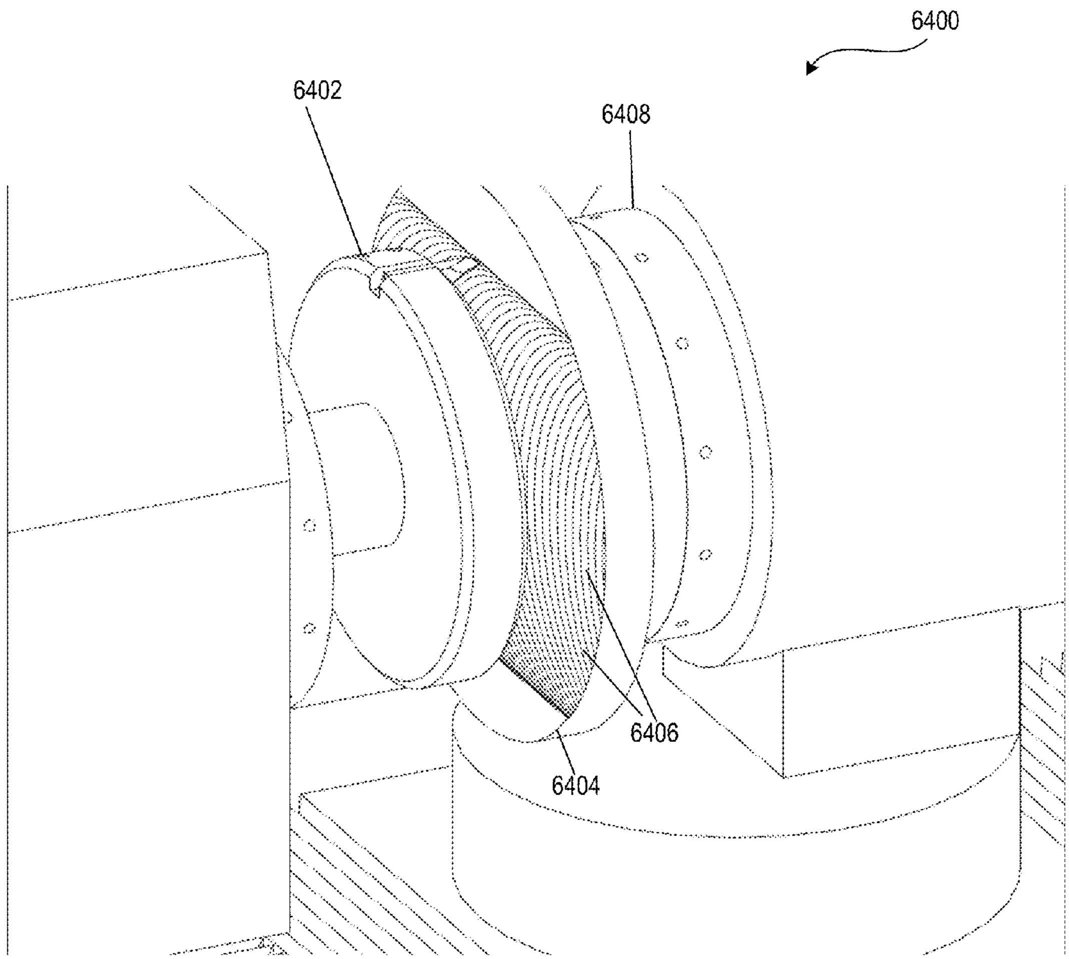

FIG. 267 shows an exemplary fly-cutting configuration suitable for forming a machined surface, including intentional machining marks, according to an embodiment.

Figure 268:
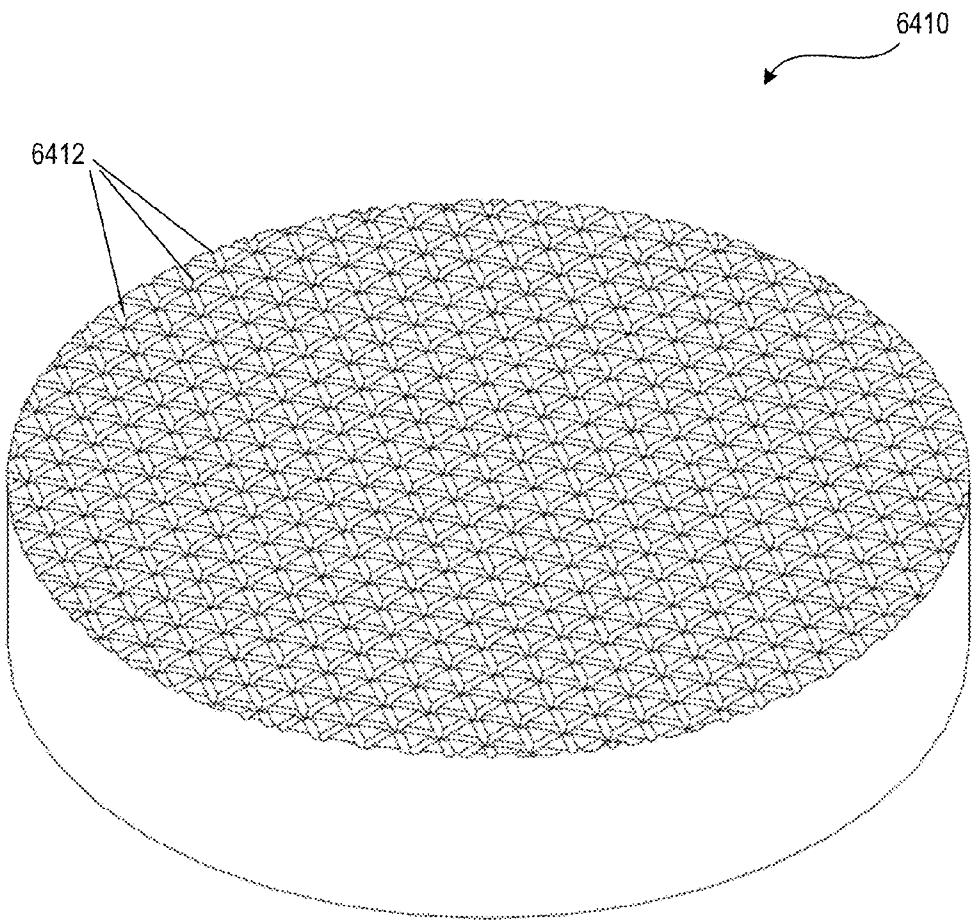

FIG. 268 shows an exemplary machined surface, in partial elevation, formable using the fly-cutting configuration of FIG. 267.

Figure 269:
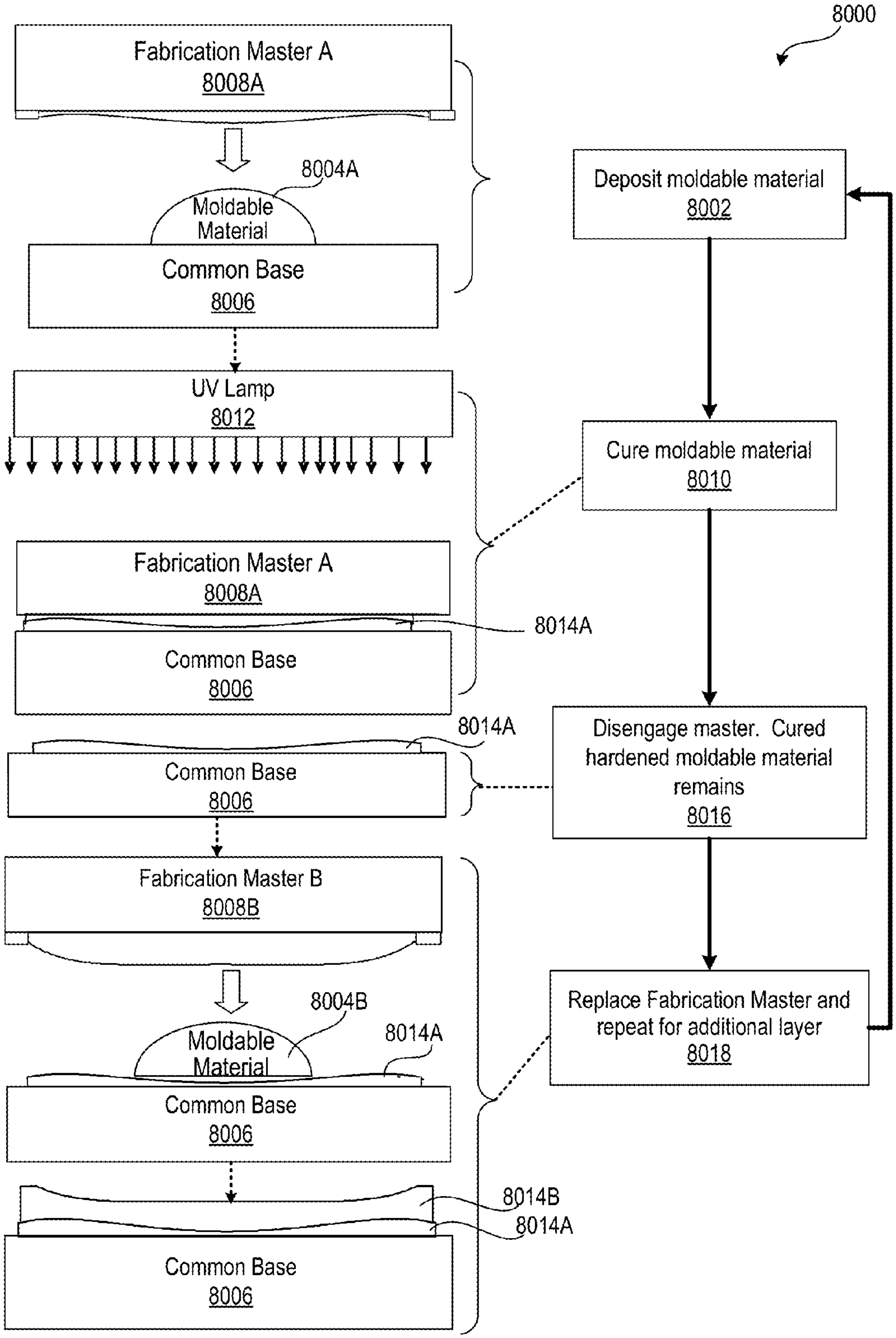

FIG. 269 shows a schematic diagram and a flowchart for producing layered optical elements by use of a fabrication master according to one embodiment.

Figure 270A:
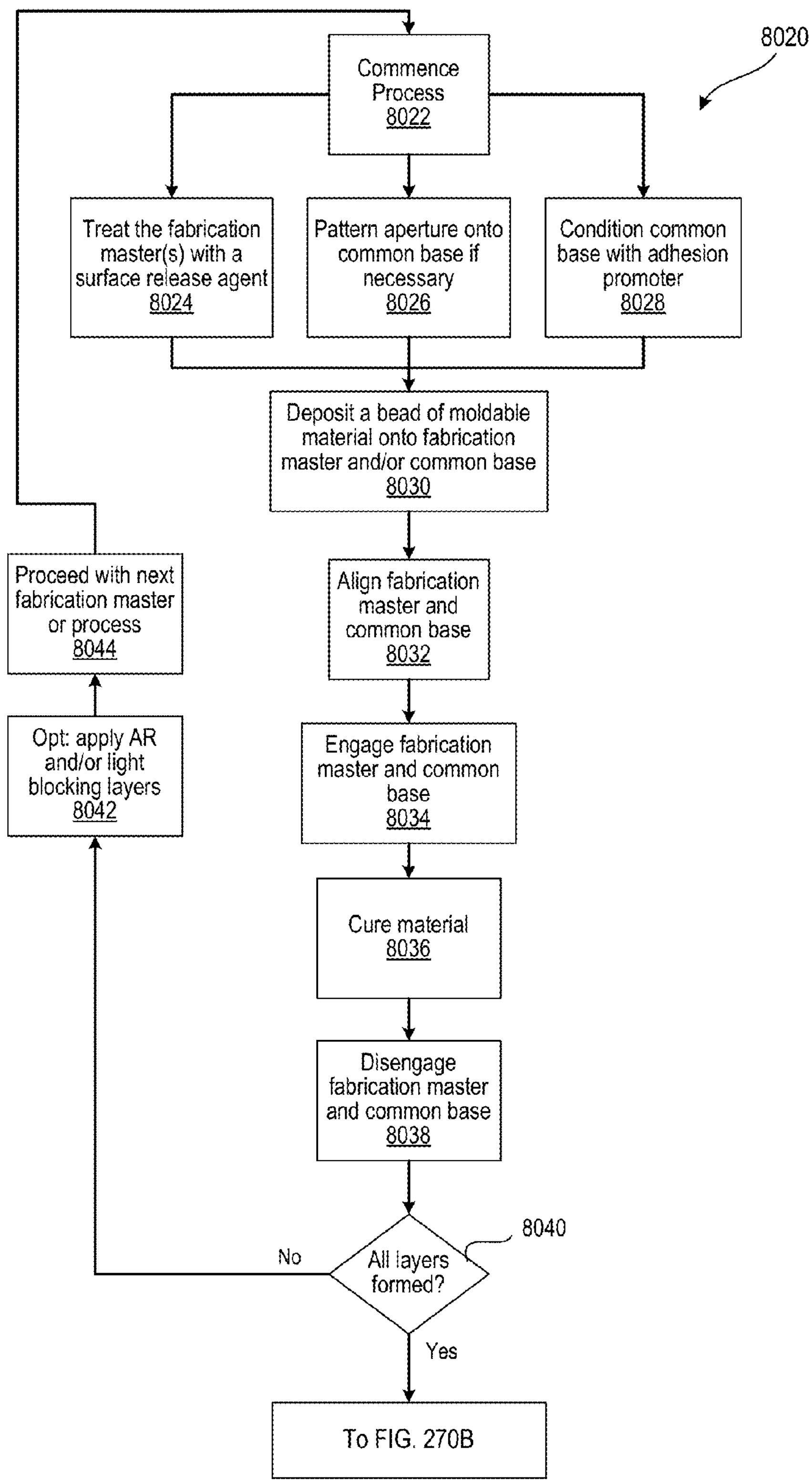
Figure 270B:
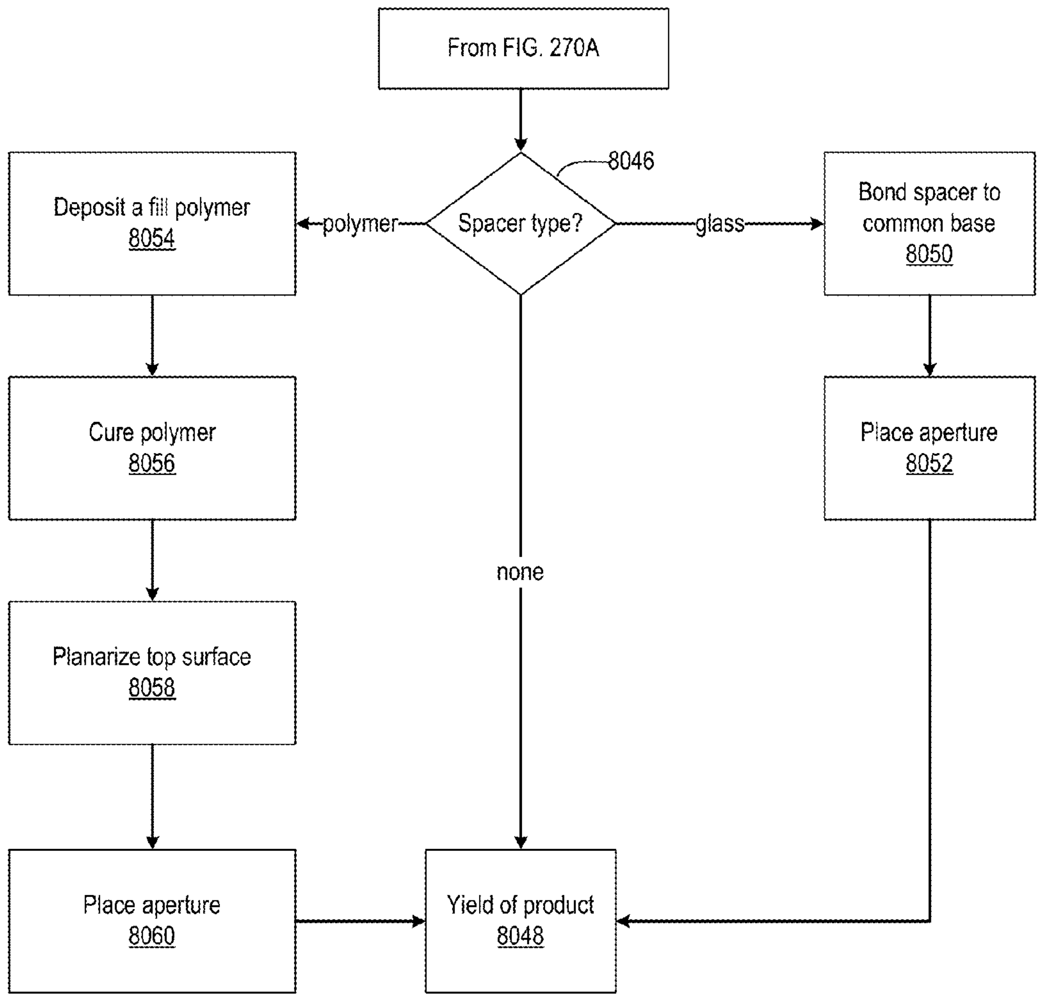

FIGS. 270A and 270B show a flowchart for producing layered optical elements by use of a fabrication master according to one embodiment.

Figure 271A:
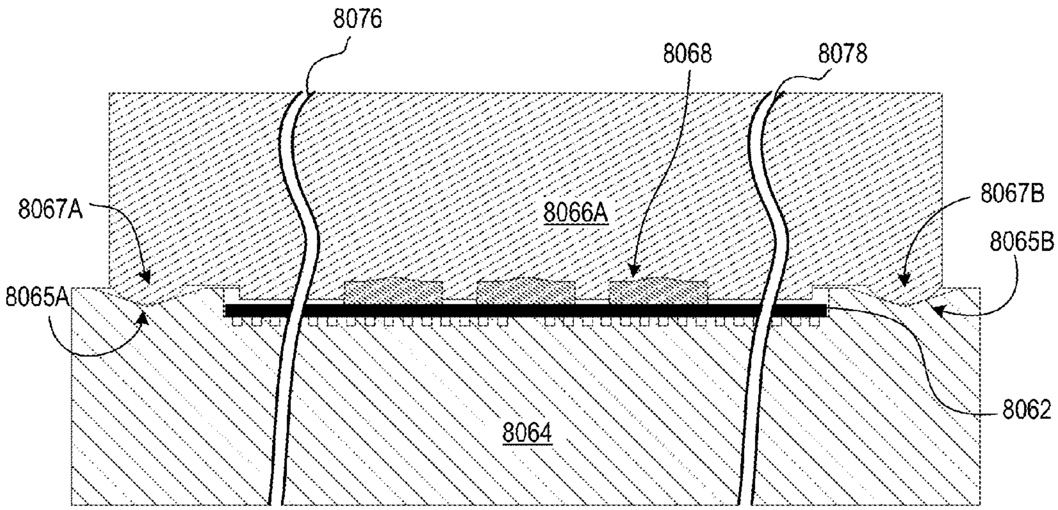
Figure 271B:
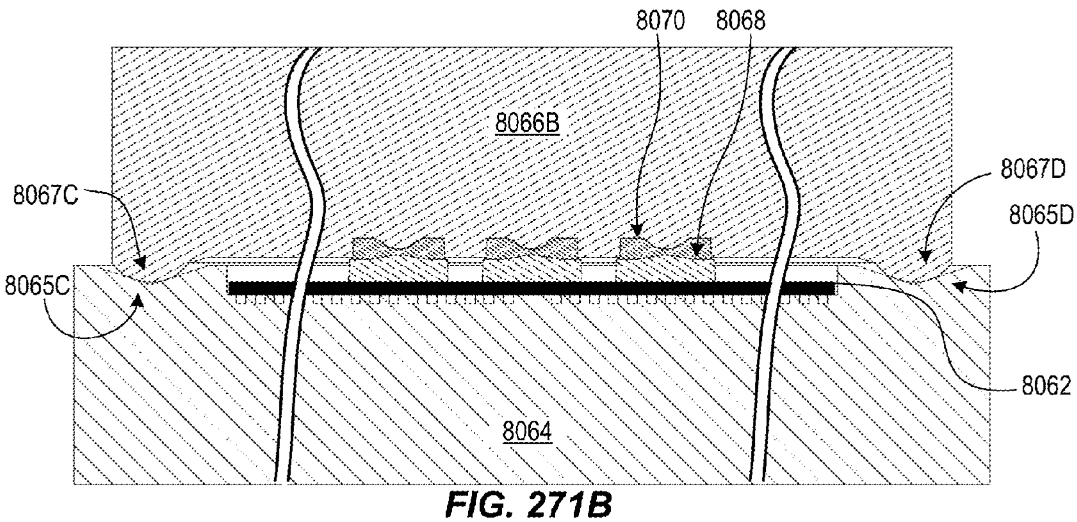
Figure 271C:
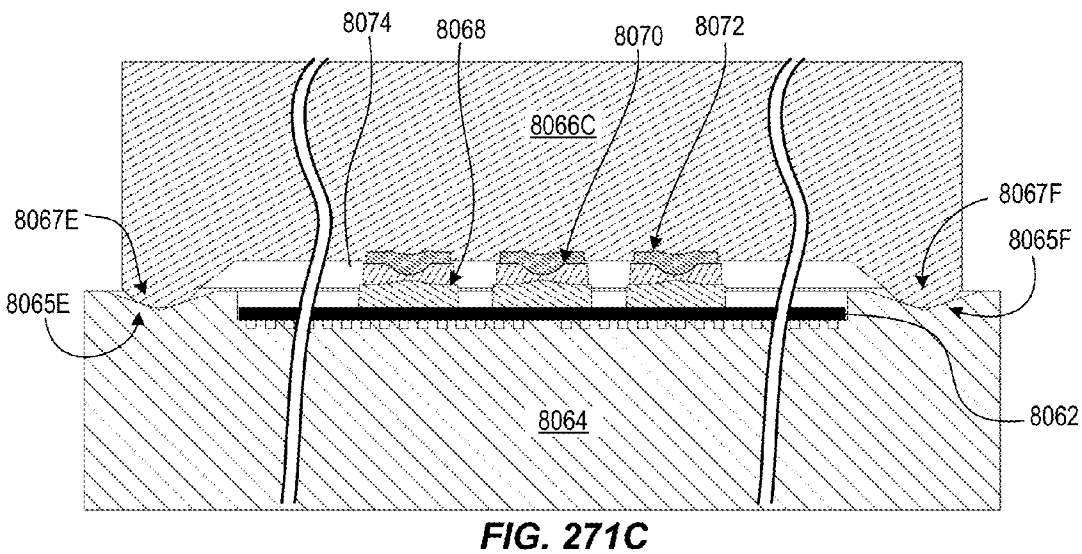

FIGS. 271A-271C show a plurality of sequential steps that are used to make an array of layered optical elements on a common base.

FIGS. 272A-272E show a plurality of sequential steps that are used to make an array of layered optical elements.

Figure 273:
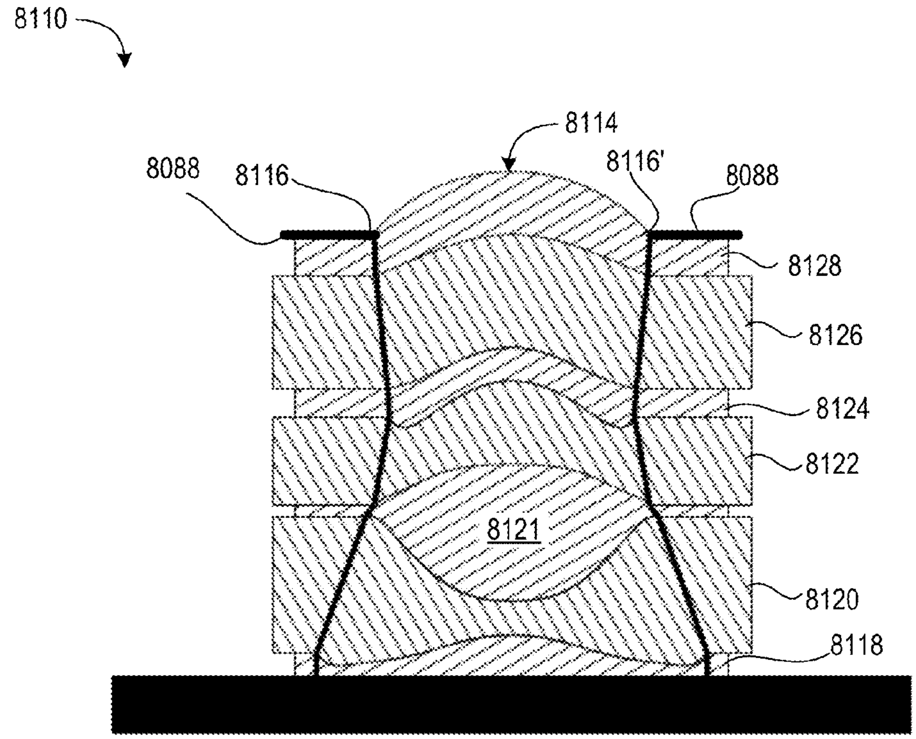

FIG. 273 shows a layered optical element manufactured by the sequential steps according to FIGS. 271A-271C.

Figure 274:
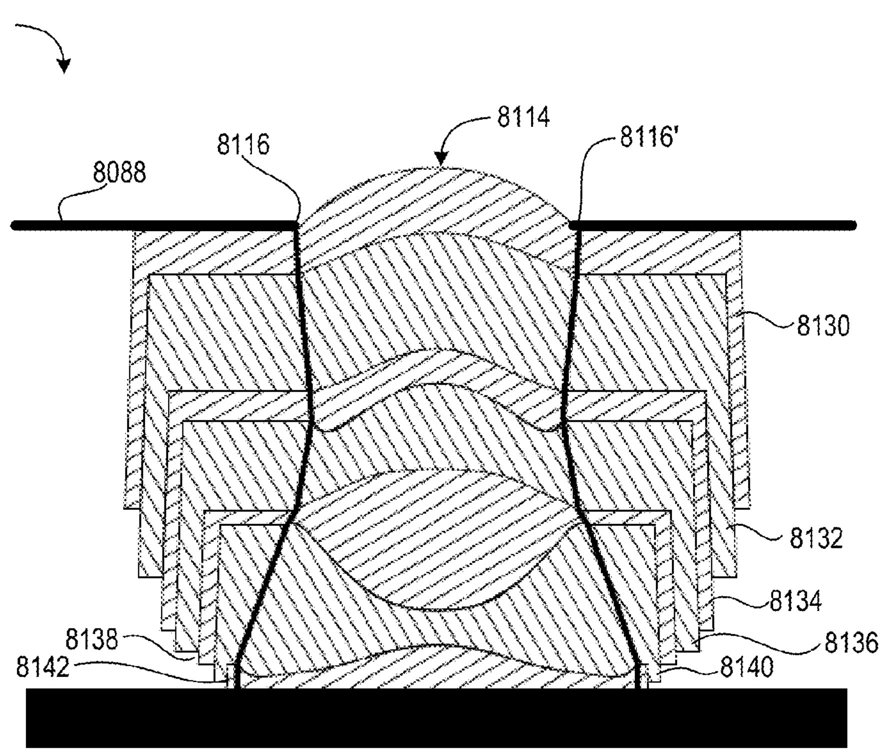

FIG. 274 shows a layered optical element made by the sequential steps according to FIGS. 272A-272E.

Figure 275:
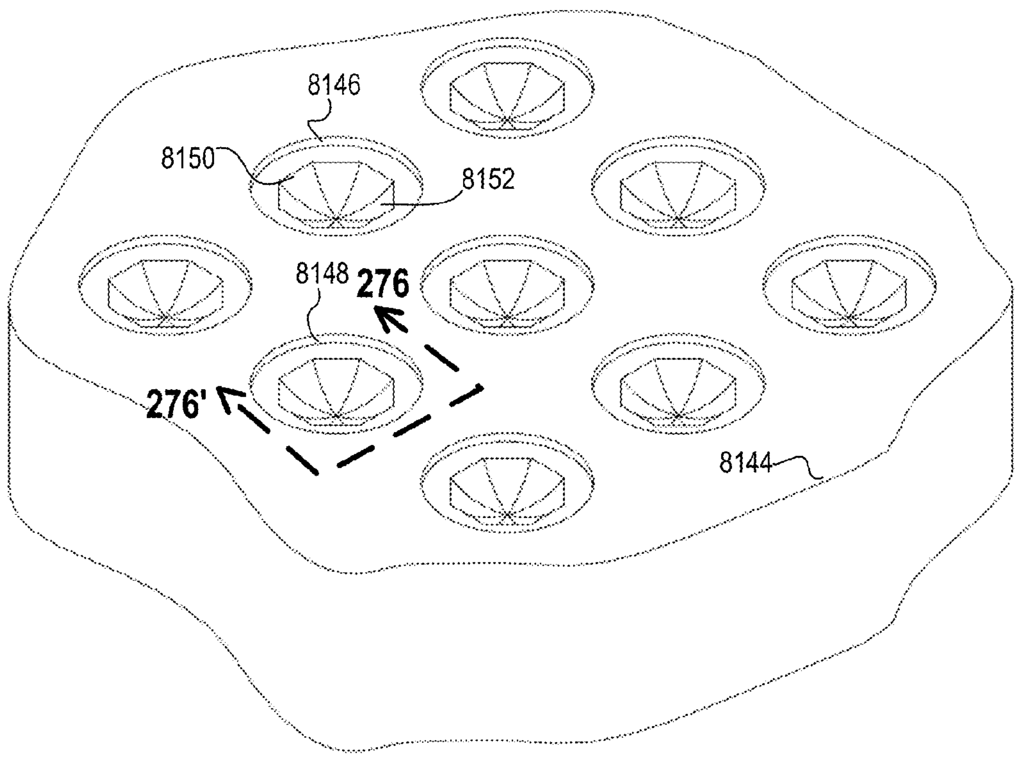

FIG. 275 shows a partial perspective view of a fabrication master having formed thereon a plurality of features for forming phase modifying elements.

Figure 276:
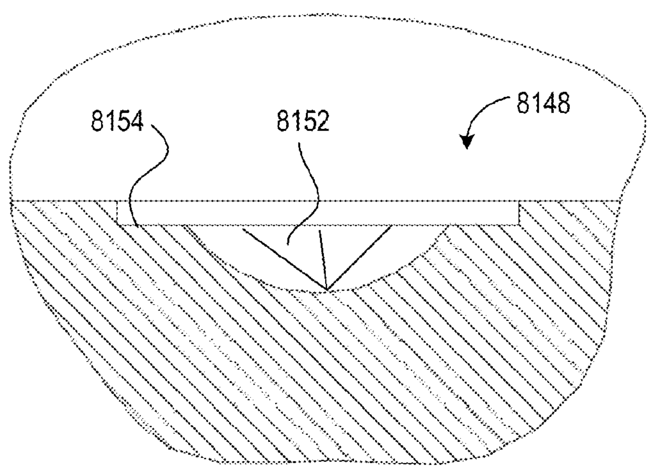

FIG. 276 shows a cross-sectional view taken along line 276-276' of FIG. 275 to provide additional detail with respect to a selected one of the features for forming phase modifying elements.

FIGS. 277A-277D show sequential steps for forming optical elements on two sides of a common base.

Figure 278:
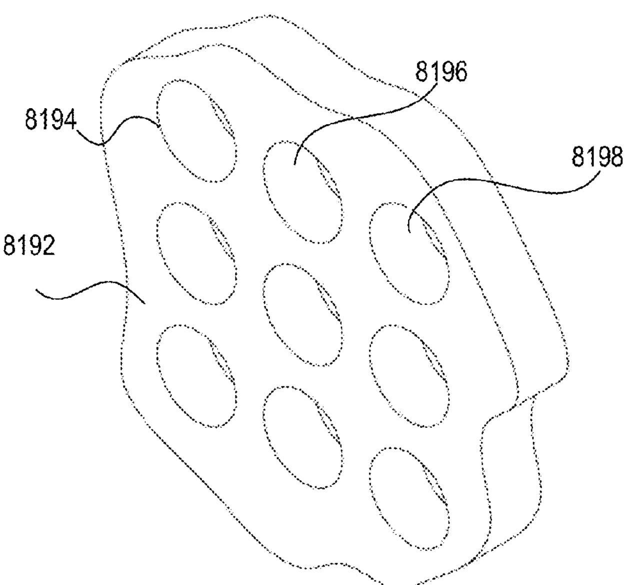

FIG. 278 shows an exemplary spacer that may be used to separate optics.

Figure 279A:
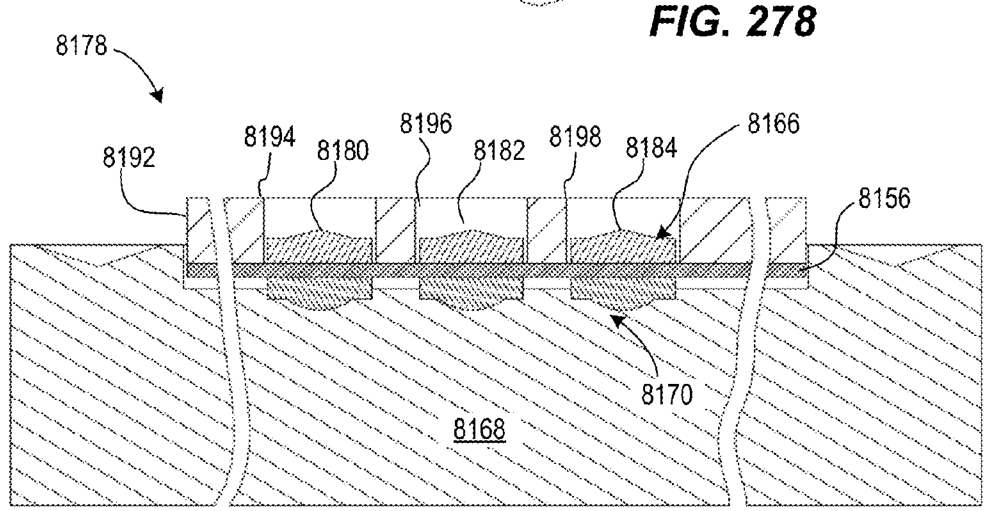
Figure 279B:
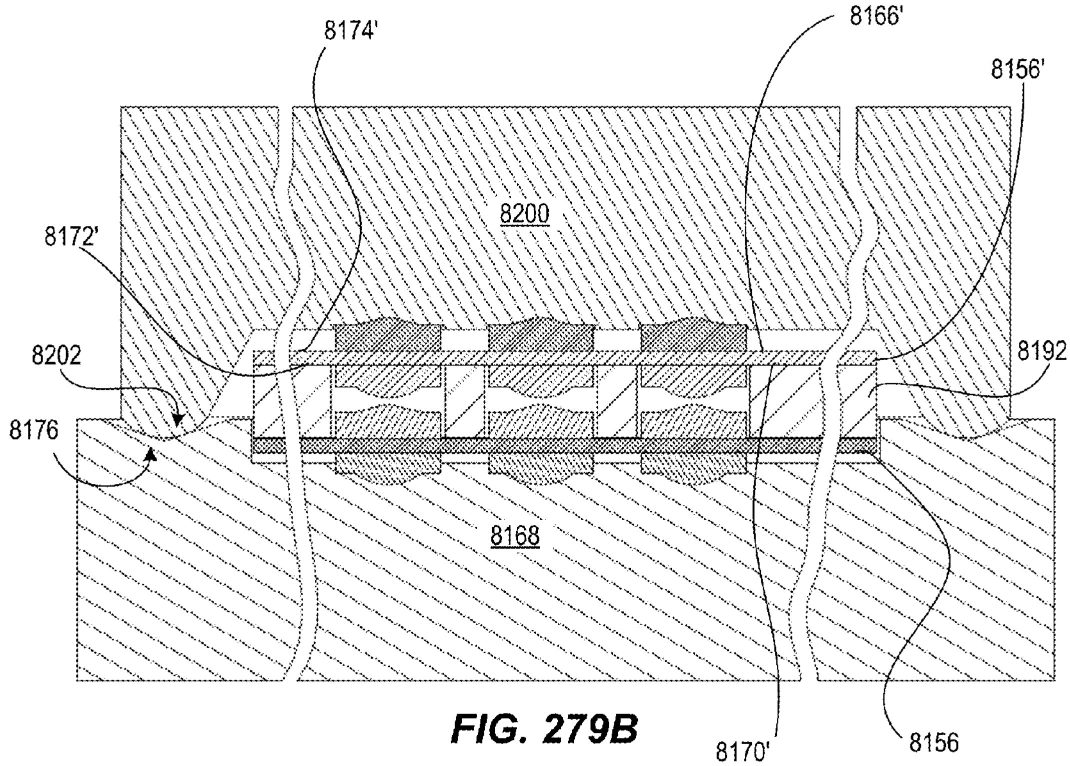

FIGS. 279A and 279B show sequential steps for forming an array of optics with use of the spacer of FIG. 278.

Figure 280:
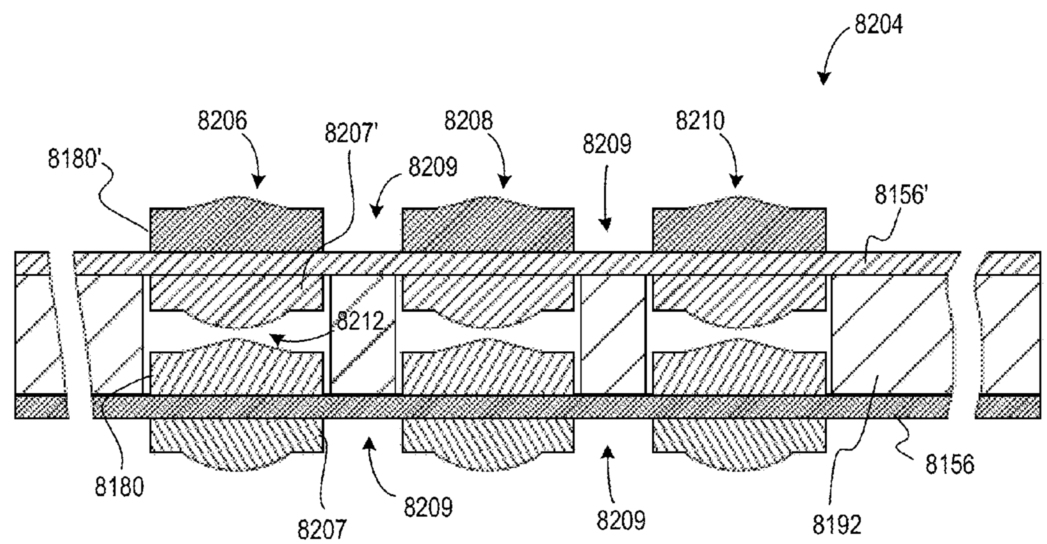

FIG. 280 shows an array of optics.

Figure 281A:
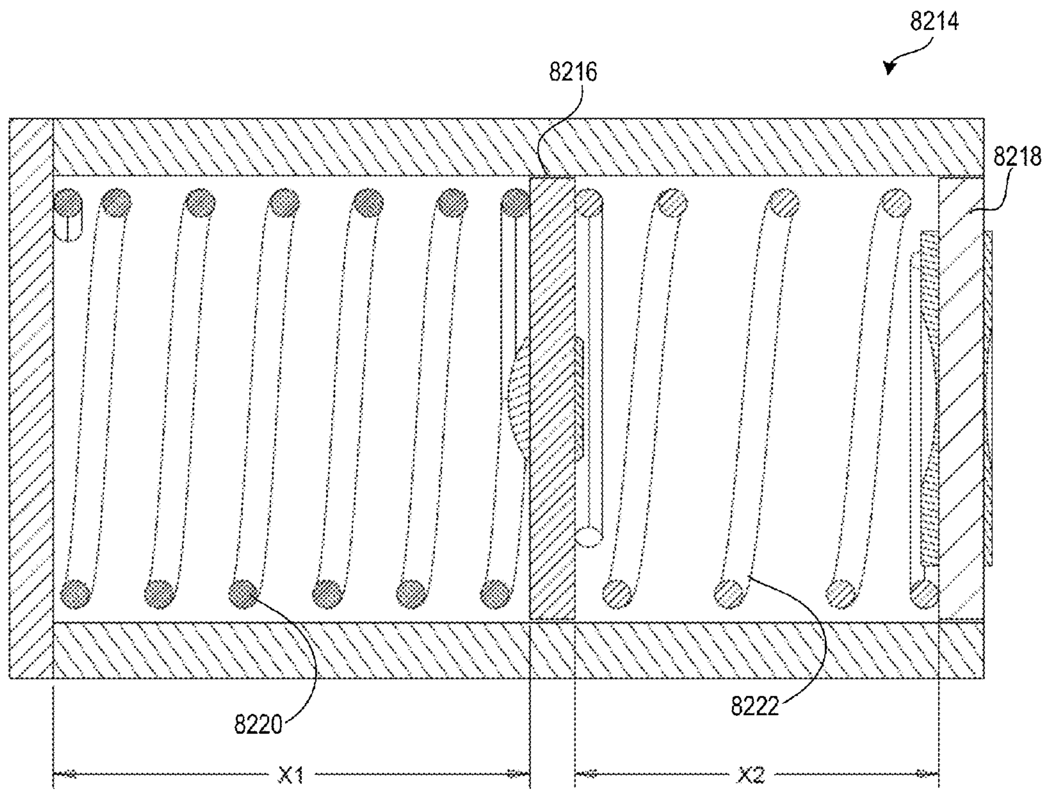
Figure 281B:
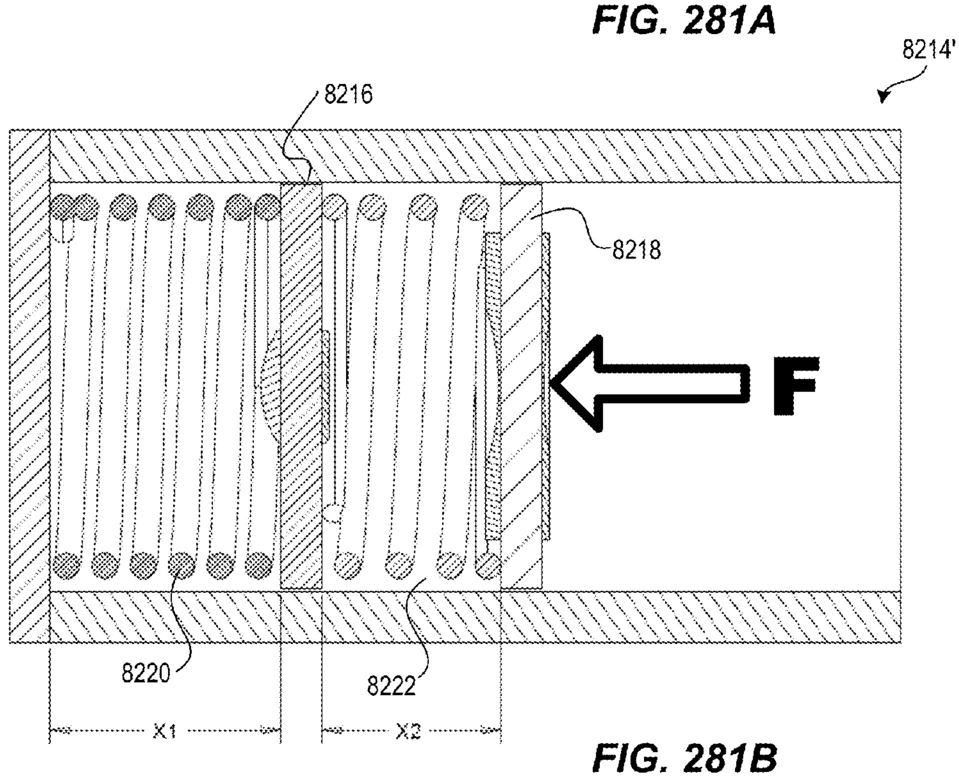

FIGS. 281A and 281B show cross-sections of wafer-scale zoom optics according to one embodiment.

Figure 282A:
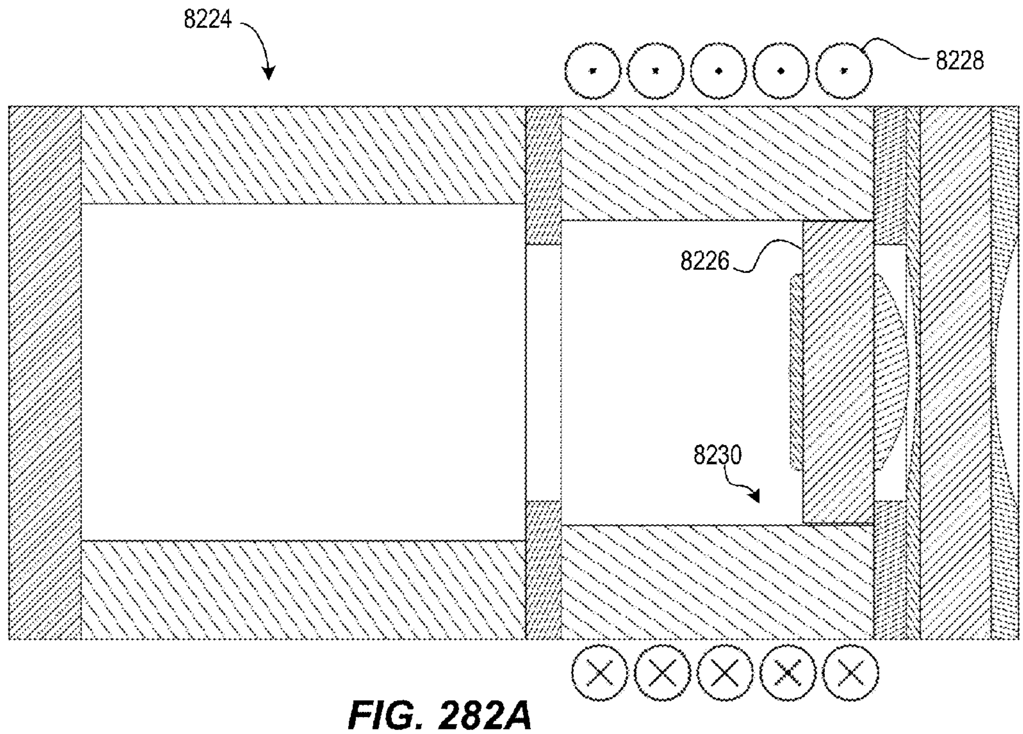
Figure 282B:
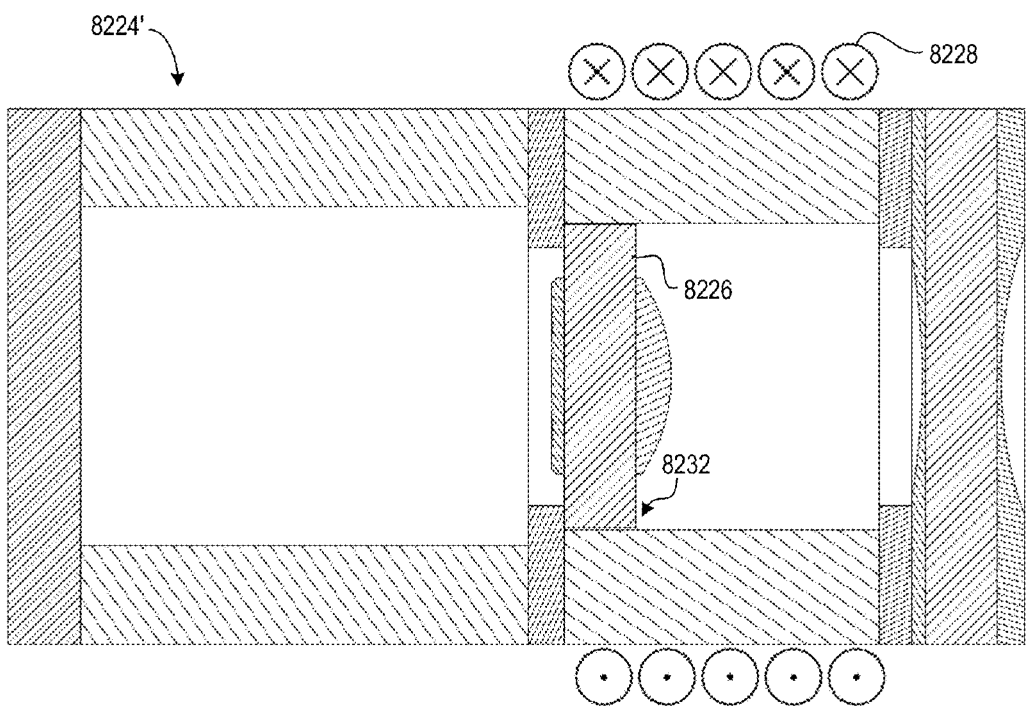

FIGS. 282A and 282B show cross-sections of wafer-scale zoom optics according to one embodiment.

Figure 283A:
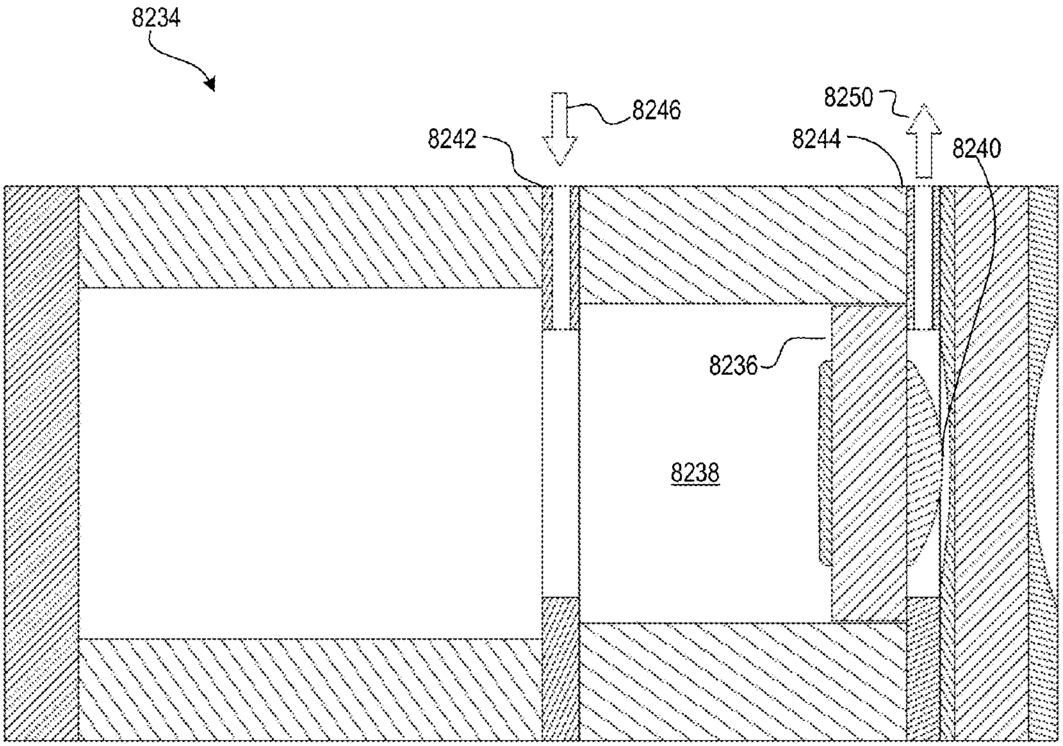
Figure 283B:
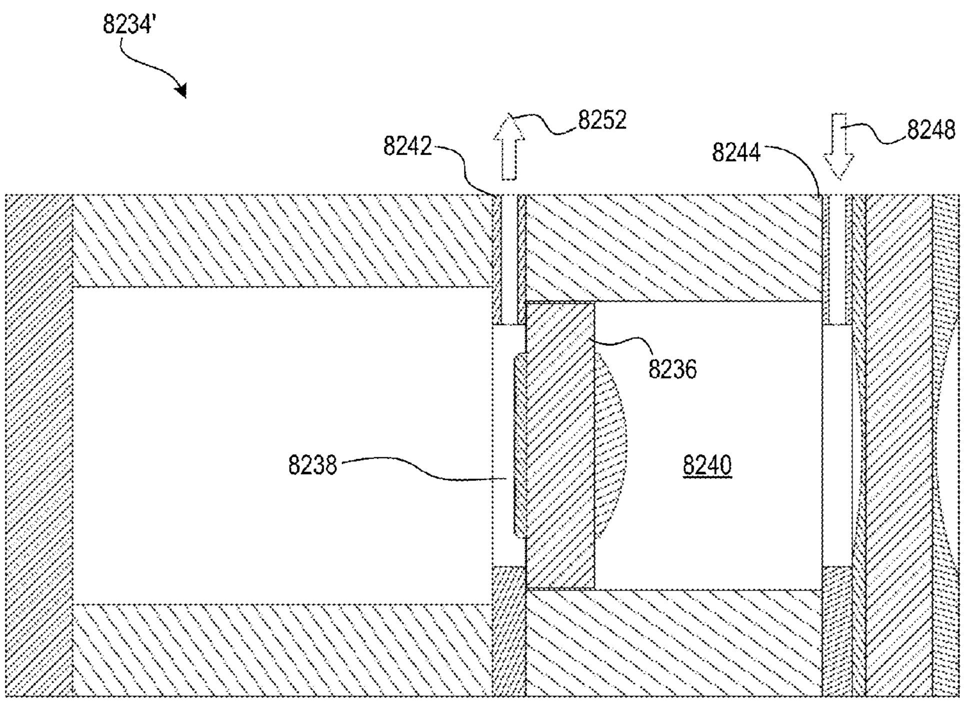

FIGS. 283A and 283B show cross-sections of wafer-scale zoom optics according to one embodiment.

Figure 284:
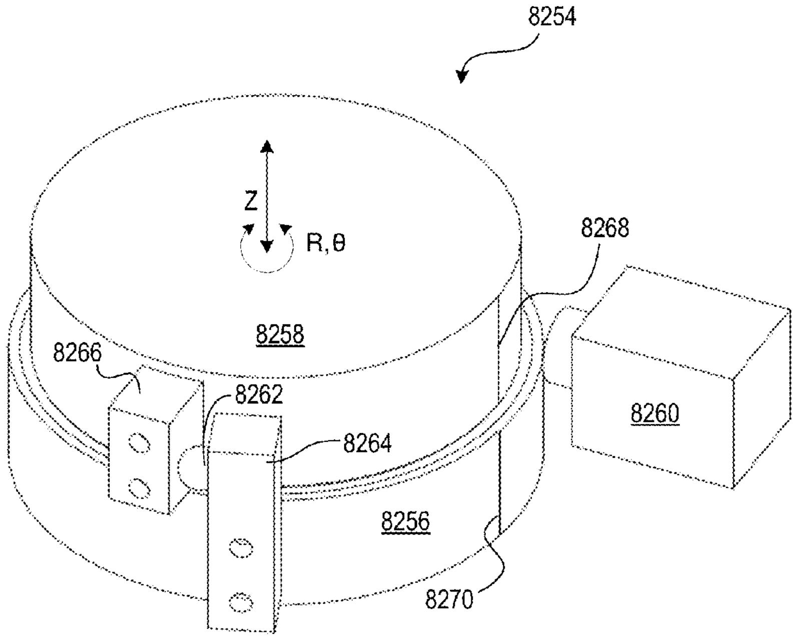

FIG. 284 shows an exemplary alignment system that uses a vision system and robotics to position a fabrication master and a vacuum chuck.

Figure 285:
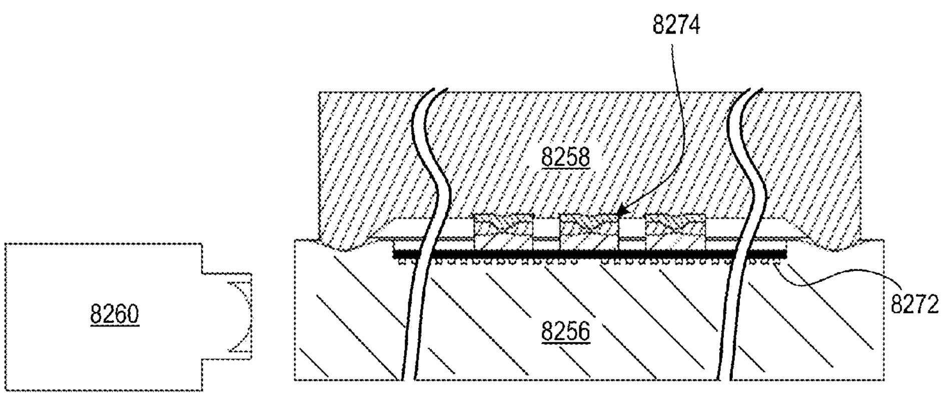

FIG. 285 is a cross-sectional view of the system shown in FIG. 284 to illustrate details therein.

Figure 286:
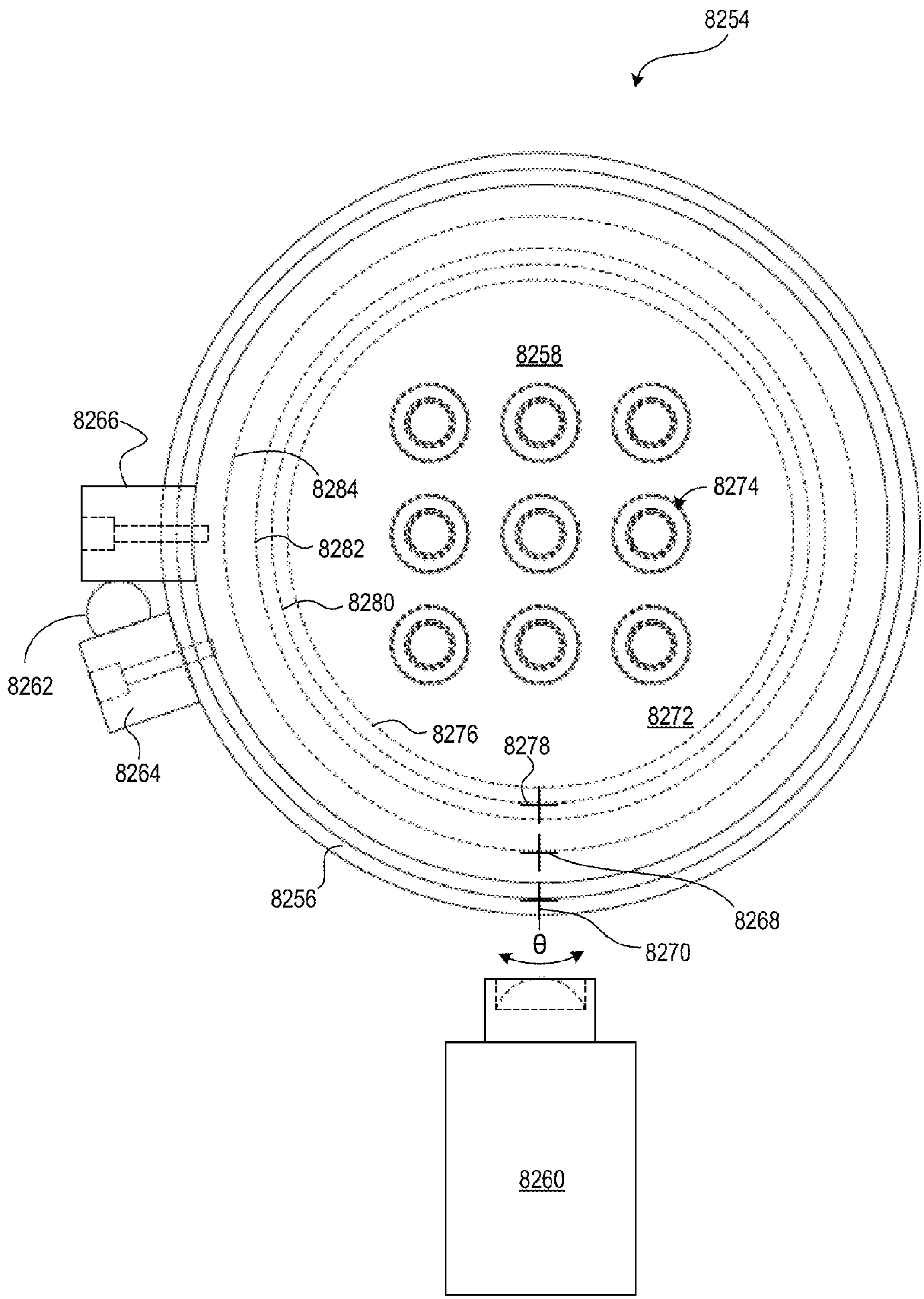

FIG. 286 is a top plan view of the system shown in FIG. 284 to illustrate the use of transparent or translucent system components.

Figure 287:
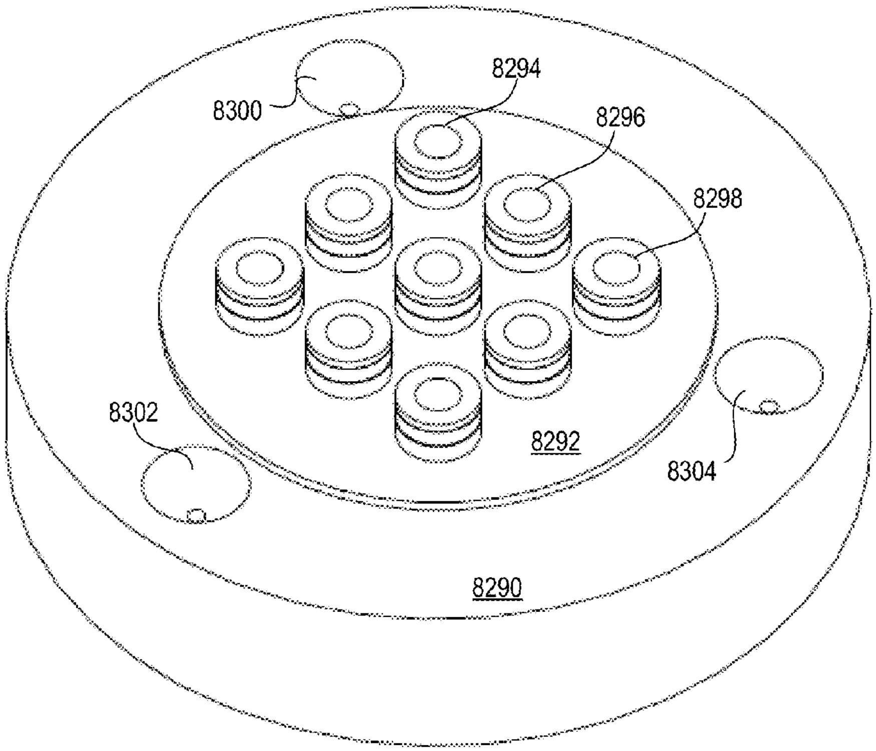

FIG. 287 shows an exemplary structure for kinematic positioning of a chuck for a common base.

Figure 288:
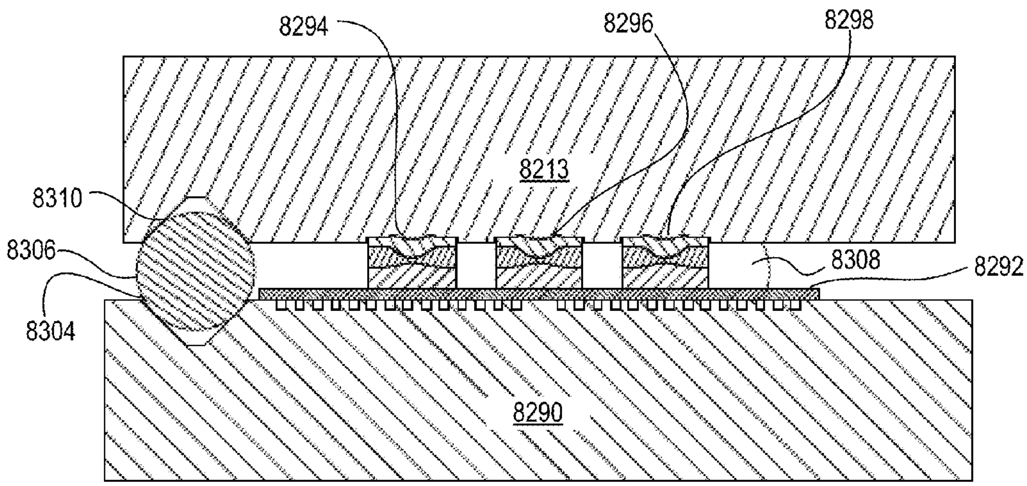

FIG. 288 shows a cross-sectional view of the structure of FIG. 287 including an engaged fabrication master.

Figure 289:
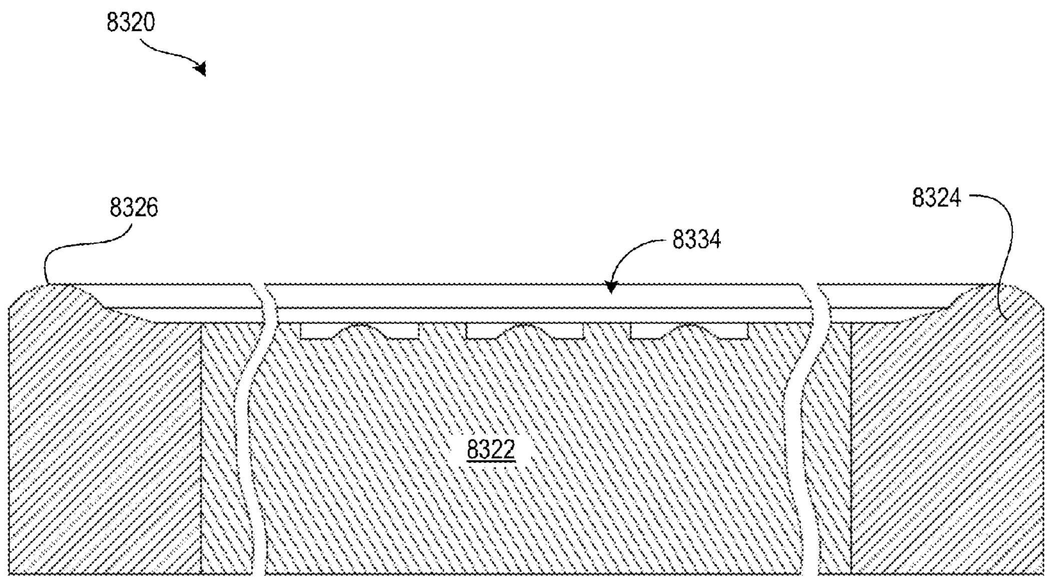

FIG. 289 illustrates the construction of a fabrication master according to one embodiment.

Figure 290:
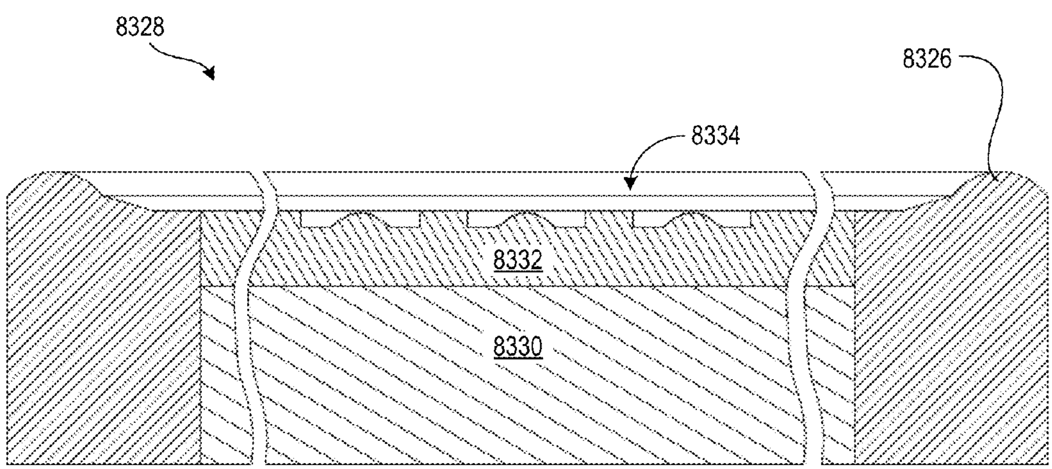

FIG. 290 illustrates the construction of a fabrication master according to one embodiment.

Figure 291A:
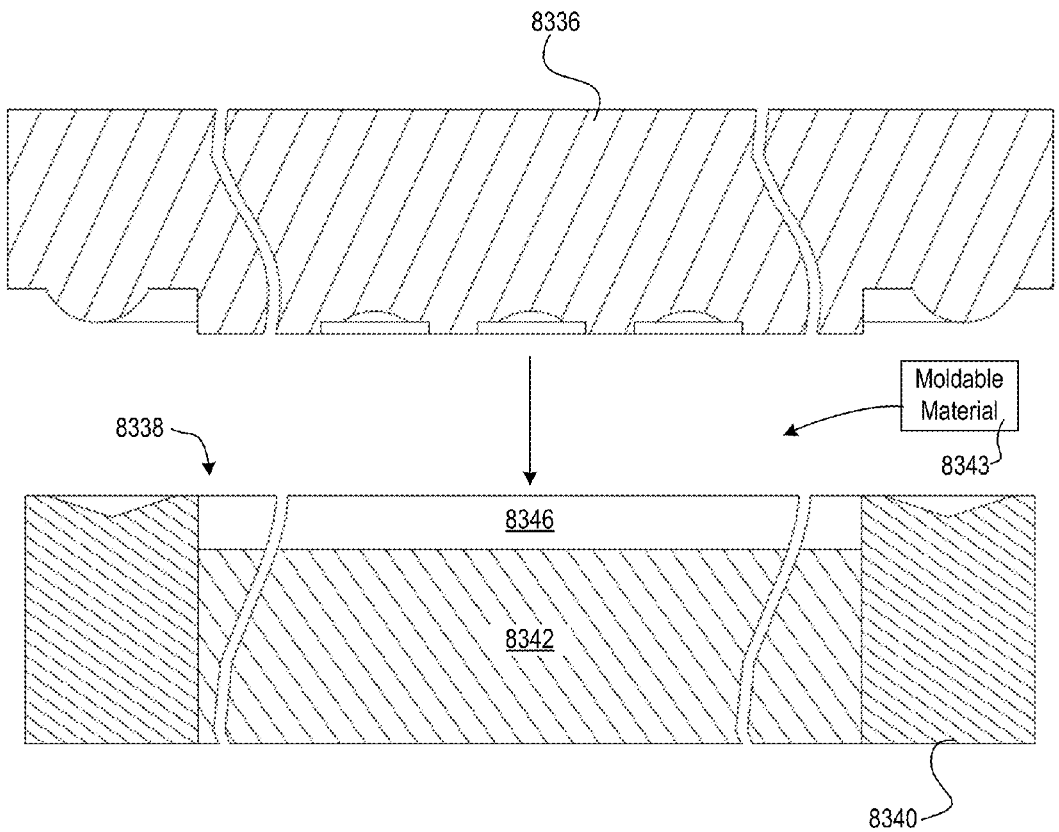
Figure 291B:
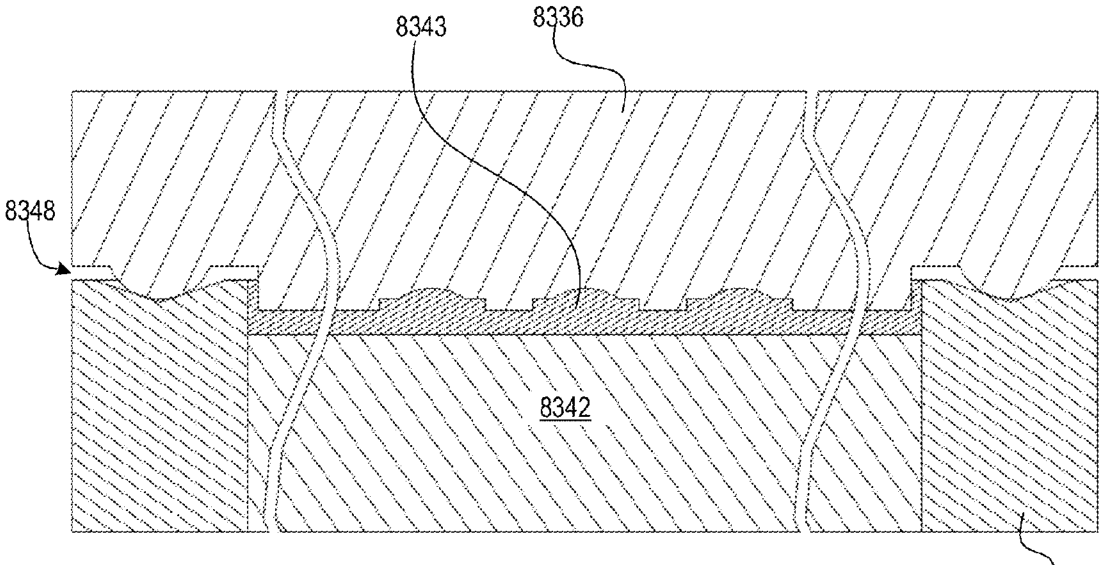
Figure 291C:
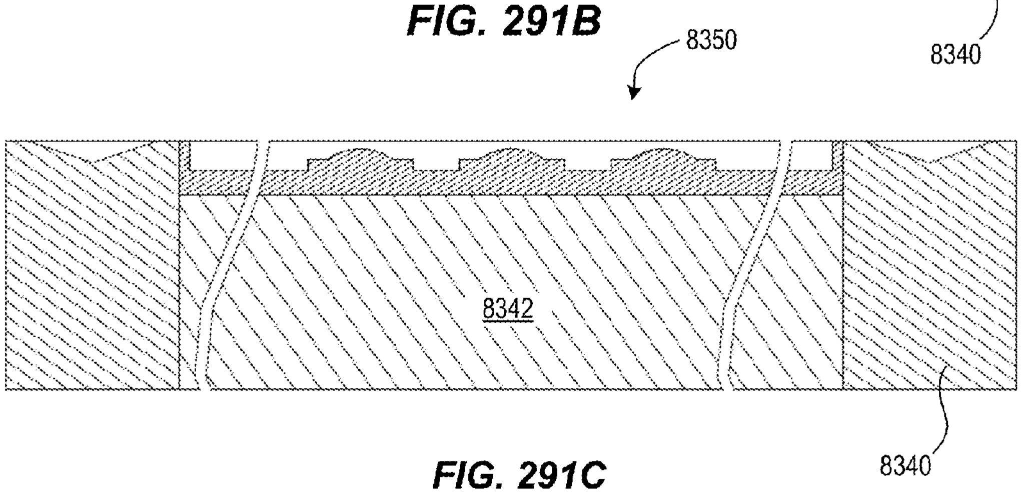

FIGS. 291A-291C show successive steps in the construction of the fabrication master of FIG. 290 according to a mother-daughter process.

Figure 292:
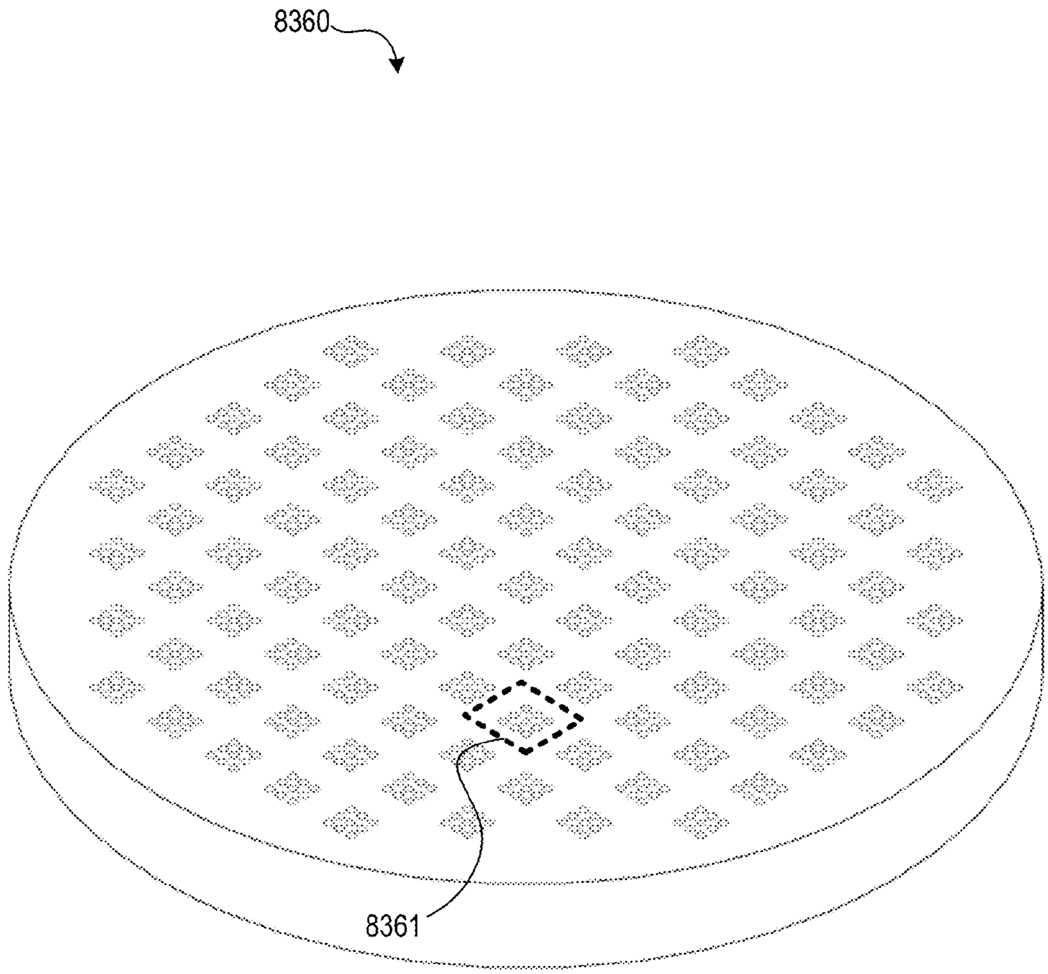

FIG. 292 shows a fabrication master with a selected array of features for forming optical elements.

Figure 293:
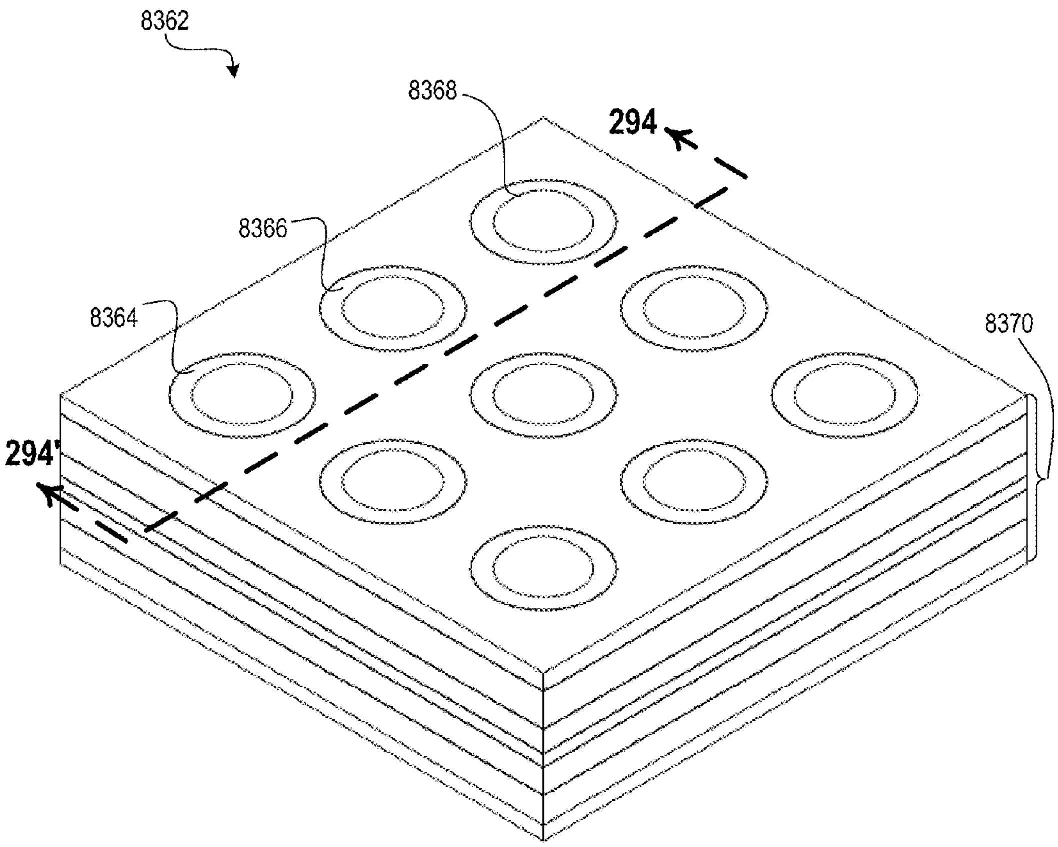

FIG. 293 shows a separated portion of arrayed imaging systems that contains array of layered optical elements that have been produced by use of fabrication masters like those shown in FIG. 292.

Figure 294:
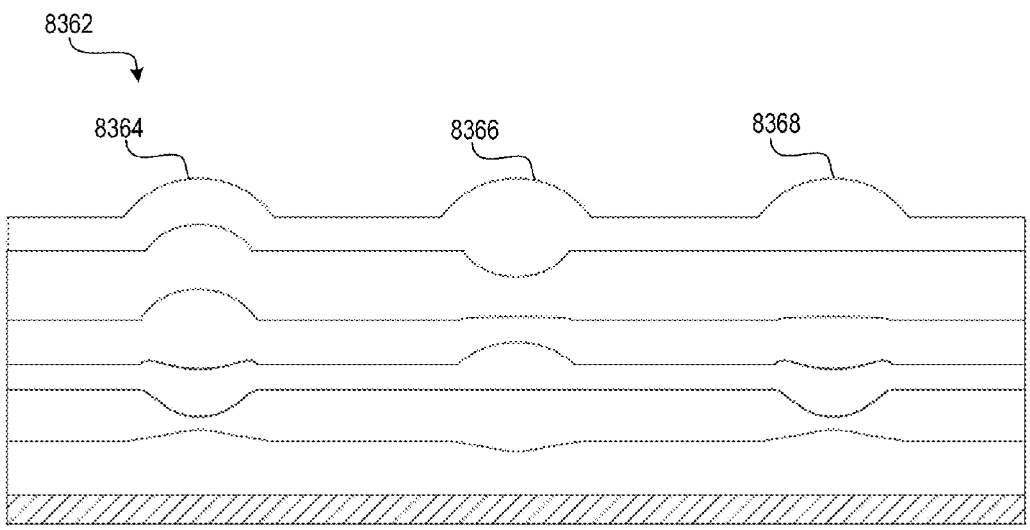

FIG. 294 is a cross-sectional view taken along line 294-294' of FIG. 293.

Figure 295:
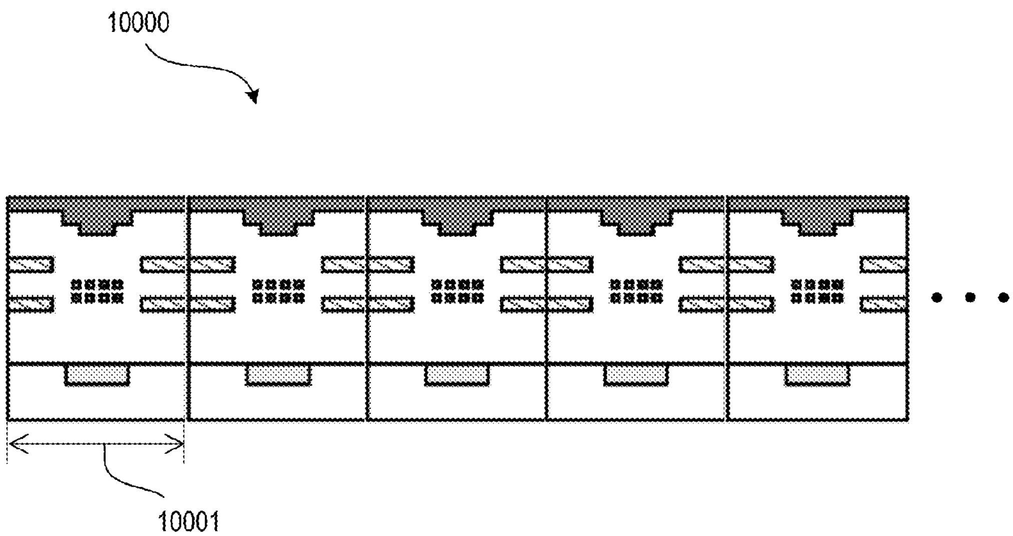

FIG. 295 shows a portion of a detector including a plurality of detector pixels, each with buried optics, according to an embodiment.

Figure 296:
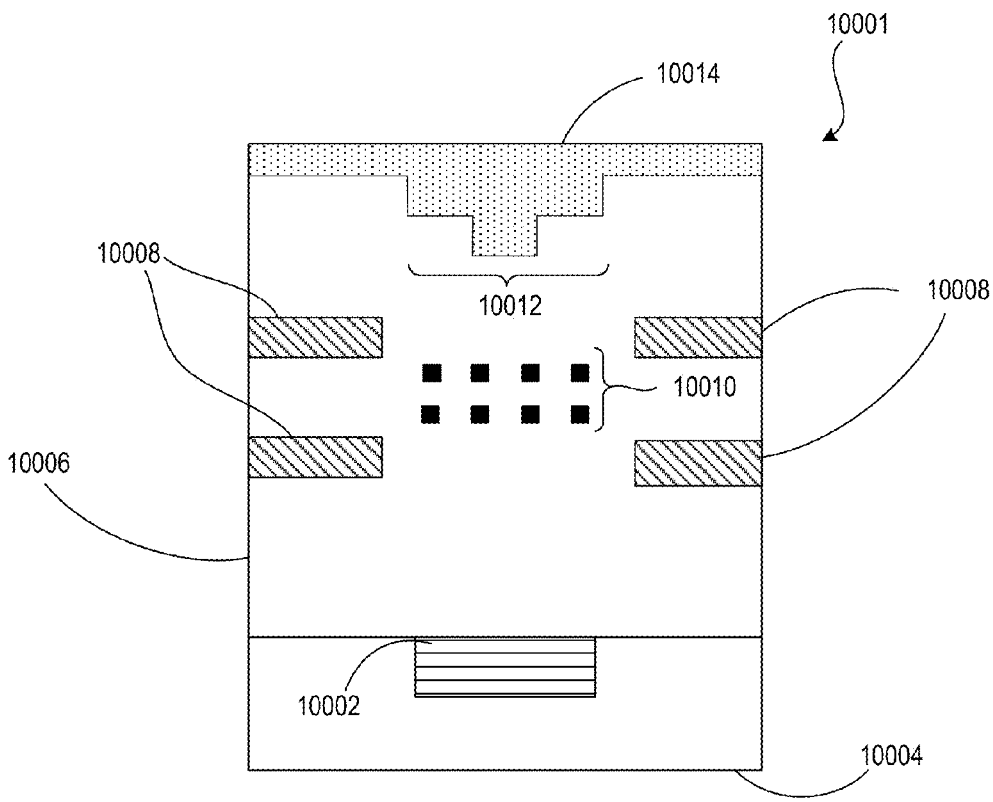

FIG. 296 shows a single, detector pixel of the detector of FIG. 295.

FIGS. 297-304 illustrate a variety of optical elements that may be included within detector pixels, according to an embodiment.

Figure 305:
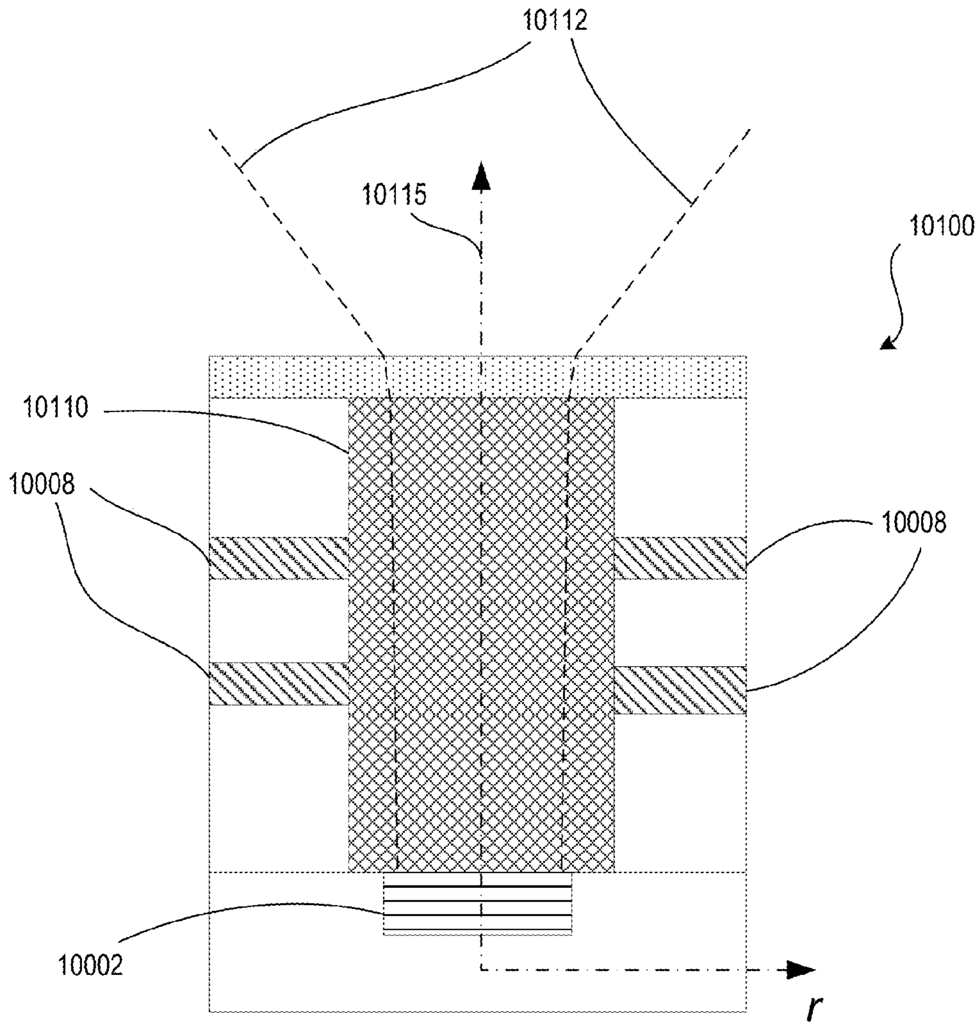
Figure 306:
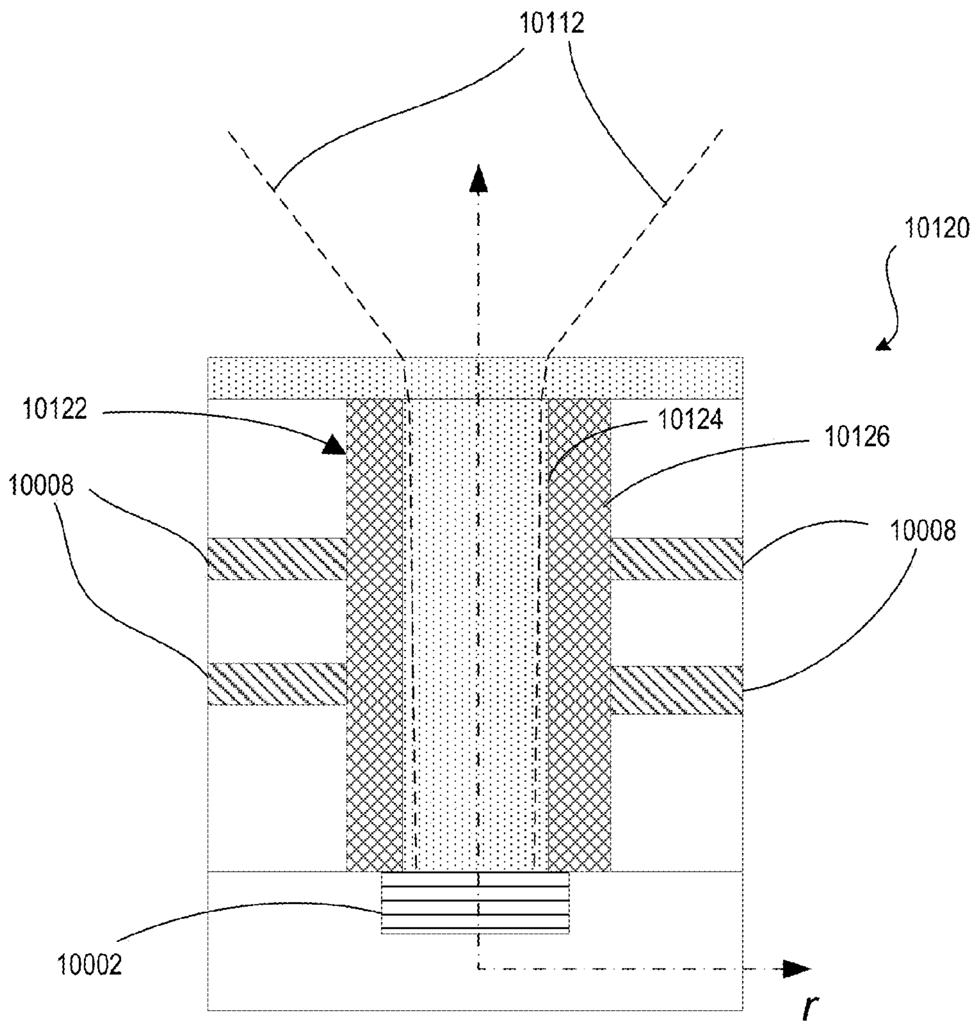

FIGS. 305 and 306 show two configurations of detector pixels including optical waveguides as the buried optical elements, according to an embodiment.

Figure 307:
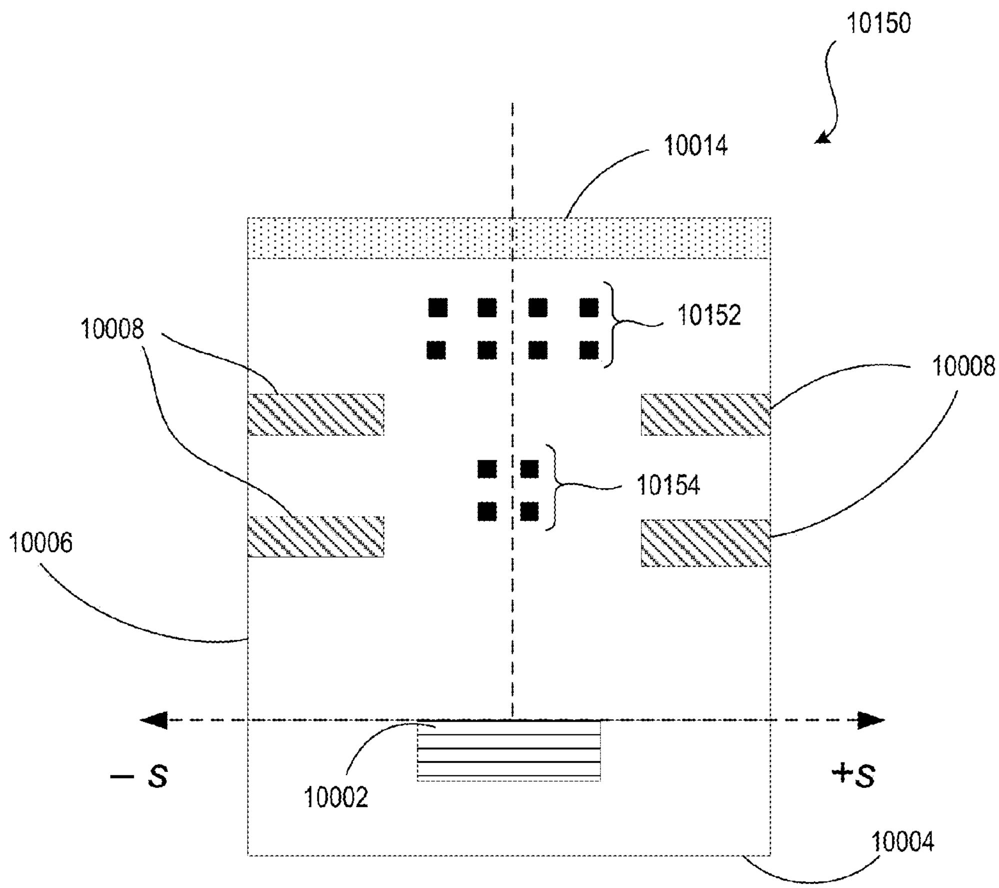

FIG. 307 shows an exemplary detector pixel including an optical relay configuration, according to an embodiment.

Figure 308:
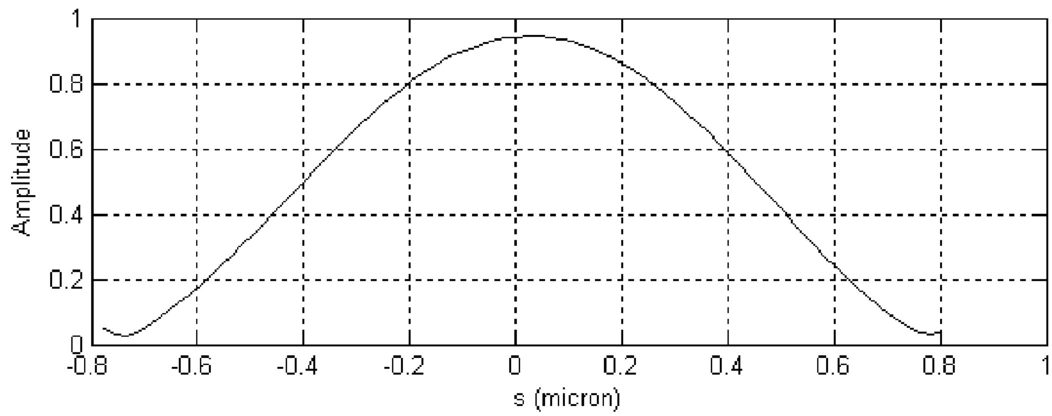
Figure 309:
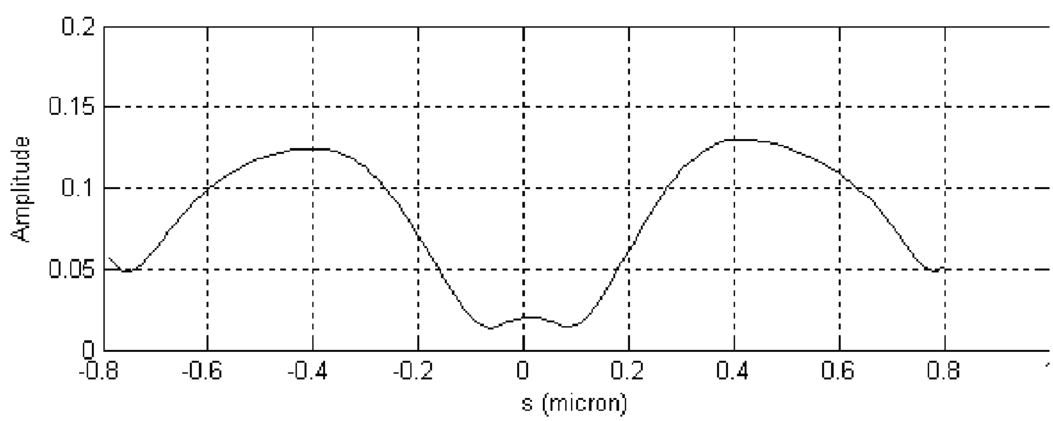

FIGS. 308 and 309 show cross-sections of electric field amplitude at a photosensitive region in a detector pixel for wavelengths of 0.5 and 0.25 microns, respectively.

Figure 310:
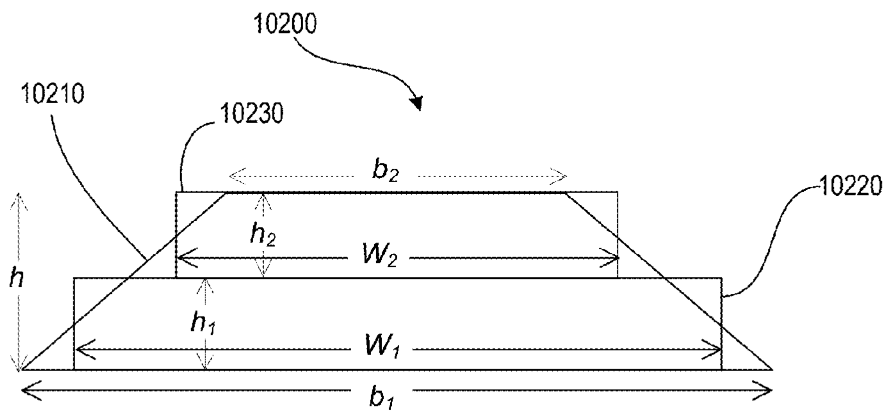

FIG. 310 shows a schematic diagram of a dual-slab configuration used to approximate a trapezoidal optical element.

Figure 311:
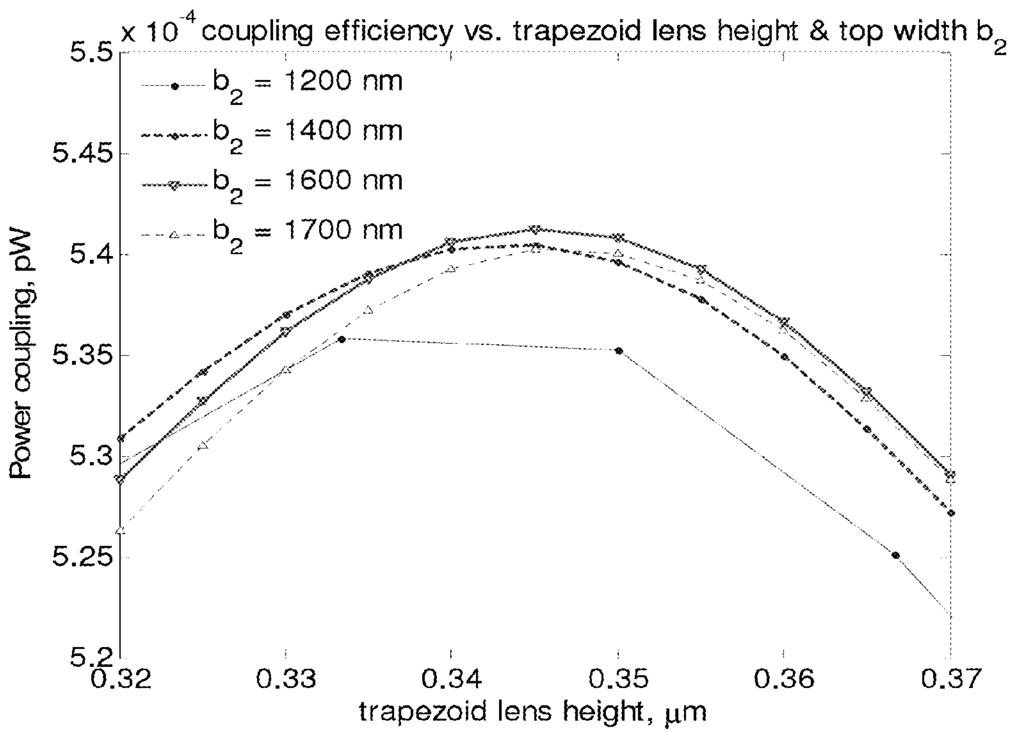

FIG. 311 shows numerical modeling results of power coupling efficiency for trapezoidal optical elements with various geometries.

Figure 312:
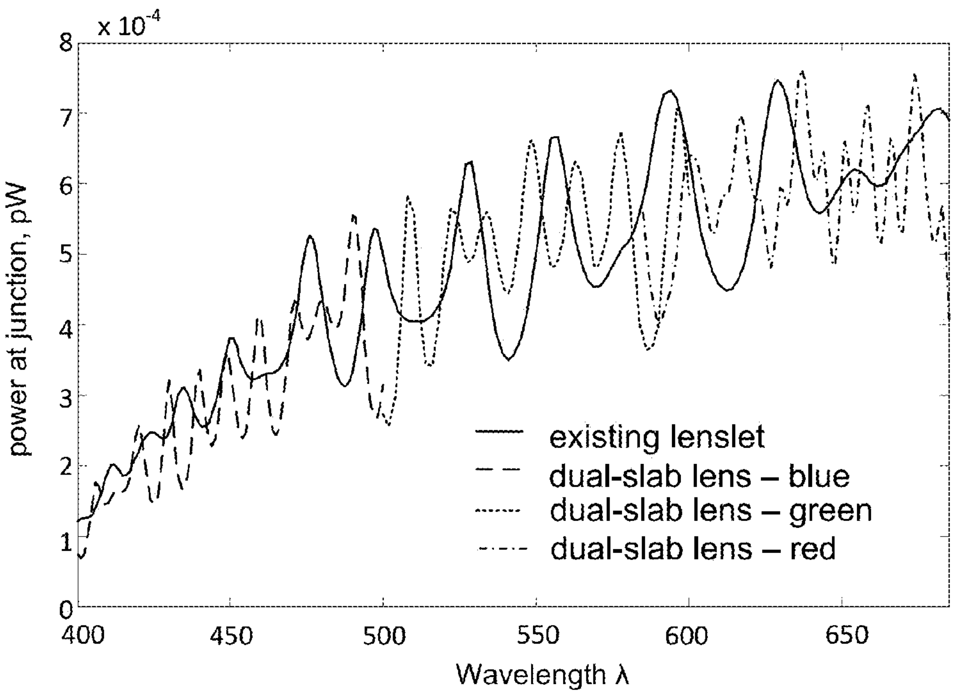

FIG. 312 is a composite plot showing a comparison of power coupling efficiencies for lenslet and dual-slab configurations over a range of wavelengths.

Figure 313:
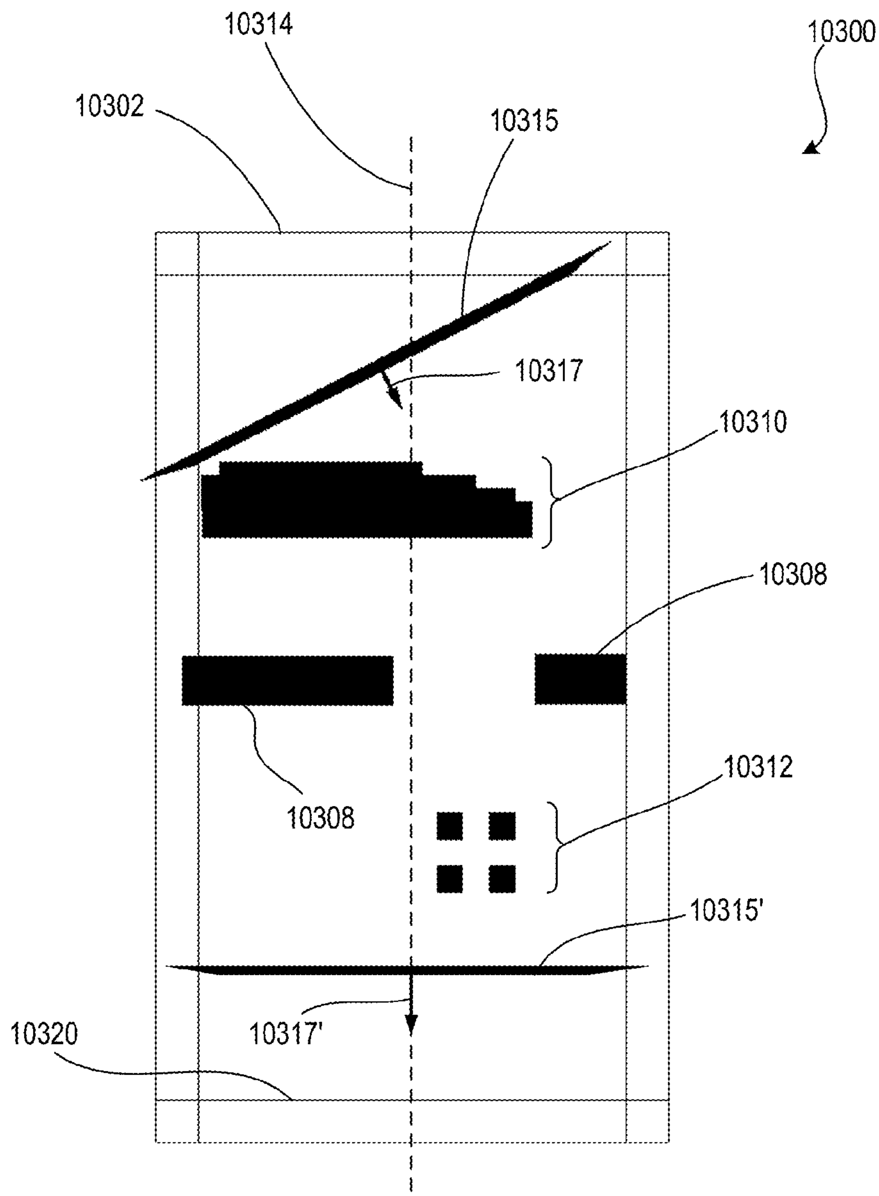

FIG. 313 shows a schematic diagram of a buried optical element configuration for chief ray angle ("CRA") correction, according to an embodiment.

Figure 314:
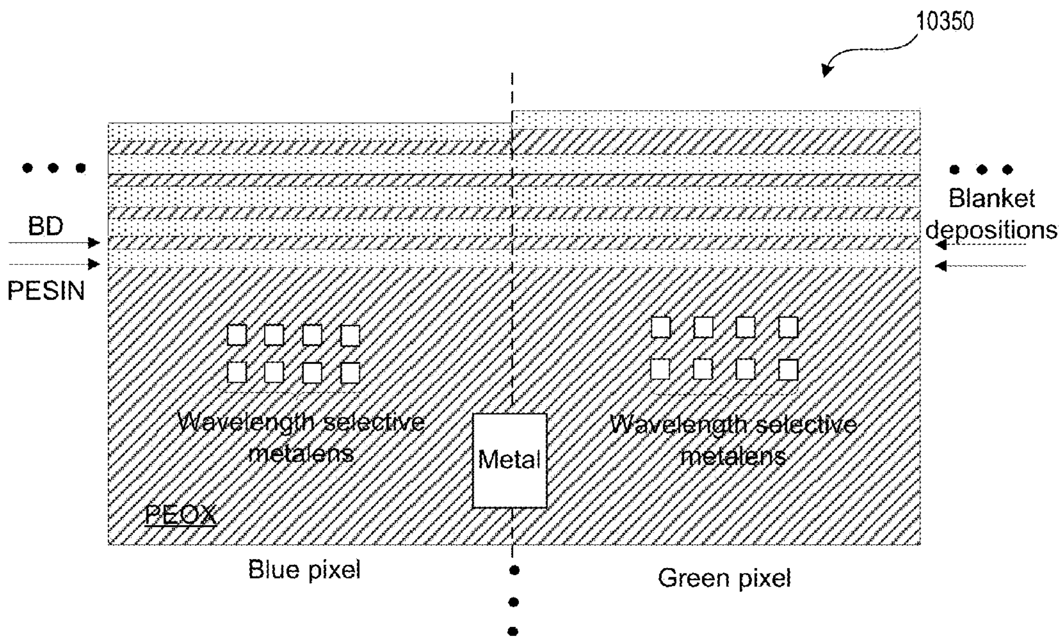

FIG. 314 shows a schematic diagram of a detector pixel configuration including buried optical elements for wavelength-selective filtering, according to an embodiment.

Figure 315:
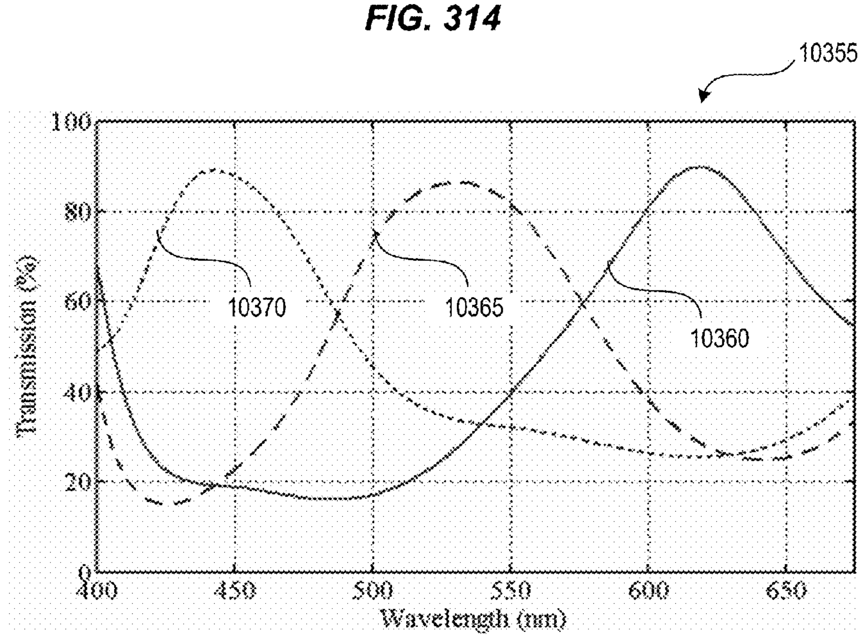

FIG. 315 shows numerical modeling results of transmission as a function of wavelength for different layer combinations in the pixel configuration of FIG. 314.

Figure 316:
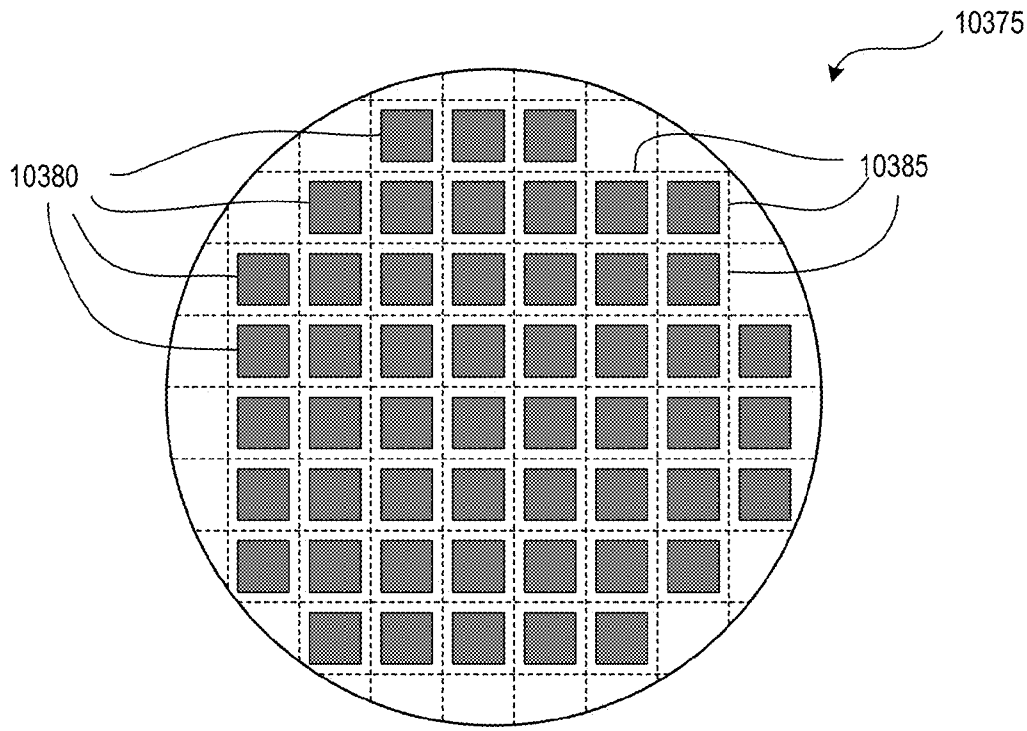

FIG. 316 shows a schematic diagram of an exemplary wafer including a plurality of detectors, according to an embodiment, shown here to illustrate separating lanes.

Figure 317:
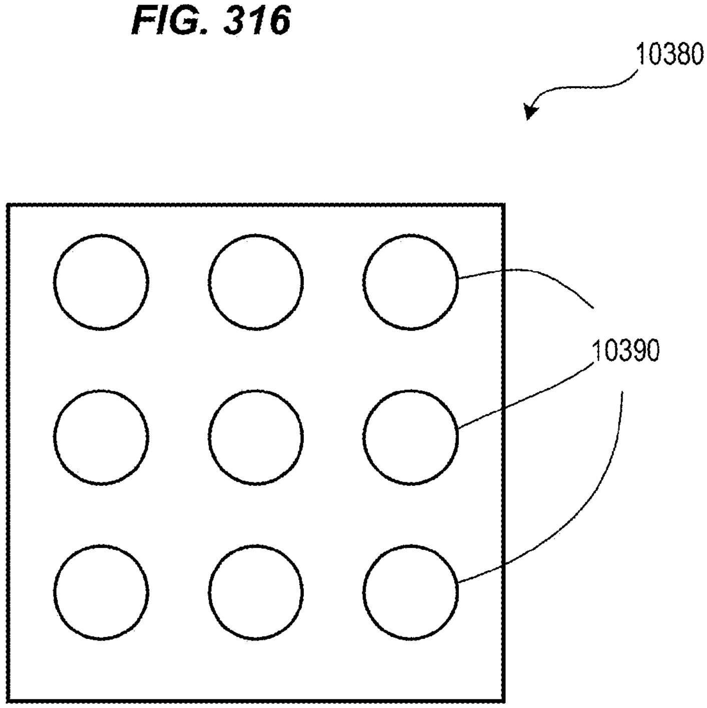

FIG. 317 shows a bottom view of an individual detector, shown here to illustrate bonding pads.

Figure 318:
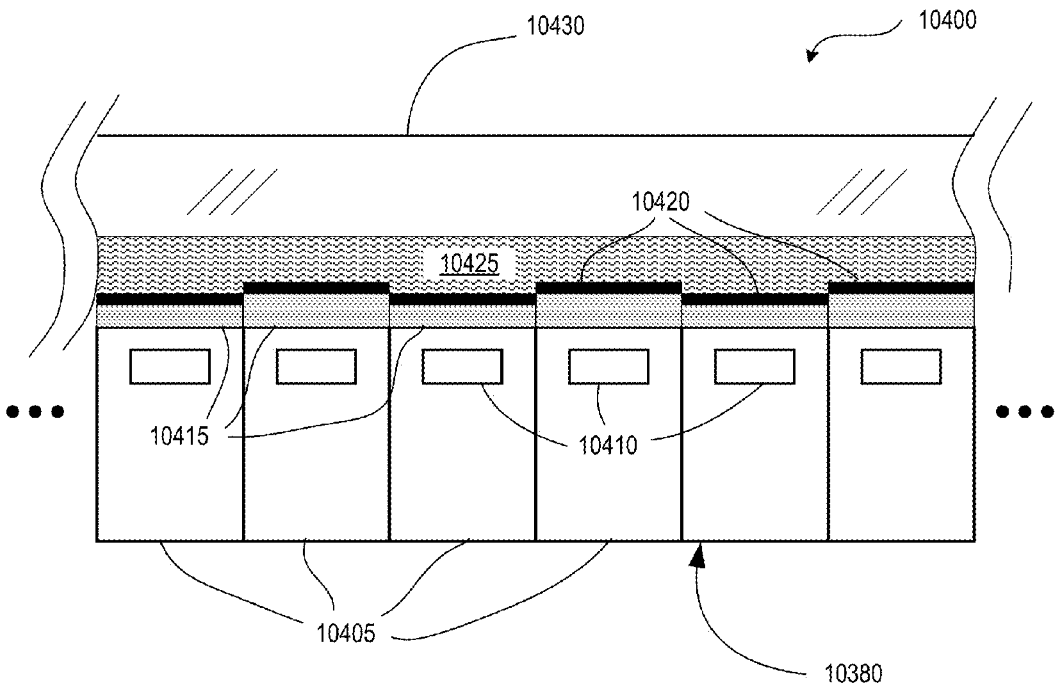

FIG. 318 shows a schematic diagram of a portion of an alternative detector, according to an embodiment, shown here to illustrate the addition of a planarization layer and a cover plate.

Figure 319:
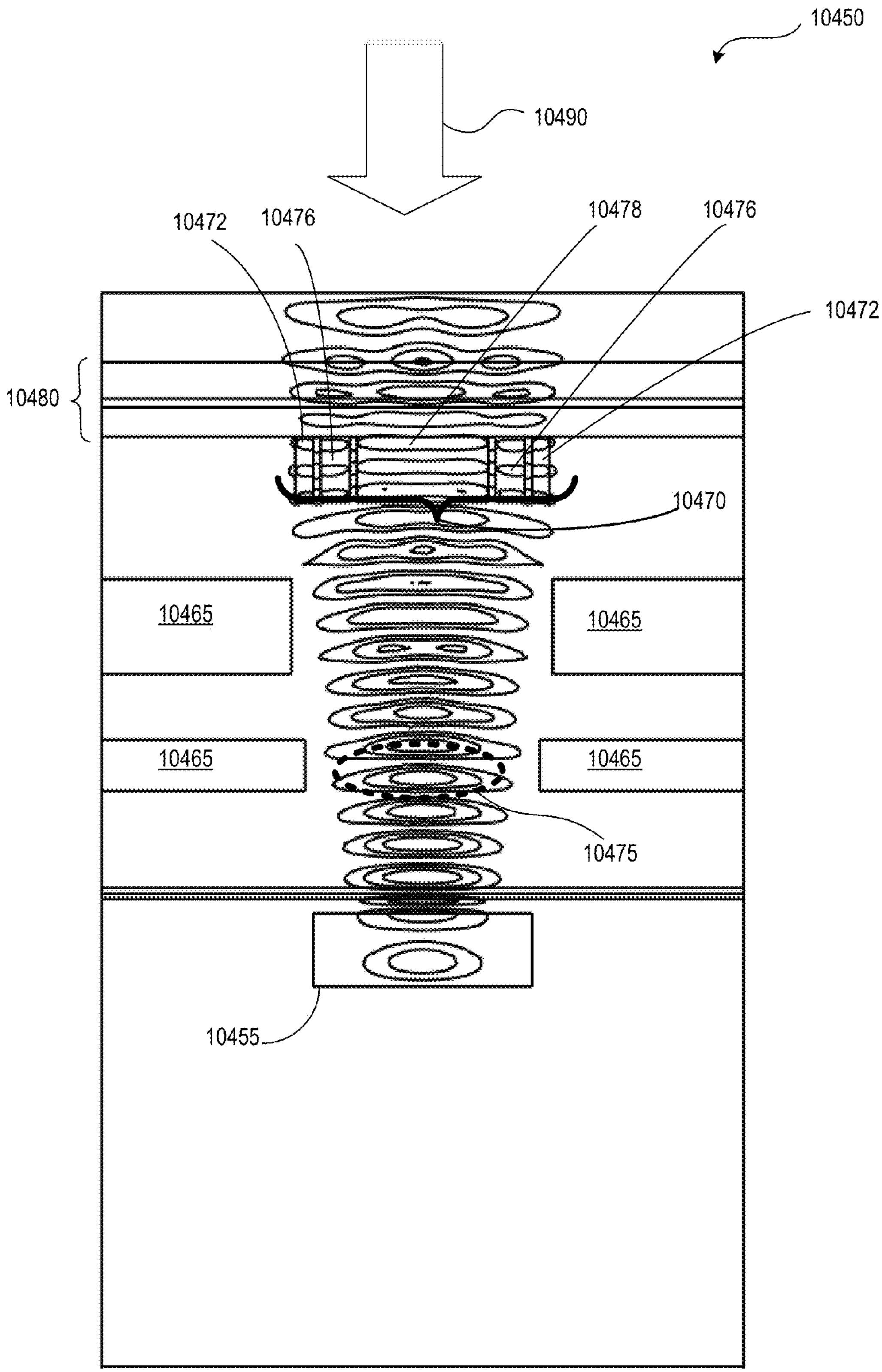

FIG. 319 shows a cross-sectional view of a detector pixel including a set of buried optical elements acting as a metalens, according to an embodiment.

Figure 320:
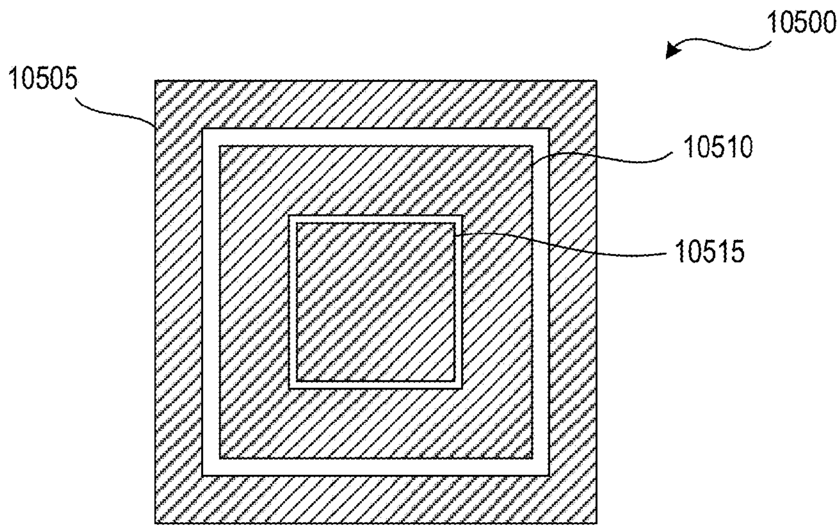

FIG. 320 shows a top view of the metalens of FIG. 319.

Figure 321:
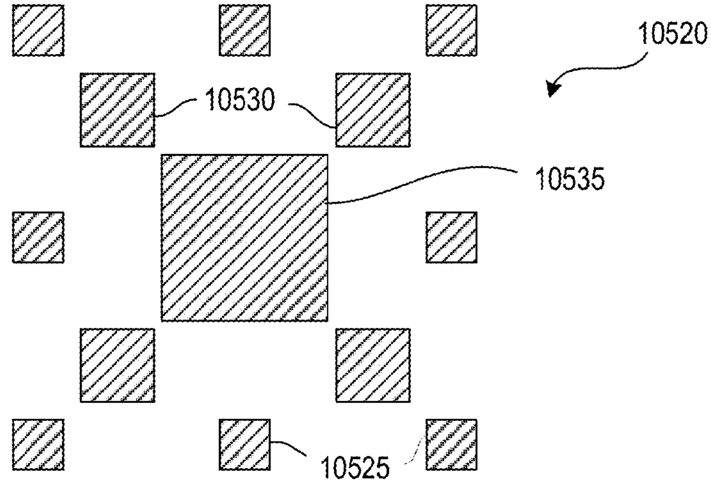

FIG. 321 shows a top view of another metalens suitable for use in the detector pixel of FIG. 319.

Figure 322:
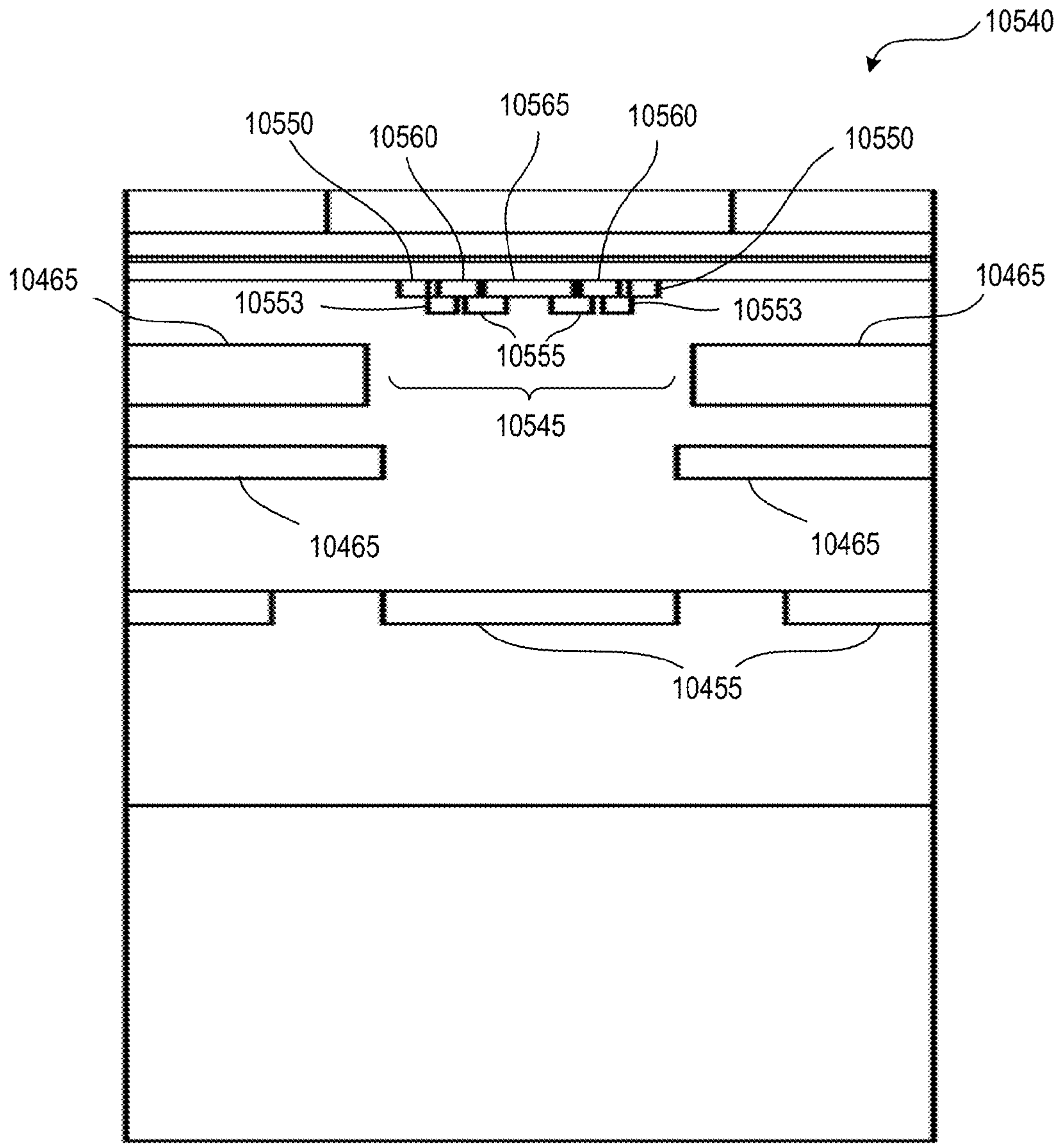

FIG. 322 shows a cross-sectional view of a detector pixel including a multilayered set of buried optical elements acting as a metalens, according to an embodiment.

Figure 323:
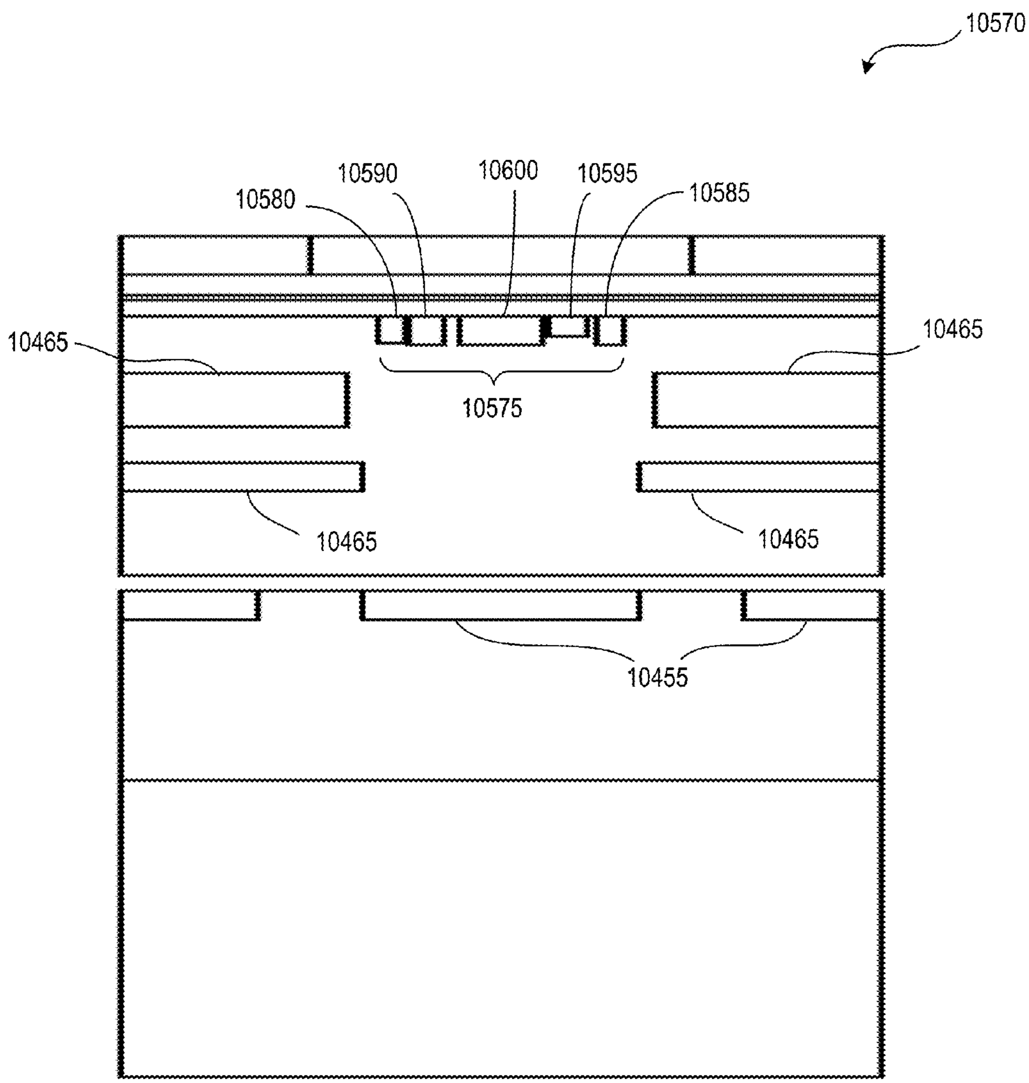

FIG. 323 shows a cross-sectional view of a detector pixel including an asymmetric set of buried optical elements acting as a metalens, according to an embodiment.

Figure 324:
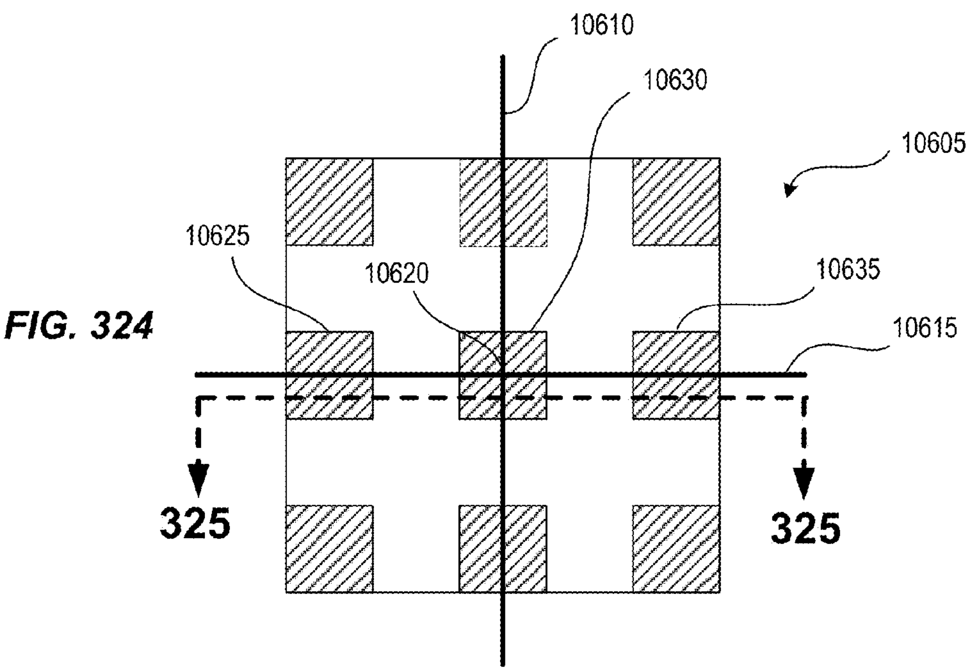

FIG. 324 shows a top view of another metalens suitable for use with detector pixel configurations, according to an embodiment.

Figure 325:
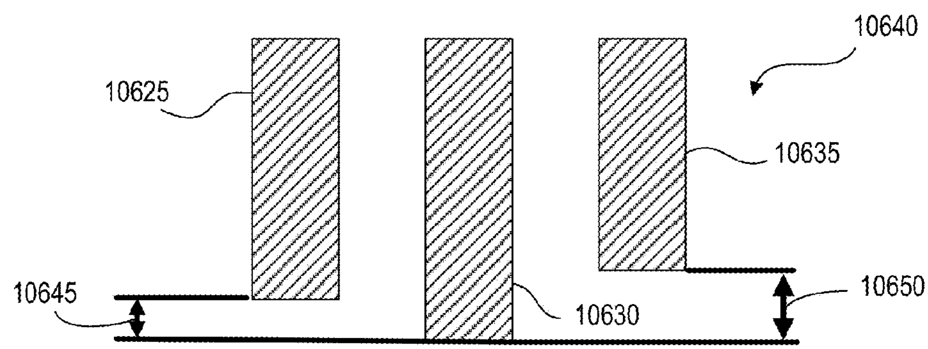
Figure 326:
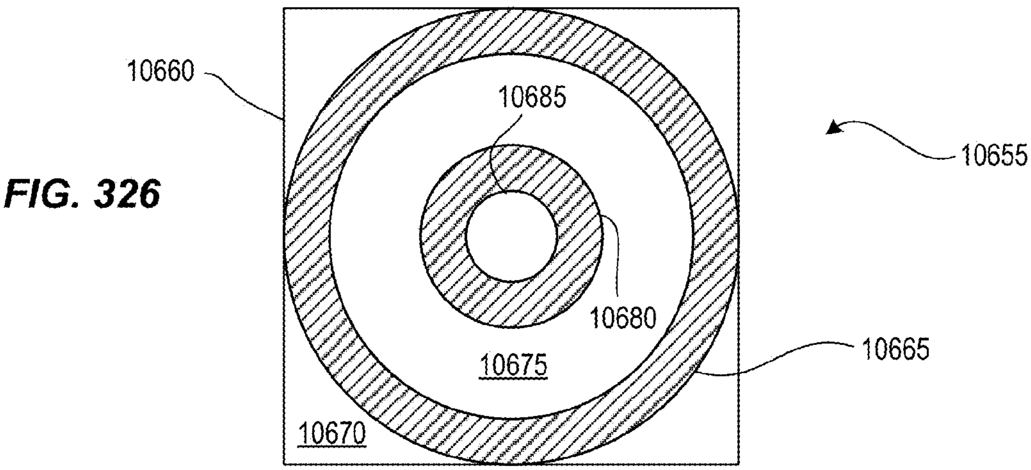

FIG. 325 shows a cross-sectional view of the metalens of FIG. 324.

FIGS. 326-330 show top views of alternative optical elements suitable for use with detector pixel configurations, according to an embodiment.

Figure 331:
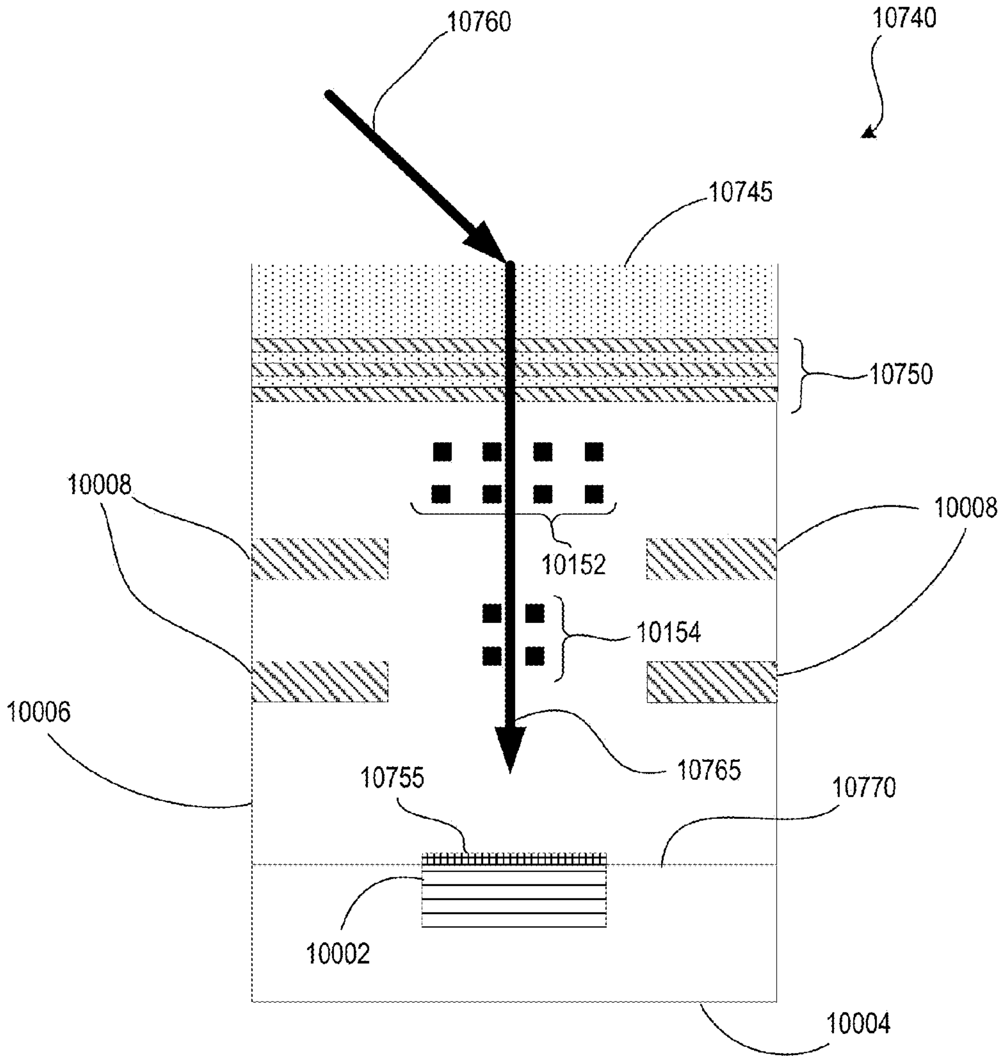

FIG. 331 shows a schematic diagram, in cross-section, of a detector pixel, according to an embodiment, shown here to illustrate additional features that may be included therein.

FIGS. 332-335 show examples of additional optical elements that may be incorporated into detector pixel configurations, according to an embodiment.

Figure 336:
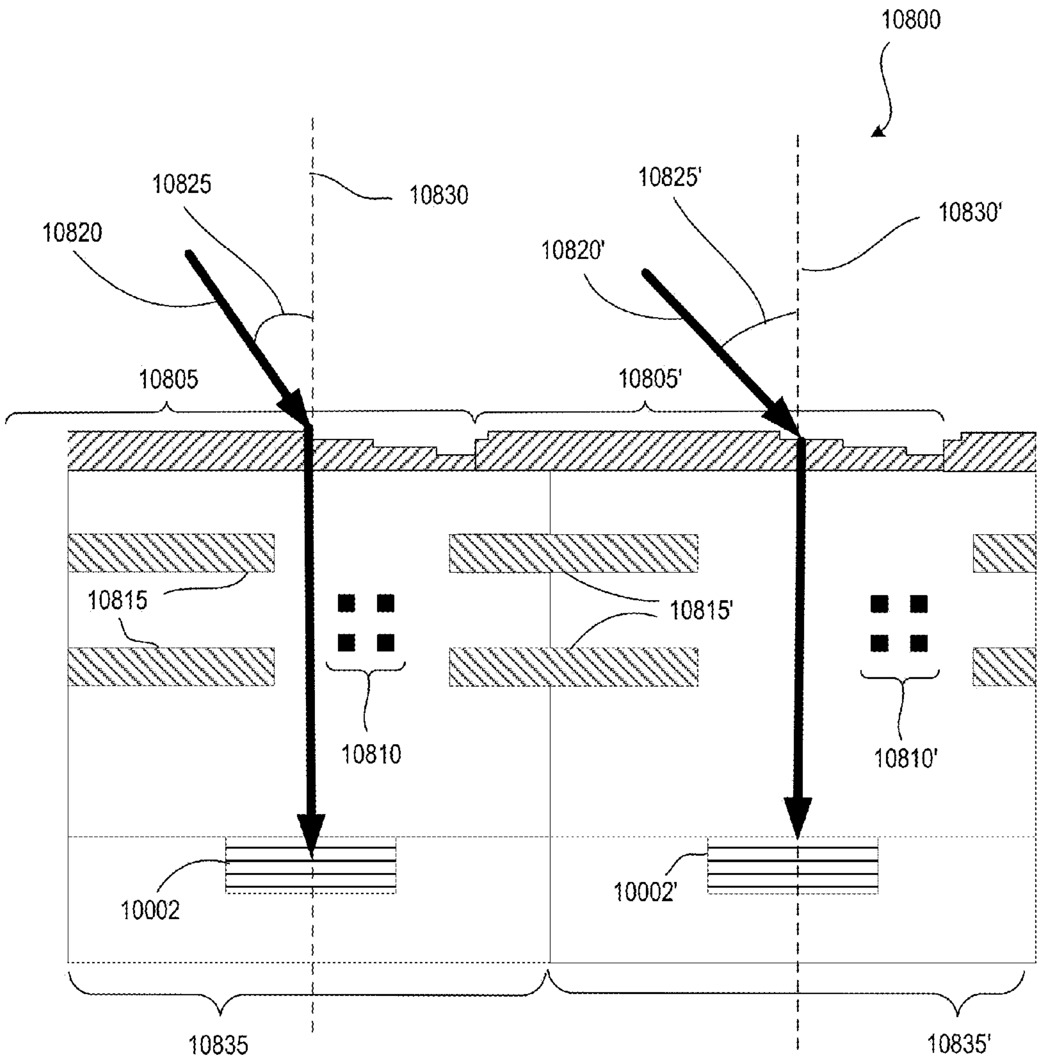

FIG. 336 shows a schematic diagram, in partial cross-section, of a detector including detector pixels with asymmetric features for CRA correction.

Figure 337:
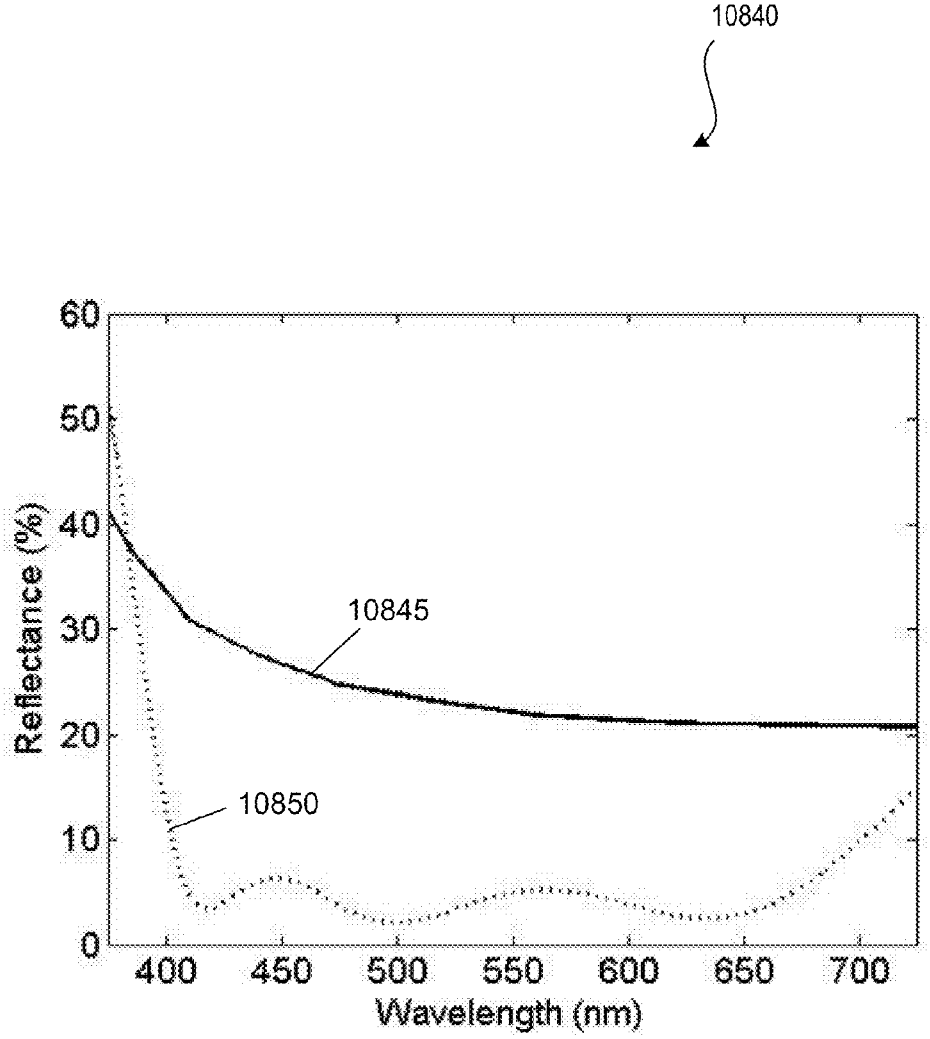

FIG. 337 shows a plot comparing the calculated reflectances of uncoated and anti-reflection (AR) coated silicon photosensitive regions of a detector pixel, according to an embodiment.

Figure 338:
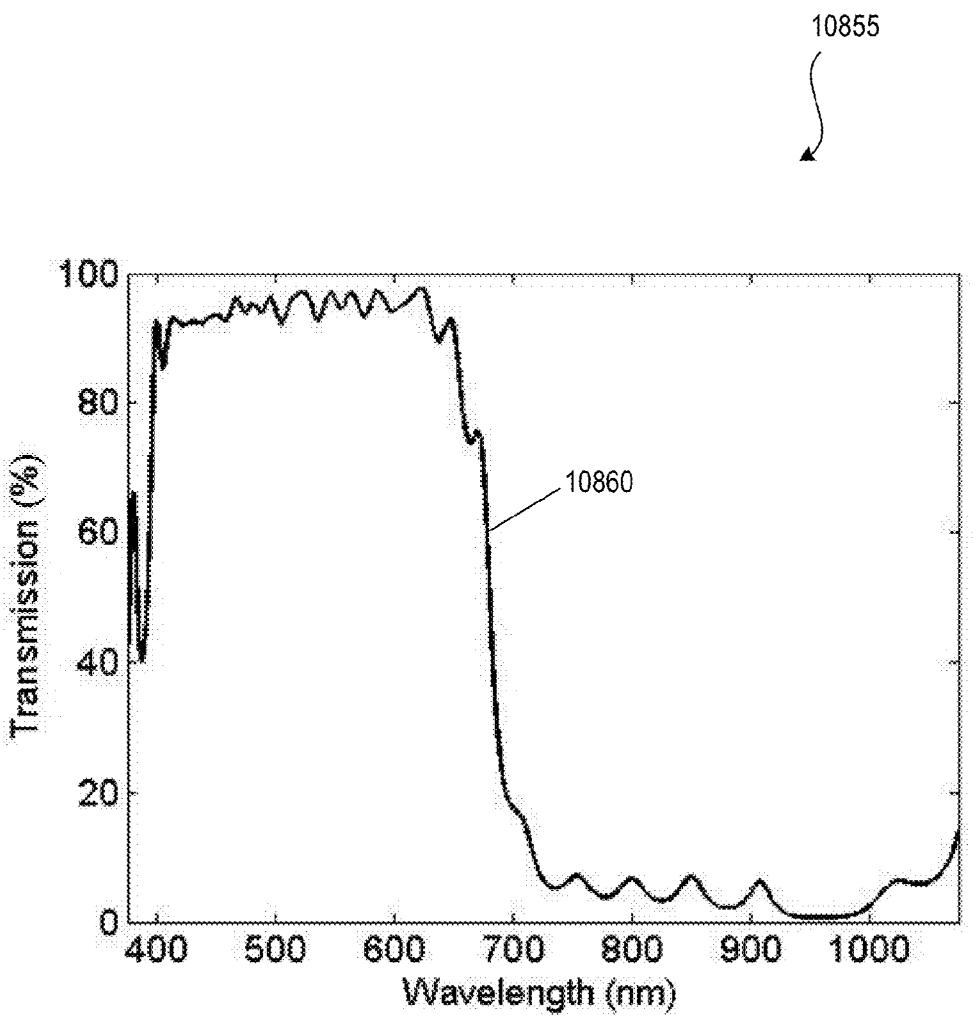

FIG. 338 shows a plot of the calculated transmission characteristics of an infrared (IR)-cut filter, according to an embodiment.

Figure 339:
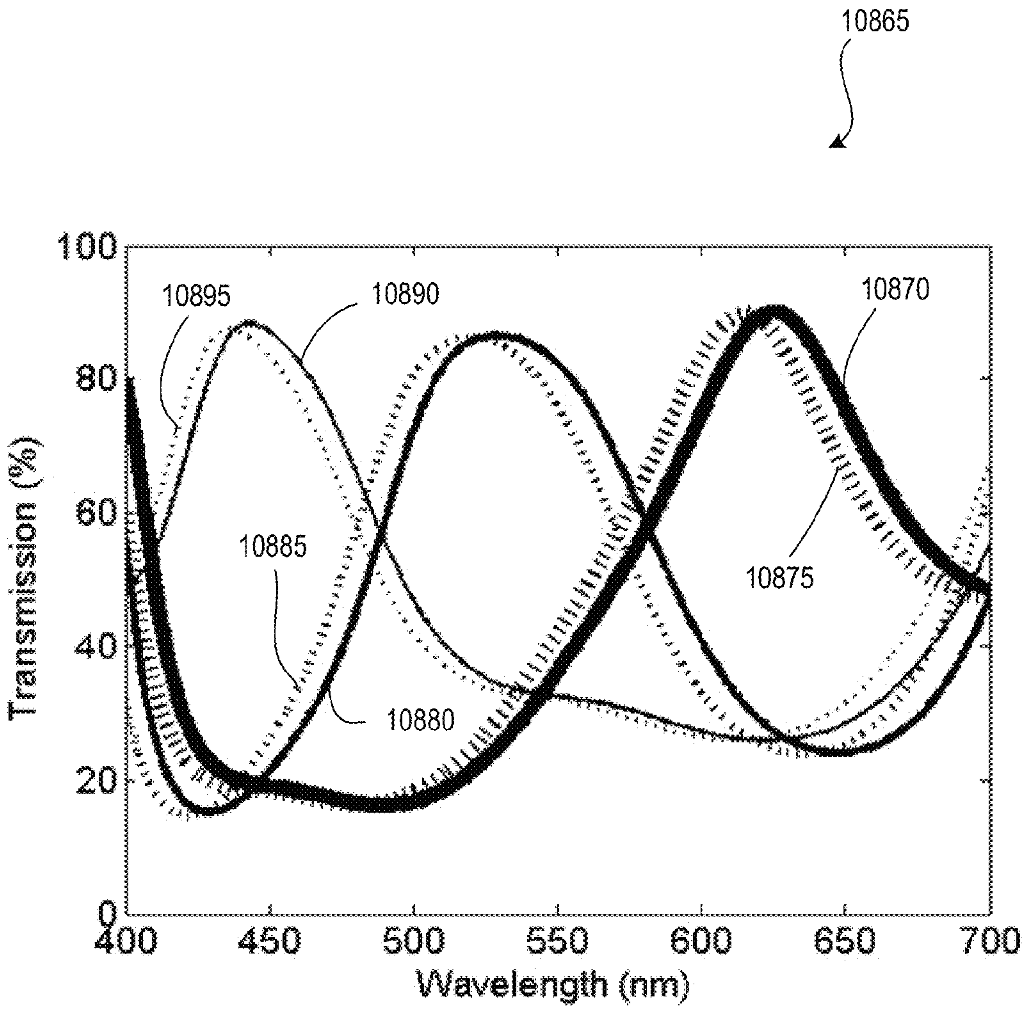

FIG. 339 shows a plot of the calculated transmission characteristics of a red-green-blue (RGB) color filter, according to an embodiment.

Figure 340:
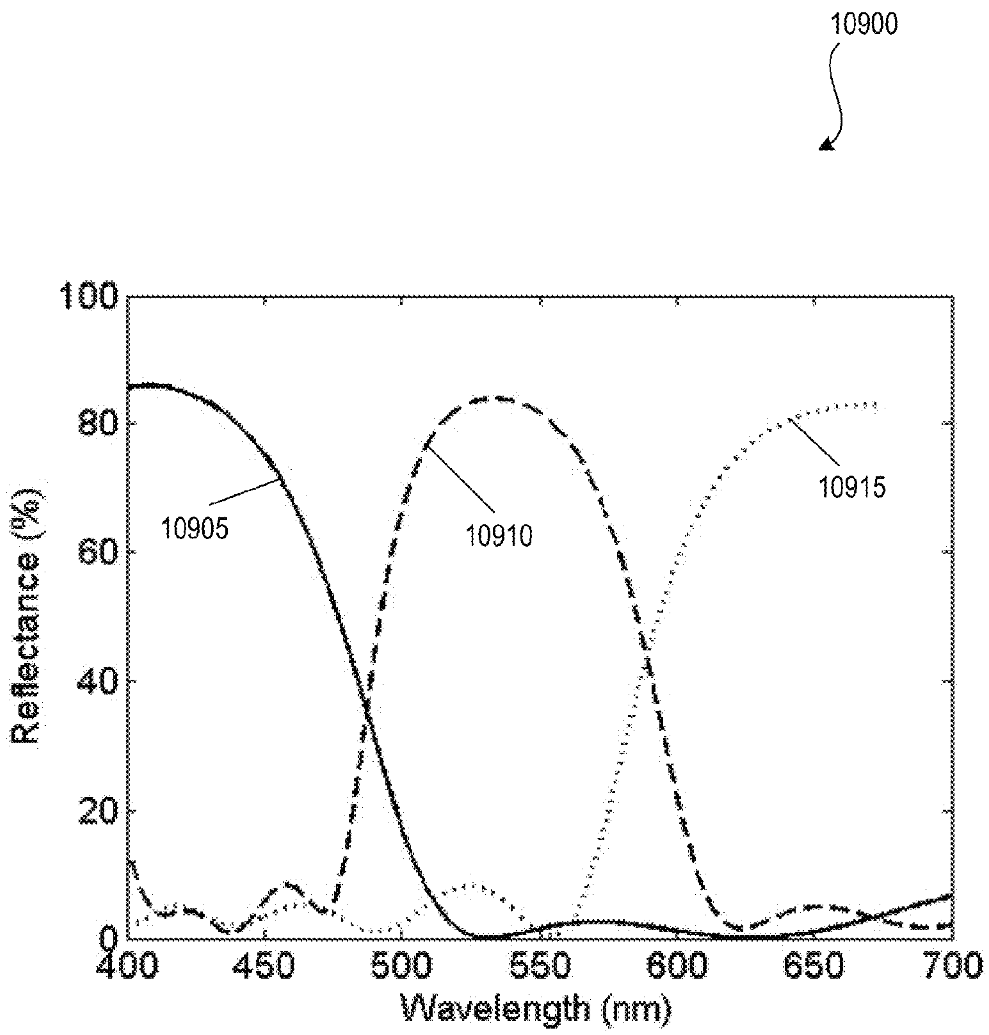

FIG. 340 shows a plot of the calculated reflectance characteristics of a cyan-magenta-yellow (CMY) color filter, according to an embodiment.

Figure 341:
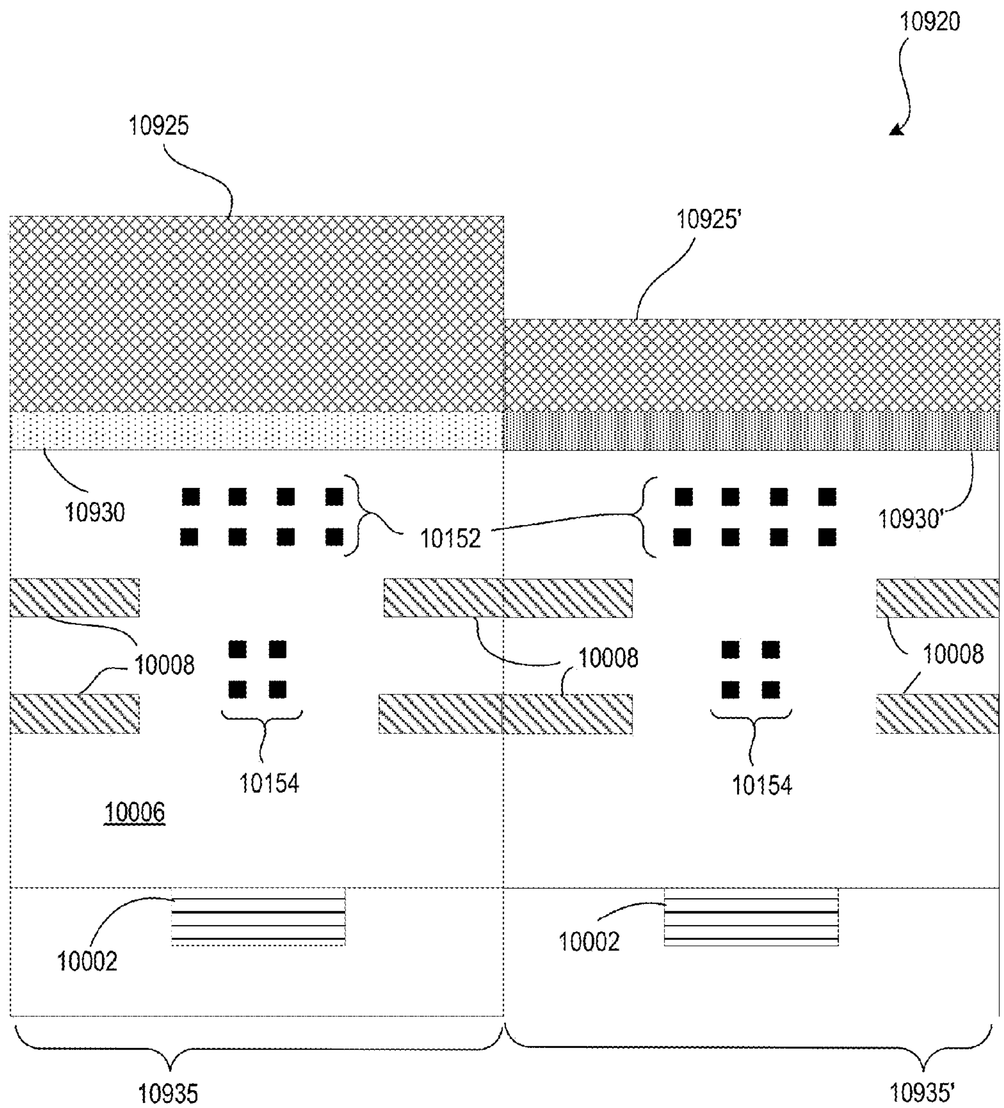

FIG. 341 shows two pixels of an array of detector pixels, in cross-section, illustrating features allowing for customization of a layer optical index.

Figure 342:
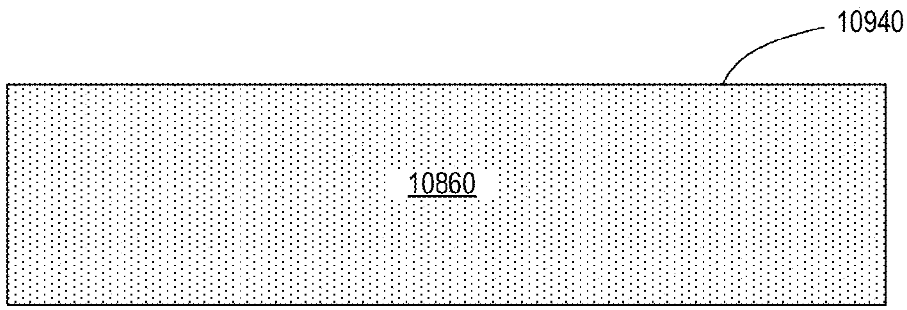
Figure 343:
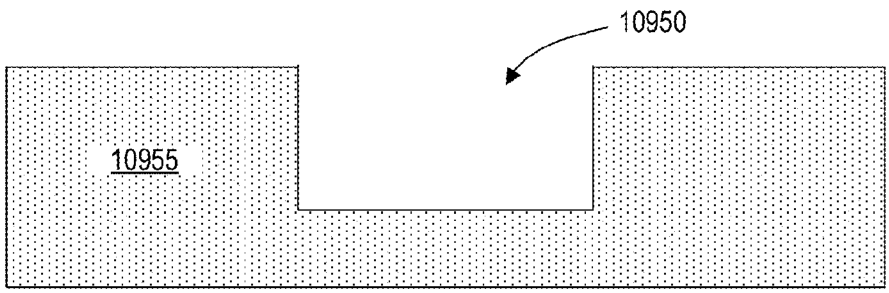
Figure 344:
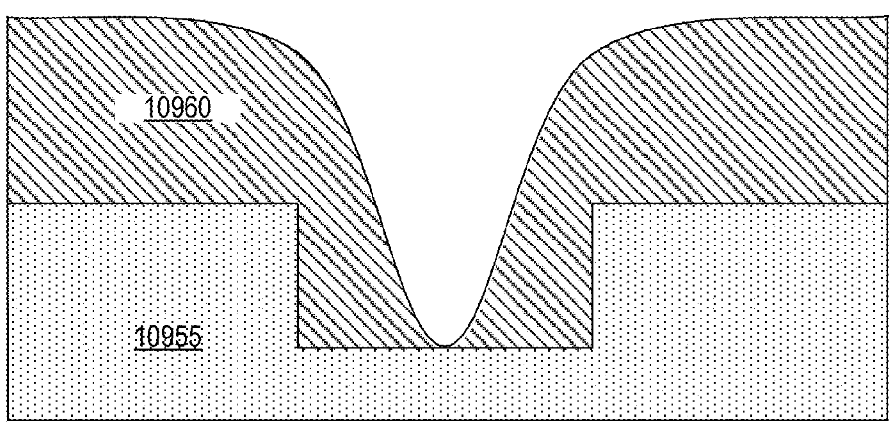

FIGS. 342-344 illustrate a series of processing steps to yield a non-planar surface that may be incorporated into buried optical elements, according to an embodiment.

Figure 345:
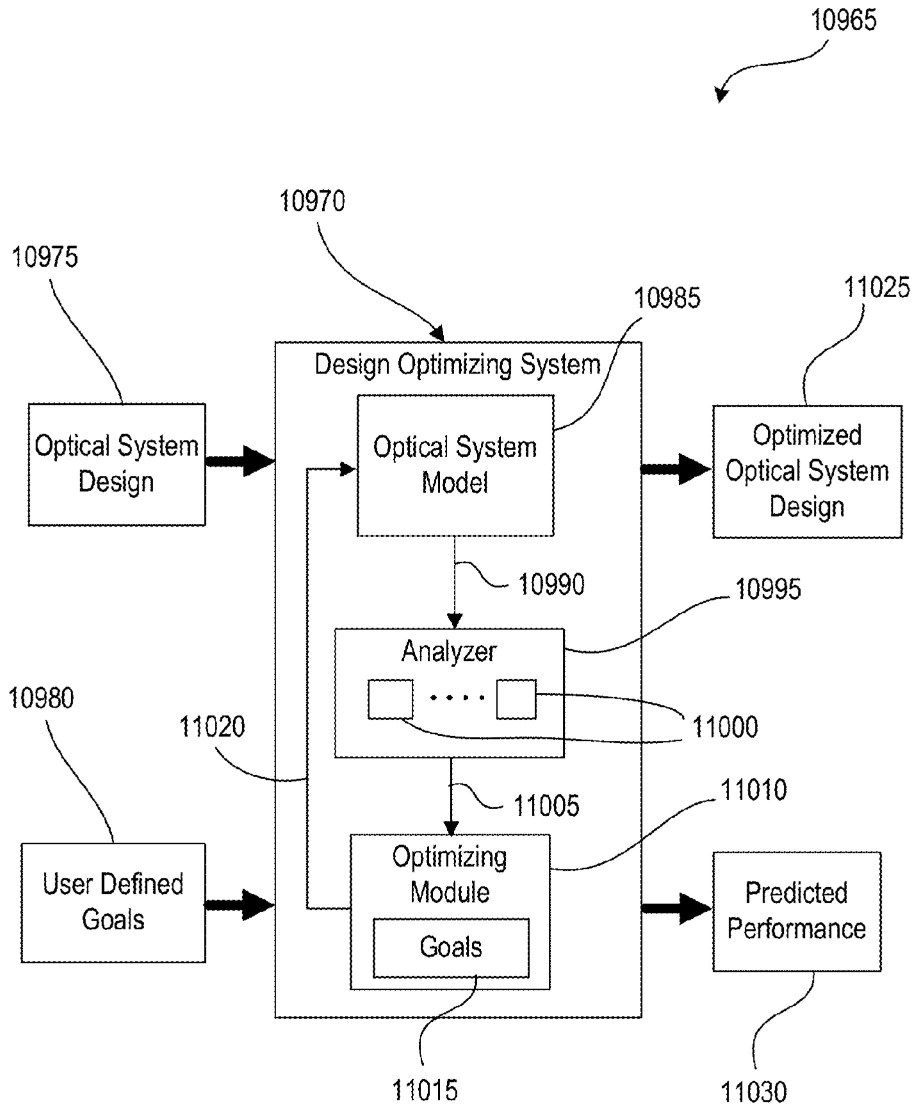

FIG. 345 is a block diagram showing a system for the optimization of an imaging system.

Figure 346:
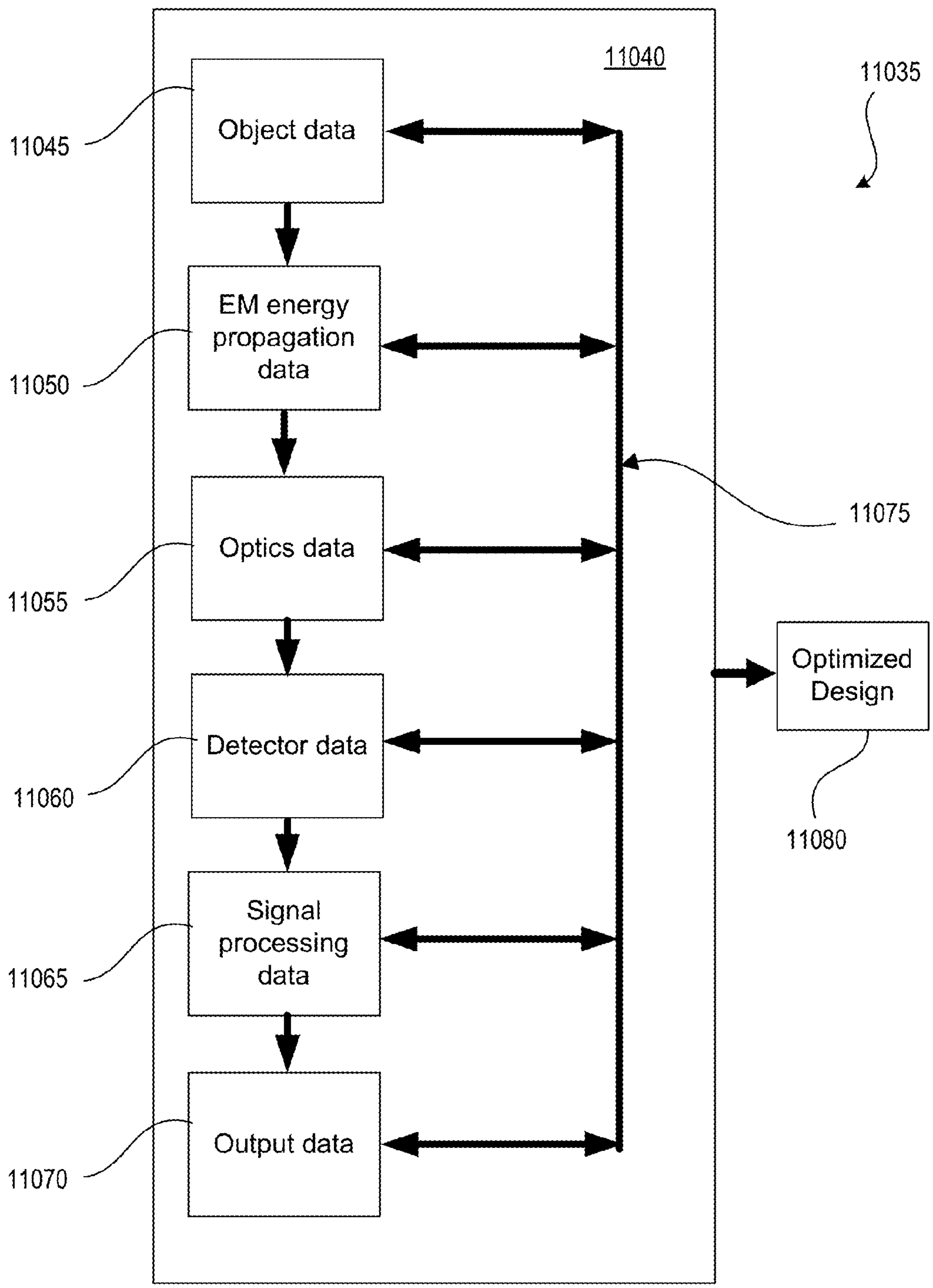

FIG. 346 is a flowchart showing an exemplary optimization process for performing a system-wide joint optimization, according to an embodiment.

Figure 347:
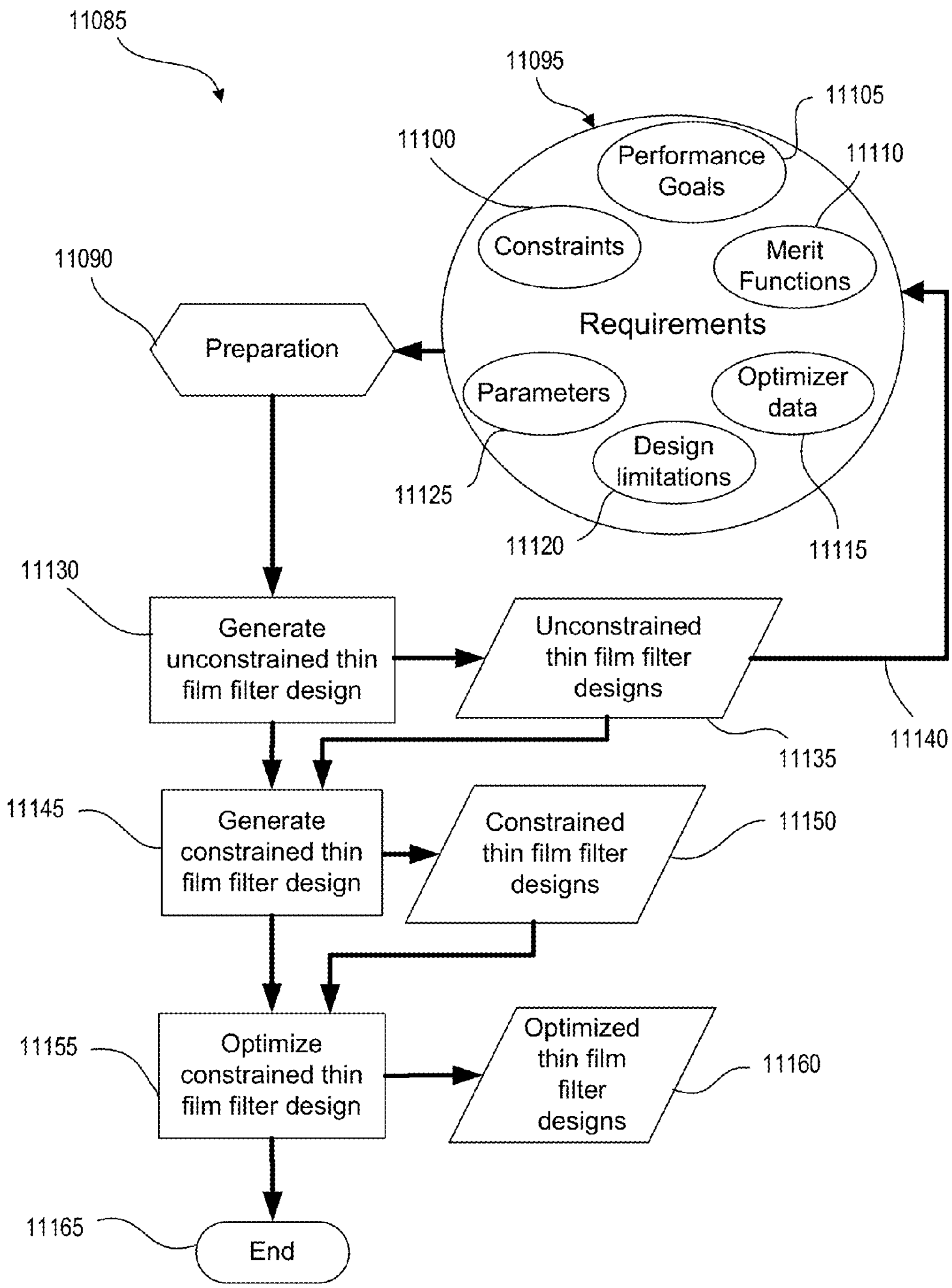

FIG. 347 shows a flowchart for a process for generating and optimizing thin film filter set designs, according to an embodiment.

Figure 348:
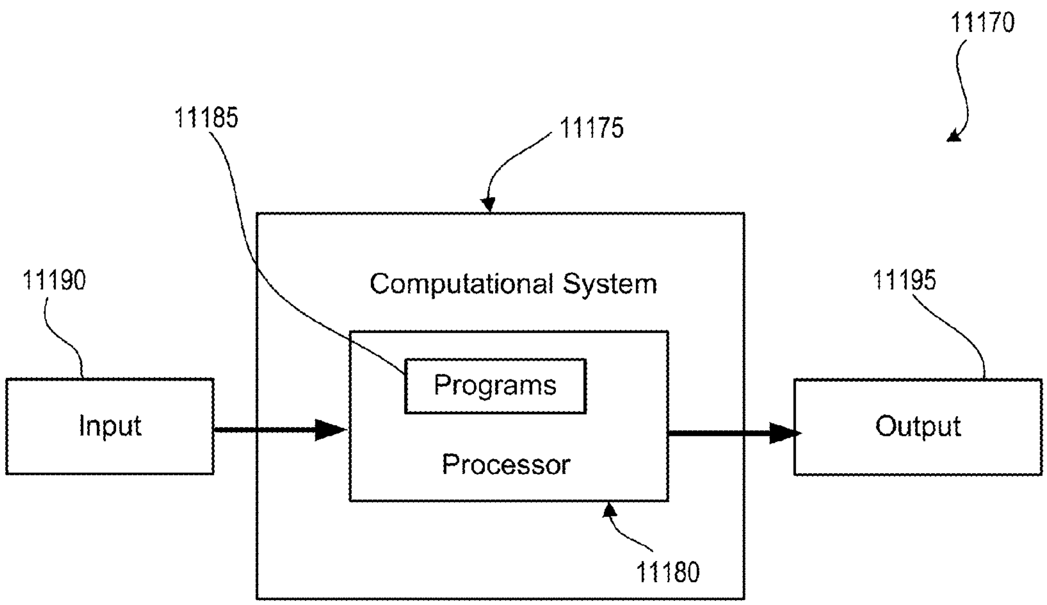

FIG. 348 shows a block diagram of a thin film filter set design system including a computational system with inputs and outputs, according to an embodiment.

Figure 349:
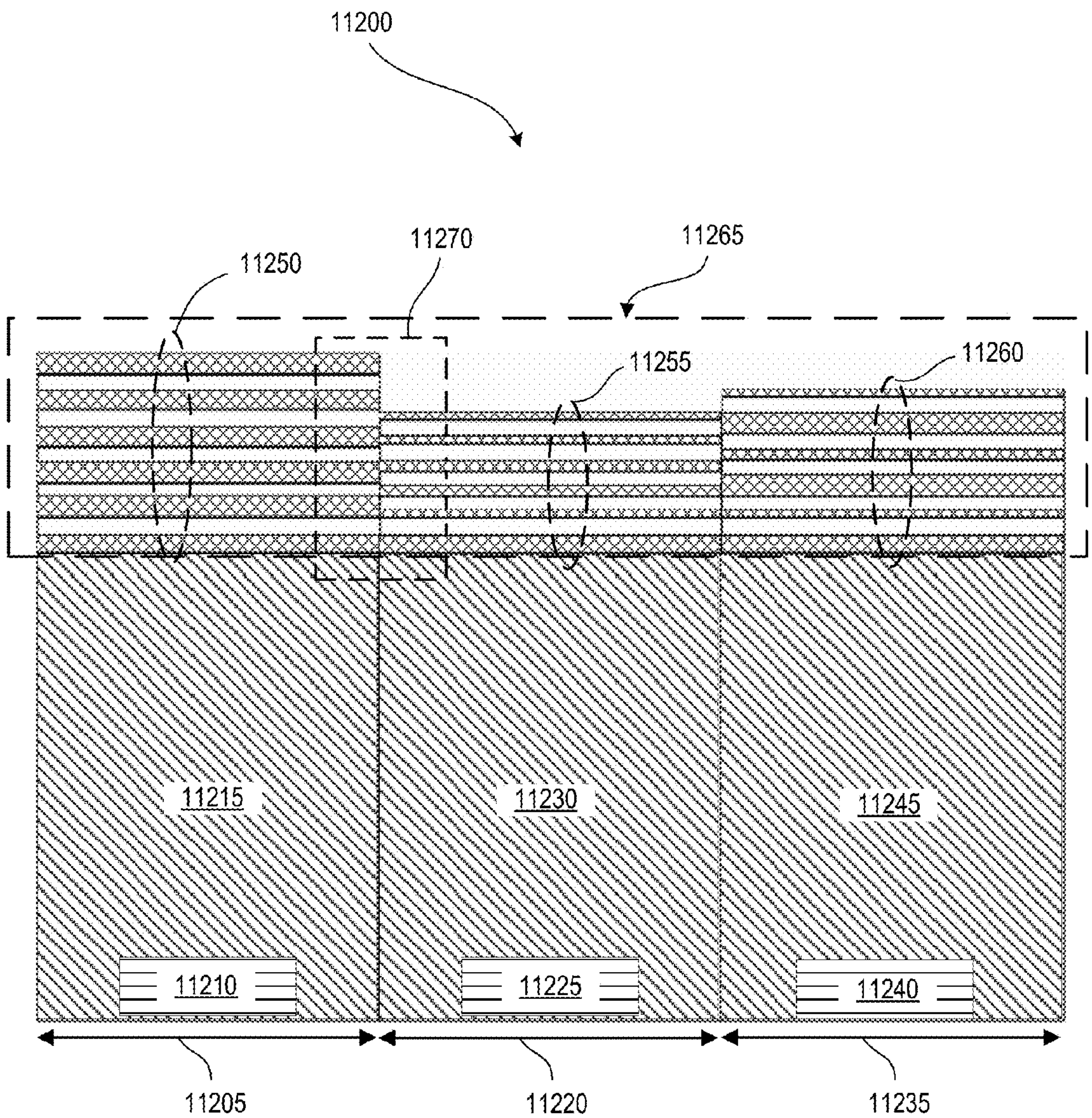

FIG. 349 shows a cross-sectional illustration of an array of detector pixels including thin film color filters, according to an embodiment.

Figure 350:
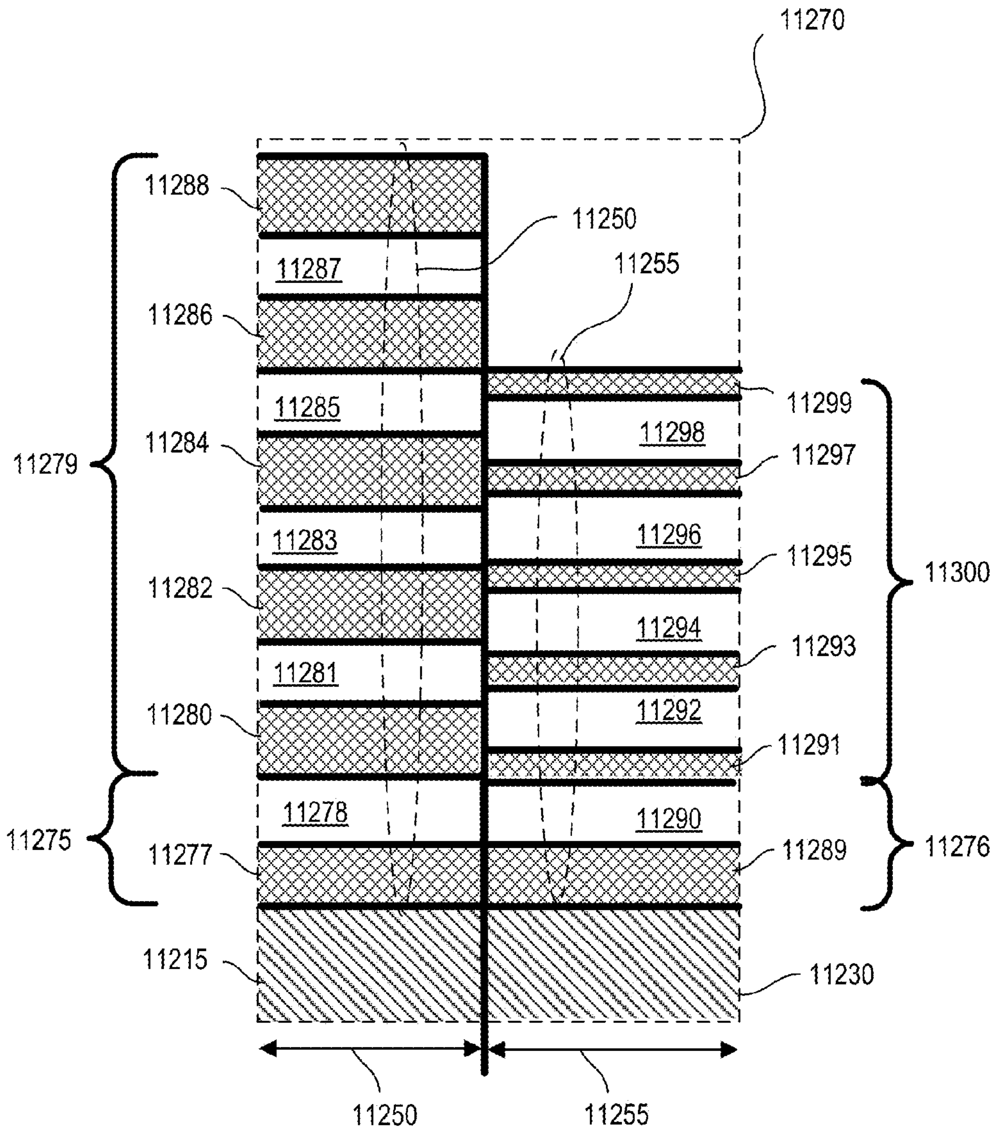

FIG. 350 shows a subsection of FIG. 349, shown here to illustrate details of the thin film layer structures in the thin film filters, according to an embodiment.

Figure 351:
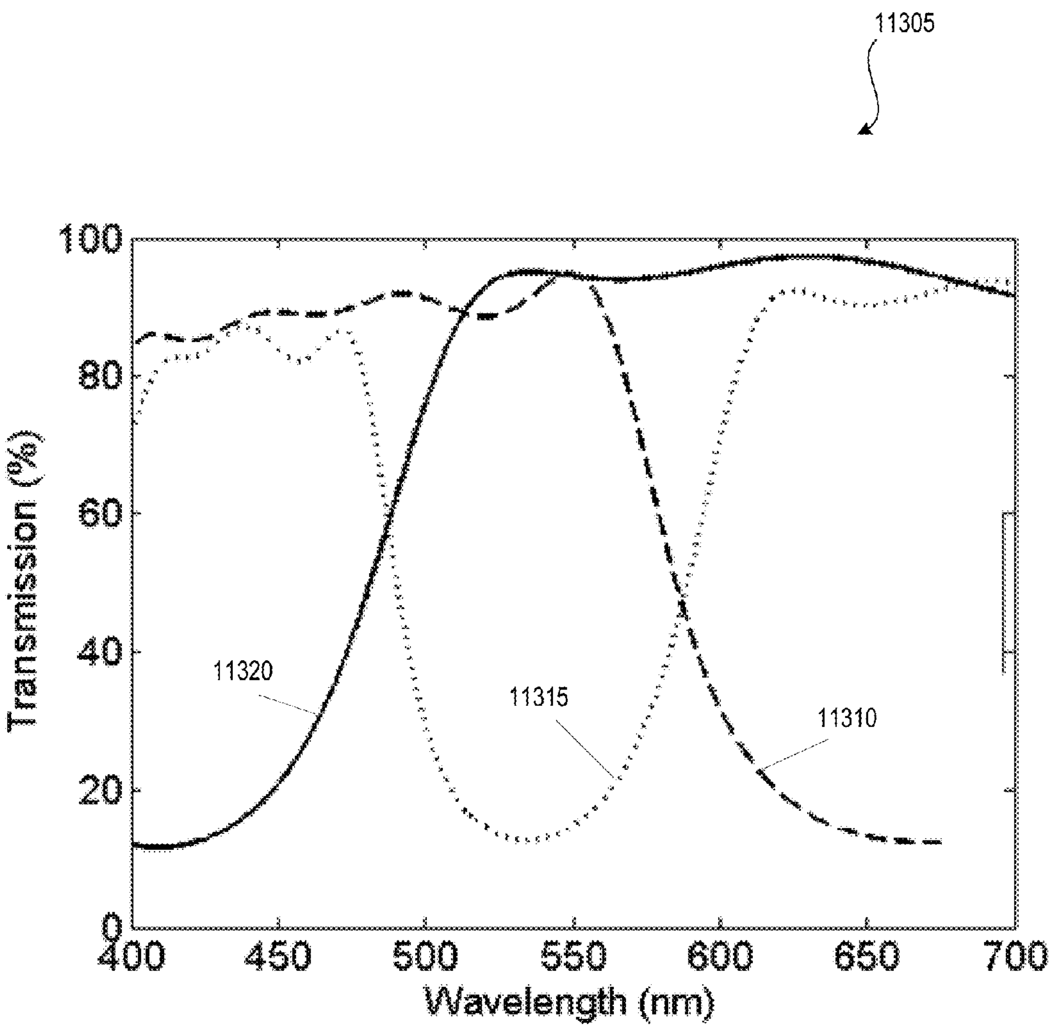

FIG. 351 shows a plot of the transmission characteristics of independently optimized cyan, magenta and yellow (CMY) color filter designs, according to an embodiment.

Figure 352:
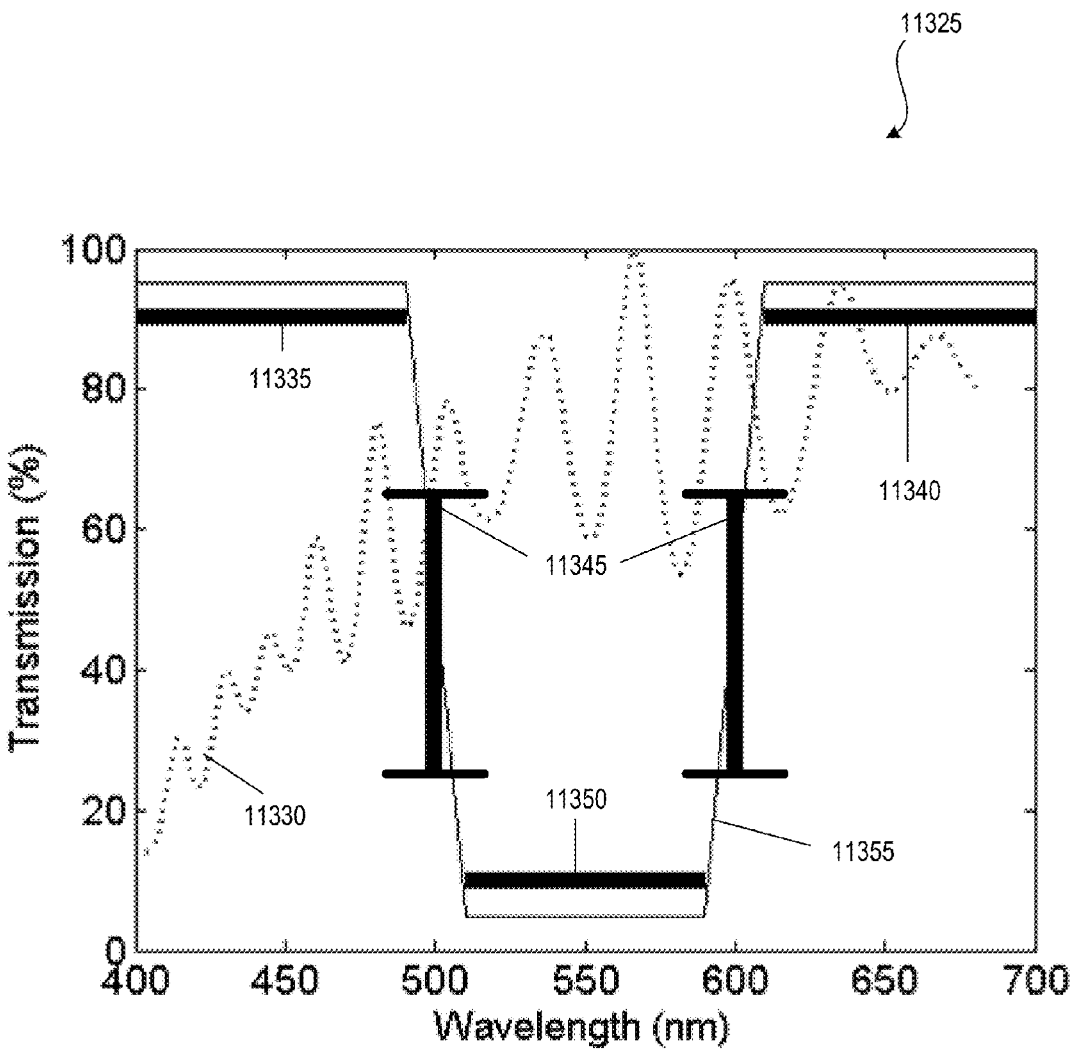

FIG. 352 shows a plot of the performance goals and tolerances for optimizing a magenta color filter, according to an embodiment.

Figure 353:
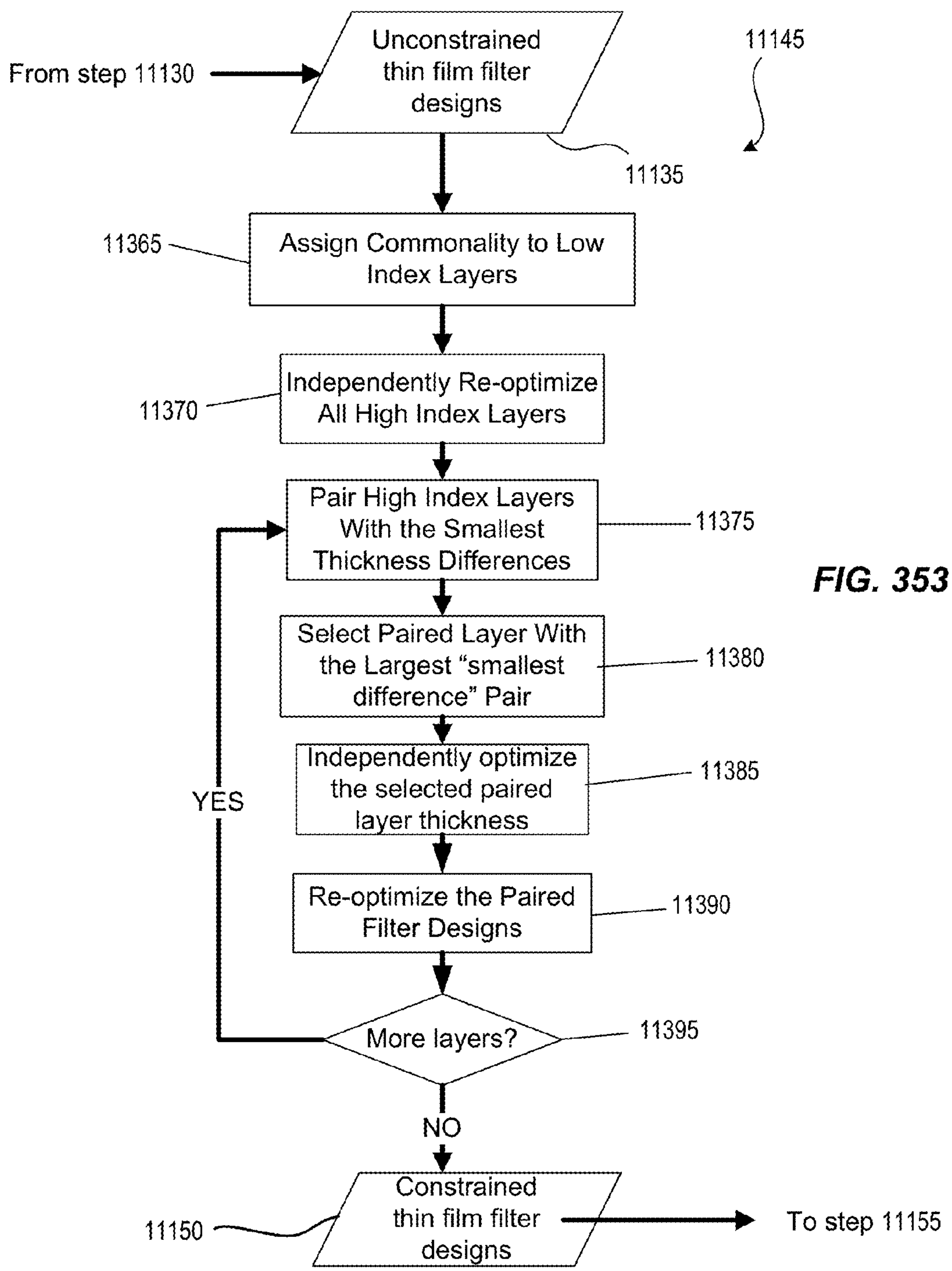

FIG. 353 is a flowchart illustrating further details of one of the steps of the process shown in FIG. 347, according to an embodiment.

Figure 354:
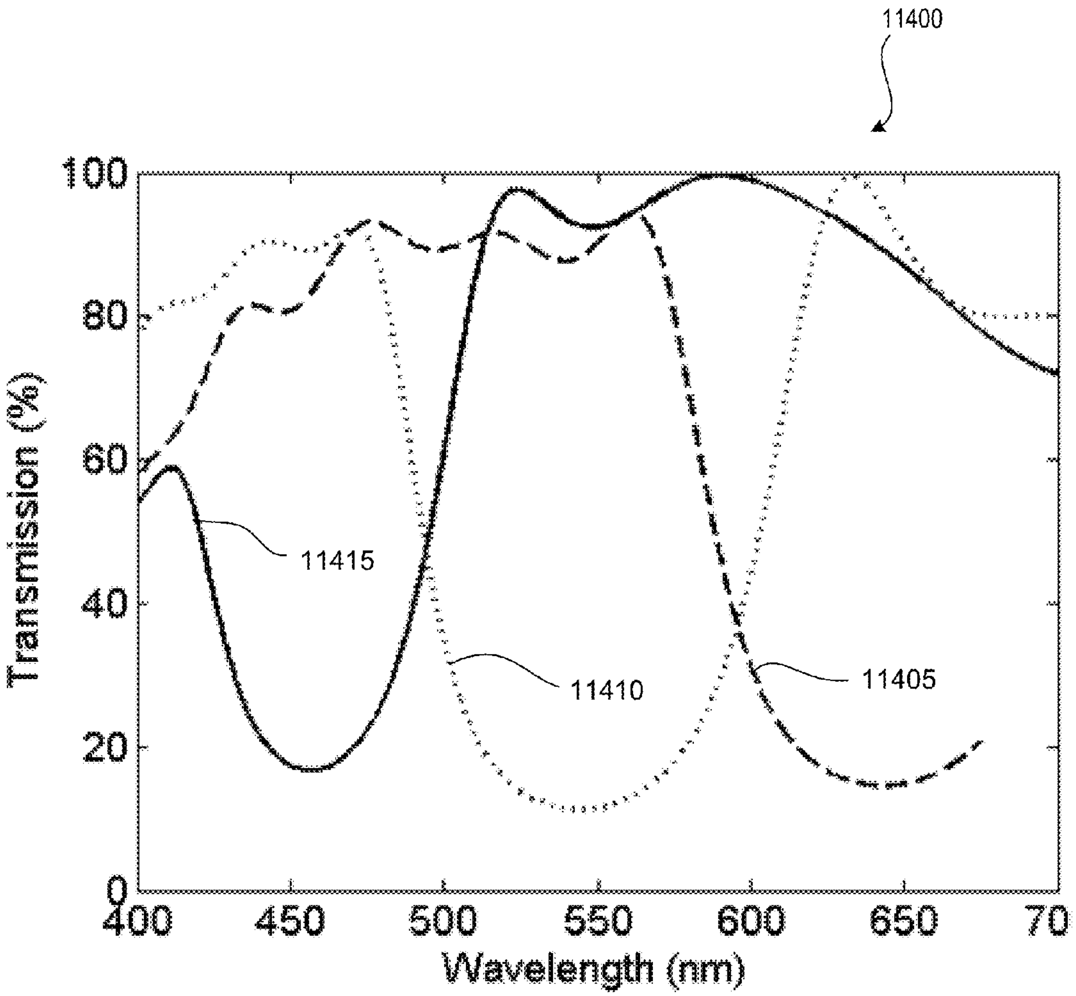

FIG. 354 shows a plot of the transmission characteristics of a partially constrained set of cyan, magenta and yellow (CMY) color filter designs with common low index layers, according to an embodiment.

Figure 355:
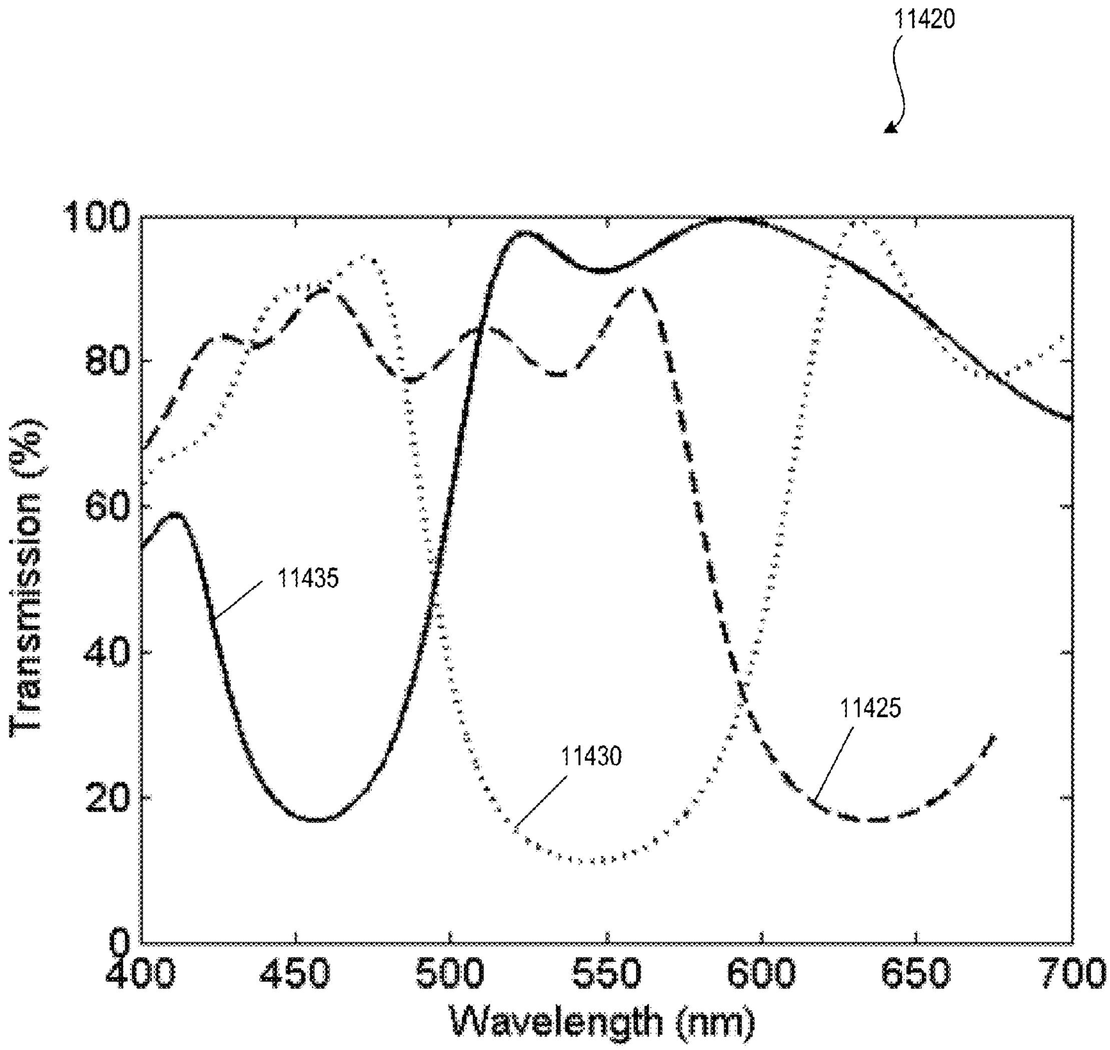

FIG. 355 shows a plot of the transmission characteristics of a further constrained set of cyan, magenta and yellow (CMY) color filter designs with common low index layers and a paired high index layer, according to an embodiment.

Figure 356:
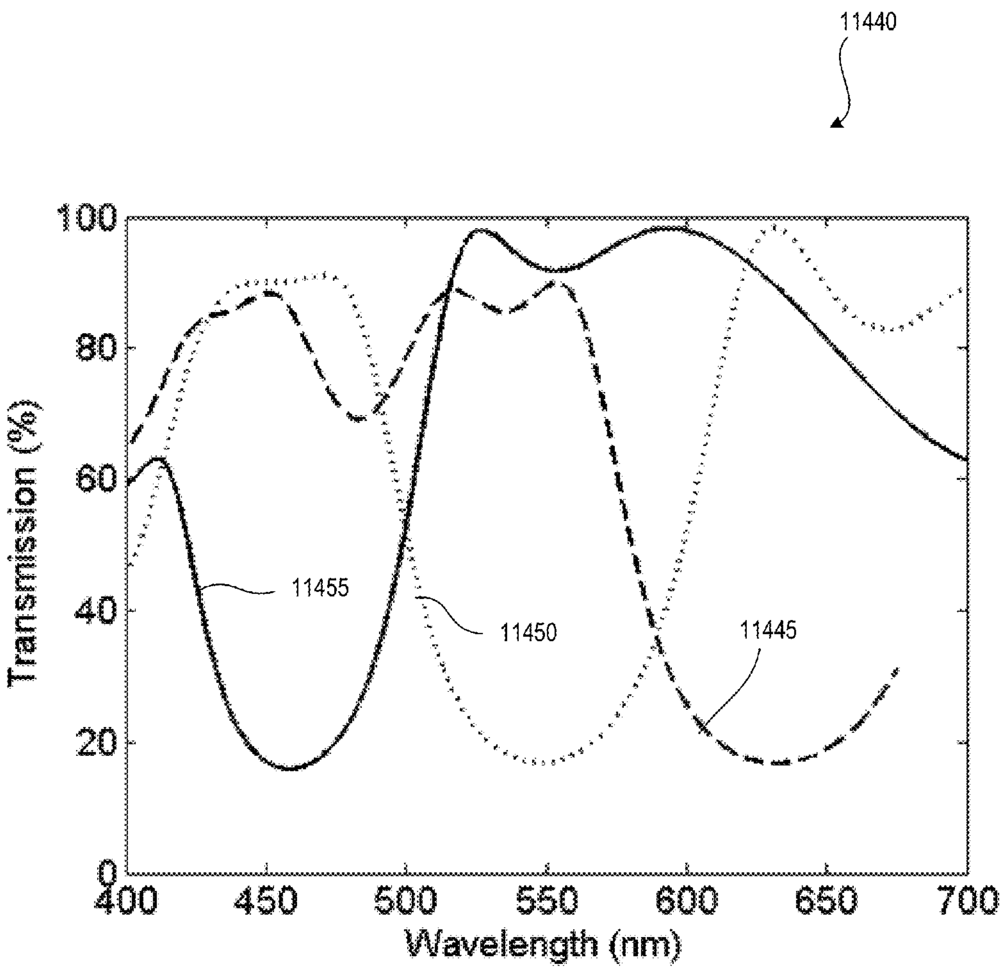

FIG. 356 shows a plot of the transmission characteristics of a fully constrained set of cyan, magenta and yellow (CMY) color filter designs with common low index layers and multiple paired high index layer, according to an embodiment.

Figure 357:
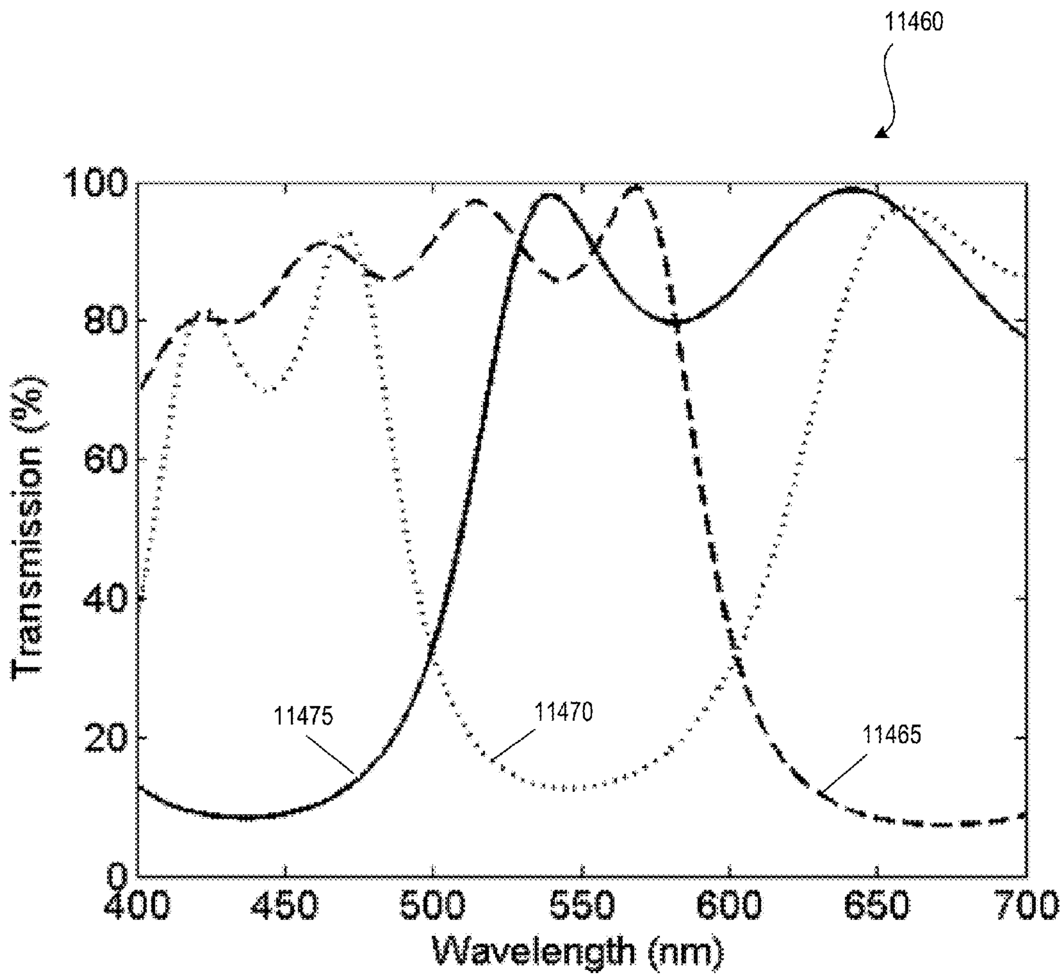

FIG. 357 shows a plot of the transmission characteristics of a fully constrained set of cyan, magenta and yellow (CMY) color filter designs with common low index layers and multiple paired high index layer that has been further optimized to form a final design, according to an embodiment.

Figure 358:
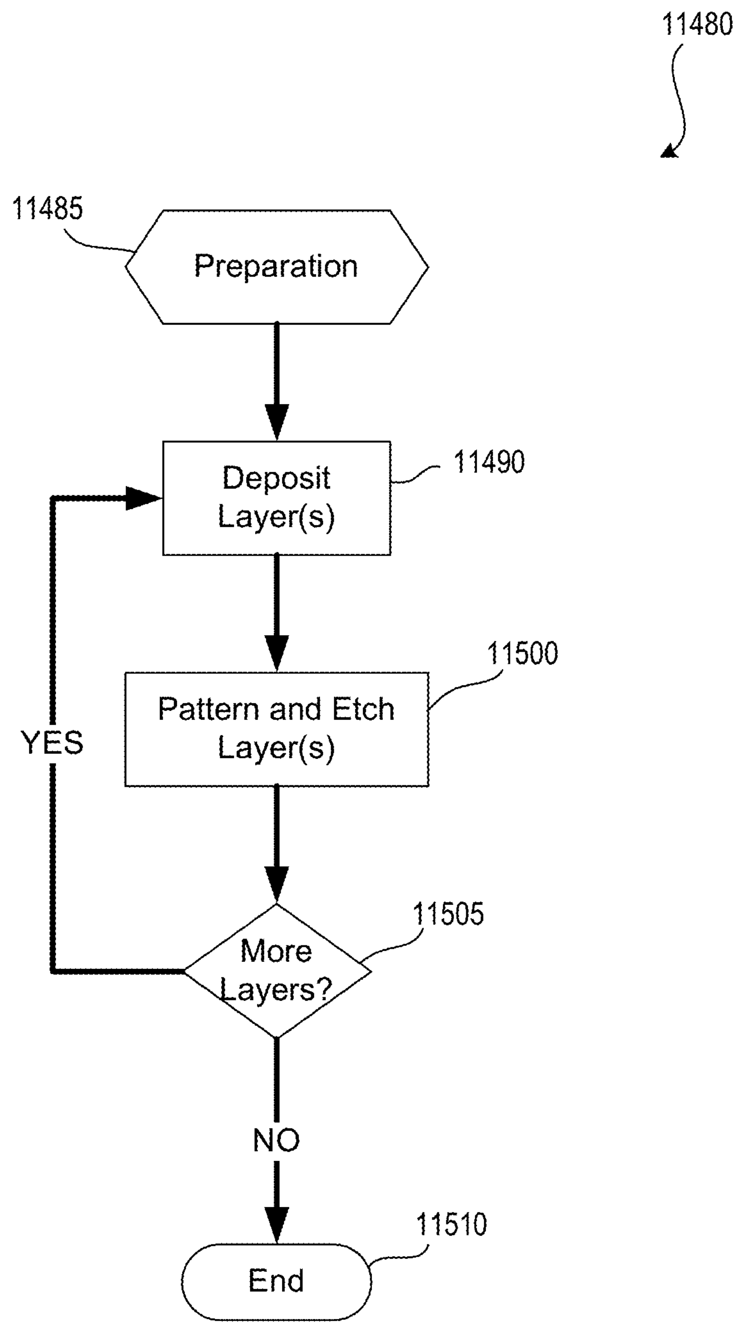

FIG. 358 shows a flowchart for a manufacturing process for thin film filters, according to an embodiment.

Figure 359:
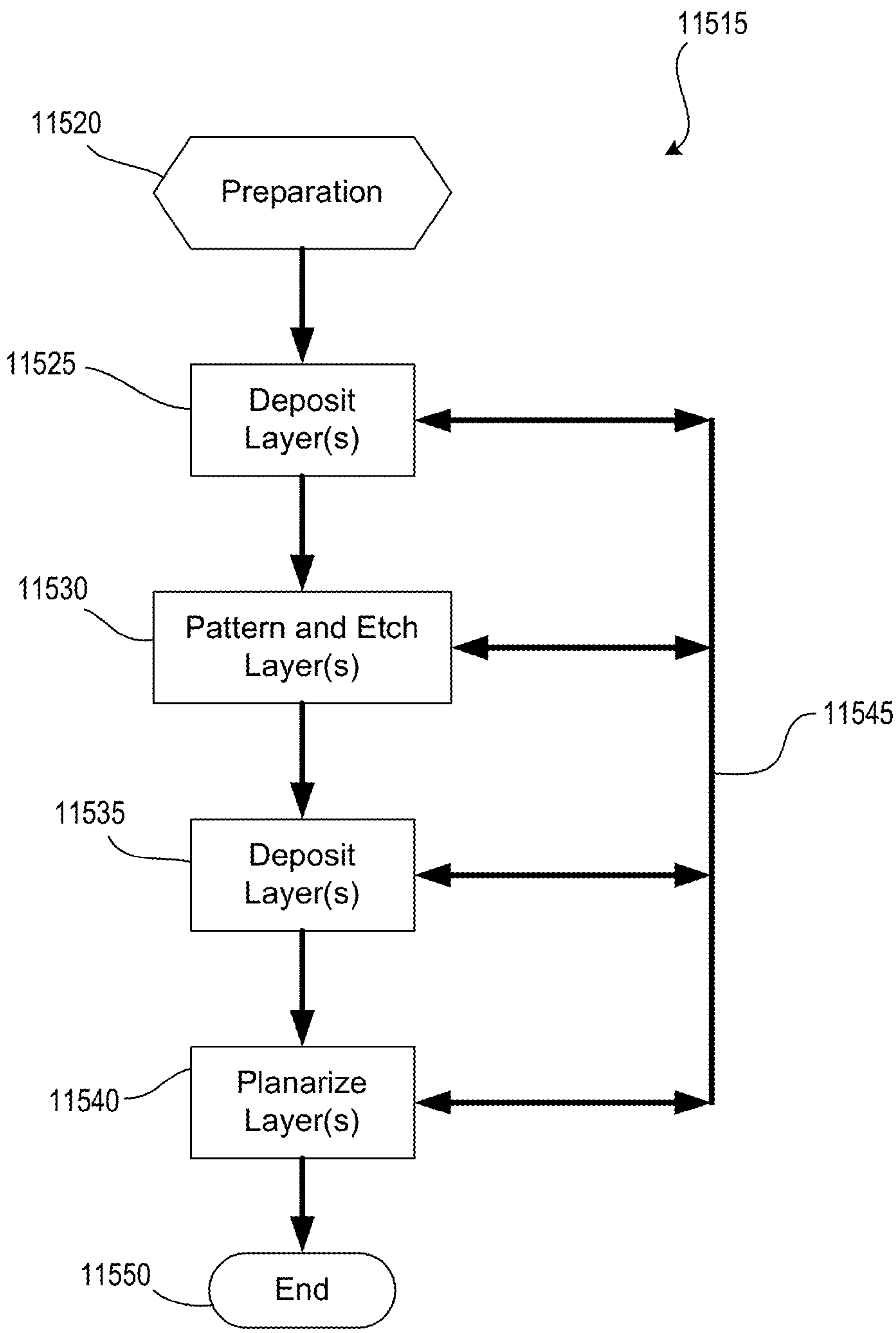
Figure 360:
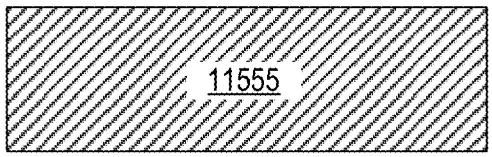
Figure 361:
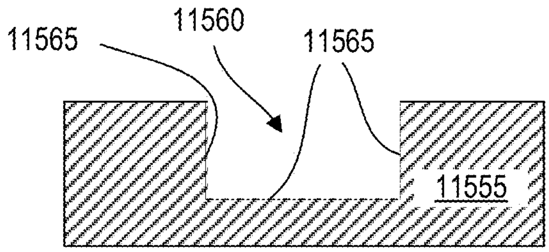
Figure 362:
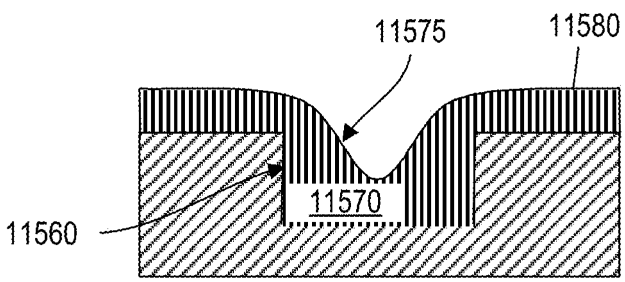
Figure 363:
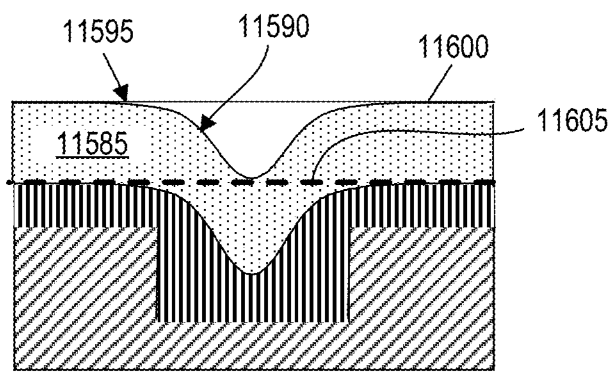

FIG. 359 shows a flowchart for a manufacturing process for non-planar electromagnetic energy modifying elements, according to an embodiment.

FIGS. 360-364 show a series of cross-sections of an exemplary, non-planar electromagnetic energy modifying element in fabrication, shown here to illustrate the manufacturing process shown in FIG. 359.

Figure 365:
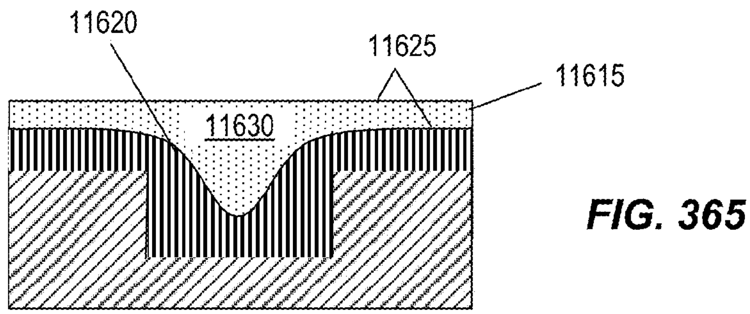

FIG. 365 shows an alternative embodiment of the exemplary, non-planar electromagnetic energy modifying element formed in accordance with the manufacturing process shown in FIG. 359.

Figure 366:
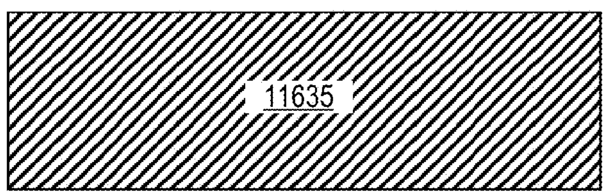
Figure 367:
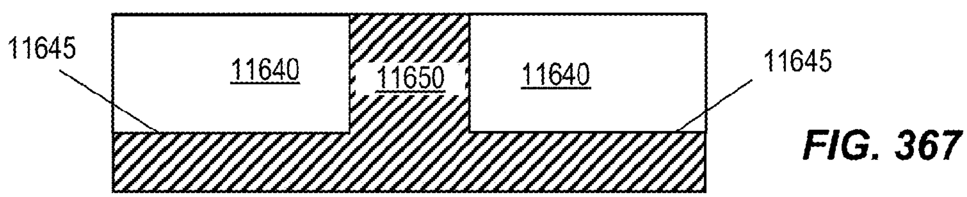
Figure 368:
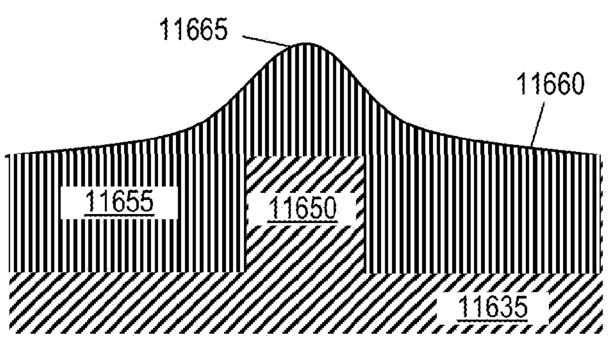
Figure 369:
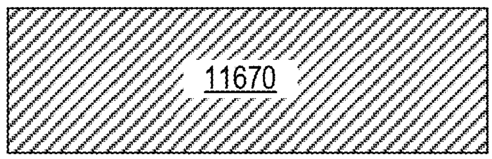
Figure 370:
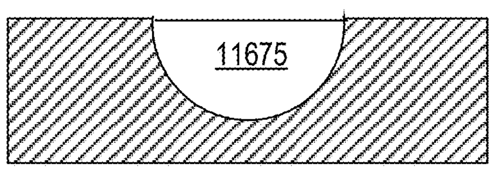
Figure 371:
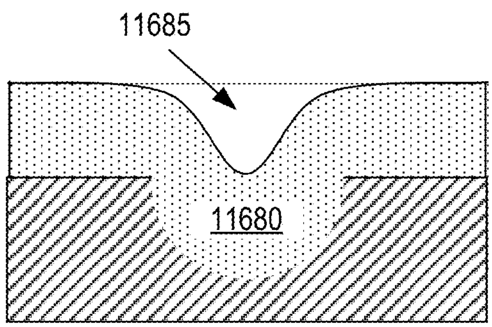
Figure 372:
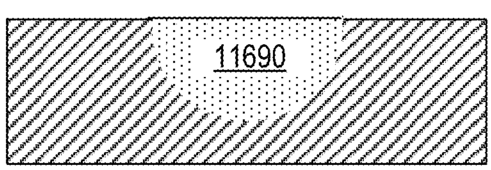

FIGS. 366-368 show another series of cross-sections of another exemplary, non-planar electromagnetic energy modifying element in fabrication, shown here to illustrate another version of the manufacturing process shown in FIG. 359.

FIGS. 369-372 show a series of cross-sections of yet another exemplary, non-planar electromagnetic energy modifying element in fabrication, shown here to illustrate an alternative embodiment of the manufacturing process shown in FIG. 359.

Figure 373:
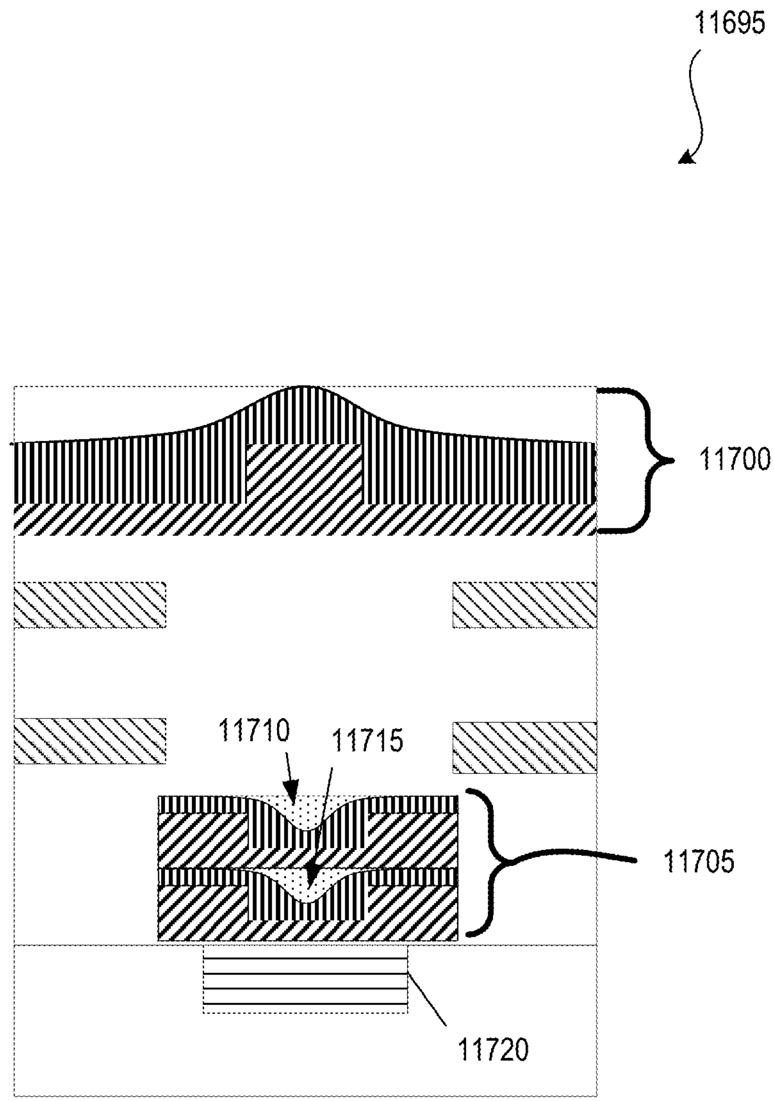

FIG. 373 shows a single detector pixel including non-planar elements, according to an embodiment.

Figure 374:
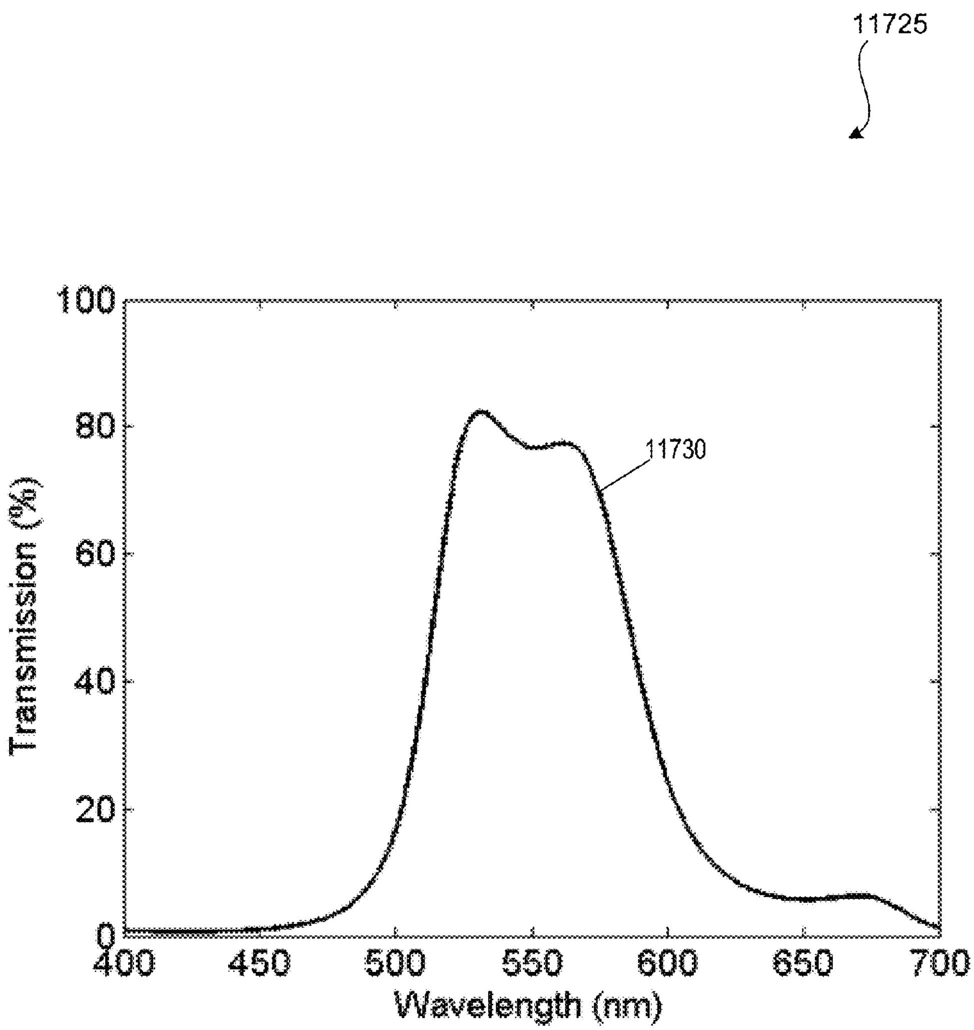

FIG. 374 shows a plot of the transmission characteristics of a magenta color filter including silver layers, according to an embodiment.

Figure 375:
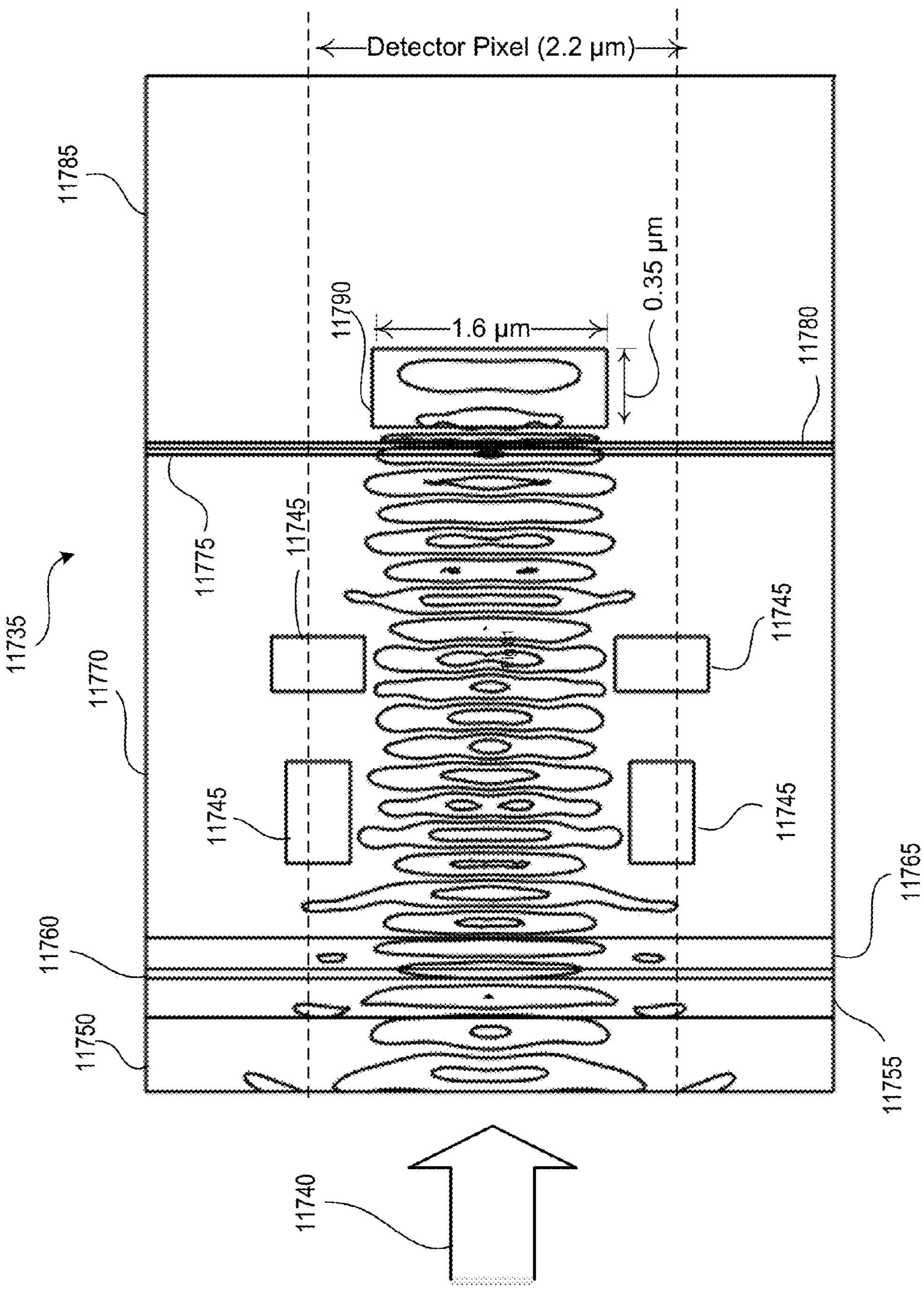

FIG. 375 shows a schematic diagram, in partial cross-section, of a prior art detector pixel array, without power focusing elements or CRA correcting elements, overlain with simulated results of electromagnetic power density therethrough, shown here to illustrate power density of normally incident electromagnetic energy through a detector pixel.

Figure 376:
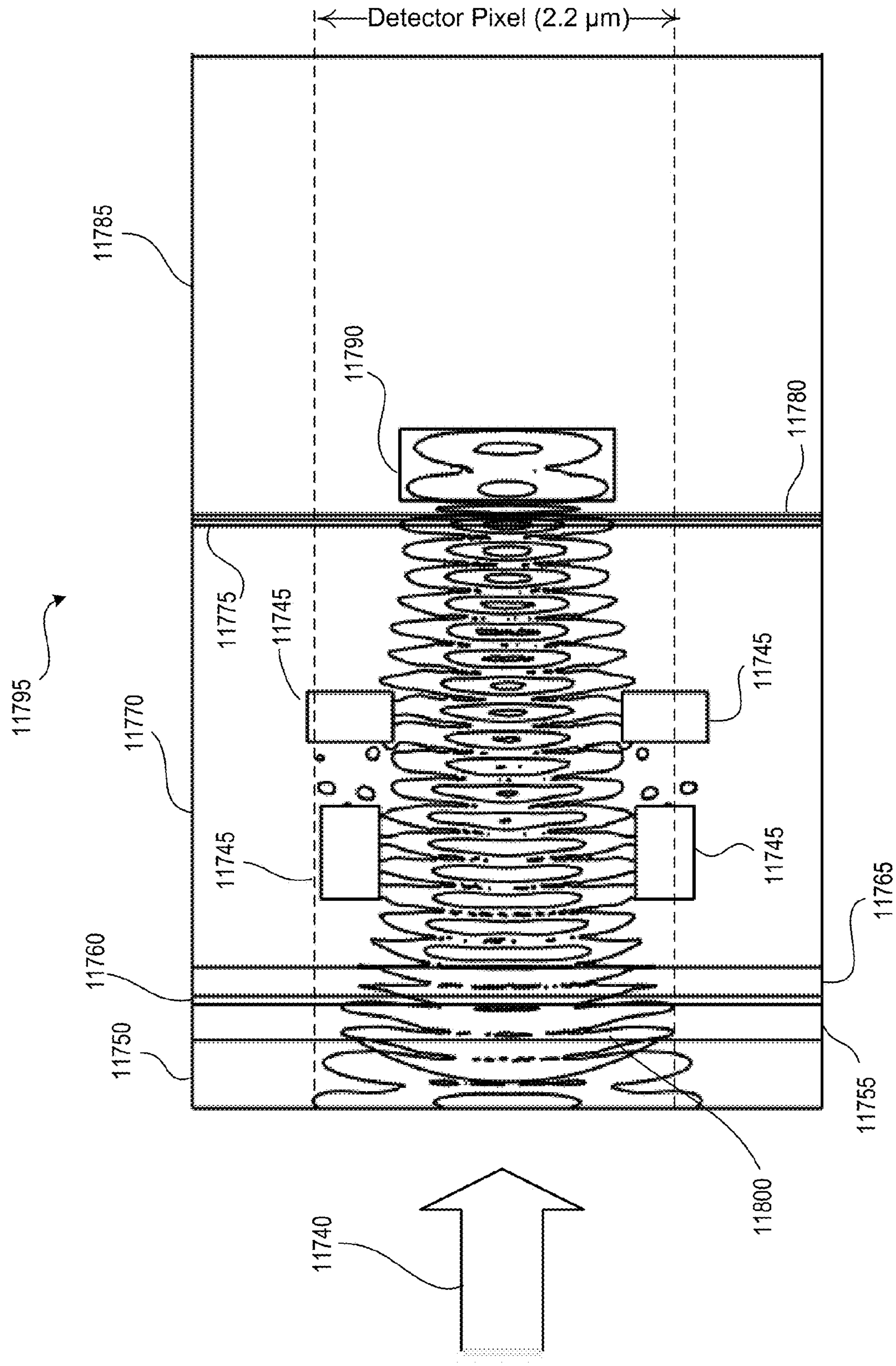

FIG. 376 shows a schematic diagram, in partial cross-section, of another prior art detector pixel array, overlain with simulated results of electromagnetic power density therethrough, shown here to illustrate power density of normally incident electromagnetic energy through the detector pixel array with a lenslet.

Figure 377:
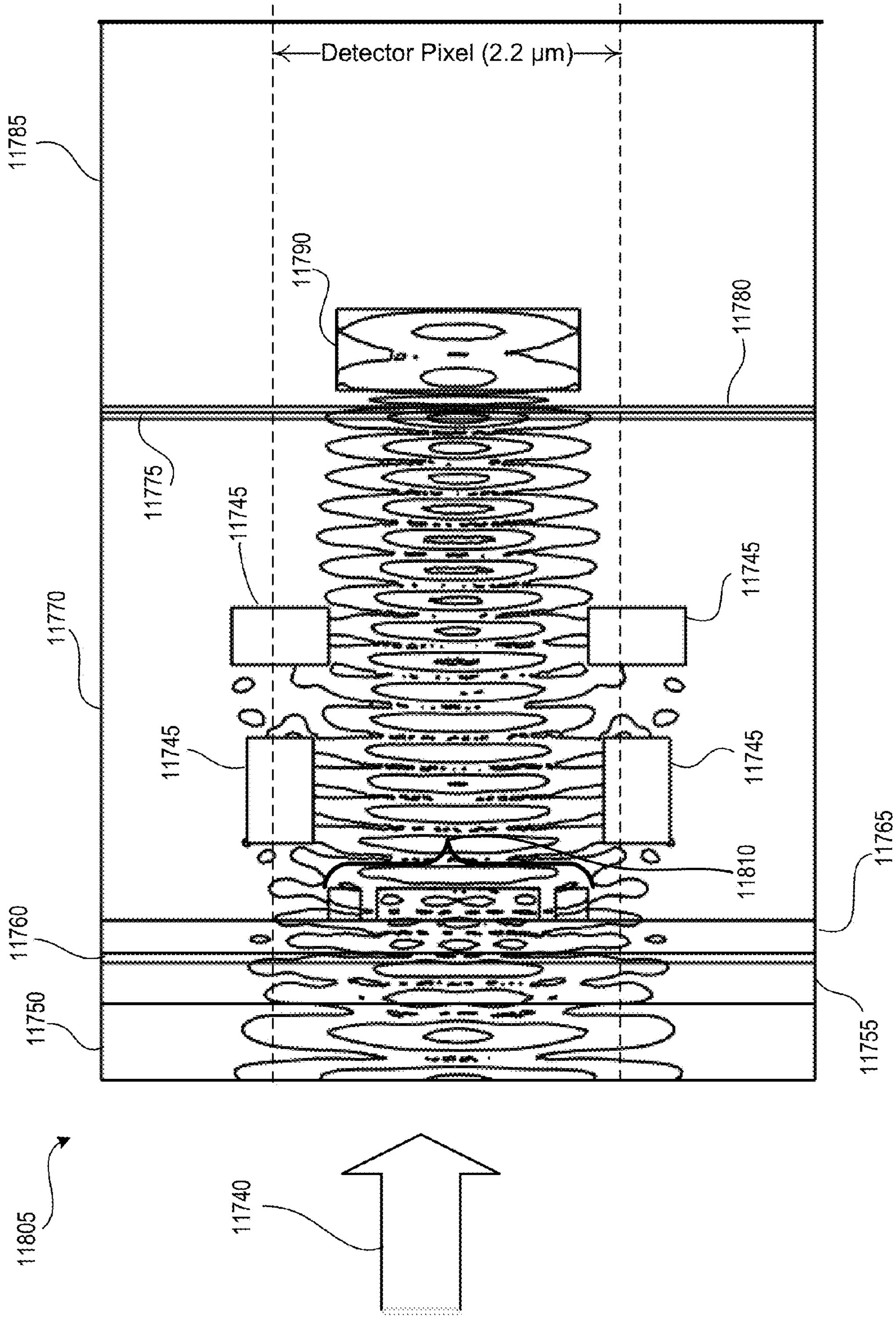

FIG. 377 shows a schematic diagram, in partial cross-section, of a detector pixel array, overlain with simulated results of electromagnetic power density therethrough, shown here to illustrate power density of normally incident electromagnetic energy through a detector pixel with a metalens, according to an embodiment.

Figure 378:
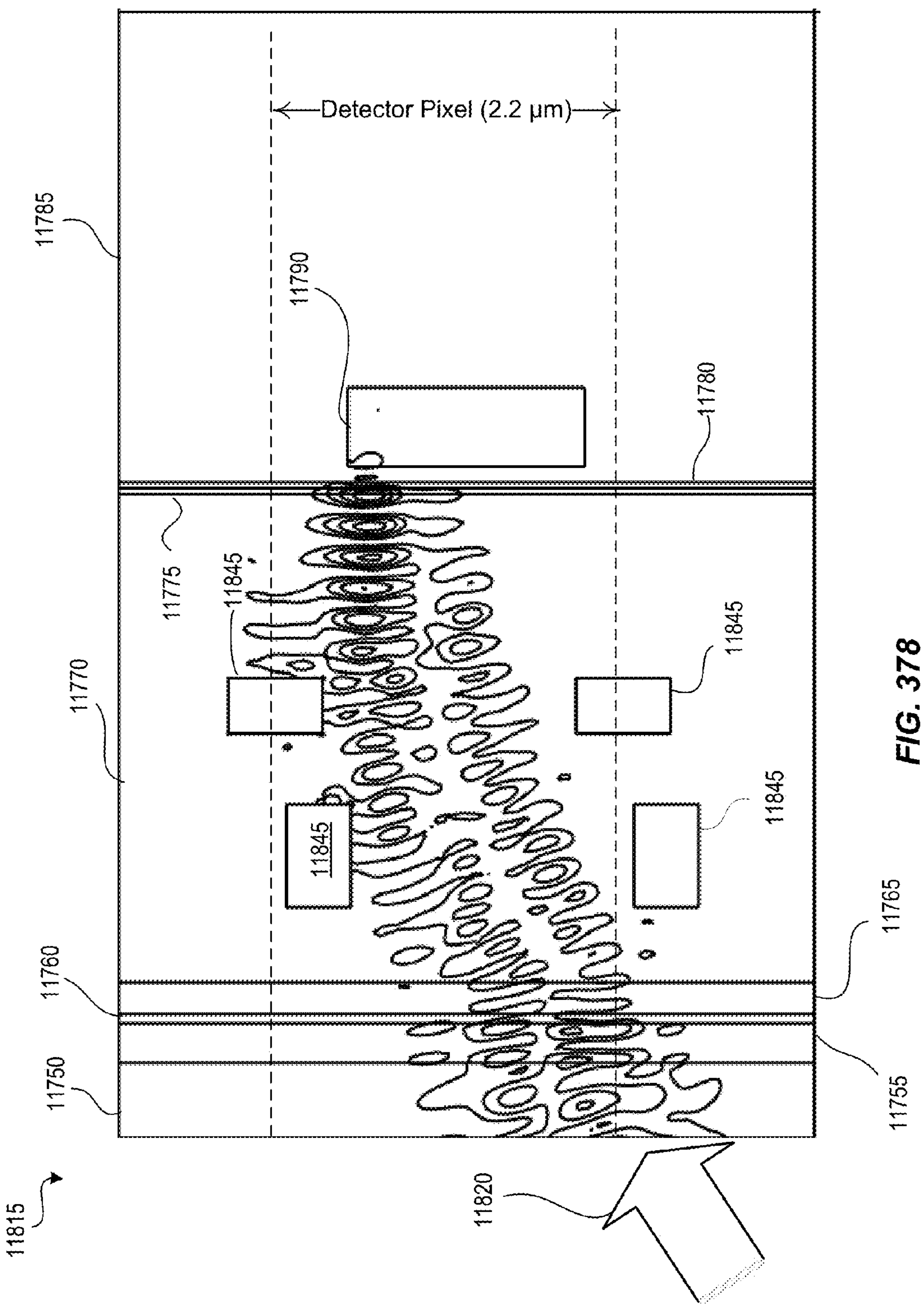

FIG. 378 shows a schematic diagram, in partial cross-section, of a prior art detector pixel array, without power focusing elements or CRA correcting elements, overlain with simulated results of electromagnetic power density therethrough, shown here to illustrate power density of electromagnetic energy incident at a CRA of 35° on a detector pixel with shifted metal traces but no additional elements to affect electromagnetic energy propagation.

Figure 379:
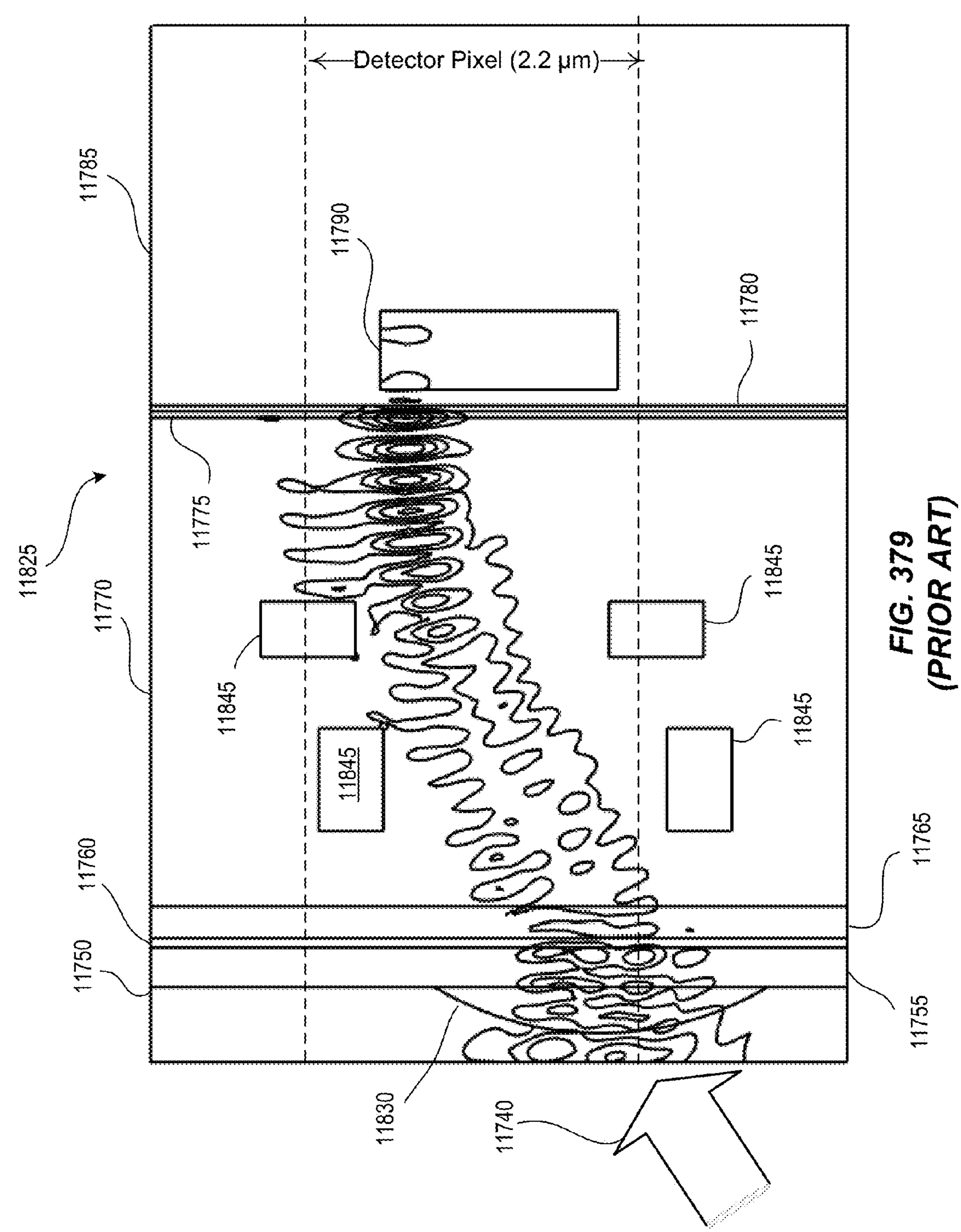

FIG. 379 shows a schematic diagram, in partial cross-section, of a prior art detector pixel array, overlain with simulated results of electromagnetic power density therethrough, shown here to illustrate power density of electromagnetic energy incident at a CRA of 35° on the detector pixel with shifted metal traces and a lenslet for directing the electromagnetic energy toward the photosensitive region.

Figure 380:
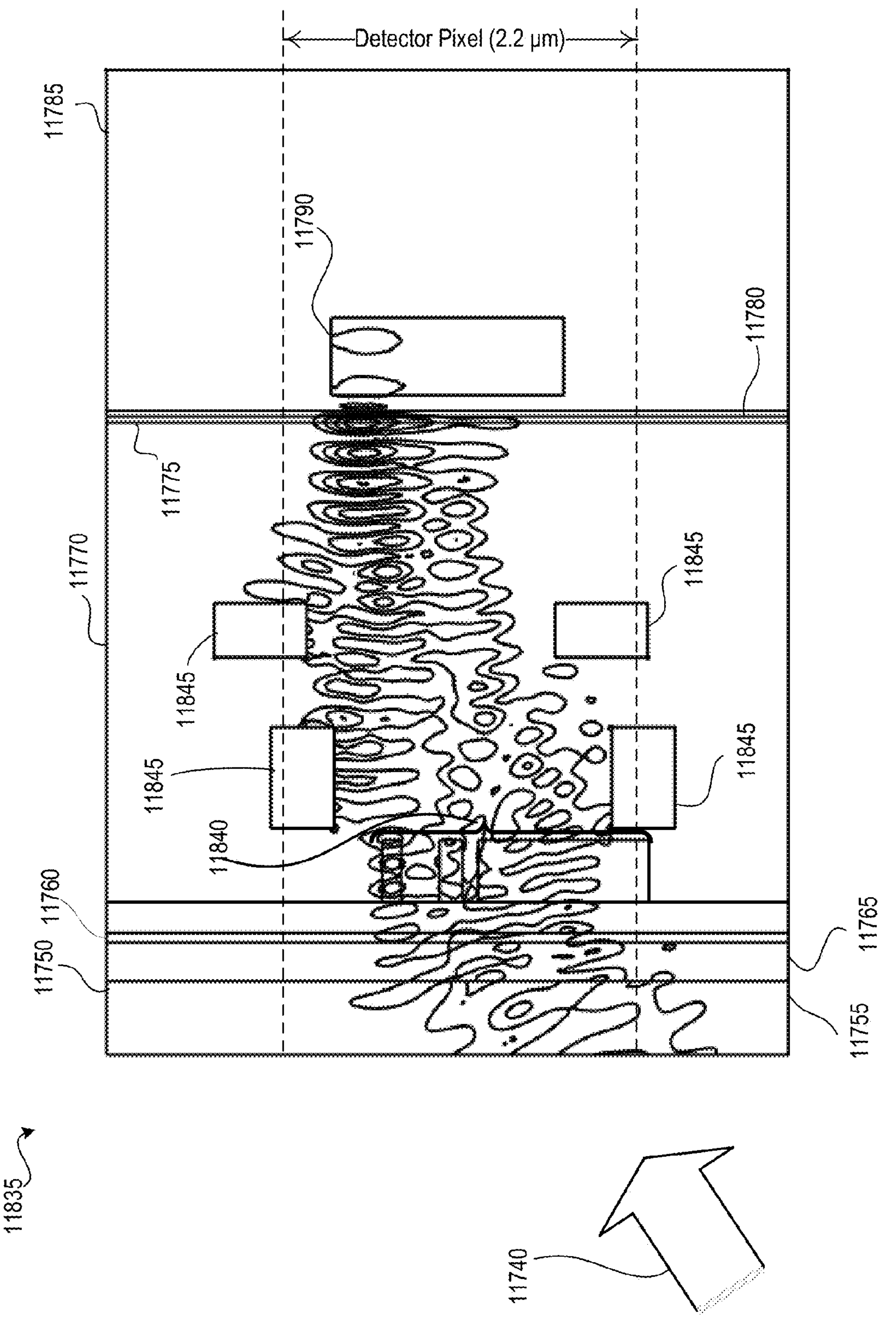

FIG. 380 shows a schematic diagram, in partial cross-section, of a detector pixel array in accordance with the present disclosure, overlain with simulated results of electromagnetic power density therethrough, shown here to illustrate power density of electromagnetic energy incident at a CRA of 35° on a detector pixel with shifted metal traces and a metalens for directing the electromagnetic energy toward the photosensitive region.

Figure 381:
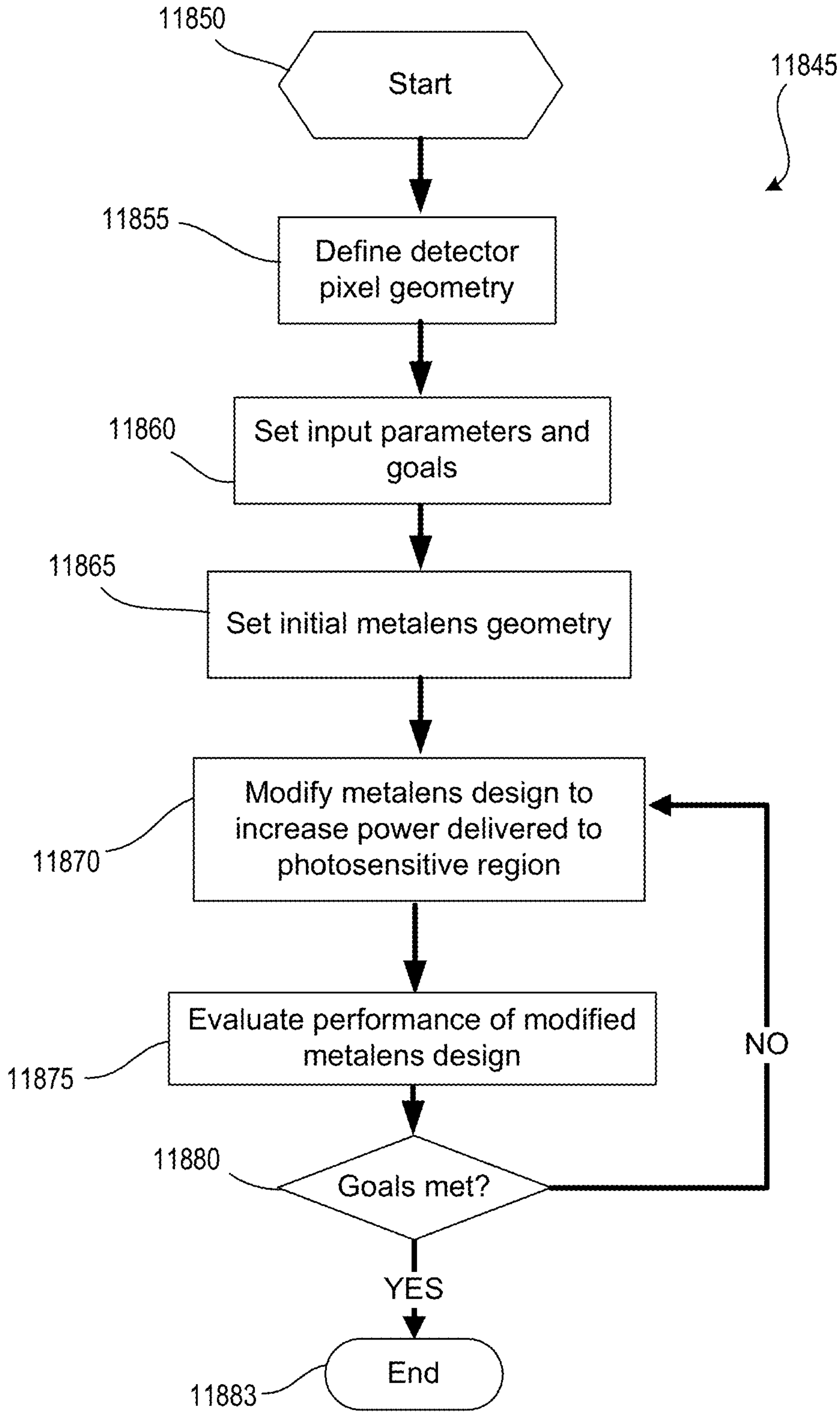

FIG. 381 shows a flowchart of an exemplary design process for designing a metalens, according to an embodiment.

Figure 382:
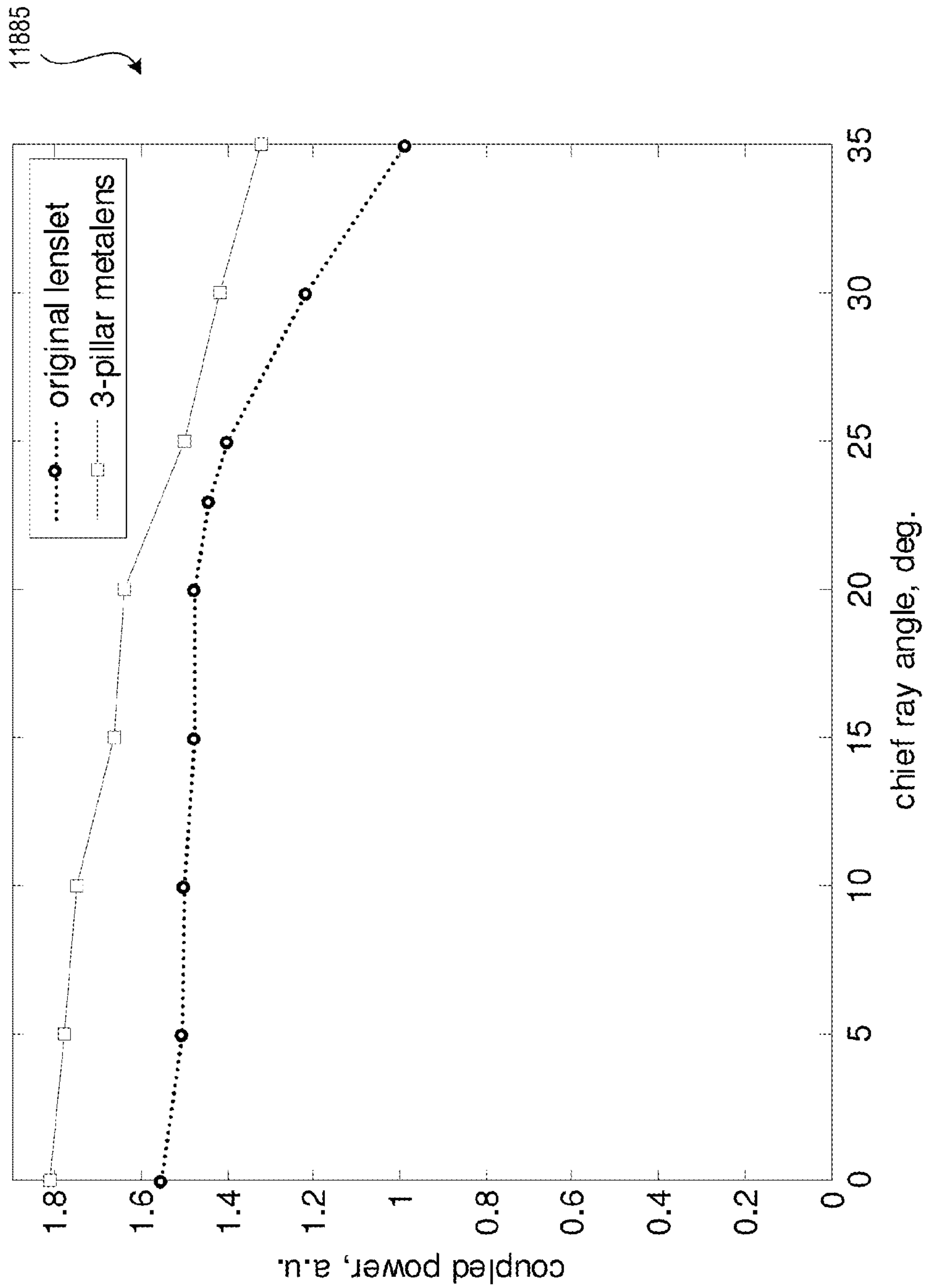

FIG. 382 shows a comparison of coupled power at the photosensitive region as a function of CRA for a prior art detector pixel with a lenslet and a detector pixel including a metalens, according to an embodiment.

Figure 383:
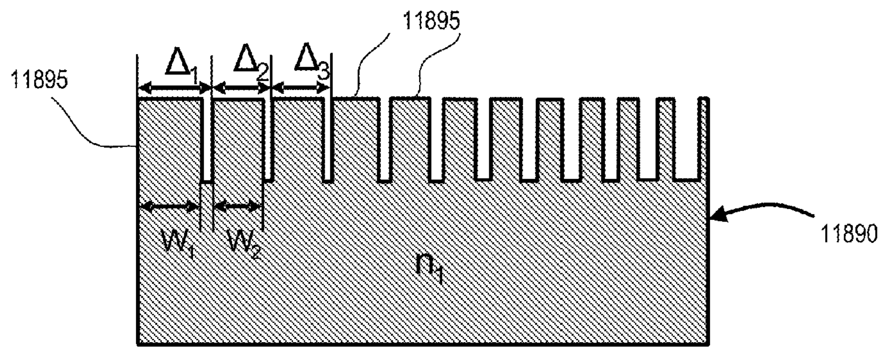

FIG. 383 shows a schematic diagram, in cross-section, of a subwavelength prism grating (SPG) suitable for integration into a detector pixel, according to an embodiment.

Figure 384:
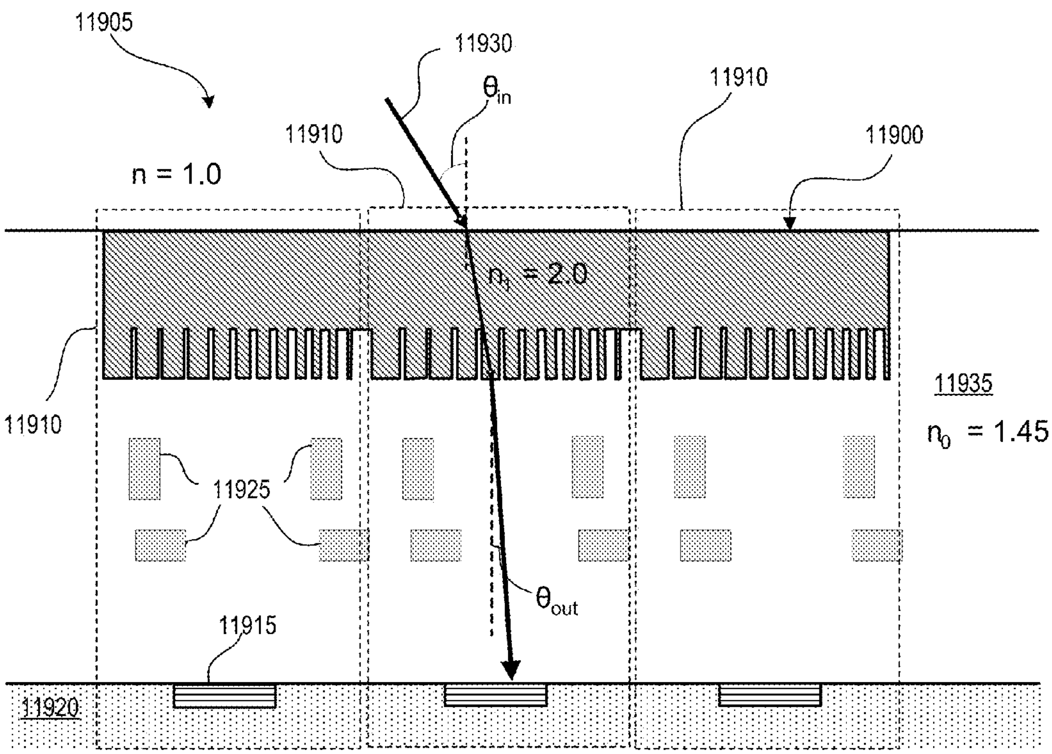

FIG. 384 shows a schematic diagram, in partial cross-section, of an array of SPGs integrated into an array of detector pixels, according to an embodiment.

Figure 385:
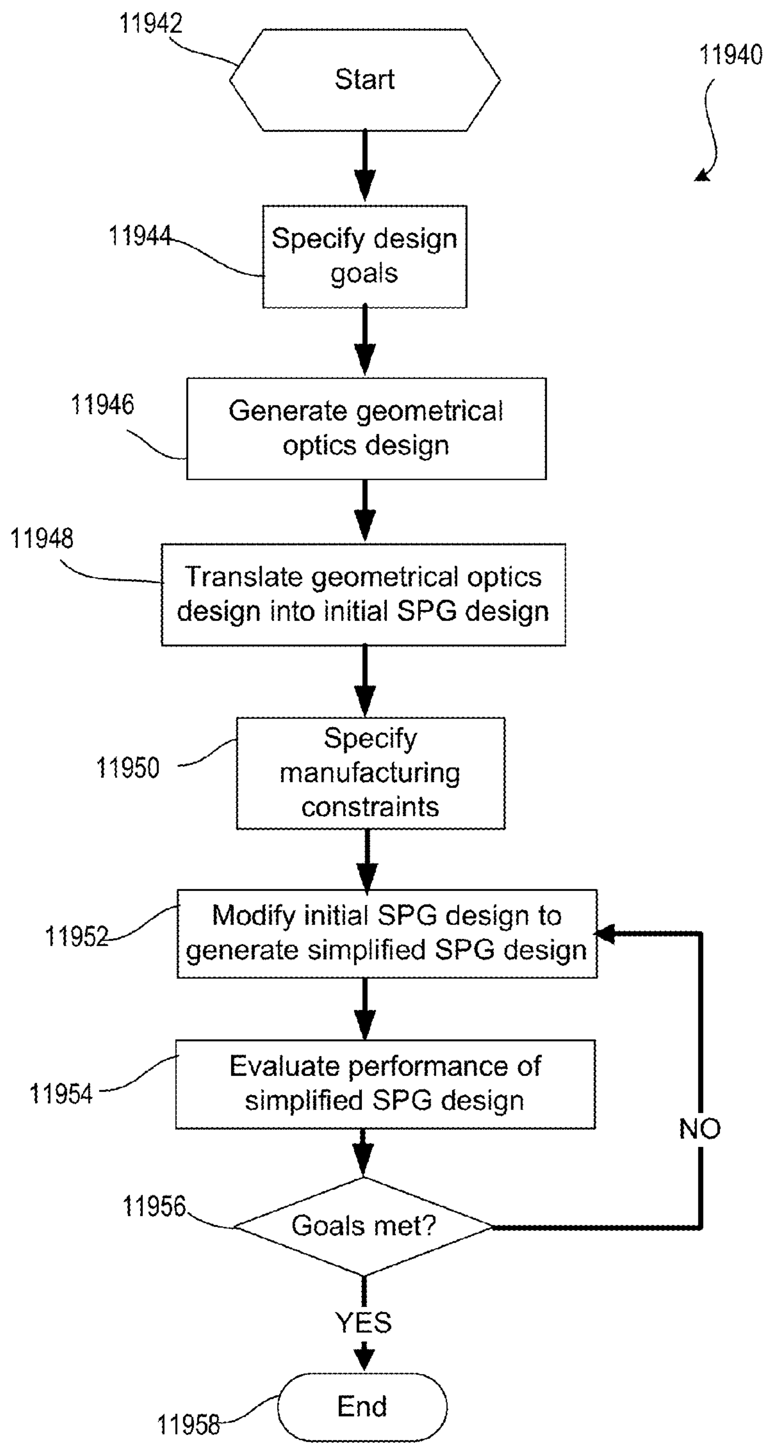

FIG. 385 shows a flowchart of an exemplary design process for designing a manufacturable SPG, according to an embodiment.

Figure 386:
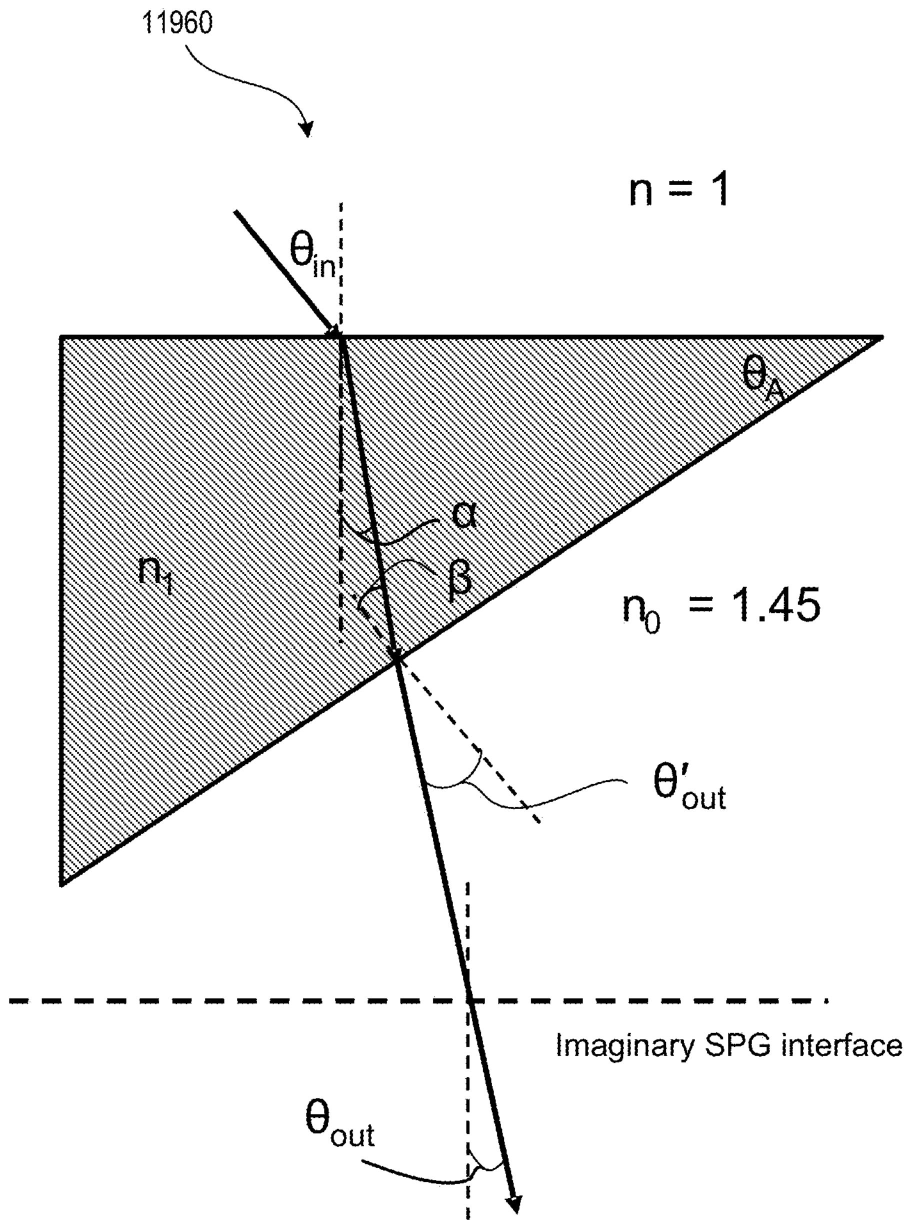

FIG. 386 shows a geometric construct used in the design of an SPG, according to an embodiment.

Figure 387:
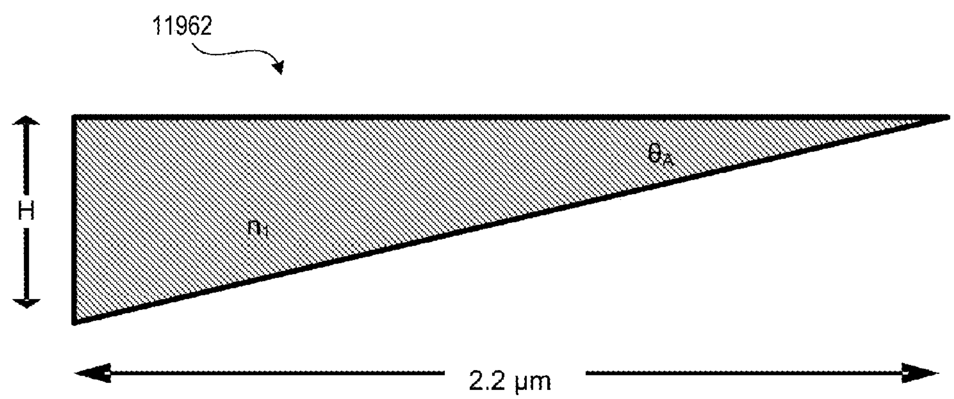

FIG. 387 shows a schematic diagram, in cross-section, of an exemplary prism structure used in calculating the parameters of an equivalent SPG, according to an embodiment.

Figure 388:
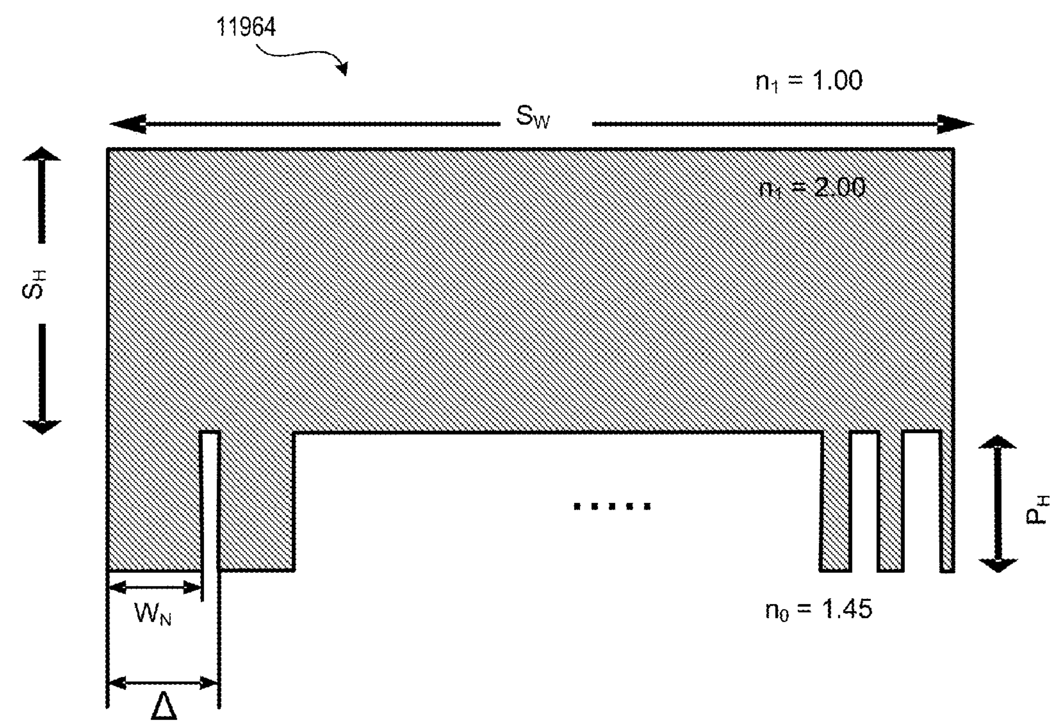

FIG. 388 shows a schematic diagram, in cross-section, of a SPG corresponding to a prism structure, shown here to illustrate various parameters of the SPG that may be calculated from the dimensions of the equivalent prism structure, according to an embodiment.

Figure 389:
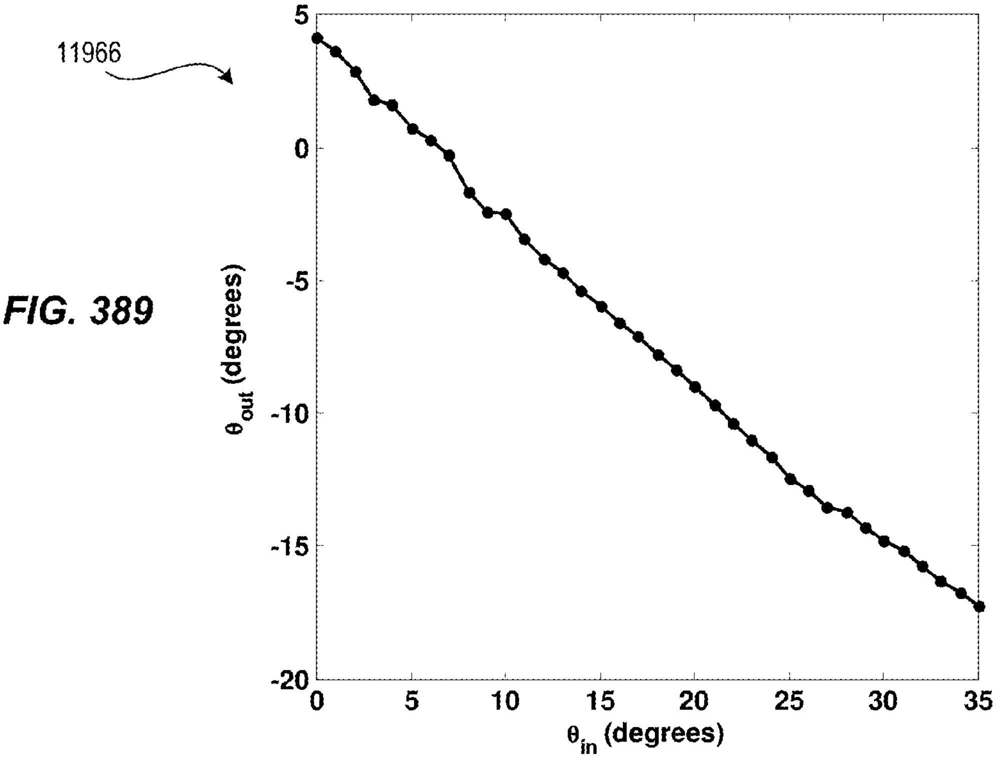

FIG. 389 shows a plot, calculated using a numeric solver for Maxwell's equations, estimating the performance of a manufacturable SPG used for CRA correction.

Figure 390:
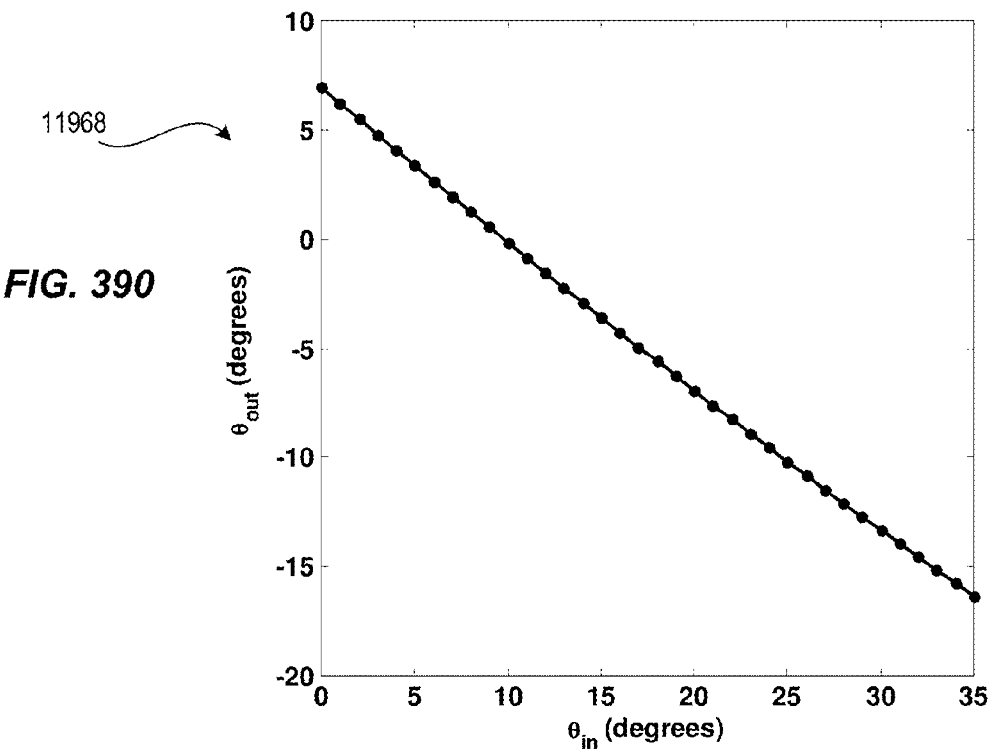

FIG. 390 shows a plot, calculated using geometrical optics approximations, estimating the performance of a prism used for CRA correction.

Figure 391:
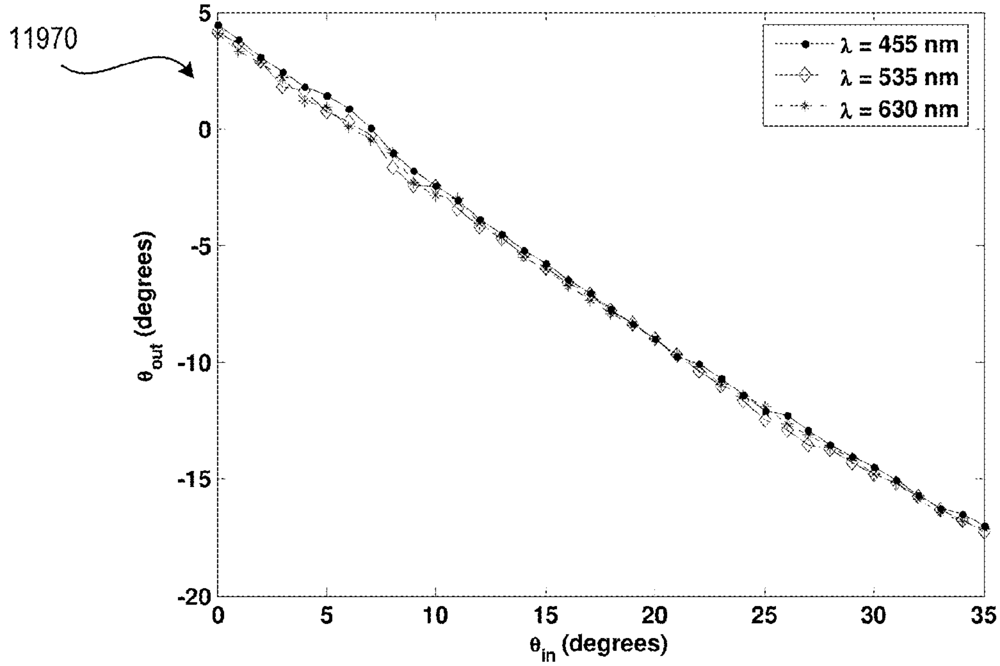

FIG. 391 shows a plot comparing computationally simulated results of CRA correction performed by a manufacturable SPG for s-polarized electromagnetic energy of different wavelengths.

Figure 392:
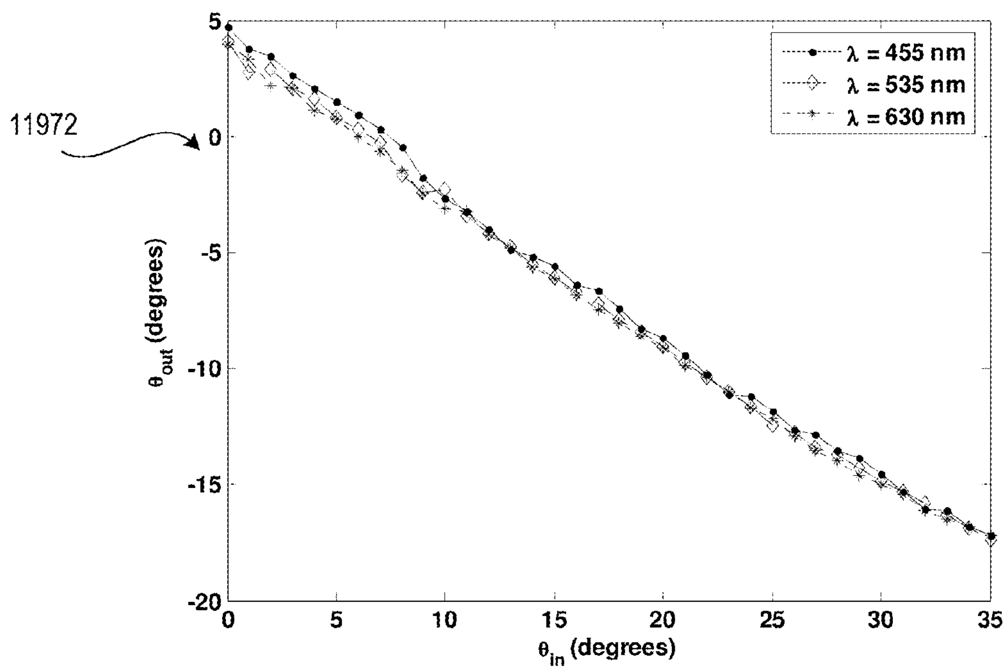

FIG. 392 shows a plot comparing computationally simulated results of CRA correction performed by a manufacturable SPG for p-polarized electromagnetic energy of different wavelengths.

Figure 393:
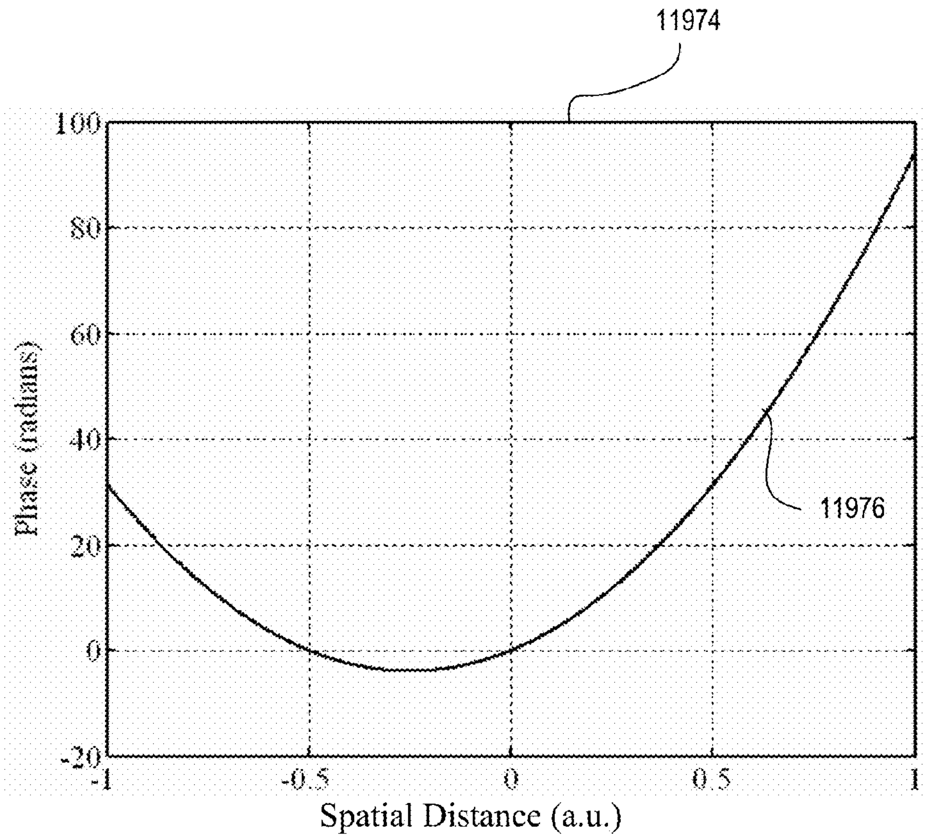

FIG. 393 shows a plot of an exemplary phase profile of an optical device capable of simultaneously focusing electromagnetic energy and performing CRA correction, shown here to illustrate an example of a parabolic surface added to a tilted surface.

Figure 394:
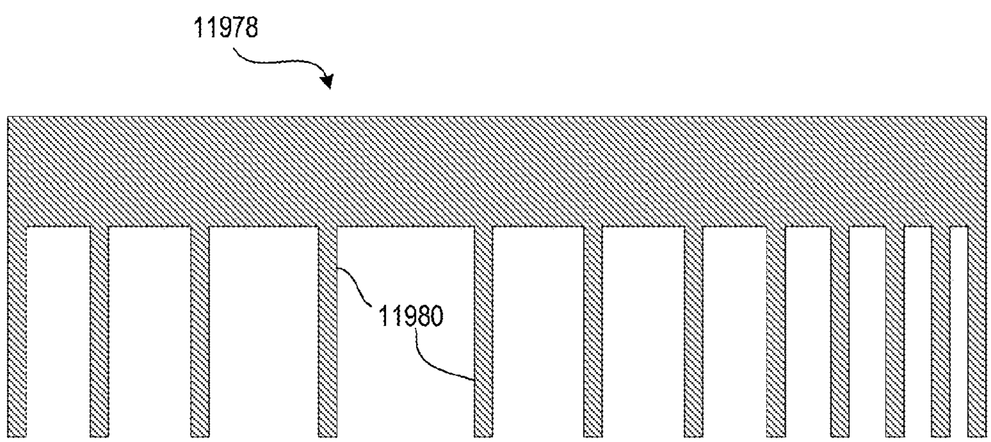

FIG. 394 shows an exemplary SPG corresponding to the exemplary phase profile shown in FIG. 393 such that the SPG simultaneously provides CRA correction and focusing of electromagnetic energy incident thereon, according to an embodiment.

FIGS. 395A, 395B and 395C are cross-sectional illustrations of one layered optical element including an anti-reflection coating, according to an embodiment.

Figure 396:
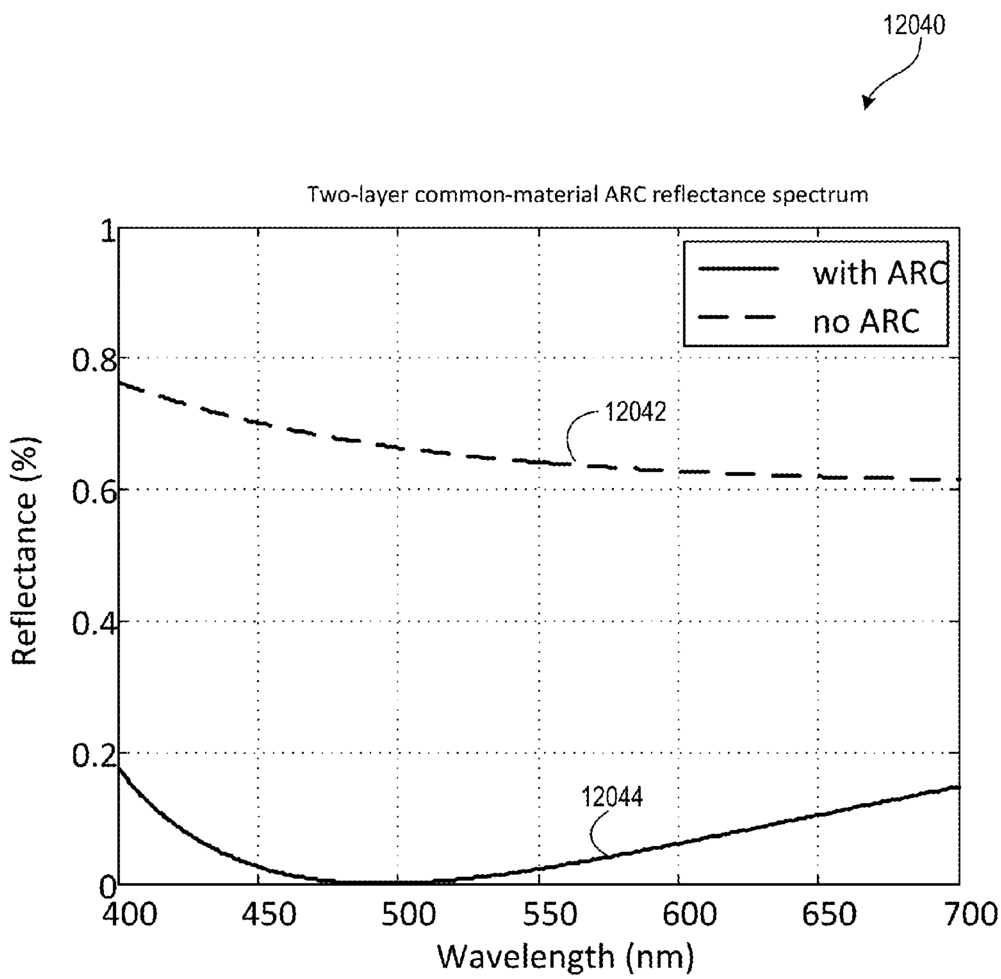

FIG. 396 shows a plot of reflectance as a function of wavelength of one surface defined by two layered optical elements with and without an anti-reflection layer, according to an embodiment.

Figure 397A:
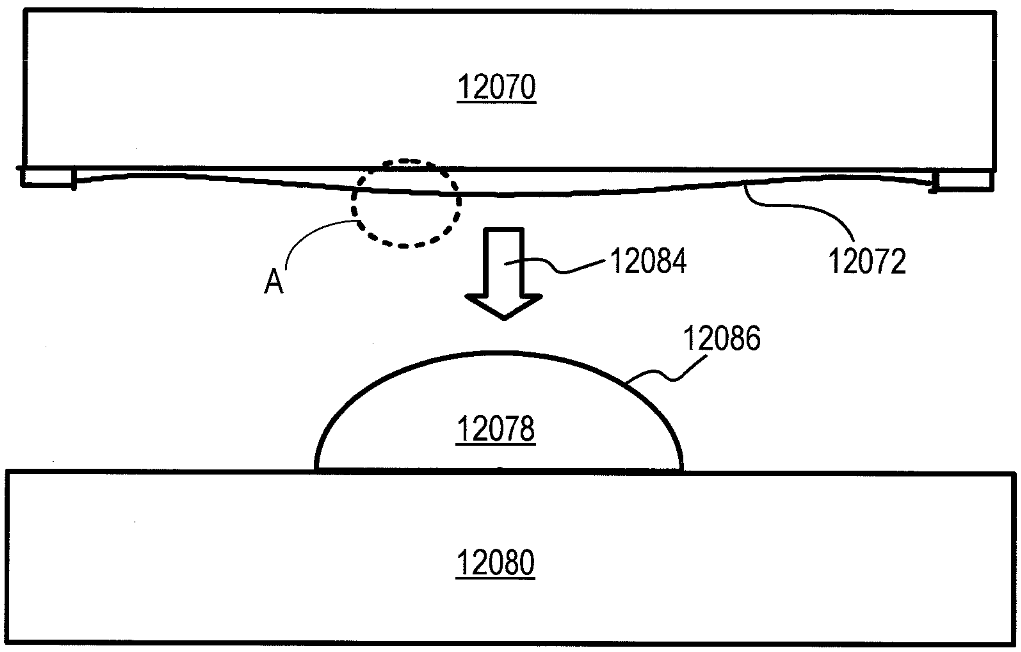
Figure 397B:
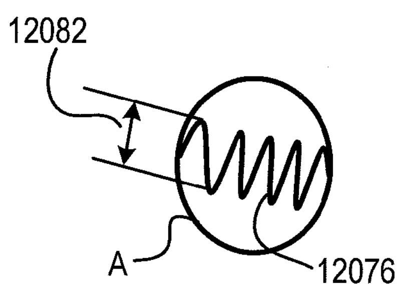

FIGS. 397A and 397B illustrate one fabrication master having a surface including a negative of subwavelength features to be applied to a surface of an optical element, according to an embodiment.

Figure 398:
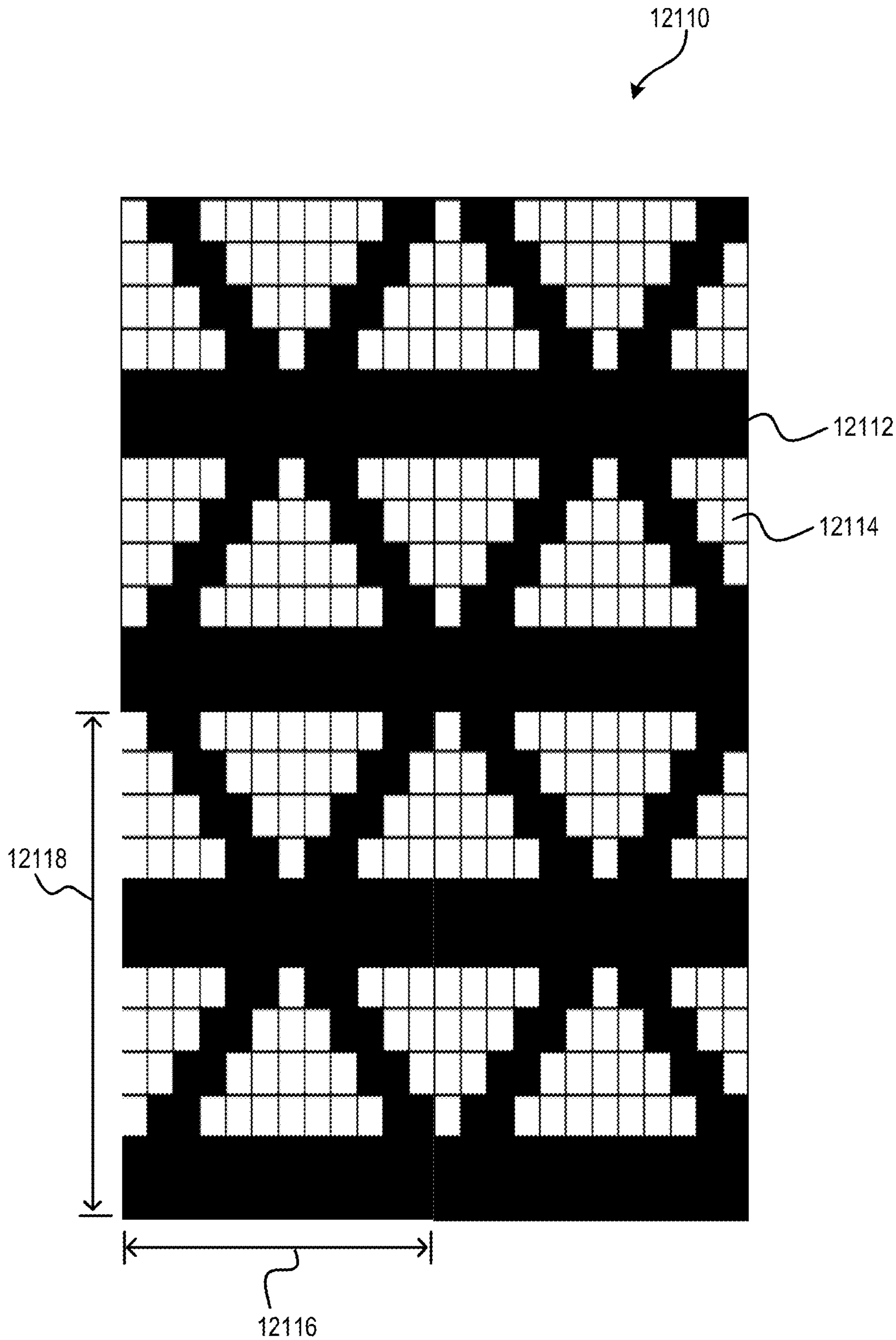

FIG. 398 shows a numerical grid model of a subsection of the machined surface of FIG. 268.

Figure 399:
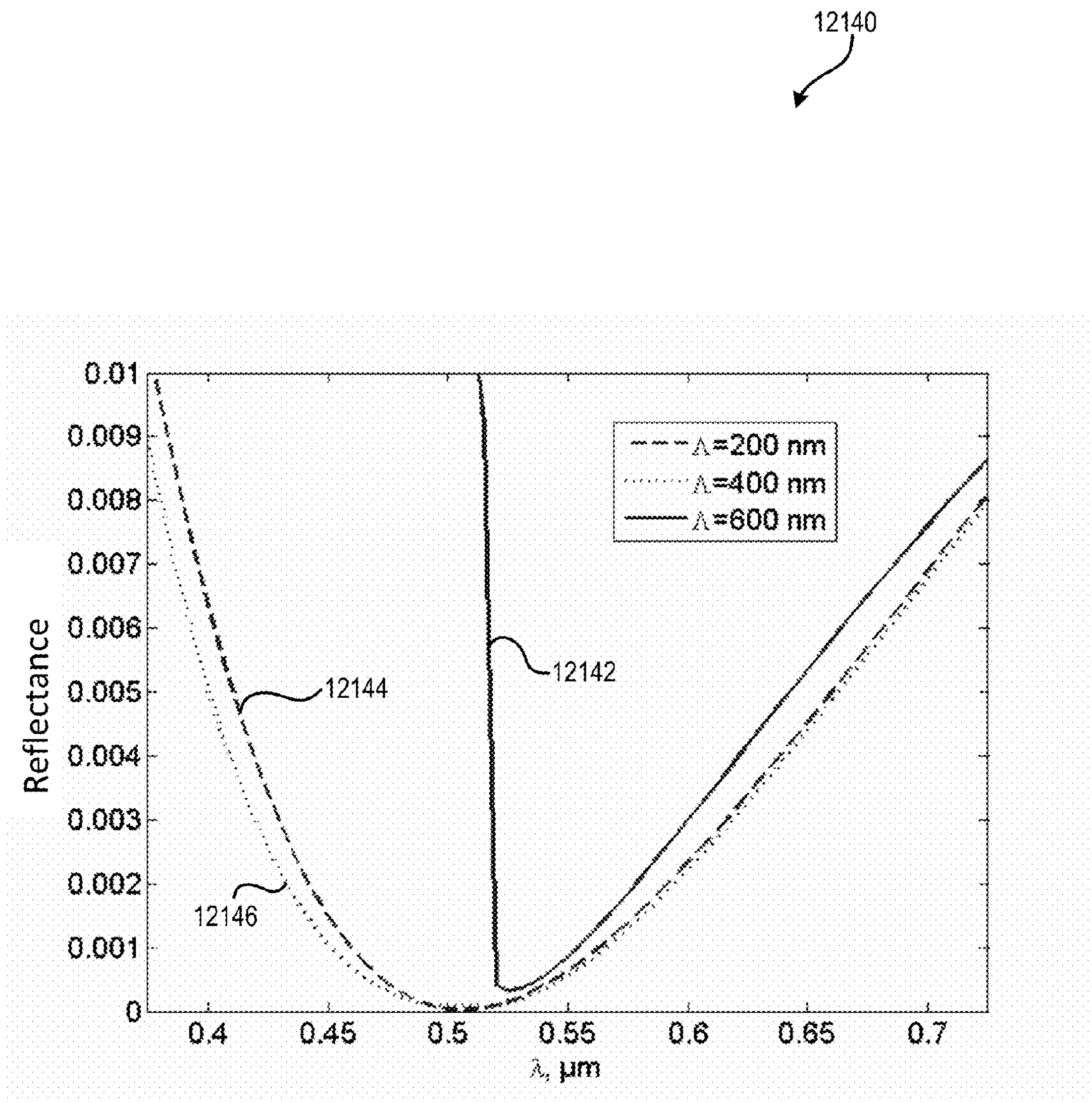

FIG. 399 is a plot of reflectance as a function of wavelength of electromagnetic energy normally incident on a planar surface having subwavelength features created using a fabrication master having the machined surface of FIG. 268.

Figure 400:
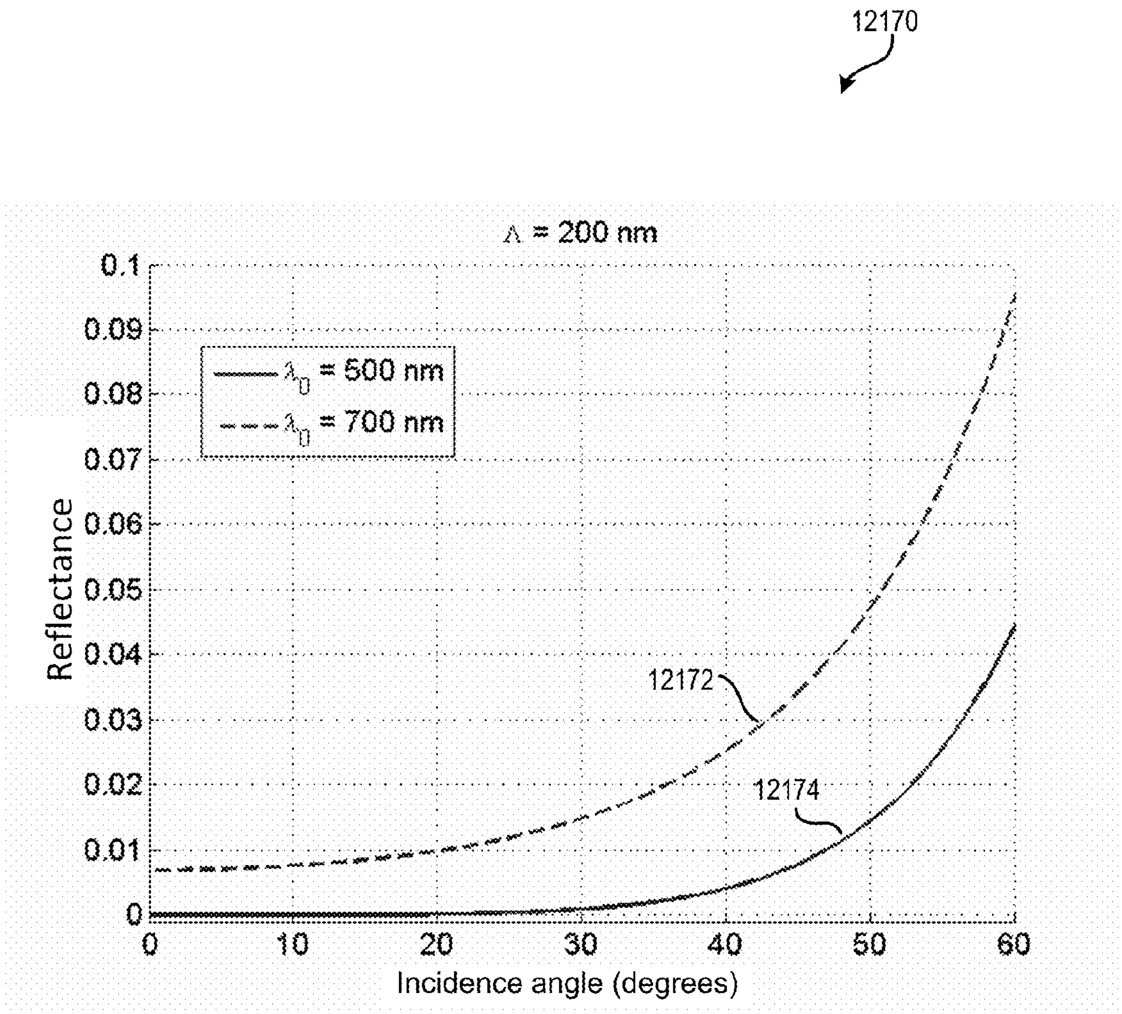

FIG. 400 is a plot of reflectance as a function of angle of incidence of electromagnetic energy incident on a planar surface having subwavelength features created using a fabrication master having the machined surface of FIG. 268.

Figure 401:
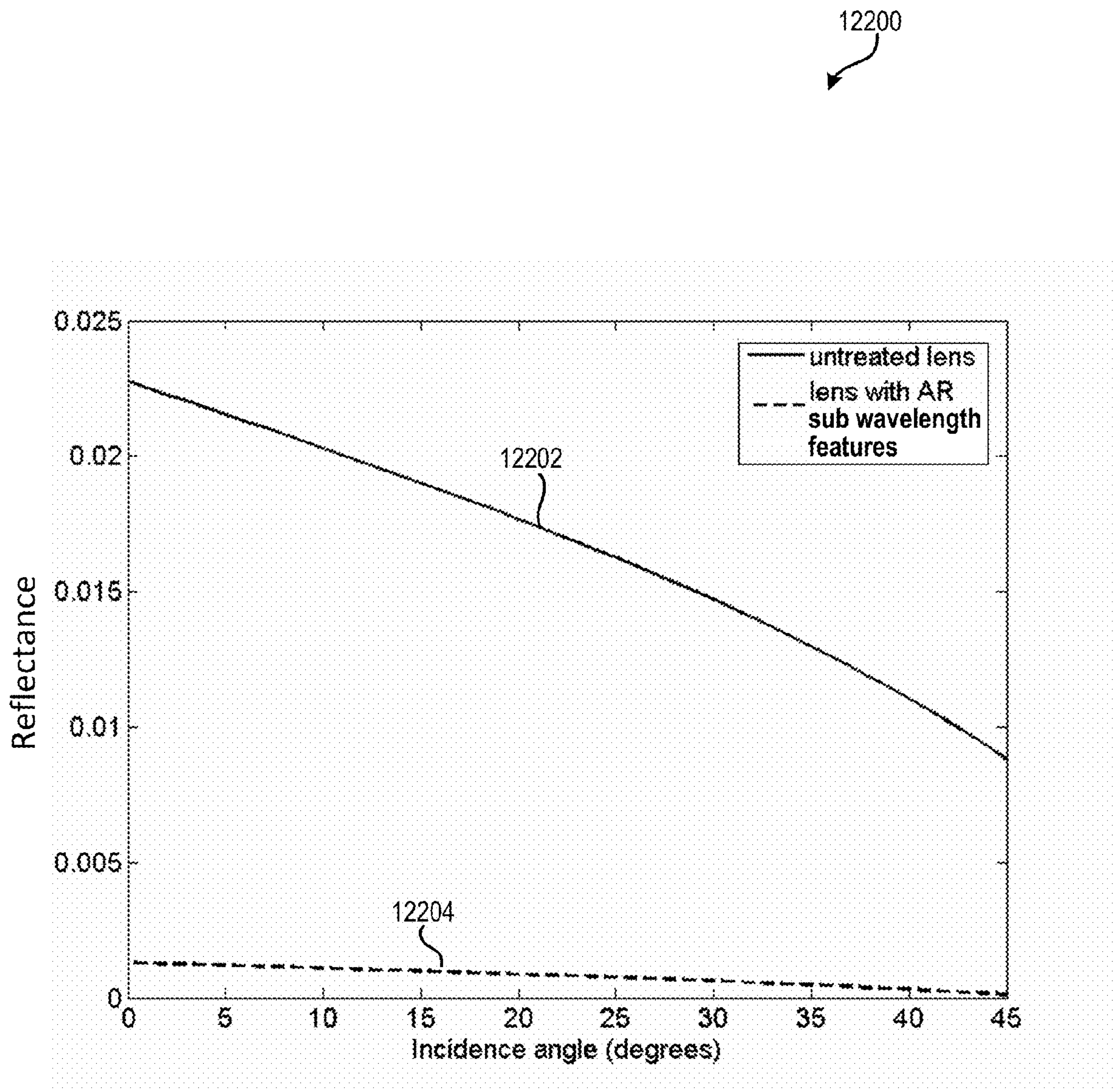

FIG. 401 is a plot of reflectance as a function of angle of incidence of electromagnetic energy incident on an exemplary optical element.

Figure 402:
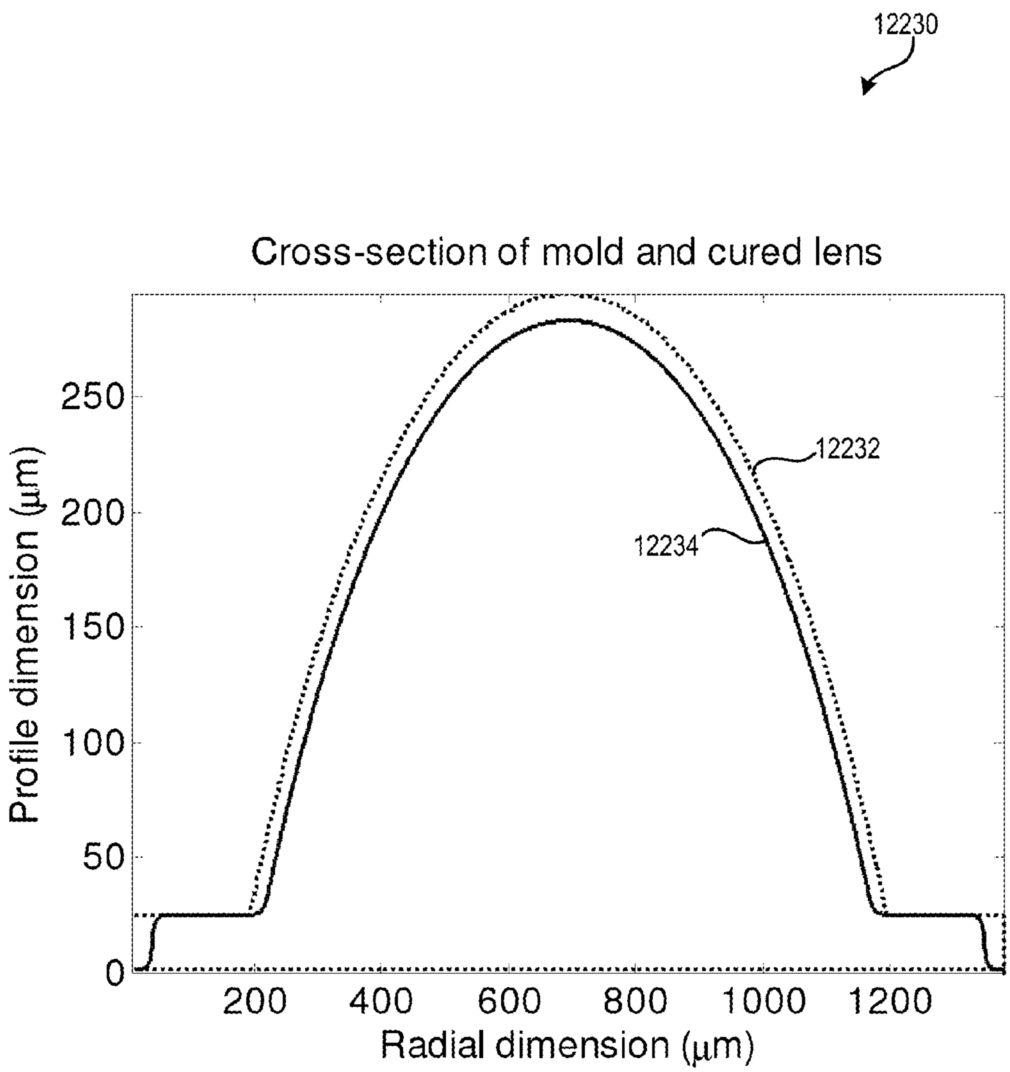

FIG. 402 is a plot of cross-sections of a mold and a cured optical element, showing shrinkage effects.

Figure 403:
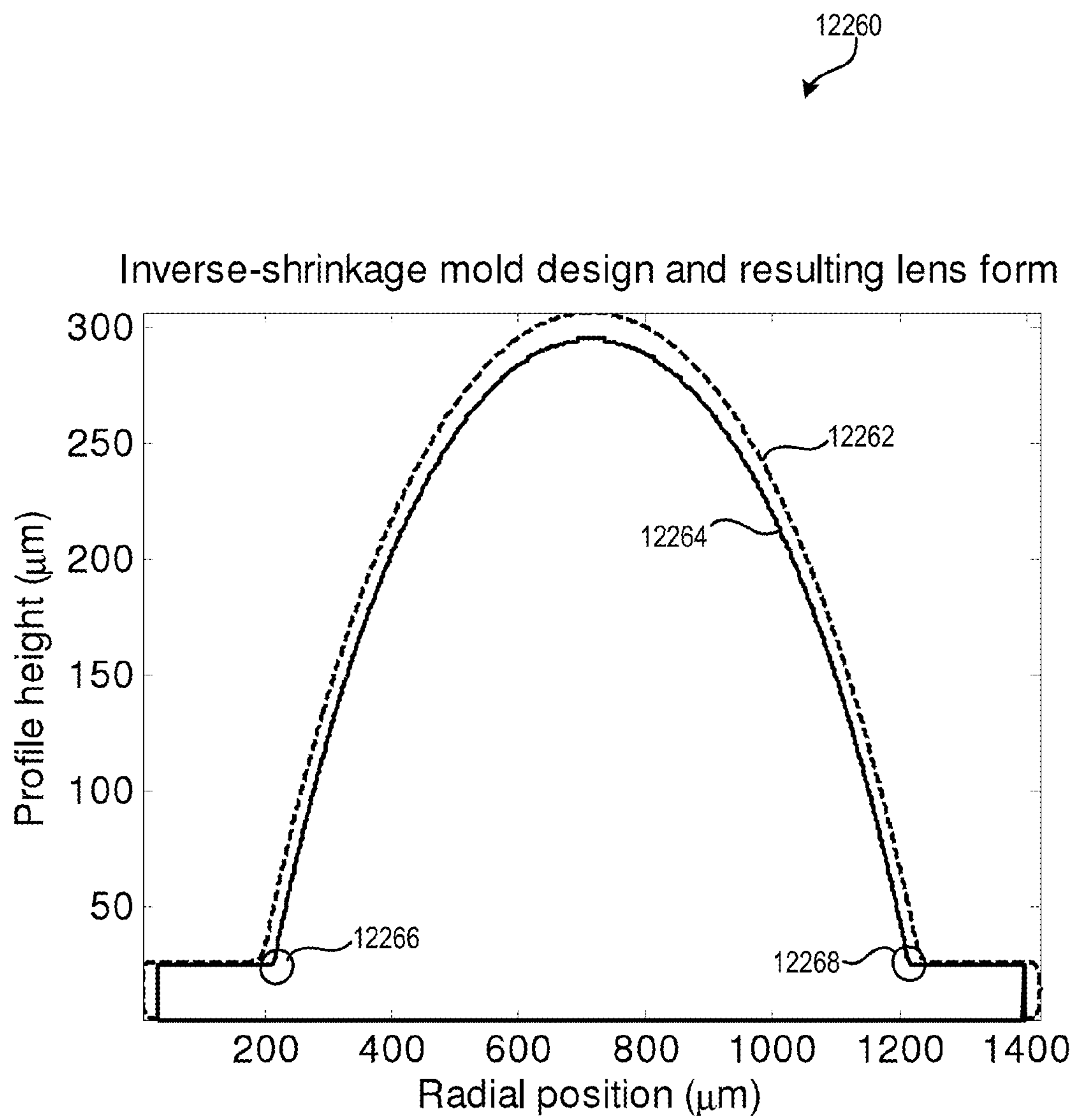

FIG. 403 is a plot of cross-sections of a mold and a cured optical element, showing accommodation of shrinkage effects.

Figure 404A:
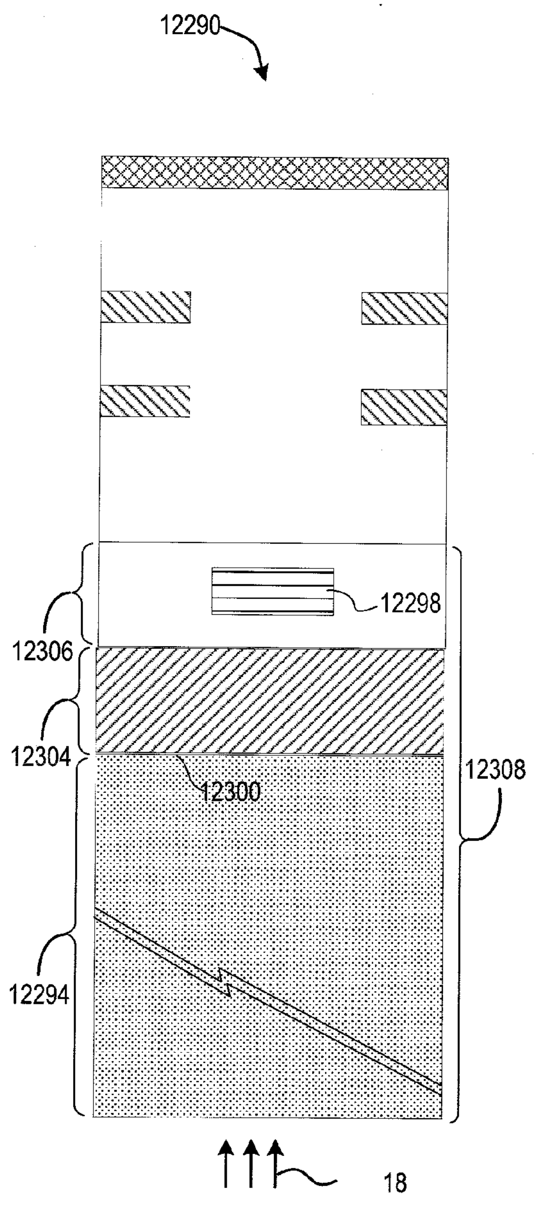
Figure 404B:
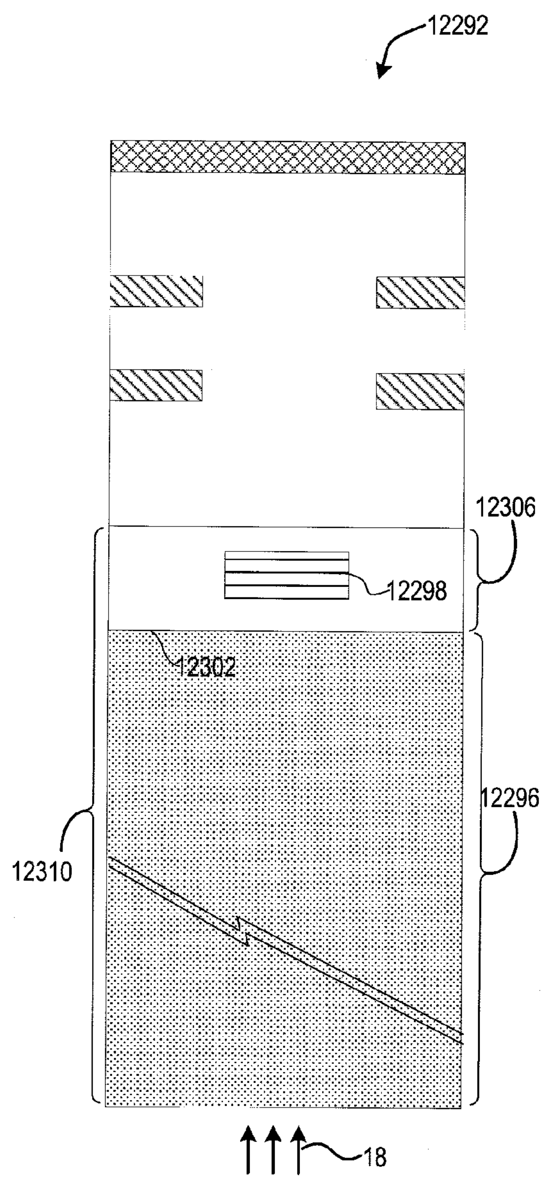

FIGS. 404A and 404B show cross-sectional illustrations of two detector pixels formed on different types of backside-thinned silicon wafers, according to an embodiment.

Figure 405:
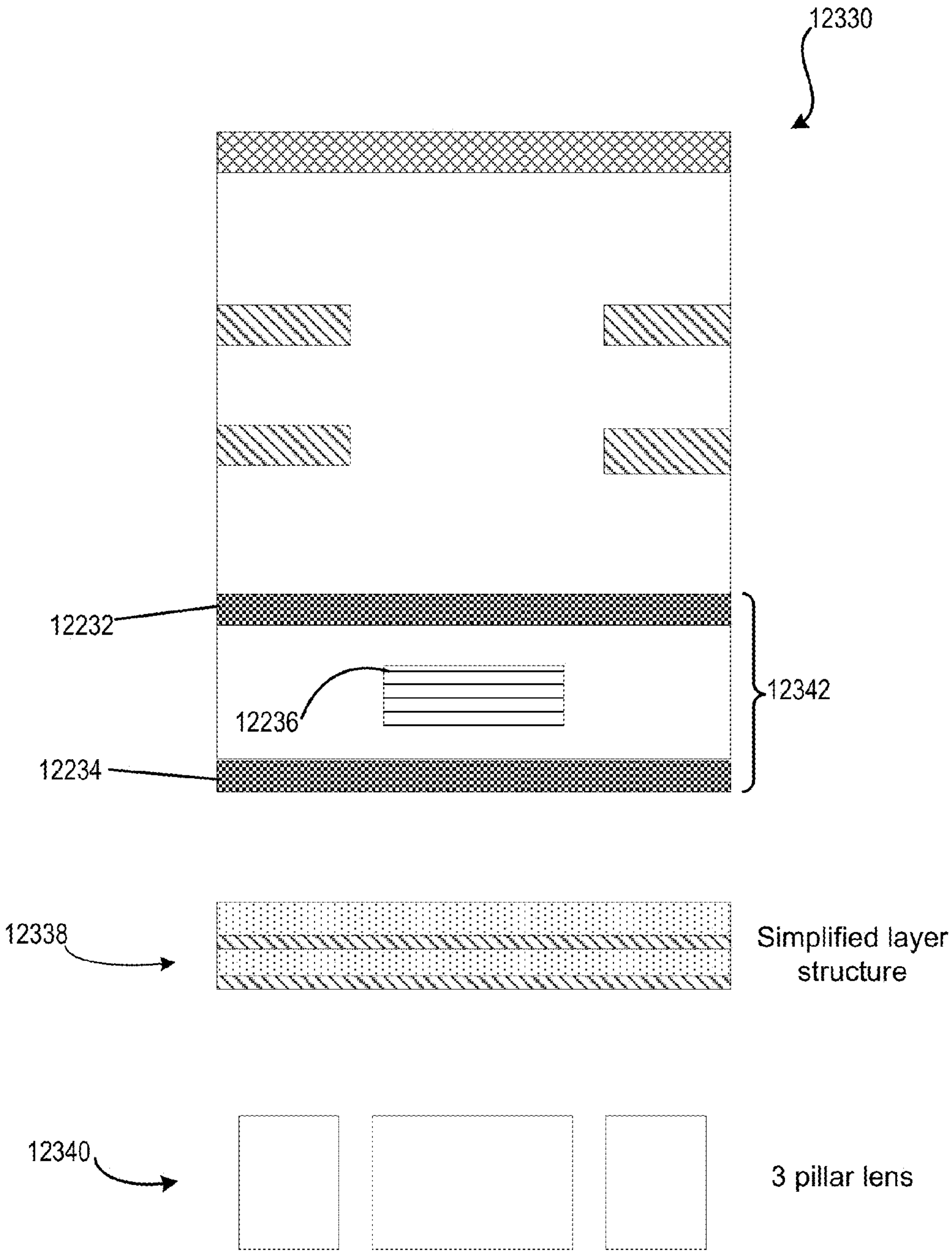

FIG. 405 shows a cross-sectional illustration of one detector pixel configured for backside illumination as well as a layer structure and three-pillar metalens that may be used with the detector pixel, according to an embodiment.

Figure 406:
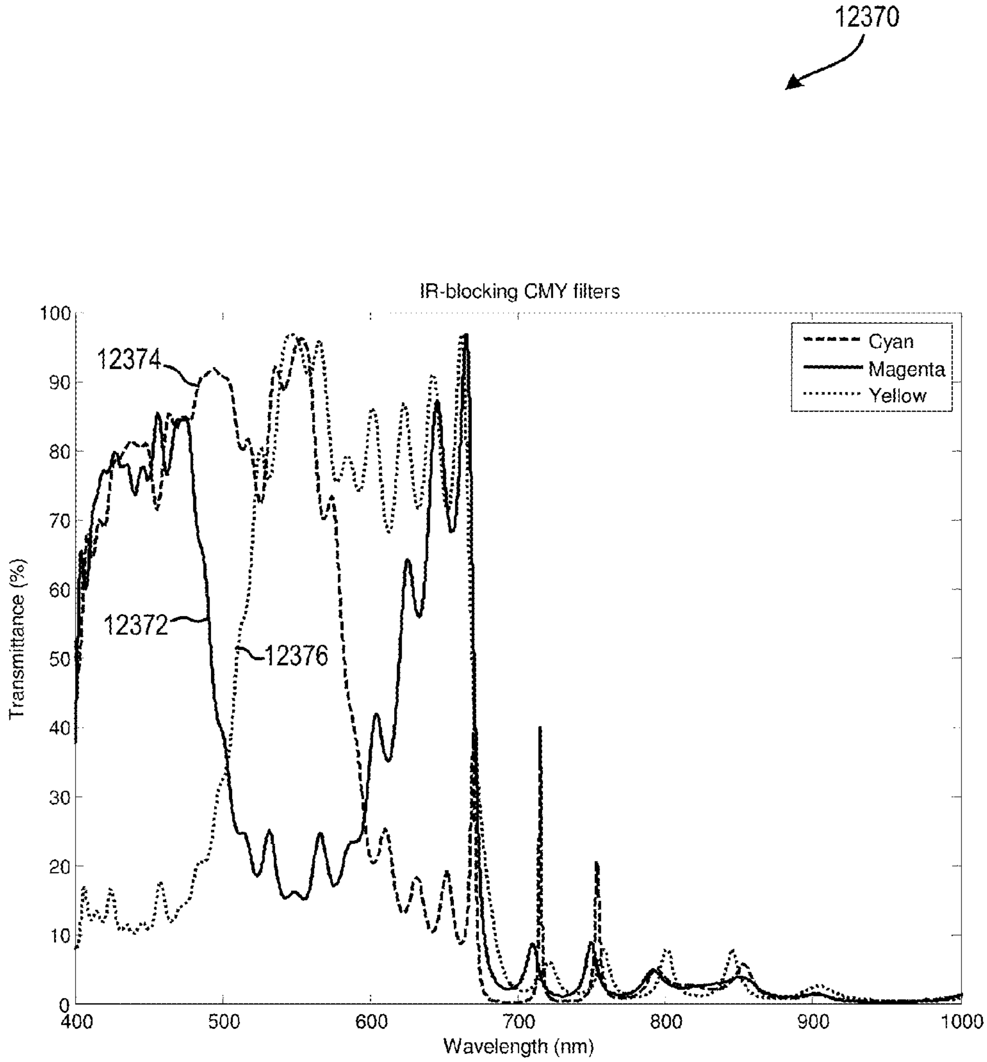

FIG. 406 shows a plot of transmittance as a function of wavelength for a combination color and infrared blocking filter that may be fabricated for use with a detector pixel configured for backside illumination.

Figure 407:
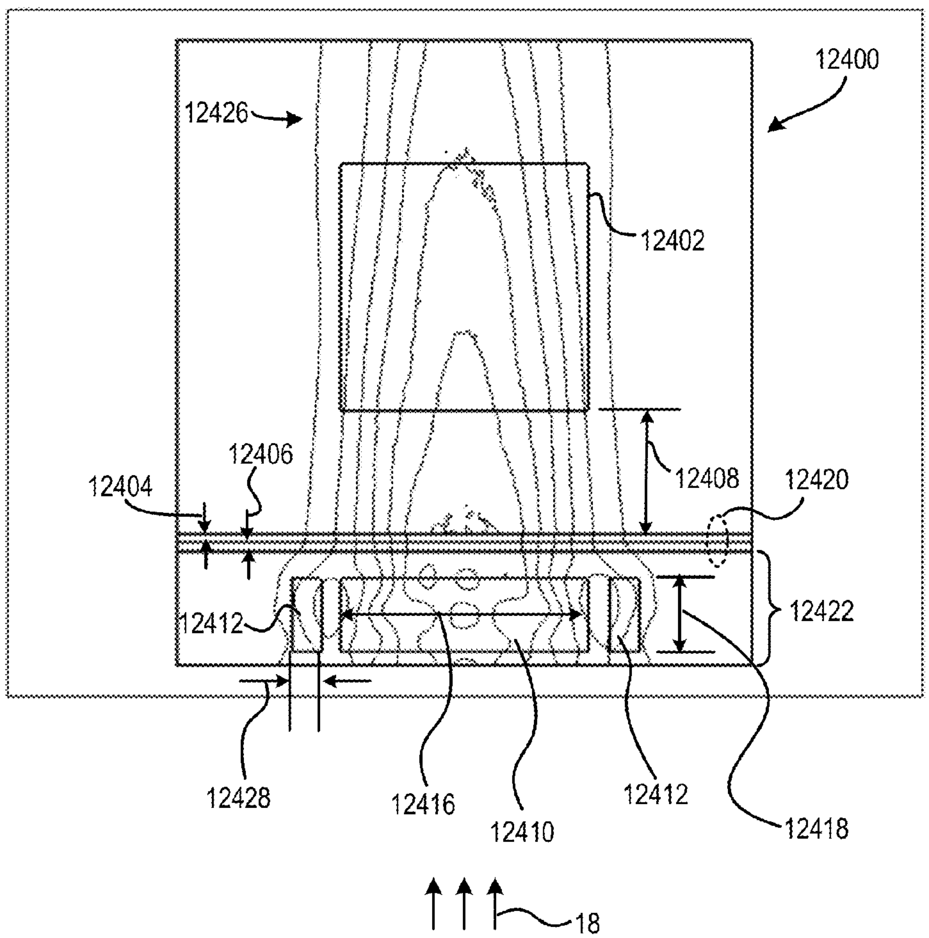

FIG. 407 is cross-sectional illustration of one detector pixel configured for backside illumination, according to an embodiment.

Figure 408:
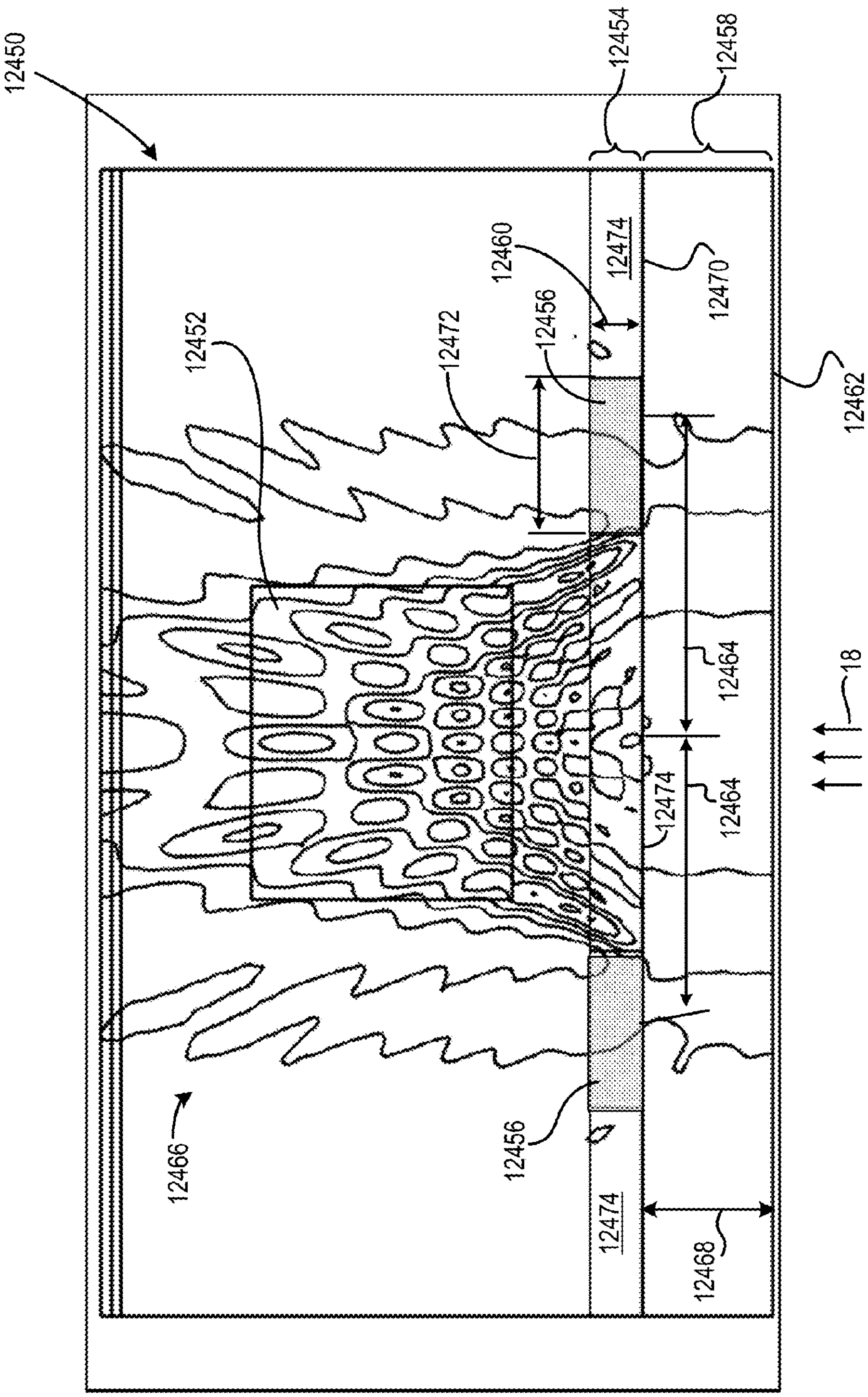

FIG. 408 is cross-sectional illustration of one detector pixel configured for backside illumination, according to an embodiment.

Figure 409:
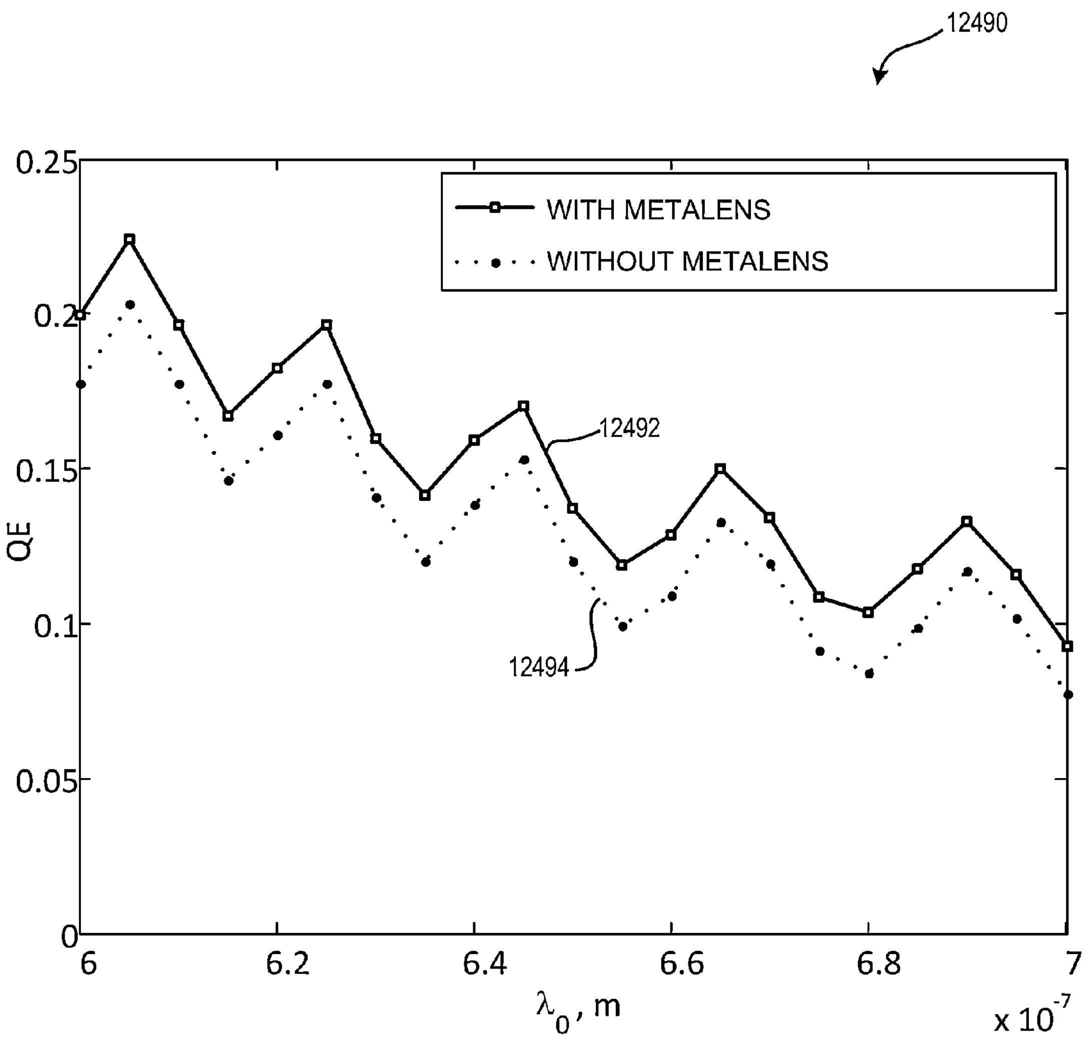

FIG. 409 is a plot of quantum efficiency as a function of wavelength for the detector pixel of FIG. 408.

DETAILED DESCRIPTION OF ILLUSTRATED EMBODIMENTS

The present disclosure discusses various aspects related to arrayed imaging systems and associated processes. In particular, design processes and related software, multi-index optical elements, wafer-scale arrangements of optics, fabrication masters for forming or molding a plurality of optics, replication and packaging of arrayed imaging systems, detector pixels having optical elements formed therein, and additional embodiments of the above-described systems and processes are disclosed. In other words, the embodiments described in the present disclosure provide details of arrayed imaging systems from design generation and optimization to fabrication and application to a variety of uses.

For example, the present disclosure discuss the fabrication of imaging systems, such as cameras for consumers and integrators, manufacturable with optical precision on a mass production scale. Such a camera, manufactured in accordance with the present disclosure, provides superior optics, high quality image processing, unique electronic sensors and precision packaging over existing cameras. Manufacturing techniques discussed in detail hereinafter allow nanometer precision fabrication and assembly, on a mass production scale that rivals the modern production capability of, for instance, microchip industries. The use of advanced optical materials in cooperation with precision semiconductor manufacturing and assembly techniques enables image detectors and image signal processing to be combined with precision optical elements for optimal performance and cost in mass produced imaging systems. The techniques discussed in the present disclosure allow the fabrication of optics compatible with processes generally used in detector fabrication; for example, the precision optical elements of the present disclosure may be configured to withstand high temperature processing associated with, for instance, reflow processes used in detector fabrication. The precision fabrication, and the superior performance of the resulting cameras, enables application of such imaging systems in a variety of technology areas; for example, the imaging systems disclosed herein are suitable for use in mobile imaging markets, such as hand-held or wearable cameras and phones, and in transportation sectors such as the automotive and shipping industries. Additionally, the imaging systems manufactured in accordance with the present disclosure may be used for, or integrated into, home and professional security applications, industrial control and monitoring, toys and games, medical devices and precision instruments and hobby and professional photography.

In accordance with an embodiment, multiple cameras may be manufactured as coupled units, or individual camera units can be integrated by an original equipment manufacturer ("OEM") integrator as a multi-viewer system of cameras. Not all cameras in multi-view systems need be identical, and the high precision fabrication and assembly techniques, disclosed herein, allow a multitude of configurations to be mass produced. Some cameras in a multi-camera system may be low resolution and perform simple tasks, while other cameras in the immediate vicinity or elsewhere may cooperate to form high quality images.

In another embodiment, processors for image signal processing, machine tasks, and input/output ("I/O") subsystems may also be integrated with the cameras using the precision fabrication and assembly techniques, or can be distributed throughout an integrated system. For instance, a single processor may be relied upon by any number of cameras, performing similar or different tasks as the processor communicates with each camera. In other applications, a single camera, or multiple cameras integrated into a single imaging system, may provide input to, or processing for, a broad variety of external processors and I/O subsystems to perform tasks and provide information or control queues. The high precision fabrication and assembly of the camera enables electronic processing and optical performance to be optimized for mass production with high quality.

Packaging for the cameras, in accordance with the present disclosure, may also integrate all packaging necessary to form a complete camera unit for off-the-shelf use. Packaging may be customized to permit mass production using the types of modern assembly techniques typically associated with electronic devices, semiconductors and chip sets. Packaging may also be configured to accommodate industrial and commercial uses such as process control and monitoring, barcode and label reading, security and surveillance, and cooperative tasks. The advanced optical materials and precision fabrication and assembly may be configured to cooperate and provide robust solutions for use in harsh environments that may degrade prior art systems. Increased tolerance to thermal and mechanical stress coupled with monolithic assemblies provides stable image quality through a broad range of stresses.

Applications for the imaging system, in accordance with an embodiment, including use in hand held devices such as phones, Global Positioning System ("GPS") units and wearable cameras, benefit from the improved image quality and rugged utility in a precision package. The integrators for hand held devices gain flexibility and can leverage the ability to have optics, detector and signal processing combined in a single unit using precision fabrication, to provide an "optical system-on-a-chip." Hand held camera users may gain benefit from longer battery life due to low power processing, smaller and thinner devices, and new capabilities, such as barcode reading and optical character recognition for managing information. Security may also be provided through biometric analysis such as iris identification using hand held devices with the identification and/or security processing built into the camera or communicated across a network.

Applications for mobile markets, such as transportation including automobiles and heavy trucks, shipping by rail and sea, air travel and mobile security, all may benefit from having inexpensive, high quality cameras that are mass produced. For instance, the driver of an automobile would benefit from increased monitoring abilities external to the vehicle, such as imagery behind the vehicle and to the side, providing visual feedback and/or warning, assistance with "blind spot" visualization or monitoring of cargo attached to a rack or in a truck bed. Moreover, automobile manufacturers may use the camera for monitoring internal activities, occupant behavior and location as well as providing input to safety deployment devices. Security and monitoring of cargo and shipping containers, or airline activities and equipment, with a multitude of cooperating cameras may be achieved with low cost as a result of the mass producibility of the imaging systems of the present disclosure.

Within the context of the present disclosure, an optical element is understood to be a single element that affects the electromagnetic energy transmitted therethrough in some way. For example, an optical element may be a diffractive element, a refractive element, a reflective element or a holographic element. An array of optical elements is considered to be a plurality of optical elements supported on a common base. A layered optical element is monolithic structure including two or more layers having different optical properties (e.g., refractive indices), and a plurality of layered optical elements may be supported on a common base to form an array of layered optical elements. Details of design and fabrication of such layered optical elements are discussed at an appropriate juncture hereinafter. An imaging system is considered to be a combination of optical elements and layered optical elements that cooperate to form an image, and a plurality of imaging systems may be arranged on a common substrate to form arrayed imaging systems, as will be discussed in further detail hereinafter. Furthermore, the term optics is intended to encompass any of optical elements, layered optical elements, imaging systems, detectors, cover plates, spacers, etc., which may be assembled together in a cooperative manner.

Recent interest in imaging systems such as those for use in, for instance, cell phone cameras, toys and games has spurred further miniaturization of the components that make up the imaging system. In this regard, a low cost, compact imaging system with reduced misfocus-related aberrations, that is easy to align and manufacture, would be desirable.

The embodiments described herein provide arrayed imaging systems and methods for manufacturing such imaging systems. The present disclosure advantageously provides specific configurations of optics that enable high performance, methods of fabricating wafer-scale imaging systems that enable increased yields, and assembled configurations that may be used in tandem with digital image signal processing algorithms to improve at least one of image quality and manufacturability of a given wafer-scale imaging system.

Figures 1A, 1B, 1C:
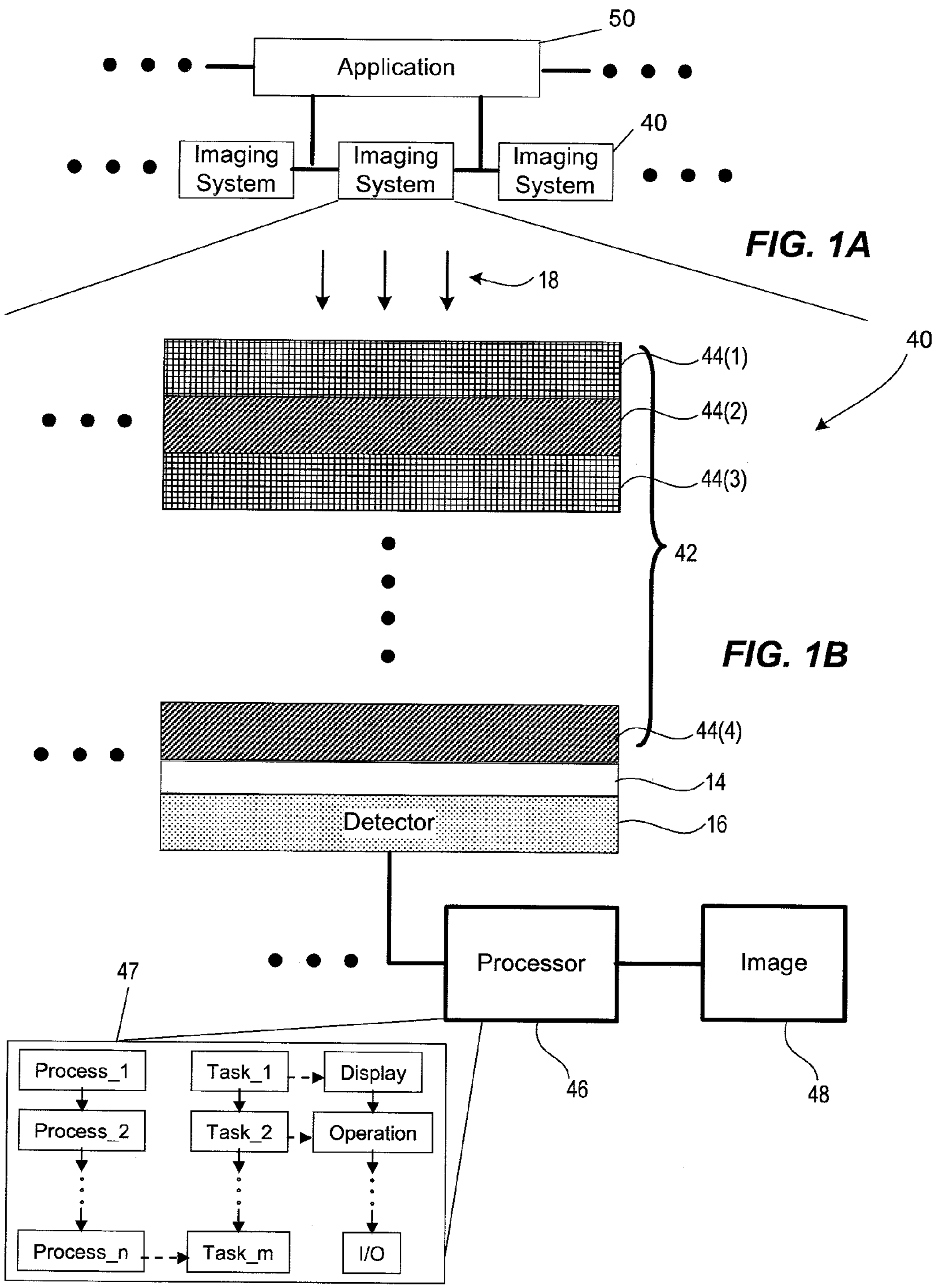
FIGS. 1A, 1B and 1C are block diagrams of imaging systems and associated arrangements thereof, according to an embodiment.

FIG. 1A shows an application 50 in communication with imaging systems 40. FIG. 1B is a block diagram of one such imaging system 40 including optics 42 in optical communication with detector 16. Optics 42 includes a plurality of optical elements 44 (e.g., sequentially formed as layered optical elements from polymer materials), and may include one or more phase modifying elements to introduce predetermined phase effects in imaging system 40, as will be described in detail at an appropriate juncture hereinafter. While four optical elements are illustrated in FIG. 1B, optics 42 may have a different number of optical elements. Imaging system 40 may also include buried optical elements (not shown) as described herein below incorporated into detector 16 or as part of optics-detector interface 14. Optics 42 is formed with many additional imaging systems, which may be identical to each other or different, and then may be separated to form individual units in accordance with the teachings herein.

Imaging system 40 includes a processor 46 electrically connected with detector 16. Processor 46 operates to process electronic data generated by detector pixels of detector 16 in accordance with electromagnetic energy 18 incident on imaging system 40, and transmitted to the detector pixels, to produce image 48. FIG. 1C is a block diagram of one processor 46 that may be associated with any number of operations 47 including processes, tasks, display operations, signal processing operations and input/output operations. In an embodiment, processor 46 implements a decoding algorithm (e.g., a deconvolution of the data using a filter kernel) to modify an image encoded by a phase modifying element included in optics 42. Alternatively, processor 46 may also implement, for example, color processing, task based processing or noise removal. An exemplary task may be a task of object recognition.

Imaging system 40 may work independently or cooperatively with one or more other imaging systems. For example, three imaging systems may work to view an object volume from three different perspectives to be able to complete a task of identifying an object in the object volume. Each imaging system may include one or more arrayed imaging systems, such as will be described in detail with reference to FIG. 293. The imaging systems may be included within a larger application 50, such as a package sorting system or automobile that many also include one or more other imaging systems.

Figure 2A:
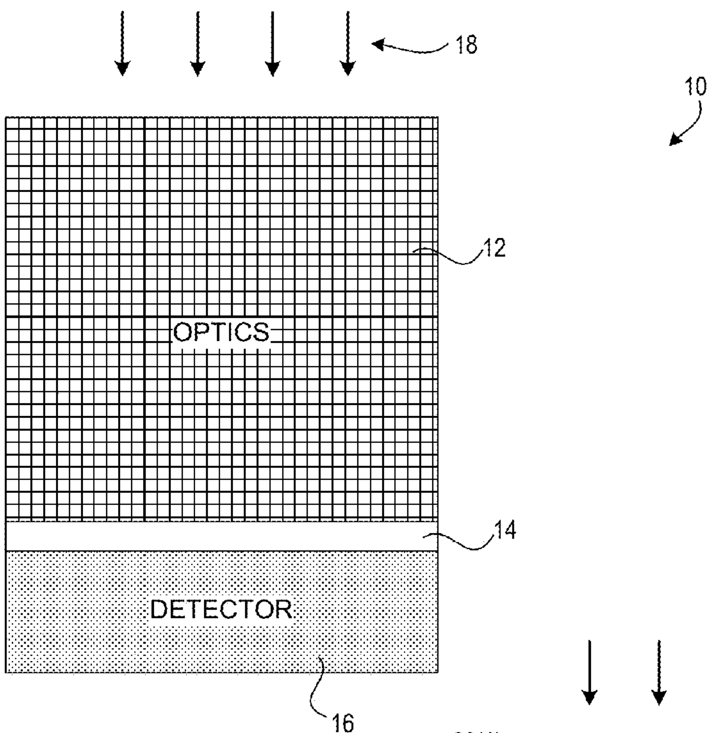
FIG. 2A is a cross-sectional illustration of one imaging system, according to an embodiment.

FIG. 2A is a cross-sectional illustration of an imaging system 10 that creates electronic image data in accordance with electromagnetic energy 18 incident thereon. Imaging system 10 is thus operable to capture an image (in the form of electronic image data) of a scene of interest from electromagnetic energy 18 emitted and/or reflected from the scene of interest. Imaging system 10 may be used in imaging system applications including, but not limited to, digital cameras, mobile telephones, toys, and automotive rear view cameras.

Imaging system 10 includes a detector 16, an optics-detector interface 14, and optics 12 which cooperatively create the electronic image data. Detector 16 is, for example, a CMOS detector or a charge-coupled device ("CCD") detector. Detector 16 has a plurality of detector pixels (not shown); each pixel is operable to create part of the electronic image data in accordance with part of electromagnetic energy 18 incident thereon. In the embodiment illustrated in FIG. 2A, detector 16 is a VGA detector having 640 by 480 detector pixels of 2.2 micron pixel size; such detector is operable to provide 307,160 elements of electronic data, wherein each element of electronic data represents electromagnetic energy incident on its respective detector pixel.

Optics-detector interface 14 may be formed on detector 16. Optics-detector interface 14 may include one or more filters, such as an infrared filter and a color filter. Optics-detector interface 14 may also include optical elements, e.g., an array of lenslets, disposed over detector pixels of detector 16, such that a lenslet is disposed over each detector pixel of detector 16. These lenslets are for example operable to direct part of electromagnetic energy 18 passing through optics 12 onto associated detector pixels. In one embodiment, lenslets are included in optics-detector interface 14 to provide chief ray angle correction as hereinafter described.

Optics 12 may be formed on optics-detector interface 14 and is operable to direct electromagnetic energy 18 onto optics-detector interface 14 and detector 16. As discussed below, optics 12 may include a plurality of optical elements and may be formed in different configurations. Optics 12 generally includes a hard aperture stop, shown later, and may be wrapped in an opaque material to mitigate stray light.

Although imaging system 10 is illustrated in FIG. 2A as being a stand alone imaging system, it is initially fabricated as one of arrayed imaging systems. This array is formed on a common base and is, for example, separable by "dicing" (i.e., physical cutting or separation) to create a plurality of singulated or grouped imaging systems, one of which is illustrated in FIG. 2A. Alternately, imaging system 10 may remain as part of an array (e.g., nine imaging systems cooperatively disposed) of imaging systems 10, as discussed below; that is, the array either is kept intact or is separated into a plurality of sub-arrays of imaging systems 10.

Arrayed imaging systems 10 may be fabricated as follows. A plurality of detectors 16 are formed on a common semiconductor wafer (e.g., silicon) using a process such as CMOS. Optics-detector interfaces 14 are subsequently formed on top of each detector 16, and optics 12 is then formed on each optics-detector interface 14, for example through a molding process. Accordingly, components of arrayed imaging systems 10 may be fabricated in parallel; for example, each detector 16 may be formed on the common semiconductor wafer at the same time, and then each optical element of optics 12 may be formed simultaneously. Replication methods for fabricating the components of arrayed imaging systems 10 may involve the use of a fabrication master that includes a negative profile, possibly shrinkage compensated, of the desired surface. The fabrication master is engaged with a material (e.g., liquid monomer) which may be treated (e.g., ultraviolet light "UV" cured) to harden (e.g., polymerize) and retain the shape of the fabrication master. Molding methods, generally, involve introduction of a flowable material into a mold and then cooling or solidifying the material whereupon the material retains the shape of the mold. Embossing methods are similar to replication methods, but involve engaging the fabrication master with a pliable, formable material and then optionally treating the material to retain the surface shape. Many variations of each of these methods exist in the prior art and may be exploited as appropriate to meet the design and quality constraints of the intended optical design. Specifics of the processes for forming such arrays of imaging systems 10 are discussed in more detail below.

As discussed below, additional elements (not shown) may be included in imaging system 10. For example, a variable optical element may be included in imaging system 10; such variable optical element may be useful in correcting for aberrations of imaging system 10 and/or implementing zoom functionality in imaging system 10. Optics 12 may also include one or more phase modifying elements to modify the phase of the wavefront of electromagnetic energy 18 transmitted therethrough such that an image captured at detector 16 is less sensitive to, for instance, aberrations as compared to a corresponding image captured at detector 16 without the one or more phase modifying elements. Such use of phase modifying elements may include, for example, wavefront coding, which may be used, for example, to increase a depth of field of imaging system 10 and/or implement a continuously variable zoom.

If present, the one or more phase modifying elements encodes a wavefront of electromagnetic energy 18 passing through optics 12 before it is detected by detector 16 by selectively modifying phase of a wavefront of electromagnetic energy 18. For example, the resulting image captured by detector 16 may exhibit imaging effects as a result of the encoding of the wavefront. In applications that are not sensitive to such imaging effects, such as when the image is to be analyzed by a machine, the image (including the imaging effects) captured by detector 16 may be used without further processing. However, if an in-focus image is desired, the captured image may be further processed by a processor (not shown) executing a decoding algorithm (sometimes denoted herein as "post processing" or "filtering").

Figure 2B:
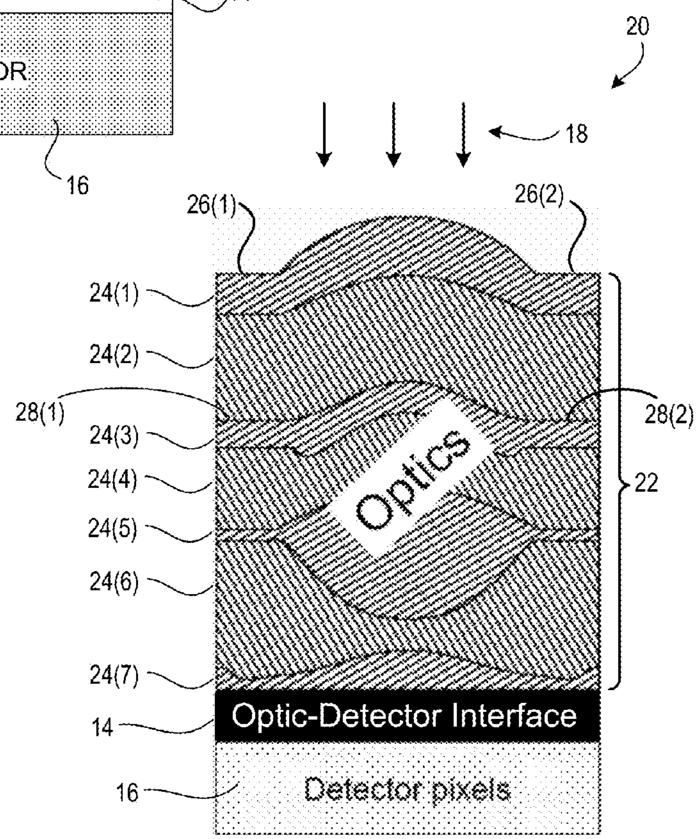
FIG. 2B is a cross-sectional illustration of one imaging system, according to an embodiment.

FIG. 2B is a cross-sectional illustration of imaging system 20, which is an embodiment of imaging system 10 of FIG. 2A. Imaging system 20 includes optics 22, which is an embodiment of optics 12 of imaging system 10. Optics 22 includes a plurality of layered optical elements 24 formed on optics-detector interface 14; thus, optics 22 may be considered an example of non-homogenous or multi-index optical element. Each layered optical element 24 directly abuts at least one other layered optical element 24. Although optics 22 is illustrated as having seven layered optical elements 24, optics 22 may have a different quantity of layered optical elements 24. Specifically, layered optical element 24(7) is formed on optics-detector interface 14; layered optical element 24(6) is formed on layered optical element 24(7); layered optical element 24(5) is formed on layered optical element 24(6); layered optical element 24(4) is formed on layered optical element 24(5); layered optical element 24(3) is formed on layered optical element 24(4); layered optical element 24(2) is formed on layered optical element 24(3); and layered optical element 24(1) is formed on layered optical element 24(2). Layered optical elements 24 may be fabricated by molding, for example, an ultraviolet light curable polymer or a thermally curable polymer. Fabrication of layered optical elements is discussed in more detail below.

Adjacent layered optical elements 24 have a different refractive index; for example, layered optical element 24(1) has a different refractive index than layered optical element 24(2). In an embodiment of optics 22, first layered optical element 24(1) may have a larger Abbe number, or smaller dispersion, than the second layered optical element 24(2) in order to reduce chromatic aberration of imaging system 20. Anti-reflection coatings made from subwavelength features forming an effective index layer or a plurality of layers of subwavelength thicknesses may be applied between adjacent optical elements. Alternatively, a third material with a third refractive index may be applied between adjacent optical elements. The use of two different materials having different refractive indices is illustrated in FIG. 2B: a first material is indicated by cross hatching extending upward from left to right, and a second material is indicated by cross hatching extending downward from left to right. Accordingly, layered optical elements 24(1), 24(3), 24(5), and 24(7) are formed of the first material, and layered optical elements 24(2), 24(4), and 24(6) are formed of the second material, in this example.

Although layered optical elements are illustrated in FIG. 2B as being formed of two materials, layered optical elements 24 may be formed of more than two materials. Decreasing a quantity of materials used to form layered optical elements 24 may reduce complexity and/or cost of imaging system 20; however increasing the quantity of materials used to form layered optical elements 24 may increase performance of imaging system 20 and/or flexibility in design of imaging system 20. For example, in embodiments of imaging system 20, aberrations including axial color may be reduced by increasing the number of materials used to form layered optical elements 24.

Optics 22 may include one or more physical apertures (not shown). Such apertures may be disposed on top planar surfaces 26(1) and 26(2) of optics 22, for example. Optionally, apertures may be disposed on one or more layered optical element 24; for example, apertures may be disposed on planar surfaces 28(1) and 28(2) bounding layered optical elements 24(2) and 24(3). By way of example, an aperture may be formed by a low temperature deposition of metal or other opaque material onto a specific layered optical element 24. In another example, an aperture is formed on a thin metal sheet using lithography, and that metal sheet is then disposed on a layered optical element 24.

Figures 3A, 3B:
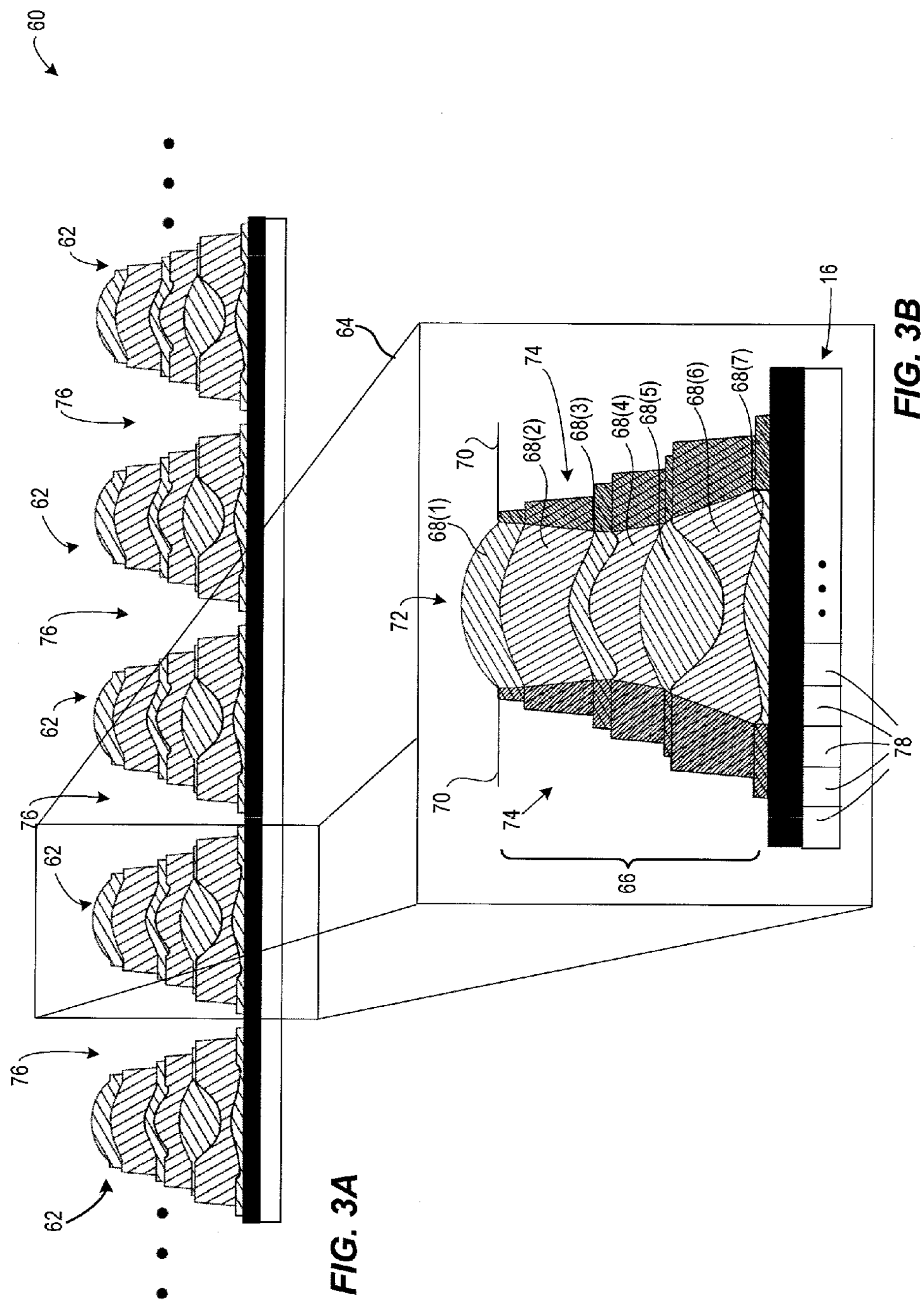
FIGS. 3A and 3B are cross-sectional illustrations of arrayed imaging systems, according to an embodiment.

FIG. 3A is a cross-sectional illustration of an array 60 of imaging systems 62, each of which is, for example, an embodiment of imaging system 10 of FIG. 2A. FIG. 3B shows one imaging system 62 in greater detail. Although array 60 is illustrated as having five imaging systems 62, array 60 can have a different quantity of imaging systems 62 without departing from the scope hereof. Furthermore, although each imaging system of array 60 is illustrated as being identical, each imaging system 62 of array 60 may be different (or any one may be different). Array 60 may again be separated to create sub-arrays and/or one or more stand alone imaging systems 62. Although array 60 shows an evenly spaced group of imaging systems 62, it may be noted that one or more imaging systems 62 may be left unformed, thereby leaving a region devoid of an optics.

FIG. 3B represents a close up view of one instance of one imaging system 62. Imaging system 62 includes optics 66, which is an embodiment of optics 12, of FIG. 2A, fabricated on detector 16. Detector 16 includes detector pixels 78, which are not drawn to scale—the size of detector pixels 78 are exaggerated for illustrative clarity. A cross-section of detector 16 would likely have at least hundreds of detector pixels 78.

Optics 66 includes a plurality of layered optical elements 68, which may be similar to layered optical elements 24 of FIG. 2B. Layered optical elements 68 are illustrated as being formed of two different materials as indicated by the two different styles of cross-hatching; however, layered optical elements 68 may be formed of more than two materials. It should be noted that the diameter of layered optical elements 68 decreases as the distance of layered optical elements 68 from detector 16 increases, in this embodiment. Thus, layered optical element 68(7) has the largest diameter, and layered optical element 68(1) has the smallest diameter. Such configuration of layered optical elements 68 may be referred to as a "layer cake" configuration; such configuration may be advantageously used in an imaging system to reduce an amount of surface area between a layered optical element and a fabrication master used to fabricate the layered optical element, such as described herein below. Extensive surface area contact between a layered optical element and the fabrication master may be undesirable because material used to form the layered optical element may adhere to the fabrication master, potentially tearing off the array of layered optical elements from the common base (e.g., a substrate or a wafer supporting an array of detectors) when the fabrication master is disengaged.

Optics 66 includes a clear aperture 72 through which electromagnetic energy is intended to travel to reach detector 16; the clear aperture in this example is formed by a physical aperture 70 disposed on optical element 68(1), as shown. Areas of optics 66 outside of clear aperture 72 are represented by reference numbers 74 and may be referred to as "yards"—electromagnetic energy (e.g., 18, FIG. 1B) is inhibited from traveling through the yards because of aperture 70. Areas 74 are not used for imaging of the incident electromagnetic energy and are therefore able to be adapted to fit design constraints. Physical apertures like aperture 70 may be disposed on any one layered optical element 68, and may be formed as discussed above with respect to FIG. 2B. The sides of the optics 66 may be coated with an opaque protective layer that will prevent physical damage to, or dust contamination of, the optics 66; the protective layer will also prevent stray or ambient light, for example stray light that is due to multiple reflections from the interface between layered optical element 68(2) and 68(3), or ambient light leaking through the sides of the optics 66, from reaching detector 16.

In an embodiment, spaces 76 between imaging systems 62 are filled with a filler material, such as a spin-on polymer. The filler material is for example placed in spaces 76, and array 60 is then rotated at a high speed such that the filler material evenly distributes itself within spaces 76. Filler material may provide support and rigidity to imaging systems 62; if the filler material is opaque, it may isolate each imaging system 62 from undesired (stray or ambient) electromagnetic energy after separating.

Figures 4A, 4B:
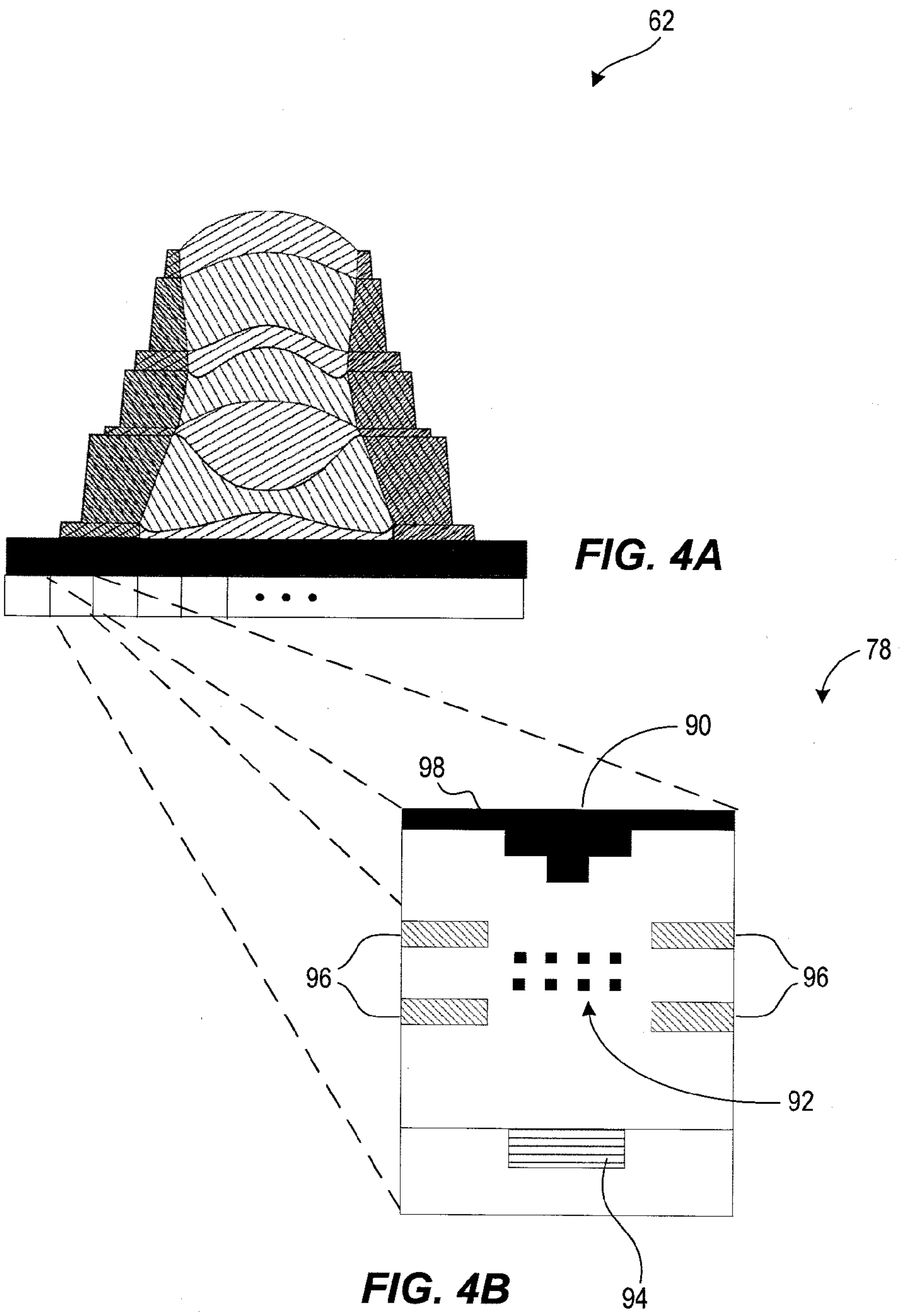
FIGS. 4A and 4B are cross-sectional illustrations of one imaging system of the arrayed imaging systems of FIG. 3A, according to an embodiment.

FIG. 4A is a cross-sectional illustration of an instance of imaging system 62 of FIG. 3B including (not to scale) an array of detector pixels 78. FIG. 4B shows an enlarged cross-sectional illustration of one detector pixel 78. Detector pixel 78 includes buried optical elements 90 and 92, photosensitive region 94, and metal interconnects 96. Photosensitive region 94 creates an electronic signal in accordance with electromagnetic energy incident thereon. Buried optical elements 90 and 92 direct electromagnetic energy incident on a surface 98 to photosensitive region 94. In an embodiment, buried optical elements 90 and/or 92 may be further configured to perform chief ray angle correction as described below. Electrical interconnects 96 are electrically connected to photosensitive region 94 and serve as electrical connection points for connecting detector pixel 78 to an external subsystem (e.g., processor 46 of FIG. 1B).

Multiple embodiments of imaging system 10 are discussed herein. TABLES 1 and 2 summarize various parameters of the described embodiments. Specifics of each embodiment are discussed in detail immediately hereinafter. In TABLES 1 and 2, field of view is designated as "FOV" and chief ray angle is designated as "CRA."

TABLE 1

| DESIGN | Focal length (mm) | FOV (°) | F/# | Total Track (mm) | Max CRA (°) | # of Layers |
|---|---|---|---|---|---|---|
| VGA | 1.50 | 62 | 1.3 | 2.25 | 31 | 7 |
| 3MP | 4.91 | 60 | 2.0 | 6.3 | 28.5 | 9 + glass plate + air gap |
| VGA_WFC | 1.60 | 62 | 1.3 | 2.25 | 31 | 7 |

TABLE 1-continued

| DESIGN | Focal length (mm) | FOV (°) | F/# | Total Track (mm) | Max CRA (°) | # of Layers |
|---|---|---|---|---|---|---|
| VGA_AF | 1.50 | 62 | 1.3 | 2.25 | 31 | 7 + thermally adjustable lens |
| VGA_W | 1.55 | 62 | 2.9 | 2.35* | 29 | 6 + cover plate + detector cover plate |
| VGA_S_WFC | 0.98 | 80 | 2.2 | 2.1* | 30 | NA |
| VGA_O/ VGA_O1 | 1.50/1.55 | 62 | 1.3 | 2.45 | 28/26 | 7 |

*includes 0.4 mm thick cover plate

TABLE 2

| DESIGN | Focal length (mm) Tele/Wide | FOV (°) Tele/Wide | F/# Tele/Wide | Total Track (mm) Tele/Wide | Max CRA (°) Tele/Wide | Zoom Ratio | # of Groups |
|---|---|---|---|---|---|---|---|
| Z_VGA_W | 4.29/2.15 | 24/50 | 5.56/3.84 | 6.05*/6.05* | 12/17 | 2 | 2 |
| Z_VGA_LL | 3.36/1.68 | 29/62 | 1.9/1.9 | 8.25/8.25 | 25/25 | 2 | 3 |
| Z_VGA_LL_AF | 3.34/1.71 | 28/62 | 1.9/1.9 | 9.25/9.25 | 25/25 | Continuous zoom. Max zoom ratio is 1.95. | 3 + thermally adjustable lens |
| Z_VGA_LL_WFC | 3.37/1.72 | 28/60 | 1.7/1.7 | 8.3/8.3 | 22/22 | Continuous zoom. Max zoom ratio is 1.96. | 3 |

*includes 0.4 mm thick cover plate

Figure 5:
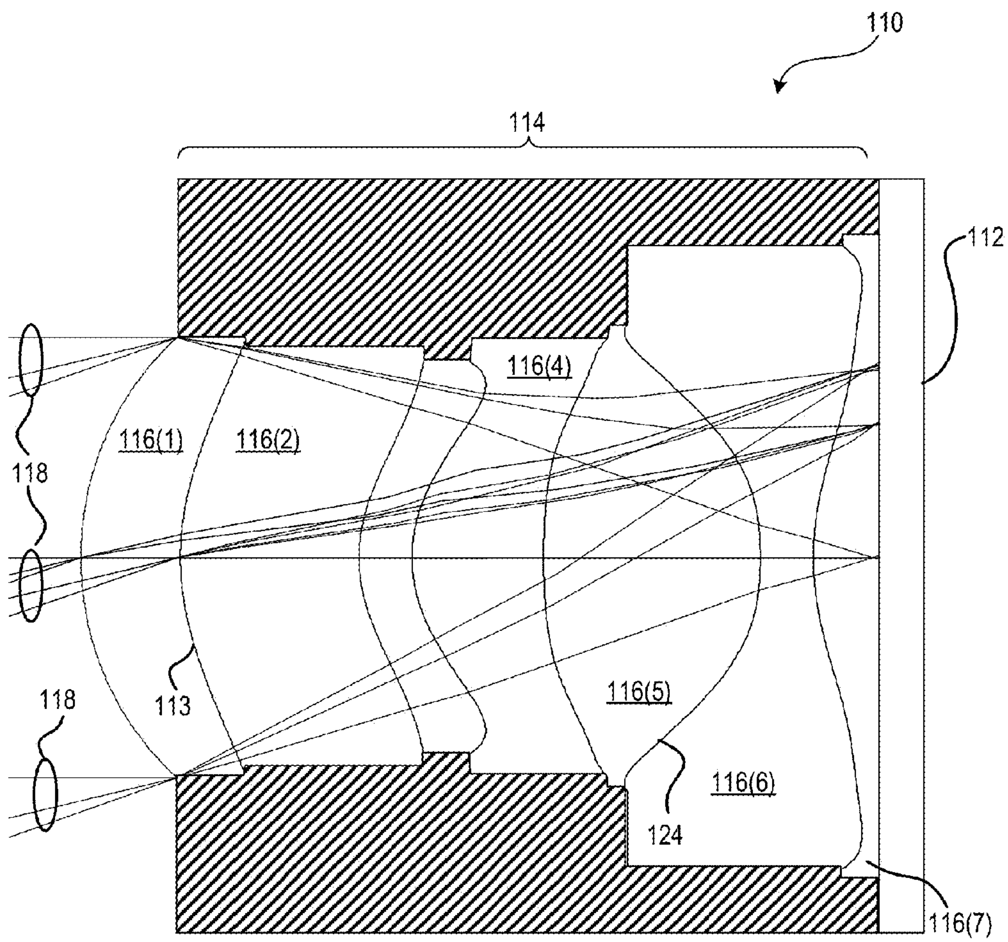
FIG. 5 is an optical layout and raytrace illustration of one imaging system, according to an embodiment.

FIG. 5 is an optical layout and raytrace illustration of an imaging system 110, which is an embodiment of imaging system 10 of FIG. 2A. In the present context, "VGA" stands for "video graphics array." Imaging system 110 is again one of arrayed imaging systems; such array may be separated into a plurality of sub-arrays and/or singulated imaging systems as discussed above with respect to FIG. 2A and FIG. 4A. Imaging system 110 may hereinafter be referred to as "the VGA imaging system." The VGA imaging system 110 includes optics 114 in optical communication with a detector 112. An optics-detector interface (not shown) is also present between optics 114 and detector 112. VGA imaging system 110 has a focal length of 1.50 millimeters ("mm"), a field of view of 62°, F/# of 1.3, a total track length of 2.25 mm, and a maximum chief ray angle of 31°. The cross hatched area shows the yard region, or the area outside the clear aperture, through which electromagnetic energy does not propagate, as earlier described.

Detector 112 has a "VGA" format, which means that it includes a matrix of detector pixels (not shown) of 640 columns and 480 rows. Thus, detector 112 may be said to have a resolution of 640×480. When observed from the direction of the incident electromagnetic energy, each detector pixel has a generally square shape with each side having a length of 2.2 microns. Detector 112 has a nominal width of 1.408 mm and a nominal height of 1.056 mm. The diagonal distance across a surface of detector 112 proximate to optics 114 is nominally 1.76 mm in length.

Optics 114 has seven layered optical elements 116. Layered optical elements 116 are formed of two different materials and adjacent layered optical elements are formed of different materials. Layered optical elements 116(1), 116(3), 116(5), and 116(7) are formed of a first material having a first refractive index, and layered optical elements 116(2), 116(4), and 116(6) are formed of a second material having a second refractive index. No air gaps exist between optical elements in the embodiment of optics 114. Rays 118 represent electromagnetic energy being imaged by VGA imaging system 110; rays 118 are assumed to originate from infinity. The equation for the sag is given by Eq. (1), and the prescription of optics 114 is summarized in TABLES 3 and 4, where radius, thickness and diameter are given in units of millimeters.

$$Sag = \frac{cr^2}{1+\sqrt{1-(1+k)c^2r^2}} + \sum_{i=2n} A_i r^i, \quad \text{Eq. (1)}$$

where $n=1, 2, \ldots, 8$;

$r=\sqrt{x^2+y^2}$;

$c=1/\text{Radius}$;

$k=\text{Conic}$;

$\text{Diameter}=2*\max(r)$; and $A_i$=aspheric coefficients.

TABLE 3

| Surface | Radius | Thickness | Refractive index | Abbe# | Diameter | Conic |
|---|---|---|---|---|---|---|
| OBJECT | Infinity | Infinity | air | | Infinity | 0 |
| STOP | 0.8531869 | 0.2778449 | 1.370 | 92.00 | 1.21 | 0 |
| 3 | 0.7026177 | 0.4992371 | 1.620 | 32.00 | 1.192312 | 0 |
| 4 | 0.5827148 | 0.1476905 | 1.370 | 92.00 | 1.089324 | 0 |
| 5 | 1.07797 | 0.3685015 | 1.620 | 32.00 | 1.07513 | 0 |
| 6 | 2.012126 | 0.6051814 | 1.370 | 92.00 | 1.208095 | 0 |
| 7 | −0.93657 | 0.1480326 | 1.620 | 32.00 | 1.284121 | 0 |
| 8 | 4.371518 | 0.1848199 | 1.370 | 92.00 | 1.712286 | 0 |
| IMAGE | Infinity | 0 | 1.458 | 67.82 | 1.772066 | 0 |

TABLE 4

| Surface# | $A_2$ | $A_4$ | $A_6$ | $A_8$ | $A_{10}$ | $A_{12}$ | $A_{14}$ | $A_{16}$ |
|---|---|---|---|---|---|---|---|---|
| 1 (Object) | 0 | 0 | 0 | 0 | 0 | 0 | 0 | 0 |
| 2 (Stop) | 0 | 0.2200 | −0.4457 | 0.6385 | −0.1168 | 0 | 0 | 0 |
| 3 | 0 | −1.103 | 0.1747 | 0.5534 | −4.640 | 0 | 0 | 0 |
| 4 | 0.3551 | −2.624 | −5.929 | 30.30 | −63.79 | 0 | 0 | 0 |
| 5 | 0.8519 | −0.9265 | −1.117 | −1.843 | −54.39 | 0 | 0 | 0 |
| 6 | 0 | 1.063 | 11.11 | −73.31 | 109.1 | 0 | 0 | 0 |
| 7 | 0 | −7.291 | 39.95 | −106.0 | 116.4 | 0 | 0 | 0 |
| 8 | 0.5467 | −0.6080 | −3.590 | 10.31 | −7.759 | 0 | 0 | 0 |

It may be observed from FIG. 5 that surface 113 between layered optical elements 116(1) and 116(2) is relatively shallow (resulting in low optical power); such shallow surface is advantageously created using a slow tool servo ("STS") method as discussed below. Conversely, it may be observed that surface 124 between layered optical element 116(5) and 116(6) is relatively steep (resulting in higher optical power); such steep surface is advantageously created using an XYZ milling method such as discussed below.

Figure 6:
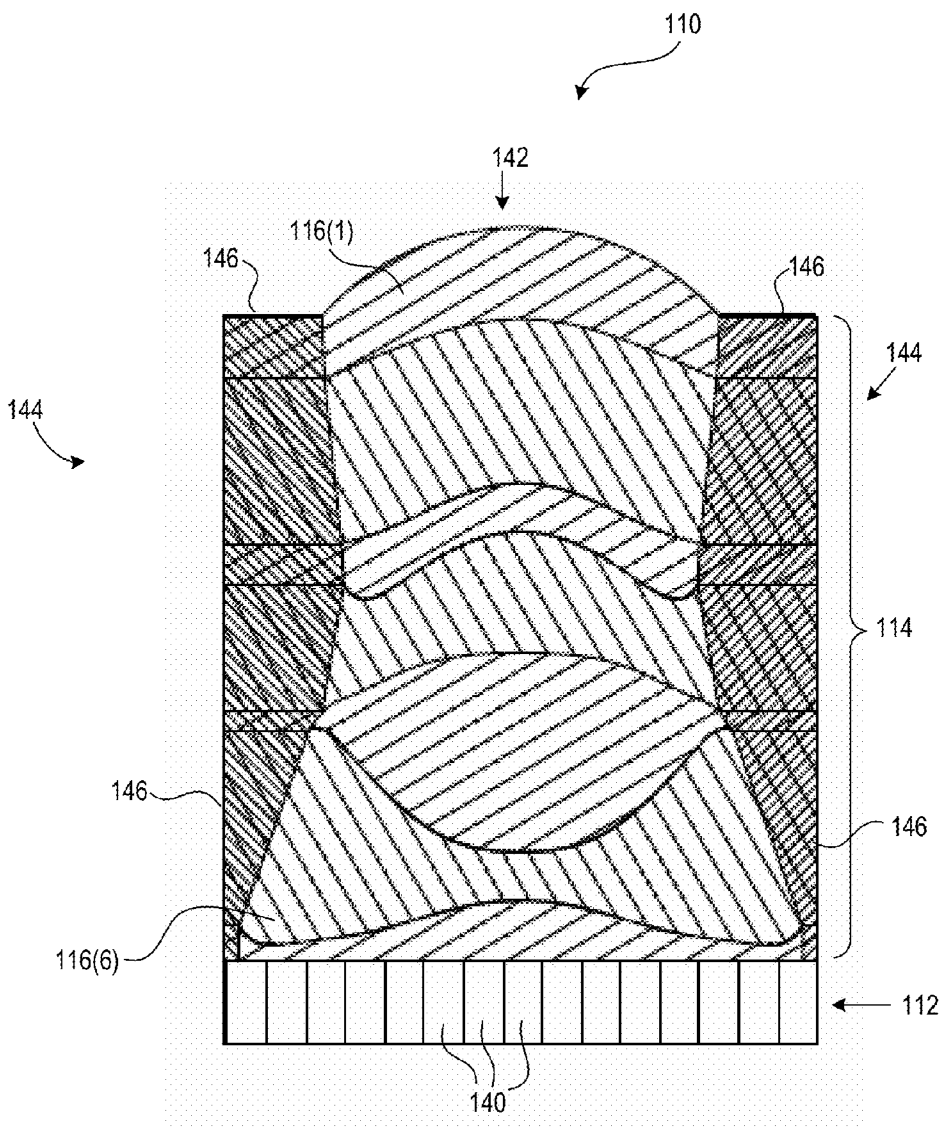
FIG. 6 is a cross-sectional illustration of the imaging system of FIG. 5, after being diced from arrayed imaging systems.

FIG. 6 is a cross-sectional illustration of VGA imaging system 110 of FIG. 5 obtained from separating an array of like imaging systems. Relatively straight sides 146 indicate that VGA imaging system 110 has been separated from arrayed imaging systems. FIG. 6 illustrates detector 112 as including a plurality of detector pixels 140. As in FIG. 3B, detector pixels 140 are not drawn to scale—their size is exaggerated for illustrative clarity. Furthermore, only three detector pixels 140 are labeled for illustrative clarity.

Optics 114 is shown with a clear aperture 142 corresponding to that part of optics 114 through which electromagnetic energy travels to reach detector 112. Yards 144 outside of clear aperture 142 are represented by dark shading in FIG. 6. For illustrative clarity, only layered optical elements 116(1) and 116(6) are labeled in FIG. 6. VGA imaging system 110 may include a physical aperture 148 disposed, for example, on layered optical element 116(1).

Figure 7:
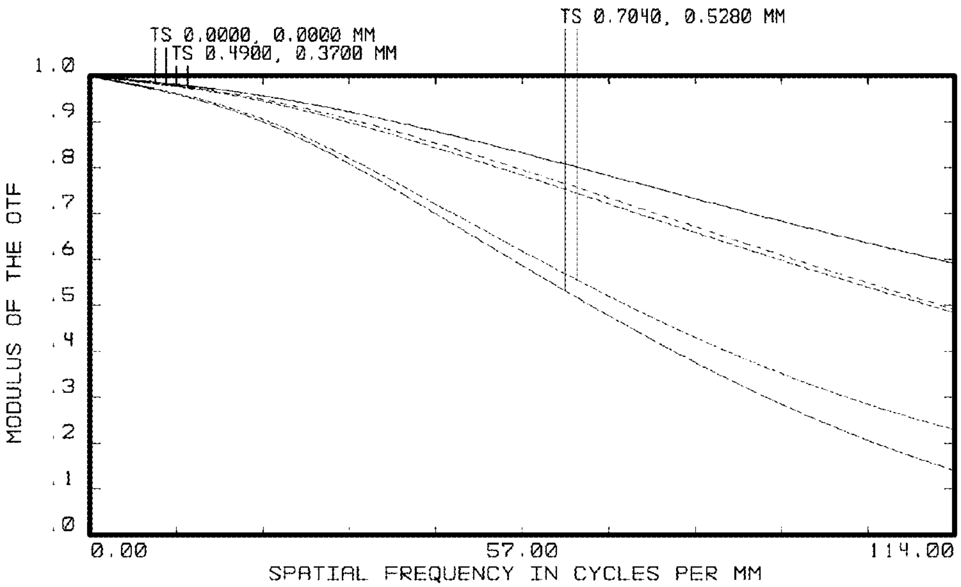
FIG. 7 shows a plot of the modulation transfer functions as a function of spatial frequency for the imaging system of FIG. 5.

FIGS. 7-10 show performance plots of the VGA imaging system. FIG. 7 shows a plot 160 of the modulation transfer function ("MTF") as a function of spatial frequency of the VGA imaging system. The MTF curves are averaged over wavelengths from 470 to 650 nanometers ("nm"). FIG. 7 illustrates MTF curves for three distinct field points associated with real image heights on a diagonal axis of detector 112: the three field points are an on-axis field point having coordinates (0 mm, 0 mm), a 0.7 field point having coordinates (0.49 mm, 0.37 mm), and a full field point having coordinates (0.704 mm, 0.528 mm). In FIG. 7, and in the remainder of the present disclosure "T" refers to tangential field and "S" refers to sagittal field.

Figure 8A:
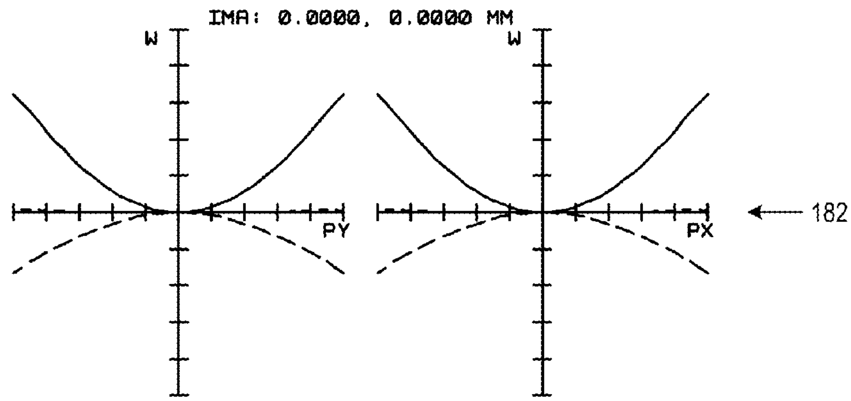
FIGS. 8A-8C show plots of optical path differences of the imaging system of FIG. 5.
Figure 8B:
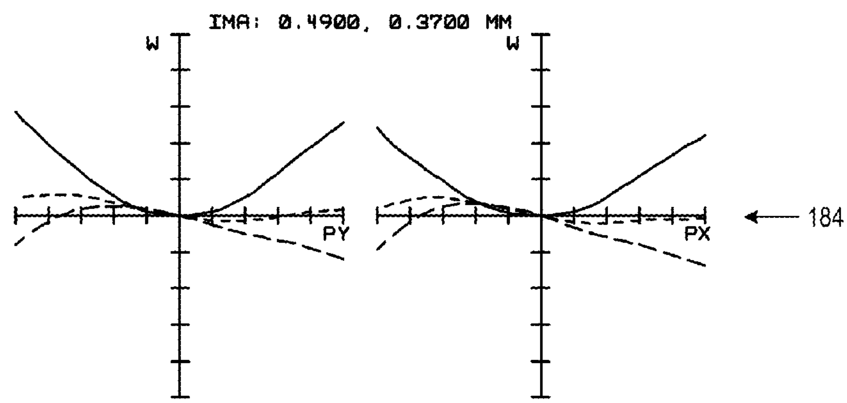
Figure 8C:
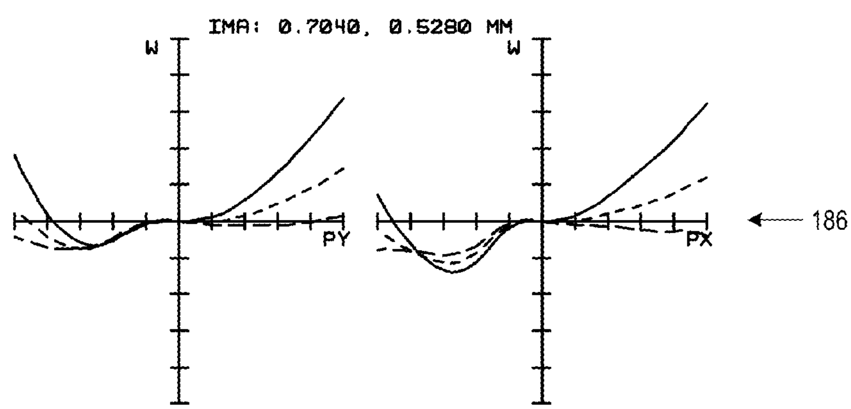

FIGS. 8A-8C show pairs of plots 182, 184 and 186, respectively, of the optical path differences, or wavefront error, of VGA imaging system 110. The maximum scale in each direction is +/−five waves. The solid lines correspond to electromagnetic energy having a wavelength of 470 nm (blue light). The short dashed lines correspond to electromagnetic energy having a wavelength of 550 nm (green light). The long dashed lines represent electromagnetic energy having a wavelength of 650 nm (red light). Each pair of plots represents optical path differences at a different real image height on the diagonal of detector 112 of FIG. 6. Plots 182 correspond to an on-axis field point having coordinates (0 mm, 0 mm); plots 184 correspond to a 0.7 field point having coordinates (0.49 mm, 0.37 mm); and plots 186 correspond to a full field point having coordinates (0.704 mm, 0.528 mm). In pairs of plots 182, 184 and 186, the left plots show wavefront error for the tangential set of rays, and the right plots show wavefront error for the sagittal set of rays.

Figure 9A:
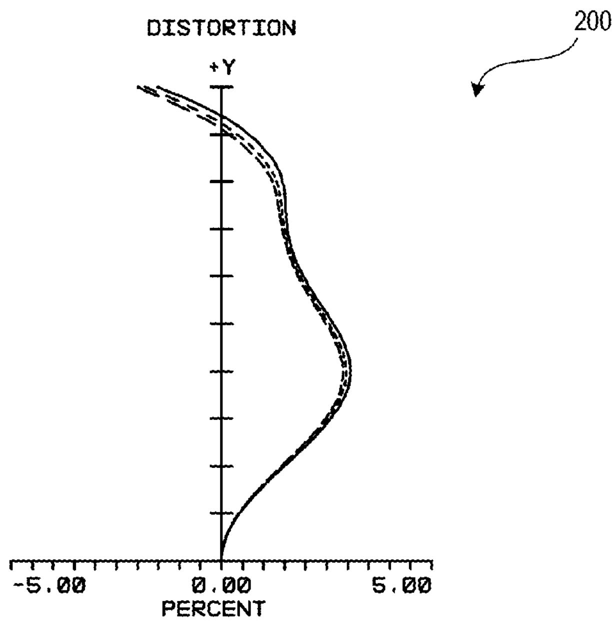
FIG. 9A shows a plot of distortion of the imaging system of FIG. 5.
Figure 9B:
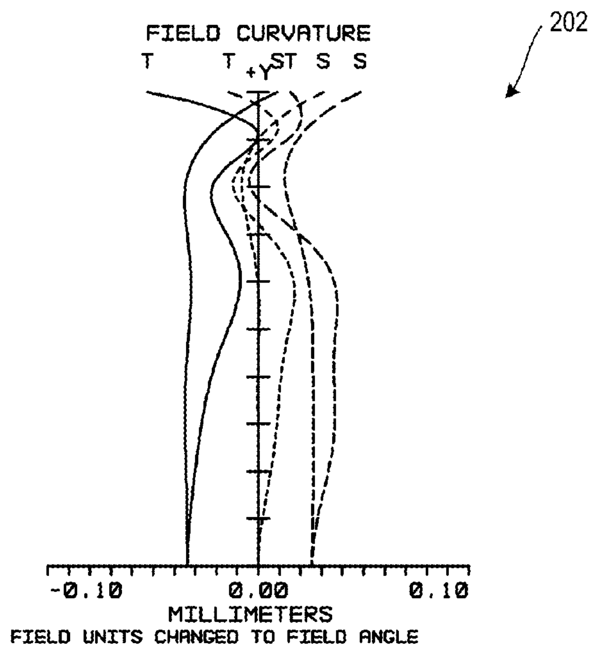
FIG. 9B shows a plot of field curvature of the imaging system of FIG. 5.

FIGS. 9A and 9B show a plot 200 of distortion and a plot 202 of field curvature of the VGA imaging system, respectively. The maximum half-field angle is 31.101°. The solid lines correspond to electromagnetic energy having a wavelength of 470 nm; the short dashed lines correspond to electromagnetic energy having a wavelength of 550 nm; and the long dashed lines correspond to electromagnetic energy having a wavelength of 650 nm.

Figure 10:
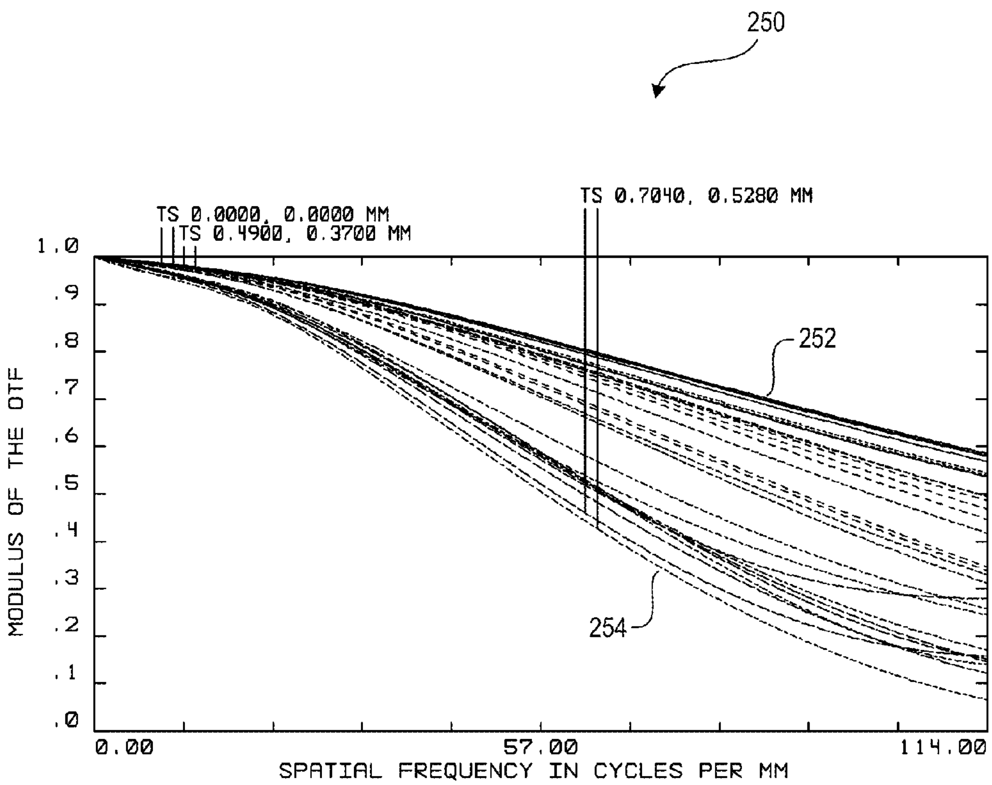
FIG. 10 shows a plot of the modulation transfer functions as a function of spatial frequency of the imaging system of FIG. 5 taking into account tolerances in centering and thickness variation of optical elements.

FIG. 10 shows a plot 250 of MTFs as a function of spatial frequency of the VGA imaging system taking into account tolerances in centering and thickness of optical elements of optics 114. Plot 250 includes on-axis field point, 0.7 field point, and full field point sagittal and tangential field MTF curves generated over ten Monte Carlo tolerance analysis runs. Tolerances in centering and thickness of optical elements of optics 114 are assumed to have a normal distribution sampled between +2 and −2 microns and are described in TABLE 5. Accordingly, it is expected that the MTFs of imaging system 110 will be bounded by curves 252 and 254.

TABLE 5

| PARAMETER | Surface decenter in x and y (mm) | Surface tilt in x and y (degrees) | Element thickness variation (mm) |
|---|---|---|---|
| VALUE | ±0.002 | ±0.01 | ±0.002 |

Figure 11:
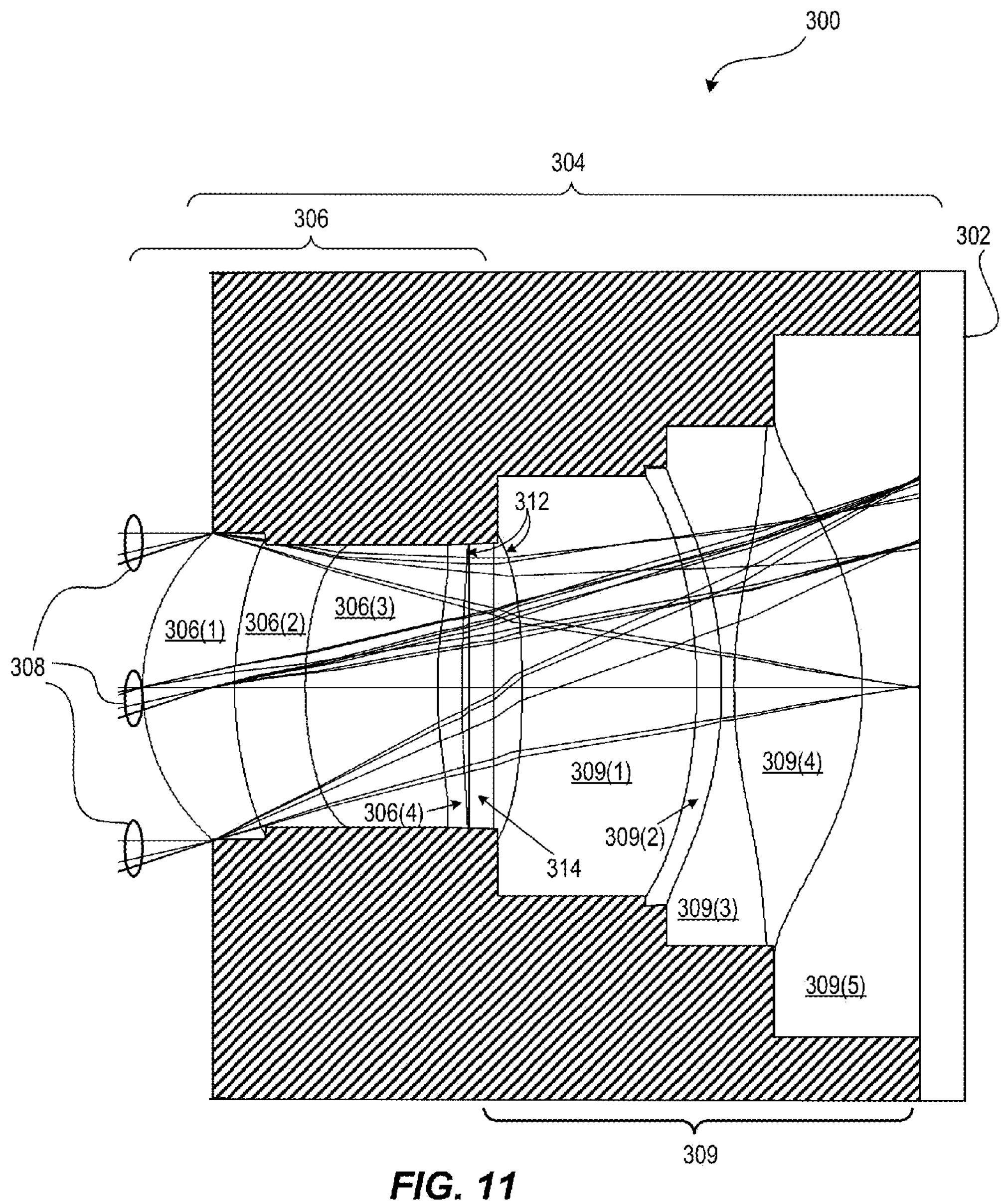
FIG. 11 is an optical layout and raytrace of one imaging system, according to an embodiment.

FIG. 11 is an optical layout and raytrace of a three megapixel "3MP") imaging system 300, which is an embodiment of imaging system 10 of FIG. 2A. 3MP imaging system 300 may be one of arrayed imaging systems; such array may be separated into a plurality of sub-arrays and/or stand alone imaging systems as discussed above with respect to FIG. 2A. 3MP imaging system 300 includes detector 302 and optics 304. An optics-detector interface (not shown) is also present between optics 304 and detector 302. 3MP imaging system 300 has a focal length of 4.91 millimeters, a field of view of 60°, F/# of 2.0, a total track length of 6.3 mm, and a maximum chief ray angle of 28.5°. The cross hatched area shows the yard region (i.e., the area outside the clear aperture) through which electromagnetic energy does not propagate, as previously discussed.

Detector 302 has a three megapixel "3MP" format, which means that it includes a matrix of detector pixels (not shown) of 2,048 columns and 1,536 rows. Thus, detector 302 may be said to have a resolution of 2,048×1,536, which is significantly higher than that of detector 112 of FIG. 5. Each detector pixel has a square shape with each side having a length of 2.2 microns. Detector 302 has a nominal width of 4.5 mm and a nominal height of 3.38 mm. The diagonal distance across a surface of detector 302 proximate to optics 304 is nominally 5.62 mm.

Optics 304 has four layers of optical elements in layered optical element 306 and five layers of optical elements in layered optical element 309. Layered optical element 306 is formed of two different materials, and adjacent optical elements are formed of different materials. Specifically, optical elements 306(1) and 306(3) are formed of a first material having a first refractive index; optical elements 306(2) and 306(4) are formed of a second material having a second refractive index. Layered optical element 309 is formed of two different materials, and adjacent optical elements are formed of different materials. Specifically, optical elements 309(1), 309(3) and 309(5) are formed of a first material having a first refractive index; optical elements 309(2) and 309(4) are formed of a second material having a second refractive index. Furthermore, optics 304 includes an intermediate common base 314 (e.g., formed of a glass plate) that cooperatively forms air gaps 312 within optics 304. One air gap 312 is defined by optical element 306(4) and common base 314, and another air gap 312 is defined by common base 314 and optical element 309(1). Air gaps 312 advantageously increase optical power of optics 304. Rays 308 represent electromagnetic energy being imaged by 3MP imaging system 300; rays 308 are assumed to originate from infinity. The sag equation for optics 304 is given by Eq. (1). The prescription of optics 304 is summarized in TABLES 6 and 7, where radius, thickness and diameter are given in units of millimeters.

TABLE 6

| Surface | Radius | Thickness | Refractive index | Abbe# | Diameter | Conic |
|---|---|---|---|---|---|---|
| OBJECT | Infinity | Infinity | air | | Infinity | 0 |
| STOP | 1.646978 | 0.7431315 | 1.370 | 92.000 | 2.5 | 0 |
| 3 | 2.97575 | 0.5756877 | 1.620 | 32.000 | 2.454056 | 0 |
| 4 | 1.855751 | 1.06786 | 1.370 | 92.000 | 2.291633 | 0 |
| 5 | 3.479259 | 0.2 | 1.620 | 32.000 | 2.390627 | 0 |
| 6 | 9.857028 | 0.059 | air | | 2.418568 | 0 |
| 7 | Infinity | 0.2 | 1.520 | 64.200 | 2.420774 | 0 |
| 8 | Infinity | 0.23 | air | | 2.462989 | 0 |
| 9 | −9.140551 | 1.418134 | 1.620 | 32.000 | 2.474236 | 0 |
| 10 | −3.892207 | 0.2 | 1.370 | 92.000 | 3.420696 | 0 |
| 11 | −3.874526 | 0.1 | 1.620 | 32.000 | 3.557525 | 0 |
| 12 | 3.712696 | 1.04 | 1.370 | 92.000 | 4.251807 | 0 |
| 13 | −2.743629 | 0.4709611 | 1.620 | 32.000 | 4.323436 | 0 |
| IMAGE | Infinity | 0 | 1.458 | 67.820 | 5.718294 | 0 |

TABLE 7

| Surface# | $A_2$ | $A_4$ | $A_6$ | $A_8$ | $A_{10}$ | $A_{12}$ | $A_{14}$ | $A_{16}$ |
|---|---|---|---|---|---|---|---|---|
| 1(Object) | 0 | 0 | 0 | 0 | 0 | 0 | 0 | 0 |
| 2(Stop) | 0 | $-1.746 \times 10^{-3}$ | $1.419 \times 10^{-3}$ | $-1.244 \times 10^{-3}$ | 0 | 0 | 0 | 0 |
| 3 | 0 | $-1.517 \times 10^{-2}$ | $-2.777 \times 10^{-3}$ | $7.544 \times 10^{-3}$ | 0 | 0 | 0 | 0 |
| 4 | −0.1162 | $1.292 \times 10^{-2}$ | $-3.760 \times 10^{-2}$ | $5.075 \times 10^{-2}$ | 0 | 0 | 0 | 0 |
| 5 | 0 | $-4.789 \times 10^{-2}$ | $-2.327 \times 10^{-3}$ | $-6.977 \times 10^{-3}$ | 0 | 0 | 0 | 0 |
| 6 | 0 | $-7.803 \times 10^{-3}$ | $-3.196 \times 10^{-3}$ | $9.558 \times 10^{-4}$ | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |
| 9 | 0 | $-3.542 \times 10^{-2}$ | $-4.762 \times 10^{-3}$ | $-1.991 \times 10^{-3}$ | 0 | 0 | 0 | 0 |
| 10 | 0 | $2.230 \times 10^{-2}$ | $-1.528 \times 10^{-2}$ | $2.399 \times 10^{-3}$ | 0 | 0 | 0 | 0 |
| 11 | 0 | $-1.410 \times 10^{-2}$ | $1.866 \times 10^{-3}$ | $6.690 \times 10^{-4}$ | 0 | 0 | 0 | 0 |
| 12 | 0 | $-1.908 \times 10^{-2}$ | $-2.251 \times 10^{-3}$ | $4.750 \times 10^{-4}$ | 0 | 0 | 0 | 0 |
| 13 | 0 | $-4.800 \times 10^{-4}$ | $1.650 \times 10^{-3}$ | $3.881 \times 10^{-4}$ | 0 | 0 | 0 | 0 |

Figure 12:
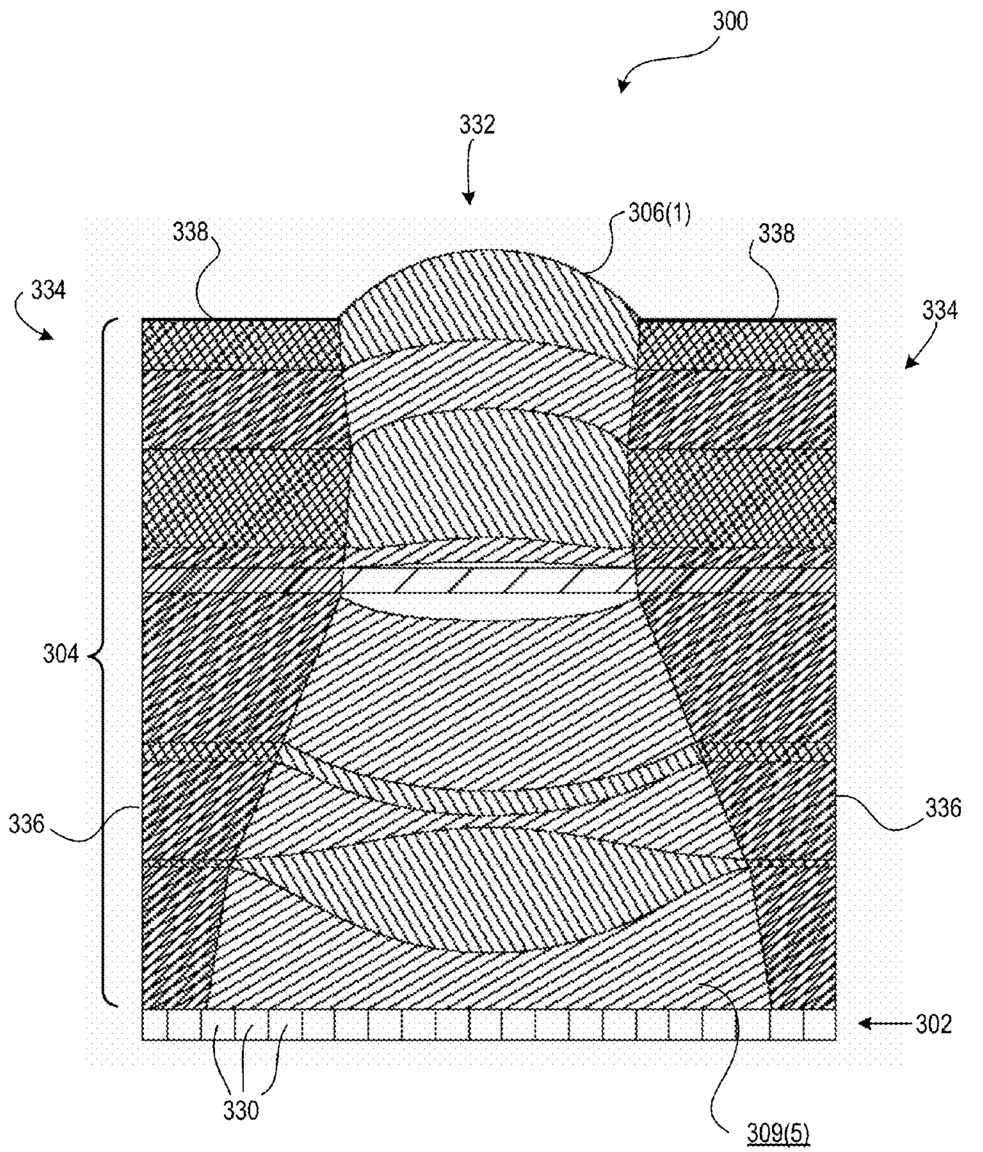
FIG. 12 is a cross-sectional illustration of the imaging system of FIG. 11 that has been diced from arrayed imaging systems, according to an embodiment.

FIG. 12 is a cross-sectional illustration of 3MP imaging system 300 of FIG. 11 obtained from separating an array of like imaging systems (relatively straight sides 336 are indicative that 3MP imaging system 300 has been separated). FIG. 12 illustrates detector 302 as including a plurality of detector pixels 330. As in FIG. 3B, detector pixels 330 are not drawn to scale—their size is exaggerated for illustrative clarity. Furthermore, only three detector pixels 330 are labeled in order to promote illustrative clarity.

In order to promote illustrative clarity, only one optical element of each layered optical elements 306 and 309 are labeled in FIG. 12. Optics 304 again has a clear aperture 332 corresponding to that portion of optics 304 through which electromagnetic energy travels to reach detector 302. Yards 334 outside of clear aperture 332 are represented by dark shading in FIG. 12. The 3MP imaging system may include physical apertures 338 disposed on optical element 306(1), for example, though these apertures may be placed elsewhere (e.g., adjacent one or more other layered optical elements 306). Apertures may be formed as discussed above with respect to FIG. 2B.

Figure 13:
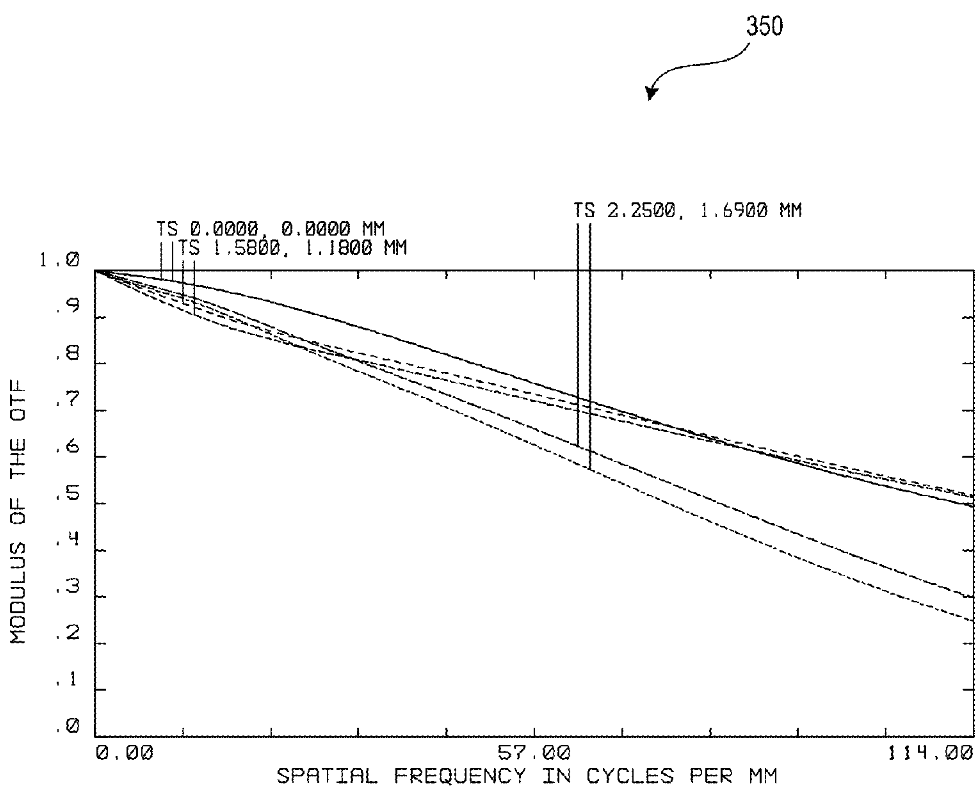
FIG. 13 shows a plot of the modulation transfer functions as a function of spatial frequency for the imaging system of FIG. 11.

FIGS. 13-16 show performance plots of 3MP imaging system 300. FIG. 13 is a plot 350 of the modulus of the MTF as a function of spatial frequency of 3MP imaging system 300. The MTF curves are averaged over wavelengths from 470 to 650 nm. FIG. 13 illustrates MTF curves for three distinct field points associated with real image heights on a diagonal axis of detector 302; the three field points are an on-axis field point having coordinates (0 mm, 0 mm), a 0.7 field point having coordinates (1.58 mm, 1.18 mm), and a full field point having coordinates (2.25 mm, 1.69 mm).

Figure 14A:
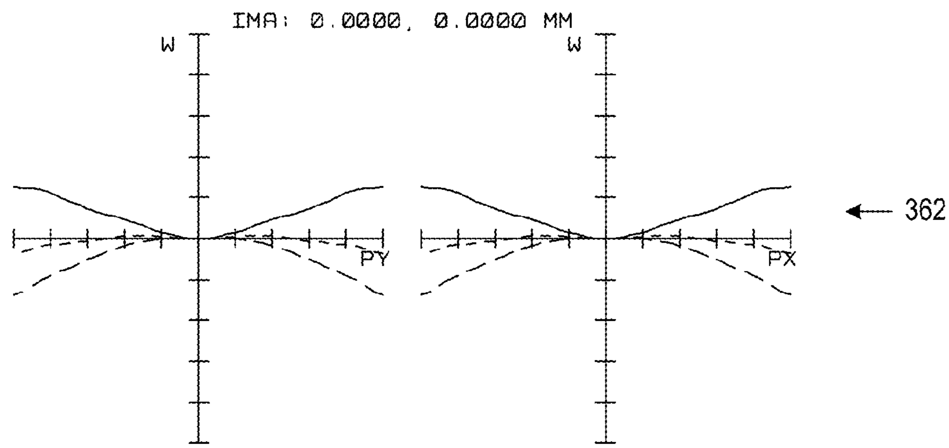
FIGS. 14A-14C show plots of optical path differences of the imaging system of FIG. 11.
Figure 14B:
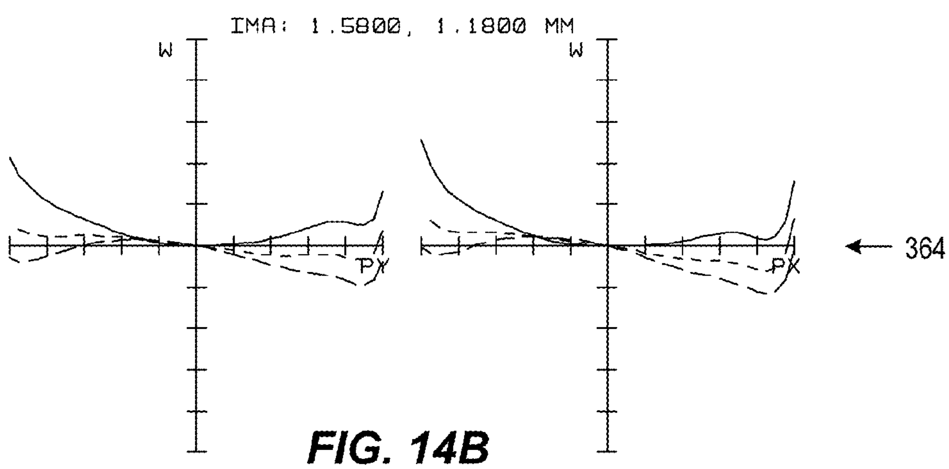
Figure 14C:
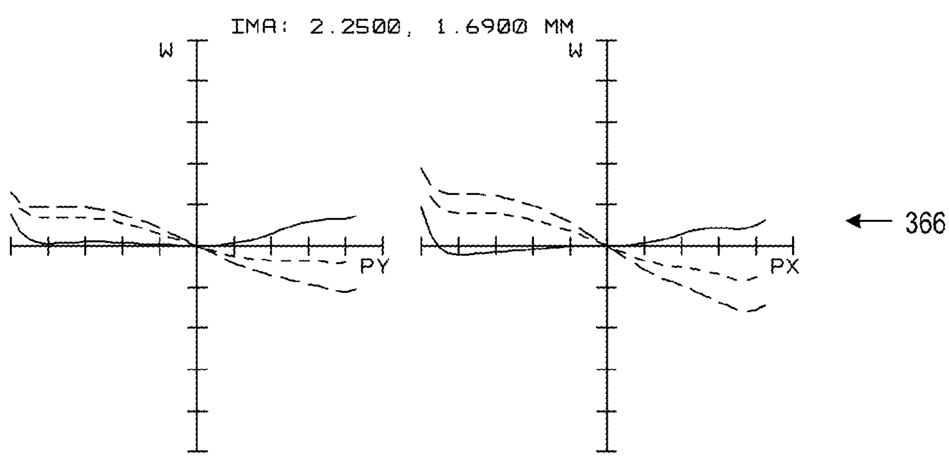

FIGS. 14A, 14B and 14C show pairs of plots 362, 364 and 366 respectively of the optical path differences of 3MP imaging system 300. The maximum scale in each direction is +/−five waves. The solid lines correspond to electromagnetic energy having a wavelength of 470 nm; the short dashed lines correspond to electromagnetic energy having a wavelength of 550 nm; and the long dashed lines correspond to electromagnetic energy having a wavelength of 650 nm. Each pair of plots represents optical path differences at a different real height on the diagonal of detector 302. Plots 362 correspond to an on-axis field point having coordinates (0 mm, 0 mm); plots 364 correspond to a 0.7 field point having coordinates (1.58 mm, 1.18 mm); and plots 366 correspond to a full field point having coordinates (2.25 mm, 1.69 mm). In pairs of plots 362, 364 and 366, the left plots show wavefront error for the tangential set of rays, and the right plots show wavefront error for the sagittal set of rays.

Figure 15A:
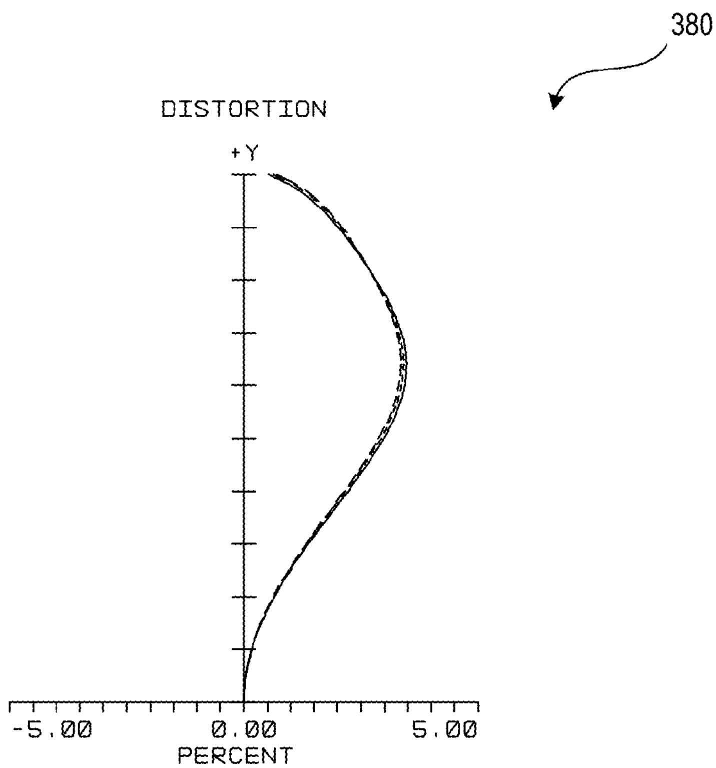
FIG. 15A shows a plot of distortion of the imaging system of FIG. 11.
Figure 15B:
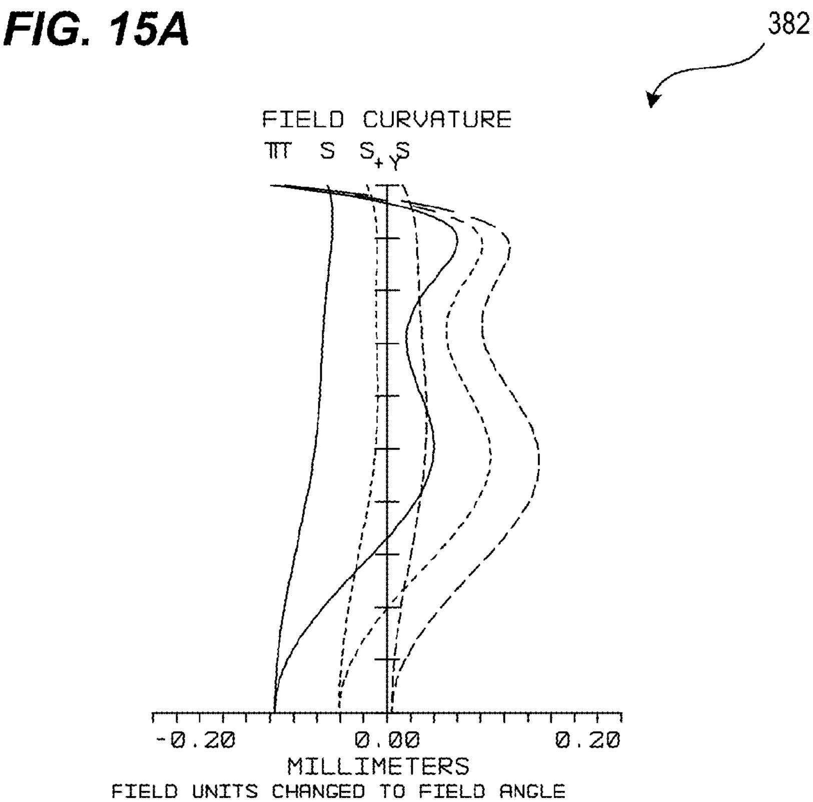
FIG. 15B shows a plot of field curvature of the imaging system of FIG. 11.

FIGS. 15A and 15B show a plot 380 of distortion and a plot 382 of field curvature of 3MP imaging system 300, respectively. The maximum half-field angle is 30.063°. The solid lines correspond to electromagnetic energy having a wavelength of 470 nm; the short dashed lines correspond to electromagnetic energy having a wavelength of 550 nm; and the long dashed lines correspond to electromagnetic energy having a wavelength of 650 nm.

Figure 16:
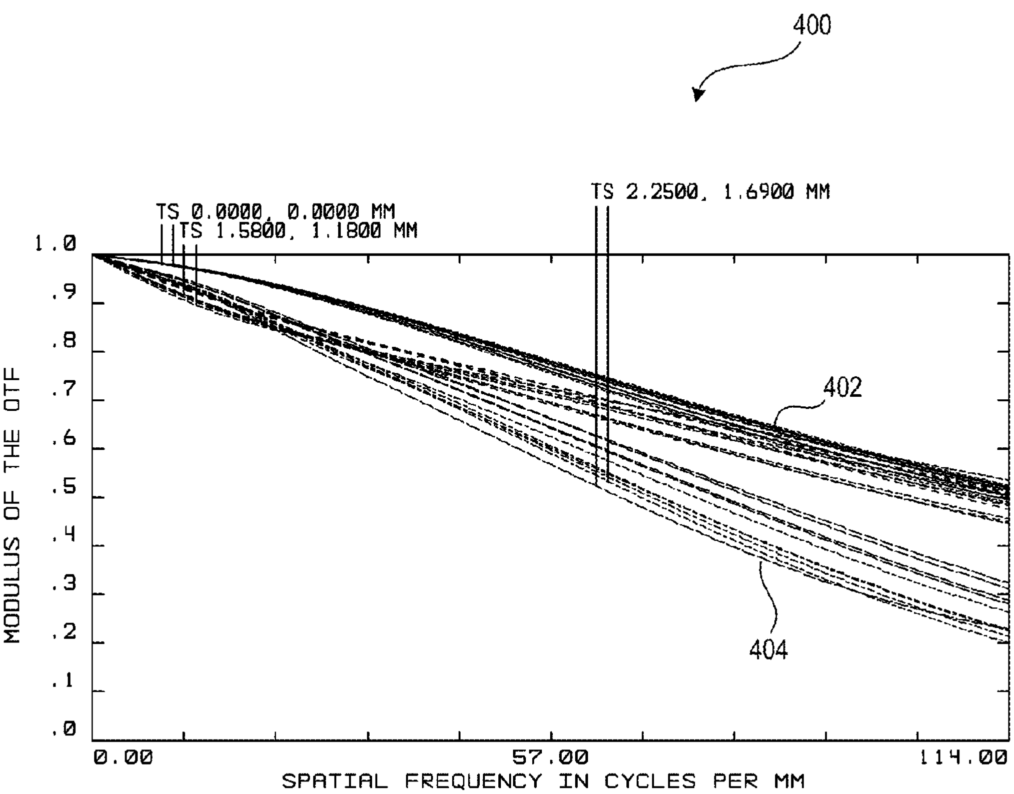
FIG. 16 shows a plot of the modulation transfer functions as a function of spatial frequency of the imaging system of FIG. 11, taking into account tolerances in centering and thickness variation of optical elements.

FIG. 16 shows a plot 400 of MTFs as a function of spatial frequency of 3MP imaging system 300, taking into account tolerances in centering and thickness of optical elements of optics 304. Plot 400 includes on-axis field point, 0.7 field point, and full field point sagittal and tangential field MTF curves generated over ten Monte Carlo tolerance analysis runs, with a normal distribution sampled between +2 and −2 microns. The on-axis field point has coordinates (0 mm, 0 mm); the 0.7 field point has coordinates (1.58 mm, 1.18 mm); and the full field point has coordinates (2.25 mm, 1.69 mm). Tolerances in centering and thickness of optical elements of optics 304 are assumed to have a normal distribution in the Monte Carlo runs of FIG. 16. Accordingly, it is expected that the MTFs of imaging system 300 will be bounded by curves 402 and 404.

Figure 17:
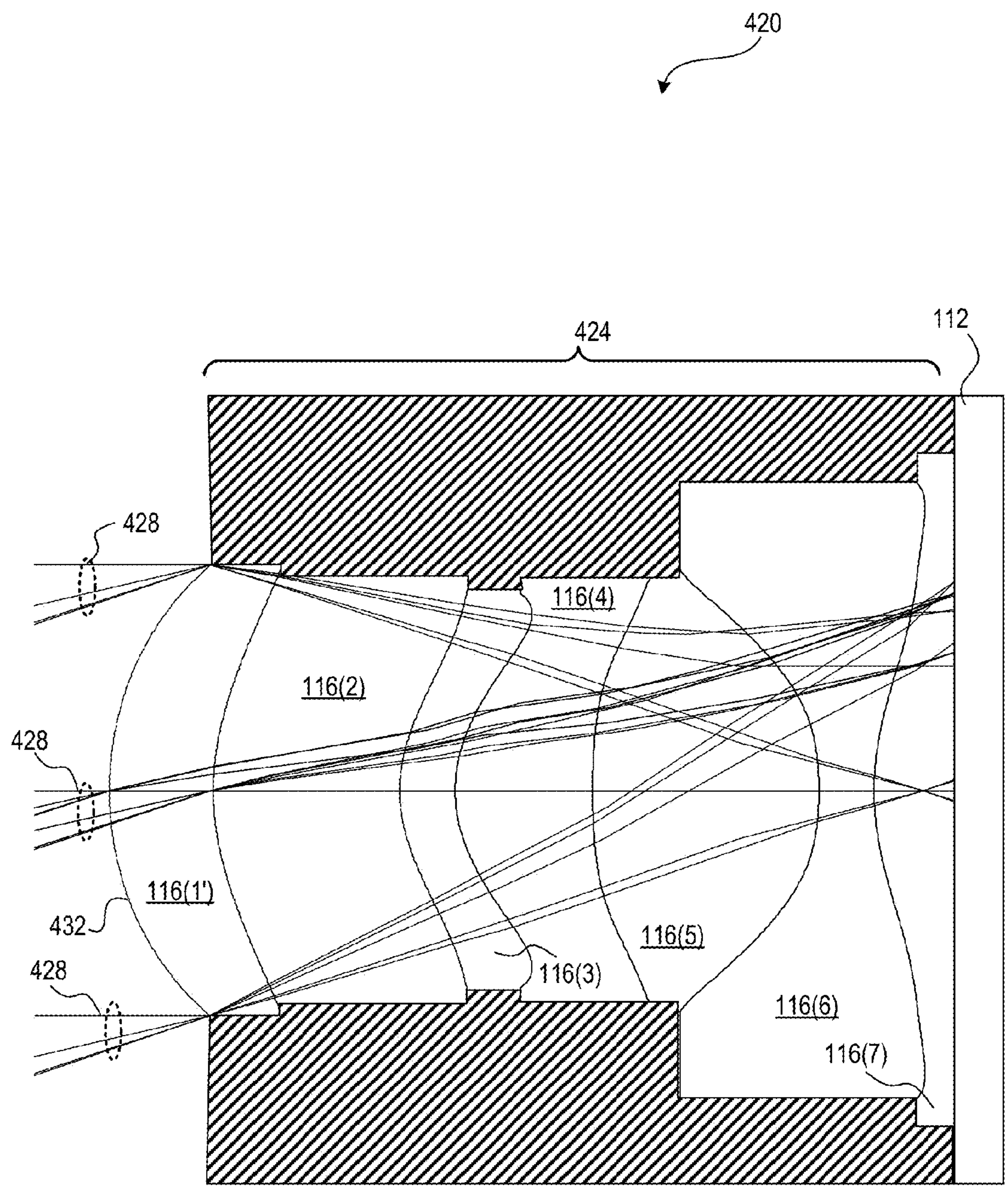
FIG. 17 shows an optical layout and raytrace of one imaging system, according to an embodiment.

FIG. 17 is an optical layout and raytrace of a VGA_WFC imaging system 420, which is an embodiment of imaging system 10 of FIG. 2A. In the present context, "WFC" stands for "wavefront coding." Imaging system 420 differs from the VGA imaging system 110 of FIG. 5 in that imaging system 420 includes a phase modifying element 116(1') that implements a predetermined phase modification, such as wavefront coding. Wavefront coding refers to techniques of introducing a predetermined phase modification in an imaging system to achieve a variety of advantageous effects such as aberration reduction and extended depth of field. For example, U.S. Pat. No. 5,748,371 to Cathey, Jr., et al. (hereinafter, the '371 patent) discloses a phase modifying element inserted into an imaging system for extending the depth of field of the imaging system. For instance, an imaging system may be used to image an object through imaging optics and a phase modifying element, onto a detector. The phase modifying element may be configured for encoding a wavefront of the electromagnetic energy from the object to introduce a predetermined imaging effect into the resulting image at the detector. This imaging effect is controlled by the phase modifying element such that, in comparison to a traditional imaging system without such a phase modifying element, misfocus-related aberrations are reduced and/or depth of field of the imaging system is extended. The phase modifying element may be configured, for example, to introduce a phase modulation that is a separable cubic function of spatial variables x and y in the plane of the phase modifying element surface (as discussed in the '371 patent). Such introduction of predetermined phase modification is generally referred to as wavefront coding in the context of the present disclosure.

VGA_WFC imaging system 420 has a focal length of 1.60 mm, a field of view of 62°, F/# of 1.3, a total track length of 2.25 mm, and a maximum chief ray angle of 31°. As discussed earlier, the cross hatched area shows the yard region, or the area outside the clear aperture, through which electromagnetic energy does not propagate.

VGA_WFC imaging system 420 includes optics 424 having seven-element layered optical element 116. Optics 424 includes an optical element 116(1') that includes predetermined phase modification. That is, a surface 432 of optical element 116(1') is formed such that optical element 116(1') additionally functions as a phase modifying element for implementing predetermined phase modification to extend the depth of field in VGA_WFC imaging system 420. Rays 428 represent electromagnetic energy being imaged by the VGA_WFC imaging system 420; rays 428 are assumed to originate from infinity. The sag of optics 424 may be expressed using Eq. (2) and Eq. (3). Details of the prescription of optics 424 are summarized in TABLES 8-11, where radius, thickness and diameter are given in units of millimeters.

$$Sag = \frac{cr^2}{1+\sqrt{1-(1+k)c^2r^2}} + \sum_{i=2n} A_i r^i + Amp * OctSag, \qquad \text{Eq. (2)}$$

where

Amp=Amplitude of the oct form and $$OctSag(d) = \sum_{i=1}^{m} \alpha_i d^{\beta_i} + Cd^N, \qquad \text{Eq. (3)}$$

where $r=\sqrt{x^2+y^2}$;

$-\pi \le \theta \le \pi$, $$\theta = \arctan\left(\frac{Y}{X}\right)$$

for all zones;

$$\left(\frac{-\pi}{8} < \theta \le \frac{\pi}{8}\right) \cup \left(|\theta| \ge \frac{7\pi}{8}\right); \qquad \text{Zone 1}$$

$$\left(\frac{\pi}{8} < \theta \le \frac{3\pi}{8}\right) \cup \left(\frac{-7\pi}{8} < \theta \le \frac{-5\pi}{8}\right); \qquad \text{Zone 2}$$

$$\left(\frac{3\pi}{8} < \theta \le \frac{5\pi}{8}\right) \cup \left(\frac{-5\pi}{8} < \theta \le \frac{-3\pi}{8}\right); \qquad \text{Zone 3}$$

-continued $$\left(\frac{5\pi}{8} < \theta \le \frac{7\pi}{8}\right) \cup \left(\frac{-3\pi}{8} < \theta \le \frac{-\pi}{8}\right); \quad \text{Zone 4}$$

$$d(X, Y, \text{Zone1}) = \left|\frac{X}{NR\cos\left(\frac{\pi}{8}\right)}\right|;$$

$$d(X, Y, \text{Zone2}) = \left|\frac{X+Y}{\sqrt{2}\,NR\cos\left(\frac{\pi}{8}\right)}\right|;$$

$$d(X, Y, \text{Zone3}) = \left|\frac{Y}{NR\cos\left(\frac{\pi}{8}\right)}\right|;$$

and $$d(X, Y, \text{Zone4}) = \left|\frac{Y-X}{\sqrt{2}\,NR\cos\left(\frac{\pi}{8}\right)}\right|.$$

TABLE 8

| Surface | Radius | Thickness | Refractive index | Abbe# | Diameter | Conic |
|---|---|---|---|---|---|---|
| OBJECT | Infinity | Infinity | air | | Infinity | 0 |
| STOP | 0.8531869 | 0.2778449 | 1.370 | 92.00 | 1.21 | 0 |
| 3 | 0.7026177 | 0.4992371 | 1.620 | 32.00 | 1.188751 | 0 |
| 4 | 0.5827148 | 0.1476905 | 1.370 | 92.00 | 1.078165 | 0 |
| 5 | 1.07797 | 0.3685015 | 1.620 | 32.00 | 1.05661 | 0 |
| 6 | 2.012126 | 0.6051814 | 1.370 | 92.00 | 1.142809 | 0 |
| 7 | −0.93657 | 0.1480326 | 1.620 | 32.00 | 1.186191 | 0 |
| 8 | 4.371518 | 0.2153112 | 1.370 | 92.00 | 1.655702 | 0 |
| IMAGE | Infinity | 0 | 1.458 | 67.82 | 1.814248 | 0 |

TABLE 9

| Surface# | $A_2$ | $A_4$ | $A_6$ | $A_8$ | $A_{10}$ | $A_{12}$ | $A_{14}$ | $A_{16}$ |
|---|---|---|---|---|---|---|---|---|
| 1(Object) | 0.000 | 0.000 | 0.000 | 0.000 | 0.000 | 0 | 0 | 0 |
| 2(Stop) | −0.01707 | 0.2018 | −0.2489 | 0.6095 | −0.3912 | 0 | 0 | 0 |
| 3 | 0.000 | −1.103 | 0.1747 | 0.5534 | −4.640 | 0 | 0 | 0 |
| 4 | 0.3551 | −2.624 | −5.929 | 30.30 | −63.79 | 0 | 0 | 0 |
| 5 | 0.8519 | −0.9265 | −1.117 | −1.843 | −54.39 | 0 | 0 | 0 |
| 6 | 0.000 | 1.063 | 11.11 | −73.31 | 109.1 | 0 | 0 | 0 |
| 7 | 0.000 | −7.291 | 39.95 | −106.0 | 116.4 | 0 | 0 | 0 |
| 8 | 0.5467 | −0.6080 | −3.590 | 10.31 | −7.759 | 0 | 0 | 0 |

TABLE 10

| Surface# | Amp | C | N | RO | NR |
|---|---|---|---|---|---|
| 2 (Stop) | $0.34856 \times 10^{-3}$ | −227.67 | 10.613 | 0.48877 | 0.605 |

TABLE 11

| | | | | | | | | | |
|---|---|---|---|---|---|---|---|---|---|
| α | 1.0127 | 6.6221 | 4.161 | −16.5618 | −20.381 | −14.766 | −5.698 | 46.167 | 200.785 |
| β | 1 | 2 | 3 | 4 | 5 | 6 | 7 | 8 | 9 |

Figure 18:
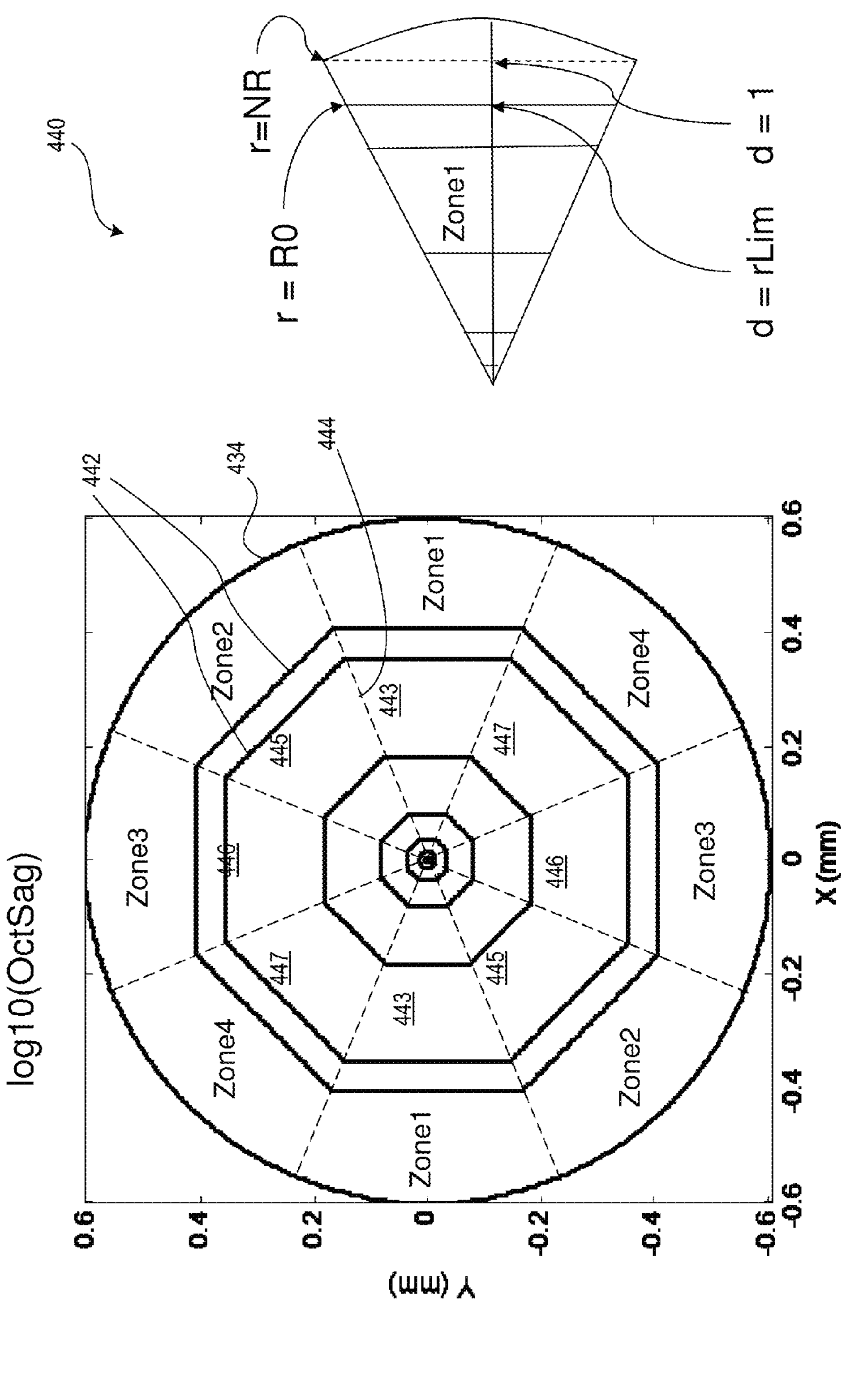
FIG. 18 shows a contour plot of a wavefront encoding profile of a layered lens of the imaging system of FIG. 17.

FIG. 18 shows a contour plot 440 of surface 432 of layered optical element 116(1') as a function of the X-coordinates and Y-coordinates of layered optical element 116(1'). Contours are represented by solid lines 442; such contours represent the logarithm of the height variations of surface 432. Surface 432 is thus faceted, as represented by dashed lines 444, only one of which is labeled to promote illustrative clarity. One exemplary description of surface 432, with the corresponding parameters shown in FIG. 18, is given by Eq. (3).

Figure 19:
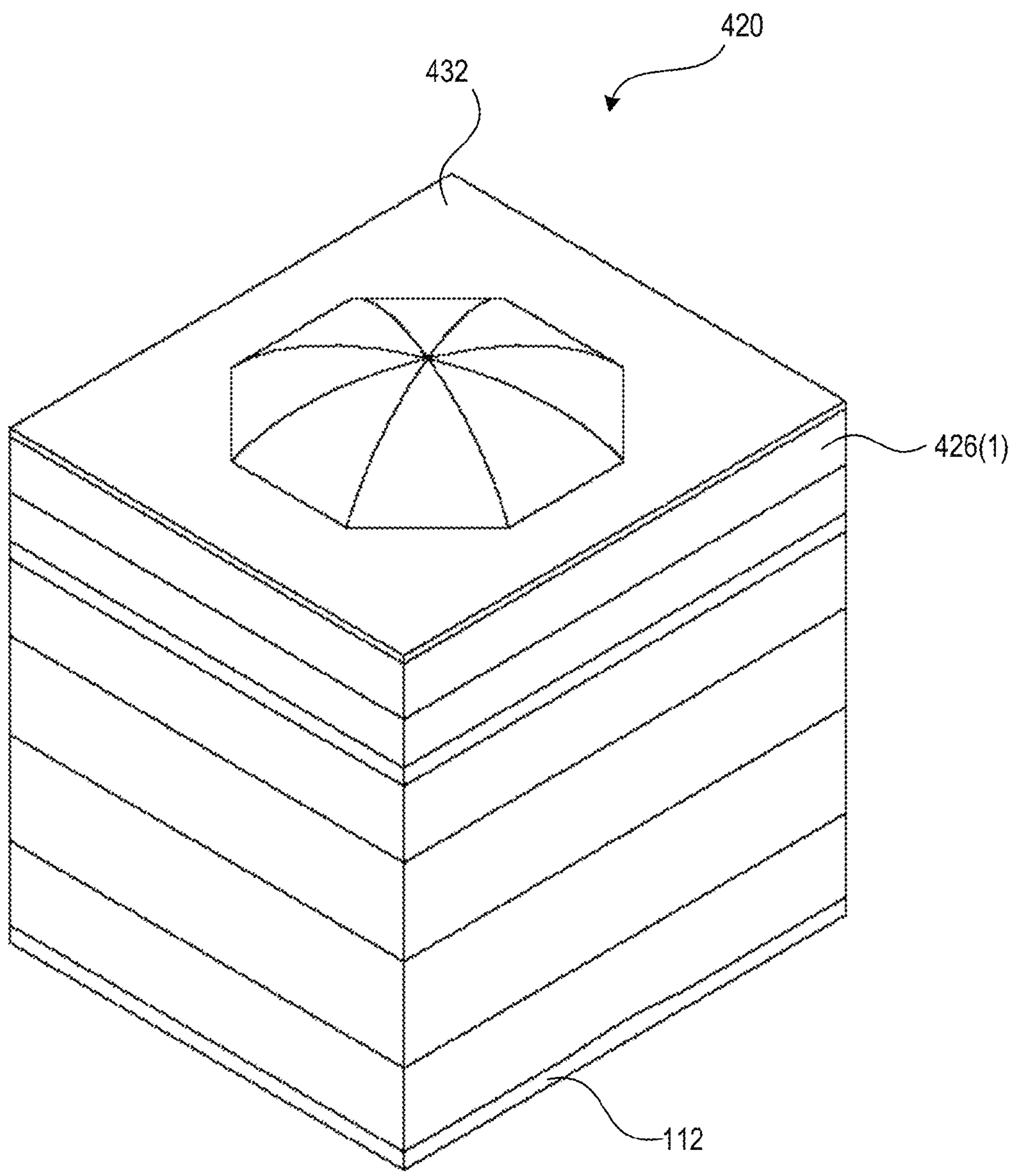
FIG. 19 is a perspective view of the imaging system of FIG. 17 that has been diced from arrayed imaging systems, according to an embodiment.
Figure 20A:
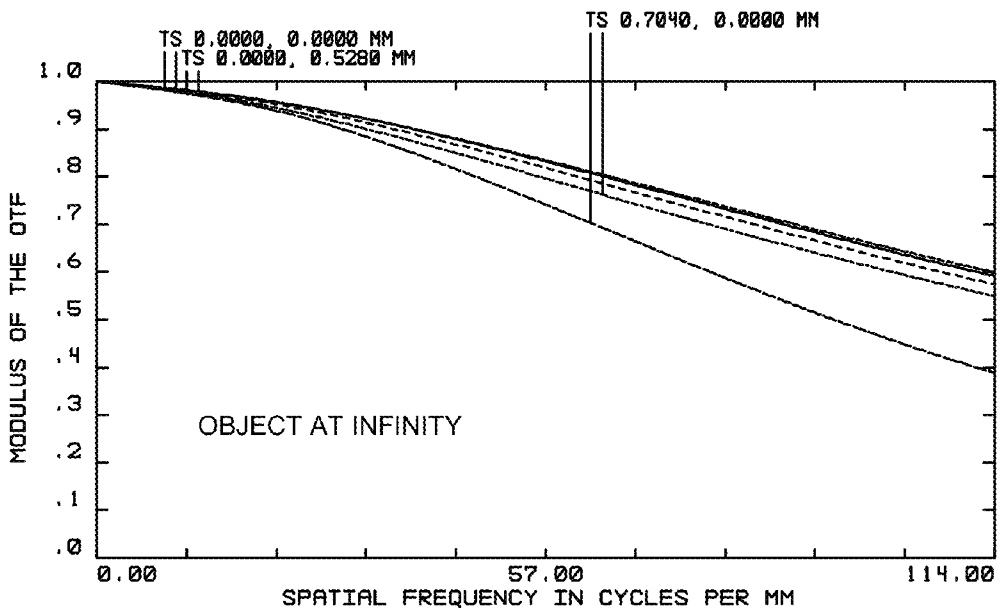
FIGS. 20A, 20B and 21 show plots of the modulation transfer functions as a function of spatial frequency at different object conjugates for the imaging system of FIG. 17.
Figure 20B:
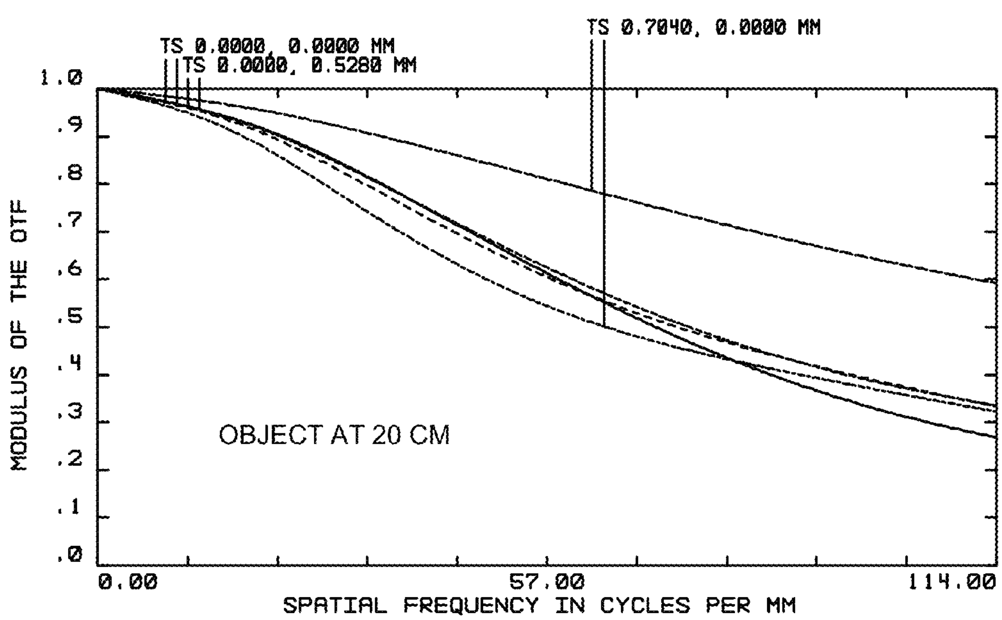

FIG. 19 is a perspective view of the VGA_WFC imaging system of FIG. 17 obtained from separating arrayed imaging systems. FIG. 19 is not drawn to scale; in particular, the contour of surface 432 of optical element 116(1') is exaggerated in order to illustrate the phase modifying surface as implemented on surface 432. It should be noted that surface 432 forms an aperture of the imaging system.

Figure 21:
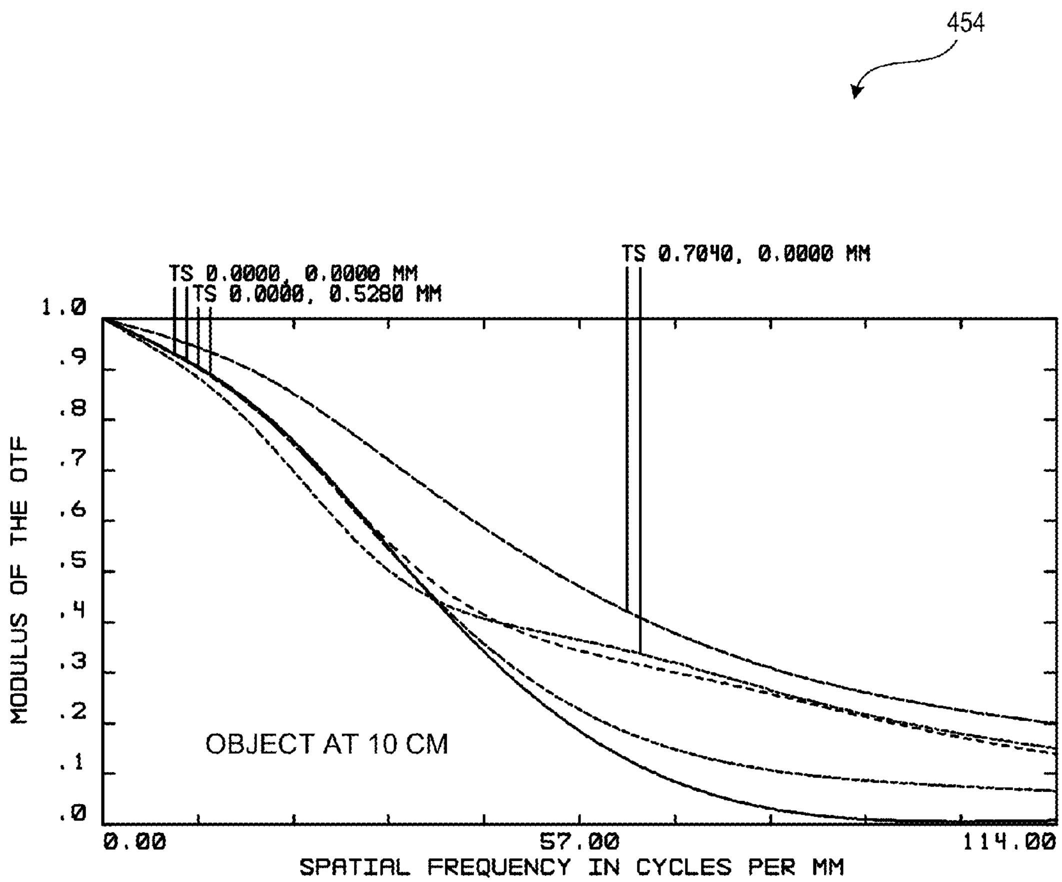

FIGS. 20-27 compare performance of VGA_WFC imaging system 420 to that of the VGA imaging system 110. As stated above, VGA_WFC imaging system 420 differs from the VGA imaging system 110 in that VGA_WFC imaging system 420 includes a phase modifying element for implementing a predetermined phase modification, which will extend the depth of field of the imaging system. In particular, FIGS. 20A and 20B show plots 450 and 452, respectively, and FIG. 21 shows plot 454 of the MTFs as a function of spatial frequency at various object conjugates for VGA imaging system 110. Plot 450 corresponds to an object conjugate distance of infinity; plot 452 corresponds to an object conjugate distance of 20 centimeters ("cm"); and plot 454 corresponds to an object conjugate distance of 10 cm. from VGA imaging system 110. An object conjugate distance is the distance of the object from the first optical element of the imaging system (e.g., optical elements 116(1) and/or 116(1')). The MTFs are averaged over wavelengths from 470 to 650 nm. FIGS. 20A, 20B and 21 indicate that VGA imaging system 110 performs best for an object located at infinity because it was designed for an infinite object conjugate distance; the decreasing magnitude of the MTF curves of plots 452 and 454 shows that the performance of VGA imaging system 110 deteriorates as the object gets closer to VGA imaging system 110 due to defocus, which will produce a blurred image. Furthermore, as may be observed from plot 454, the MTFs of VGA imaging system 110 may fall to zero under certain conditions; image information is lost when the MTF reaches zero.

Figure 22A:
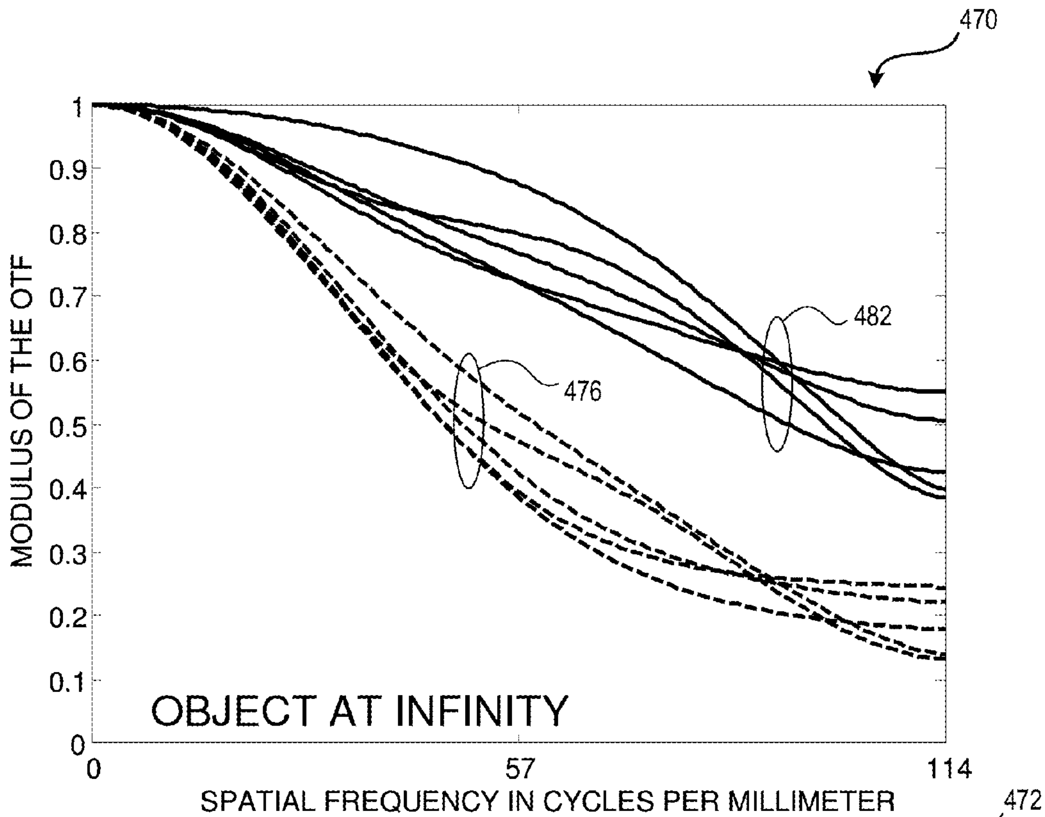
FIGS. 22A, 22B and 23 show plots of the modulation transfer functions as a function of spatial frequency at different object conjugates for the imaging system of FIG. 17, before and after processing.
Figure 22B:
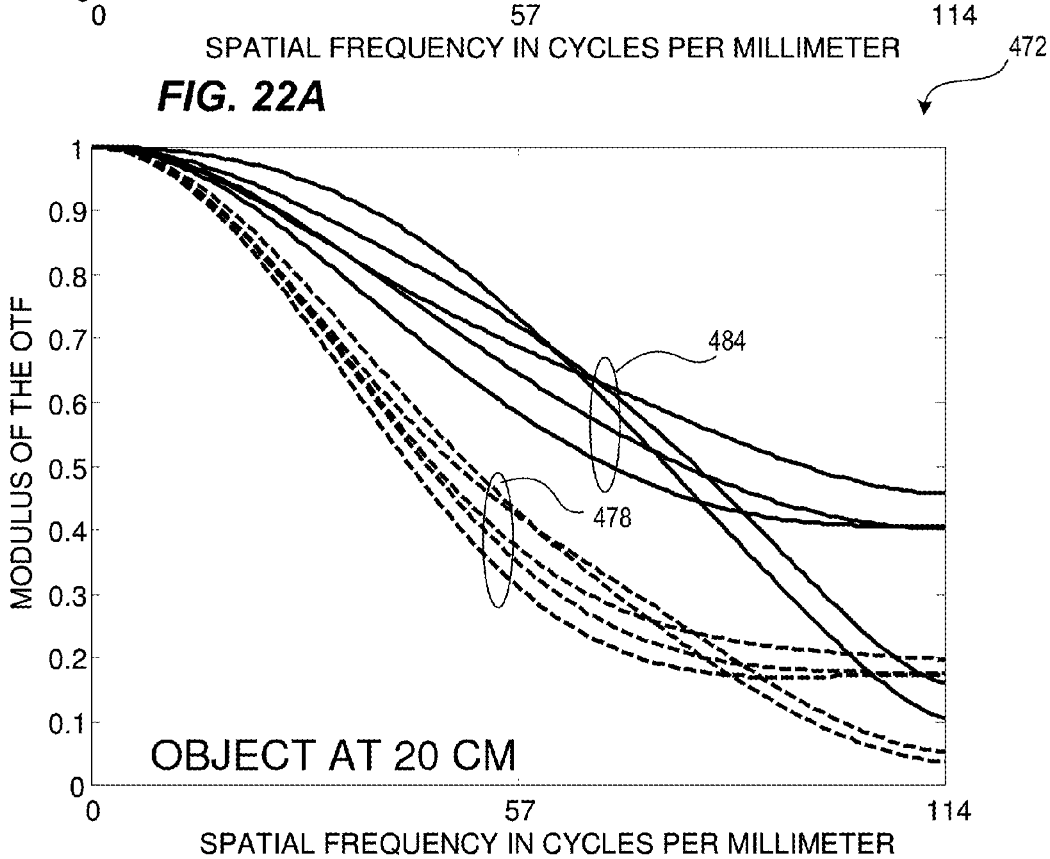
Figure 23:
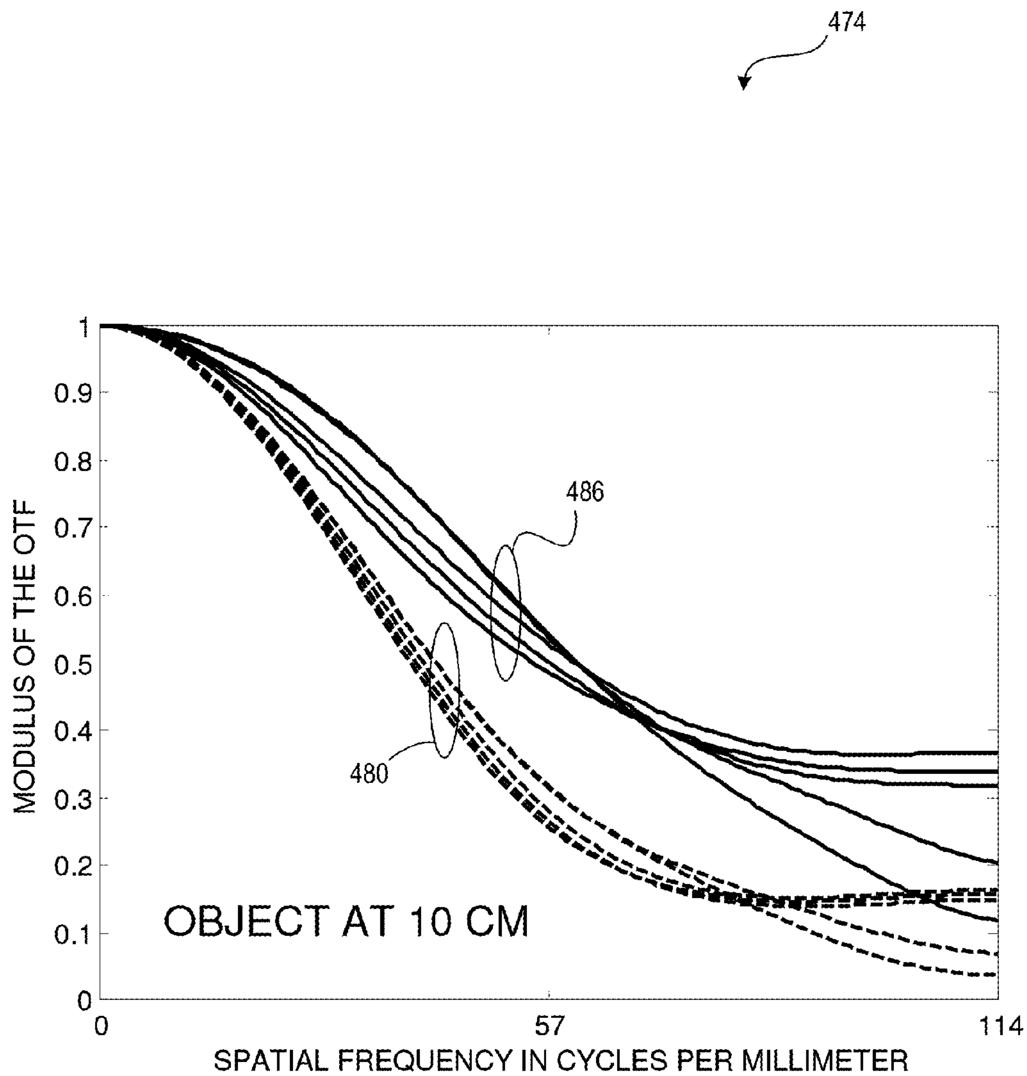

FIGS. 22A and 22B show plots 470 and 472, respectively, and FIG. 23 shows plot 474 of the MTFs as a function of spatial frequency of the VGA_WFC imaging system 420. Plot 470 corresponds to an object conjugate distance of infinity; plot 472 corresponds to an object conjugate distance of 20 cm; plot 474 corresponds to an object conjugate distance of 10 cm. The MTFs are averaged over wavelengths from 470 to 650 nm.

Each of plots 470, 472, and 474 includes MTF curves of the VGA_WFC imaging system 420 with and without post processing of electronic data produced by VGA_WFC imaging system 420. Specifically, plot 470 includes unfiltered MTF curves 476 and filtered MTF curves 482; plot 472 includes unfiltered MTF curves 478 and filtered MTF curves 484; and plot 474 includes unfiltered MTF curves 480 and filtered MTF curves 486. Filtered MTF curves 482, 484, and 486 represent performance of VGA_WFC imaging system 420 with post processing. As can be observed by comparing FIGS. 22A, 22B and 23 to FIGS. 20A, 20B and 21, unfiltered MTF curves 476, 478, 480 of VGA_WFC imaging system 420 have, generally, smaller magnitude than the MTF curves of VGA imaging system 110 at an object distance of infinity. However, unfiltered MTF curves 476, 478, 480 of VGA_WFC imaging system 420 advantageously do not reach zero magnitude; accordingly, VGA_WFC imaging system 420 may operate at an object conjugate distance as close as 10 cm without loss of image data. Furthermore, the unfiltered MTF curves 476, 478, 480 of VGA_WFC imaging system 420 are similar, even as the object conjugate distance changes. Such similarity in MTF curves allows a single filter kernel to be used by a processor (not shown) executing a decoding algorithm, as will be discussed hereinafter at an appropriate juncture.

As discussed above with respect to imaging system 10 of FIG. 2A, encoding introduced by the phase modifying (i.e., optical element 116(1')) may be processed by a processor (not shown) executing a decoding algorithm such that VGA_WFC imaging system 420 produces a sharper image than it would without such post processing. As may be observed by comparing FIGS. 22A, 22B and 23 to FIGS. 20A, 20B and 21, VGA_WFC imaging system 420 with post processing performs better than VGA imaging system 110 over a range of object conjugate distances. Therefore, the depth of field of the VGA_WFC imaging system 420 is larger than the depth of field of VGA imaging system 110.

Figure 24:
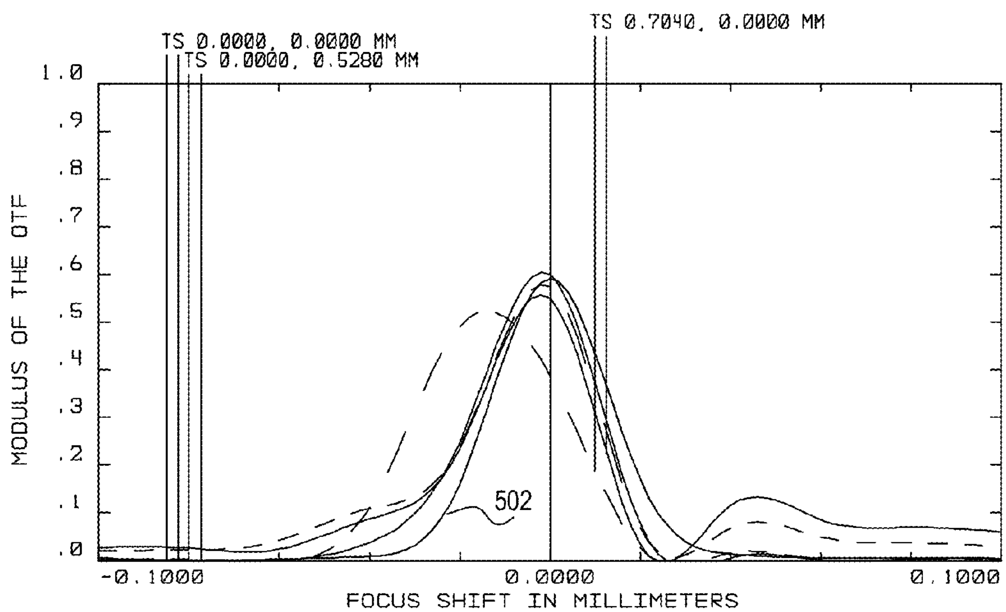
FIG. 24 shows a plot of the modulation transfer function as a function of defocus for the imaging system of FIG. 5.

FIG. 24 shows a plot 500 of the MTF as a function of defocus for VGA imaging system 110. Plot 500 includes MTF curves for three distinct field points associated with real image heights at detector 112; the three field points are an on-axis field point having coordinates (0 mm, 0 mm), a full field point in y having coordinates (0.704 mm, 0 mm), and a full field point in x having coordinates (0 mm, 0.528 mm). The on axis MTF 502 goes to zero at approximately ±25 microns.

Figure 25:
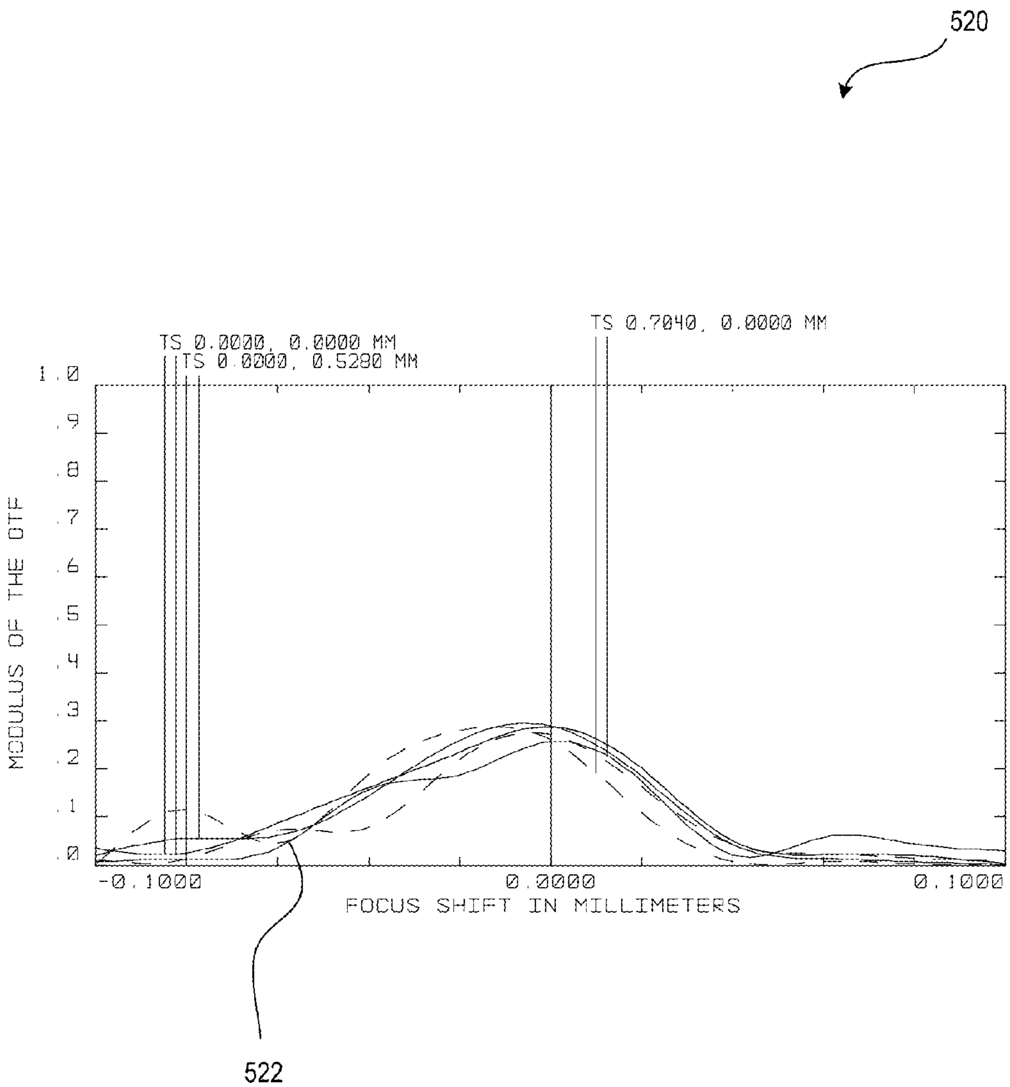
FIG. 25 shows a plot of the modulation transfer function as a function of defocus for the imaging system of FIG. 17.

FIG. 25 shows a plot 520 of the MTF as a function of defocus for VGA_WFC imaging system 420. Plot 520 includes MTF curves for the same three distinct field points as plot 500. The on axis MTF 522 approaches zero at approximately ±50 microns; accordingly, VGA_WFC imaging system 420 has a depth of field that is about twice as large as that of VGA imaging system 110.

Figure 26A:
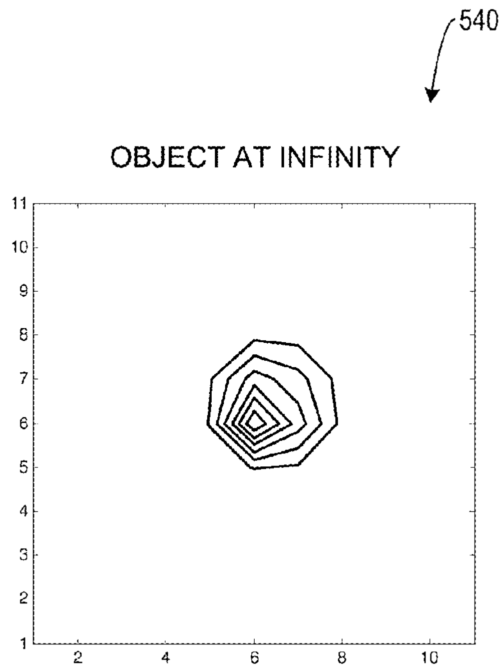
FIGS. 26A-26C show plots of point spread functions of the imaging system of FIG. 17, before processing.
Figure 26B:
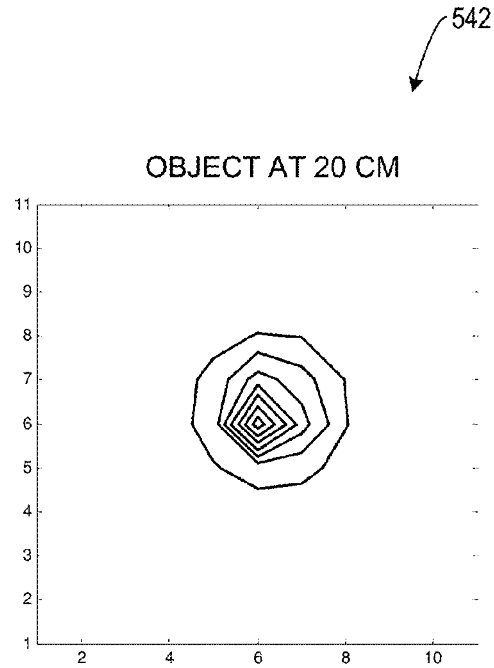
Figure 26C:
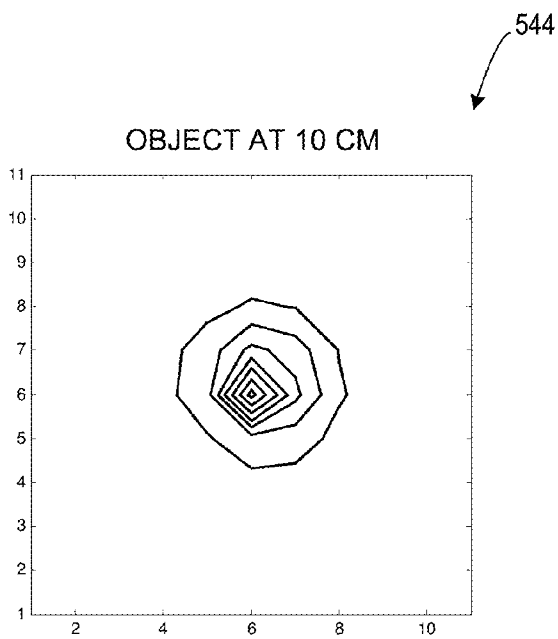

FIGS. 26A, 26B and 26C show plots of point spread functions ("PSFs") of VGA_WFC imaging system 420 before filtering. Plot 540 corresponds to an object conjugate distance of infinity; plot 542 corresponds to an object conjugate distance of 20 cm; and plot 544 corresponds to an object conjugate distance of 10 cm.

Figure 27A:
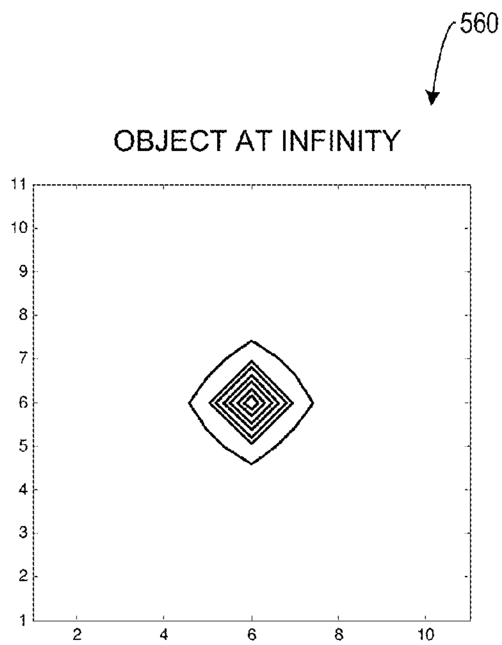
FIGS. 27A-27C show plots of point spread functions of the imaging system of FIG. 17, after filtering.
Figure 27B:
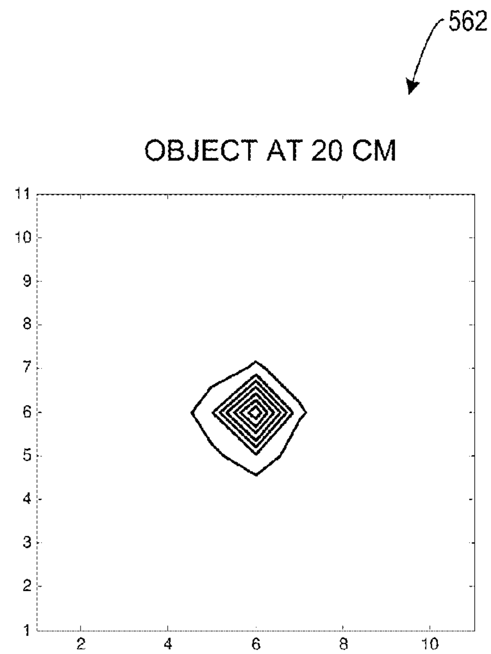
Figure 27C:
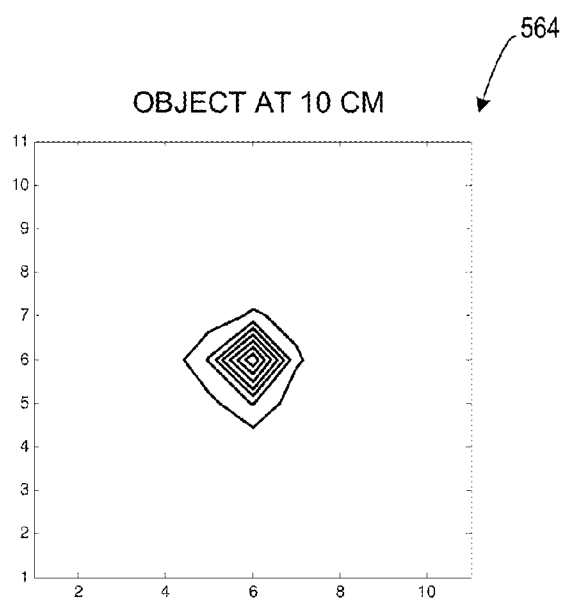

FIGS. 27A, 27B and 27C show plots of on-axis PSFs of VGA_WFC imaging system 420 after filtering by a processor (not shown), such as processor 46 of FIG. 1B, executing a decoding algorithm. Such filtering is discussed below with respect to FIGS. 28A and 28B. Plot 560 corresponds to an object conjugate distance of infinity, plot 562 corresponds to an object conjugate distance of 20 cm, and plot 564 corresponds to an object conjugate distance of 10 cm. As can be observed by comparing plots 560, 562, and 564, the PSFs after filtering are more compact than those before filtering. Since the same filter kernel was used to post process the PSFs for shown object conjugates, the filtered PSFs are slightly different from each other. One could use filter kernels specifically designed to post-process the PSF for each of the objects conjugate, in which case PSFs for each object conjugates may be made more similar to each other.

Figures 28A, 28B:
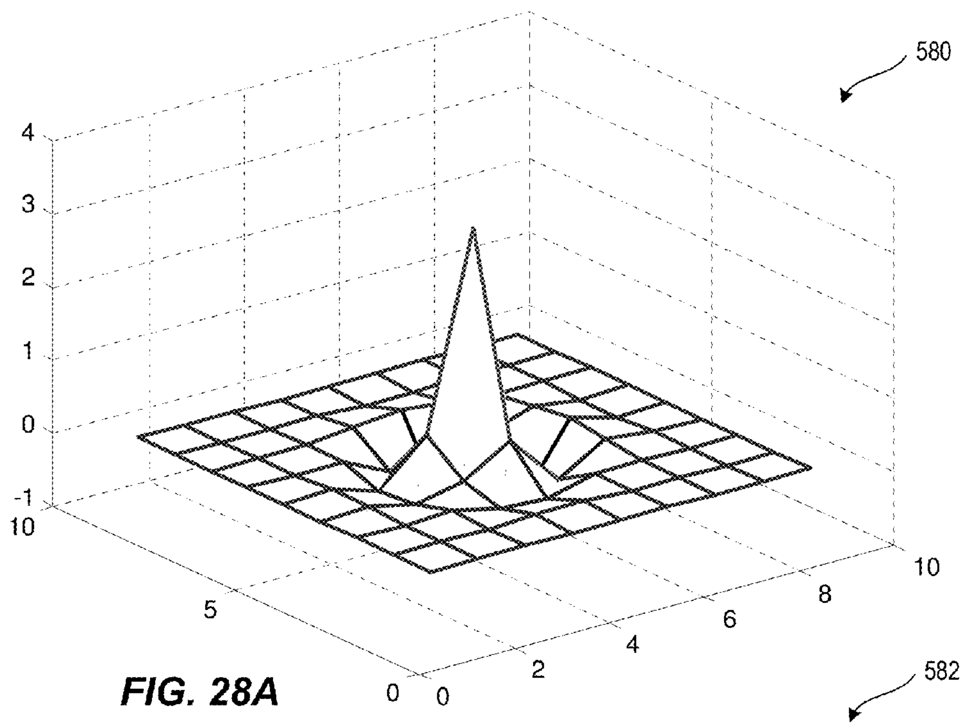
FIG. 28A shows a 3D plot representation of a filter kernel that may be used with the imaging system of FIG. 17, according to an embodiment.
FIG. 28B shows a tabular representation of the filter kernel shown in FIG. 28A.

FIG. 28A is a pictorial representation and FIG. 28B is a tabular representation of a filter kernel that may be used with VGA_WFC imaging system 420. Such a filter kernel may be used by a processor to execute a decoding algorithm to remove an imaging effect introduced in the image by a phase modifying element (e.g., phase modifying surface 432 of optical element 116(1')). Plot 580 is a three dimensional plot of the filter kernel, and the filter coefficient values are summarized in FIG. 28B. The filter kernel is 9×9 elements in extent. The filter was designed for the on-axis infinite object conjugate distance PSF.

Figure 29:
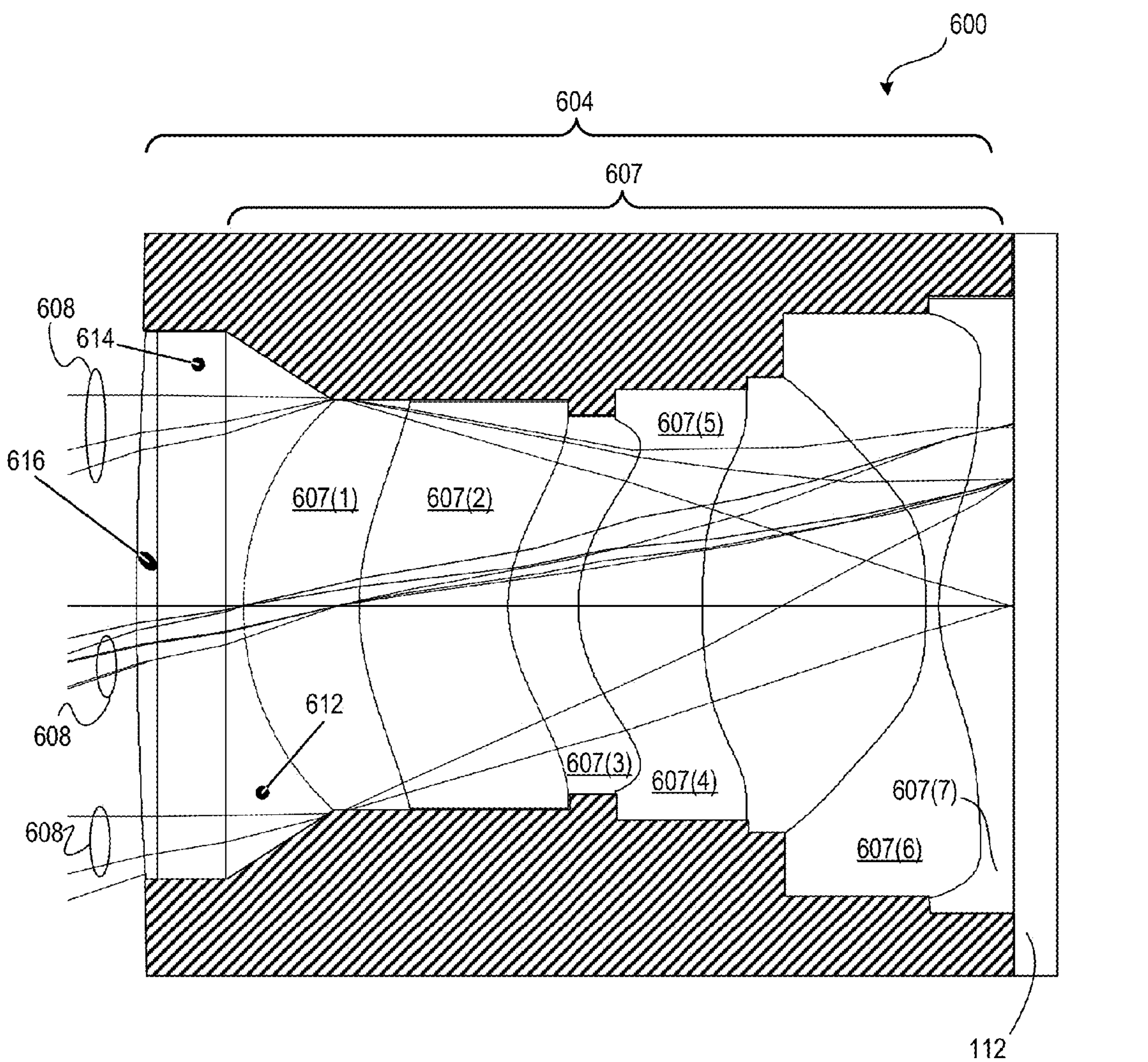
FIG. 29 is an optical layout and raytrace of one imaging system, according to an embodiment.

FIG. 29 is an optical layout and raytrace of a "VGA_AF" imaging system 600, which is an embodiment of imaging system 10 of FIG. 2A where "AF" stands for "auto-focus". Imaging system 600 is similar to VGA imaging system 110 of FIG. 5, as discussed below. Imaging system 600 may be one of arrayed imaging systems; such array may be separated into a plurality of sub-arrays and/or stand alone imaging systems as discussed above with respect to FIG. 2A. As previously, a cross hatched area shows yard regions, that is, areas outside the clear aperture through which electromagnetic energy does not propagate. Imaging system 600 includes optics 604. The sag for each element of optics 604 is given by Eq. (1). An exemplary prescription for optics 604 is summarized in TABLES 12-14. Radius and diameter are given in units of millimeters.

TABLE 12

| Surface | Radius | Thickness | Refractive index | Abbe# | Diameter | Conic |
|---|---|---|---|---|---|---|
| OBJECT | Infinity | Infinity | air | | Infinity | 0 |
| 2 | Infinity | 0.06 | 1.430 | 60.000 | 1.6 | 0 |
| | Infinity | 0.2 | 1.526 | 62.545 | 1.6 | 0 |
| 4 | Infinity | 0.05 | air | | 1.6 | 0 |
| STOP | 0.8414661 | 0.3366751 | 1.370 | 92.000 | 1.21 | 0 |
| 6 | 0.7257141 | 0.4340219 | 1.620 | 32.000 | 1.184922 | 0 |

TABLE 12-continued

| Surface | Radius | Thickness | Refractive index | Abbe# | Diameter | Conic |
|---|---|---|---|---|---|---|
| 7 | 0.6002909 | 0.2037323 | 1.370 | 92.000 | 1.103418 | 0 |
| 8 | 1.128762 | 0.3617095 | 1.620 | 32.000 | 1.082999 | 0 |
| 9 | 1.872443 | 0.65 | 1.370 | 92.000 | 1.263734 | 0 |
| 10 | −6.776813 | 0.03803262 | 1.620 | 32.000 | 1.337634 | 0 |
| 11 | 2.223674 | 0.2159973 | 1.370 | 92.000 | 1.709311 | 0 |
| IMAGE | Infinity | 0 | 1.458 | 67.820 | 1.793165 | 0 |

It should be noted that the thickness of Surface 2, and the value of coefficient $A_2$, change with object distance as shown in TABLE 13:

TABLE 13

| | Object distance (mm) | | |
|---|---|---|---|
| | Infinity | 400 | 100 |
| Thickness on surface 2 (mm) | 0.06 | 0.0619 | 0.063 |
| $A_2$ | 0.04 | 0.0429 | 0.0493 |

TABLE 14

| Surface# | $A_2$ | $A_4$ | $A_6$ | $A_8$ | $A_{10}$ | $A_{12}$ | $A_{14}$ | $A_{16}$ |
|---|---|---|---|---|---|---|---|---|
| 1(Object) | 0 | 0 | 0 | 0 | 0 | 0 | 0 | 0 |
| 2 | 0.040 | 0 | 0 | 0 | 0 | 0 | 0 | 0 |
| 3 | 0 | 0 | 0 | 0 | 0 | 0 | 0 | 0 |
| 4 | 0 | 0 | 0 | 0 | 0 | 0 | 0 | 0 |
| 5(Stop) | 0 | 0.2153 | −0.4558 | 0.5998 | 0.01651 | 0 | 0 | 0 |
| 6 | 0 | −1.302 | 0.3804 | 0.2710 | −3.341 | 0 | 0 | 0 |
| 7 | 0.3325 | −2.274 | −5.859 | 25.50 | −50.31 | 0 | 0 | 0 |
| 8 | 0.7246 | −0.5474 | −1.793 | 0.6142 | −70.88 | 0 | 0 | 0 |
| 9 | 0 | 1.017 | 9.634 | −62.33 | 81.79 | 0 | 0 | 0 |
| 10 | 0 | −11.69 | 56.16 | −115.0 | 85.75 | 0 | 0 | 0 |
| 11 | 0.6961 | −2.400 | 0.5905 | 6.770 | −7.627 | 0 | 0 | 0 |

Imaging system 600 includes detector 112 and optics 604. Optics 604 includes a variable optic 616 formed on a common base 614 and layered optical elements 607(1)-607(7). A common base 614 (e.g., a glass plate) and optical element 607(1) define an air gap 612. Spacers, which are not shown in FIG. 30, facilitate formation of air gap 612. Detector 112 has a VGA format. Accordingly, the structure of VGA_AF imaging system 600 differs from the structure of VGA imaging system 110 of FIG. 5 in that the VGA_AF imaging system 600 has a slightly different prescription compared to the VGA imaging system 110, and the VGA_AF imaging system 600 further includes variable optic 616 formed on common base 614, which is separated from layered optical element 607(1) by air gap 612. VGA_AF imaging system 600 as shown has a focal length of 1.50 millimeters, a field of view of 62°, F/# of 1.3, a total track length of 2.25 mm, and a maximum chief ray angle of 31°. Rays 608 represent electromagnetic energy being imaged by VGA_AF imaging system 600; rays 608 are assumed to originate from infinity.

The focal length of variable optic 616 may be varied to partially or fully correct for defocus in the VGA_AF imaging system 600. For example, the focal length of variable optic 616 may be varied to adjust the focus of imaging system 600 for different object distances. In an embodiment, a user of the VGA_AF imaging system 600 manually adjusts the focal length of variable optic 616; in another embodiment, the VGA_AF imaging system 600 automatically changes the focal length of variable optic 616 to correct for aberrations, such as defocus.

In an embodiment, variable optic 616 is formed from a material with a sufficiently large coefficient of thermal expansion ("CTE"), such as polydimethylsiloxane ("PDMS"), which has a CTE of approximately $3.1\times10^{-4}$/K, deposited on common base 614. The focal length of this variable optic 616 may be varied by changing the temperature of the material, causing the material to expand or contract; causing variable optic 616 to change focal length. The temperature of the material may be changed by use of an electric heating element, which may possibly be formed into the yard region. For example, a heating element may be formed from a ring of polysilicon material surrounding the periphery of variable optic 616. In one embodiment, the heater has an inner diameter ("ID") of 1.6 mm, an outer diameter ("OD") of 2.6 mm and a thickness of 0.6435 mm. The heater surrounds variable optic 616, which has an OD of 1.6 mm, an edge thickness ("ET") of 0.645 mm and a center thickness ("CT") of greater than 0.645 mm, thereby forming a positive optical element. Polysilicon that forms the heater ring has a heat capacity of approximately 700 J/Kg·K, a resistivity of approximately $6.4\times10^{2}$ ΩM and a CTE of approximately $2.6\times10^{-6}$/K.

Assuming that the expansion of the polysilicon heater ring is negligible with respect to that of PDMS variable optic 616, then the volume expansion of variable optic 616 is constrained in a piston-like manner. The PDMS variable optic 616 is attached to common base 614 and the ID of the heater ring, and is thereby constrained. The curvature of a top surface 615 of variable optic 616 is directly controlled therefore by the expansion of the polymer. A change in sag $\Delta h$ is defined as $\Delta h=3\alpha\Delta Th$ where h is the original sag (CT) value, $\Delta T$ is the temperature change and $\alpha$ is the linear expansion coefficient of variable optic 616. For a PDMS variable optic 616 of the dimensions described above, a temperature change of 10° C. will provide a sag change of 6 microns. This calculation may provide as much as a 33% overestimate of sag change (e.g., cylindrical volume $\pi r^3$ compared to spherical volume $0.66\pi r^3$) since only axial expansion is assumed, however, the modulus of the material will constrain the motion and alter the surface curvature and therefore the optical power.

For an exemplary heater ring formed from polysilicon, a current of approximately 0.3 milliamps for 1 second is sufficient to raise the temperature of the ring by 10°. Then, assuming that a majority of the heat is conducted into variable optic 616, this heat flow drives the expansion. Other heat will be lost to conduction and radiation, but the ring may be mounted upon a 200 micron glass substrate (e.g., common base 614) and further thermally isolated to minimize conduction. Other heater rings may be formed from the materials and processes used in the fabrication of thick film or thin film resistors. Alternatively, variable optic 616 may be heated from the top or bottom surfaces via a transparent resistive layer such as indium tin oxide ("ITO"). Furthermore, for suitable polymers a current may be directed through the polymer itself. In other embodiments, variable optic 616 includes a liquid lens or a liquid crystal lens.

Figure 30:
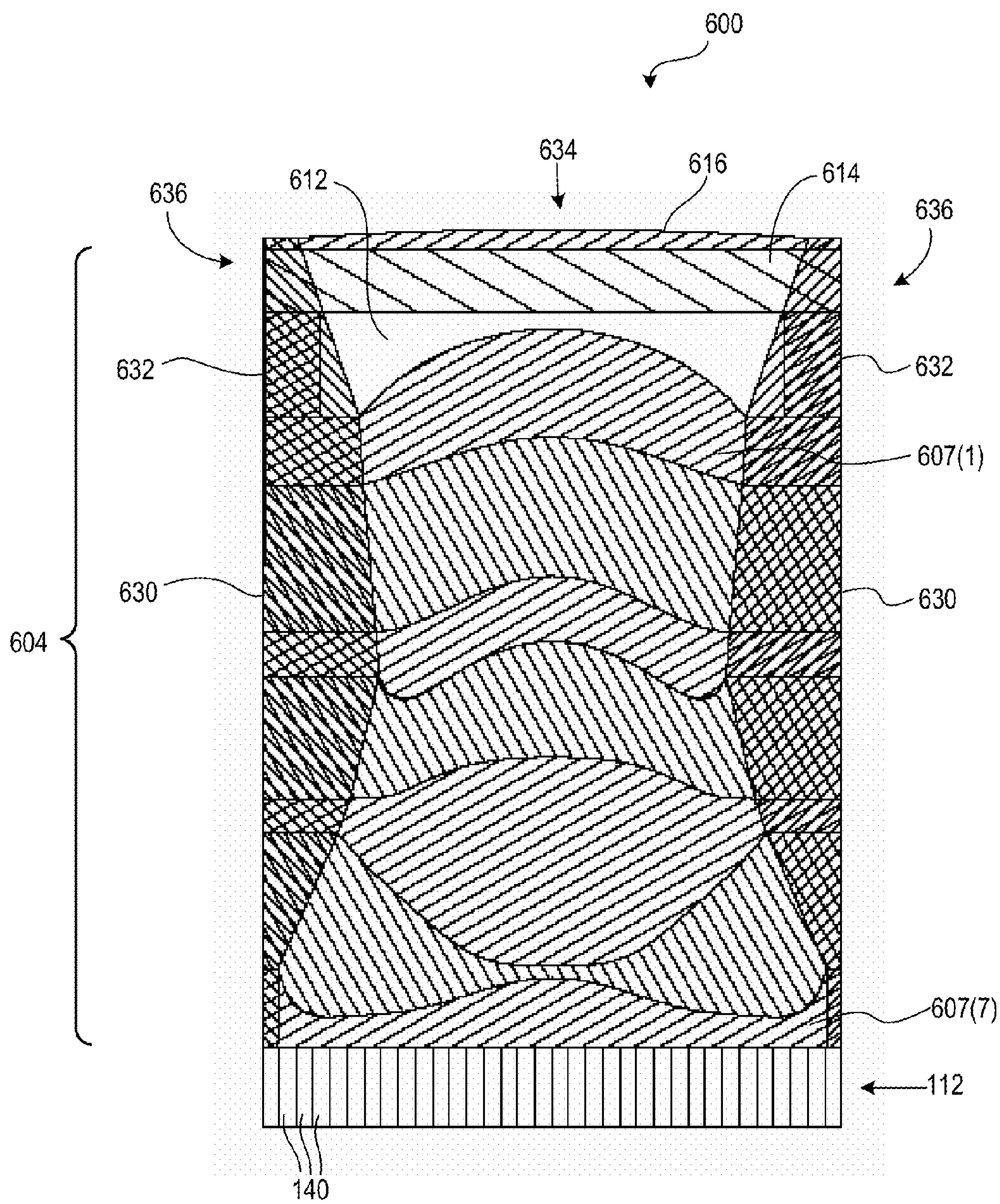
FIG. 30 is a cross-sectional illustration of the imaging system of FIG. 29, after being diced from arrayed imaging systems, according to an embodiment.

FIG. 30 is a cross-sectional illustration of VGA_AF imaging system 600 of FIG. 29 obtained from separating arrayed imaging systems. Relatively straight sides 630 are indicative of VGA_AF imaging system 600 having been separated from arrayed imaging systems. For illustrative clarity, only layered optical elements 607(1) and 607(7) are labeled in FIG. 30. Spacers 632 are used to separate layered optical element 607(1) and common base 614 to form air gap 612.

Optics 604 forms a clear aperture 634 corresponding to that part of optics 604 through which electromagnetic energy travels to reach detector 112. Yards 636 outside of clear aperture 634 are represented by dark shading in FIG. 30.

Figure 31A:
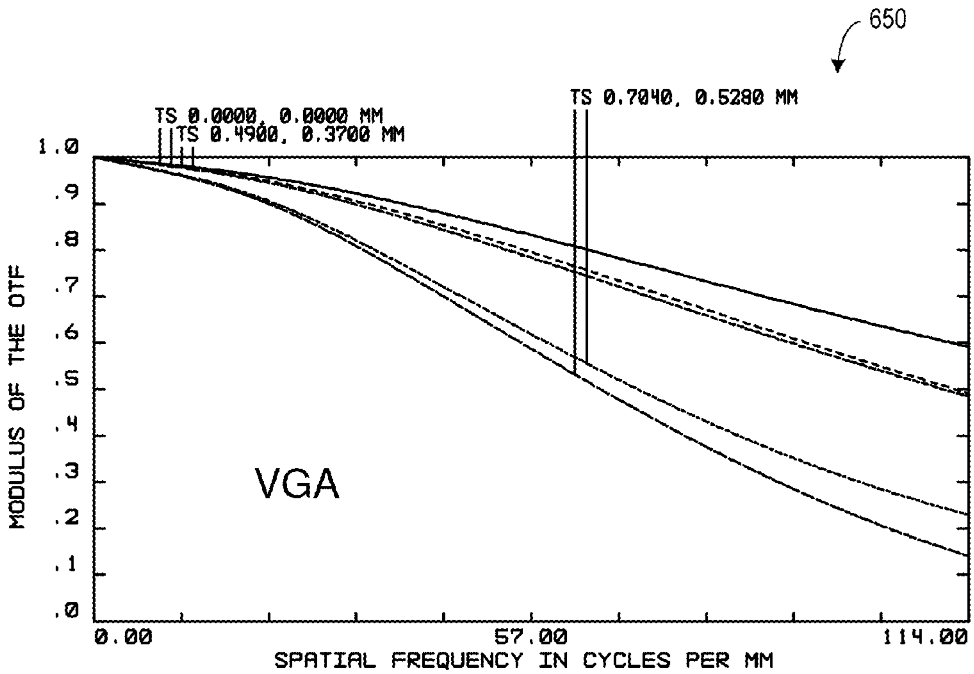
FIGS. 31A, 31B, 32A, 32B, 33A and 33B show plots of the modulation transfer functions as a function of spatial frequency of the imaging systems of FIGS. 5 and 29, at different object conjugates.
Figure 31B:
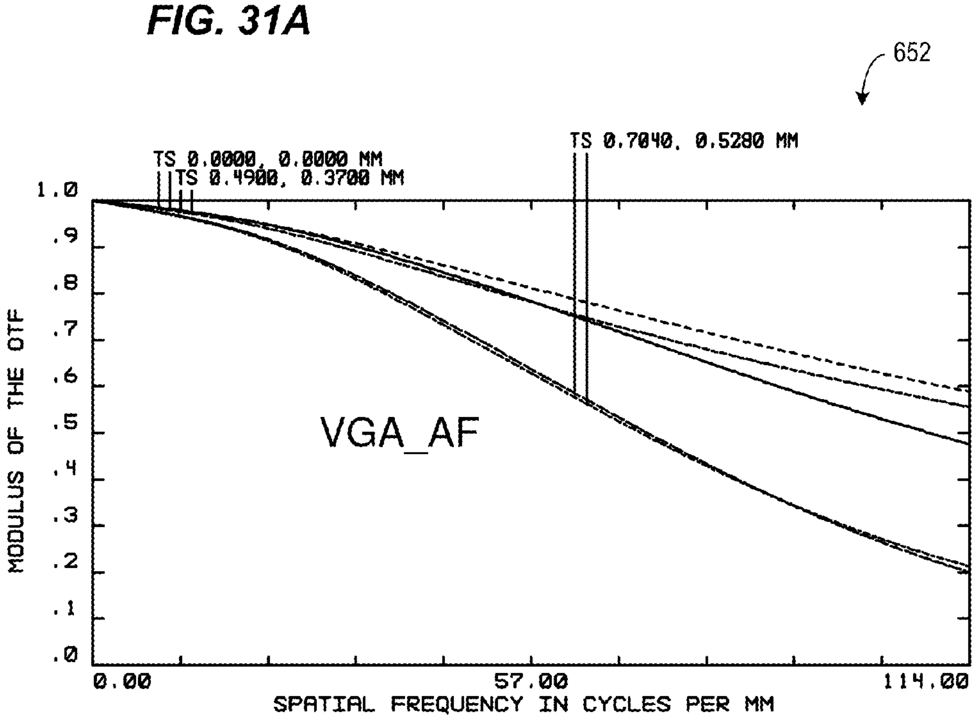

FIGS. 31-39 compare performance of VGA_AF imaging system 600 to VGA imaging system 110 of FIG. 5. As stated above, VGA_AF imaging system 600 differs from VGA imaging system 110 in that VGA_AF imaging system 600 has a slightly different prescription and includes variable optic 616 formed on common base 614 separated from layered optical elements 607 by an air gap 612. In particular, FIGS. 31-33 show plots of the MTFs as a function of spatial frequency for VGA imaging system 110 and VGA_AF imaging systems 600. The MTFs are averaged over wavelengths from 470 to 650 nm. Each plot includes MTF curves for three distinct field points associated with real image heights on a diagonal axis of detector 112; the three field points are an on-axis field point having coordinates (0 mm, 0 mm), a 0.7 field point having coordinates (0.49 mm, 0.37 mm), and a full field point having coordinates (0.704 mm, 0.528 mm). FIGS. 31A and 31B show plots 650 and 652 of MTF curves at an object conjugate distance of infinity; plot 650 corresponds to VGA imaging system 110 and plot 652 corresponds to VGA_AF imaging system 600. A comparison of plots 650 and 652 shows that VGA imaging system 110 and VGA_AF imaging system 600 perform similarly at an object conjugate distance of infinity.

Figure 32A:
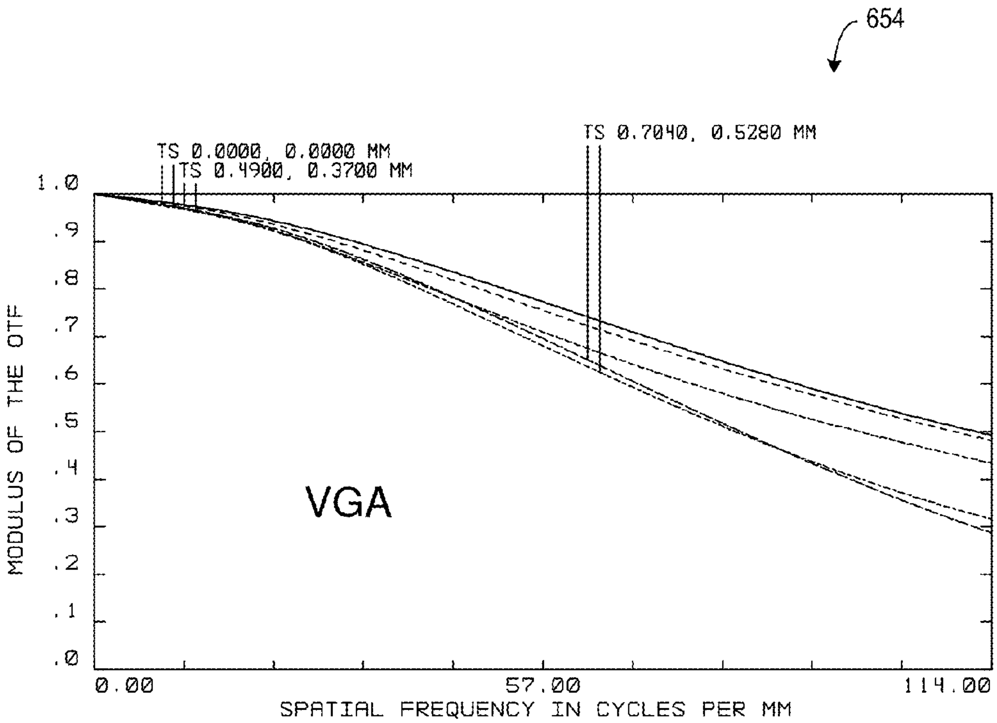
Figure 32B:
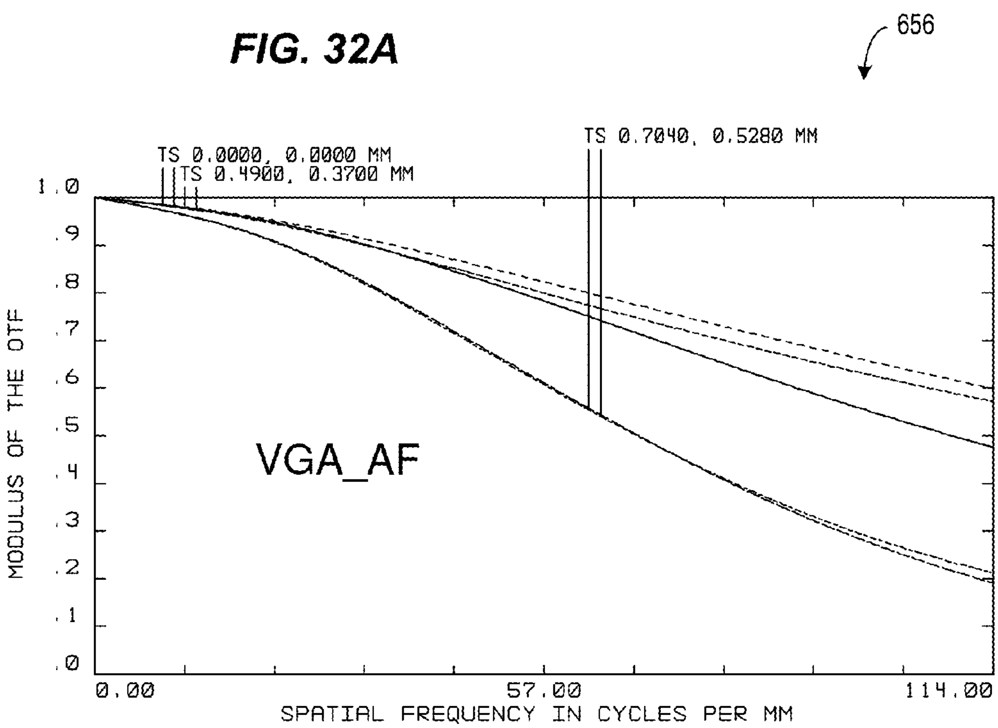
Figure 33A:
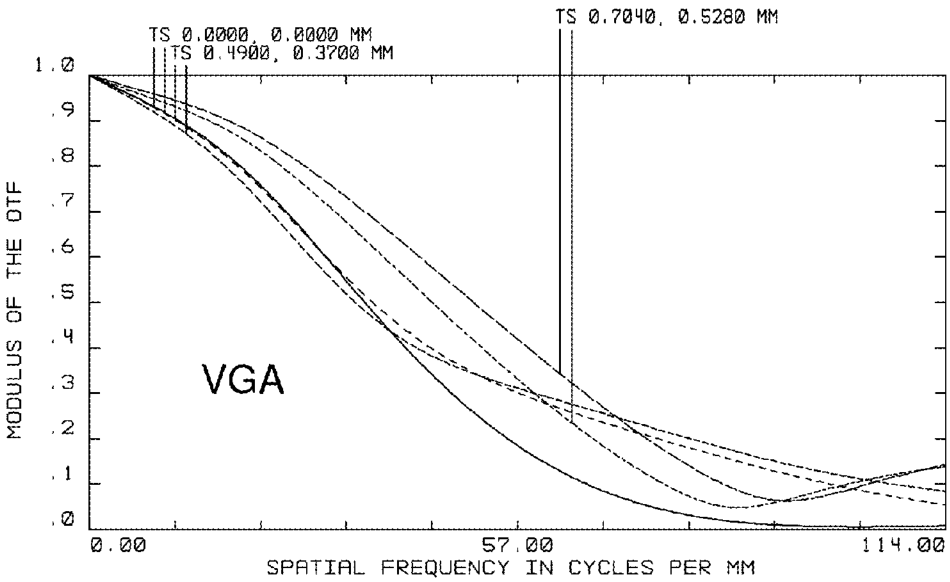
Figure 33B:
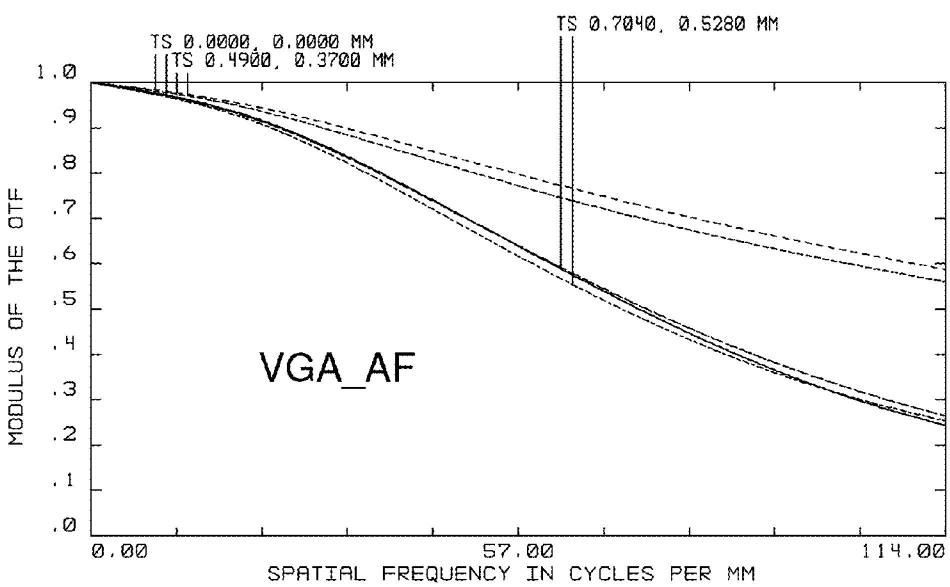

FIGS. 32A and 32B show plots 654 and 656, respectively, of MTF curves at an object conjugate distance of 40 cm; plot 654 corresponds to VGA imaging system 110 and plot 656 corresponds to VGA_AF imaging system 600. Similarly, FIGS. 33A and 33B include plots 658 and 660, respectively, of MTF curves at an object conjugate distance of 10 cm; plot 658 corresponds to VGA imaging system 110 and plot 660 corresponds to VGA_AF imaging system 600. A comparison of FIGS. 31A and 31B to FIGS. 33A and 33B shows that performance of VGA imaging system 110 is degraded due to defocus as the object conjugate distance decreases; however, performance of the VGA_AF imaging system 600 remains relatively constant at an object conjugate distance range from 10 cm to infinity due to inclusion of variable optic 616 in VGA_AF imaging system 600. Furthermore, as may be observed from plot 658, the MTF of VGA imaging system 110 may fall to zero at small object conjugate distances, resulting in loss of image information, in contrast with VGA_AF imaging system 600.

Figure 34A:
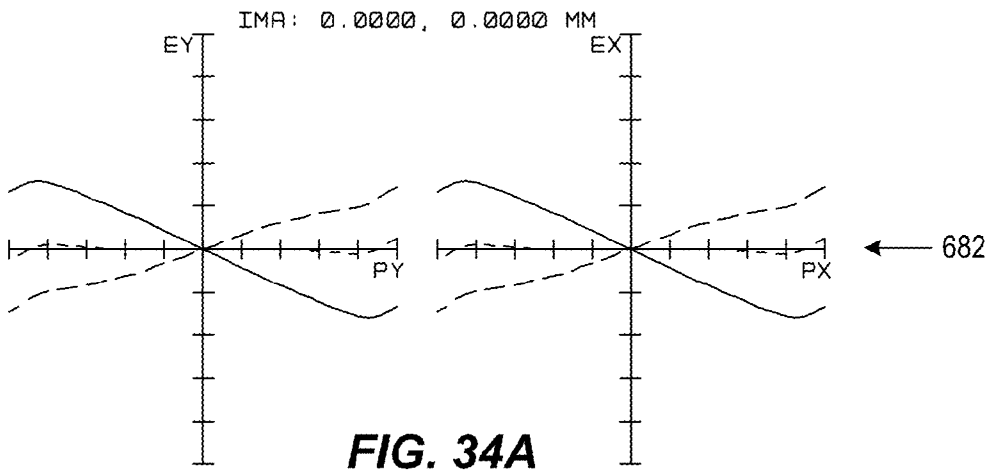
FIGS. 34A-34C, 35A-35C and 36A-36C show transverse ray fan plots of the imaging system of FIG. 5, at different object conjugates.
Figure 34B:
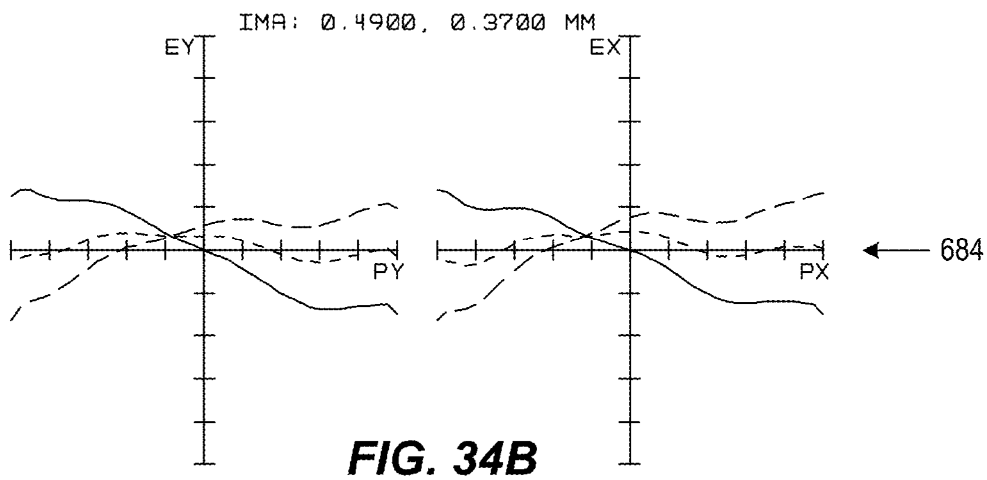
Figure 34C:
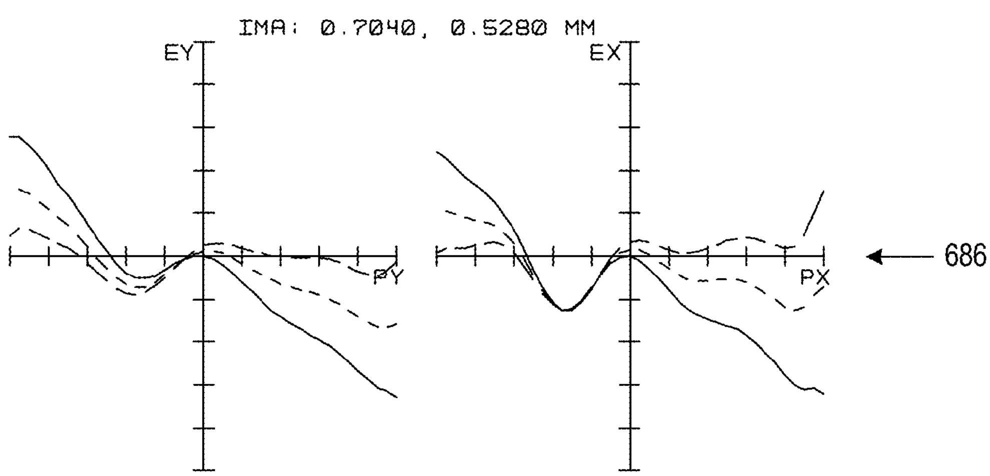
Figure 35A:
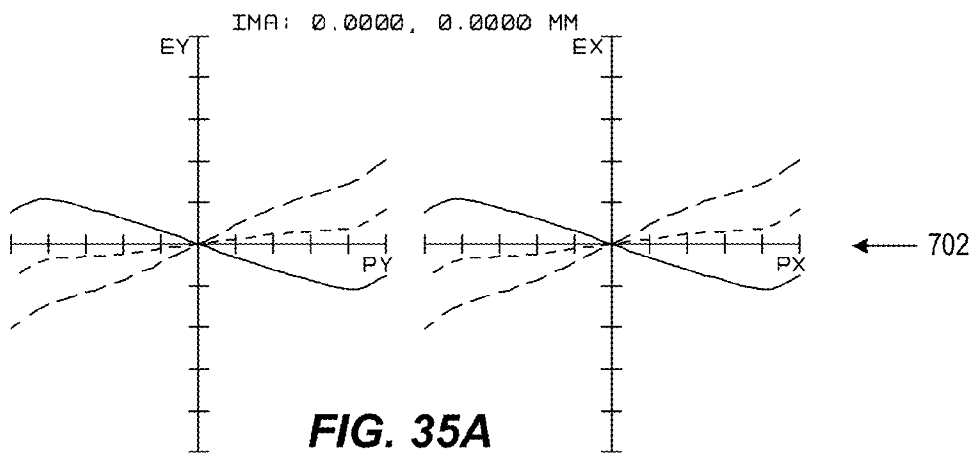
Figure 35B:
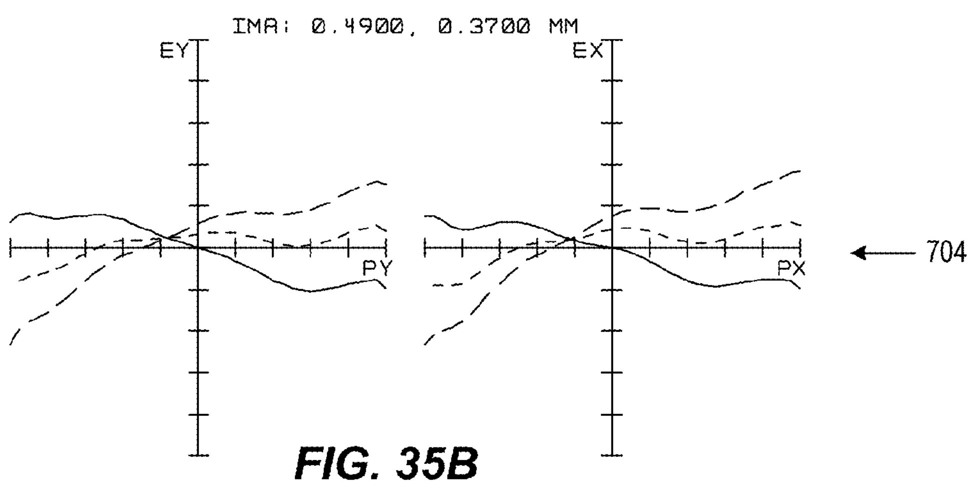
Figure 35C:
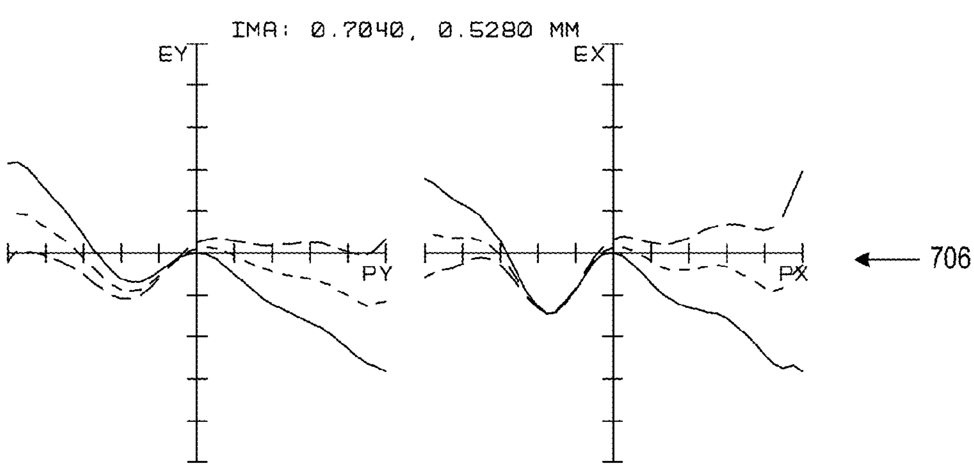
Figure 36A:
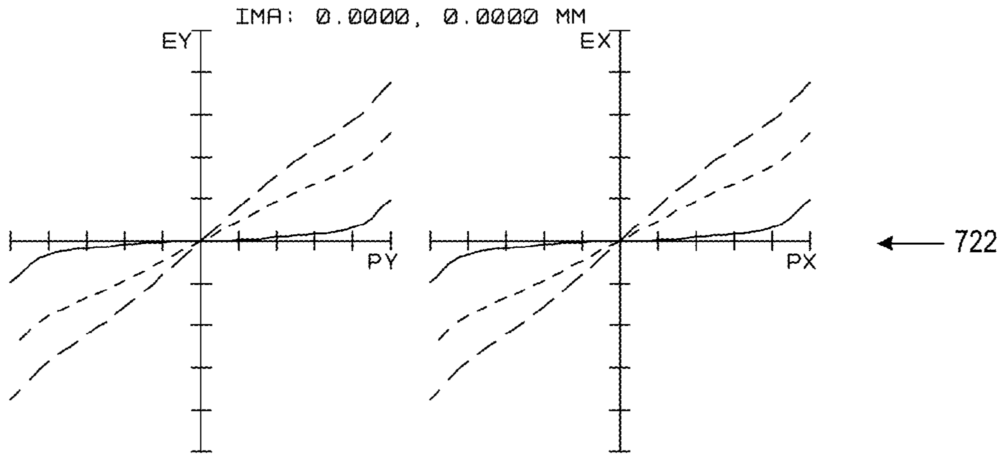
Figure 36B:
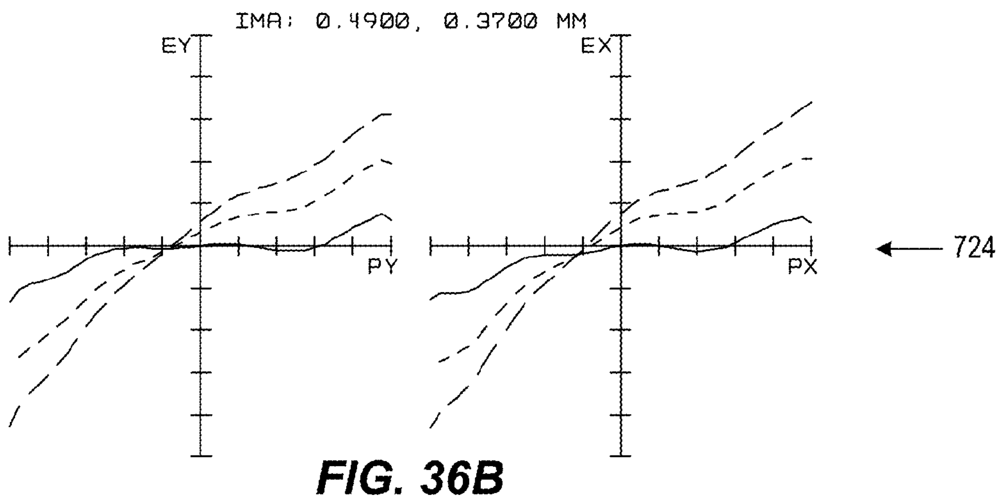
Figure 36C:
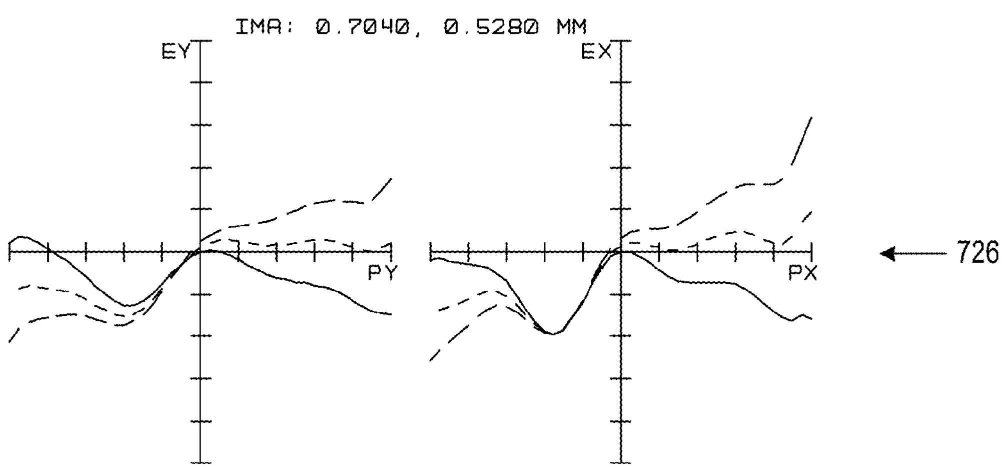
Figure 37A:
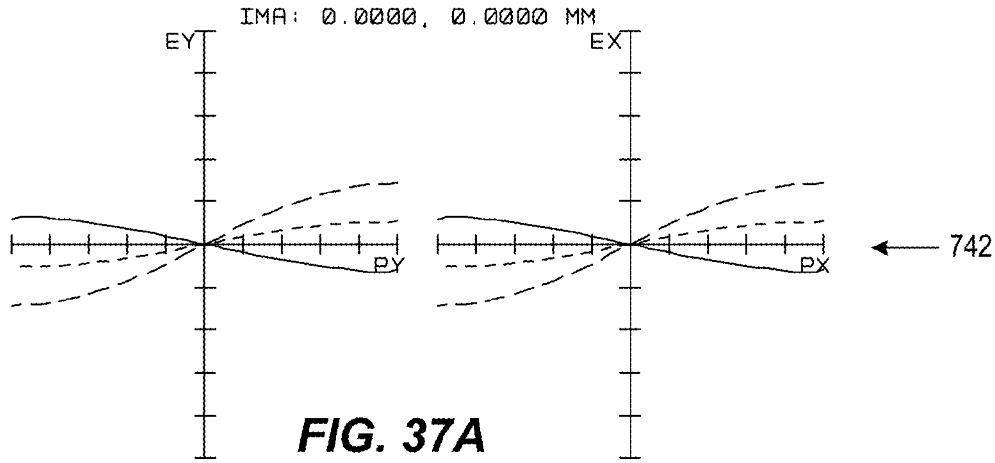
FIGS. 37A-37C, 38A-38C and 39A-39C show transverse ray fan plots of the imaging system of FIG. 29, at different object conjugates.
Figure 37B:
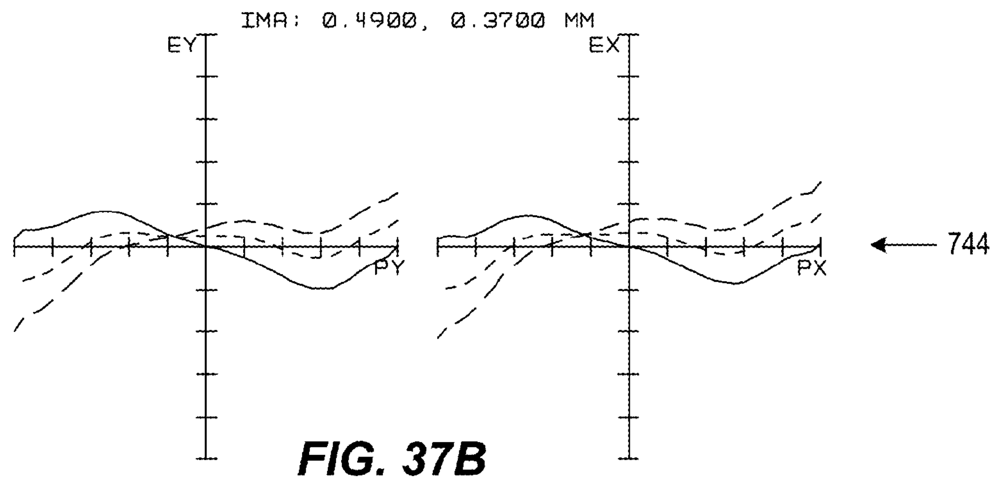
Figure 37C:
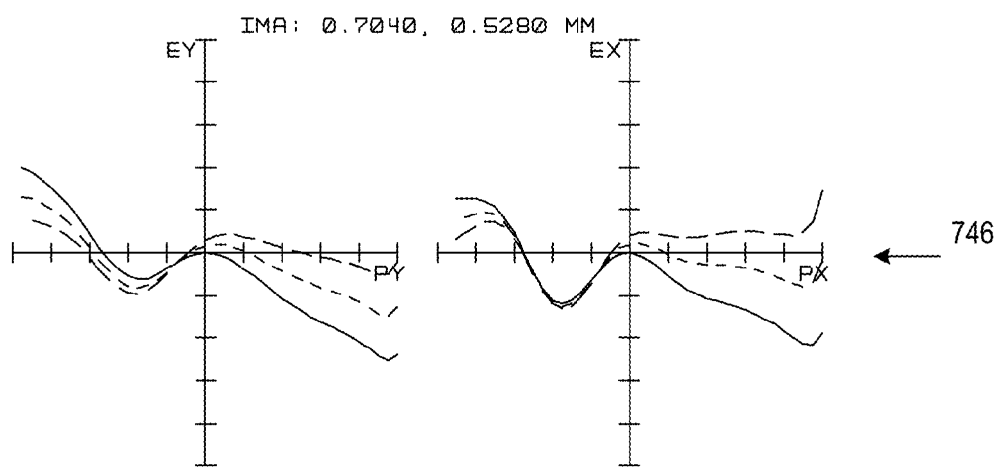
Figure 38A:
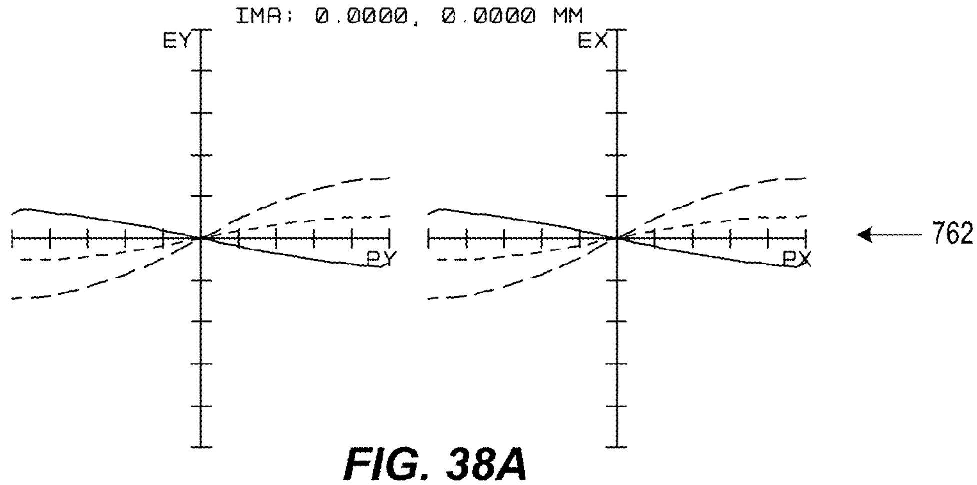
Figure 38B:
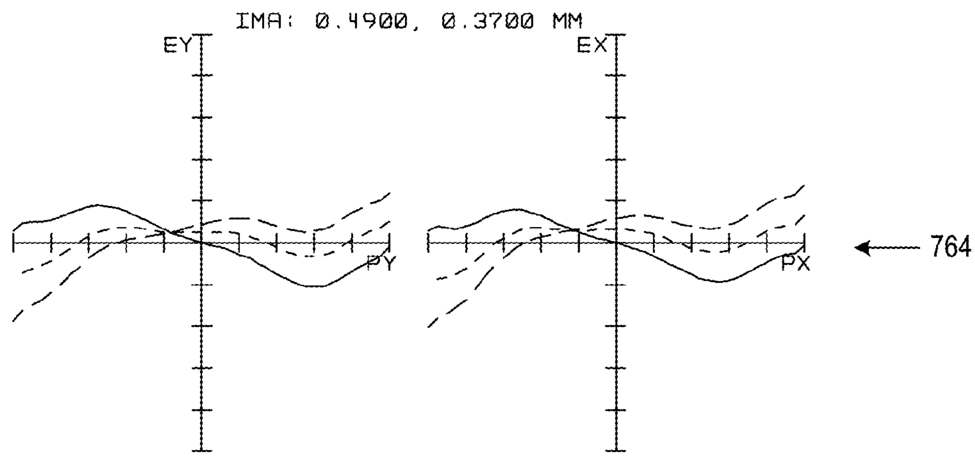
Figure 38C:
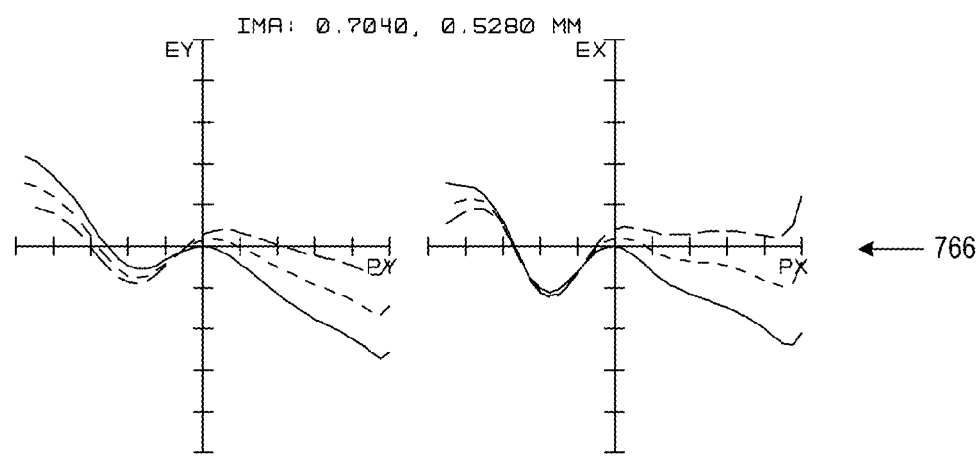
Figure 39A:
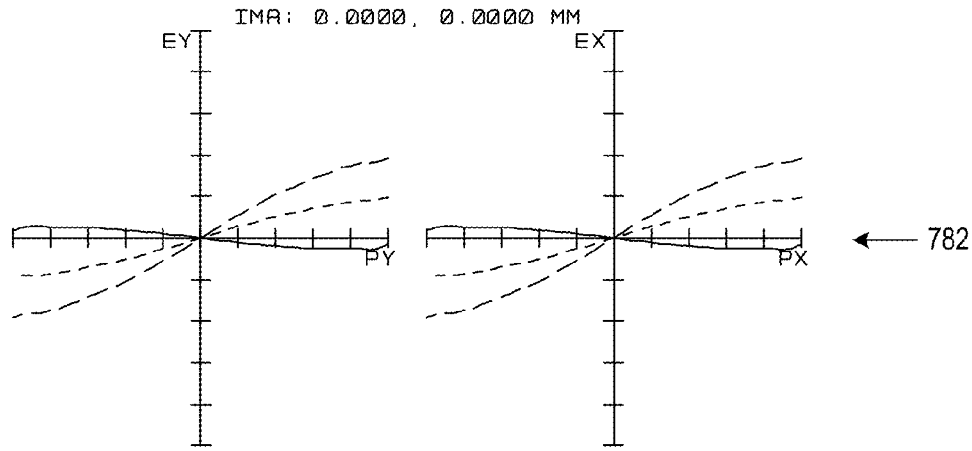
Figure 39B:
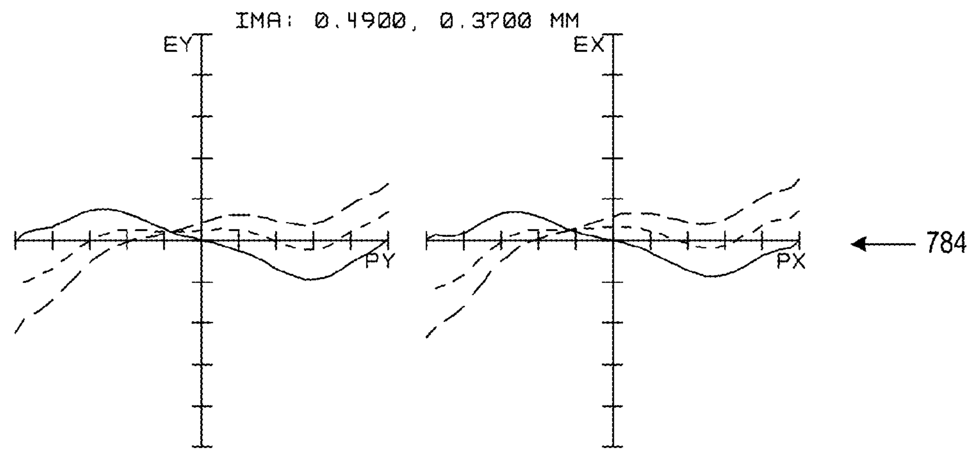
Figure 39C:
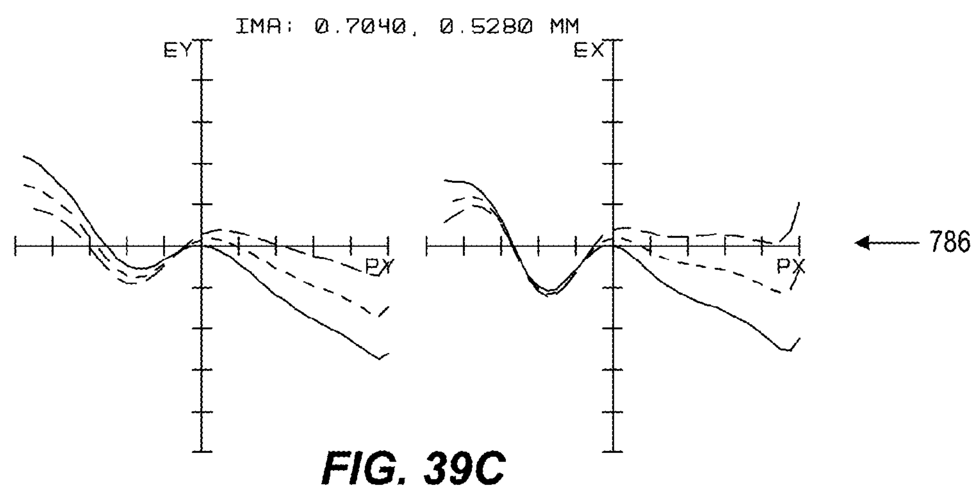

FIGS. 34-36 show transverse ray fan plots of VGA imaging system 110, and FIGS. 37-39 show transverse ray fan plots of VGA_AF imaging system 600. In FIGS. 34-39, the maximum scale is +/−20 microns. The solid lines correspond to a wavelength of 470 nm; the short dashed lines correspond to a wavelength of 550 nm; and the long dashed lines correspond to a wavelength of 650 nm. In particular, FIGS. 34-36 include pairs of plots corresponding to VGA imaging system 110 at conjugate object distances of infinity (pairs of plots 682, 684 and 686), 40 cm (pairs of plots 702, 704 and 706), and 10 cm (pairs of plots 722, 724 and 726). FIGS. 37-39 include pairs of plots corresponding to the VGA_AF imaging system 600 at conjugate object distances of infinity (pairs of plots 742, 744 and 746), 40 cm (pairs of plots 762, 764 and 766), and 10 cm (pairs of plots 782, 784 and 786). Plots 682, 702, 722, 742, 762, and 782 correspond to an on-axis field point having coordinates (0 mm, 0 mm), plots 684, 704, 724, 744, 764, and 784 correspond to a 0.7 field point having coordinates (0.49 mm, 0.37 mm), and plots 686, 706, 726, 746, 766, and 786 correspond to a full field point having coordinates (0.704 mm, 0.528 mm). In each pair of plots, the left hand plot shows tangential ray fans, and right hand plot shows sagittal ray fans.

Comparison of FIGS. 34-36 show that the ray fan plots change as a function of object conjugate distance; in particular, the ray fan plots of FIGS. 36A-36C, which correspond to an object conjugate distance of 10 cm, are significantly different than the ray fan plots of FIGS. 34A-34C, which correspond to an object conjugate distance of infinity. Accordingly, the performance of VGA imaging system 110 varies significantly as a function of object conjugate distance. In contrast, comparison of FIGS. 37-39 show that the ray fan plots of VGA_AF imaging system 600 vary little as object conjugate distance changes from infinity to 10 cm; accordingly, performance of the VGA_AF imaging system 600 varies little as the object conjugate distance changes from infinity to 10 cm.

Figure 40:
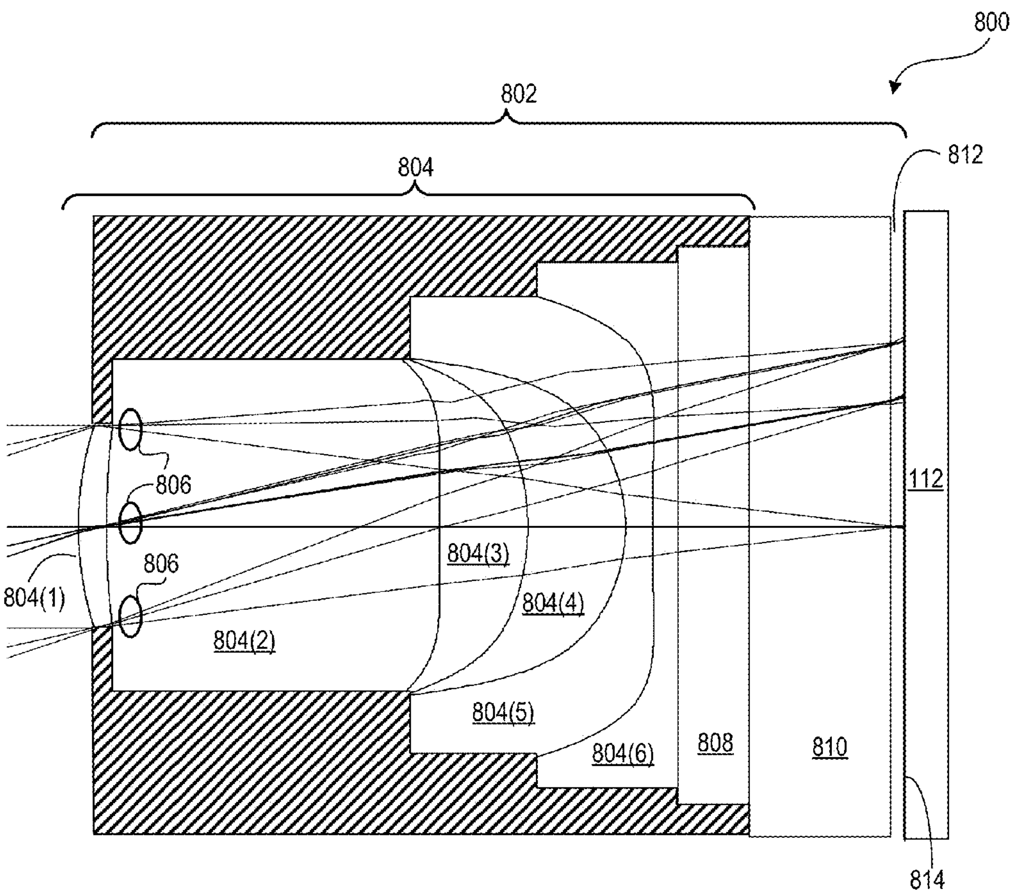
FIG. 40 is a cross-sectional illustration of a layout of one imaging system, according to an embodiment.

FIG. 40 is a cross-sectional illustration of a layout of "VGA_W" imaging system 800, which is an embodiment of imaging system 10 of FIG. 2A. The "W" indicates that a portion of VGA_W imaging system 800 may be fabricated using WAfer-Level Optics ("WALO") fabrication techniques, which are discussed below. In the context of the present disclosure, "WALO-style optics" refers to two or more optics (in its general sense of the term, referring to one or more optical elements, combinations of optical elements, layered optical elements and imaging systems) distributed over a surface of a common base; similarly, "WALO fabrication techniques" or, equivalently, "WALO techniques" refers to the simultaneous fabrication of a plurality of imaging systems by assembly of a plurality of common bases supporting WALO-style optics. Imaging system 800 may be one of arrayed imaging systems; such array may be separated into a plurality of sub-arrays and/or stand alone imaging systems as discussed above with respect to FIG. 2A. Imaging system 800 includes VGA format detector 112 and optics 802. Imaging system 800 may hereinafter be referred to as the VGA_W imaging system. VGA_W imaging system 800 has a focal length of 1.55 millimeters, a field of view of 62°, F/# of 2.9, a total track length of 2.35 mm (including optical elements, optical element cover plate and detector cover plate, as well as an air gap between the detector cover plate and the detector), and a maximum chief ray angle of 29°. The cross hatched area shows the yard region, or the area outside the clear aperture, through which electromagnetic energy does not propagate, as earlier discussed.

Optics 802 includes detector cover plate 810 separated from a surface 814 of detector 112 by an air gap 812. In an embodiment, air gap 812 has a thickness of 0.04 mm to accommodate lenslets of surface 814. Optional optical element cover plate 808 may be positioned adjacent to detector cover plate 810. In an embodiment, detector cover plate 810 is 0.4 mm thick. Layered optical element 804(6) is formed on optical element cover plate 808; layered optical element 804 (5) is formed on layered optical element 804(6); layered optical element 804(4) is formed on layered optical element 804(5); layered optical element 804(3) is formed on layered optical element 804(4); layered optical element 804(2) is formed on layered optical element 804(3); and layered optical element 804(1) is formed on layered optical element 804(2). Layered optical elements 804 are formed of two different materials, in this example, with each adjacent layered optical element 804 being formed of different material. Specifically, layered optical elements 804(1), 804(3), and 804(5) are formed of a first material with a first refractive index, and layered optical elements 804(2), 804(4), and 804(6) are formed of a second material with a second refractive index. Rays 806 represent electromagnetic energy being imaged by VGA_W imaging system 800. A prescription for optics 802 is summarized in TABLES 15 and 16. The sag for the optics 802 is given by Eq. (1), where radius, thickness and diameter are given in units of millimeters.

Figure 42A:
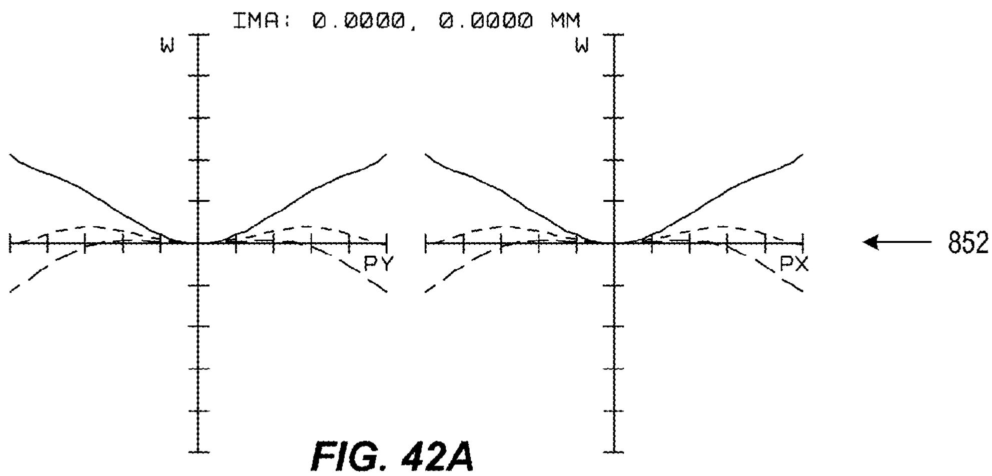
FIGS. 42A-42C show plots of optical path differences of the imaging system of FIG. 40.
Figure 42B:
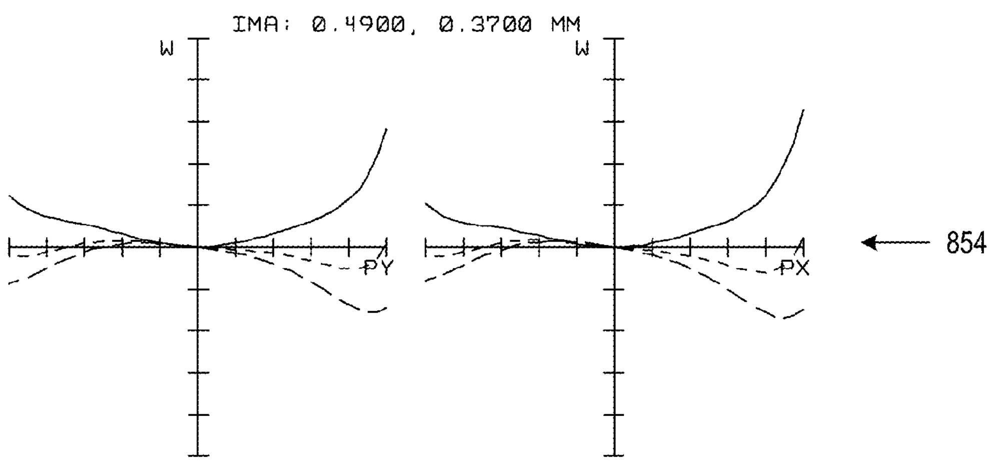
Figure 42C:
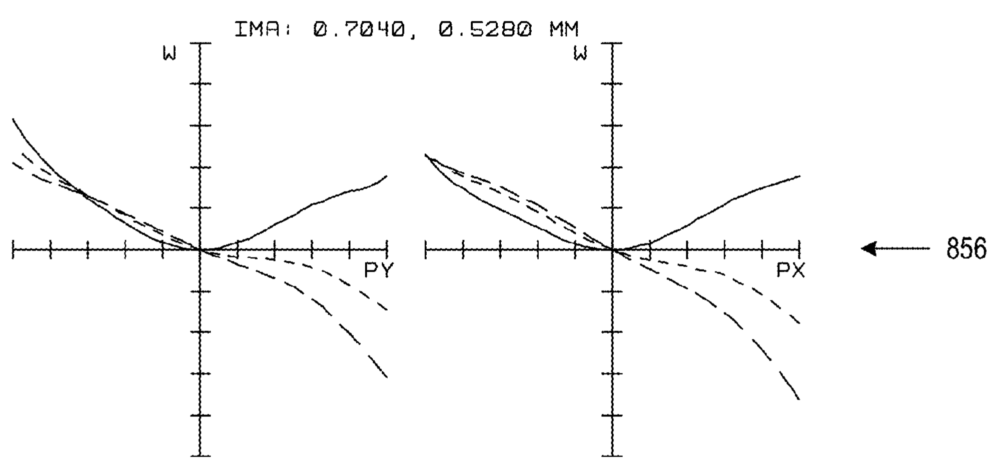

FIGS. 42A, 42B and 42C show pairs of plots 852, 854 and 856, respectively of the optical path differences of VGA_W imaging system 800. The maximum scale in each direction is +/−two waves. The solid lines correspond to electromagnetic energy having a wavelength of 470 nm; the short dashed lines correspond to electromagnetic energy having a wavelength of 550 nm; the long dashed lines correspond to electromagnetic energy having a wavelength of 650 nm. Each plot represents optical path differences at a different real image height on the diagonal of detector 112. Plots 852 correspond to an on-axis field point having coordinates (0 mm, 0 mm); plots 854 correspond to a 0.7 field point having coordinates (0.49 mm, 0.37 mm); and plots 856 correspond to a full field point having coordinates (0.704 mm, 0.528 mm). In each pair of plots, the left plot shows wavefront error for the tangential set of rays, and the right plot shows wavefront error for sagittal set of rays.

Figure 43A:
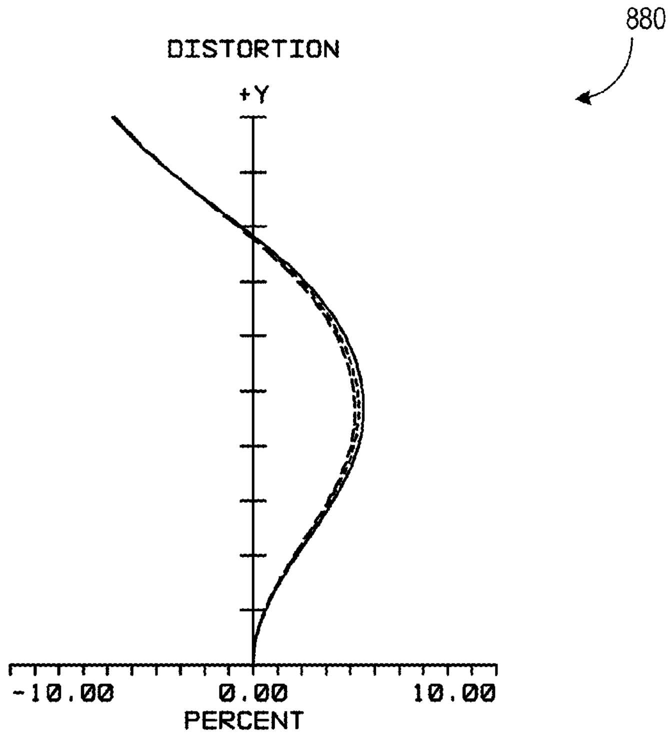
FIG. 43A shows a plot of distortion of the imaging system of FIG. 40.
Figure 43B:
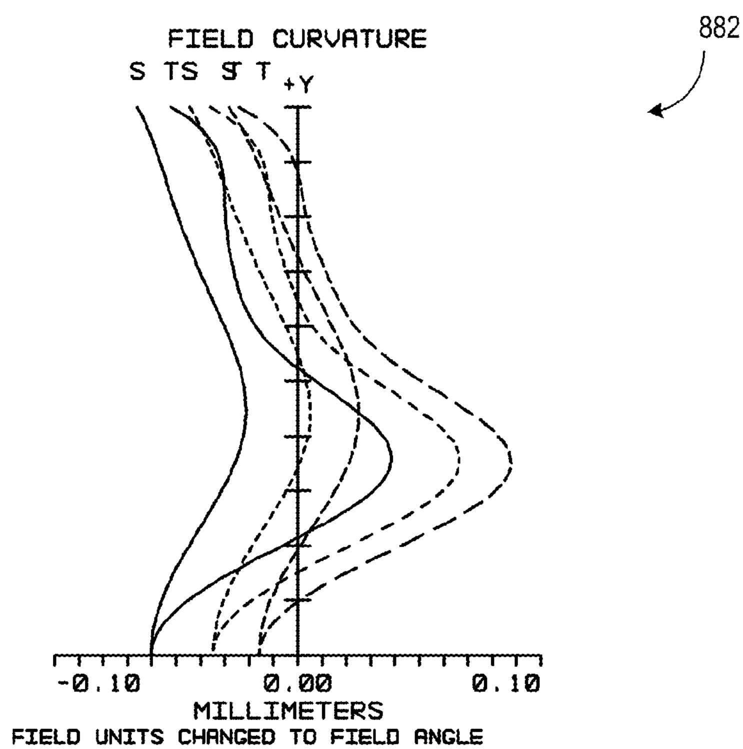
FIG. 43B shows a plot of field curvature of the imaging system of FIG. 40.

FIG. 43A shows a plot 880 of distortion and FIG. 43B shows a plot 882 of field curvature of VGA_W imaging system 800 an infinite conjugate object. The maximum half-field angle is 31.062°. The solid lines correspond to electromagnetic energy having a wavelength of about 470 nm; the short dashed lines correspond to electromagnetic energy having a wavelength of 550 nm; and the long dashed lines correspond to electromagnetic energy having a wavelength of 650 nm.

TABLE 15

| Surface | Radius | Thickness | Refractive index | Abbe# | Diameter | Conic |
|---|---|---|---|---|---|---|
| OBJECT | Infinity | Infinity | air | | Infinity | 0 |
| STOP | 5.270106 | 0.9399417 | 1.370 | 92.000 | 0.5827785 | 0 |
| 3 | 4.106864 | 0.25 | 1.620 | 32.000 | 0.9450127 | 0 |
| 4 | −0.635388 | 0.2752138 | 1.370 | 92.000 | 0.9507387 | 0 |
| STOP | −0.492543 | 0.07704269 | 1.620 | 32.000 | 0.9519911 | 0 |
| 6 | 6.003253 | 0.07204369 | 1.370 | 92.000 | 1.302438 | 0 |
| 7 | Infinity | 0.2 | 1.520 | 64.200 | 1.495102 | 0 |
| 8 | Infinity | 0.4 | 1.458 | 67.820 | 1.581881 | 0 |
| 9 | Infinity | 0.04 | air | | 1.754418 | 0 |
| IMAGE | Infinity | 0 | 1.458 | 67.820 | 1.781543 | 0 |

TABLE 16

| Surface# | $A_2$ | $A_4$ | $A_6$ | $A_8$ | $A_{10}$ | $A_{12}$ | $A_{14}$ | $A_{16}$ |
|---|---|---|---|---|---|---|---|---|
| 1(Object) | 0 | 0 | 0 | 0 | 0 | 0 | 0 | 0 |
| 2(Stop) | 0.09594 | 0.5937 | −4.097 | 0 | 0 | 0 | 0 | 0 |
| 3 | 0 | −1.680 | −4.339 | 0 | 0 | 0 | 0 | 0 |
| 4 | 0 | 2.116 | −26.92 | 26.83 | 0 | 0 | 0 | 0 |
| 5 | 0 | −1.941 | 24.02 | −159.3 | 0 | 0 | 0 | 0 |
| 6 | −0.03206 | 0.3185 | −5.340 | 0.03144 | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |
| 9 | 0 | 0 | 0 | 0 | 0 | 0 | 0 | 0 |

Figure 41:
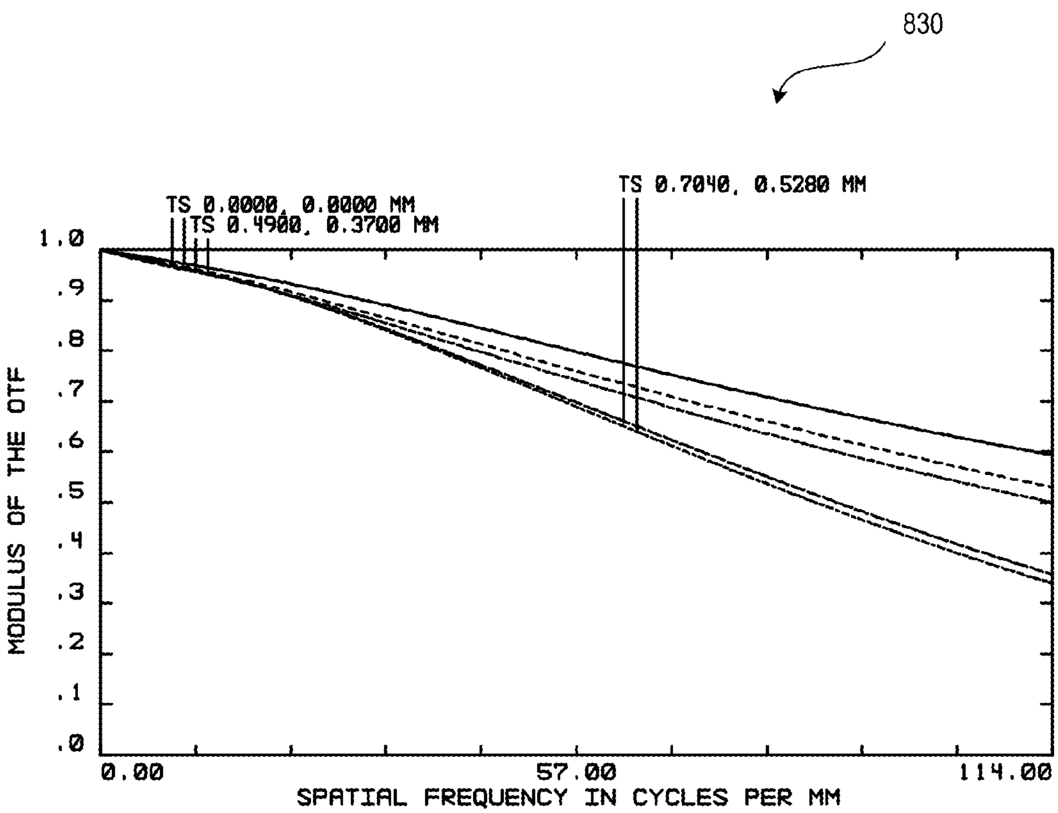
FIG. 41 shows a plot of the modulation transfer functions as a function of spatial frequency for the imaging system of FIG. 40.

FIGS. 41-44 show performance plots of VGA_W imaging system 800. FIG. 41 shows a plot 830 of the MTF as a function of spatial frequency of the VGA_W imaging system 800 for an infinite conjugate object. The MTF curves are averaged over wavelengths from 470 to 650 nm. FIG. 41 illustrates MTF curves for three distinct field points associated with real image heights on a diagonal axis of detector 112, FIG. 40; the three field points are an on-axis field point having coordinates (0 mm, 0 mm), a 0.7 field point having coordinates (0.49 mm, 0.37 mm), and a full field point having coordinates (0.704 mm, 0.528 mm).

Figure 44:
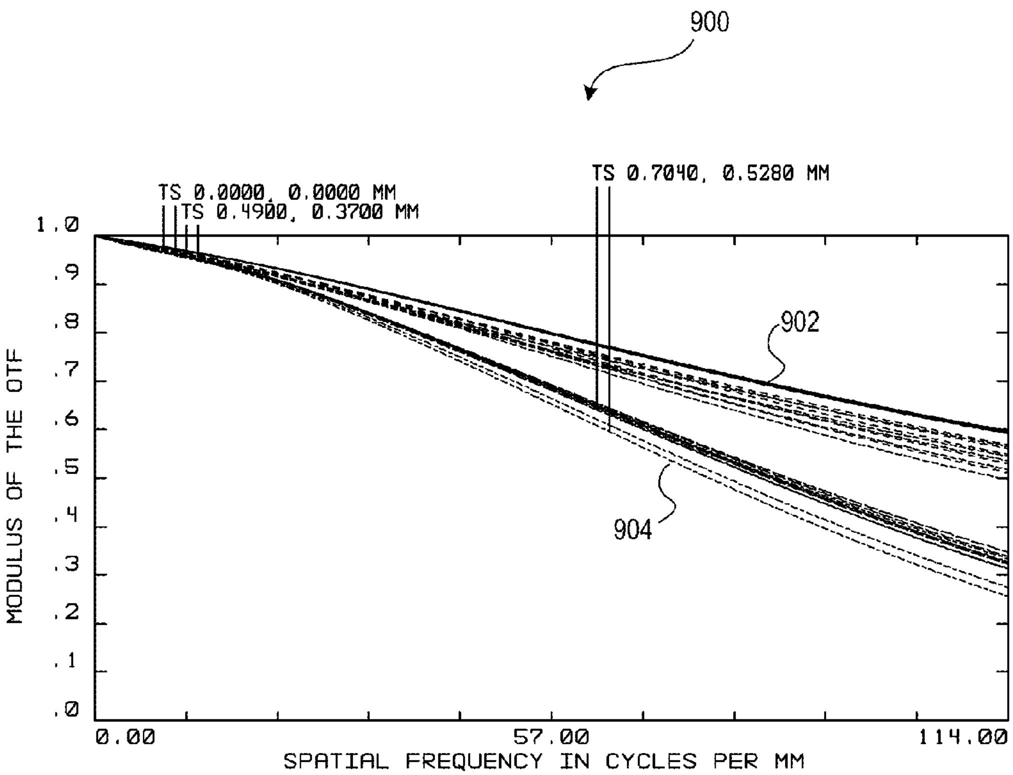
FIG. 44 shows a plot of the modulation transfer functions as a function of spatial frequency of the imaging system of FIG. 40 taking into account tolerances in centering and thickness variation of optical elements, according to an embodiment.

FIG. 44 shows a plot 900 of MTFs as a function of spatial frequency of VGA_W imaging system 800 taking into account tolerances in centering and thickness of optical elements of optics 802. Plot 900 includes on-axis field point, 0.7 field point, and full field point sagittal and tangential field MTF curves generated over ten Monte Carlo tolerance analysis runs. The on-axis field point has coordinates (0 mm, 0 mm); the 0.7 field point has coordinates (0.49 mm, 0.37 mm); and the full field point has coordinates (0.704 mm, 0.528 mm). Tolerances in centering and thickness of the optical elements are assumed to have a normal distribution sampled from +2 to −2 microns. Accordingly, it is expected that the MTFs of VGA_W imaging system 800 will be bounded by curves 902 and 904.

Figure 45:
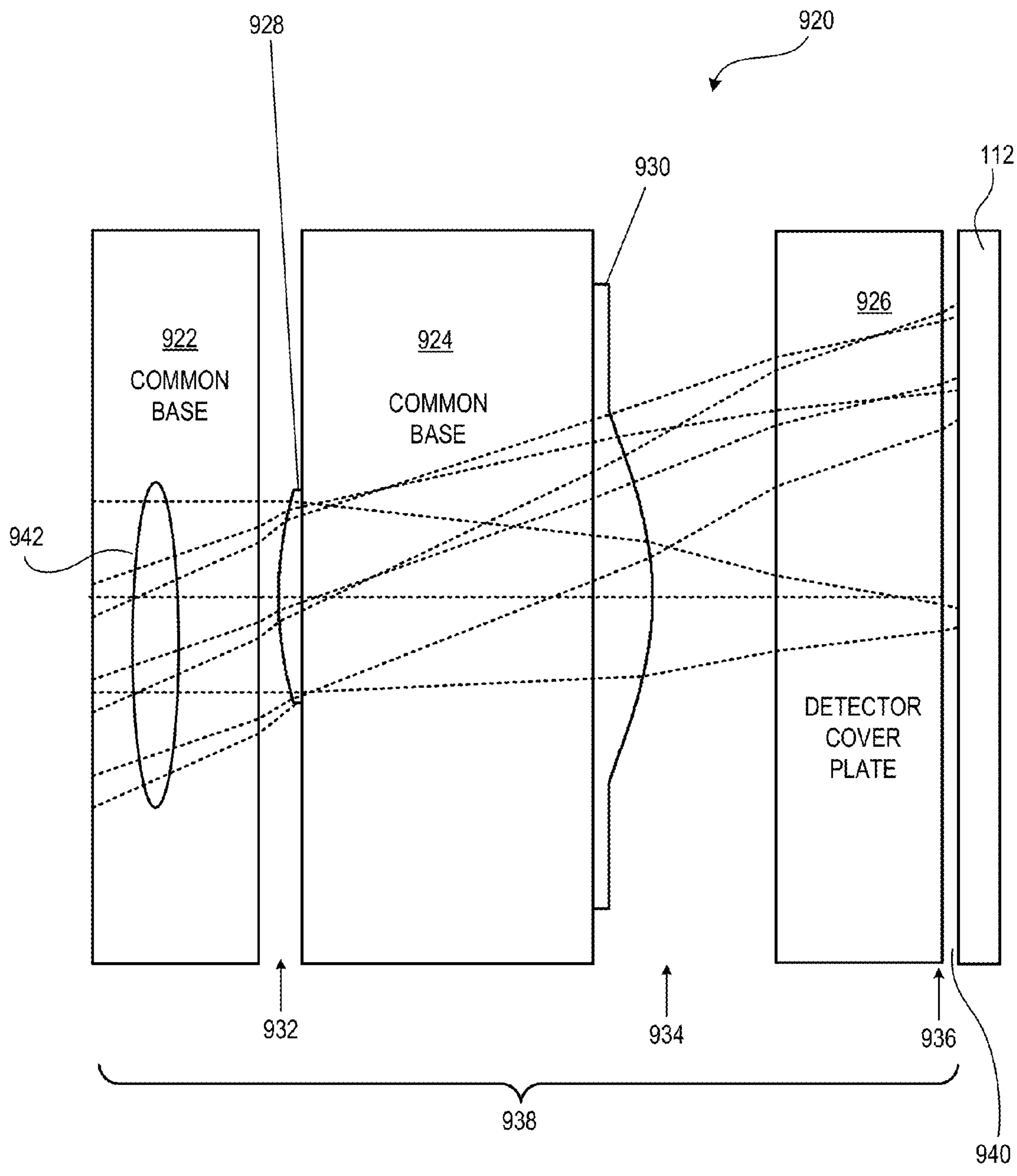
FIG. 45 is an optical layout and raytrace of one imaging system, according to an embodiment.

FIG. 45 is an optical layout and raytrace of a "VGA_S_WFC" imaging system 920, which is an embodiment of imaging system 10 of FIG. 2A where "S" stands for "short". VGA_S_WFC imaging system 920 has a focal length of 0.98 millimeters, a field of view of 80°, F/# of 2.2, a total track length of 2.1 mm (including detector cover plate), and a maximum chief ray angle of 30°.

VGA_S_WFC imaging system 920 includes VGA format detector 112 and optics 938. Optics 938 includes an optical element 922, which may be a glass plate, optical element 924 (which again may be a glass plate) with optical elements 928 and 930 formed on opposite sides thereof, and detector cover plate 926. Optical elements 922 and 924 form air gap 932 for a high power ray transition at optical element 928; optical element 924 and detector cover plate 926 form air gap 934 for a high power ray transition at optical element 930, and surface 940 of detector 112 and detector cover plate 926 form air gap 936.

VGA_S_WFC imaging system 920 includes a phase modifying element for introducing a predetermined imaging effect into the image. Such phase modifying element may be implemented on a surface of optical element 928 and/or optical element 930 or the phase modifying effect may be distributed among optical elements 928 and 930. In imaging system 920, primary aberrations include field curvature and astigmatism; thus, phase modification may be employed in imaging system 920 to advantageously reduce effects of such aberrations. An imaging system that is otherwise identical to system 920, but without a phase modifying element, would be referred to as the "VGA_S imaging system" (not shown). Rays 942 represent electromagnetic energy being imaged by VGA_S_WFC imaging system 920.

The sag equation for optics 938 is given by a higher-order separable polynomial phase function of Eq. (4).

$$Sag = \frac{cr^2}{1+\sqrt{1-(1+k)c^2r^2}} + \sum_{i=2n} A_i r^i + WFC, \qquad \text{Eq. (4)}$$

where $$WFC = \sum_{j=2k-1} B_j\left[\left(\frac{x}{\max(r)}\right)^j + \left(\frac{y}{\max(r)}\right)^j\right],$$

and k=2, 3, 4 and 5.

It should be noted that the VGA_S imaging system will not have the WFC portion of the sag equation in Eq. (4), whereas VGA_S_WFC imaging system 920 will include the WFC expression attached to the sag equation. The prescription for optics 938 is summarized in TABLES 17 and 18, where radius, thickness and diameter are given in units of millimeters. The phase modifying function described by the WFC term in Eq. (4), is a higher-order separable polynomial. This particular phase function is convenient since it is relatively simple to visualize. The oct form, as well as a number of other phase functions may be used instead of the higher-order separable polynomial phase function of Eq. (4).

TABLE 17

| Surface | Radius | Thickness | Refractive index | Abbe# | Diameter | Conic |
|---|---|---|---|---|---|---|
| OBJECT | Infinity | Infinity | air | | Infinity | 0 |
| STOP | Infinity | 0.04867617 | air | 92.000 | 0.5827785 | 0 |
| 3 | 0.7244954 | 0.05659412 | 1.481 | 32.000 | 0.9450127 | 1.438326 |
| 4 | Infinity | 0 | 1.481 | 92.000 | 0.9507387 | 0 |
| STOP | Infinity | 0.7 | 1.525 | 32.000 | 0.9519911 | 0 |
| 6 | Infinity | 0.1439282 | 1.481 | 92.000 | 1.302438 | 0 |
| 7 | −0.1636462 | 0.296058 | air | | 0.898397 | −1.367766 |
| 8 | Infinity | 0.4 | 1.525 | 62.558 | 1.759104 | 0 |
| 9 | Infinity | 0.04 | air | | 1.759104 | 0 |
| IMAGE | Infinity | 0 | 1.458 | 67.820 | 1.76 | 0 |

TABLE 18

| Surface# | $A_2$ | $A_4$ | $A_6$ | $A_8$ | $A_{10}$ | $A_{12}$ | $A_{14}$ | $A_{16}$ |
|---|---|---|---|---|---|---|---|---|
| 1(Object) | 0 | 0 | 0 | 0 | 0 | 0 | 0 | 0 |
| 2 | 0 | 0 | 0 | 0 | 0 | 0 | 0 | 0 |
| 3 | −0.1275 | −0.9764 | 0.8386 | −21.14 | 0 | 0 | 0 | 0 |
| 4(Stop) | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 2.330 | −6.933 | 19.49 | −20.96 | 0 | 0 | 0 | 0 |
| 8 | 0 | 0 | 0 | 0 | 0 | 0 | 0 | 0 |
| 9 | 0 | 0 | 0 | 0 | 0 | 0 | 0 | 0 |

Surface #3 of TABLE 17 is configured for providing a predetermined phase modification, with the parameters as shown in TABLE 19.

TABLE 19

| $B_3$ | $B_5$ | $B_7$ | $B_9$ |
|---|---|---|---|
| $6.546 \times 10^{-3}$ | $2.988 \times 10^{-3}$ | $-7.252 \times 10^{-3}$ | $7.997 \times 10^{-3}$ |

Figure 46A:
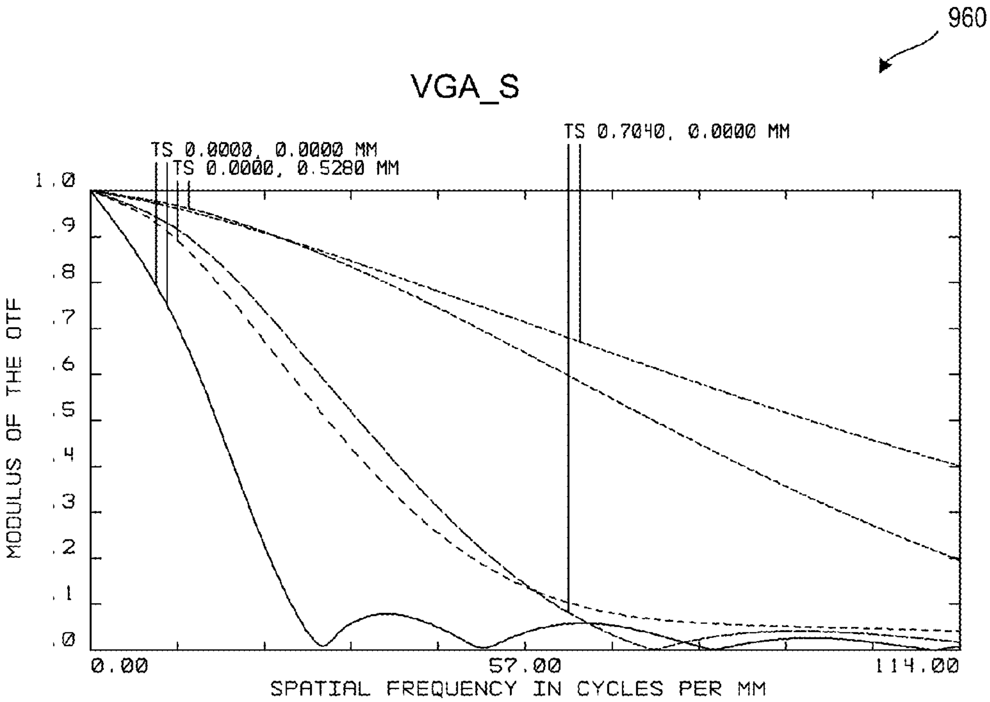
FIG. 46A shows a plot of the modulation transfer functions as a function of spatial frequency for the imaging system of FIG. 45, without wavefront coding.
Figure 46B:
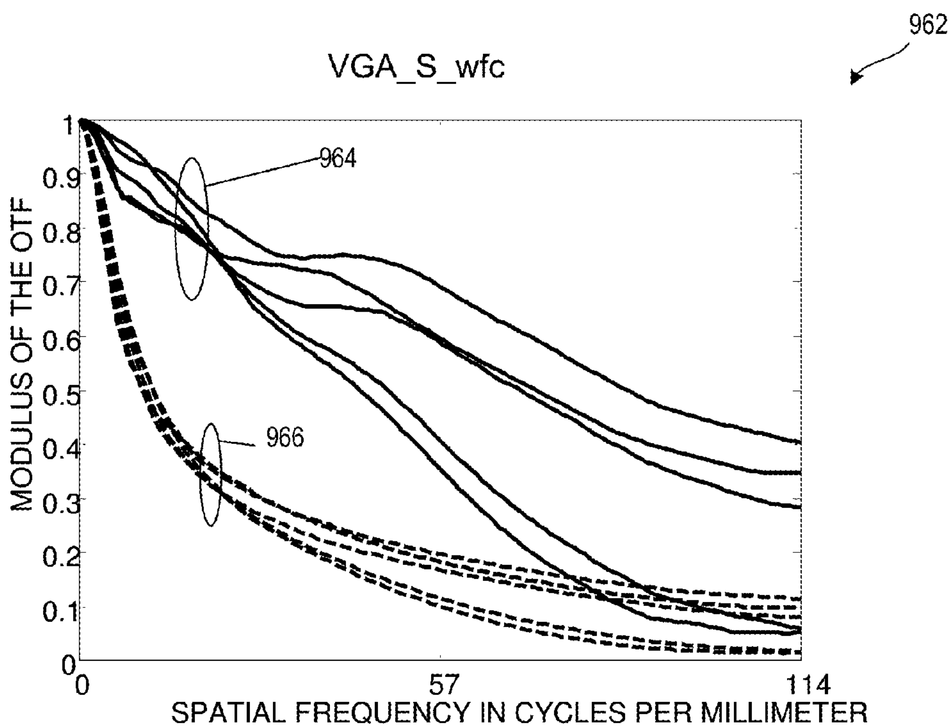
FIG. 46B shows a plot of the modulation transfer functions as a function of spatial frequency for the imaging system of FIG. 45 with wavefront coding before and after filtering.

FIGS. 46A and 46B include plots 960 and 962, respectively; plot 960 is a plot of the MTFs of the VGA_S imaging system as a function of spatial frequency, and plot 962 is a plot of the MTFs of VGA_S_WFC imaging system 920 as a function of spatial frequency, each for an infinite object conjugate distance. The MTF curves are averaged over wavelengths from 470 to 650 nm Plots 960 and 962 illustrate MTF curves for three distinct field points associated with real image heights on a diagonal axis of detector 112; the three field points are an on-axis field point having coordinates (0 mm, 0 mm), a full field point in x having coordinates (0.704 mm, 0 mm), and a full field in y having coordinates (0 mm, 0.528 mm).

Plot 960 shows that the VGA_S imaging system exhibits relatively poor performance; in particular, the MTFs have relatively small values and reach zero under certain conditions. As stated above, a MTF value of zero is undesirable as it indicates loss of image data. Curves 966 of plot 962 represent the MTFs of VGA_S_WFC imaging system 920 without post filtering of electronic data produced by VGA_S_WFC imaging system 920. As may be seen by comparing plot 960 and 962, the unfiltered MTF curves 966 of VGA_S_WFC imaging system 920 have a smaller magnitude than some of the MTF curves of VGA_S imaging system. However, the unfiltered MTF curves 966 of VGA_S_WFC imaging system 920 advantageously do not reach zero, which means that VGA_S_WFC imaging system 920 preserves image information across the entire range of spatial frequencies of interest. Furthermore, the unfiltered MTF curves 966 of VGA_S_WFC imaging system 920 are all very similar. Such similarity in MTF curves allows a single filter kernel to be used by a processor (not shown) executing a decoding algorithm, as will discussed next.

As discussed above, encoding introduced by a phase modifying element in optics 938, FIG. 45 (e.g., in optical elements 928 and/or 930) may be further processed by a processor (see, for example, processor 46 of FIG. 1C) executing a decoding algorithm such that VGA_S_WFC imaging system 920 produces a sharper image than it would without such post processing. MTF curves 964 of plot 962, FIG. 46B, represent performance of VGA_S_WFC imaging system 920 with such post processing. As may be observed by comparing plots 960 and 962, VGA_S_WFC imaging system 920 with post processing performs better the VGA_S imaging system.

Figure 47A:
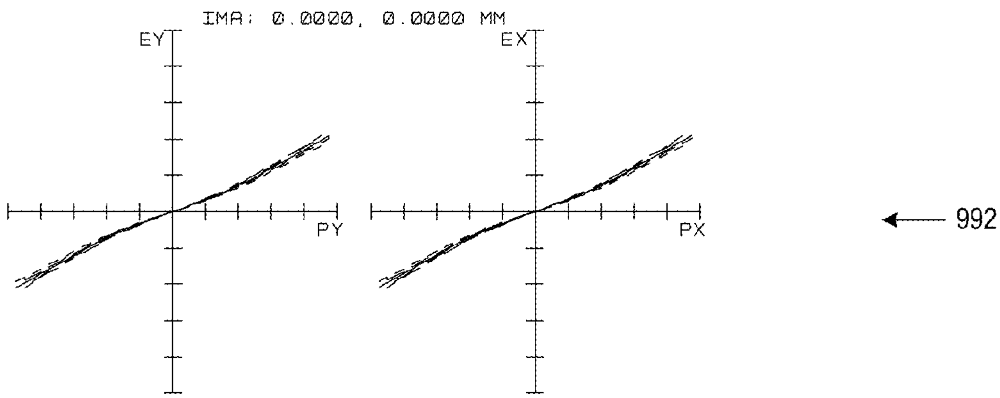
FIGS. 47A-47C show transverse ray fan plots of the imaging system of FIG. 45, without wavefront coding.
Figure 47B:
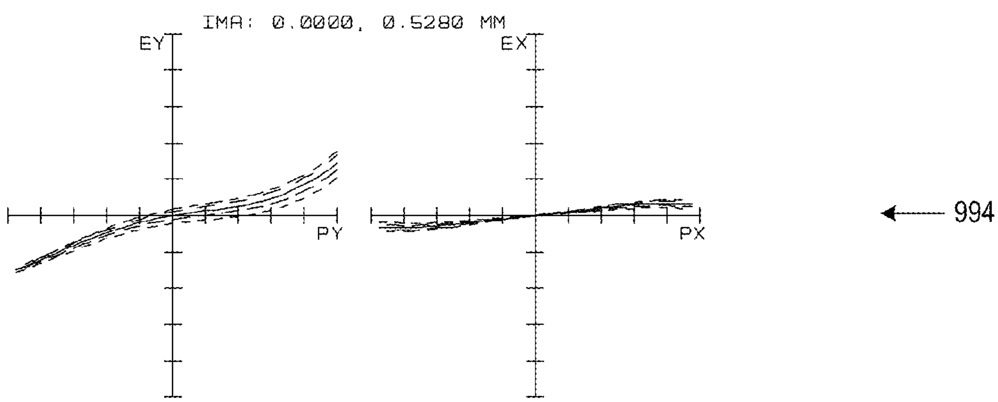
Figure 47C:
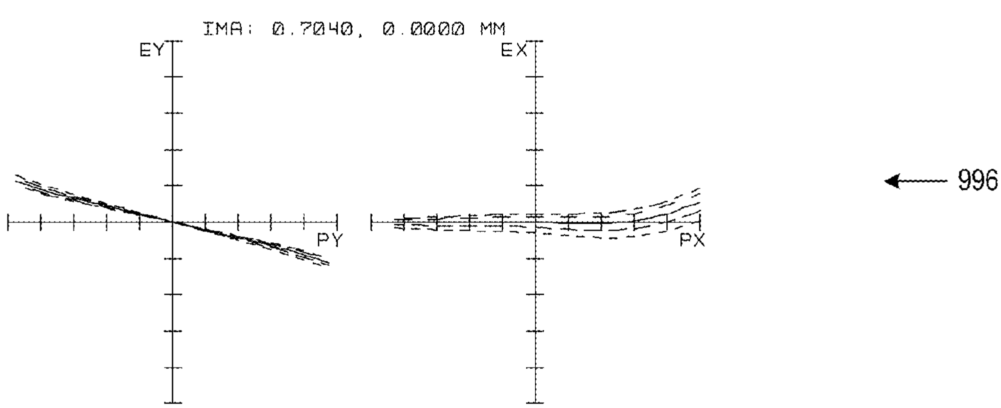
Figure 48A:
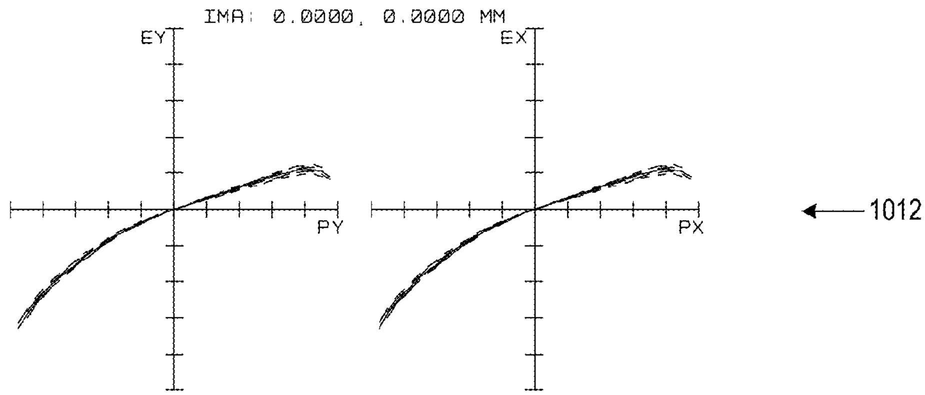
FIGS. 48A, 48B and 48C show transverse ray fan plots of the imaging system of FIG. 45, with wavefront coding.
Figure 48B:
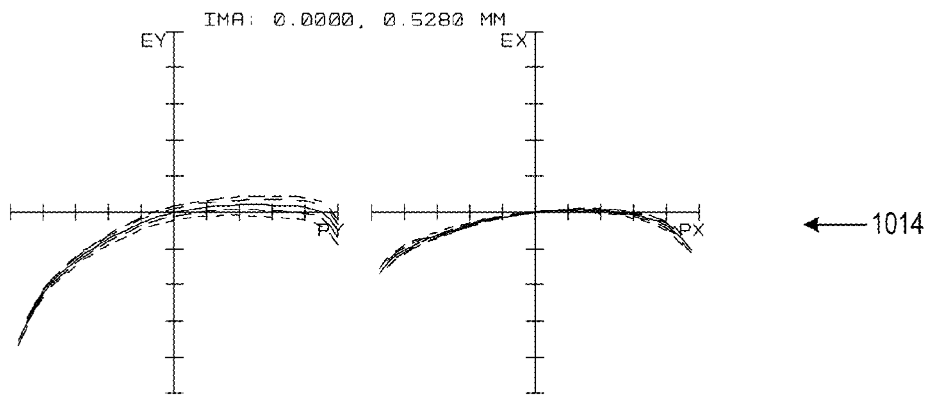
Figure 48C:
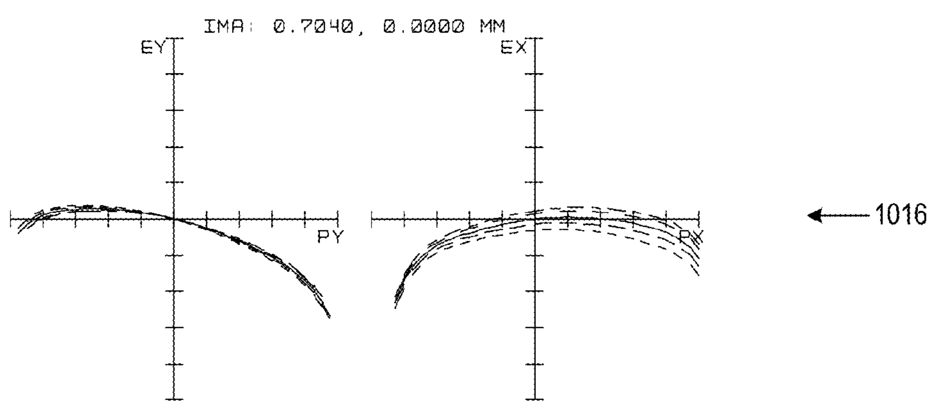

FIGS. 47A, 47B and 47C show pairs of transverse ray fan plots 992, 994 and 996, respectively for the VGA_S imaging system, and FIGS. 48A, 48B and 48C show transverse ray fan plots 1012, 1014 and 1016, respectively, for VGA_S_WFC imaging system 920, each for an infinite object conjugate distance. In FIGS. 47-48, the solid lines correspond to a wavelength of 470 nm; the short dashed lines correspond to a wavelength of 550 nm; and the long dashed lines correspond to a wavelength of 650 nm. The maximum scale of pairs of plots 992, 994 and 996 is +/−50 microns; and maximum scale of pairs of plots 1012, 1014 and 1016 is +/−50 microns. It is notable that the transverse ray fan plots in FIGS. 47A, 47B and 47C are indicative of astigmatism and field curvature in the VGA_S imaging system. The left hand plot of each of the pairs of ray fan plots shows tangential set of rays, and each right hand plot shows the sagittal set of rays.

Each of FIGS. 47-48 contains three pairs of plots, and each pair includes ray fan plots for a distinct field point associated with real image heights on surface of detector 112. Pairs of plots 992 and 1012 correspond to an on-axis field point having coordinates (0 mm, 0 mm); pairs of plots 994 and 1014 correspond to a full field point in y having coordinates (0 mm, 0.528 mm); and pairs of plots 996 and 1016 correspond to a full field point in x having coordinates (0.704 mm, 0 mm). It may be observed from FIGS. 47A, 47B and 47C that the ray fan plots change as a function of field point; accordingly, the VGA_S imaging system exhibits varied performance as a function of field point. In contrast, it can be observed from FIGS. 48A, 48B and 48C that VGA_S_WFC imaging system 920 exhibits relatively constant performance over variations in field point.

Figure 49A:
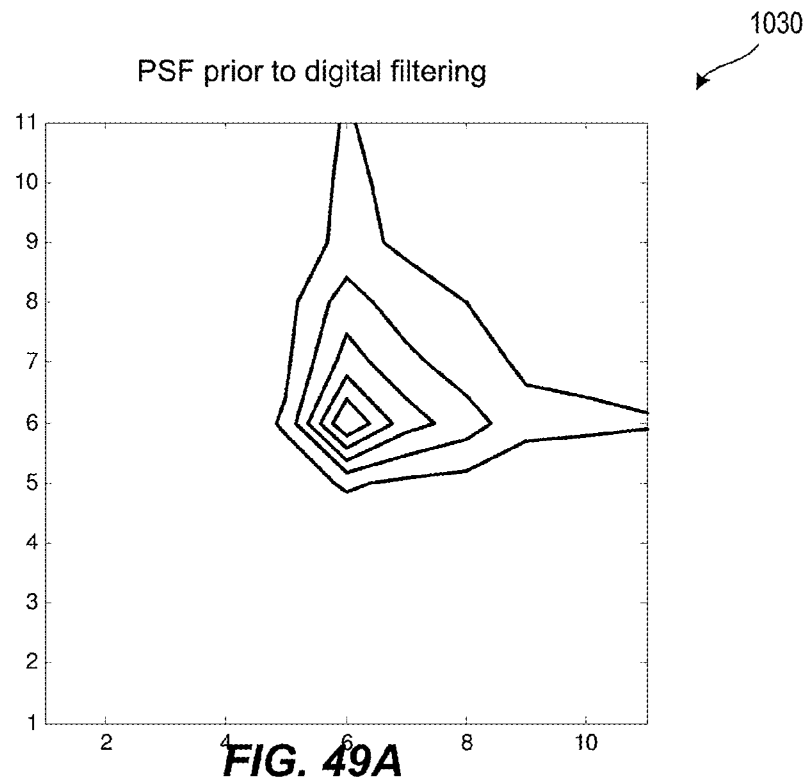
FIGS. 49A and 49B show plots of point spread functions of the imaging system of FIG. 45, including wavefront coding.
Figure 49B:
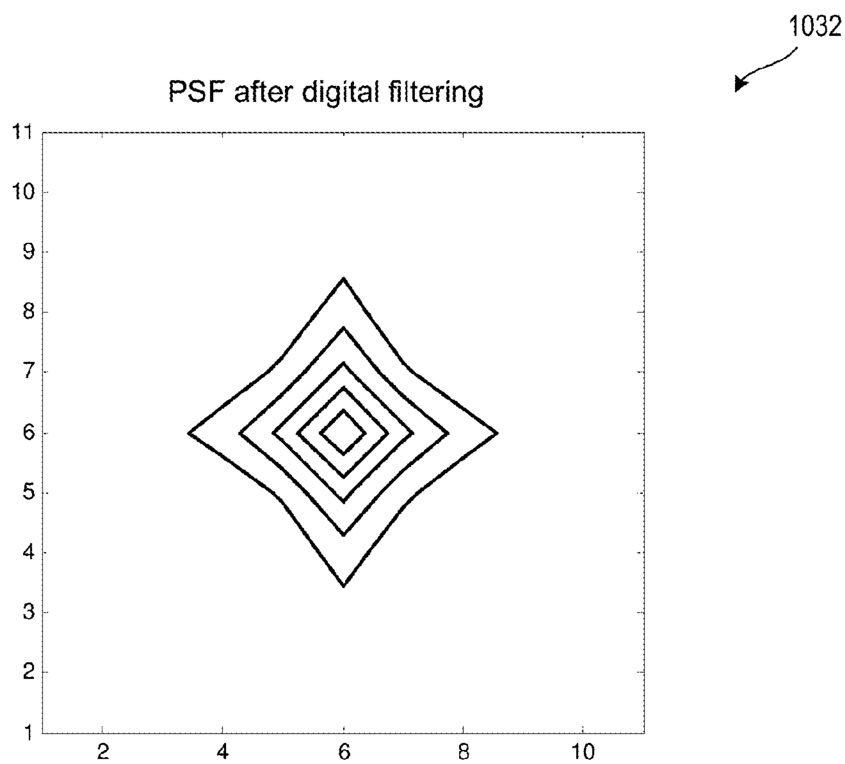
Figure 50A:
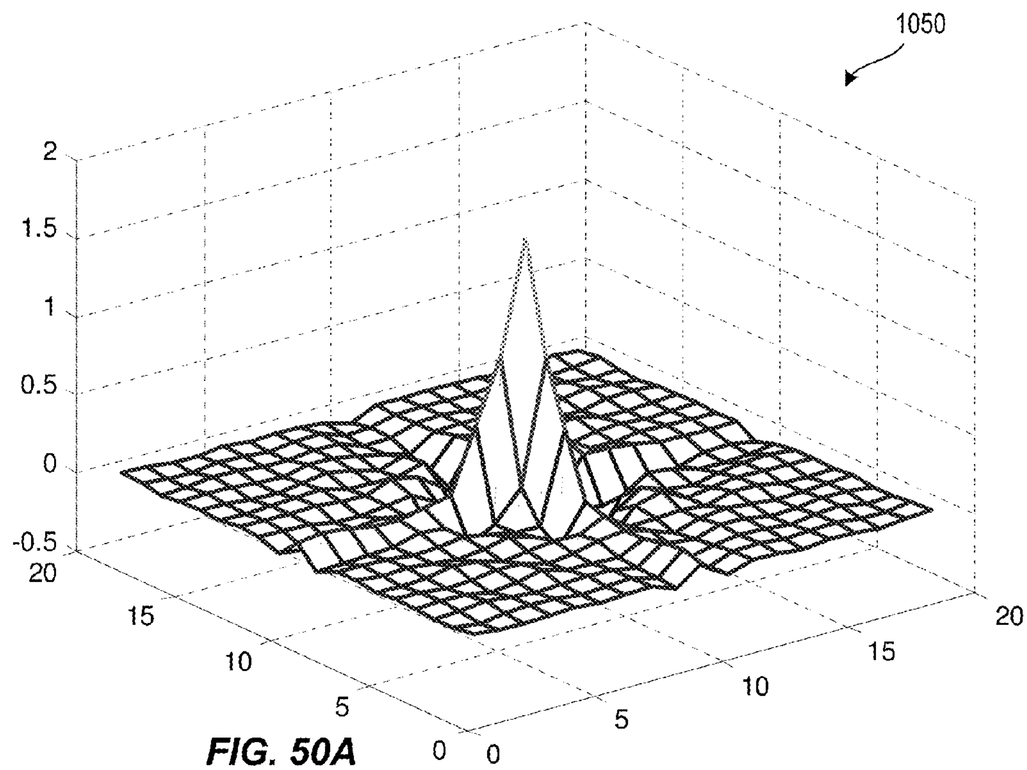
FIG. 50A shows a 3D plot representation of a filter kernel that may be used with the imaging system of FIG. 45, according to an embodiment.

FIGS. 49A and 49B show plots 1030 and 1032, respectively of on-axis PSFs of the VGA_S_WFC imaging system 920. Plot 1030 is a plot of a PSF before post processing by a processor executing a decoding algorithm, and plot 1032 is a plot of a PSF after post processing by a processor executing a decoding algorithm using the kernel of FIGS. 50A and 50B. In particular, FIG. 50A is a pictorial representation 1050 of a filter kernel and FIG. 50B is a table 1052 of filter coefficients that may be used to implement the filter kernel in VGA_S_WFC imaging system 920. The filter kernel is 21×21 elements in extent. Such filter kernel may be used by a processor executing a decoding algorithm to remove an imaging effect (e.g., a blur) introduced by the phase modifying element.

Figure 51A:
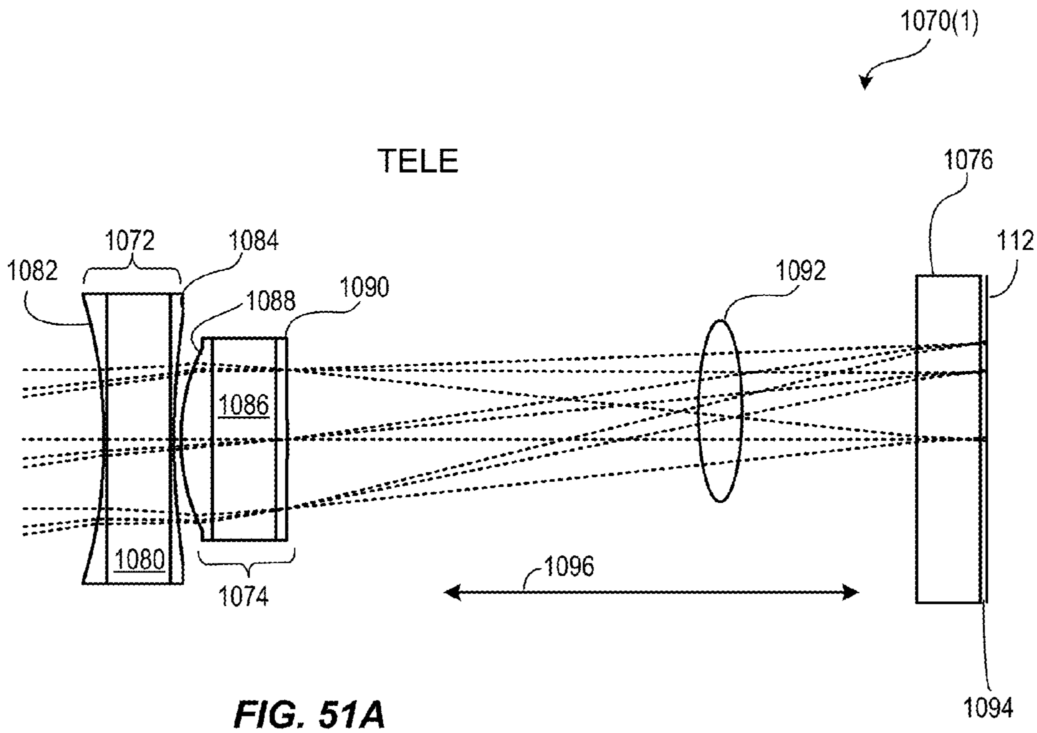
FIGS. 51A and 51B show an optical layout and raytrace of two configurations of a zoom imaging system, according to an embodiment.
Figure 51B:
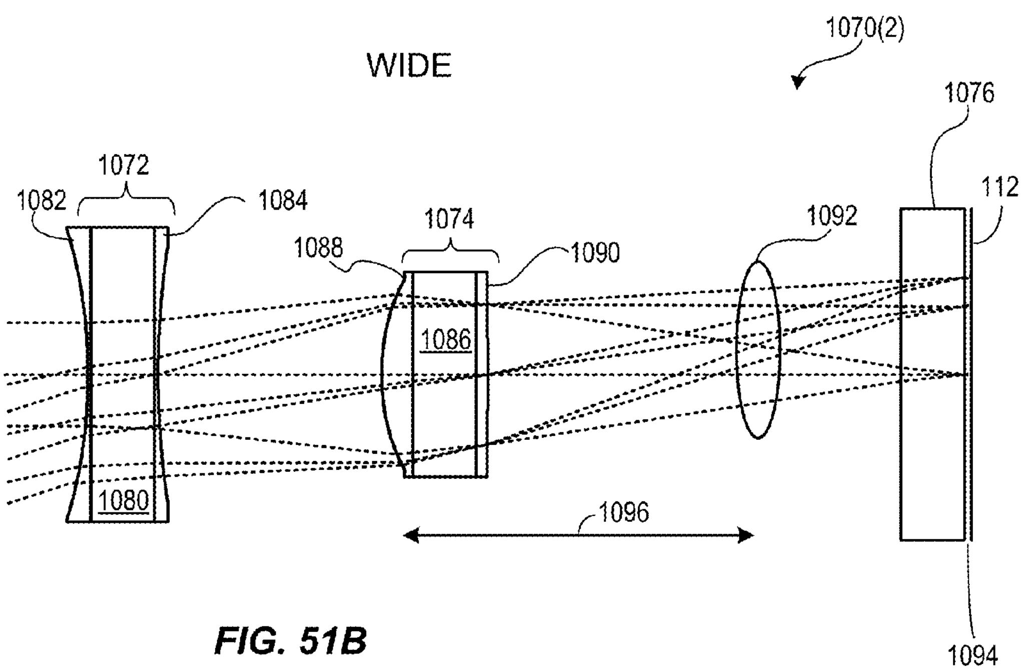

FIGS. 51A and 51B are optical layouts and raytraces of two configurations "Z_VGA_W" zoom imaging system 1070, where "Z" stands for "zoom," which is an embodiment of imaging system 10 of FIG. 2A. Z_VGA_W imaging system 1070 is a two group, discrete zoom imaging system that has two zoom configurations. The first zoom configuration, which may be referred to as the tele configuration, is illustrated as Z_VGA_W imaging system 1070(1). In the tele configuration, Z_VGA_W imaging system 1070 has a relatively long focal length. The second zoom configuration, which may be referred to as the wide configuration, is illustrated as imaging system 1070(2). In the wide configuration, Z_VGA_W imaging system 1070 has a relatively wide field of view Imaging system 1070(1) has a focal length of 4.29 millimeters, a field of view of 24°, F/# of 5.56, a total track length of 6.05 mm (including detector cover plate and an air gap between the detector cover plate and the detector), and a maximum chief ray angle of 12°. Z_VGA_W imaging system 1070(2) has a focal length of 2.15 millimeters, a field of view of 50°, F/# of 3.84, a total track length of 6.05 mm (including detector cover plate), and a maximum chief ray angle of 17° Imaging system 1070 may be referred to as the Z_VGA_W imaging system.

The Z_VGA_W imaging system 1070 includes a first optics group 1072 including a common base 1080. Negative optical element 1082 is formed on one side of common base 1080, and negative optical element 1084 is formed on the other side of common base 1080. Common base 1080 may be, for example, a glass plate. The position of optics group 1072 in imaging system 1070 is fixed.

Z_VGA_W imaging system 1070 includes a second optics group 1074 having common base 1086. Positive optical element 1088 is formed on one side of common base 1086, and plano optical element 1090 is formed on an opposite side of common base 1086. Common base 1086 is for example a glass plate. Second optics group 1074 is translatable in Z_VGA_W imaging system 1070 along an axis indicated by line 1096 between two positions. In the first position of optics group 1074, which is shown in imaging system 1070(1), imaging system 1070 has a tele configuration. In the second position of optics group 1074, which is shown in imaging system 1070(2), Z_VGA_W imaging system 1070 has a wide configuration. Prescriptions for tele configuration and wide configuration are summarized in TABLES 20-22. The sag of each optical element of Z_VGA_W imaging system 1070 is given by Eq. (1), where radius, thickness and diameter are given in units of millimeters.

Tele:

TABLE 20

| Surface | Radius | Thickness | Refractive index | Abbe# | Diameter | Conic |
|---|---|---|---|---|---|---|
| OBJECT | Infinity | Infinity | air | | Infinity | 0 |
| 2 | −2.587398 | 0.02 | air | 60.131 | 1.58 | 0 |
| 3 | Infinity | 0.4 | 1.481 | 62.558 | 1.58 | 0 |
| 4 | Infinity | 0.02 | 1.481 | 60.131 | 1.58 | 0 |
| 5 | 3.530633 | 0.044505 | 1.525 | 62.558 | 1.363373 | 0 |
| 6 | 1.027796 | 0.193778 | 1.481 | 60.131 | 0.9885556 | 0 |
| 7 | Infinity | 0.4 | 1.525 | | 1.1 | 0 |
| 8 | Infinity | 0.07304748 | 1.481 | 62.558 | 1.1 | 0 |
| STOP | −7.719257 | 3.955 | air | | 0.7516766 | 0 |
| 10 | Infinity | 0.4 | 1.525 | 62.558 | 1.723515 | 0 |
| 11 | Infinity | 0.04 | air | | 1.786427 | 0 |
| IMAGE | Infinity | 0 | 1.458 | 67.821 | 1.776048 | 0 |

Wide:

TABLE 21

| Surface | Radius | Thickness | Refractive index | Abbe# | Diameter | Conic |
|---|---|---|---|---|---|---|
| OBJECT | Infinity | Infinity | air | | Infinity | 0 |
| 2 | −2.587398 | 0.02 | 1.481 | 60.131 | 1.58 | 0 |
| 3 | Infinity | 0.4 | 1.525 | 62.558 | 1.58 | 0 |
| 4 | Infinity | 0.02 | 1.481 | 60.131 | 1.58 | 0 |
| 5 | 3.530633 | 1.401871 | air | | 1.36 | 0 |
| 6 | 1.027796 | 0.193778 | 1.481 | 60.131 | 1.034 | 0 |
| 7 | Infinity | 0.4 | 1.525 | 62.558 | 1.1 | 0 |
| 8 | Infinity | 0.07304748 | 1.481 | 60.131 | 1.1 | 0 |
| STOP | −7.719257 | 2.591 | air | | 0.7508 | 0 |
| 10 | Infinity | 0.4 | 1.525 | 62.558 | 1.694 | 0 |
| 11 | Infinity | 0.04 | air | | 1.786 | 0 |
| IMAGE | Infinity | 0 | 1.458 | 67.821 | 1.78 | 0 |

TABLE 22

| Surface# | $A_2$ | $A_4$ | $A_6$ | $A_8$ | $A_{10}$ | $A_{12}$ | $A_{14}$ | $A_{16}$ |
|---|---|---|---|---|---|---|---|---|
| 1(Object) | 0 | 0 | 0 | 0 | 0 | 0 | 0 | 0 |
| 2 | 0 | −0.04914 | 0.5497 | −4.522 | 14.91 | −21.85 | 11.94 | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | −0.1225 | 1.440 | −12.51 | 50.96 | −95.96 | 68.30 | 0 |
| 6 | 0 | −0.08855 | 2.330 | −14.67 | 45.57 | −51.41 | 0 | 0 |
| 7 | 0 | 0 | 0 | 0 | 0 | 0 | 0 | 0 |
| 8 | 0 | 0 | 0 | 0 | 0 | 0 | 0 | 0 |
| 9(Stop) | 0 | 0.4078 | −2.986 | 3.619 | −168.3 | 295.6 | 0 | 0 |
| 10 | 0 | 0 | 0 | 0 | 0 | 0 | 0 | 0 |
| 11 | 0 | 0 | 0 | 0 | 0 | 0 | 0 | 0 |

Aspheric coefficients are identical for tele configuration and wide configuration.

The Z_VGA_W imaging system 1070 includes VGA format detector 112. An air gap 1094 separates a detector cover plate 1076 from detector 112 to provide space for lenslets on a surface of detector 112 proximate to detector cover plate 1076.

Rays 1092 represent electromagnetic energy being imaged by the Z_VGA_W imaging system 1070; rays 1092 originate from infinity.

Figure 52A:
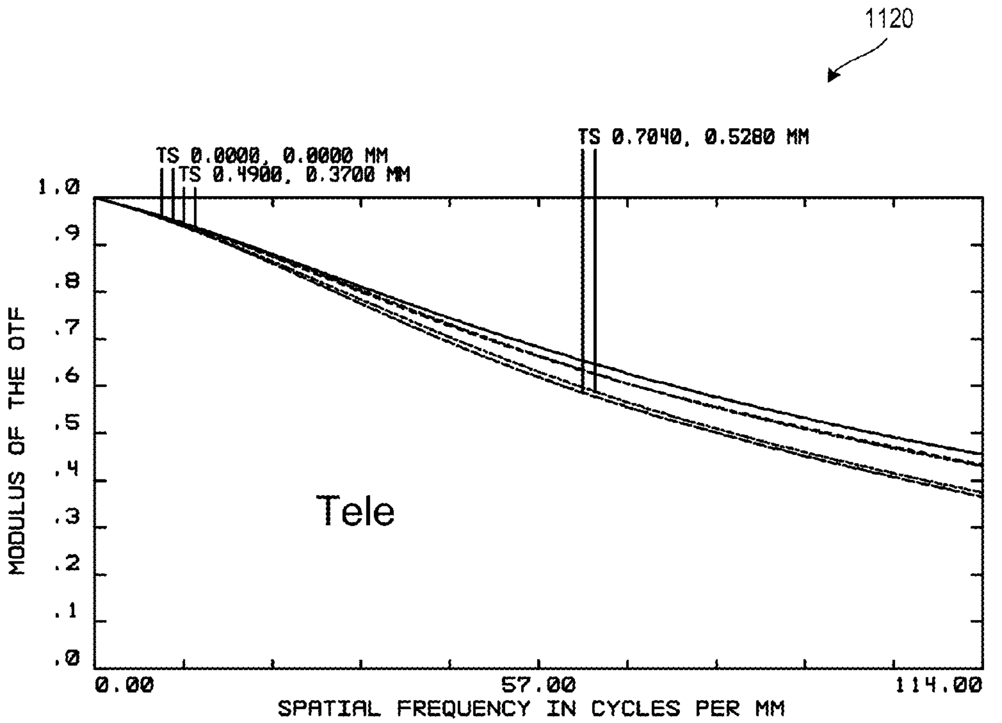
FIGS. 52A and 52B show plots of the modulation transfer functions as a function of spatial frequency for two configurations of the imaging system of FIG. 51.
Figure 52B:
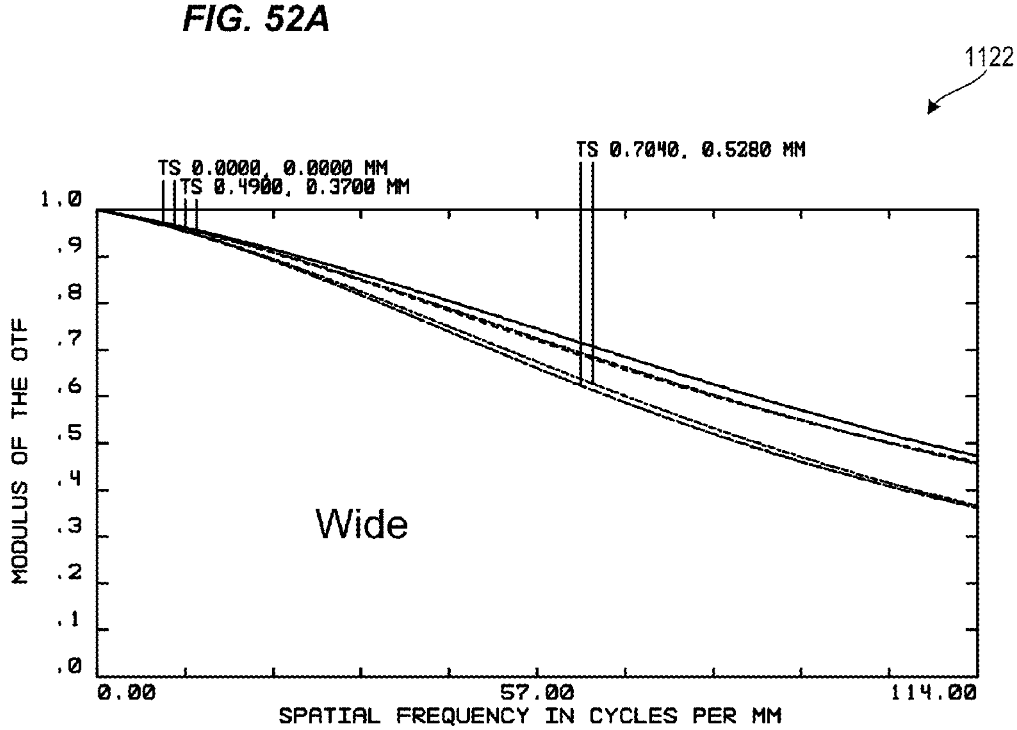

FIGS. 52A and 52B show plots 1120 and 1122, respectively, of the MTFs as a function of spatial frequency of Z_VGA_W imaging system 1070. The MTFs are averaged over wavelengths from 470 to 650 nm Each plot includes MTF curves for three distinct field points associated with real image heights on a diagonal axis of detector 112; the three field points are an on-axis field point having coordinates (0 mm, 0 mm), a 0.7 field point having coordinates (0.49 mm, 0.37 mm), and a full field point having coordinates (0.704 mm, 0.528 mm) Plot 1120 corresponds to imaging system 1070(1), which represents imaging system 1070 having a tele configuration, and plot 1122 corresponds to imaging system 1070(2), which represents imaging system 1070 having a wide configuration.

Figure 53A:
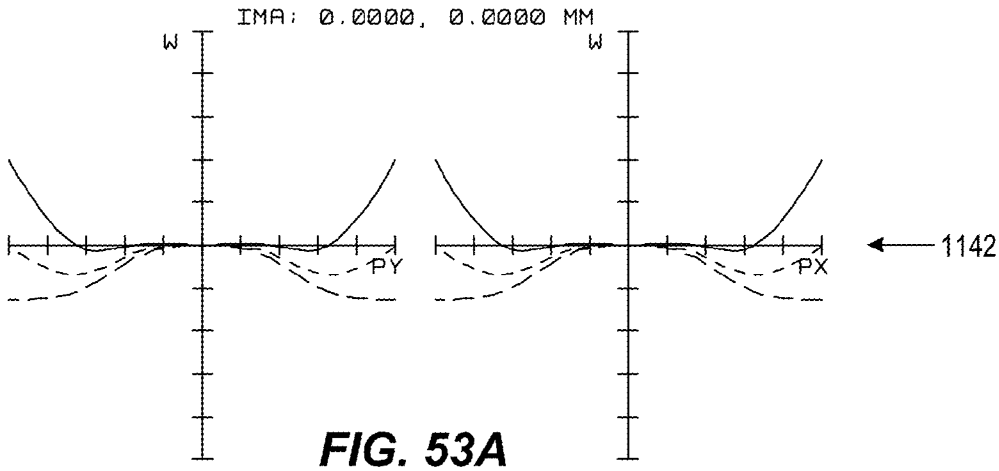
FIGS. 53A-53C and 54A-54C show plots of optical path differences for two configurations of the imaging system of FIGS. 51A and 51B.
Figure 53B:
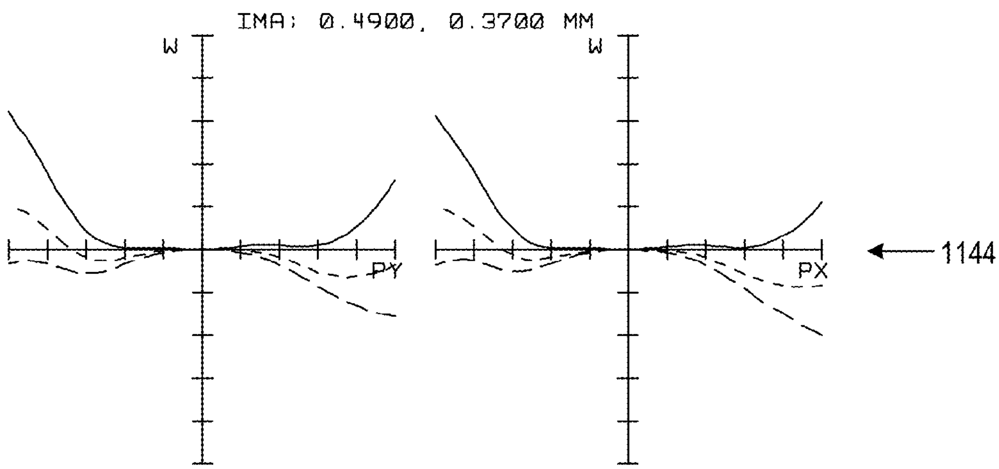
Figure 53C:
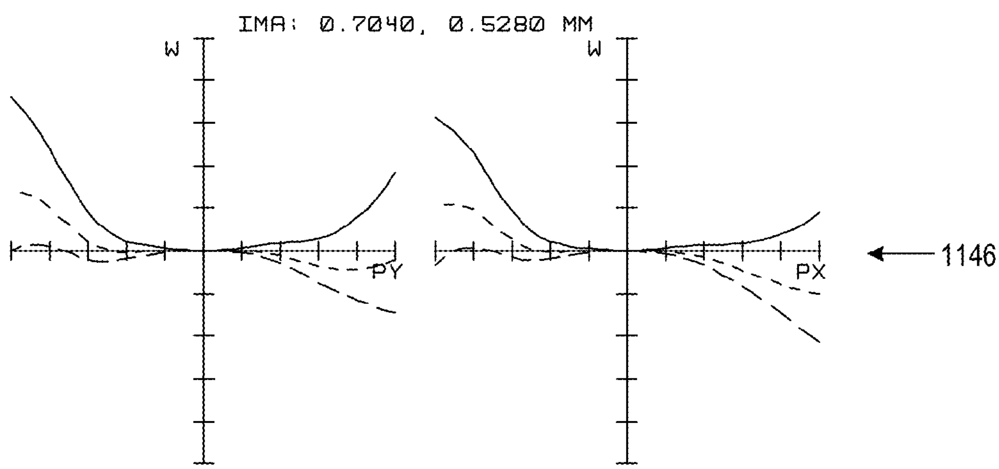
Figure 54A:
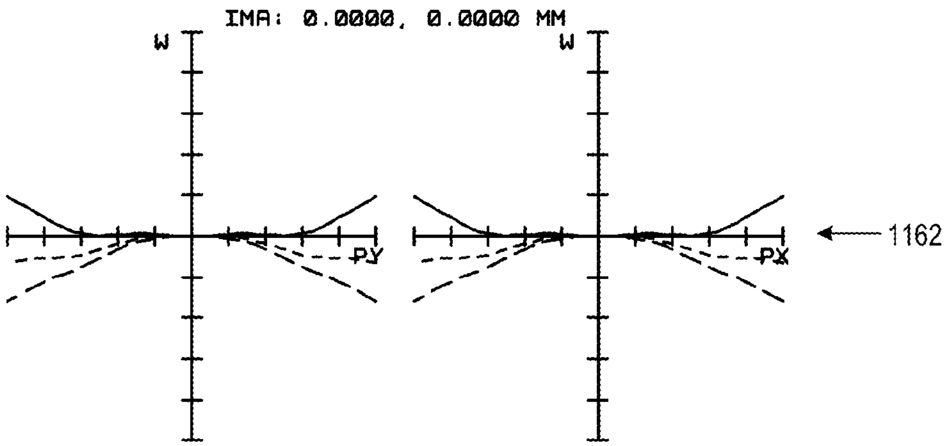
Figure 54B:
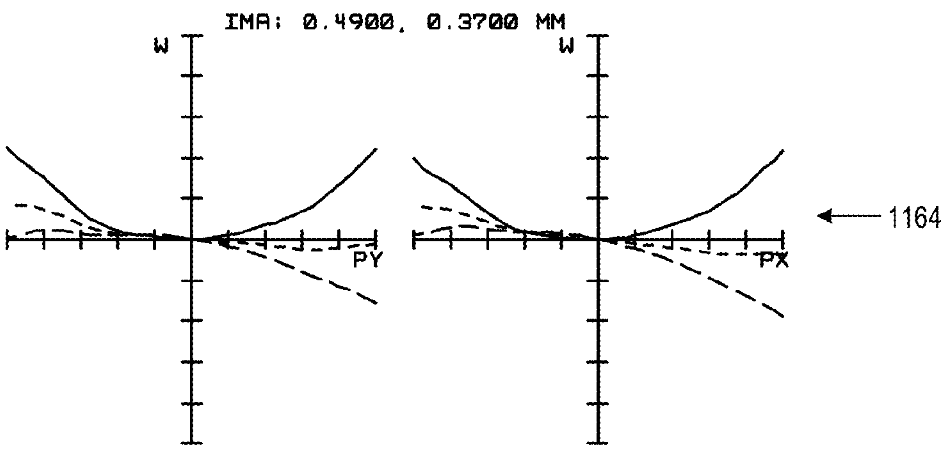
Figure 54C:
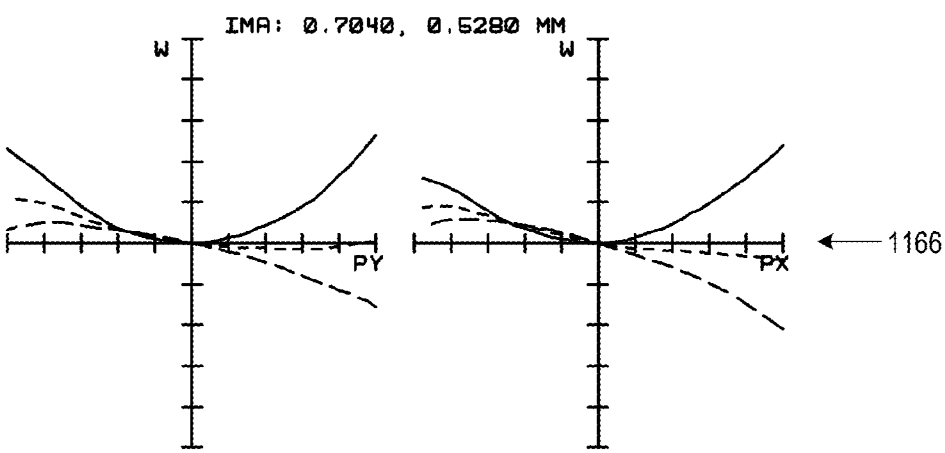
Figure 55A:
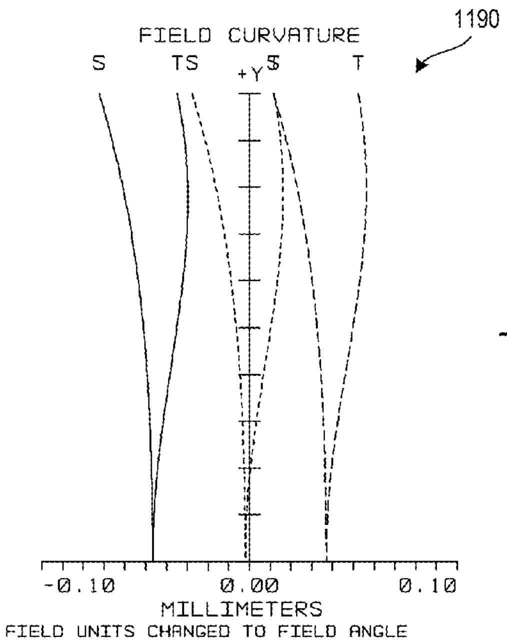
FIGS. 55A and 55C show plots of field curvature for two configurations of the imaging system of FIGS. 51A and 51B.
Figure 55B:
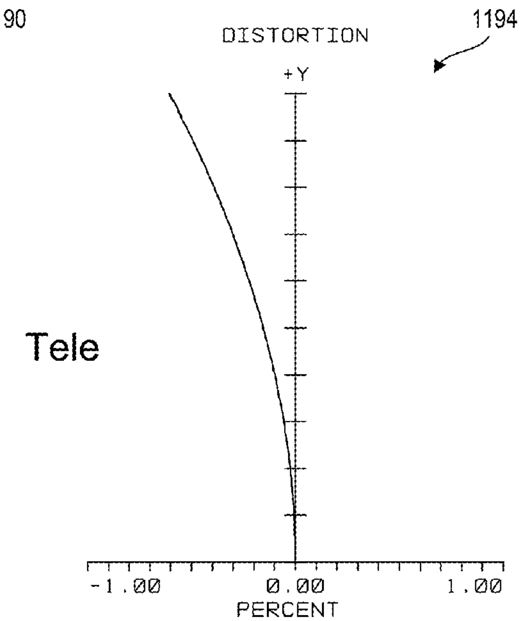
FIGS. 55B and 55D show plots of distortion for two configurations of the imaging system of FIGS. 51A and 51B.
Figure 55C:
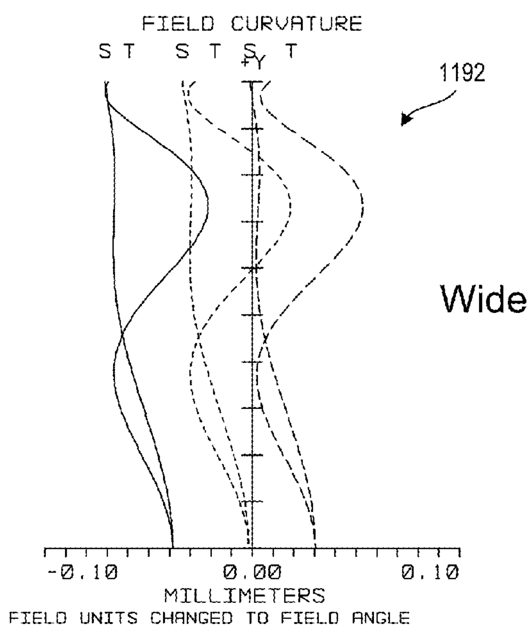
Figure 55D:
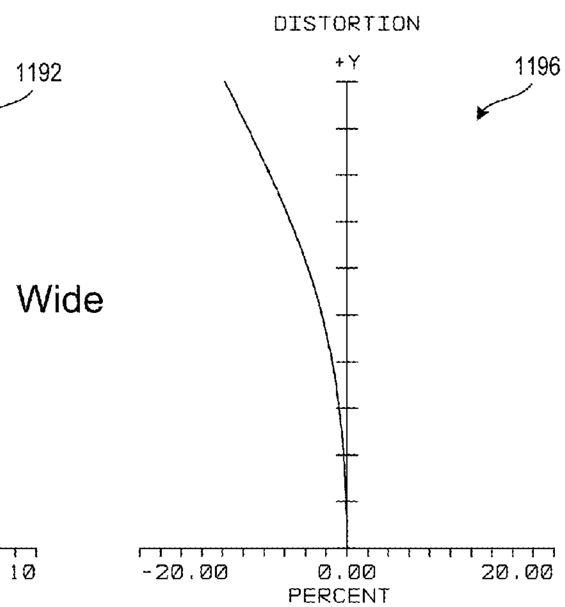

FIGS. 53A, 53B and 53C show pairs of plots 1142, 1144 and 1146 and FIGS. 54A, 54B and 54C show pairs of plots 1162, 1164 and 1166 of the optical path differences of Z_VGA_W imaging system 1070. Pairs of plots 1142, 1144 and 1146 are for Z_VGA_W imaging system 1070(1) having a tele configuration, and pairs of plots 1162, 1164 and 1166 are for Z_VGA_W imaging system 1070(2) having a wide configuration. The maximum scale for pairs of plots 1142, 1144 and 1146 is +/−one wave, and the maximum scale for pairs of plots 1162, 1164 and 1166 is +/−two waves. The solid lines correspond to electromagnetic energy having a wavelength of 470 nm; the short dashed lines correspond to electromagnetic energy having a wavelength of 550 nm; the long dashed lines correspond to electromagnetic energy having a wavelength of 650 nm.

Each pair of plots in FIGS. 53 and 54 represents optical path differences at a different real image height on the diagonal of detector 112. Plots 1142 and 1162 correspond to an on-axis field point having coordinates (0 mm, 0 mm); plots 1144 and 1164 correspond to 0.7 field point having coordinates (0.49 mm, 0.37 mm); and plots 1146 and 1166 correspond to a full field point having coordinates (0.704 mm, 0.528 mm). The left plot of each pair of plots is a plot of wavefront error for the tangential set of rays, and the right plot is a plot of wavefront error for sagittal set of rays.

FIGS. 55A, 55B, 55C and 55D show plots 1194 and 1996 of distortion, and plots 1190 and 1192 of field curvature, of Z_VGA_W imaging system 1070. Plots 1190 and 1194 correspond to the Z_VGA_W imaging system 1070(1), and plots 1192 and 1996 correspond to Z_VGA_W imaging system 1070(2). The maximum half-field angle is 11.744° for the tele configuration and 25.568 for the wide-angle configuration. The solid lines correspond to electromagnetic energy having a wavelength of 470 nm; the short dashed lines correspond to electromagnetic energy having a wavelength of 550 nm; and the long dashed lines correspond to electromagnetic energy having a wavelength of 650 nm.

Figure 56A:
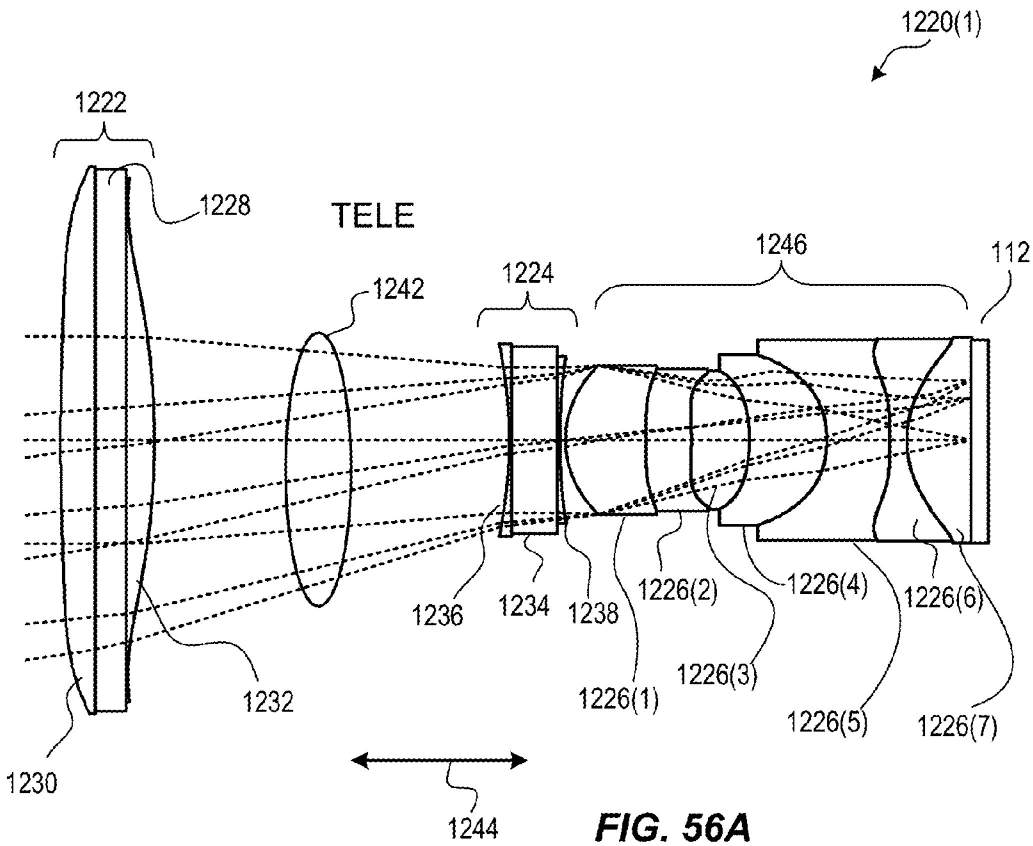
FIGS. 56A and 56B show optical layouts and raytraces of two configurations of a zoom imaging system, according to an embodiment.
Figure 56B:
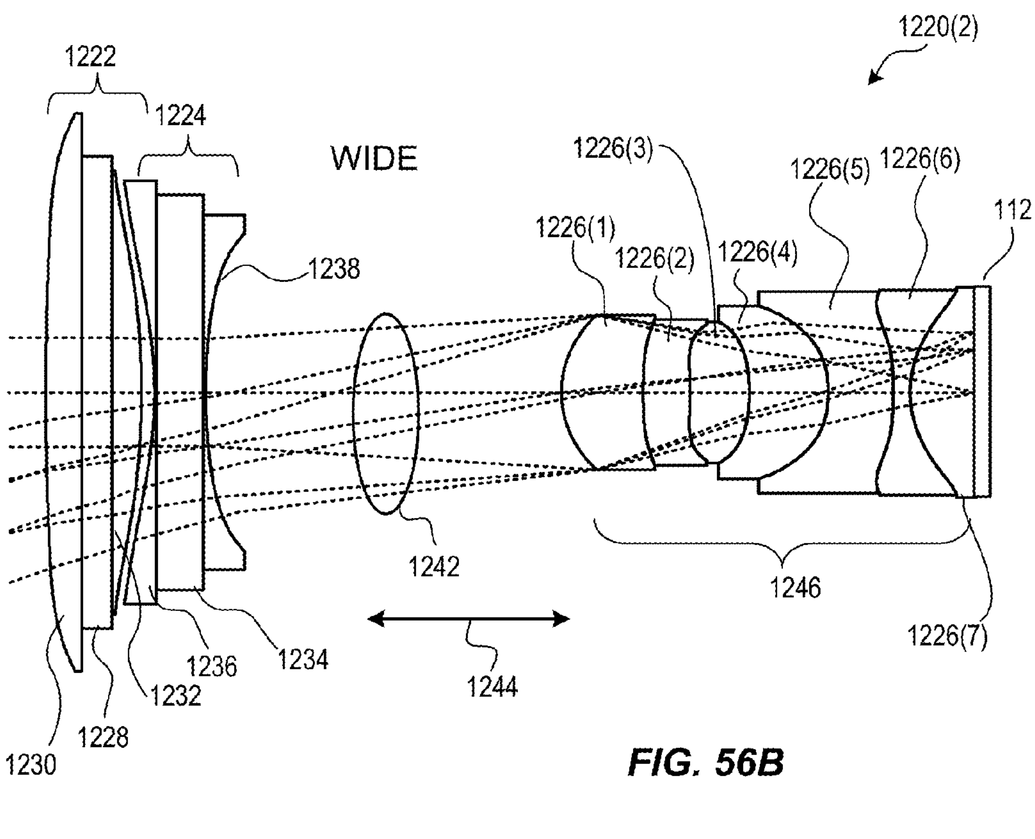

FIGS. 56A and 56B show optical layouts and raytraces of two configurations of Z_VGA_LL imaging system 1220, which is an embodiment of imaging system 10 of FIG. 2A, where "LL" stands for "layered lens" in this context. Z_VGA_LL imaging system 1220 is a three group, discrete zoom imaging system that has two zoom configurations. The first zoom configuration, which may be referred to as the tele configuration, is illustrated as Z_VGA_LL imaging system 1220(1). In the tele configuration, imaging system 1220 has a relatively long focal length. The second zoom configuration, which may be referred to as the wide configuration, is illustrated as Z_VGA_LL imaging system 1220(2). In the wide configuration, Z_VGA_LL imaging system 1220 has a relatively wide field of view. It may be noted that the drawing size of optics groups, for example optics group 1224, are different for tele and wide configuration. This difference in drawing size is due to the drawing scaling in the optical software, ZEMAX®, which was used to create this design. In reality, the sizes of the optics groups, or individual optical elements, do not change for different zoom configurations. It is also noted here that this issue appears in all the zoom designs that follow. Z_VGA_LL imaging system 1220(1) has a focal length of 3.36 millimeters, a field of view of 29°, F/# of 1.9, a total track length of 8.25 mm, and a maximum chief ray angle of 25°. Imaging system 1220(2) has a focal length of 1.68 millimeters, a field of view of 62°, F/# of 1.9, a total track length of 8.25 mm, and a maximum chief ray angle of 25°.

Z_VGA_LL imaging system 1220 includes a first optics group 1222 having an element 1228. Positive optical element 1230 is formed on one side of element 1228, and positive optical element 1232 is formed on the opposite side of element 1228. Element 1228 is for example a glass plate. The position of first optics group 1222 in the Z_VGA_LL imaging system 1220 is fixed.

Z_VGA_LL imaging system 1220 includes a second optics group 1224 having an optical element 1234. Negative optical element 1236 is formed on one side of element 1234, and negative optical element 1238 is formed on the other side element 1234. Element 1234 is for example a glass plate. Second optics group 1224 is translatable between two positions along an axis indicated by line 1244. In the first position of optics group 1224, which is shown in imaging system 1220(1), Z_VGA_LL imaging system 1220 has a tele configuration. In the second position of optics group 1224, which is shown in imaging system 1220(2), Z_VGA_LL imaging system 1220 has a wide configuration. It should be noted that ZEMAX® makes groups of optical elements appear to be different in the wide and tele configurations due to scaling.

The Z_VGA_LL imaging system 1220 includes a third optics group 1246 formed on VGA format detector 112. An optics-detector interface (not shown) separates third optics group 1246 from a surface of detector 112. Layered optical element 1226(7) is formed on detector 112; layered optical element 1226(6) is formed on layered optical element 1226(7); layered optical element 1226(5) is formed on layered optical element 1226(6); layered optical element 1226(4) is formed on layered optical element 1226(5); layered optical element 1226(3) is formed on layered optical element 1226(4); layered optical element 1226(2) is formed on layered optical element 1226(3); and layered optical element 1226(1) is formed on layered optical element 1226(2). Layered optical elements 1226 are formed of two different materials, with adjacent layered optical elements 1226 being formed of different materials. Specifically, layered optical elements 1226(1), 1226(3), 1226(5), and 1226(7) are formed of a first material with a first refractive index, and layered optical elements 1226(2), 1226(4), and 1226(6) are formed of a second material with a second refractive index. Rays 1242 represent electromagnetic energy being imaged by the Z_VGA_LL imaging system 1220; rays 1242 originate from infinity. The prescriptions for tele and wide configurations are summarized in TABLES 23-25. The sag for each optical element of these configurations is given by Eq. (1), where radius, thickness and diameter are given in units of millimeters.

Tele:

TABLE 23

| Surface | Radius | Thickness | Refractive index | Abbe# | Diameter | Conic |
|---|---|---|---|---|---|---|
| OBJECT | Infinity | Infinity | air | | Infinity | 0 |
| 2 | 21.01981 | 0.3053034 | 1.481 | 60.131 | 4.76 | 0 |
| 3 | Infinity | 0.2643123 | 1.525 | 62.558 | 4.714341 | 0 |
| 4 | Infinity | 0.2489378 | 1.481 | 60.131 | 4.549862 | 0 |
| 5 | −6.841404 | 3.095902 | air | | 4.530787 | 0 |
| 6 | −3.589125 | 0.02 | 1.481 | 60.131 | 1.668737 | 0 |
| 7 | Infinity | 0.4 | 1.525 | 62.558 | 1.623728 | 0 |
| 8 | Infinity | 0.02 | 1.481 | 60.131 | 1.459292 | 0 |
| 9 | 5.261591 | 0.04882453 | air | | 1.428582 | 0 |
| STOP | 0.8309022 | 0.6992978 | 1.370 | 92.000 | 1.294725 | 0 |
| 11 | 7.037158 | 0.4 | 1.620 | 32.000 | 1.233914 | 0 |
| 12 | 0.6283516 | 0.5053543 | 1.370 | 92.000 | 1.157337 | 0 |

TABLE 23-continued

| Surface | Radius | Thickness | Refractive index | Abbe# | Diameter | Conic |
|---|---|---|---|---|---|---|
| 13 | −4.590466 | 0.6746035 | 1.620 | 32.000 | 1.204819 | 0 |
| 14 | −0.9448569 | 0.5489904 | 1.370 | 92.000 | 1.480335 | 0 |
| 15 | 36.82564 | 0.1480326 | 1.620 | 32.000 | 1.746687 | 0 |
| 16 | 3.515415 | 0.5700821 | 1.370 | 92.000 | 1.757716 | 0 |
| IMAGE | Infinity | 0 | 1.458 | 67.821 | 1.79263 | 0 |

Wide:

TABLE 24

| Surface | Radius | Thickness | Refractive index | Abbe# | Diameter | Conic |
|---|---|---|---|---|---|---|
| OBJECT | Infinity | Infinity | air | | Infinity | 0 |
| 2 | 21.01981 | 0.3053034 | 1.481 | 60.131 | 4.76 | 0 |
| 3 | Infinity | 0.2643123 | 1.525 | 62.558 | 4.036723 | 0 |
| 4 | Infinity | 0.2489378 | 1.481 | 60.131 | 3.787365 | 0 |
| 5 | −6.841404 | 0.1097721 | air | | 3.763112 | 0 |
| 6 | −3.589125 | 0.02 | 1.481 | 60.131 | 3.610554 | 0 |
| 7 | Infinity | 0.4 | 1.525 | 62.558 | 3.364582 | 0 |
| 8 | Infinity | 0.02 | 1.481 | 60.131 | 3.021448 | 0 |
| 9 | 5.261591 | 3.03466 | air | | 2.70938 | 0 |
| STOP | 0.8309022 | 0.6992978 | 1.370 | 92.000 | 1.296265 | 0 |
| 11 | 7.037158 | 0.4 | 1.620 | 32.000 | 1.234651 | 0 |
| 12 | 0.6283516 | 0.5053543 | 1.370 | 92.000 | 1.157644 | 0 |
| 13 | −4.590466 | 0.6746035 | 1.620 | 32.000 | 1.204964 | 0 |
| 14 | −0.9448569 | 0.5489904 | 1.370 | 92.000 | 1.477343 | 0 |
| 15 | 36.82564 | 0.1480326 | 1.620 | 32.000 | 1.74712 | 0 |
| 16 | 3.515415 | 0.5700821 | 1.370 | 92.000 | 1.757878 | 0 |
| IMAGE | Infinity | 0 | 1.458 | 67.821 | 1.804693 | 0 |

Aspheric coefficients are identical for tele configuration and wide configuration, and they are listed in TABLE 25.

TABLE 25

| Surface# | $A_2$ | $A_4$ | $A_6$ | $A_8$ | $A_{10}$ | $A_{12}$ | $A_{14}$ | $A_{16}$ |
|---|---|---|---|---|---|---|---|---|
| 1(Object) | 0 | 0 | 0 | 0 | 0 | 0 | 0 | 0 |
| 2 | 0 | $-2.192 \times 10^{-3}$ | $-1.882 \times 10^{-3}$ | $1.028 \times 10^{-3}$ | $-9.061 \times 10^{-5}$ | 0 | 0 | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | $-3.323 \times 10^{-3}$ | $1.121 \times 10^{-4}$ | $8.006 \times 10^{-4}$ | $-8.886 \times 10^{-5}$ | 0 | 0 | 0 |
| 6 | 0 | 0.02534 | $-1.669 \times 10^{-4}$ | $-2.207 \times 10^{-4}$ | $-2.233 \times 10^{-5}$ | 0 | 0 | 0 |
| 7 | 0 | 0 | 0 | 0 | 0 | 0 | 0 | 0 |
| 8 | 0 | 0 | 0 | 0 | 0 | 0 | 0 | 0 |
| 9 | 0 | $3.035 \times 10^{-3}$ | 0.02305 | $-2.656 \times 10^{-3}$ | $1.501 \times 10^{-3}$ | 0 | 0 | 0 |
| 10(Stop) | 0 | −0.07564 | −0.1525 | 0.2919 | −0.4144 | 0 | 0 | 0 |
| 11 | 0 | 0.6611 | −1.267 | 6.860 | −12.86 | 0 | 0 | 0 |
| 12 | −0.9991 | 1.145 | −4.218 | 21.14 | −34.56 | 0 | 0 | 0 |
| 13 | −0.2285 | −0.4463 | −2.304 | 8.371 | −18.33 | 0 | 0 | 0 |
| 14 | 0 | −0.7106 | −1.277 | 5.748 | −6.939 | 0 | 0 | 0 |
| 15 | 0 | −1.852 | 3.752 | −2.818 | 0.9606 | 0 | 0 | 0 |
| 16 | 0.4195 | 0.1774 | −0.8167 | 1.600 | −1.214 | 0 | 0 | 0 |

Figure 57A:
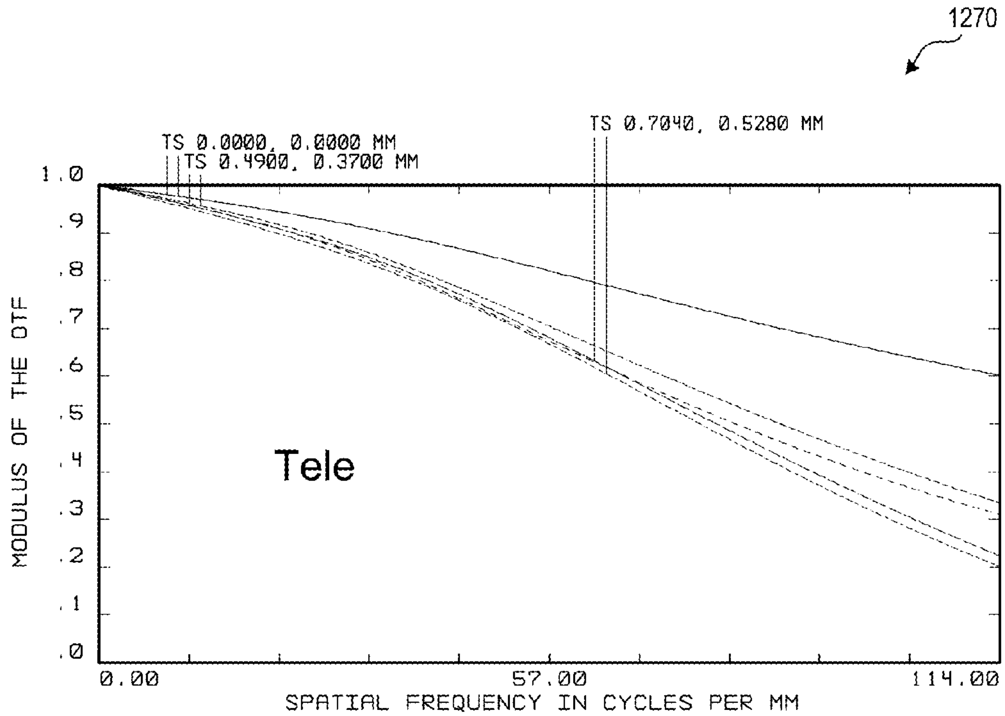
FIGS. 57A and 57B show plots of the modulation transfer functions as a function of spatial frequency for two configurations of the imaging system of FIGS. 56A and 56B.
Figure 57B:
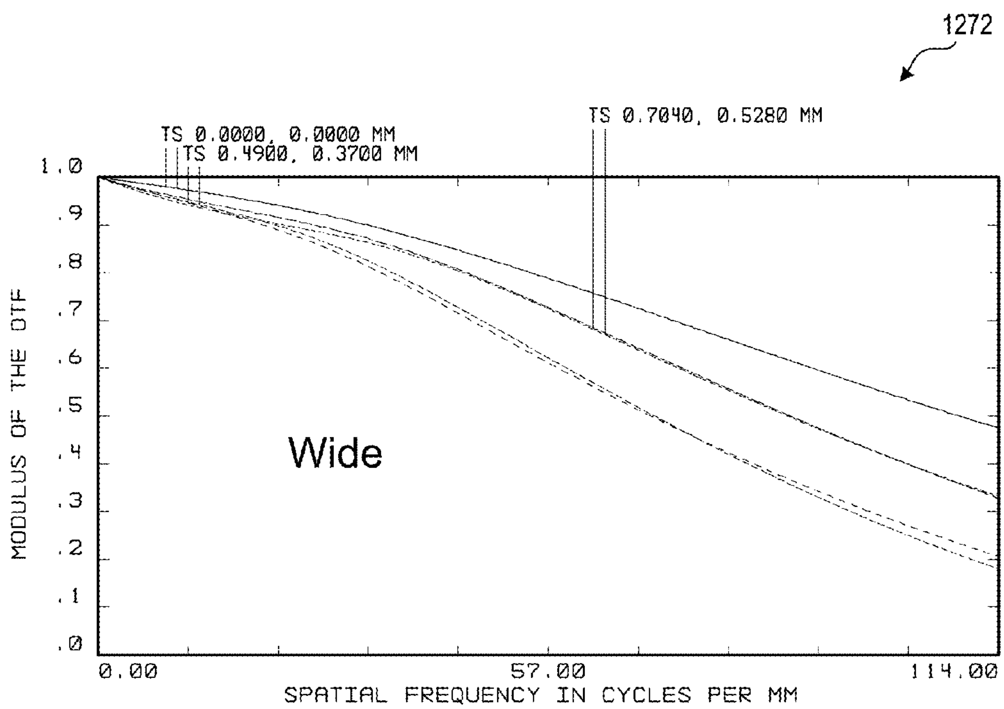

FIGS. 57A and 57B show plots 1270 and 1272 of the MTFs as a function of spatial frequency of Z_VGA_LL imaging system 1220, for an infinite conjugate distance object. The MTFs are averaged over wavelengths from 470 to 650 nm. Each plot includes MTF curves for three distinct field points associated with real image heights on a diagonal axis of detector 112; the three field points are an on-axis field point having coordinates (0 mm, 0 mm), a 0.7 field point having coordinates (0.49 mm, 0.37 mm), and a full field point having coordinates (0.704 mm, 0.528 mm). Plot 1270 corresponds to imaging system 1220(1), which represents Z_VGA_LL imaging system 1220 having a tele configuration, and plot 1272 corresponds to imaging system 1220(2), which represents Z_VGA_LL imaging system 1220 having a wide configuration.

Figure 58A:
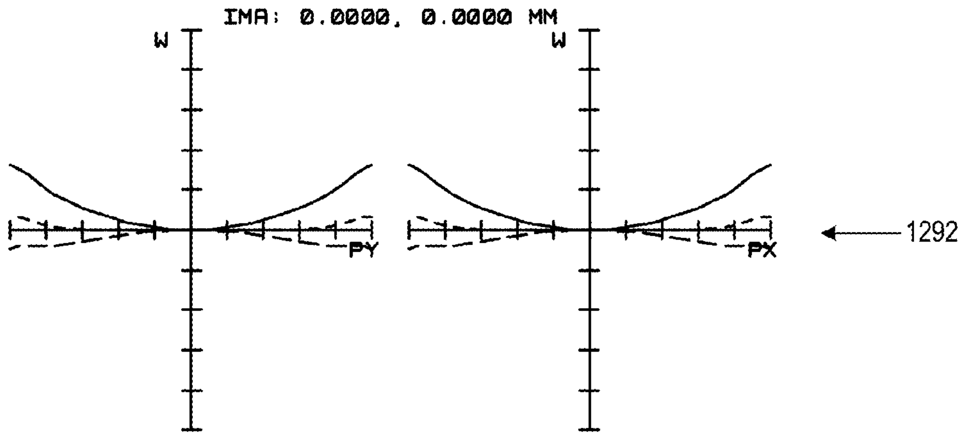
FIGS. 58A-58C and 59A-59C show plots of optical path differences for two configurations of the imaging system of FIGS. 56A and 56B.
Figure 58B:
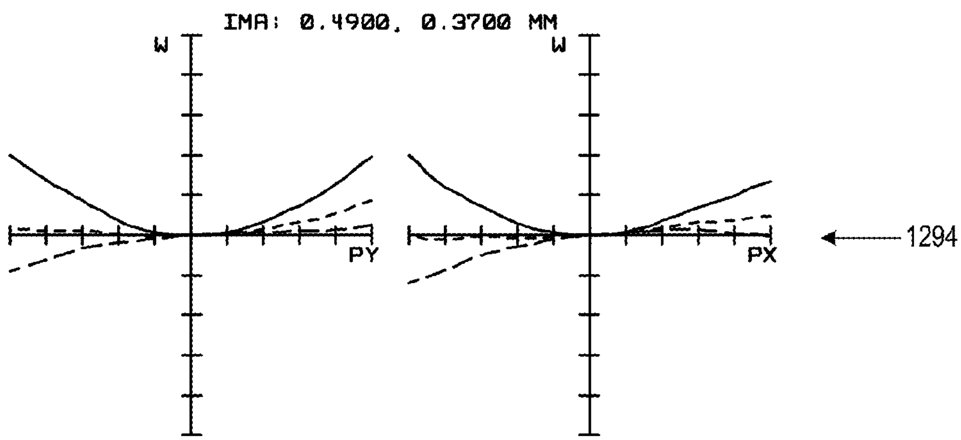
Figure 58C:
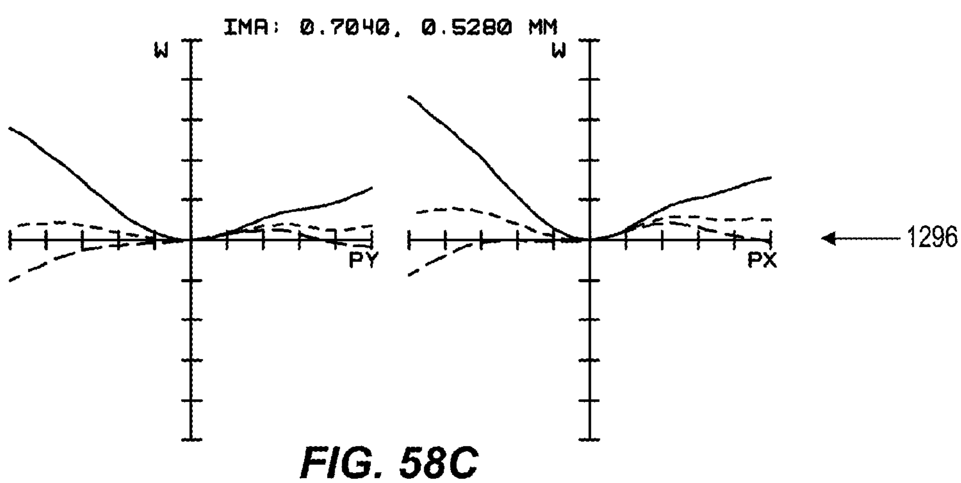
Figure 59A:
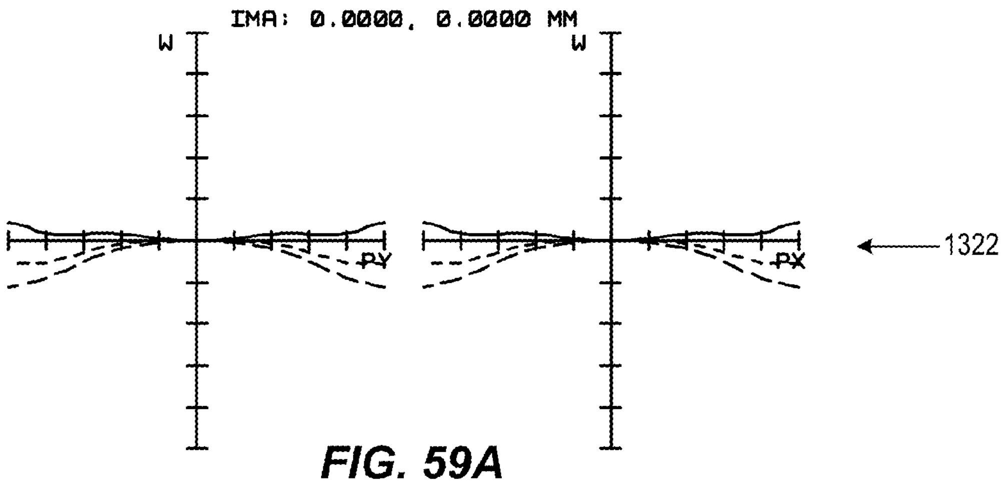
Figure 59B:
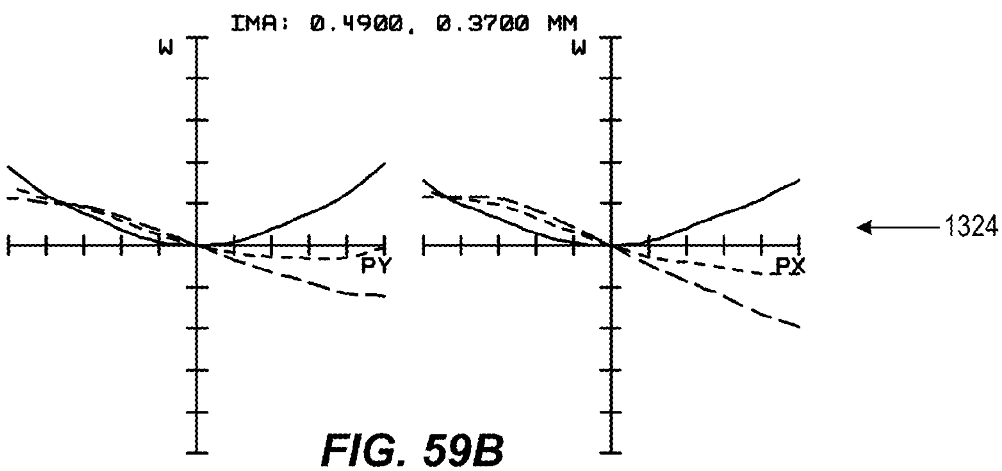
Figure 59C:
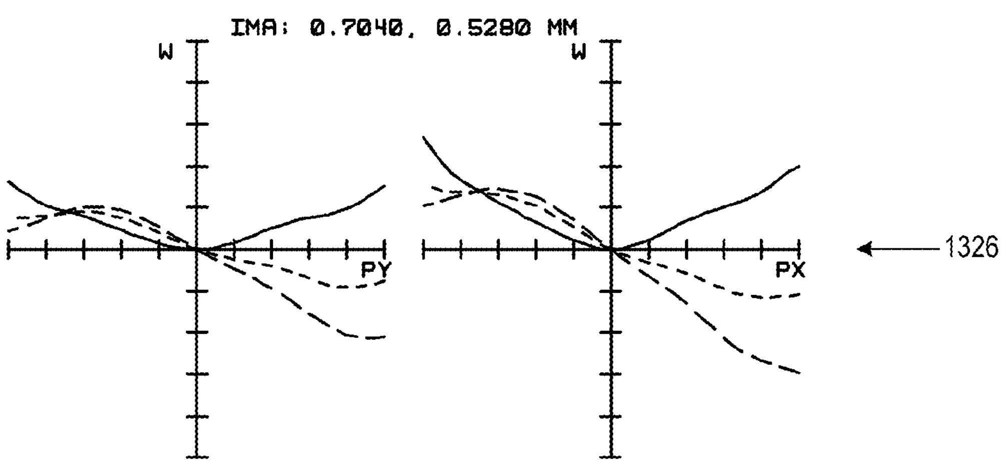
Figure 60A:
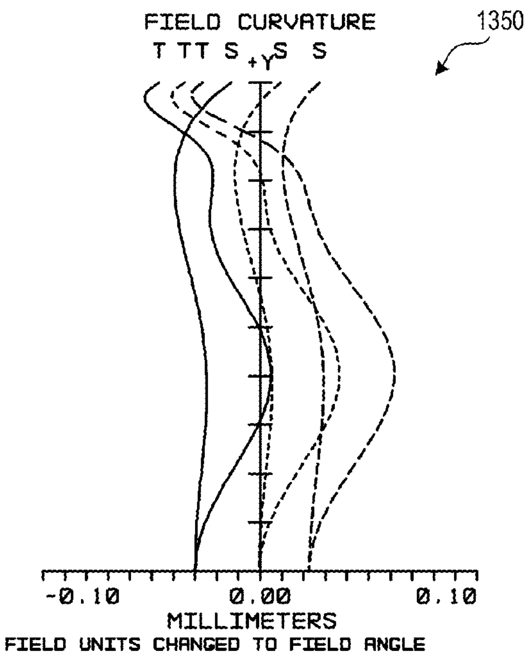
FIGS. 60A and 60C show plots of field curvature for two configurations of the imaging system of FIGS. 56A and 56B.
Figure 60B:
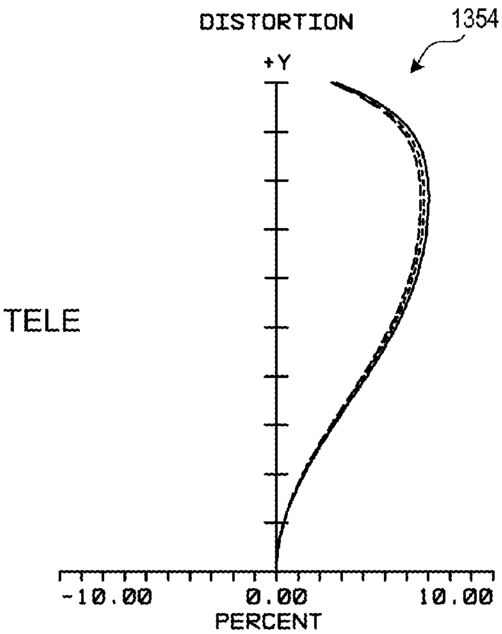
FIGS. 60B and 60D show plots of distortion for two configurations of the imaging system of FIGS. 56A and 56B.
Figure 60C:
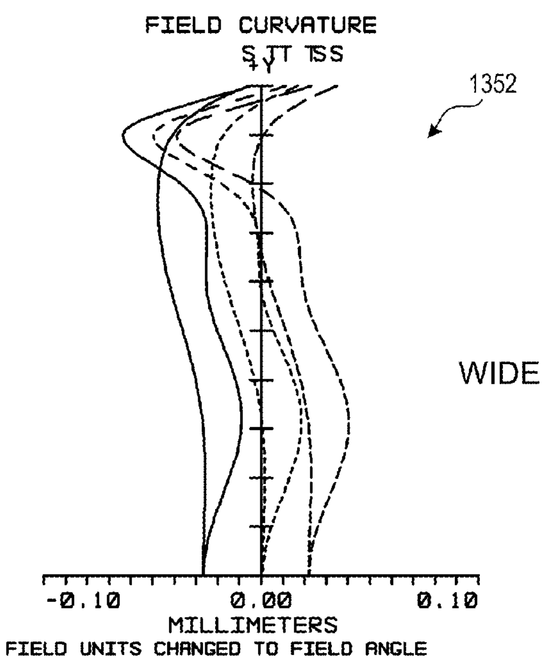
Figure 60D:
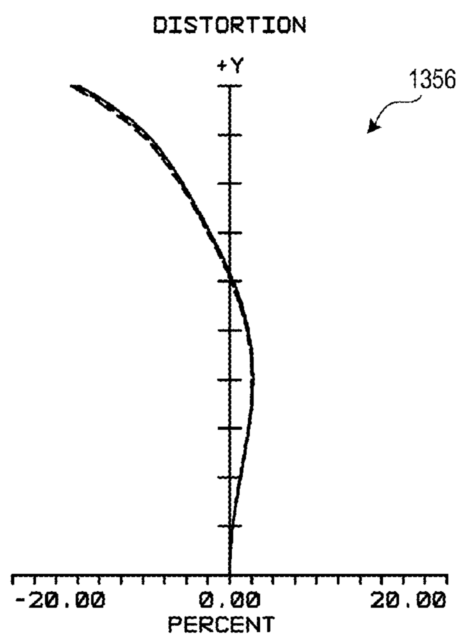

FIGS. 58A, 58B and 58C show pairs of plots 1292, 1294 and 1296 and FIGS. 59A, 59B and 59C show plots 1322, 1324 and 1326, respectively, of the optical path differences of Z_VGA_LL imaging system 1220 for an infinite conjugate object. Pairs of plots 1292, 1294 and 1296 are for the Z_VGA_LL imaging system 1220(1) having a tele configuration, and pairs of plots 1322, 1324 and 1326 are for Z_VGA_LL imaging system 1220(2) having a wide configuration. The maximum scale for plots 1292, 1294, 1296, 1322, 1324 and 1326 is +/−five waves. The solid lines correspond to electromagnetic energy having a wavelength of 470 nm; the short dashed lines correspond to electromagnetic energy having a wavelength of 550 nm; the long dashed lines correspond to electromagnetic energy having a wavelength of 650 nm.

Each pair of plots in FIGS. 58 and 59 represents optical path differences at a different real height on the diagonal of detector 112. Plots 1292 and 1322 correspond to an on-axis field point having coordinates (0 mm, 0 mm); the second rows of plots 1294 and 1324 correspond to a 0.7 field point having coordinates (0.49 mm, 0.37 mm); and the third rows of plots 1296 and 1326 correspond to a full field point having coordinates (0.704 mm, 0.528 mm). The left plot of each pair is a plot of wavefront error for the tangential set of rays, and the right plot is a plot of wavefront error for the sagittal set of rays.

FIGS. 60A, 60B, 60C and 60D show plots 1354 and 1356 of distortion and plots 1350 and 1352 of field curvature of Z_VGA_LL imaging system 1220. Plots 1350 and 1354 correspond to Z_VGA_LL imaging system 1220(1) having a tele configuration, and plots 1352 and 1356 correspond to Z_VGA_LL imaging system 1220(2) having a wide configuration. The maximum half-field angle is 14.374° for the tele configuration and 31.450° for the wide-angle configuration. The solid lines correspond to electromagnetic energy having a wavelength of about 470 nm; the short dashed lines correspond to electromagnetic energy having a wavelength of 550 nm; and the long dashed lines correspond to electromagnetic energy having a wavelength of 650 nm.

Figure 61A:
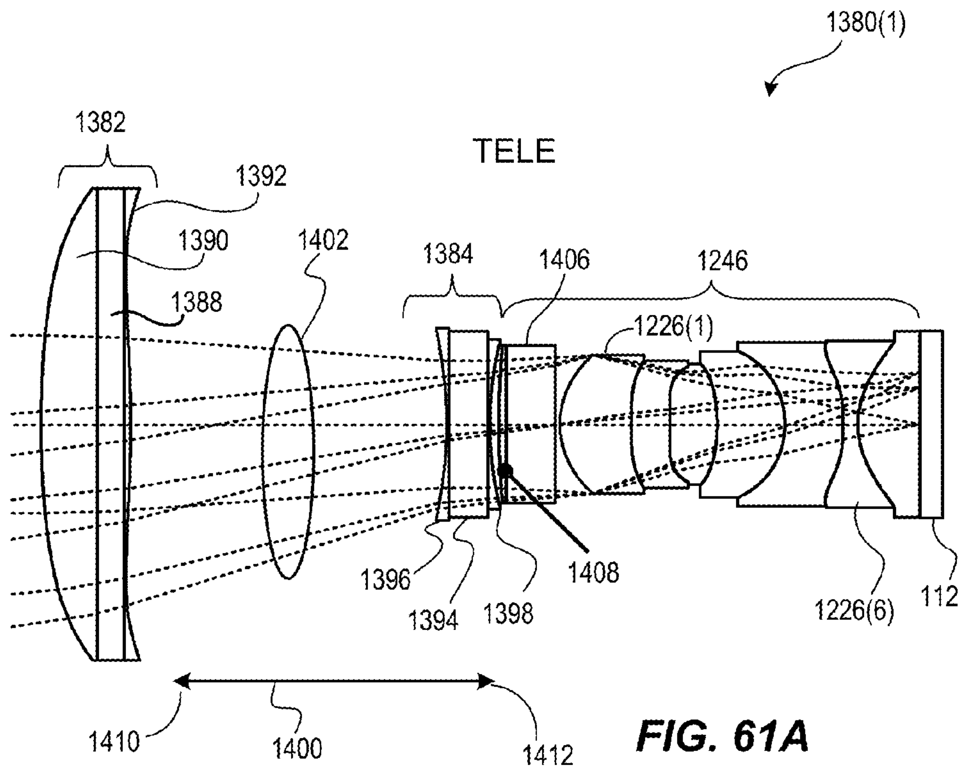
FIGS. 61A, 61B and 62 show optical layouts and raytraces for three configurations of a zoom imaging system, according to an embodiment.
Figure 61B:
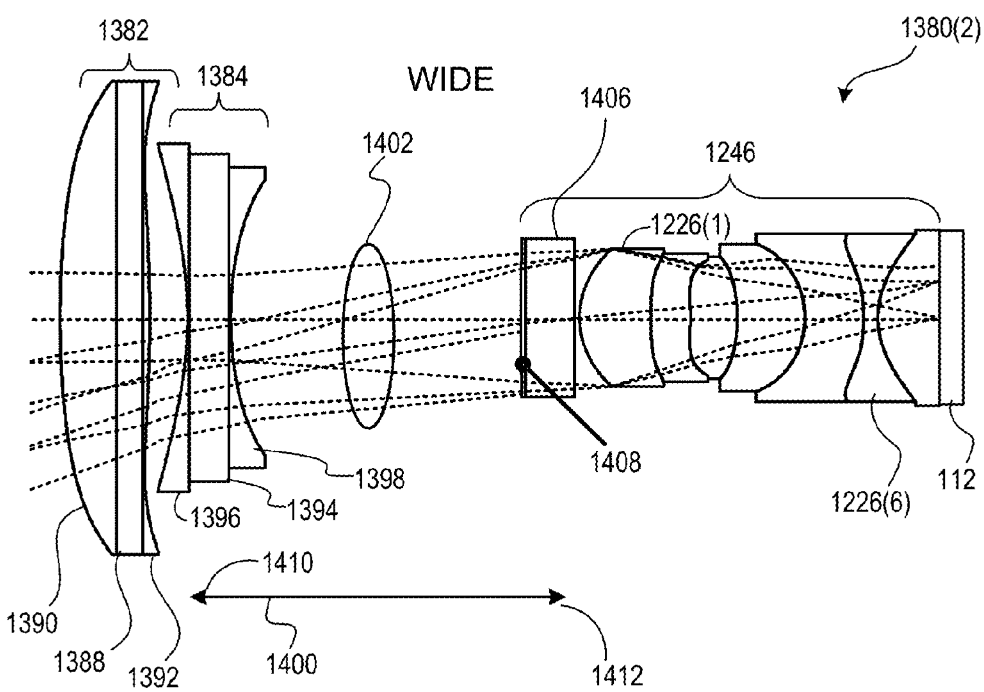
Figure 62:
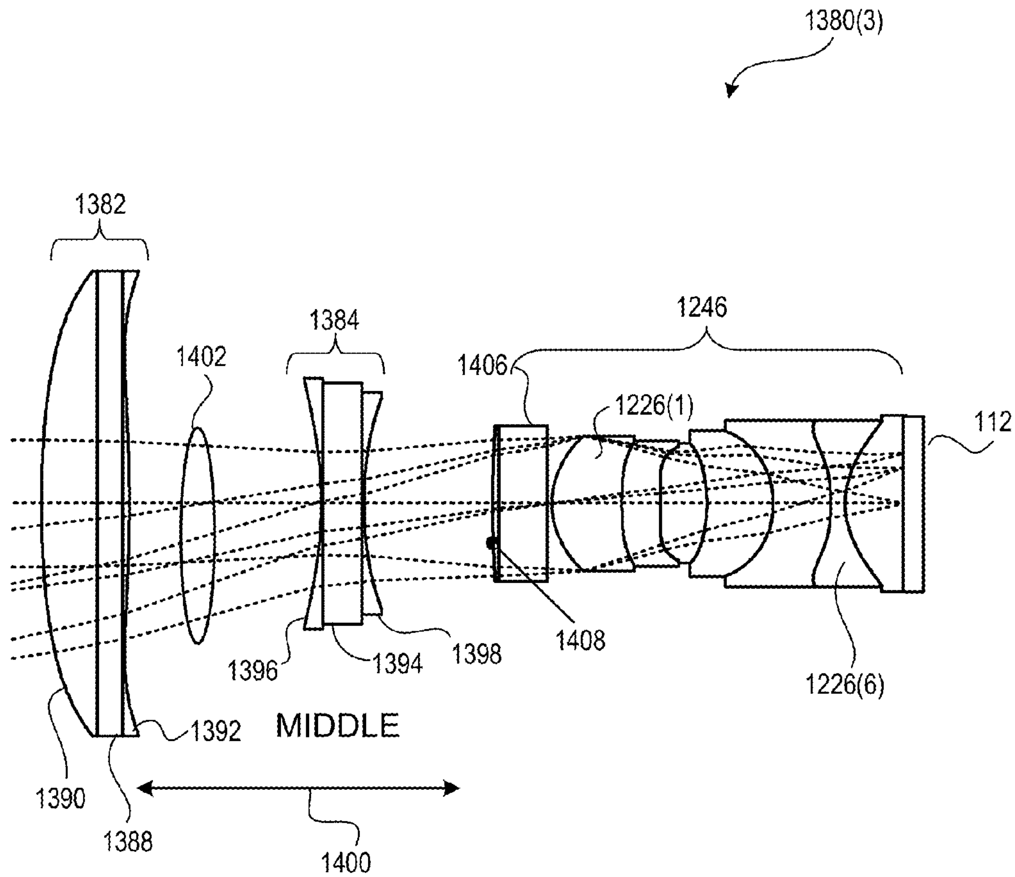

FIGS. 61A, 61B and 62 show optical layouts and raytraces of three configurations of "Z_VGA_LL_AF" imaging system 1380, which is an embodiment of imaging system 10 of FIG. 2A. Z_VGA_LL_AF imaging system 1380 is a three group zoom imaging system that has a continuously variable zoom ratio up to a maximum ratio of 1.95. Generally, in order to have a continuous zooming, more than one optics group in the zoom imaging system has to move. In this case, continuous zooming is achieved by moving only second optics group 1384, in tandem with adjusting the power of a variable optic 1408, discussed below. Variable optics 1408 is described in detail in FIG. 29. One zoom configuration, which may be referred to as the tele configuration, is illustrated as Z_VGA_LL_AF imaging system 1380(1). In the tele configuration, Z_VGA_LL_AF imaging system 1380 has a relatively long focal length. Another zoom configuration, which may be referred to as the wide configuration, is illustrated as Z_VGA_LL_AF imaging system 1380(2). In the wide configuration, Z_VGA_LL_AF imaging system 1380 has a relatively wide field of view. Yet another zoom configuration, which may be referred to as the middle configuration, is illustrated as Z_VGA_LL_AF imaging system 1380(3). The middle configuration has a focal length and field of view in between those of the tele configuration and the wide configuration.

Imaging system 1380(1) has a focal length of 3.34 millimeters, a field of view of 28°, F/# of 1.9, a total track length of 9.25 mm, and a maximum chief ray angle of 25°. Imaging system 1380(2) has a focal length of 1.71 millimeters, a field of view of 62°, F/# of 1.9, a total track length of 9.25 mm, and a maximum chief ray angle of 25°.

The Z_VGA_LL_AF imaging system 1380 includes a first optics group 1382 having an element 1388. Positive optical element 1390 is formed on one side of element 1388, and negative optical element 1392 is formed on the other side of element 1388. Element 1388 is for example a glass plate. The position of first optics group 1382 in the Z_VGA_LL_AF imaging system 1380 is fixed.

Z_VGA_LL_AF imaging system 1380 includes a second optics group 1384 having an element 1394. Negative optical element 1396 is formed on one side of element 1394, and negative optical element 1398 is formed on the opposite side of element 1394. Element 1394 is for example a glass plate. Second optics group 1384 is continuously translatable along an axis indicated by line 1400 between ends 1410 and 1412. If optics group 1384 is positioned at end 1412 of line 1400, which is shown in imaging system 1380(1), Z_VGA_LL_AF imaging system 1380 has a tele configuration. If optics group 1384 is positioned at end 1410 of line 1400, which is shown in imaging system 1380(2), Z_VGA_LL_AF imaging system 1380 has a wide configuration. If optics group 1384 is positioned in the middle of line 1400, which is shown in imaging system 1380(3), Z_VGA_LL_AF imaging system 1380 has a middle configuration. Any other zoom position between tele and wide is achieved by moving optics group 2 and adjusting the power of variable optic 1408, discussed below. The prescriptions for tele configuration, middle configuration, and wide configuration, are summarized in TABLES 26-30. The sag for each optical element of each configuration is given by Eq. (1), where radius, thickness and diameter are given in units of millimeters.

Tele:

TABLE 26

| Surface | Radius | Thickness | Refractive Index | Abbe# | Diameter | Conic |
|---|---|---|---|---|---|---|
| OBJECT | Infinity | Infinity | | air | Infinity | 0 |
| 2 | 10.82221 | 0.5733523 | 1.48 | 60.131 | 4.8 | 0 |
| 3 | Infinity | 0.27 | 1.525 | 62.558 | 4.8 | 0 |
| 4 | Infinity | 0.06712479 | 1.481 | 60.131 | 4.8 | 0 |
| 5 | −14.27353 | 3.220371 | air | | 4.8 | 0 |
| 6 | −3.982425 | 0.02 | 1.481 | 60.131 | 1.946502 | 0 |
| 7 | Infinity | 0.4 | 1.525 | 62.558 | 1.890202 | 0 |
| 8 | Infinity | 0.02 | 1.481 | 60.131 | 1.721946 | 0 |
| 9 | 3.61866 | 0.08948048 | air | | 1.669251 | 0 |
| 10 | Infinity | 0.0711205 | 1.430 | 60.000 | 1.6 | 0 |
| 11 | Infinity | 0.5 | 1.525 | 62.558 | 1.6 | 0 |
| 12 | Infinity | 0.05 | air | | 1.6 | 0 |
| STOP | 0.8475955 | 0.7265116 | 1.370 | 92.000 | 1.397062 | 0 |
| 14 | 6.993954 | 0.4 | 1.620 | 32.000 | 1.297315 | 0 |
| 15 | 0.6372614 | 0.4784372 | 1.370 | 92.000 | 1.173958 | 0 |
| 16 | −4.577195 | 0.6867971 | 1.620 | 32.000 | 1.231435 | 0 |
| 17 | −0.9020605 | 0.5944188 | 1.370 | 92.000 | 1.49169 | 0 |

TABLE 26-continued

| Surface | Radius | Thickness | Refractive Index | Abbe# | Diameter | Conic |
|---|---|---|---|---|---|---|
| 18 | −3.290065 | 0.1480326 | 1.620 | 32.000 | 1.655433 | 0 |
| 19 | 3.024577 | 0.6317016 | 1.370 | 92.000 | 1.690731 | 0 |
| IMAGE | Infinity | 0 | 1.458 | 67.821 | 1.883715 | 0 |

Middle:

TABLE 27

| Surface | Radius | Thickness | Refractive Index | Abbe# | Diameter | Conic |
|---|---|---|---|---|---|---|
| OBJECT | Infinity | Infinity | | air | Infinity | 0 |
| 2 | 10.82221 | 0.5733523 | 1.48 | 60.131 | 4.8 | 0 |
| 3 | Infinity | 0.27 | 1.525 | 62.558 | 4.8 | 0 |
| 4 | Infinity | 0.06712479 | 1.481 | 60.131 | 4.8 | 0 |
| 5 | −14.27353 | 1.986417 | air | | 4.8 | 0 |
| 6 | −3.982425 | 0.02 | 1.481 | 60.131 | 2.596293 | 0 |
| 7 | Infinity | 0.4 | 1.525 | 62.558 | 2.491135 | 0 |
| 8 | Infinity | 0.02 | 1.481 | 60.131 | 2.289918 | 0 |
| 9 | 3.61866 | 1.331717 | air | | 2.183245 | 0 |
| 10 | Infinity | 0.06310436 | 1.430 | 60.000 | 1.6 | 0 |
| 11 | Infinity | 0.5 | 1.525 | 62.558 | 1.6 | 0 |
| 12 | Infinity | 0.05 | air | | 1.6 | 0 |
| STOP | 0.8475955 | 0.7265116 | 1.370 | 92.000 | 1.397687 | 0 |
| 14 | 6.993954 | 0.4 | 1.620 | 32.000 | 1.299614 | 0 |
| 15 | 0.6372614 | 0.4784372 | 1.370 | 92.000 | 1.177502 | 0 |
| 16 | −4.577195 | 0.6867971 | 1.620 | 32.000 | 1.237785 | 0 |
| 17 | −0.9020605 | 0.5944188 | 1.370 | 92.000 | 1.504015 | 0 |
| 18 | −3.290065 | 0.1480326 | 1.620 | 32.000 | 1.721973 | 0 |
| 19 | 3.024577 | 0.6317016 | 1.370 | 92.000 | 1.707845 | 0 |
| IMAGE | Infinity | 0 | 1.458 | 67.821 | 1.820635 | 0 |

Wide:

TABLE 28

| Surface | Radius | Thickness | Refractive Index | Abbe# | Diameter | Conic |
|---|---|---|---|---|---|---|
| OBJECT | Infinity | Infinity | | air | Infinity | 0 |
| 2 | 10.82221 | 0.5733523 | 1.48 | 60.131 | 4.8 | 0 |
| 3 | Infinity | 0.27 | 1.525 | 62.558 | 4.8 | 0 |
| 4 | Infinity | 0.06712479 | 1.481 | 60.131 | 4.8 | 0 |
| 5 | −14.27353 | 0.3840319 | air | | 4.8 | 0 |
| 6 | −3.982425 | 0.02 | 1.481 | 60.131 | 3.538305 | 0 |
| 7 | Infinity | 0.4 | 1.525 | 62.558 | 3.316035 | 0 |
| 8 | Infinity | 0.02 | 1.481 | 60.131 | 3.051135 | 0 |
| 9 | 3.61866 | 2.947226 | air | | 2.798488 | 0 |
| 10 | Infinity | 0.05 | 1.430 | 60.000 | 1.6 | 0 |
| 11 | Infinity | 0.5 | 1.525 | 62.558 | 1.6 | 0 |
| 12 | Infinity | 0.05 | air | | 1.6 | 0 |
| STOP | 0.8475955 | 0.7265116 | 1.370 | 92.000 | 1.396893 | 0 |
| 14 | 6.993954 | 0.4 | 1.620 | 32.000 | 1.298622 | 0 |
| 15 | 0.6372614 | 0.4784372 | 1.370 | 92.000 | 1.176309 | 0 |
| 16 | −4.577195 | 0.6867971 | 1.620 | 32.000 | 1.235759 | 0 |
| 17 | −0.9020605 | 0.5944188 | 1.370 | 92.000 | 1.499298 | 0 |
| 18 | −3.290065 | 0.1480326 | 1.620 | 32.00 | 1.699436 | 0 |
| 19 | 3.024577 | 0.6317016 | 1.370 | 92.000 | 1.705313 | 0 |
| IMAGE | Infinity | 0 | 1.458 | 67.821 | 1.786772 | 0 |

All of the aspheric coefficients, except $A_2$ on surface 10, which is the surface of the variable optic 1408, are identical for tele configuration, middle configuration, and wide configuration (or any other zoom configuration in between tele and wide configuration), and they are listed in TABLE 29.

TABLE 29

| Surface# | $A_2$ | $A_4$ | $A_6$ | $A_8$ | $A_{10}$ | $A_{12}$ | $A_{14}$ | $A_{16}$ |
|---|---|---|---|---|---|---|---|---|
| 1(Object) | 0 | 0 | 0 | 0 | 0 | 0 | 0 | 0 |
| 2 | 0 | $6.752 \times 10^{-3}$ | $-1.847 \times 10^{-3}$ | $6.215 \times 10^{-4}$ | $-4.721 \times 10^{-5}$ | 0 | 0 | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | $5.516 \times 10^{-3}$ | $-8.048 \times 10^{-4}$ | $6.015 \times 10^{-4}$ | $-6.220 \times 10^{-5}$ | 0 | 0 | 0 |
| 6 | 0 | 0.01164 | $1.137 \times 10^{-3}$ | $-5.261 \times 10^{-4}$ | $3.999 \times 10^{-5}$ | $1.651 \times 10^{-5}$ | $-5.484 \times 10^{-6}$ | 0 |
| 7 | 0 | 0 | 0 | 0 | 0 | 0 | 0 | 0 |
| 8 | 0 | 0 | 0 | 0 | 0 | 0 | 0 | 0 |
| 9 | 0 | $3.802 \times 10^{-3}$ | $4.945 \times 10^{-3}$ | $1.015 \times 10^{-3}$ | $7.853 \times 10^{-4}$ | $-1.202 \times 10^{-4}$ | $-1.338 \times 10^{-4}$ | 0 |
| 10 | 0.05908 | 0 | 0 | 0 | 0 | 0 | 0 | 0 |
| 11 | 0 | 0 | 0 | 0 | 0 | 0 | 0 | 0 |
| 12 | 0 | 0 | 0 | 0 | 0 | 0 | 0 | 0 |
| 13(Stop) | 0 | −0.05935 | −0.2946 | 0.5858 | −0.7367 | 0 | 0 | 0 |
| 14 | 0 | 0.7439 | −1.363 | 6.505 | −10.39 | 0 | 0 | 0 |
| 15 | −0.9661 | 1.392 | −4.786 | 21.18 | −29.59 | 0 | 0 | 0 |
| 16 | −0.2265 | 0.2368 | −2.878 | 8.639 | −13.07 | 0 | 0 | 0 |
| 17 | 0 | −0.06562 | −1.303 | 4.230 | −4.684 | 0 | 0 | 0 |
| 18 | 0 | −1.615 | 4.122 | −4.360 | 2.159 | 0 | 0 | 0 |
| 19 | 0.4483 | −0.1897 | 0.001987 | 0.6048 | −0.6845 | 0 | 0 | 0 |

Aspheric coefficients $A_2$ on surface 10 for different zoom configurations are summarized in TABLE 30.

TABLE 30

| Zoom configuration | Tele | Middle | Wide |
|---|---|---|---|
| $A_2$ | 0.05908 | 0.04311 | 0.02297 |

The Z_VGA_LL_AF imaging system 1380 includes third optics group 1246 formed on VGA format detector 112. Third optics group 1246 was described above with respect to FIG. 56. An optics-detector interface (not shown) separates third optics group 1246 from a surface of detector 112. Only some of layered optical elements 1226 of third optics group 1246 are labeled in FIGS. 61 and 62 to promote illustrative clarity.

Z_VGA_LL_AF imaging system 1380 further includes an optical element 1406 which contacts layered optical element 1226(1). A variable optic 1408 is formed on a surface of optical element 1406 opposite layered optical element 1226 (1). The focal length of variable optic 1408 may be varied in accordance with a position of second optics group 1384 such that Z_VGA_LL_AF imaging system 1380 remains focused as its zoom position varies. The focal length (power) of variable optic 1408 varies to correct the defocus during zooming caused by the movement of second optics group 1384. The focal length variation of variable optic 1408 can be used not only to correct the defocus during zooming caused by the movement of second optics group 1384 as described above, but also to adjust the focus for different conjugate distances as was described in connection with VGA_AF imaging system 600 above. In an embodiment, the focal length of variable optic 1408 may be manually adjusted by, for instance, a user of the imaging system; in another embodiment, the Z_VGA_LL_AF imaging system 1380 automatically changes the focal length of variable optic 1408 in accordance with a position of second optics group 1384. For example, Z_VGA_LL_AF imaging system 1380 may include a look up table of focal lengths of variable optic 1408 corresponding to positions of second optics group 1384; Z_VGA_LL_AF imaging system 1380 may determine the correct focal length of variable optic 1408 from the lookup table and adjust the focal length of variable optic 1408 accordingly.

Variable optic 1408 is for example an optical element with an adjustable focal length. It may be a material with a sufficiently large coefficient of thermal expansion deposited on optical element 1406. The focal length of such an embodiment of variable optic 1408 is varied by varying the temperature of the material forming variable optic 1408, thereby causing the material to expand or contract; such expansion or contraction causes the focal length of variable optic 1408 to change. The temperature of the material may be changed by use of an electric heating element (not shown). As additional examples, variable optic 1408 may be a liquid lens or a liquid crystal lens.

In operation, therefore, a processor (see, e.g., processor 46 of FIG. 1B) may be configured to control a linear transducer, for example, to move group 1384 while at the same time applying voltage or heating to control focal length of variable optic 1408.

Rays 1402 represent electromagnetic energy being imaged by Z_VGA_LL_AF imaging system 1380; rays 1402 originate from infinity, although Z_VGA_LL_AF imaging system 1380 may image rays closer to system 1380.

Figure 63A:
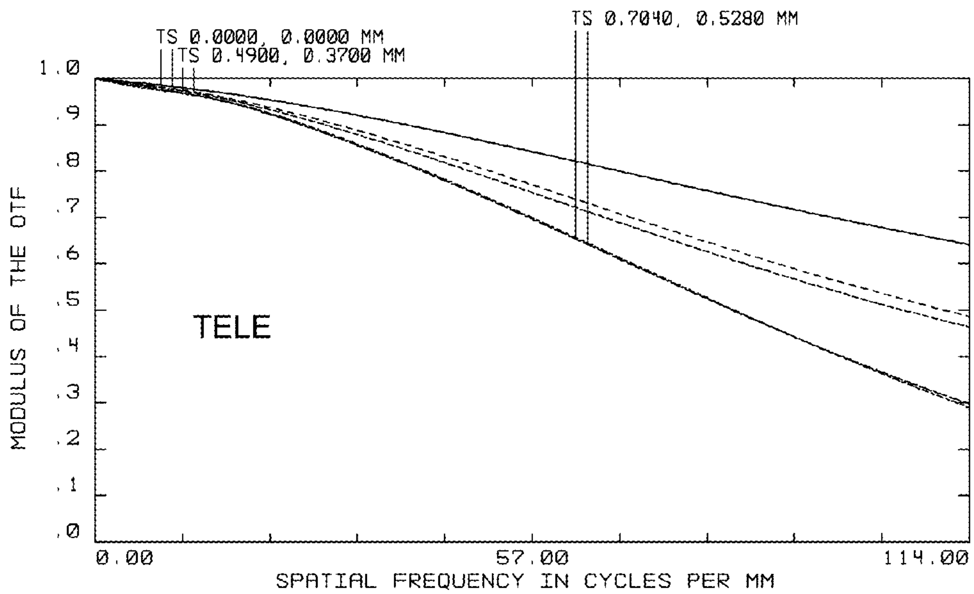
FIGS. 63A, 63B and 64 show plots of the modulation transfer functions as a function of spatial frequency for three configurations of the imaging system of FIGS. 61A, 61B and 62.
Figure 63B:
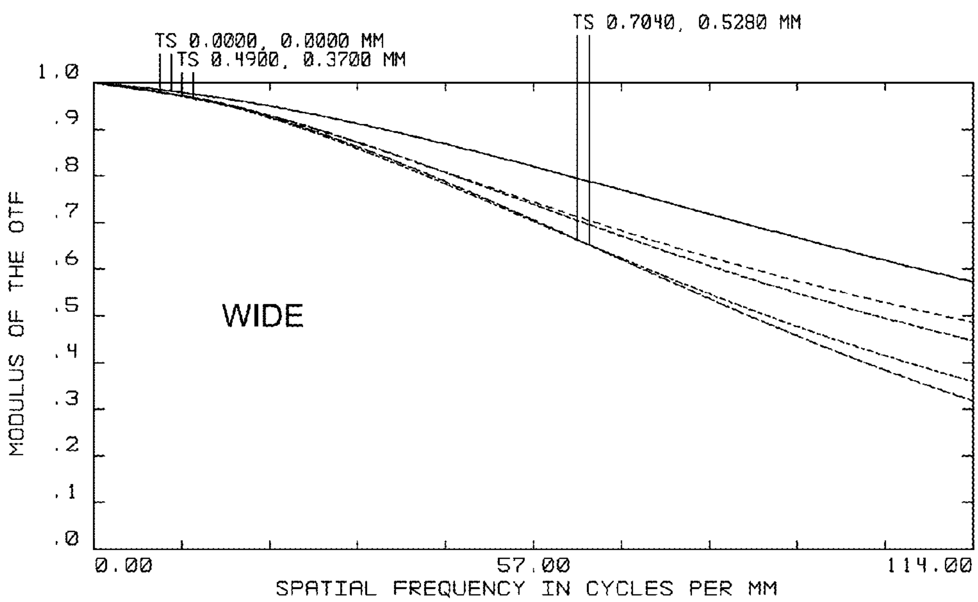
Figure 64:
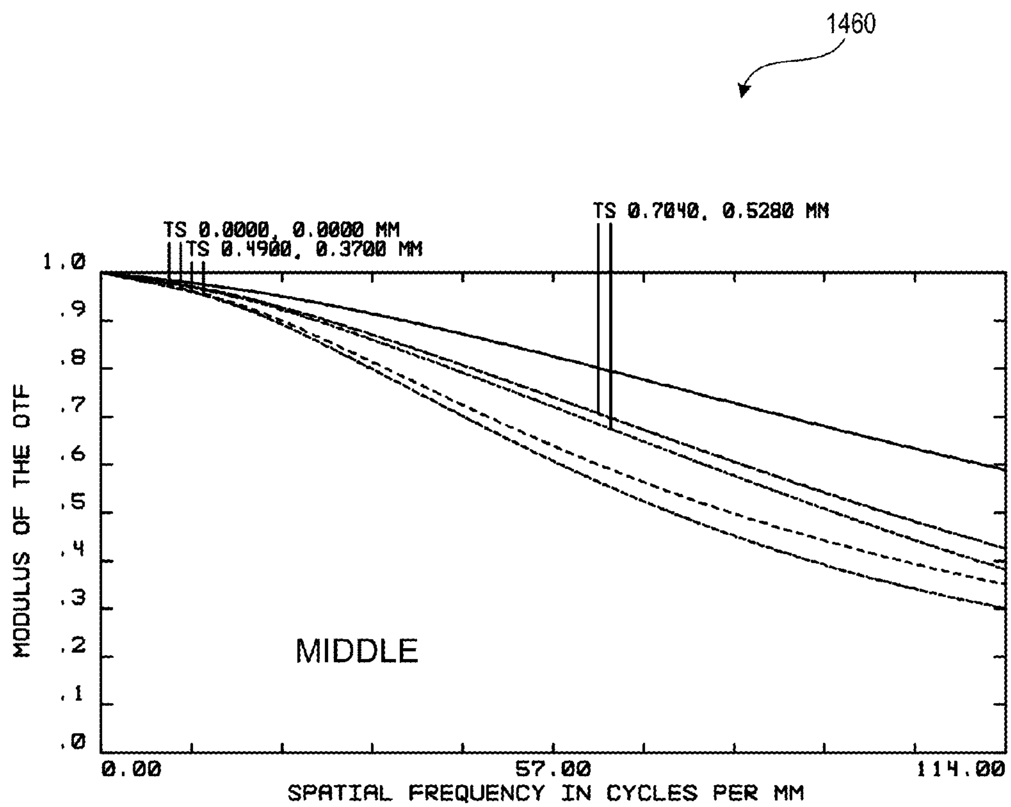

FIGS. 63A and 63B show plots 1440 and 1442 and FIG. 64 shows plot 1460 of the MTFs as a function of spatial frequency of Z_VGA_LL_AF imaging system 1380, for infinite object conjugate. The MTFs are averaged over wavelengths from 470 to 650 nm Each plot includes MTF curves for three distinct field points associated with real image heights on a diagonal axis of detector 112; the three field points are an on-axis field point having coordinates (0 mm, 0 mm), a 0.7 field point having coordinates (0.49 mm, 0.37 mm), and a full field point having coordinates (0.704 mm, 0.528 mm). Plot 1440 corresponds to Z-VGA_LL_AF imaging system 1380 (1) having a tele configuration. Plot 1442 corresponds to Z_VGA_LL_AF imaging system 1380(2), having a wide configuration. Plot 1460 corresponds to Z_VGA_LL_AF imaging system 1380(3), having a middle configuration.

Figure 65A:
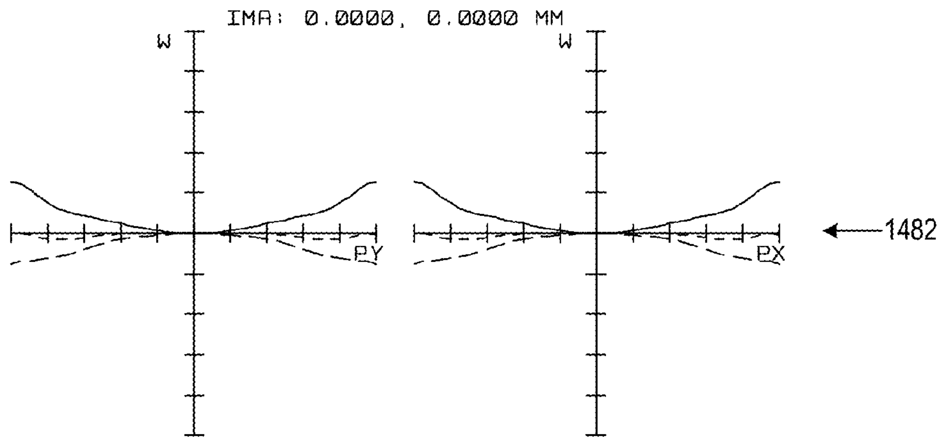
FIGS. 65A-65C, 66A-66C and 67A-67C show plots of optical path differences for three configurations of the imaging system of FIGS. 61A, 61B and 62.
Figure 65B:
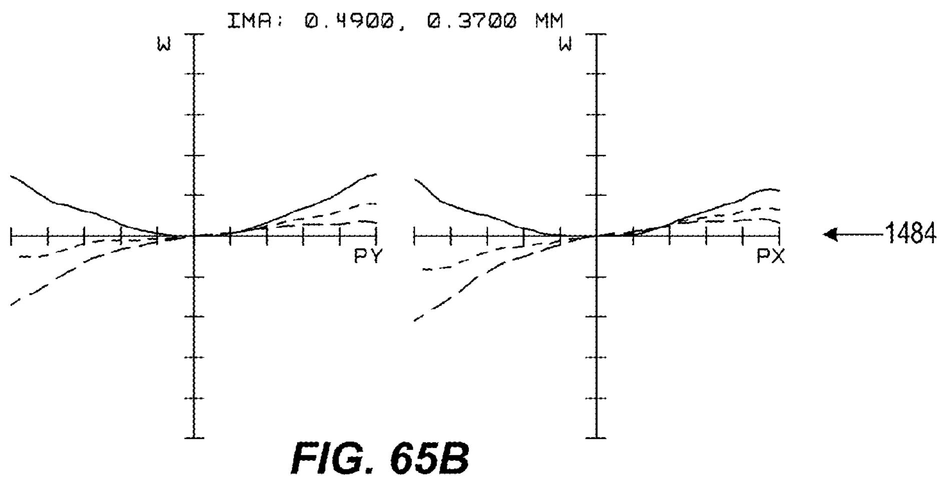
Figure 65C:
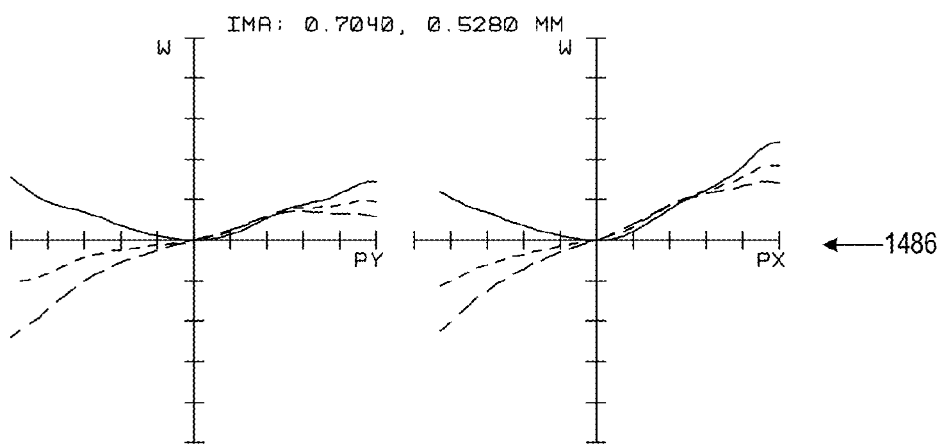
Figure 66A:
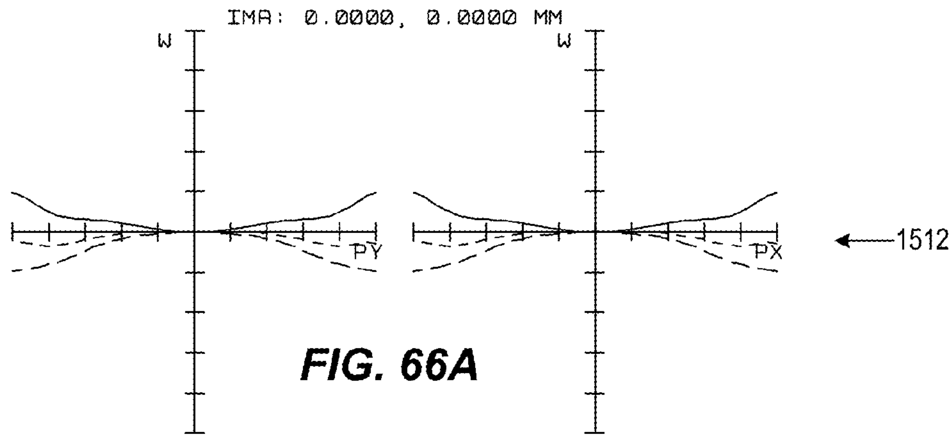
Figure 66B:
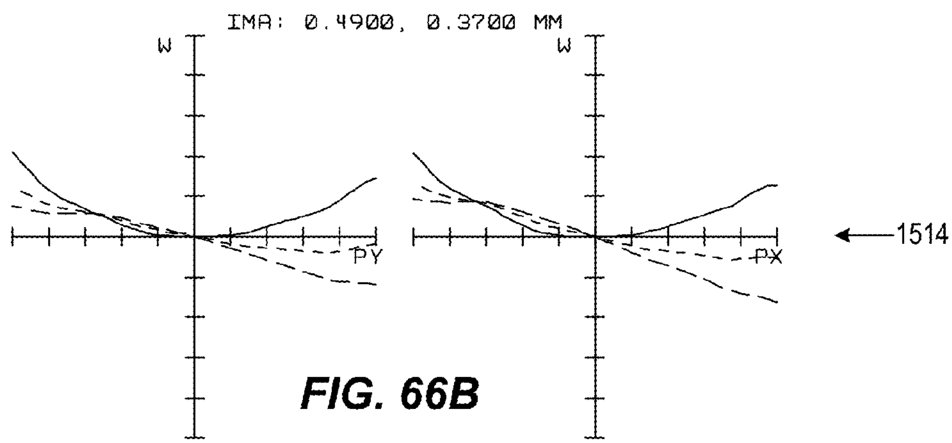
Figure 66C:
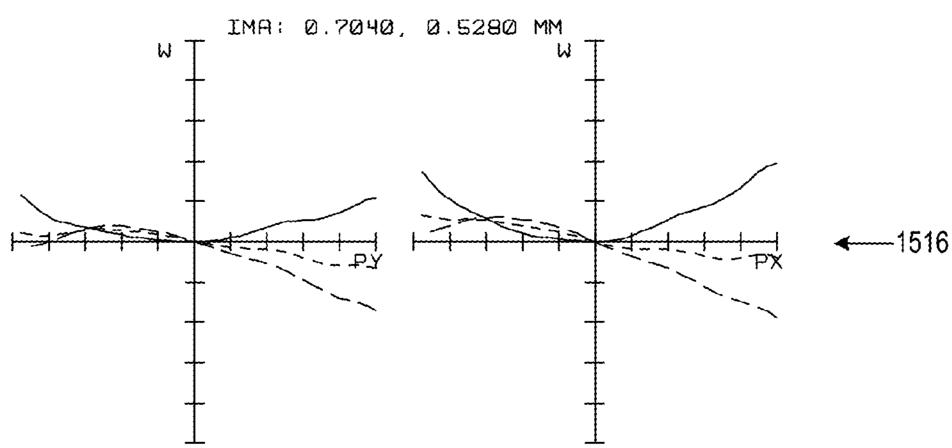
Figure 67A:
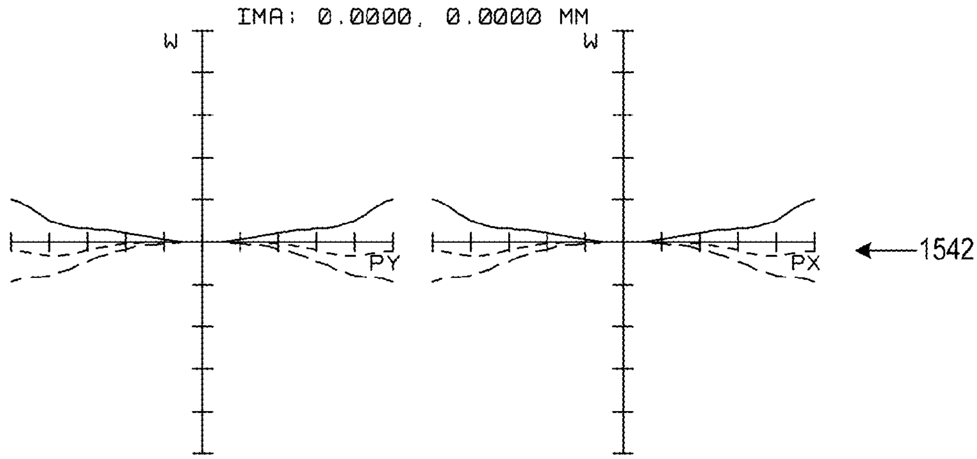
Figure 67B:
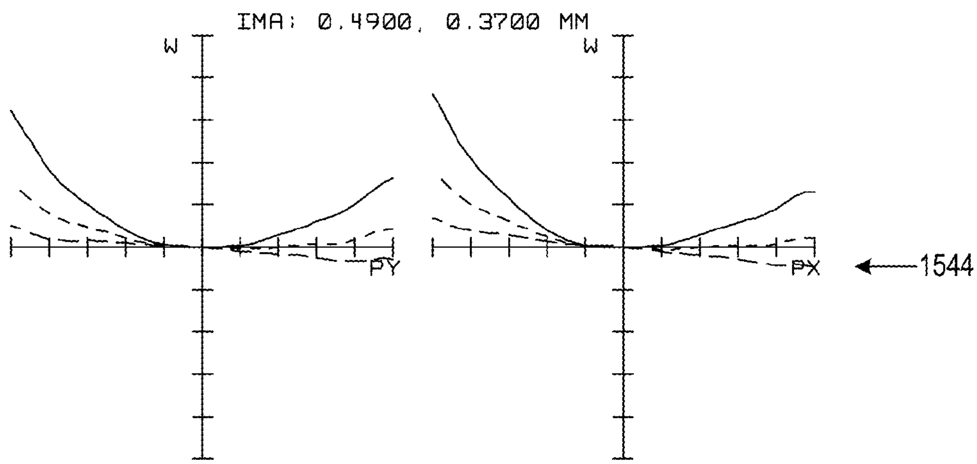
Figure 67C:
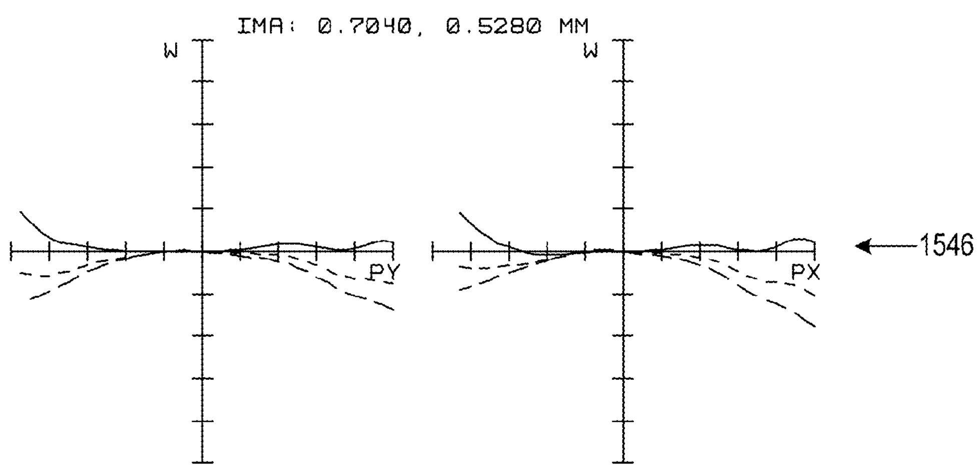

FIGS. 65A, 65B and 65C show pairs of plots 1482, 1484 and 1486 and FIGS. 66A, 66B and 66C show pairs of plots 1512, 1514 and 1516 and FIGS. 67A, 67B and 67C show pairs of plots 1542, 1544 and 1546, respectively, of the optical path differences of Z_VGA_LL_AF imaging system 1380, each at infinite object conjugate. Plots 1482, 1484 and 1486 are for Z_VGA_LL_AF imaging system 1380(1) having a tele configuration. Plots 1512, 1514 and 1516 are for Z_VGA_LL_AF imaging system 1380(2) having a wide configuration. Plots 1542, 1544 and 1546 are for Z_VGA_LL_AF imaging system 1380(3) having a middle configuration. The maximum scale for all plots is +/−five waves. The solid lines correspond to electromagnetic energy having a wavelength of 470 nm; the short dashed lines correspond to electromagnetic energy having a wavelength of 550 nm; and the long dashed lines correspond to electromagnetic energy having a wavelength of 650 nm.

Each pair of plots in FIGS. 65-67 represents optical path differences at a different real height on the diagonal of detector 112. Plots 1482, 1512, and 1542 correspond to an on-axis field point having coordinates (0 mm, 0 mm); plots 1484, 1514, and 1544 correspond to a 0.7 field point having coordinates (0.49 mm, 0.37 mm); and plots 1486, 1516, and 1546 correspond to a full field point having coordinates (0.704 mm, 0.528 mm). The left plot of each pair of plots is a plot of wavefront error for the tangential set of rays, and the right plot is a plot of wavefront error for sagittal set of rays.

Figure 68A:
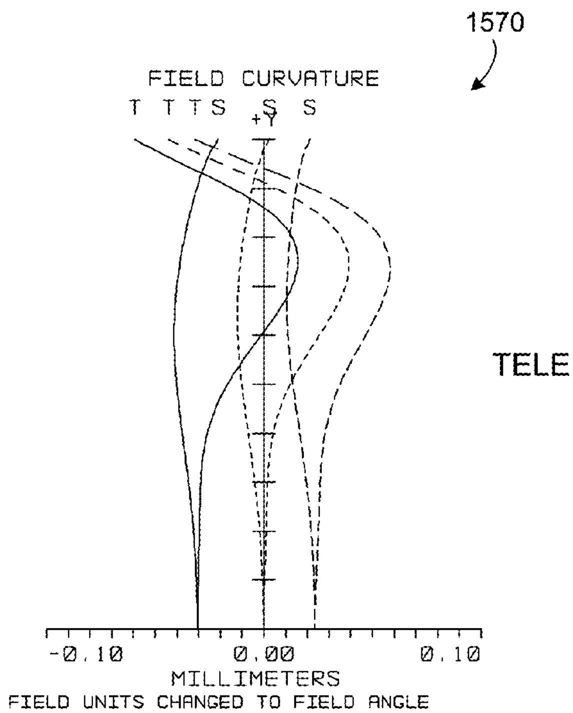
FIGS. 68A-68D and 69A and 69B show plots of distortion and plots of field curvature for three configurations of the imaging system of FIGS. 61A, 61B and 62.
Figure 68B:
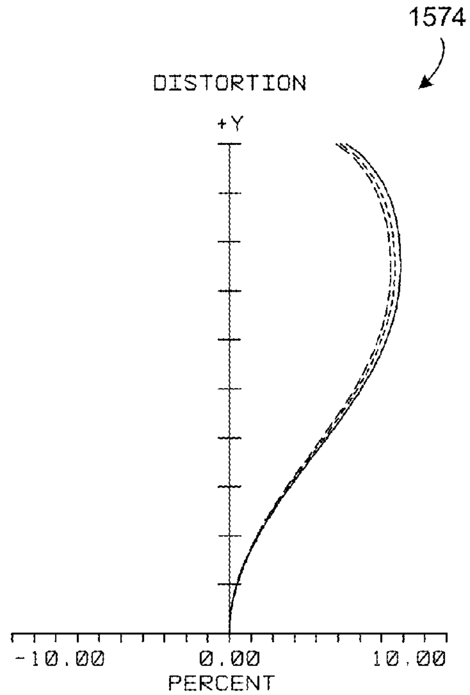
Figure 68C:
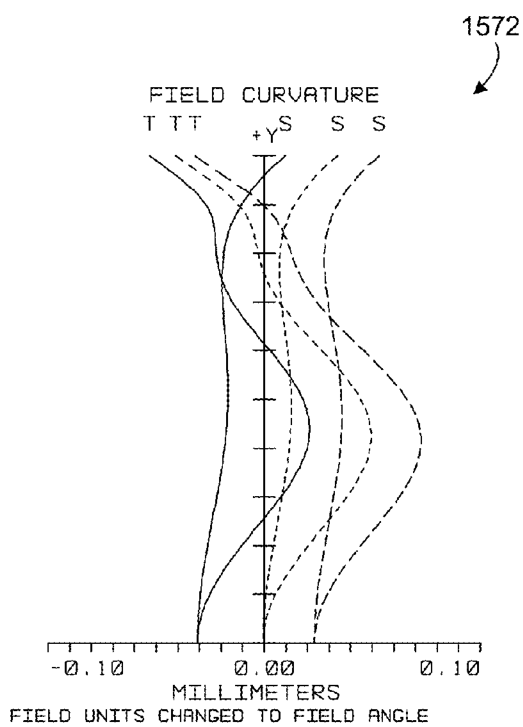
Figure 68D:
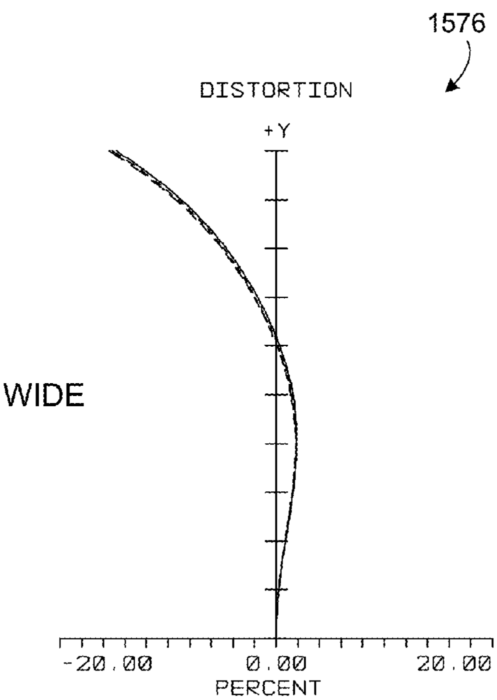
Figure 69A:
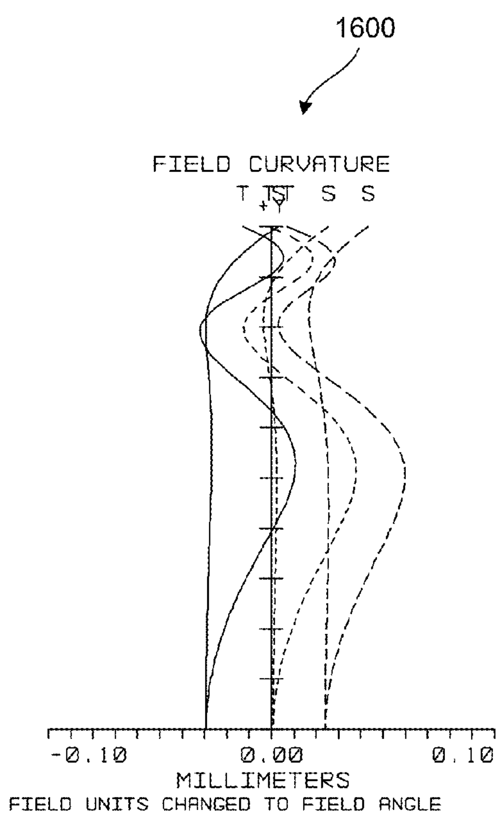
Figure 69B:
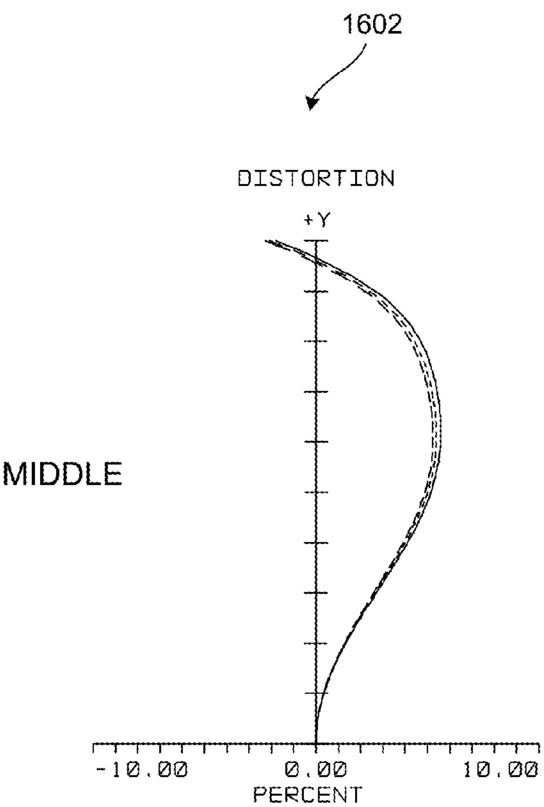

FIGS. 68A and 68C show plots 1570 and 1572 and FIG. 69A shows plot 1600 of field curvature of Z_VGA_LL_AF imaging system 1380; FIGS. 68B and 68D show plots 1574 and 1576 and FIG. 69B shows plot 1602 of distortion of Z_VGA_LL_AF imaging system 1380. Plots 1570 and 1574 correspond to Z_VGA_LL_AF imaging system 1380(1) having a tele configuration; plots 1572 and 1576 correspond to Z_VGA_LL_AF imaging system 1380(2) having a wide configuration; plots 1600 and 1602 correspond to Z_VGA_LL_AF imaging system 1380(3) having a middle configuration. The maximum half-field angle is 14.148° for the tele configuration, 31.844° for the wide-angle configuration, and 20.311° for the middle configuration. The solid lines correspond to electromagnetic energy having a wavelength of 470 nm; the short dashed lines correspond to electromagnetic energy having a wavelength of 550 nm; and the long dashed lines correspond to electromagnetic energy having a wavelength of 650 nm.

Figure 70A:
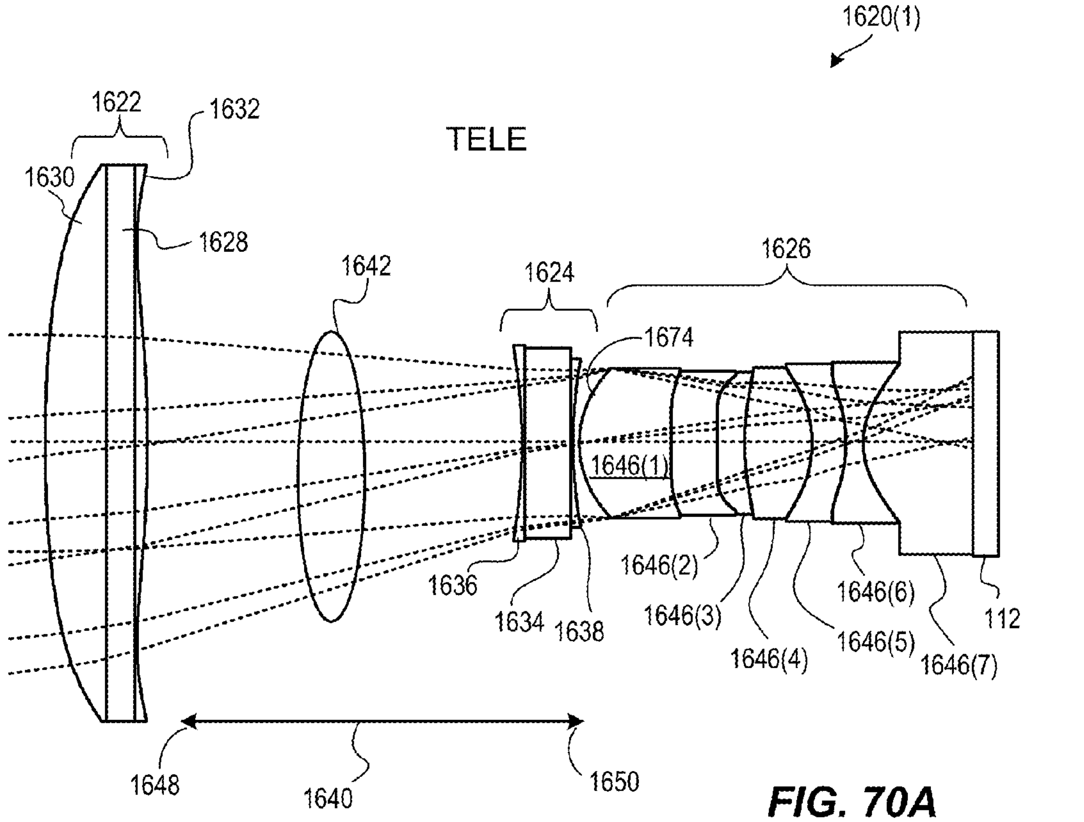
FIGS. 70A, 70B and 71 show optical layouts and raytraces of three configurations of a zoom imaging system, according to an embodiment.
Figure 70B:
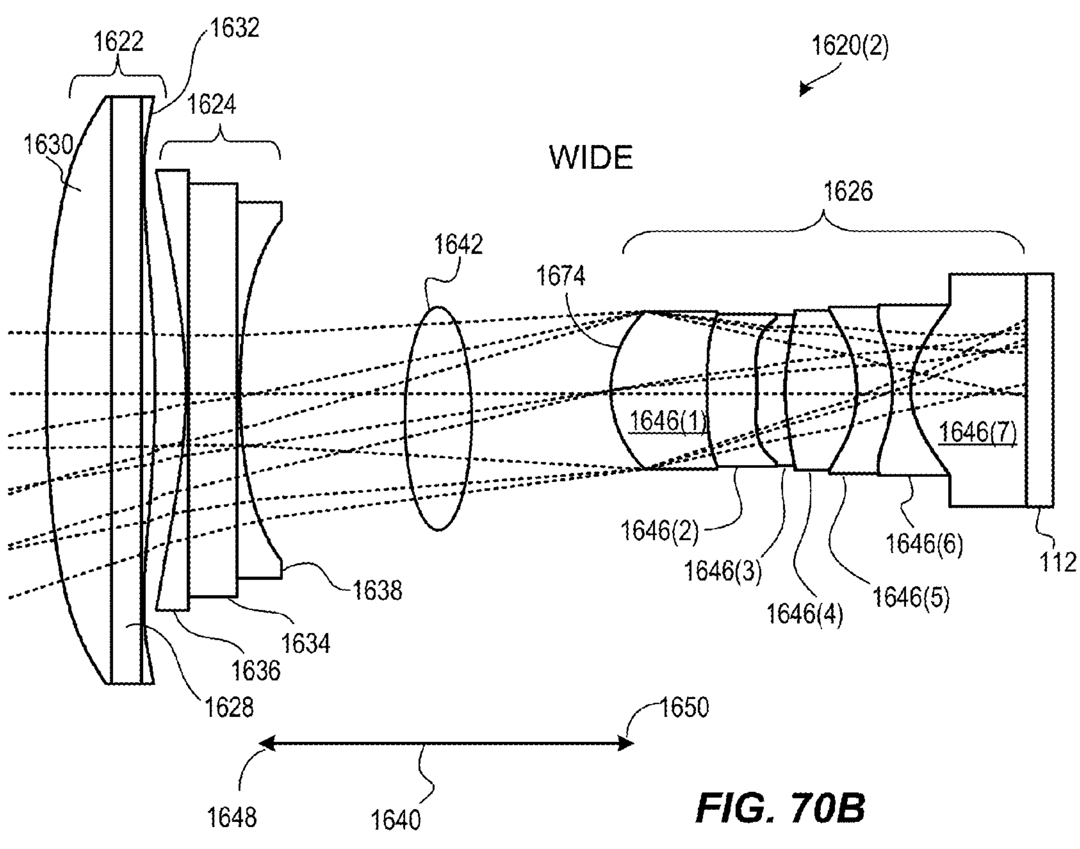
Figure 71:
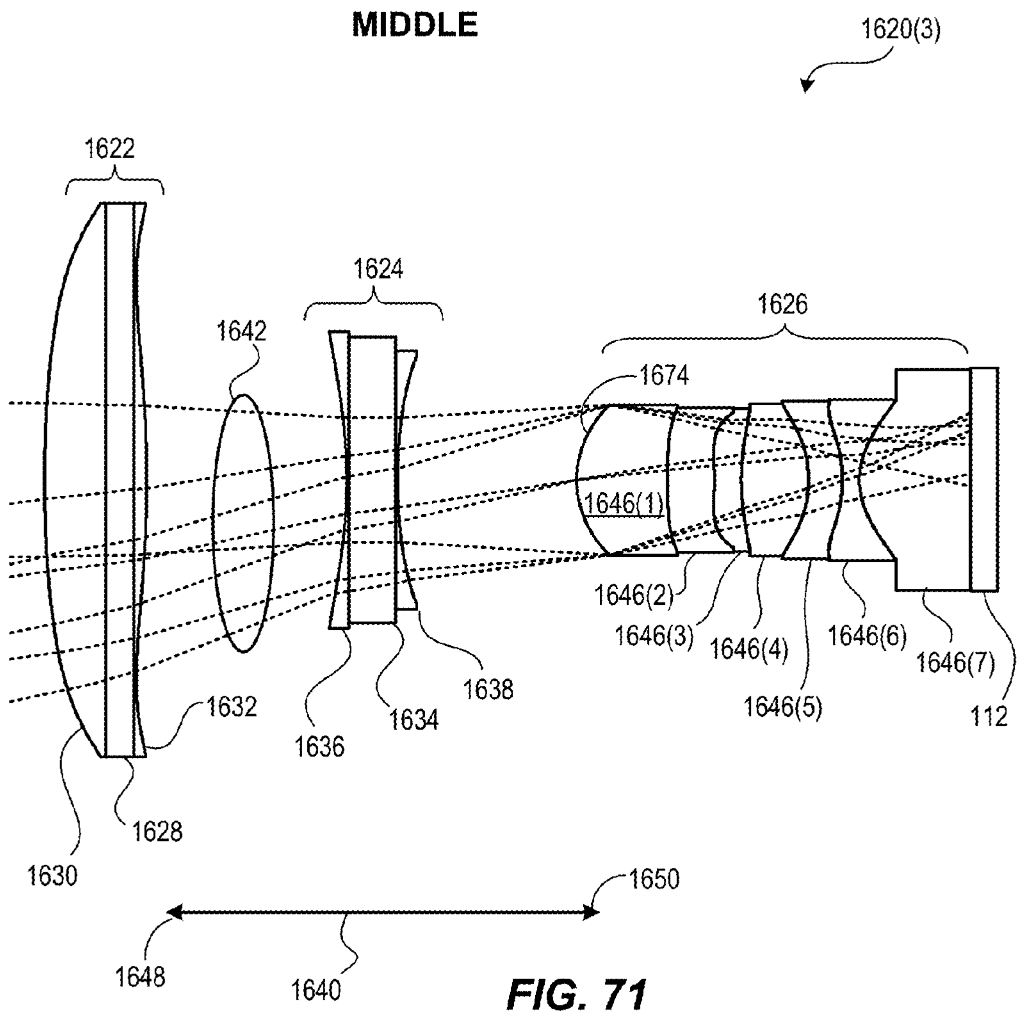

FIGS. 70A, 70B and 71 show optical layouts and raytraces of three configurations of a Z_VGA_LL_WFC imaging system 1620, which is an embodiment of imaging system 10 of FIG. 2A. Z_VGA_LL_WFC imaging system 1620 is a three group, zoom imaging system that has a continuously variable zoom ratio up to a maximum ratio of 1.96. Generally, in order to have a continuous zooming, more than one optics group in the zoom imaging system has to move. In this case, continuous zooming is achieved by moving only a second optics group 1624, and using a phase modifying element to extend the depth of focus of Z_VGA_LL_WFC imaging system 1620. One zoom configuration, which may be referred to as the tele configuration, is illustrated as Z_VGA_LL_WFC imaging system 1620(1). In the tele configuration, Z_VGA_LL_WFC imaging system 1620 has a relatively long focal length. Another zoom configuration, which may be referred to as the wide configuration, is illustrated as Z_VGA_LL_WFC imaging system 1620(2). In the wide configuration, Z_VGA_LL_WFC imaging system 1620 has a relatively wide field of view. Yet another zoom configuration, which may be referred to as the middle configuration, is illustrated as Z_VGA_LL_WFC imaging system 1620(3). The middle configuration has a focal length and field of view in between those of the tele configuration and the wide configuration.

Imaging system 1620(1) has a focal length of 3.37 millimeters, a field of view of 28°, F/# of 1.7, a total track length of 8.3 mm, and a maximum chief ray angle of 22°. Imaging system 1620(2) has a focal length of 1.72 millimeters, a field of view of 60°, F/# of 1.7, a total track length of 8.3 mm, and a maximum chief ray angle of 22°.

Z_VGA_LL_WFC imaging system 1620 includes a first optics group 1622 having an element 1628. Positive optical element 1630 is formed on one side of element 1628, and an optical element 1632 is formed on the other side of element 1628. Element 1628 is for example a glass plate. The position of first optics group 1622 in the Z_VGA_LL_WFC imaging system 1620 is fixed.

Z_VGA_LL_WFC imaging system 1620 includes second optics group 1624 having an element 1634. A negative optical element 1636 is formed on one side of element 1634, and a negative optical element 1638 is formed on an opposite side of element 1634. Element 1634 is for example a glass plate. Second optics group 1624 is continuously translatable along an axis indicated by line 1640 between ends 1648 and 1650. If second optics group 1624 is positioned at end 1650 of line 1640, which is shown in imaging system 1620(1), Z_VGA_LL_WFC imaging system 1620 has a tele configuration. If optics group 1624 is positioned at end 1648 of line 1640, which is shown in imaging system 1620(2), Z_VGA_LL_WFC imaging system 1620 has a wide configuration. If optics group 1624 is positioned in the middle of line 1640, which is shown in imaging system 1620(3), Z_VGA_LL_WFC imaging system 1620 has a middle configuration.

Z_VGA_LL_WFC imaging system 1620 includes a third optics group 1626 formed on VGA format detector 112. A layered optical element 1646(7) is formed on detector 112; a layered optical element 1646(6) is formed on layered optical element 1646(7); a layered optical element 1646(5) is formed on layered optical element 1646(6); a layered optical element 1646(4) is formed on layered optical element 1646(5); a layered optical element 1646(3) is formed on layered optical element 1646(4); a layered optical element 1646(2) is formed on layered optical element 1646(3); and a layered optical element 1646(1) is formed on layered optical element 1646(2). Layered optical elements 1646 are formed of two different materials, with adjacent layered optical elements 1646 being formed of different materials. Specifically, layered optical elements 1646(1), 1646(3), 1646(5), and 1646(7) are formed of a first material with a first refractive index, and layered optical elements 1646(2), 1646(4), and 1646(6) are formed of a second material with a second refractive index. A wavefront coded surface is formed on a first surface 1674 of layered optical element 1646(1).

The prescriptions for tele configuration, middle configuration and wide configuration are summarized in TABLES 31-36. The sag for each optical element of all three configurations is given by Eq. (2). The phase function implemented by the phase modifying element is the oct form, whose parameters are given by Eq. (3) and illustrated in FIG. 18, where radius, thickness and diameter are given in units of millimeters.

Tele:

TABLE 31

| Surface | Radius | Thickness | Refractive index | Abbe# | Diameter | Conic |
|---|---|---|---|---|---|---|
| OBJECT | Infinity | Infinity | air | | Infinity | 0 |
| 2 | 11.5383 | 0.52953 | 1.481 | 60.131 | 4.76 | 0 |
| 3 | Infinity | 0.24435 | 1.525 | 62.558 | 4.76 | 0 |
| 4 | Infinity | 0.10669 | 1.481 | 60.131 | 4.76 | 0 |
| 5 | −9.858 | 3.216 | air | | 4.76 | 0 |
| 6 | −4.2642 | 0.02 | 1.481 | 60.131 | 1.67671 | 0 |
| 7 | Infinity | 0.4 | 1.525 | 62.558 | 1.63284 | 0 |
| 8 | Infinity | 0.02 | 1.481 | 60.131 | 1.45339 | 0 |
| 9 | 4.29918 | 0.051 | air | | 1.41536 | 0 |
| STOP | 0.82831 | 0.78696 | 1.370 | 92.000 | 1.28204 | 0 |
| 11 | −22.058 | 0.4 | 1.620 | 32.000 | 1.23414 | 0 |
| 12 | 0.68700 | 0.23208 | 1.370 | 92.000 | 1.15930 | 0 |
| 13 | 3.14491 | 0.57974 | 1.620 | 32.000 | 1.21734 | 0 |
| 14 | −1.1075 | 0.29105 | 1.370 | 92.000 | 1.29760 | 0 |
| 15 | −1.3847 | 0.14803 | 1.620 | 32.000 | 1.34751 | 0 |
| 16 | 2.09489 | 0.96631 | 1.370 | 92.000 | 1.37795 | 0 |
| IMAGE | Infinity | 0 | 1.458 | 67.821 | 1.90899 | 0 |

Middle:

TABLE 32

| Surface | Radius | Thickness | Refractive index | Abbe# | Diameter | Conic |
|---|---|---|---|---|---|---|
| OBJECT | Infinity | Infinity | air | | Infinity | 0 |
| 2 | 11.5383 | 0.52953 | 1.481 | 60.131 | 4.76 | 0 |
| 3 | Infinity | 0.24435 | 1.525 | 62.558 | 4.76 | 0 |
| 4 | Infinity | 0.10669 | 1.481 | 60.131 | 4.76 | 0 |
| 5 | −9.858 | 1.724 | air | | 4.76 | 0 |
| 6 | −4.2642 | 0.02 | 1.481 | 60.131 | 2.55576 | 0 |
| 7 | Infinity | 0.4 | 1.525 | 62.558 | 2.45598 | 0 |
| 8 | Infinity | 0.02 | 1.481 | 60.131 | 2.22971 | 0 |
| 9 | 4.29918 | 3.015 | air | | 2.12385 | 0 |
| STOP | 0.82831 | 0.78696 | 1.370 | 92.000 | 1.2997 | 0 |
| 11 | −22.058 | 0.4 | 1.620 | 32.000 | 1.24488 | 0 |
| 12 | 0.687 | 0.23208 | 1.370 | 92.000 | 1.16685 | 0 |
| 13. | 3.14491 | 0.57974 | 1.620 | 32.000 | 1.22431 | 0 |
| 14 | −1.1075 | 0.29105 | 1.370 | 92.000 | 1.30413 | 0 |
| 15 | −1.3847 | 0.14803 | 1.620 | 32.000 | 1.35771 | 0 |
| 16 | 2.09489 | 0.96631 | 1.370 | 92.000 | 1.39178 | 0 |
| IMAGE | Infinity | 0 | 1.458 | 67.821 | 1.89533 | 0 |

Wide:

TABLE 33

| Surface | Radius | Thickness | Refractive index | Abbe# | Diameter | Conic |
|---|---|---|---|---|---|---|
| OBJECT | Infinity | Infinity | air | | Infinity | 0 |
| 2 | 11.5383 | 0.52953 | 1.481 | 60.131 | 4.76 | 0 |
| 3 | Infinity | 0.24435 | 1.525 | 62.558 | 4.7 | 0 |
| 4 | Infinity | 0.10669 | 1.481 | 60.131 | 4.7 | 0 |
| 5 | −9.858 | 1.724 | air | | 4.7 | 0 |
| 6 | −4.2642 | 0.02 | 1.481 | 60.131 | 3.57065 | 0 |
| 7 | Infinity | 0.4 | 1.525 | 62.558 | 3.36 | 0 |
| 8 | Infinity | 0.02 | 1.481 | 60.131 | 3.04903 | 0 |
| 9 | 4.29918 | 1.543 | air | | 2.76124 | 0 |
| STOP | 0.82831 | 0.78696 | 1.370 | 92.000 | 1.28128 | 0 |
| 11 | −22.058 | 0.4 | 1.620 | 32.000 | 1.23435 | 0 |
| 12 | 0.687 | 0.23208 | 1.370 | 92.000 | 1.16015 | 0 |
| 13 | 3.14491 | 0.57974 | 1.620 | 32.000 | 1.21875 | 0 |
| 14 | −1.1075 | 0.29105 | 1.370 | 92.000 | 1.29792 | 0 |
| 15 | −1.3847 | 0.14803 | 1.620 | 32.000 | 1.34937 | 0 |
| 16 | 2.09489 | 0.96631 | 1.370 | 92.000 | 1.38344 | 0 |
| IMAGE | Infinity | 0 | 1.458 | 67.821 | 1.89055 | 0 |

The aspheric coefficients and the surface prescription for the oct form are identical for tele, middle and wide configurations, and are summarized in TABLES 34-36.

TABLE 34

| $A_2$ | $A_4$ | $A_6$ | $A_8$ | $A_{10}$ | $A_{12}$ | $A_{14}$ | $A_{16}$ |
|---|---|---|---|---|---|---|---|
| 0 | 0 | 0 | 0 | 0 | 0 | 0 | 0 |
| 0 | $6.371 \times 10^{-3}$ | $-2.286 \times 10^{-3}$ | $8.304 \times 10^{-4}$ | $-7.019 \times 10^{-5}$ | 0 | 0 | 0 |
| 0 | 0 | 0 | 0 | 0 | 0 | 0 | 0 |
| 0 | 0 | 0 | 0 | 0 | 0 | 0 | 0 |
| 0 | $4.805 \times 10^{-3}$ | $-3.665 \times 10^{-4}$ | $5.697 \times 10^{-4}$ | $-6.715 \times 10^{-5}$ | 0 | 0 | 0 |
| 0 | 0.01626 | $1.943 \times 10^{-3}$ | $-1.137 \times 10^{-3}$ | $1.220 \times 10^{-4}$ | 0 | 0 | 0 |
| 0 | 0 | 0 | 0 | 0 | 0 | 0 | 0 |
| 0 | 0 | 0 | 0 | 0 | 0 | 0 | 0 |
| 0 | $3.980 \times 10^{-3}$ | 0.0242 | $-9.816 \times 10^{-3}$ | $2.263 \times 10^{-3}$ | 0 | 0 | 0 |
| −0.001508 | −0.1091 | −0.3253 | 1.115 | −1.484 | 0 | 0 | 0 |
| 0 | 0.9101 | −1.604 | 5.812 | −9.733 | 0 | 0 | 0 |
| −0.9113 | 1.664 | −5.057 | 22.32 | −30.98 | 0 | 0 | 0 |
| 0.1087 | 0.04032 | −2.750 | 9.654 | −10.45 | 0 | 0 | 0 |
| 0 | −0.4609 | −0.3817 | 6.283 | −7.484 | 0 | 0 | 0 |
| 0 | −0.8859 | 4.156 | −3.681 | 0.6750 | 0 | 0 | 0 |
| 0.5526 | −0.1522 | −0.5744 | 1.249 | −1.266 | 0 | 0 | 0 |

TABLE 35

| Surface# | Amp | C | N | RO | NR |
|---|---|---|---|---|---|
| 10(Stop) | $1.0672 \times 10^{-3}$ | −225.79 | 11.343 | 0.50785 | 0.65 |

TABLE 36

| | | | | | | | | | |
|---|---|---|---|---|---|---|---|---|---|
| α | −1.0949 | 6.2998 | 5.8800 | −14.746 | −21.671 | −20.584 | −11.127 | 37.153 | 199.50 |
| β | 1 | 2 | 3 | 4 | 5 | 6 | 7 | 8 | 9 |

Z_VGA_LL_WFC imaging system 1620 includes a phase modifying element for implementing a predetermined phase modification. In FIGS. 70A and 70B, a first surface 1674 of optical element 1646(1) is configured as a phase modifying element; however, any one optical element or a combination of optical elements of Z_VGA_LL_WFC imaging system 1620 may serve as a phase modifying element to implement a predetermined phase modification. Use of predetermined phase modification allows Z_VGA_LL_WFC imaging system 1620 to support continuously variable zoom ratios because the predetermined phase modification extends the depth of focus of Z_VGA_LL_WFC imaging system 1620. Rays 1642 represent electromagnetic energy being imaged by the Z_VGA_LL_WFC imaging system 1620 from infinity.

Figure 72A:
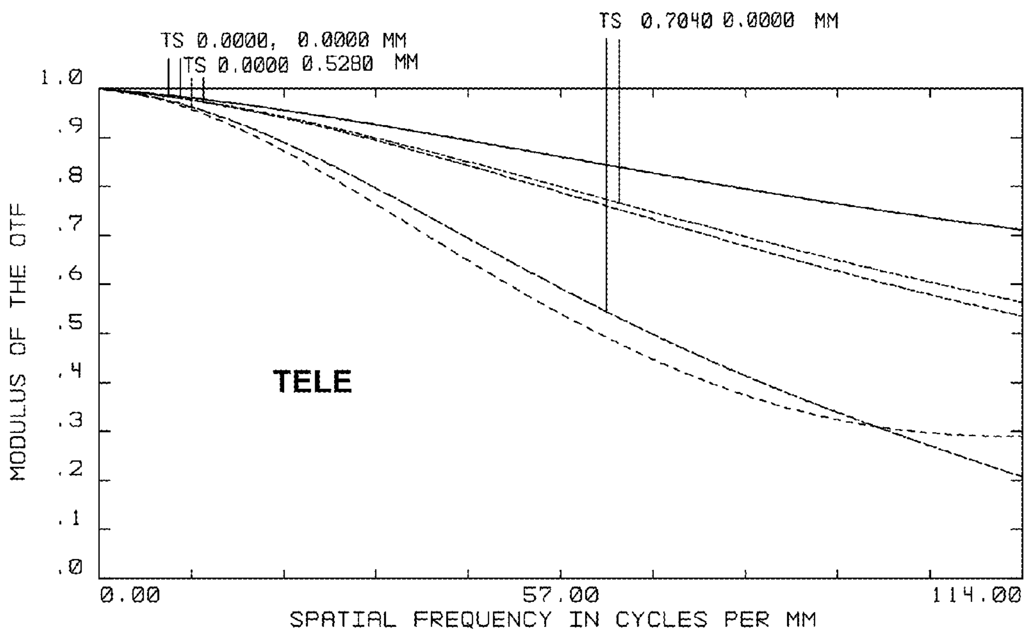
FIGS. 72A, 72B and 73 show plots of the modulation transfer functions as a function of spatial frequency for three configurations of the imaging system of FIGS. 70A, 70B and 71, without predetermined phase modification.
Figure 72B:
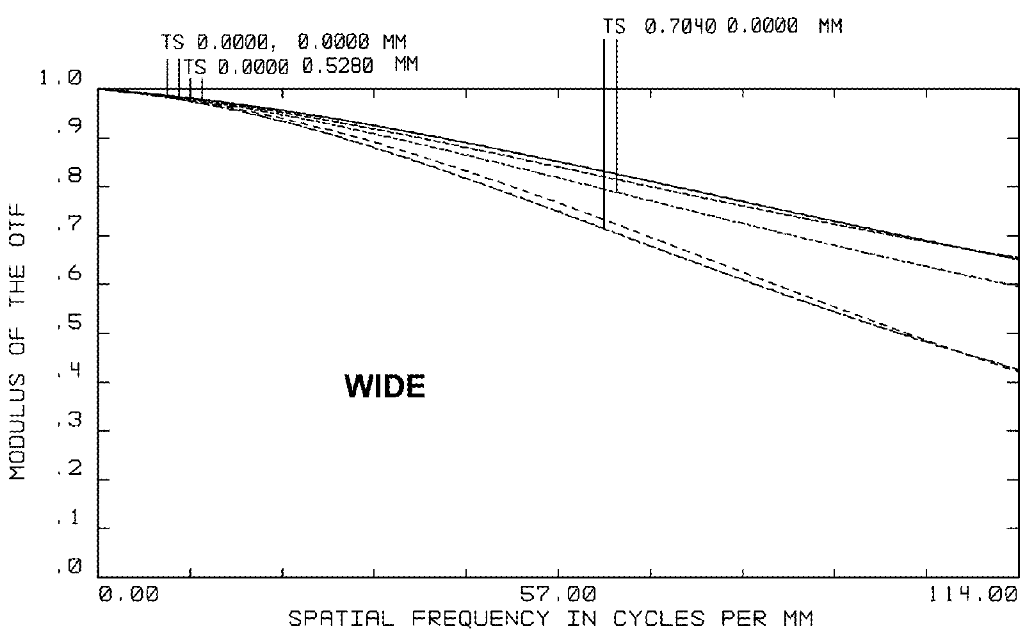
Figure 73:
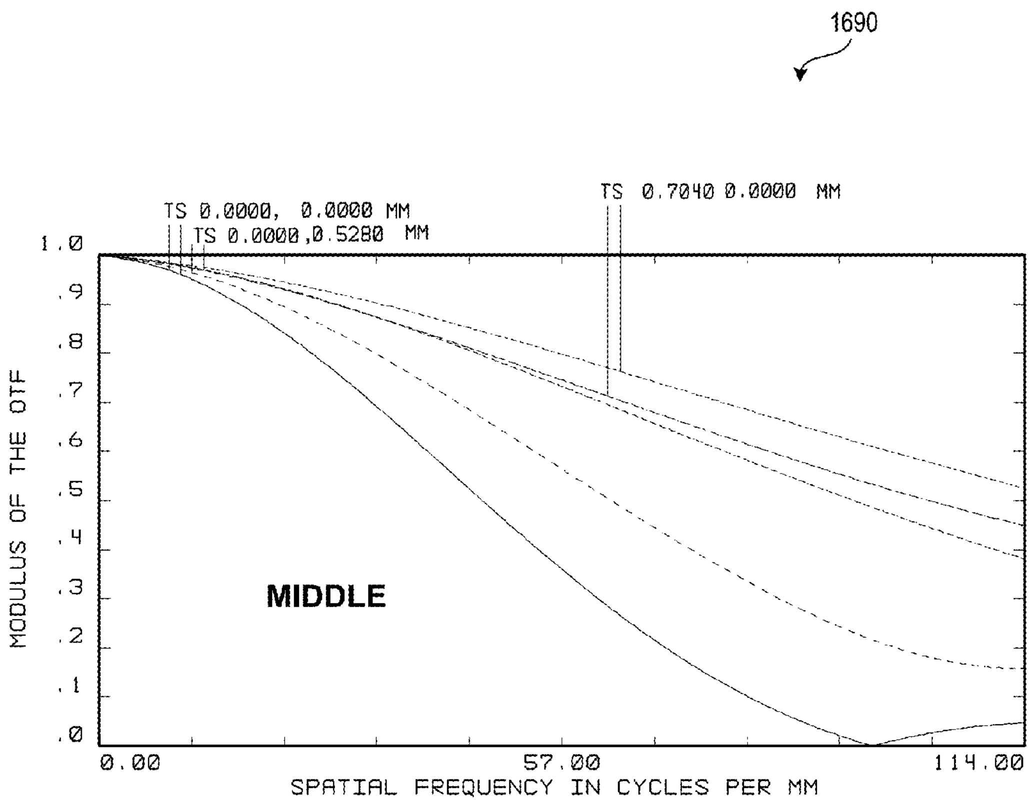

Performance of Z_VGA_LL_WFC imaging system 1620 may be appreciated by comparing its performance to that of Z_VGA_LL imaging system 1220 of FIG. 56 because the two imaging systems are similar; a difference between Z_VGA_LL_WFC imaging system 1620 and Z_VGA_LL imaging system 1220 is that Z_VGA_LL_WFC imaging system 1620 includes a predetermined phase modification while Z_VGA_LL imaging system 1220 does not. FIGS. 72A and 72B show plots 1670 and 1672 and FIG. 73 shows plot 1690 of the MTFs as a function of spatial frequency of Z_VGA_LL imaging system 1220 at infinite conjugate object distance. The MTFs are averaged over wavelengths from 470 to 650 nm. Each plot includes MTF curves for three distinct field points associated with real image heights on a diagonal axis of detector 112; the three field points are an on-axis field point having coordinates (0 mm, 0 mm), a full field point in y having coordinates (0 mm, 0.528 mm), and a full field point in x having coordinates (0.704 mm, 0 mm) In FIGS. 72A, 72B and 73, "T" refers to tangential field, and "S" refers to sagittal field. Plot 1670 corresponds to imaging system 1220(1), which represents Z_VGA_LL imaging system 1220 having a tele configuration. Plot 1672 corresponds to imaging system 1220(2), which represents Z_VGA_LL imaging system 1220 having a wide configuration. Plot 1690 corresponds to Z_VGA_LL imaging system 1220 having a middle configuration (this configuration of Z_VGA_LL imaging system 1220 is not shown). As can be observed by comparing plots 1670, 1672, and 1690, the performance of Z_VGA_LL imaging system 1220 varies as a function of zoom position. Further, Z_VGA_LL imaging system 1220 performs relatively poorly at the middle zoom configuration, as is indicated by the low magnitudes and zero values of the MTFs of plot 1690.

Figure 74A:
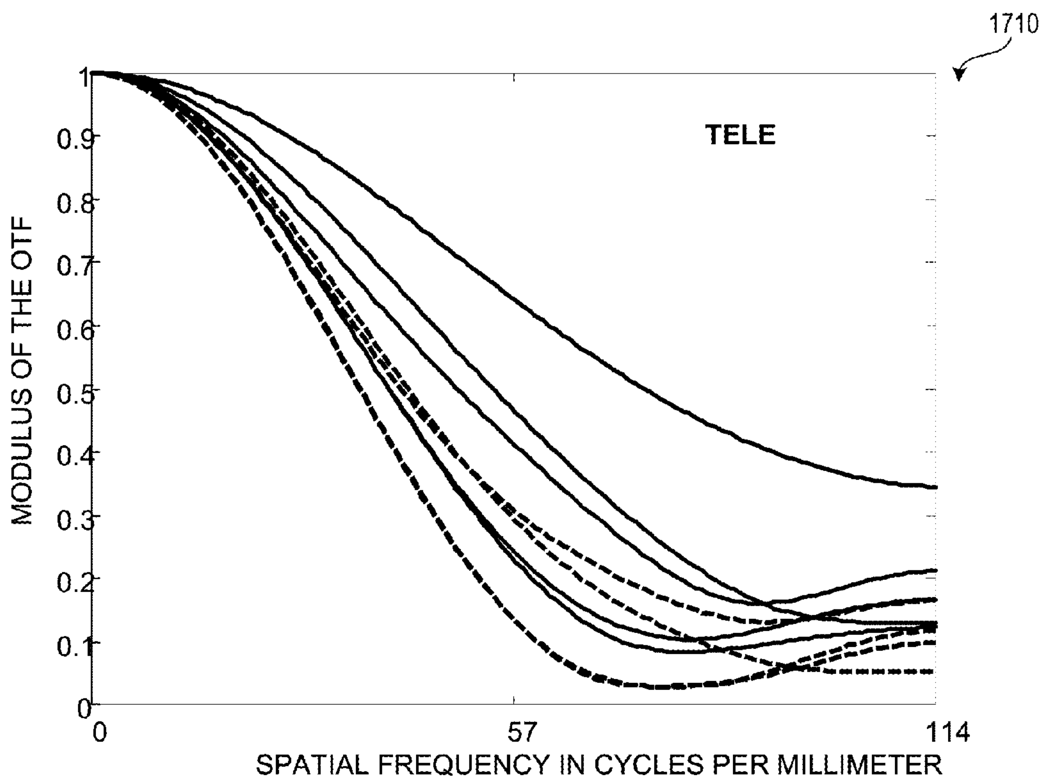
FIGS. 74A, 74B and 75 show plots of the modulation transfer functions as a function of spatial frequency for the imaging system of FIGS. 70A, 70B and 71, with predetermined phase modification, before and after processing.
Figure 74B:
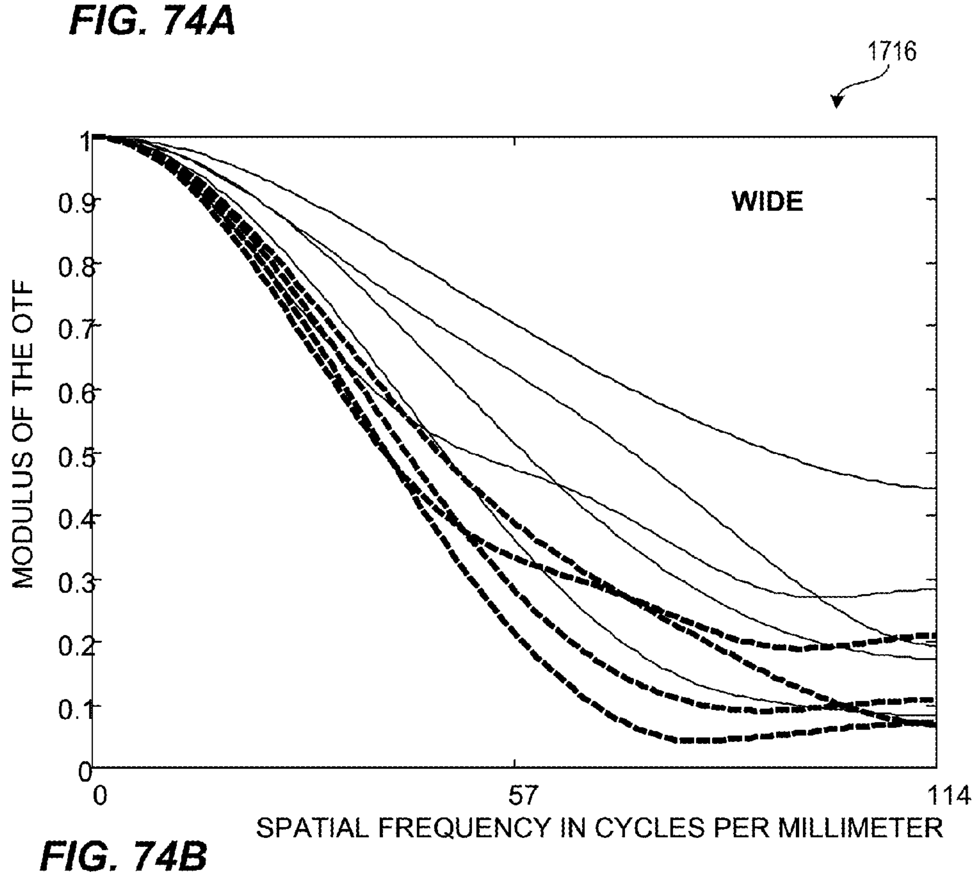
Figure 75:
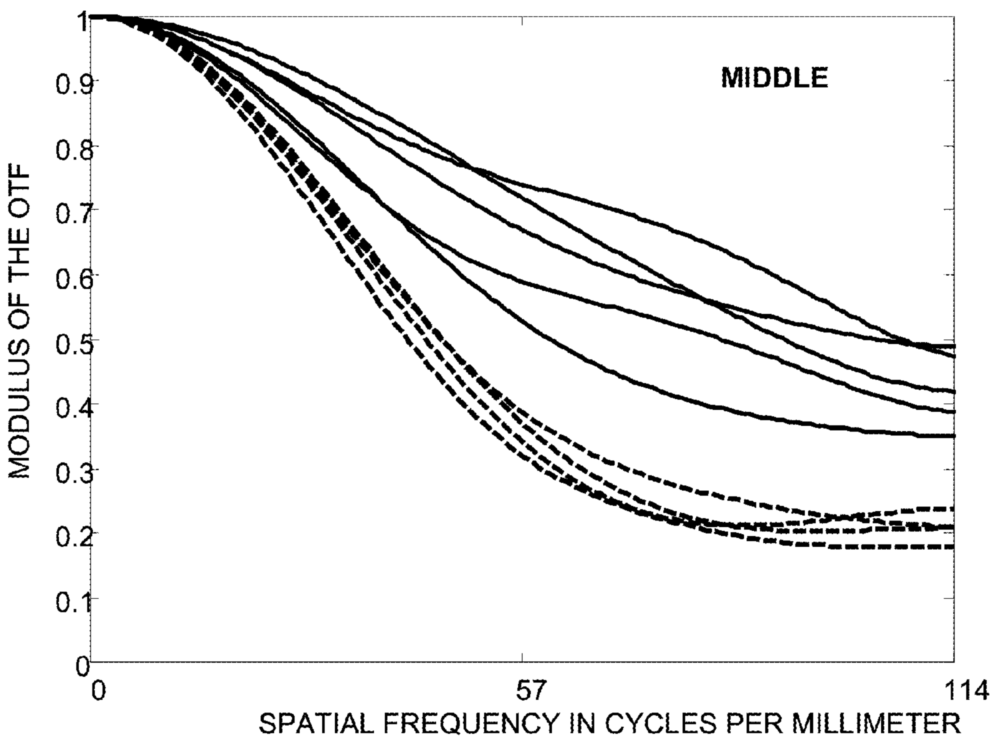

FIGS. 74A and 74B show plots 1710 and 1716 and FIG. 75 shows plot 1740, of the MTFs as a function of spatial frequency of Z_VGA_LL_WFC imaging system 1620, for infinite object conjugate. The MTFs are averaged over wavelengths from 470 to 650 nm Each plot includes MTF curves for three distinct field points associated with real image heights on a diagonal axis of detector 112; the three field points are an on-axis field point having coordinates (0 mm, 0 mm), a full field point in y having coordinates (0 mm, 0.528 mm), and a full field point in x having coordinates (0.704 mm, 0 mm). Plot 1710 corresponds to Z_VGA_LL_WFC imaging system 1620(1) having a tele configuration; plot 1716 corresponds to Z_VGA_LL_WFC imaging system 1620(2) having a wide configuration; and plot 1740 corresponds to Z_VGA_LL_WFC imaging system 1620(3) having a middle configuration.

Unfiltered curves indicated by dashed lines represent MTFs without post filtering of electronic data produced by Z_VGA_LL_WFC imaging system 1620. As may be observed from plots 1710, 1716, and 1740, the unfiltered MTF curves have a relatively small magnitude. However, the unfiltered MTF curves advantageously do not reach zero magnitude, which means that Z_VGA_LL_WFC imaging system 1620 preserves image information over the entire range of spatial frequencies of interest. Furthermore, the unfiltered MTF curves are similar to each other. Such similarity in MTF curves allows a single filter kernel to be used by a processor executing a decoding algorithm, as will be discussed next. For example, encoding introduced by a phase modifying element (e.g., formed on surface 1674 of optical element 1646(1)) may be processed by processor 46, FIG. 1B, executing a decoding algorithm such that Z_VGA_LL_WFC imaging system 1620 produces a clearer image than it would without such post-processing. Filtered MTF curves indicated by solid lines represent performance of Z_VGA_LL_WFC imaging system 1620 with such post processing. As may be observed from plots 1710, 1716, and 1740, Z_VGA_LL_WFC imaging system 1620 exhibits relatively consistent performance across zoom ratios with such post processing.

Figure 76A:
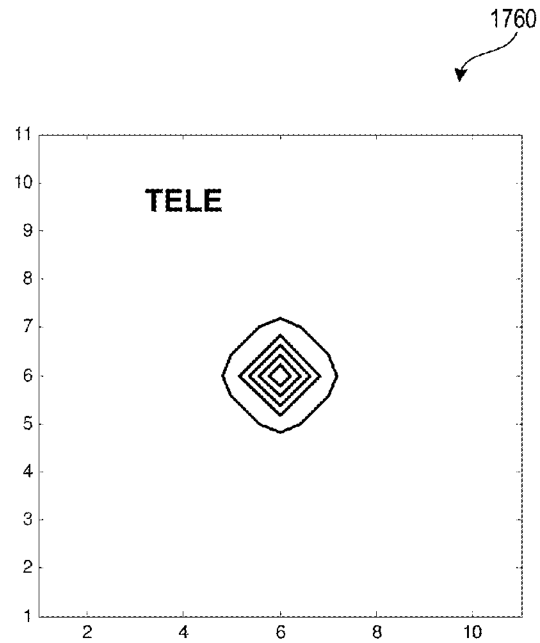
FIG. 76A-76C show plots of point spread functions for three configurations of the imaging system of FIGS. 70A, 70B and 71 before processing.
Figure 76B:
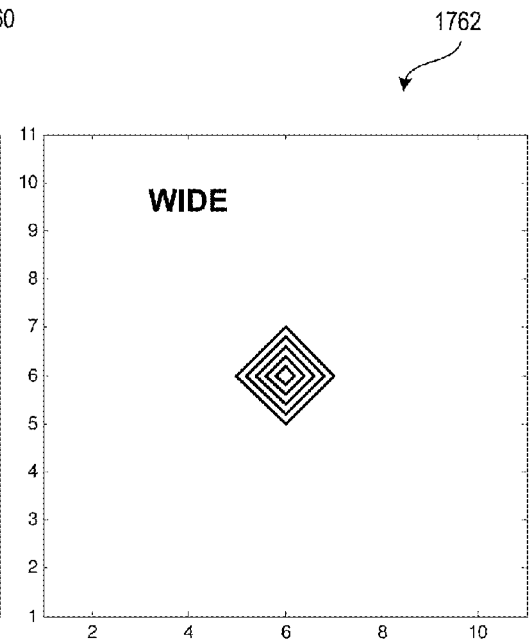
Figure 76C:
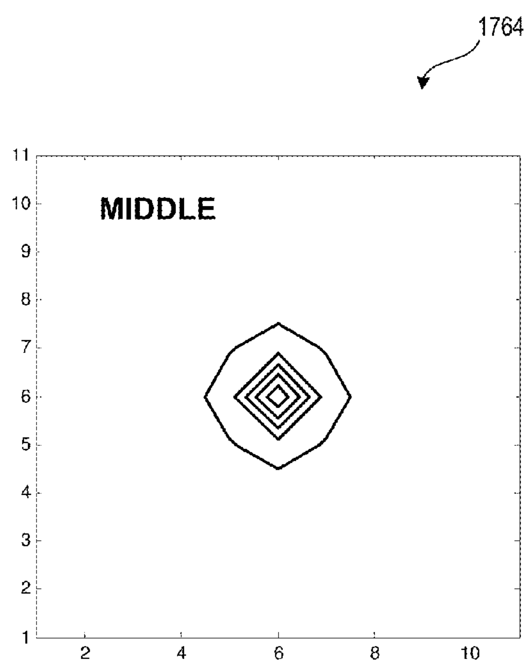

FIGS. 76A, 76B and 76C show plots 1760, 1762, and 1764 of on-axis PSFs of Z_VGA_LL_WFC imaging system 1620 before post processing by the processor executing the decoding algorithm. Plot 1760 corresponds to Z_VGA_LL_WFC imaging system 1620(1) having a tele configuration; plot 1762 corresponds to Z_VGA_LL_WFC imaging system 1620(2) having a wide configuration; and plot 1764 corresponds to Z_VGA_LL_WFC imaging system 1620(3) having a middle configuration. As can be observed from FIG. 76, the PSFs before post processing vary as a function of zoom configuration.

Figure 77A:
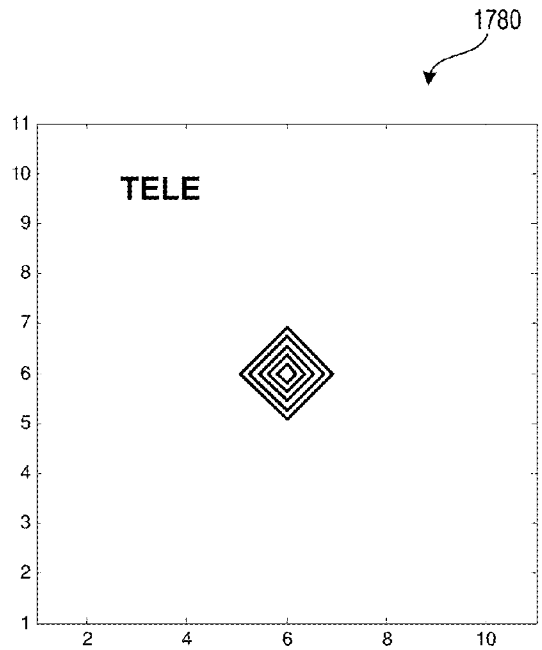
FIG. 77A-77C show plots of point spread functions for three configurations of the imaging system of FIGS. 70A, 70B and 71 after processing.
Figure 77B:
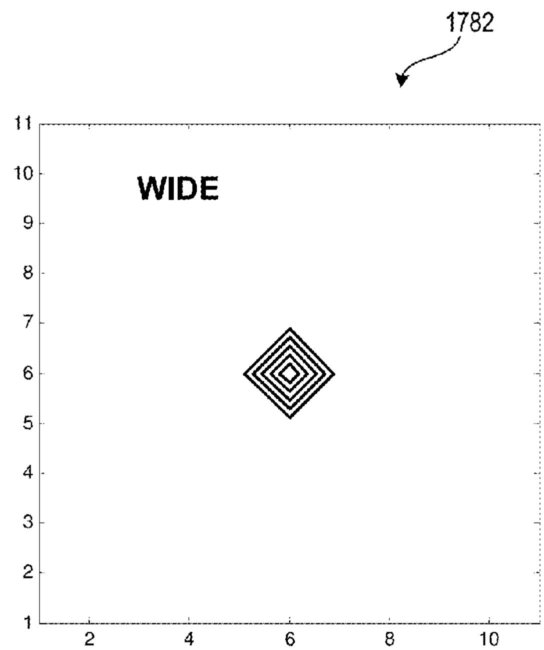
Figure 77C:
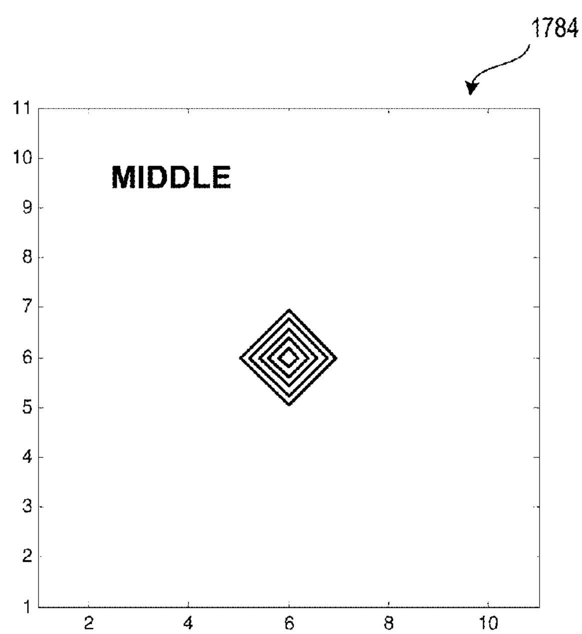

FIGS. 77A, 77B and 77C show plots 1780, 1782, and 1784 of on-axis PSFs of Z_VGA_LL_WFC imaging system 1620 after post processing by the processor executing the decoding algorithm. Plot 1780 corresponds to Z_VGA_LL_WFC imaging system 1620(1) having a tele configuration; plot 1782 corresponds to Z_VGA_LL_WFC imaging system 1620(2) having a wide configuration; and plot 1784 corresponds to the Z_VGA_LL_WFC imaging system 1620(3) having a middle configuration. As can be observed from FIG. 77, the PSFs after post processing are relatively independent of zoom configuration. Since the same filter kernel is used for processing, PSFs will differ slightly for different object conjugates.

Figure 78A:
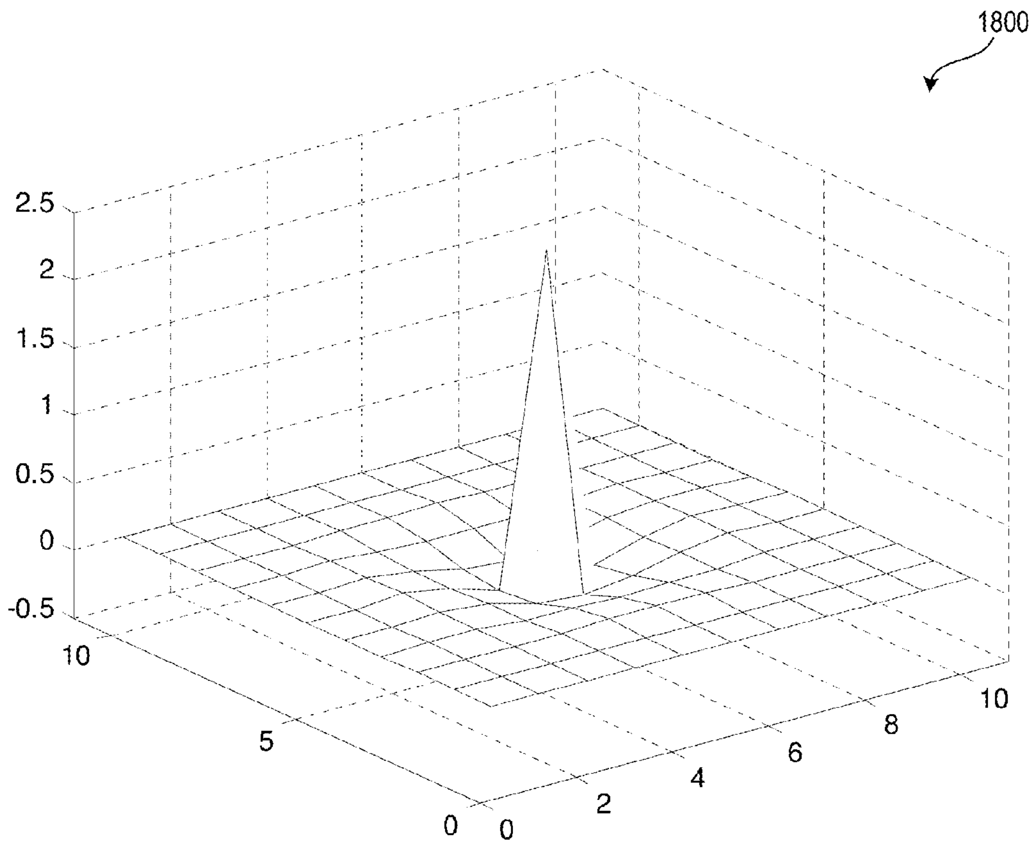
FIG. 78A shows 3D plot representations of a filter kernel that may be used with the imaging system of FIGS. 70A, 70B and 71, according to an embodiment.

FIG. 78A is a pictorial representation of a filter kernel and its values that may be used with the Z_VGA_LL_WFC imaging system 1620 in a decoding algorithm (e.g., a convolution) implemented by the processor. The filter kernel of FIG. 78A is for example used to generate the PSFs of the plots of FIGS. 77A, 77B and 77C or filtered MTF curves of FIGS. 74A, 74B and 75. Such filter kernel may be used by the processor to execute the decoding algorithm to process electronic data affected by the introduction of the wavefront coding element. Plot 1800 is a three dimensional plot of the filter kernel, and the filter coefficients are shown in a table 1802 in FIG. 78B.

Figure 79:
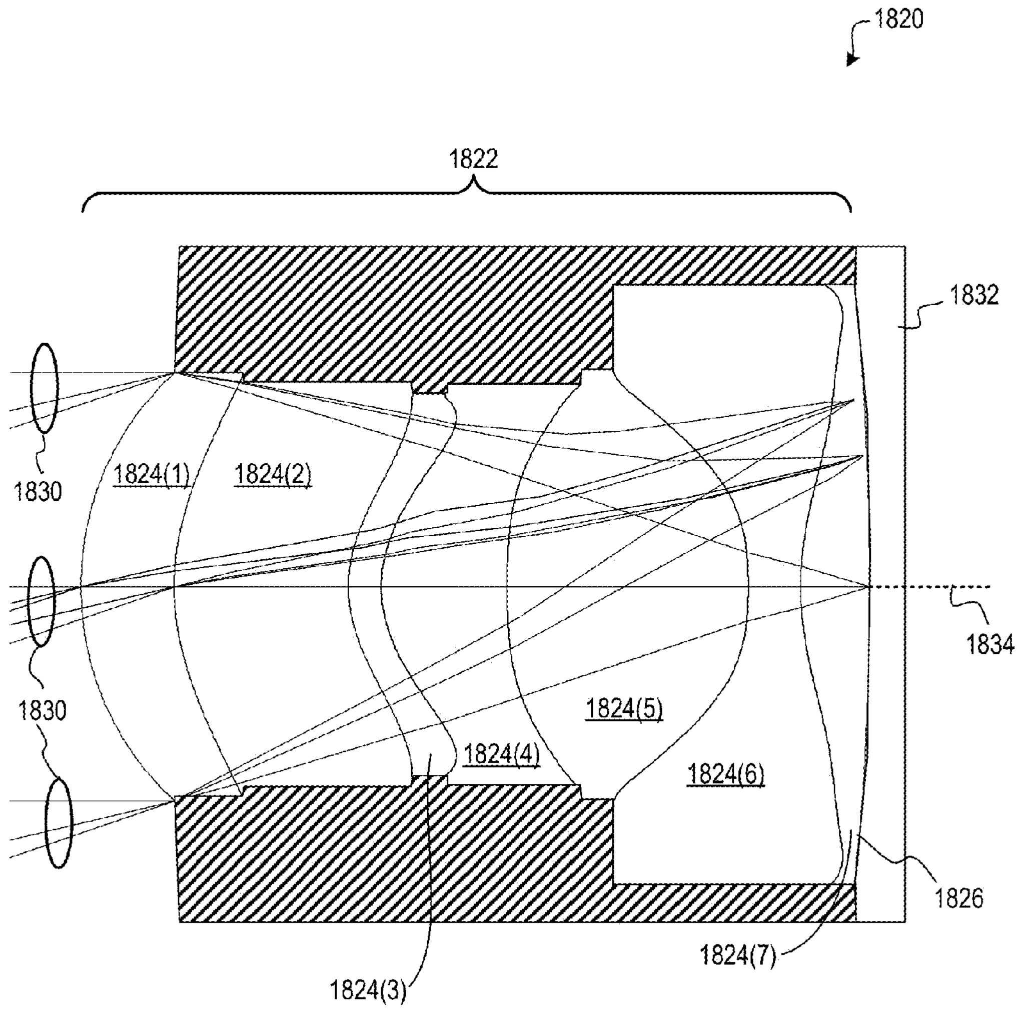
FIG. 79 shows an optical layout and raytrace of one imaging system, according to an embodiment.

FIG. 79 is an optical layout and raytrace of a "VGA_O" imaging system 1820, which is an embodiment of imaging system 10 of FIG. 2A. "O" stands for "organic" from organic detectors that may be used to form curved image planes Imaging system 1820 may be one of arrayed imaging systems; such array may be separated into a plurality of subarrays and/or stand alone imaging systems as discussed above with respect to FIG. 2A. Imaging system 1820 may be referred to as the VGA_O imaging system. The VGA_O imaging system 1820 includes optics 1822 and a curved image plane 1826 represented by a curved surface. The VGA_O imaging system 1820 has a focal length of 1.50 mm, a field of view of 62°, F/# of 1.3, a total track length of 2.45 mm, and a maximum chief ray angle of 28°.

Optics 1822 has seven layered optical elements 1824. Layered optical elements 1824 are formed of two different materials and adjacent layered optical elements are formed of different materials. Layered optical elements 1824(1), 1824(3), 1824(5), and 1824(7) are formed of a first material, with a first refractive index, and layered optical elements 1824(2), 1824(4) and 1824(6) are formed of a second material having a second refractive index. Two exemplary polymer materials that may be useful in the present context are: 1) a high index material (n=1.62) distributed by ChemOptics; and 2) a low index material (n=1.37) distributed by Optical Polymer Research, Inc. It should be noted that there are no air gaps in optics 1822. Rays 1830 represent electromagnetic energy being imaged by VGA_O imaging system 1820 from infinity.

Details of the prescription for optics 1822 are summarized in TABLES 37 and 38. The sag for each one of optics 1822 is given by Eq. (1), where radius, thickness and diameter are given in units of millimeters.

TABLE 37

| Surface | Radius | Thickness | Refractive index | Abbe# | Diameter | Conic |
|---|---|---|---|---|---|---|
| OBJECT | Infinity | Infinity | air | | Infinity | 0 |
| STOP | 0.87115 | 0.2628 | 1.370 | 92.000 | 1.21 | 0 |
| 3 | 0.69471 | 0.49072 | 1.620 | 32.000 | 1.19324 | 0 |
| 4 | 0.59367 | 0.09297 | 1.370 | 92.000 | 1.09178 | 0 |
| 5 | 1.07164 | 0.3541 | 1.620 | 32.000 | 1.07063 | 0 |
| 6 | 1.8602 | 0.68 | 1.370 | 92.000 | 1.15153 | 0 |
| 7 | −1.1947 | 0.14803 | 1.620 | 32.000 | 1.26871 | 0 |
| 8 | 43.6942 | 0.19416 | 1.370 | 92.000 | 1.70316 | 0 |
| MAGE | −8.9687 | 0 | 1.458 | 67.821 | 1.77291 | 0 |

TABLE 38

| Surface# | $A_2$ | $A_4$ | $A_6$ | $A_8$ | $A_{10}$ | $A_{12}$ | $A_{14}$ | $A_{16}$ |
|---|---|---|---|---|---|---|---|---|
| 1(Object) | 0 | 0 | 0 | 0 | 0 | 0 | 0 | 0 |
| 2(Stop) | 0 | 0.2251 | −0.4312 | 0.6812 | −0.02185 | 0 | 0 | 0 |
| 3 | 0 | −1.058 | 0.3286 | 0.5144 | −5.988 | 0 | 0 | 0 |
| 4 | 0.4507 | −2.593 | −6.754 | 30.26 | −61.12 | 0 | 0 | 0 |
| 5 | 0.8961 | −1.116 | −1.168 | −0.6283 | −51.10 | 0 | 0 | 0 |
| 6 | 0 | 1.013 | 11.46 | −68.49 | 104.9 | 0 | 0 | 0 |
| 7 | 0 | −7.726 | 39.23 | −105.7 | 121.0 | 0 | 0 | 0 |
| 8 | 0.5406 | −0.4182 | −3.808 | 10.73 | −8.110 | 0 | 0 | 0 |

Detector 1832 is applied onto curved surface 1826. Optics 1822 may be fabricated independently of detector 1832. Detector 1832 may be fabricated of an organic material. Detector 1832 is for example formed or applied directly on surface 1826, such as by using an ink jet printer; alternately, detector 1832 may be applied to a substrate (e.g., a sheet of polyethylene) which is in turn bonded to surface 1826.

In an embodiment, detector 1832 has a VGA format with a 2.2 micron pixel size. In an embodiment, detector 1832 includes additional detector pixels beyond those required for the resolution of the detector. Such additional pixels may be used to relax the registration requirements of the center of detector 1832 with respect to an optical axis 1834. If detector 1832 is not accurately registered with respect to optical axis 1834, the additional pixels may allow the outline of detector 1832 to be redefined such that detector 1832 is centered with respect to optical axis 1834.

The curved image plane of VGA_O imaging system 1820 offers another degree of design freedom that may be advantageously used in VGA_O imaging system 1820. For example, curved image plane 1826 may be configured to conform to practically any surface shape, to correct for aberrations such as field curvature and/or astigmatism. As a result, it may be possible to relax the tolerances of optics 1822 and thereby decrease cost of fabrication.

Figure 80:
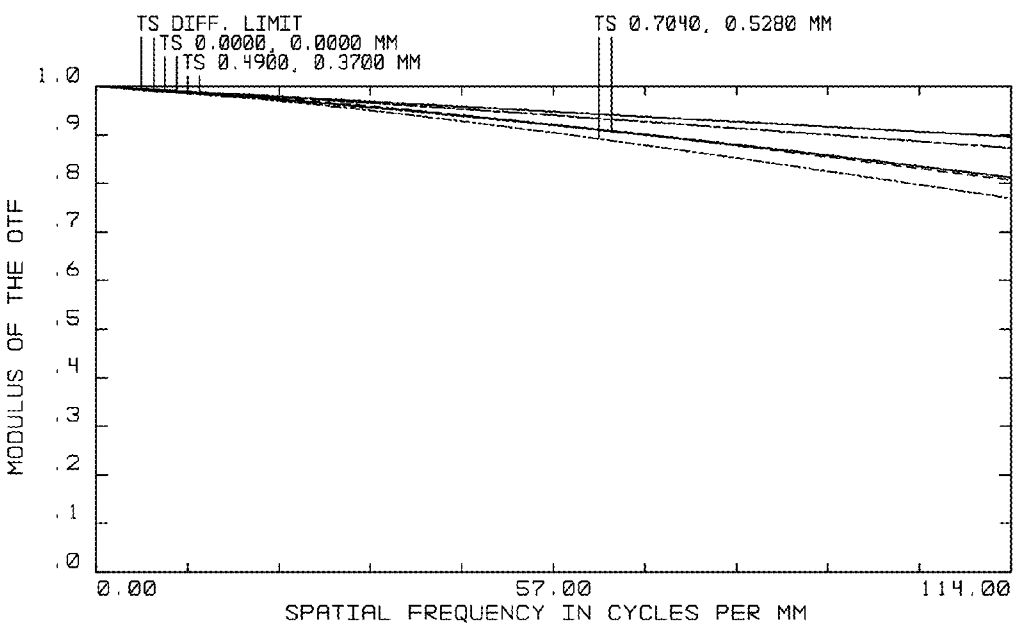
FIG. 80 shows a plot of a monochromatic modulation transfer function as a function of spatial frequency for the imaging system of FIG. 79.

FIG. 80 shows a plot 1850 of monochromatic MTF curves at a wavelength of 550 nm as a function of spatial frequency of VGA_O imaging system 1820, at infinite object conjugate distance. FIG. 80 includes MTF curves for three distinct field points associated with real image heights on a diagonal axis of detector 1832; the three field points are an on-axis field point having coordinates (0 mm, 0 mm), a 0.7 field point having coordinates (0.49 mm, 0.37 mm) and a full field point having coordinates (0.704 mm, 0.528 mm). Because of curved image plane 1826, astigmatism and field curvature are well-corrected, and the MTFs are almost diffraction limited. FIG. 80 also shows the diffraction limit, indicated as "DIFF. LIMIT" in the figure.

Figure 81:
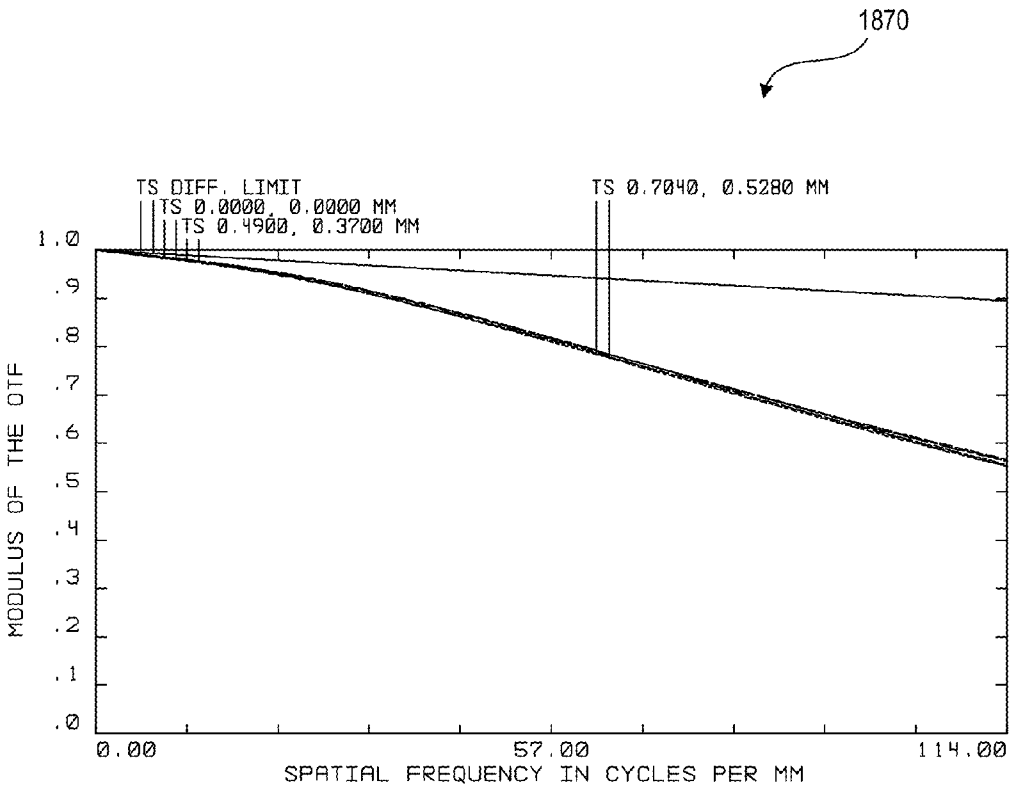
FIG. 81 shows a plot of the modulation transfer function as a function of spatial frequency for the imaging system of FIG. 79.

FIG. 81 shows a plot 1870 of white light MTFs as a function of spatial frequency of the VGA_O imaging system 1820, for infinite object conjugate distance. The MTFs are averaged over wavelengths from 470 to 650 nm FIG. 81 illustrates MTF curves for three distinct field points associated with real image heights on a diagonal axis of detector 1832; the three field points are an on-axis field point having coordinates (0 mm, 0 mm), a 0.7 field point having coordinates (0.49 mm, 0.37 mm) and a full field point having coordinates (0.704 mm, 0.528 mm). FIG. 81 also shows the diffraction limit, indicated as "DIFF. LIMIT" in the figure.

It may be observed by comparing FIGS. 80 and 81 that the color MTFs of FIG. 81 generally have a smaller magnitude than the monochromatic MTFs of FIG. 80. Such differences in magnitudes show that the VGA_O imaging system 1820 exhibits an aberration commonly referred to as axial color. Axial color may be corrected through a predetermined phase modification; however, use of a predetermined phase modification to correct for axial color may reduce the ability of a predetermined phase modification to relax the optical-mechanical tolerances of optics 1822. Relaxation of the optical-mechanical tolerances may reduce the cost of fabricating optics 1822; therefore, it would be advantageous in this case to use as much of the effect of the predetermined phase modification to relax the optical-mechanical tolerance as possible. As a result, it may be advantageous to correct axial color by using a different polymer material in one or more layered optical elements 1824, as discussed below.

Figure 82A:
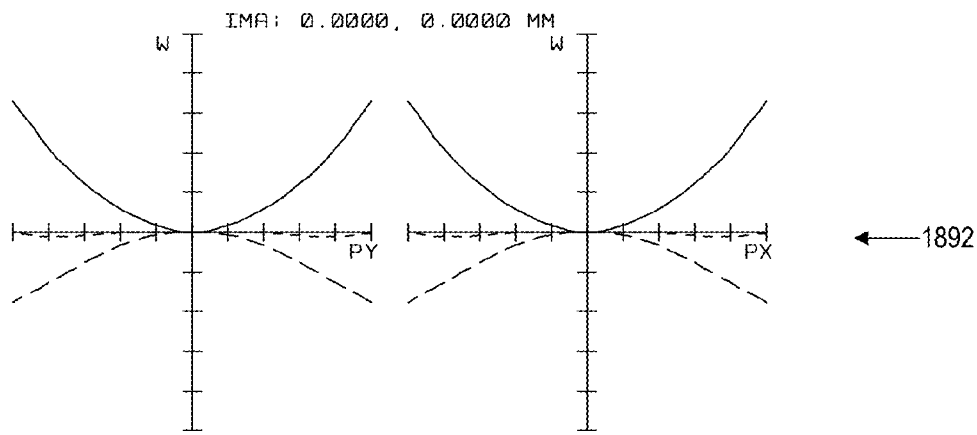
FIGS. 82A-82C show plots of optical path differences of the imaging system of FIG. 79.
Figure 82B:
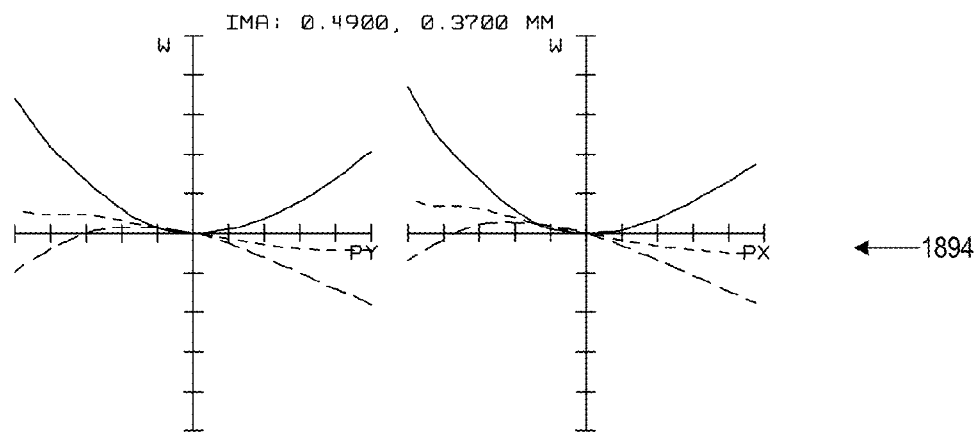
Figure 82C:
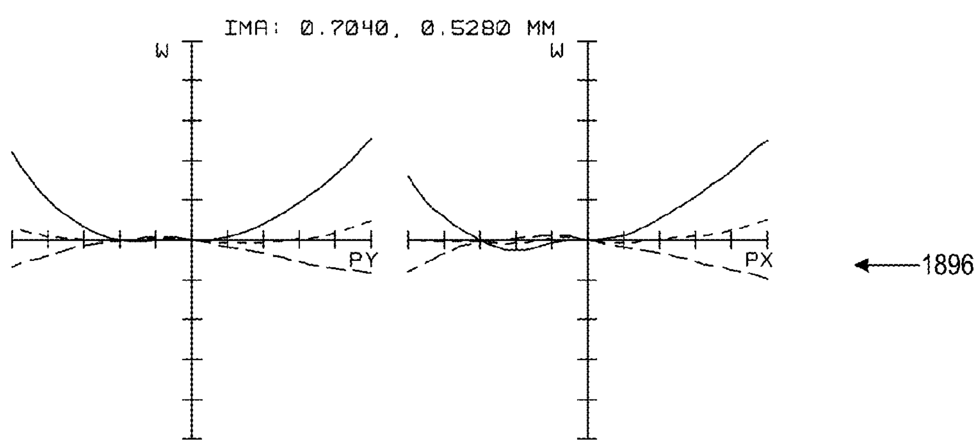

FIGS. 82A, 82B and 82C show pairs of plots 1892, 1894 and 1896, respectively, of the optical path differences of VGA_O imaging system 1820. The maximum scale in each direction is +/−five waves. The solid lines correspond to electromagnetic energy having a wavelength of 470 nm; the short dashed lines correspond to electromagnetic energy having a wavelength of 550 nm; the long dashed lines correspond to electromagnetic energy having a wavelength of 650 nm. Each pair of plots 1892, 1894 and 1896 represents optical path differences at a different real image height on the diagonal of detector 1832. Plots 1892 correspond to an on-axis field point having coordinates (0 mm, 0 mm); plots 1894 correspond to a 0.7 field point having coordinates (0.49 mm, 0.37 mm); and plots 1896 correspond to a full field point having coordinates (0.704 mm, 0.528 mm) The left hand plot of each pair of plots is a plot of wavefront error for the tangential set of rays, and the right hand plot is a plot of wavefront error for the sagittal set of rays. It may be observed from the plots that the largest aberration in the system is axial color.

Figure 83A:
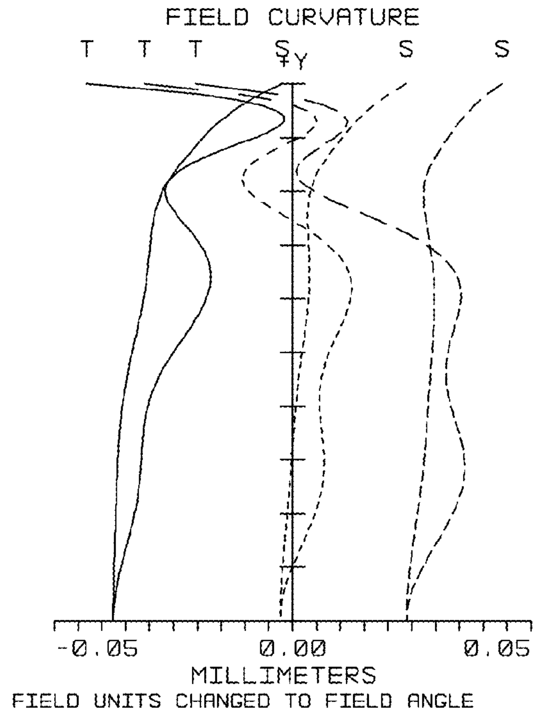
FIG. 83A shows a plot of field curvature of the imaging system of FIG. 79.
Figure 83B:
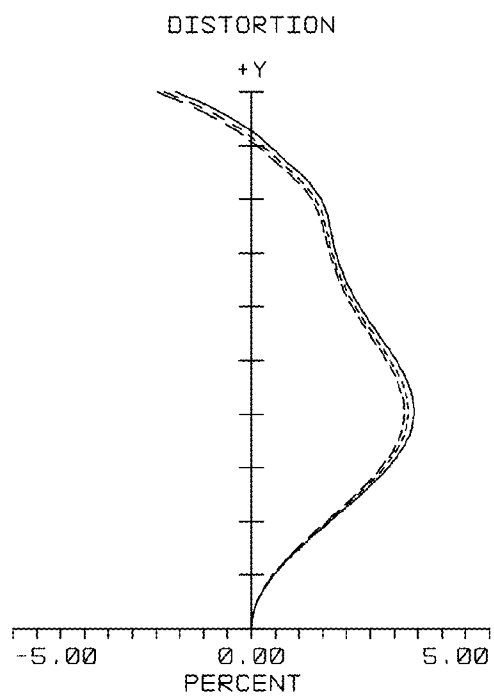
FIG. 83B shows a plot of distortion of the imaging system of FIG. 79.

FIG. 83A shows a plot 1920 of field curvature and FIG. 83B shows a plot 1922 of distortion of the VGA_O imaging system 1820. The maximum half-field angle is 31.04°. The solid lines correspond to electromagnetic energy having a wavelength of 470 nm; the short dashed lines correspond to electromagnetic energy having a wavelength of 550 nm; and the long dashed lines correspond to electromagnetic energy having a wavelength of 650 nm.

Figure 84:
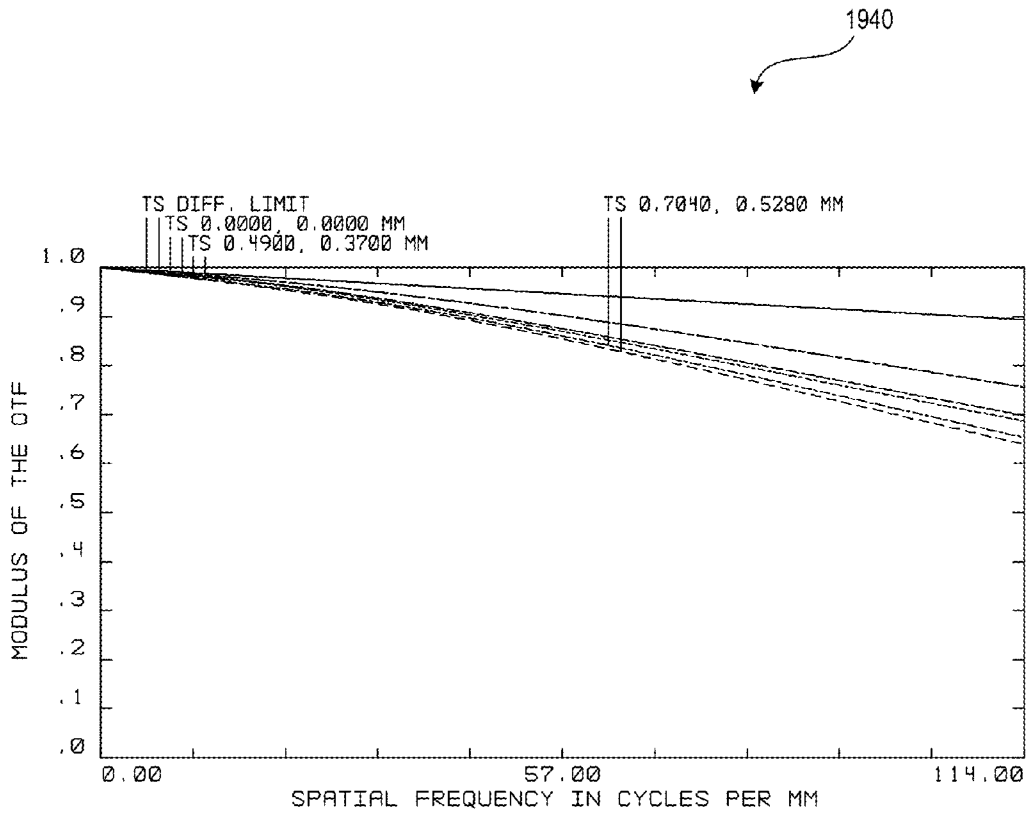
FIG. 84 shows a plot of the modulation transfer functions as a function of spatial frequency for a modified configuration of the imaging system of FIG. 79, according to an embodiment.

FIG. 84 shows a plot 1940 of MTFs as a function of spatial frequency of the VGA_O imaging system 1820 with a selected polymer used in layered optical elements 1824 to reduce axial color. Such imaging system with the selected polymer may be referred to as the VGA_O1 imaging system. The VGA_O1 imaging system has a focal length of 1.55 mm, a field of view of 62°, F/# of 1.3, a total track length of 2.45 mm and a maximum chief ray angle of 26°. Details of the prescription for optics 1822 using the selected polymer are summarized in TABLES 39 and 40. The sag for each one of optics 1822 of the VGA_O1 imaging system is given by Eq. (1), where radius, thickness and diameter are given in units of millimeters.

TABLE 39

| Surface | Radius | Thickness | Refractive index | Abbe# | Diameter | Conic |
|---|---|---|---|---|---|---|
| OBJECT | Infinity | Infinity | air | | Infinity | 0 |
| STOP | 0.86985 | 0.26457 | 1.370 | 92.000 | 1.2 | 0 |
| 3 | 0.69585 | 0.49044 | 1.620 | 32.000 | 1.18553 | 0 |
| 4 | 0.59384 | 0.09378 | 1.370 | 92.000 | 1.09062 | 0 |
| 5 | 1.07192 | 0.35286 | 1.620 | 32.000 | 1.07101 | 0 |
| 6 | 1.89355 | 0.68279 | 1.370 | 92.000 | 1.14674 | 0 |
| 7 | −1.2097 | 0.14803 | 1.620 | 32.000 | 1.26218 | 0 |
| 8 | −54.165 | 0.19532 | 1.370 | 92.000 | 1.69492 | 0 |
| IMAGE | −8.3058 | 0 | 1.458 | 67.821 | 1.76576 | 0 |

TABLE 40

| Surface# | $A_2$ | $A_4$ | $A_6$ | $A_8$ | $A_{10}$ | $A_{12}$ | $A_{14}$ | $A_{16}$ |
|---|---|---|---|---|---|---|---|---|
| 1(Object) | 0 | 0 | 0 | 0 | 0 | 0 | 0 | 0 |
| 2(Stop) | 0 | 0.2250 | −0.4318 | 0.6808 | −0.02055 | 0 | 0 | 0 |

TABLE 40-continued

| Surface# | $A_2$ | $A_4$ | $A_6$ | $A_8$ | $A_{10}$ | $A_{12}$ | $A_{14}$ | $A_{16}$ |
|---|---|---|---|---|---|---|---|---|
| 3 | 0 | −1.061 | 0.3197 | 0.5032 | −5.994 | 0 | 0 | 0 |
| 4 | 0.4526 | −2.590 | −6.733 | 30.26 | −61.37 | 0 | 0 | 0 |
| 5 | 0.8957 | −1.110 | −1.190 | −0.6586 | −51.21 | 0 | 0 | 0 |
| 6 | 0 | 1.001 | 11.47 | −68.45 | 104.9 | 0 | 0 | 0 |
| 7 | 0 | −7.732 | 39.18 | −105.8 | 120.9 | 0 | 0 | 0 |
| 8 | 0.5053 | −0.3366 | −3.796 | 10.64 | −8.267 | 0 | 0 | 0 |

In FIG. 84, the MTFs are averaged over wavelengths from 470 to 650 nm. FIG. 84 illustrates MTF curves for three distinct field points associated with real image heights on a diagonal axis of detector 1832; the three field points are an on-axis field point having coordinates (0 mm, 0 mm), a 0.7 field point having coordinates (0.49 mm, 0.37 mm), and a full field point having coordinates (0.704 mm, 0.528 mm). It may be observed by comparing FIGS. 81 and 84 that the color MTFs of the VGA_O1 are generally higher than the color MTFs of the VGA_O imaging system 1820.

Figure 85A:
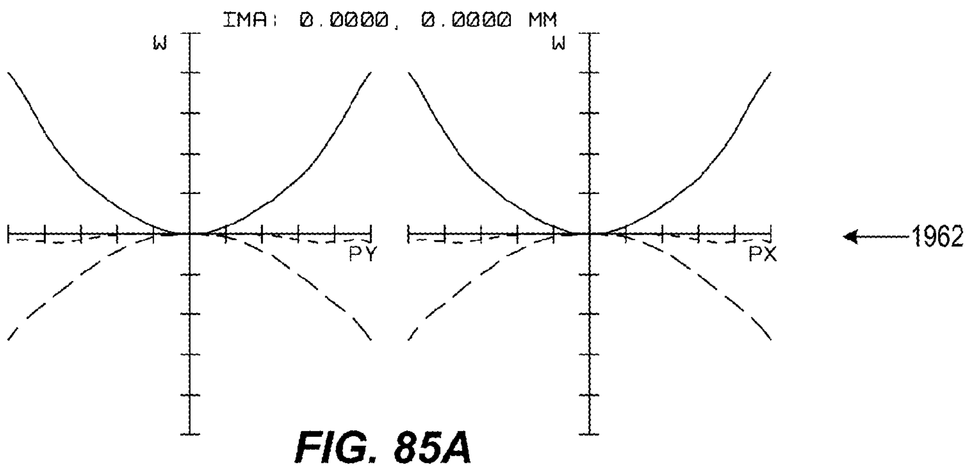
FIGS. 85A-85C show plots of optical path differences for a modified version of the imaging system of FIG. 79.
Figure 85B:
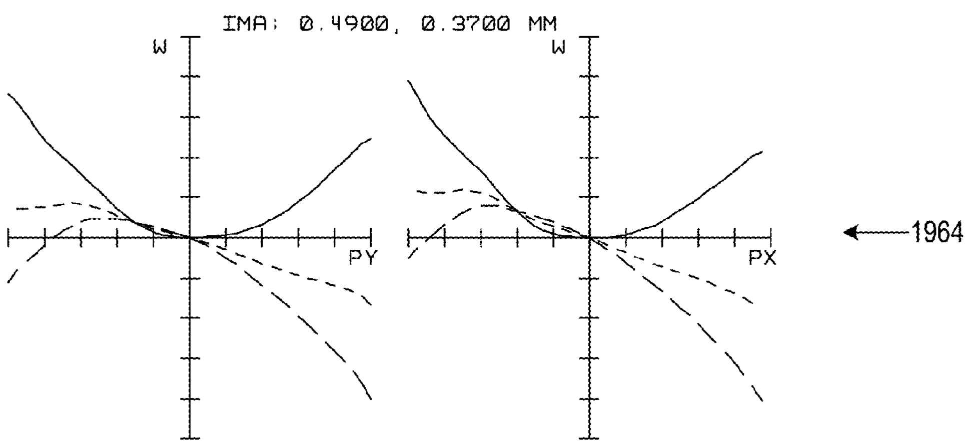
Figure 85C:
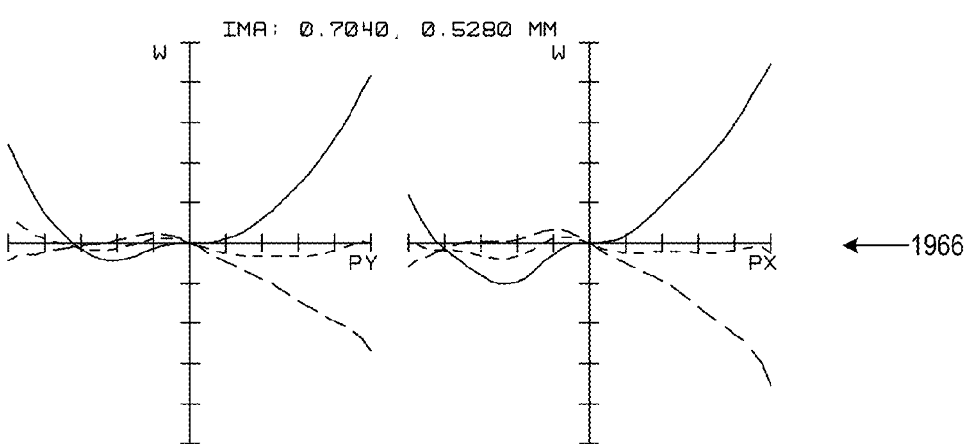

FIGS. 85A, 85B and 85C show pairs of plots 1962, 1964 and 1966, respectively, of the optical path differences of the VGA_O1 imaging system. The maximum scale in each direction is +/−two waves. The solid lines correspond to electromagnetic energy having a wavelength of 470 nm; the short dashed lines correspond to electromagnetic energy having a wavelength of 550 nm; the long dashed lines correspond to electromagnetic energy having a wavelength of 650 nm. Each pair of plots represents optical path differences at a different real height on the diagonal of detector 1832. Plots 1962 correspond to an on-axis field point having coordinates (0 mm, 0 mm); plots 1964 correspond to a 0.7 field point having coordinates (0.49 mm, 0.37 mm); and plots 1966 correspond to a full field point having coordinates (0.704 mm, 0.528 mm). It may be observed by comparing the plots of FIGS. 82 and 85 that the third polymer of the VGA_O1 imaging system reduces axial color by approximately 1.5 times compared to that of VGA_O imaging system 1820. The left hand plot of each pair of plots is a plot of wavefront error for the tangential set of rays, and the right hand plot is a plot of wavefront error for the sagittal set of rays.

Figure 86:
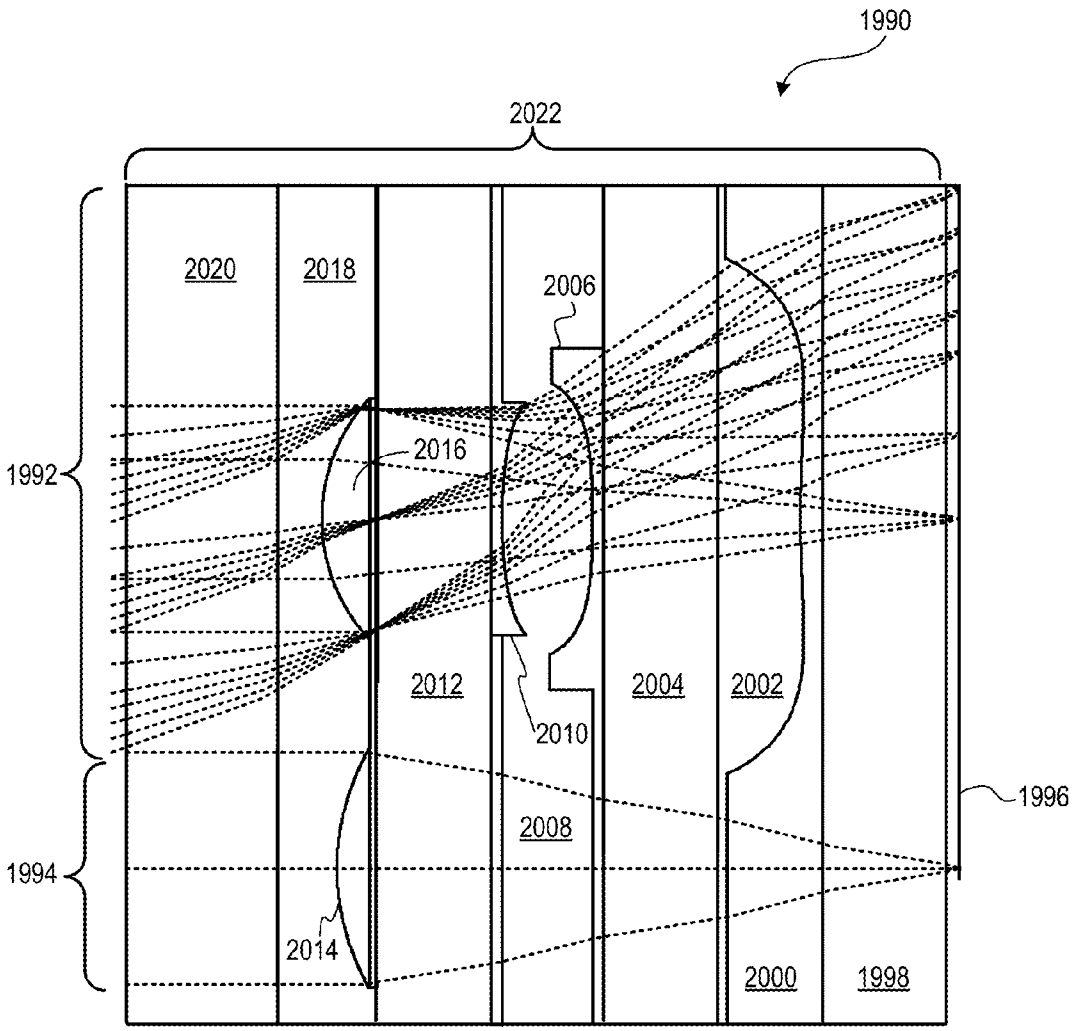
FIG. 86 is an optical layout and raytrace of one multiple aperture imaging system, according to an embodiment.

FIG. 86 is an optical layout and raytrace of a WALO-style imaging system 1990, which is an embodiment of imaging system 10 of FIG. 2A. WALO-style imaging system 1990 may be one of arrayed imaging systems; such array may be separated into a plurality of sub-arrays and/or stand alone imaging systems as discussed above with respect to FIG. 2A. WALO-style imaging system 1990 has first and second apertures 1992 and 1994, respectively, each of which directs electromagnetic energy onto detector 1996.

First aperture 1992 captures an image while second aperture 1994 is used for integrated light level detection. Such light level detection may be used to adjust imaging system 1990 according to an ambient light intensity before capturing an image with imaging system 1990. Imaging system 1990 includes optics 2022 having a plurality of optical elements. An optical element 1998 (e.g., a glass plate) is formed with detector 1996. An optics-detector interface, such as an air gap, may separate element 1998 from detector 1996. Element 1998 may therefore be a cover plate for detector 1996.

A first air gap 2000 separates an optical element 2002 from element 1998. Positive optical element 2002 is in turn formed on one side of an optical element 2004 (e.g., a glass plate) proximate to detector 1996, and a negative optical element 2006 is formed on an opposite side of element 2004. A second air gap 2008 separates negative optical element 2006 from a negative optical element 2010. Negative optical element 2010 is formed on one side of an element 2012 (e.g., a glass plate) proximate to detector 1996; positive optical elements 2016 and 2014 are formed on an opposite side of element 2012. Positive optical element 2016 is in optical communication with first aperture 1992, and optical element 2014 is in optical communication with second aperture 1994. An element 2020 (e.g., a glass plate) is separated from optical elements 2016 and 2014 by third air gap 2018.

It may be observed from FIG. 86 that optics 2022 includes four optical elements 2002, 2006, 2010 and 2016 in optical communication with first aperture 1992 and only one optical element 2014 in optical communication with second aperture 1994. Fewer optical elements are required to be used with second aperture 1994 because aperture 1994 is used solely for electromagnetic energy detection.

Figure 87:
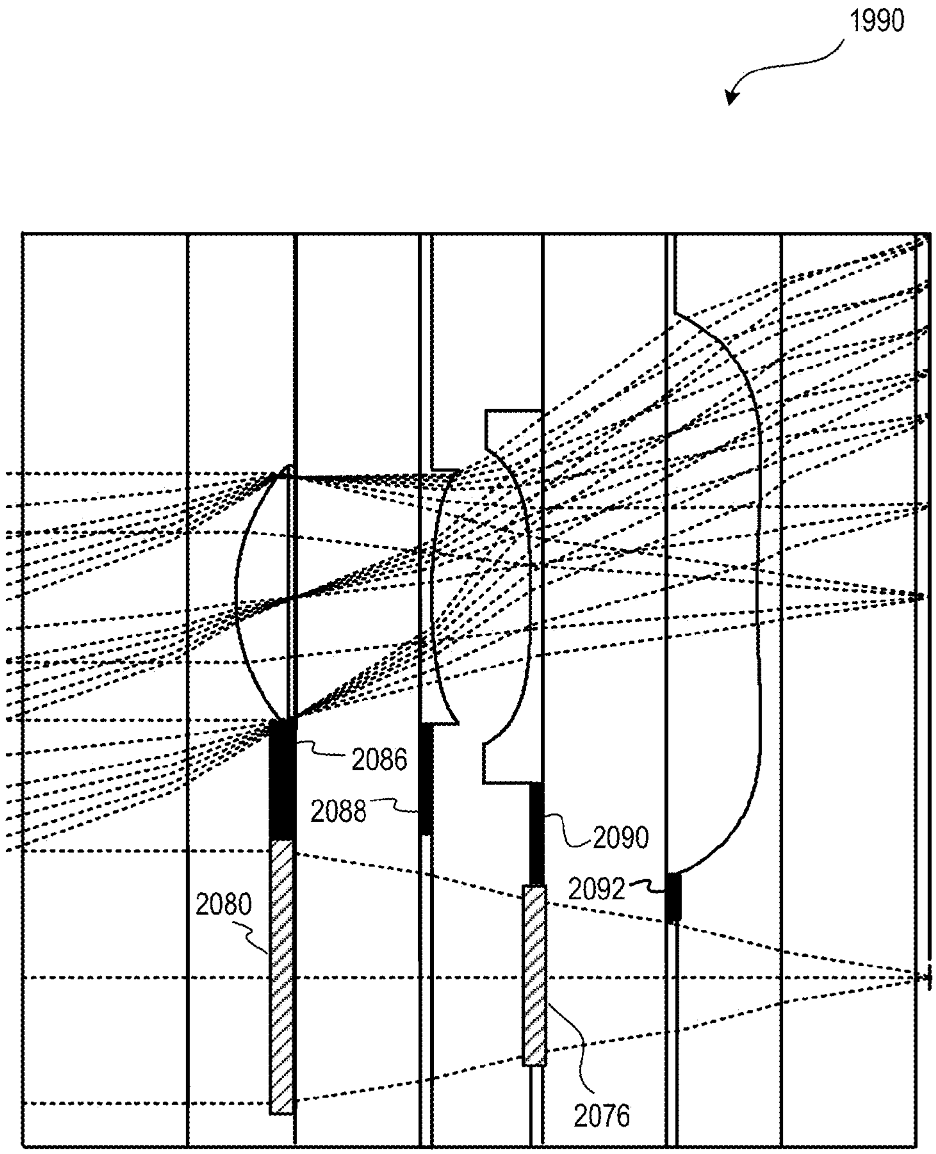
FIG. 87 is an optical layout and raytrace of one multiple aperture imaging system, according to an embodiment.

FIG. 87 is an optical layout and raytrace of an alternative WALO-style imaging system 2050, shown here to illustrate further details or alternative elements. Only elements added to or modified with respect to FIG. 86 are numbered for clarity. Alternative WALO-style imaging system 2050 may include physical aperturing elements such as elements 2086, 2088, 2090 and 2092 that aid to separate electromagnetic energy among first and second apertures 1992 and 1994.

Diffractive optical elements 2076 and 2080 may be used in place of element 2014, FIG. 86. Such diffractive elements may have a relatively large field of view but be limited to a single wavelength of electromagnetic energy; alternately, such diffractive elements may have a relatively small field of view but be operable to image over a relatively large spectrum of wavelengths. If optical elements 2076 and 2080 are diffractive elements, their properties may be selected according to desired design goals.

Realization of arrayed imaging systems of the previous section require careful coordination of the design, optimization and fabrication of each of the components that make up the arrayed imaging systems. For example, briefly returning to FIG. 3A, fabrication of array 60 of arrayed imaging systems 62 necessitates cooperation between the design, optimization and fabrication of optics 66 and detector 16 in a variety of aspects. For example, the compatibility of optics 66 and detector 16 in achieving certain imaging and detection goals may be considered, as well as methods of optimizing the fabrication steps for forming optics 66. Such compatibility and optimization may increase yield and account for limitations of the various manufacturing processes. Additionally, tailoring of the processing of captured image data to improve the image quality may alleviate some of the existing manufacturing and optimization constraints. While different components of arrayed imaging systems are known to be separately optimizable, the steps required for the realization of arrayed imaging systems, such as those described above, from conception through manufacturing may be improved by controlling all aspects of the realization from start to finish in a cooperative manner Processes for the realization of arrayed imaging systems of the present disclosure, taking into account the goals and limitations of each component, are described immediately hereinafter.

Figure 88:
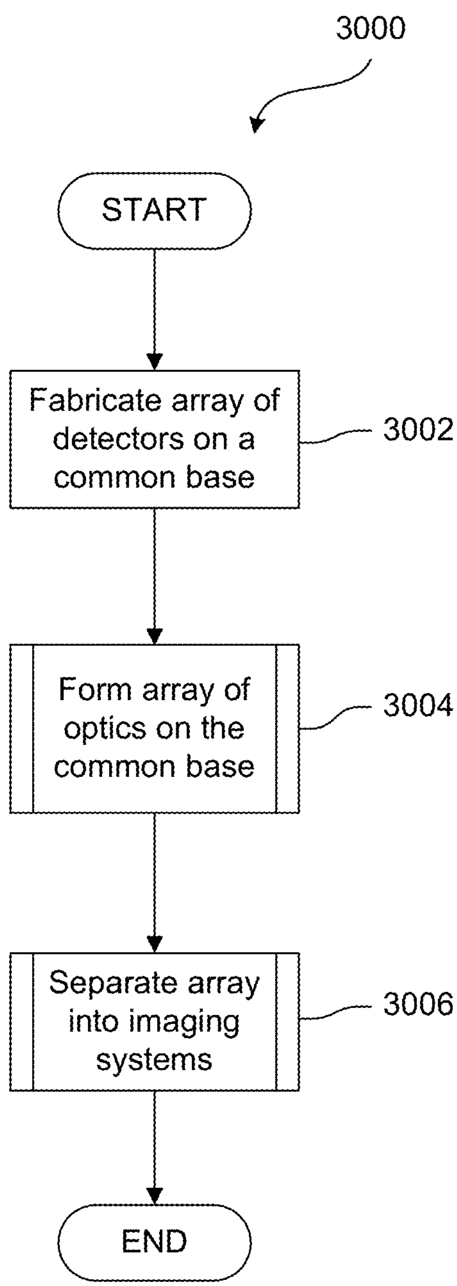
FIG. 88 is a flowchart showing an exemplary process for fabricating arrayed imaging systems, according to an embodiment.

FIG. 88 is a flowchart showing an exemplary process 3000 for realization of one embodiment of arrayed imaging systems, such as imaging systems 40, FIG. 1B. As shown in FIG. 88 at a step 3002, an array of detectors supported on a common base is fabricated. An array of optics is also formed on the common base, at a step 3004, where each one of the optics is in optical communication with at least one of the detectors. Finally, at a step 3006, the array of combined detectors and optics is separated into imaging systems. It should be noted that different imaging system configurations may be fabricated on a given common base. Each of the steps shown in FIG. 88 requires coordination of design, optimization and fabrication control processes, as discussed immediately hereinafter.

Figure 89:
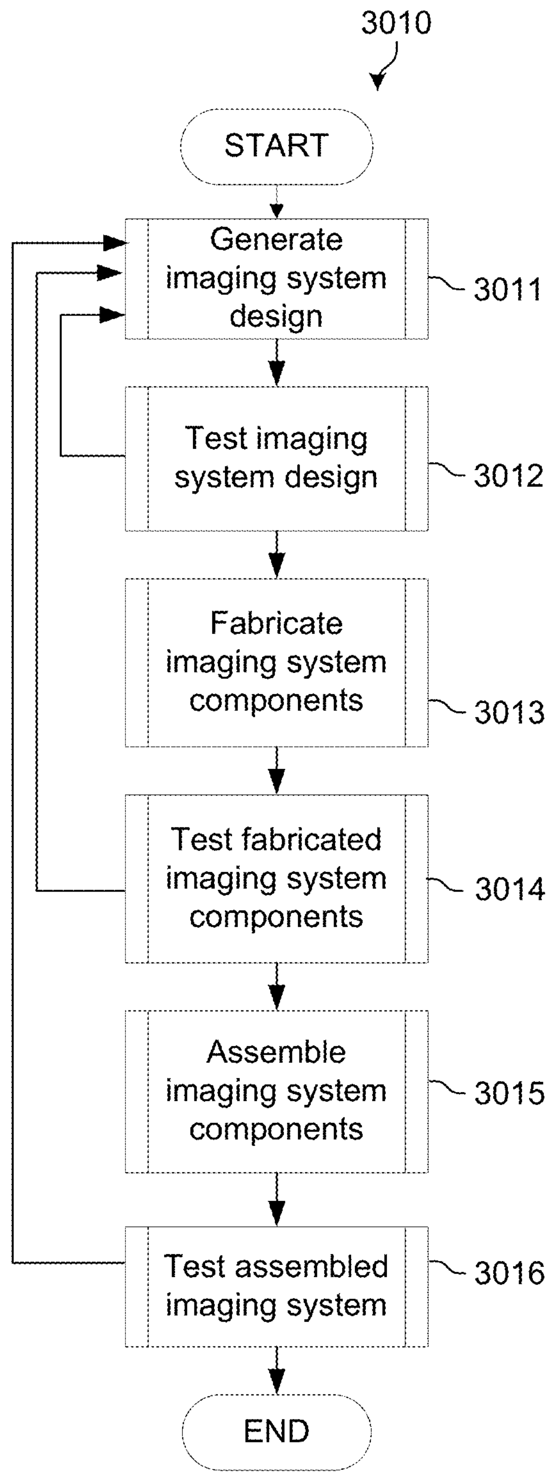
FIG. 89 is a flowchart of an exemplary set of steps performed in the realization of arrayed imaging systems, according to an embodiment.

FIG. 89 is a flowchart of an exemplary process 3010 performed in the realization of arrayed imaging systems, according to an embodiment. While exemplary process 3010 highlights the general steps used in fabricating arrayed imaging systems as described above, details of each of these general steps will be discussed at an appropriate point later in the disclosure.

As shown in FIG. 89, initially, at step 3011, an imaging system design for each imaging system of the arrayed imaging systems is generated. Within imaging system design generation step 3011, software may be used to model and optimize the imaging system design, as will be discussed in detail at a later juncture. The imaging system design may then be tested at step 3012 by, for instance, numerical modeling using commercially available software. If the imaging system design tested in step 3012 does not conform within predefined parameters, then process 3010 returns to step 3011, where the imaging system design is modified using a set of potential design parameter modifications. Predefined parameters may include, for example, MTF value, Strehl ratio, aberration analysis using optical path difference plots and ray fan plots and chief ray angle value. In addition, knowledge of the type of object to be imaged and its typical setting may be taken into consideration in step 3011. Potential design parameter modifications may include alteration of, for example, optical element curvature and thickness, number of optical elements and phase modification in an optics subsystem design, filter kernel in processing of electronic data in an image processor subsystem design, as well as subwavelength feature width and height in a detector subsystem design. Steps 3011 and 3012 are repeated until the imaging system design conforms within the predefined parameters.

Still referring to FIG. 89, at step 3013, components of the imaging system are fabricated in accordance with the imaging system design; that is, at least the optics, image processor and detector subsystems are fabricated in accordance with the respective subsystem designs. The components are then tested at step 3014. If any of the imaging system components does not conform within the predefined parameters, then the imaging system design may again be modified, using the set of potential design parameter modifications, and steps 3012 through 3014 are repeated, using a further-modified design, until the fabricated imaging system components conform within the predefined parameters.

Continuing to refer to FIG. 89, at step 3015, the imaging system components are assembled to form the imaging system, and the assembled imaging system is then tested, at step 3016. If the assembled imaging system does not conform within the predefined parameters, then the imaging system design may again be modified, using the set of potential design parameter modifications, and steps 3012 through 3016 are repeated, using a further-modified design, until the fabricated imaging system conforms within the predefined parameters. Within each of the test steps, performance metrics may also be determined.

Figure 90:
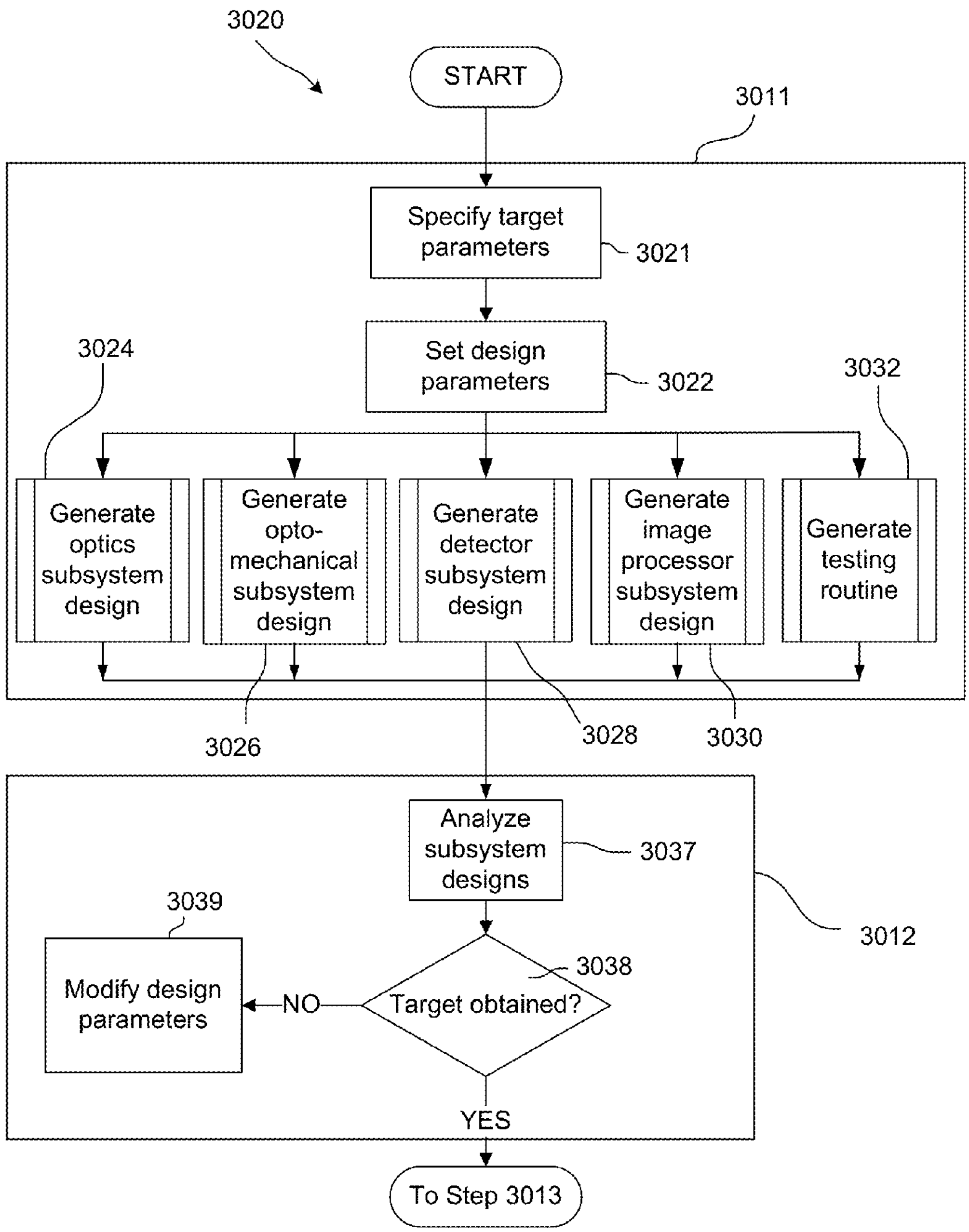
FIG. 90 is an exemplary flowchart showing details of the design steps in FIG. 88.

FIG. 90 shows a flowchart 3020, showing further details of imaging system design generating step 3011 and imaging system design testing a step 3012. As shown in FIG. 90 at step 3021, a set of target parameters is initially specified for the imaging system design. Target parameters may include, for example, design parameters, process parameters and metrics. Metrics may be specific, such as a desired characteristic in the MTF of the imaging system or more generally defined, such as depth of field, depth of focus, image quality, detectability, low cost, short fabrication time or low sensitivity to fabrication errors. Design parameters are then established for the imaging system design, at a step 3022. Design parameters may include, for example, f-number ("F/#"), field of view ("FOV"), number of optical elements, detector format (e.g., VGA or 640×480 detector pixels), detector pixel size (e.g., 2.2 μm) and filter size (e.g., 7×7 or 31×31 coefficients). Other design parameters may be total optical track length, curvature and thickness of individual optical elements, zoom ratio in a zoom lens, surface parameters of any phase modifying elements, subwavelength feature width and thickness of optical elements integrated into the detector subsystem designs, minimum coma and minimum noise gain.

Step 3011 also includes steps to generate designs for the various components of the imaging system. Namely, step 3011 includes step 3024 to generate an optics subsystem design, step 3026 to generate an opto-mechanical subsystem design, step 3028 to generate a detector subsystem design, step 3030 to generate an image processor subsystem design and step 3032 to generate a testing routine. Steps 3024, 3026, 3028, 3030 and 3032 take into account design parameter sets for the imaging system design, and these steps may be performed in parallel, serially in any order or jointly. Furthermore, certain ones of steps 3024, 3026, 3028, 3030 and 3032 may be optional; for example, a detector subsystem design may be constrained by the fact that an off-the-shelf detector is being used in the imaging system such that step 3028 is not required. Additionally, the testing routine may be dictated by available resources such that step 3032 is extraneous.

Continuing to refer to FIG. 90, further details of imaging system design testing step 3012 are illustrated. Step 3012 includes step 3037 to analyze whether the imaging system design satisfies the specified target parameters while conforming within the predefined design parameters. If the imaging system design does not conform within the predefined parameters, then at least one of the subsystem designs is modified, using the respective set of potential design parameter modifications. Analysis step 3037 may target individual design parameters or combinations of design parameters from one or more of the design steps 3024, 3026, 3028, 3030 and 3032. For instance, analysis may be performed on a specific target parameter, such as the desired MTF characteristics. As another example, the chief ray angle correction characteristics of a subwavelength optical element included within the detector subsystem design may also be analyzed. Similarly, performance of an image processor can be analyzed by inspection of the MTF values. Analysis may also include evaluating parameters relating to manufacturability. For example, machining time of fabrication masters may be analyzed or tolerances of the opto-mechanical design assembly can be evaluated. A particular optics subsystem design may not be useful if manufacturability is determined to be too costly due to tight tolerances or increased fabrication time.

Step 3012 further includes a decision 3038 to determine whether the target parameters are satisfied by the imaging system. If the target parameters are not satisfied by the current imaging system design, then design parameters may be modified at a step 3039, using the set of potential design parameter modifications. For example, numerical analysis of MTF characteristics may be used to determine whether the arrayed imaging systems meet certain specifications. A specification for MTF characteristics may, for example, be dictated by the requirements of a particular application. If an imaging system design does not meet the certain specifications, specific design parameters may be changed, such as curvatures and thicknesses of individual optical elements. As another example, if chief ray angle correction is not to specification, a design of subwavelength optical elements within a detector pixel structure may be modified by changing the subwavelength feature width or thickness. If signal processing is not to specification, a kernel size of a filter may be modified, or a filter from another class or metric may be chosen.

As discussed earlier in reference to FIG. 89, steps 3011 and 3012 are repeated, using a further-modified design, until each of the subsystem designs (and, consequently, the imaging system design) conforms within the relevant predefined parameters. The testing of the different subsystem designs may be implemented individually (i.e., each subsystem is tested and modified separately) or jointly (i.e., two or more subsystems are coupled in the testing and modification processes). The appropriate design processes described above are repeated, if necessary, using a further-modified design, until the imaging system design conforms within the predefined parameters.

Figure 91:
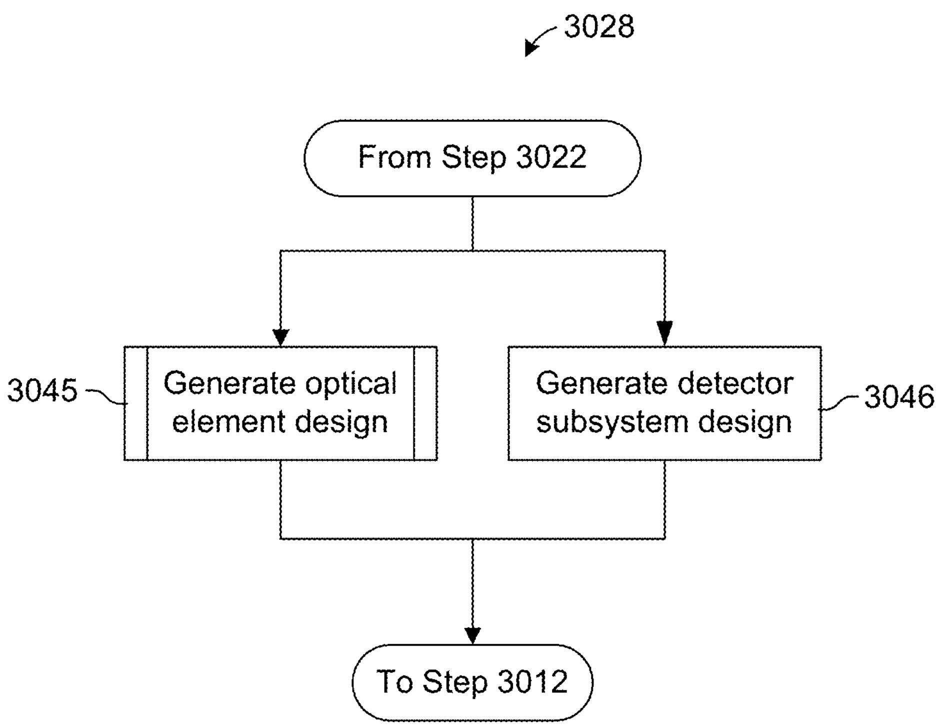
FIG. 91 is a flowchart showing an exemplary process for designing a detector subsystem, according to an embodiment.

FIG. 91 is a flowchart illustrating details of the detector subsystem design generating step 3028 of FIG. 90. In step 3045 (described in further detail below), optical elements within and proximate to the detector pixel structure are designed, modeled and optimized. In step 3046, the detector pixel structures are designed, modeled and optimized, as is well known in the art. Steps 3045 and 3046 may be performed separately or jointly, wherein the design of detector pixel structures and the design of the optical elements associated with the detector pixel structures are coupled.

Figure 92:
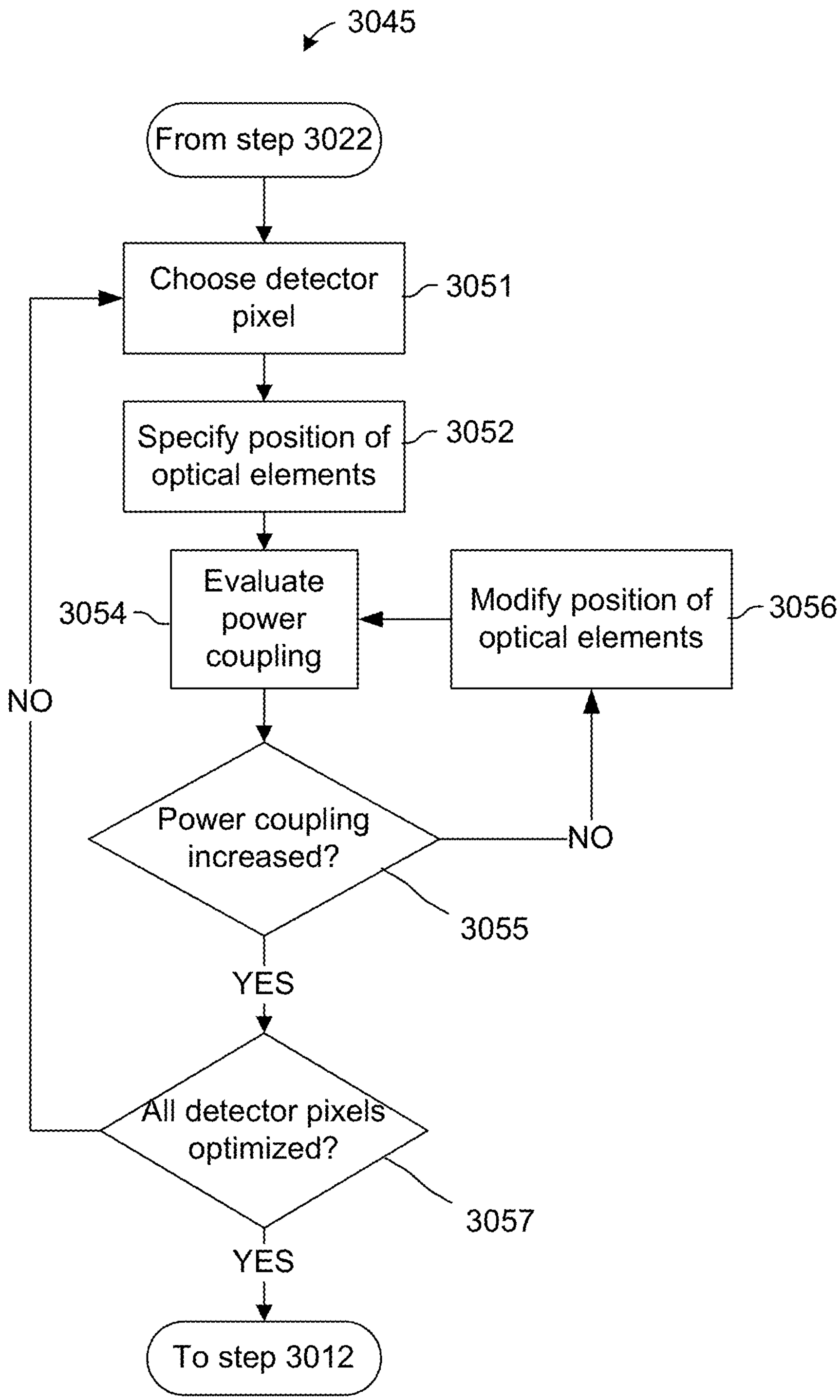
FIG. 92 is a flowchart showing an exemplary process for the design of optical elements integrally formed with detector pixels, according to an embodiment.

FIG. 92 is a flowchart showing further details of the optical element design generation step 3045 of FIG. 91. As shown in FIG. 92, at step 3051, a specific detector pixel is chosen. At step 3052, a position of the optical elements associated with that detector pixel relative to the detector pixel structure is specified. At step 3054, the power coupling for the optical element in the present position is evaluated. At step 3055, if the power coupling for the present position of the optical elements is determined not to be sufficiently maximized, then the position of the optical elements is modified, at step 3056, and steps 3054, 3055 and 3056 are repeated until a maximum power coupling value is obtained.

When the calculated power coupling for the present positioning is determined to be sufficiently close to a maximum value, then, if there are remaining detector pixels to be optimized (step 3057), the above-described process is repeated, starting with step 3051. It may be understood that other parameters may be optimized, for example, power crosstalk (power that is improperly received by a neighboring detector pixel) may be optimized toward a minimum value. Further details of step 3045 are described at an appropriate junction hereinafter.

Figure 93:
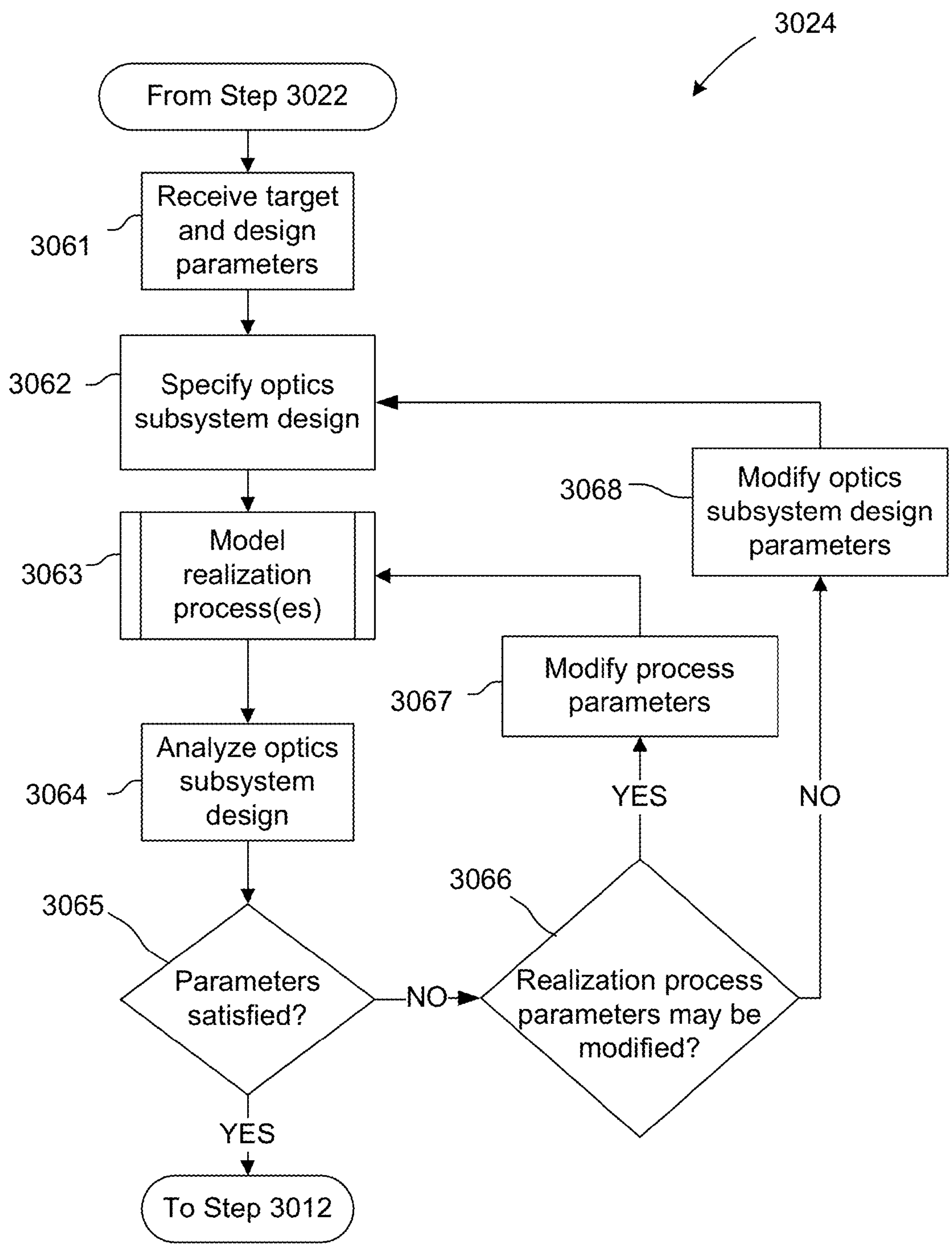
FIG. 93 is a flowchart showing an exemplary process for designing an optics subsystem, according to an embodiment.

FIG. 93 is a flowchart showing further details of the optics subsystem design generation step 3024 of FIG. 90. In step 3061, a set of target parameters and design parameters for the optics subsystem design is received from steps 3021 and 3022 of FIG. 90. An optics subsystem design, based on the target parameters and design parameters, is specified in step 3062. In step 3063, realization processes (e.g., fabrication and metrology) of the optics subsystem design are modeled to determine feasibility and impact on the optics subsystem design. In step 3064, the optics subsystem design is analyzed to determine whether the parameters are satisfied. A decision 3065 is made to determine whether the target and design parameters are satisfied by the current optics subsystem design.

If the target and design parameters are not satisfied with the current optics subsystem design, then a decision 3066 is made to determine whether the realization process parameters may be modified to achieve performance within the target parameters. If a process modification in the realization process is feasible, then realization process parameters are modified in step 3067 based on the analysis in step 3064, optimization software (i.e., an 'optimizer') and/or user knowledge. The determination of whether process parameters can be modified may be made on a parameter by parameter basis or using multiple parameters. The model realization process (step 3063) and subsequent steps, as described above, may be repeated until the target parameters are satisfied or until process parameter modification is determined not to be feasible. If process parameter modification is determined not to be feasible at decision 3066, then the optics subsystem design parameters are modified, at step 3068, and the modified optics subsystem design is used at step 3062. Subsequent steps, as described above, are repeated until the target parameters are satisfied, if possible. Alternatively, design parameters may be modified (step 3068) concurrently with the modification of process parameters (step 3067) for more robust design optimization. For any given parameter, decision 3066 may be made by either a user or an optimizer. As an example, tool radius may be set at a fixed value (i.e., not able to be modified) by a user of the optimizer as a constraint. After problem analysis, specific parameters in the optimizer and/or the weighting on variables in the optimizer may be modified.

Figure 94:
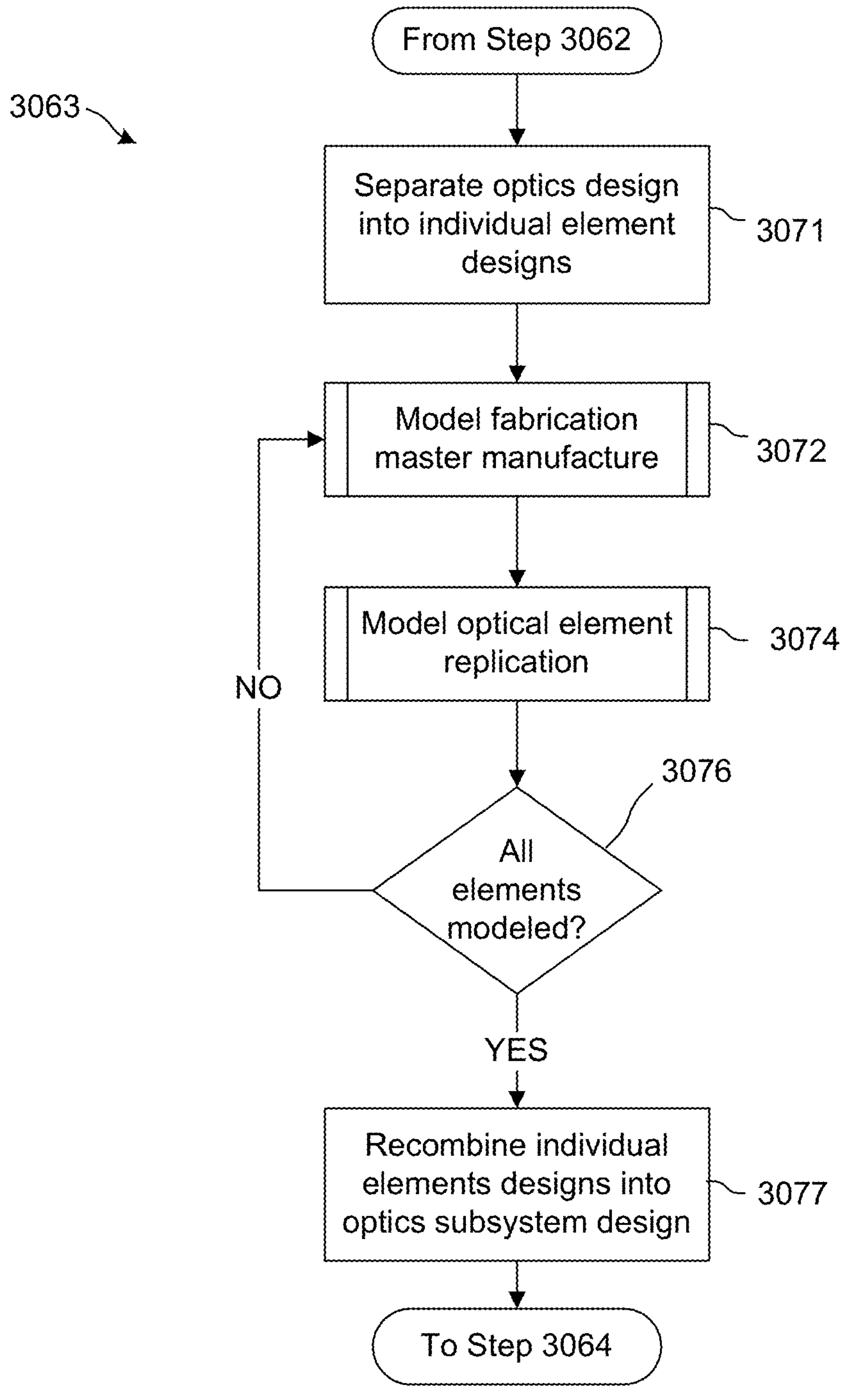
FIG. 94 is a flowchart showing an exemplary set of steps for modeling the realization process in FIG. 93.

FIG. 94 is a flowchart showing details of modeling the realization process shown in step 3063 of FIG. 93. In step 3071, the optics subsystem design is separated into arrayed optics designs. For example, each arrayed optics design in a layered optics arrangement and/or wafer level optics designs may be analyzed separately. In step 3072, the feasibility and associated errors of manufacturing a fabrication master for each arrayed optics design is modeled. In step 3074, the feasibility and associated errors of replicating the arrayed optics design from the fabrication master is modeled. Each of these steps is later discussed in further detail at an appropriate juncture. After all arrayed optics designs are modeled (step 3076), the arrayed optics designs are recombined in step 3077 into the optics subsystem design at step 3077 to be used to predict as-built performance of the optics subsystem design. The resulting optics subsystem design is directed to step 3064 of FIG. 93.

Figure 95:
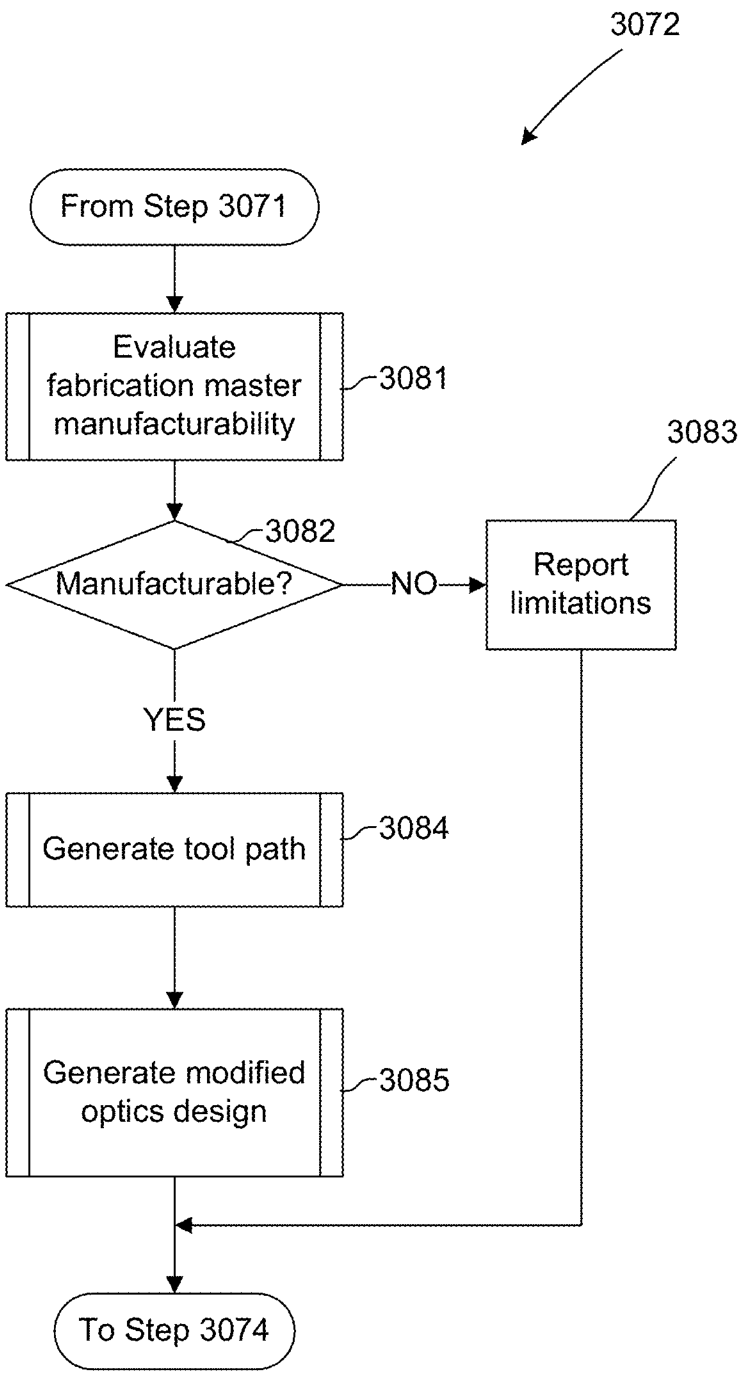
FIG. 95 is a flowchart showing an exemplary process for modeling the manufacture of fabrication masters, according to an embodiment.

FIG. 95 is a flowchart showing further details of step 3072 (FIG. 94) for modeling the manufacture of a given fabrication master. In step 3081, the manufacturability of the given fabrication master is evaluated. In a decision 3082, a determination is made as to whether manufacture of the fabrication master is feasible with the current arrayed optics design. If the answer to decision 3082 is YES, the fabrication master is manufacturable, then the tool path and associated numerical control part program for input design and current process parameters for the manufacturing machinery are generated in step 3084. A modified arrayed optics design may also be generated in step 3085, taking into account changes and/or errors inherent to the manufacturing process of the fabrication master. If the outcome of decision 3082 is NO, the fabrication master using the present arrayed optics design is not manufacturable given established design constraints or limits of process parameters, then, at step 3083, a report is generated which details the limitations determined in step 3081. For example, the report may indicate if modifications to process parameters (e.g., machine configuration and tooling) or optics subsystem design itself may be necessary. Such a report may be viewed by a user or output to software or a machine configured for evaluating the report.

Figure 96:
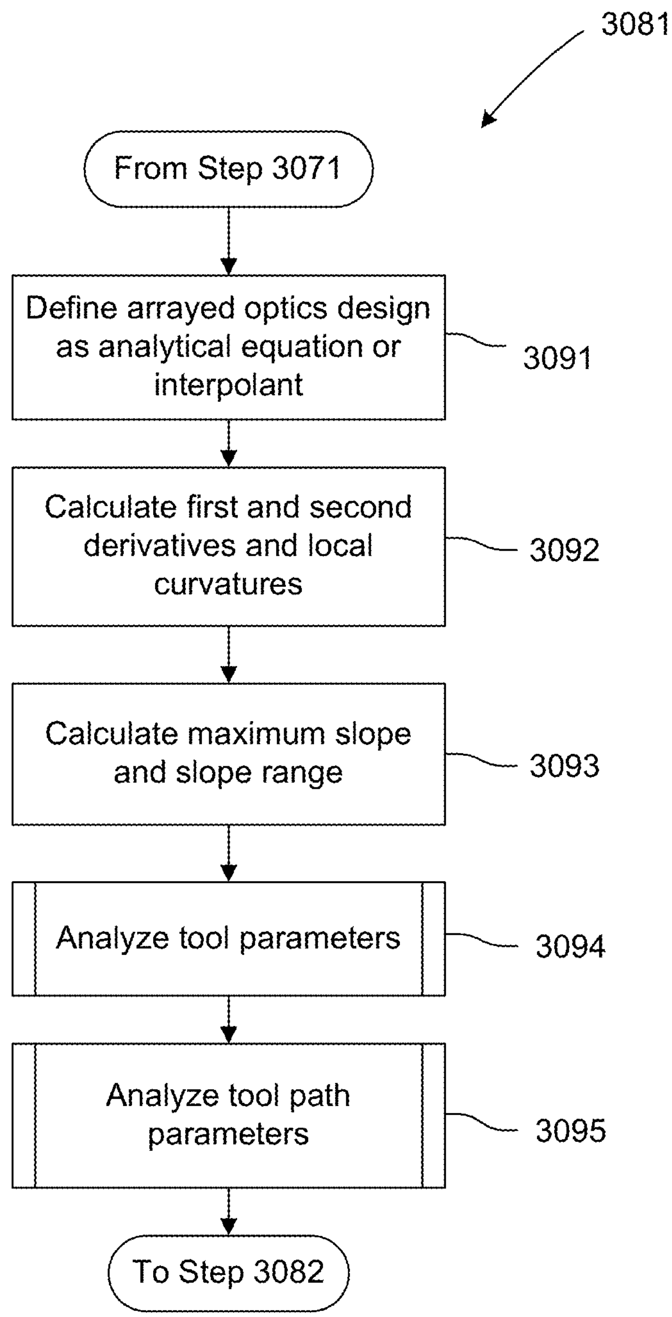
FIG. 96 is a flowchart showing an exemplary process for evaluating fabrication master manufacturability, according to an embodiment.

FIG. 96 is a flowchart showing further details of step 3081 (FIG. 95) for evaluating the manufacturability of a given fabrication master. As shown in FIG. 96, at step 3091, the arrayed optics design is defined as an analytical equation or interpolant. In step 3092, the first and second derivatives and local radii of curvatures are calculated for the arrayed optics design. In step 3093, the maximum slope and slope range is calculated for the arrayed optics design. Tool and tool path parameters required for machining the optics are analyzed in steps 3094 and 3095, respectively, and are discussed in detail below.

Figure 97:
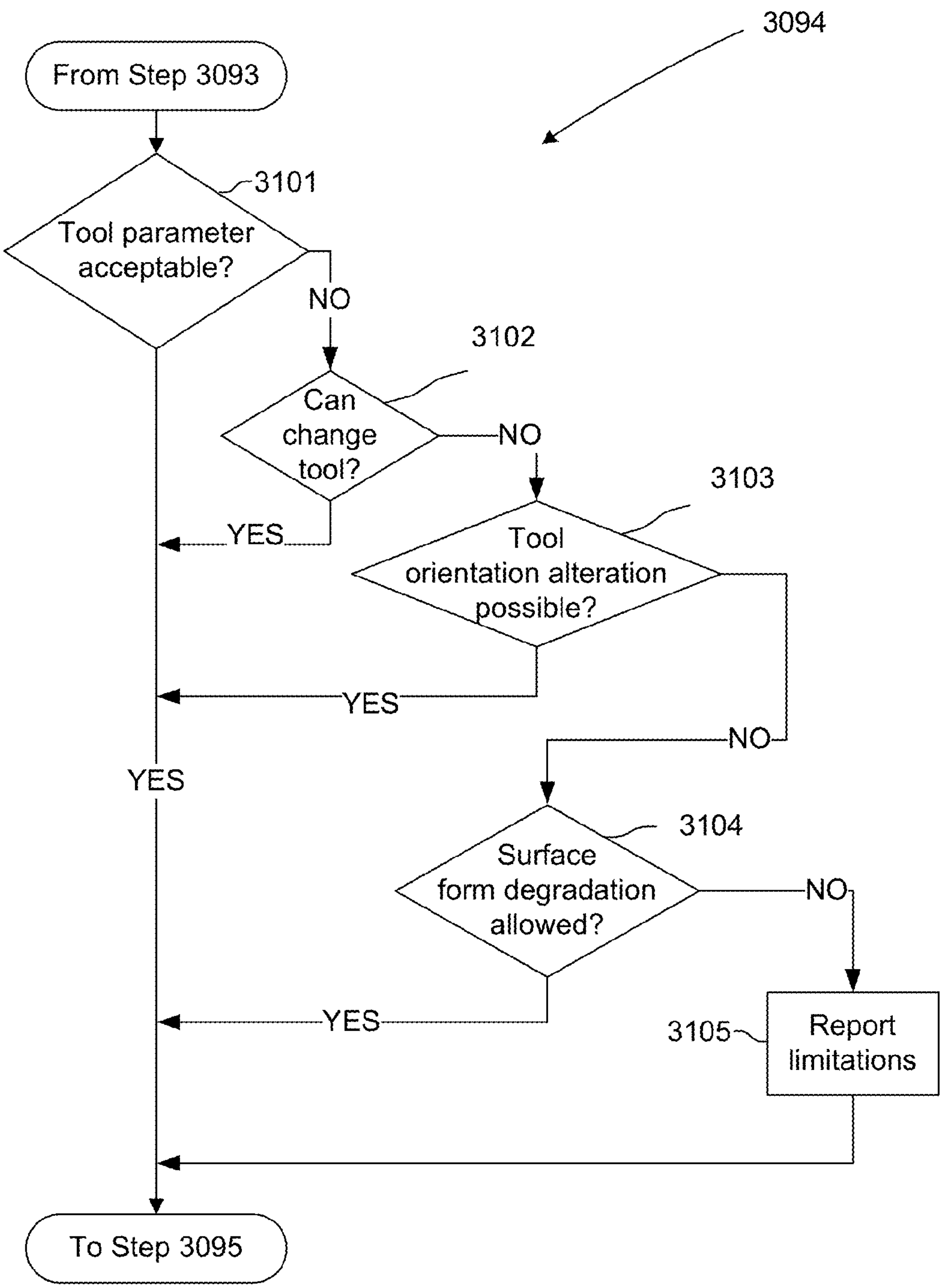
FIG. 97 is a flowchart showing an exemplary process for analyzing a tool parameter, according to an embodiment.

FIG. 97 is a flowchart showing further details of step 3094 (FIG. 96) for analyzing a tool parameter. Exemplary tool parameters include tool tip radius, a tool included angle and tool clearances. Analysis of tool parameters for a tool's use to be feasible or acceptable may include, for example, determining whether the tool tip radius is less than the minimum local radius of curvature required for the fabrication of a surface, whether the tool window is satisfied and whether the tool primary and side clearances are satisfied.

As shown in FIG. 97, at a decision 3101, if it is determined that a particular tool parameter is not acceptable for use in the manufacture of a given fabrication master, then additional evaluations are performed to determine whether the intended function may be performed by using a different tool (decision 3102), by altering tool positioning or orientation such as tool rotation and/or tilt (decision 3103) or whether surface form degradation is allowed such that anomalies in the manufacturing process may be tolerated (decision 3104). For example, in diamond turning, if the tool tip radius of a tool is larger than the smallest radius of curvature in the surface design in the radial coordinate, then features of the arrayed optics design will not be fabricated faithfully by that tool and extra material may be left behind and/or removed. If none of decisions 3101, 3102, 3103 and 3104 indicates that the tool parameter of the tool in question is acceptable, then, at step 3105, a report may be generated which details the relevant limitations determined in those previous decisions.

Figure 98:
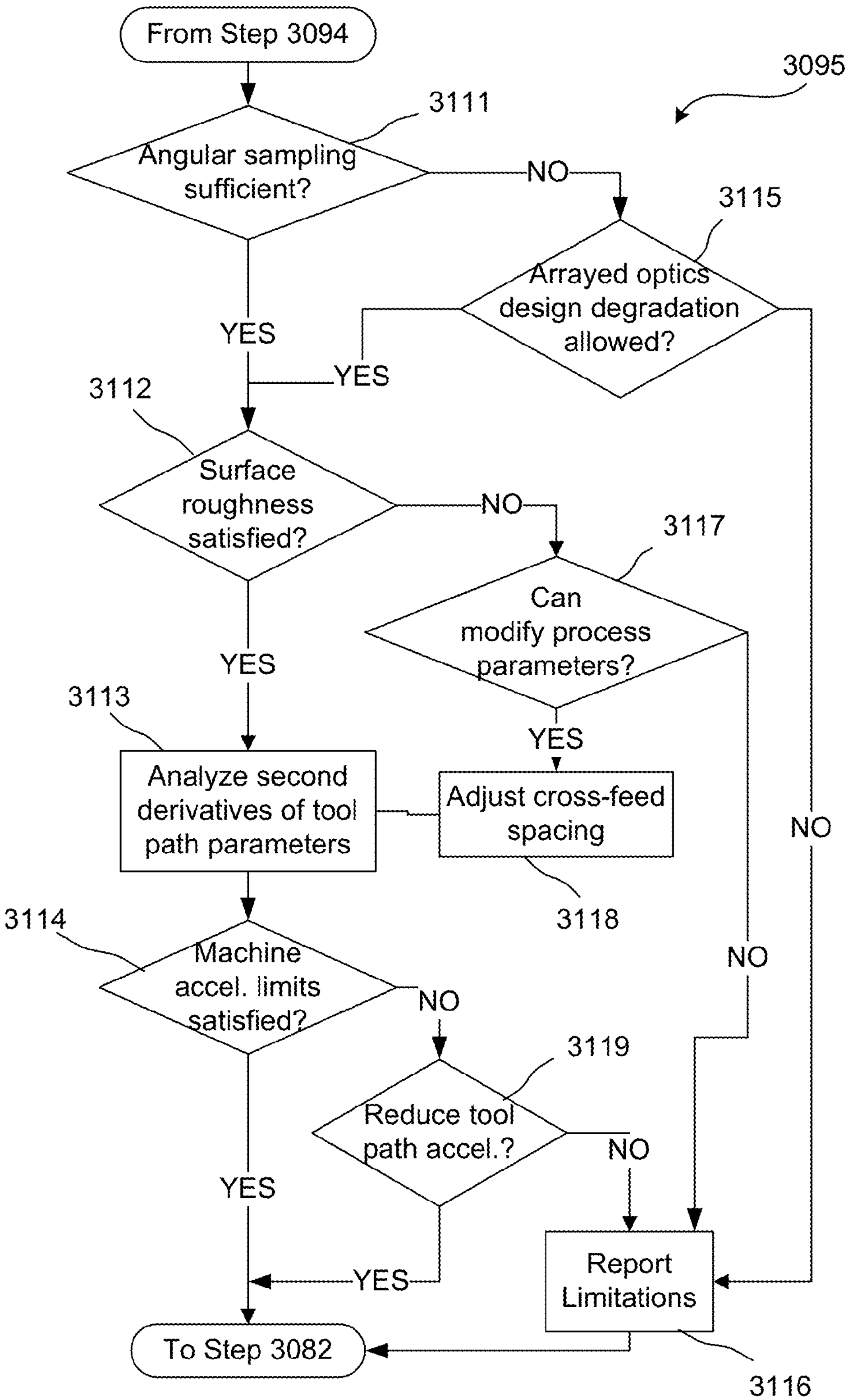
FIG. 98 is a flowchart showing an exemplary process for analyzing tool path parameters, according to an embodiment.

FIG. 98 is a flowchart illustrating further details of step 3095 for analyzing tool path parameters. As shown in FIG. 98, a determination is made in decision 3111 whether there is sufficient angular sampling for a given tool path to form the required features in the arrayed optics design. Decision 3111 may involve, for example, frequency analysis. If the outcome of decision 3111 is YES, the angular sampling is sufficient, then, in a decision 3112, it is determined whether the predicted optical surface roughness is less than a predetermined acceptable value. If the outcome of decision 3112 is YES, the surface roughness is satisfactory, then analysis of the second derivatives for the tool path parameters is performed in step 3113. In a decision 3114, a determination is made as to whether the fabricating machine acceleration limits would be exceeded during the fabrication master manufacturing process.

Continuing to refer to FIG. 98, if it is the outcome of decision 3111 is NO, the tool path does not have sufficient angular sampling, then it is determined, in a decision 3115, whether arrayed optics design degradation due to insufficient angular sampling may be allowable. If the outcome of decision 3115 is YES, arrayed optics design degradation is allowed, then the process proceeds to aforedescribed decision 3112. If the outcome of decision 3115 is NO, arrayed optics design degradation is not allowed, then a report may be generated, at step 3116, which details the relevant limitations of the present tool path parameters. Alternatively, a follow-up decision may be made to determine whether the angular sampling may be adjusted to reduce the arrayed optics design degradation and, if the outcome of the follow-up decision is YES, then such an adjustment in the angular sampling may be performed.

Still referring to FIG. 98, if the outcome of decision 3112 is NO, the surface roughness is larger than the predetermined acceptable value, then a decision 3117 is made to determine whether the process parameters (e.g., cross-feed spacing of the manufacturing machinery) may be adjusted to sufficiently reduce the surface roughness. If the outcome of decision 3117 is YES, the process parameters may be adjusted, then adjustments to the process parameters are made in step 3118. If the outcome of decision 3117 is NO, the process parameters may not be adjusted, then the process may proceed to report generating step 3116.

Further referring to FIG. 98, if the outcome of decision 3114 is NO, the machine acceleration limits would be exceeded during the fabrication process, then a decision 3119 is made to determine whether the acceleration of the tool path may be reduced without degrading the fabrication master beyond an acceptable limit. If the outcome of decision 3119 is YES, the tool path acceleration may be reduced, then the tool path parameters are considered to be within acceptable limits and the process progresses to decision 3082 of FIG. 95. If the outcome of decision 3119 is NO, the tool path acceleration may not be reduced without degrading the fabrication master, the process proceeds to report generating step 3116.

Figure 99:
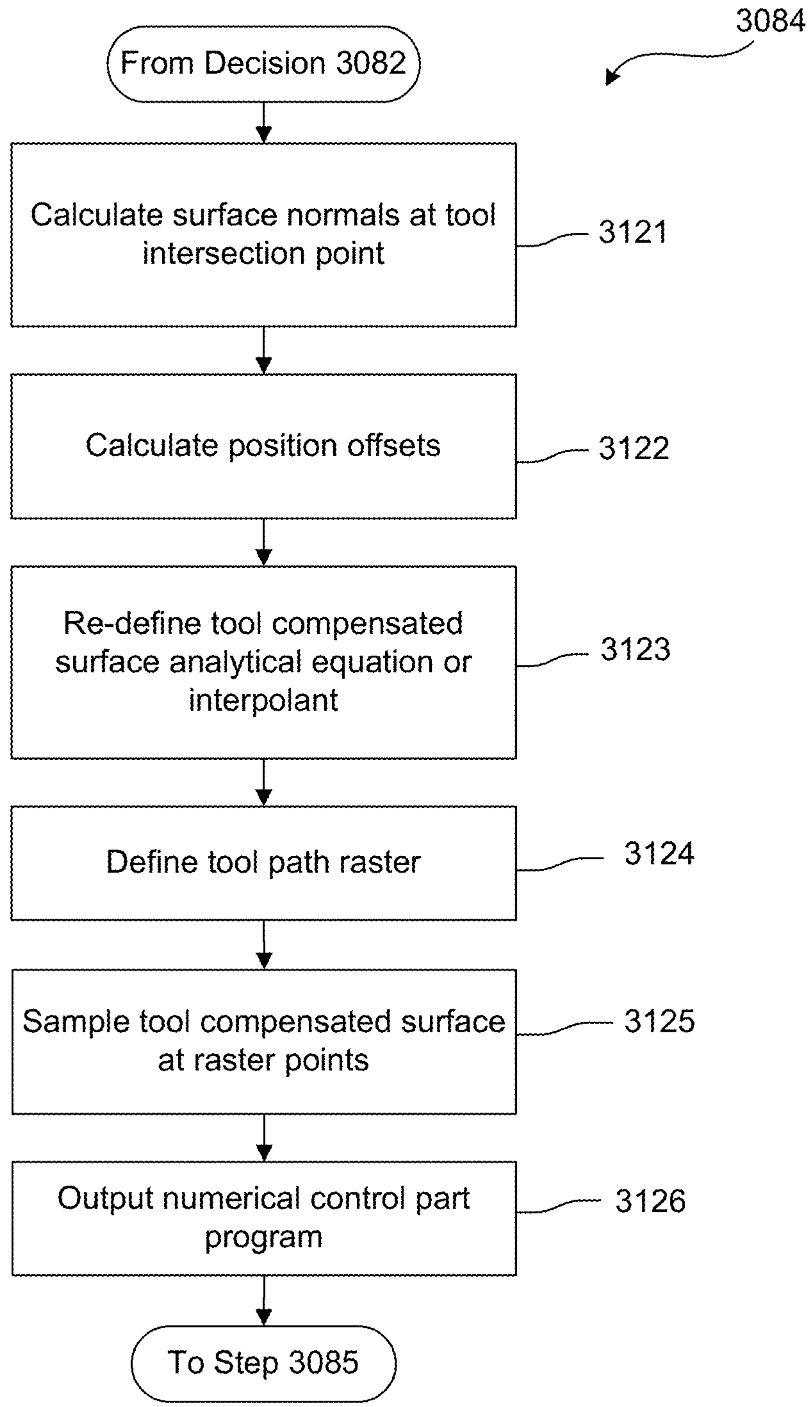
FIG. 99 is a flowchart showing an exemplary process for generating a tool path, according to an embodiment.

FIG. 99 is a flowchart showing further details of step 3084 (FIG. 95) for generating a tool path, which is an actual positioning path of a given tool along a tool compensated surface that results in a tool point (e.g., for diamond tools) or a tool surface (e.g., for grinders) cutting a desired surface in a material. As shown in FIG. 99, at a step 3121 surface normals are calculated at tool intersection points. At a step 3122, position offsets are calculated. A tool compensated surface analytical equation or interpolant is then re-defined at step 3123, and a tool path raster is defined at a step 3124. At a step 3125, the tool compensated surface is sampled at raster points. At a step 3126, a numerical control part program is output as the process continues to a step 3085 (FIG. 95).

Figure 100:
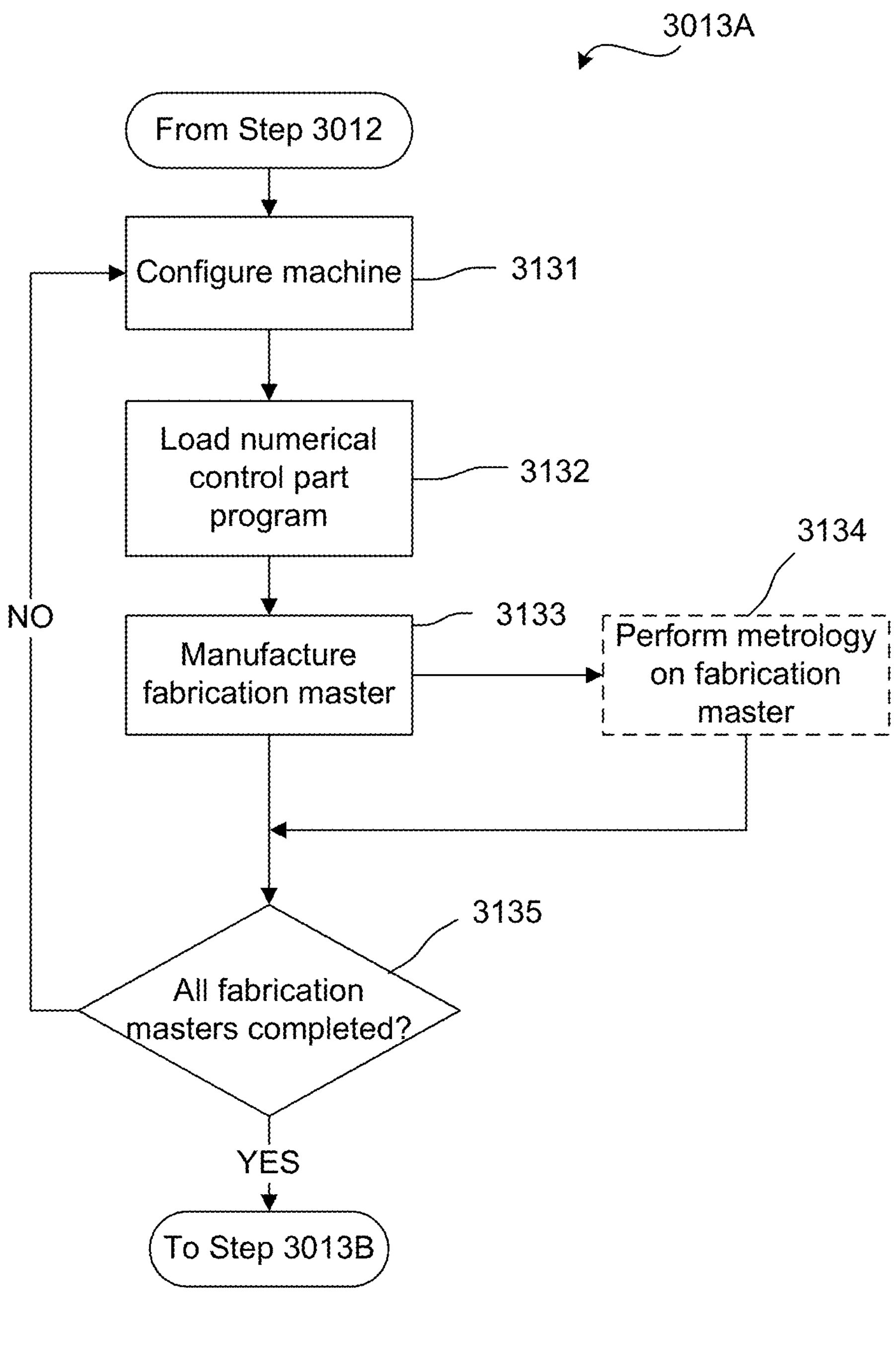
FIG. 100 is a flowchart showing an exemplary process for manufacturing a fabrication master, according to an embodiment.

FIG. 100 is a flowchart showing an exemplary process 3013A for manufacturing fabrication masters for implementing the arrayed optics design. As shown in FIG. 100, initially, at step 3131, the machine for manufacturing the fabrication masters is configured. Details of the configuration step will be discussed in further detail at an appropriate juncture hereinafter. At step 3132, the numerical control part program (e.g., from step 3126 of FIG. 99) is loaded into the machine. A fabrication master is then manufactured, at step 3133. As an optional step, metrology may be performed on the fabrication master, at step 3134. Steps 3131-3133 are repeated until all desired fabrication masters have been manufactured (per step 3135).

Figure 101:
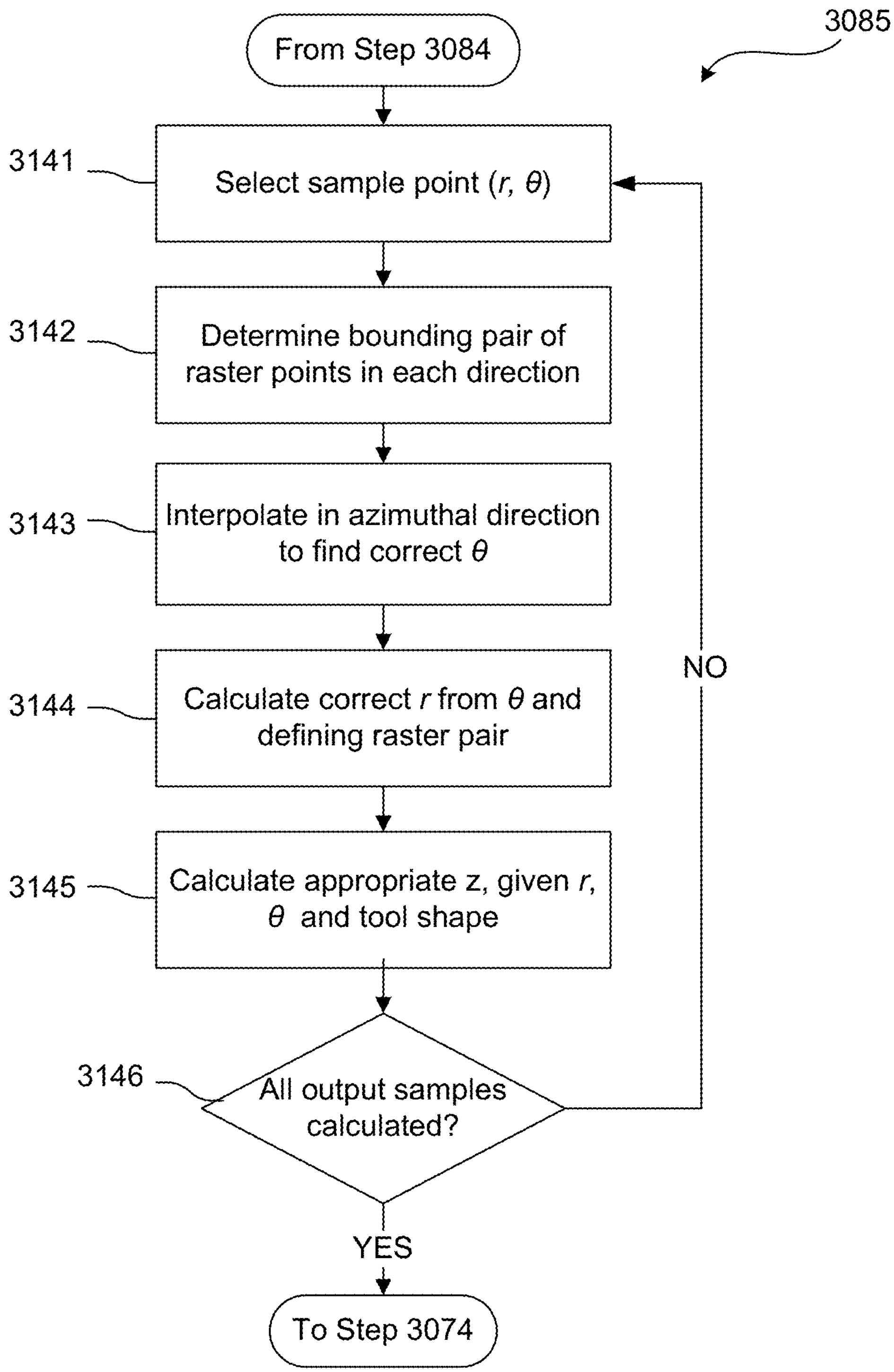
FIG. 101 is a flowchart showing an exemplary process for generating a modified optics design, according to an embodiment.

FIG. 101 is a flowchart showing details of step 3085 (FIG. 95) for generating a modified optical element design, taking into account changes and/or errors inherent to the manufacturing process of the fabrication master. As shown in FIG.

101, at step 3141, a sample point ((r, θ), where r is the radius with respect to the center of the fabrication master and θ is the angle from a reference point that intersects the sample point) on the optical element is selected. The bounding pair of raster points in each direction is then determined, at step 3142. At step 3143, interpolation in the azimuthal direction is performed to find the correct value for θ. The correct value of r is then determined from θ and the defining raster pair, at step 3144. The appropriate Z value, given r, θ and tool shape, is then calculated, at step 3145. Steps 3141 through 3145 are then performed for all points related to an optical element to be sampled (step 3146), to generate a representation of the optical element design after fabrication.

Figure 102:
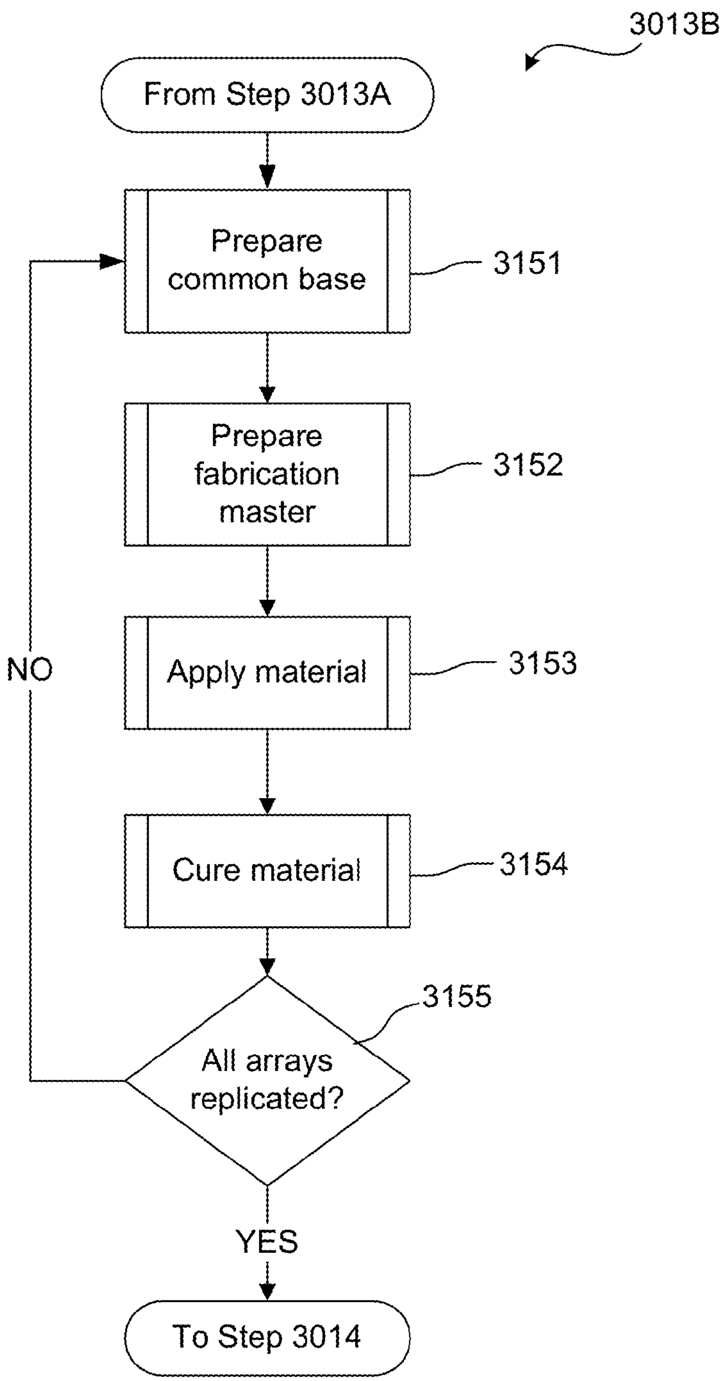
FIG. 102 is a flowchart showing an exemplary replication process for forming arrayed optics, according to an embodiment.

FIG. 102 is a flowchart showing further details of step 3013B for fabricating imaging system components; specifically, FIG. 102 shows details of replicating arrayed optical elements onto a common base. As shown in FIG. 102, initially, at step 3151, a common base is prepared for supporting the arrayed optical elements thereon. The fabrication master, used to form the arrayed optical elements, is prepared (e.g., by using the processes described above and illustrated in FIGS. 95-101) in step 3152. A suitable material, such as a transparent polymer, is applied thereto while the fabrication master is brought into engagement with the common base, at step 3153. The suitable material is then cured, at step 3154 to form one of the arrays of optical elements on the common base. Steps 3152-3154 are then repeated until the array of layered optics is complete (per step 3155).

Figure 103:
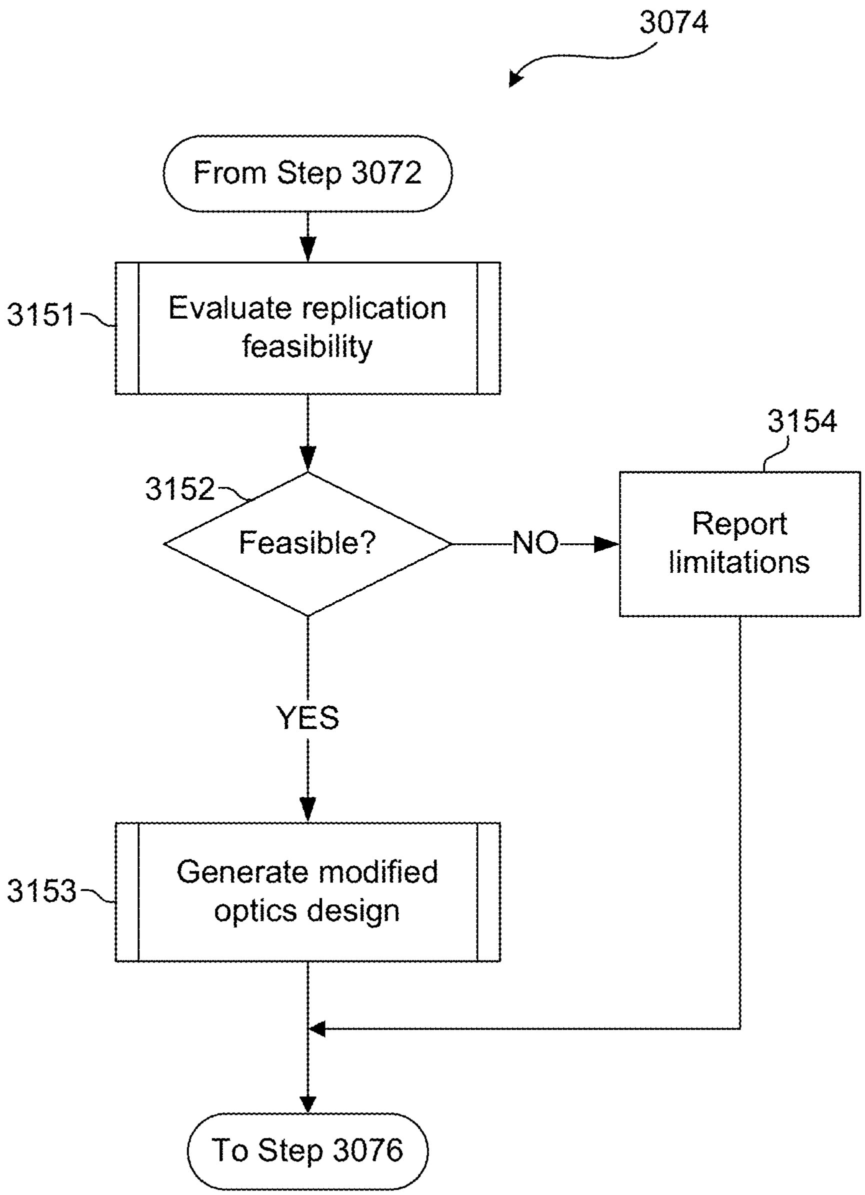
FIG. 103 is a flowchart showing an exemplary process for evaluating replication feasibility, according to an embodiment.

FIG. 103 is a flowchart showing additional details of step 3074 (FIG. 94) for modeling the replication process using fabrication masters. As shown in FIG. 103, replication process feasibility is evaluated at step 3151. In decision 3152, a determination is made whether the replication process is feasible. If the output of decision 3152 is YES, the replication process using the fabrication master is feasible, then a modified optics subsystem design is generated at step 3153. Otherwise, if the result of decision 3152 is NO, the replication process is not feasible, then a report may be generated at step 3154. In like fashion to the process defined by the flowchart of FIG. 103, a process for evaluating metrology feasibility may be performed wherein step 3151 is replaced with the appropriate evaluation of metrology feasibility. Metrology feasibility may, for example, include a determination or analysis of curvatures of an optical element to be fabrication and the ability of a machine, such as an interferometer, to characterize those curvatures.

Figure 104:
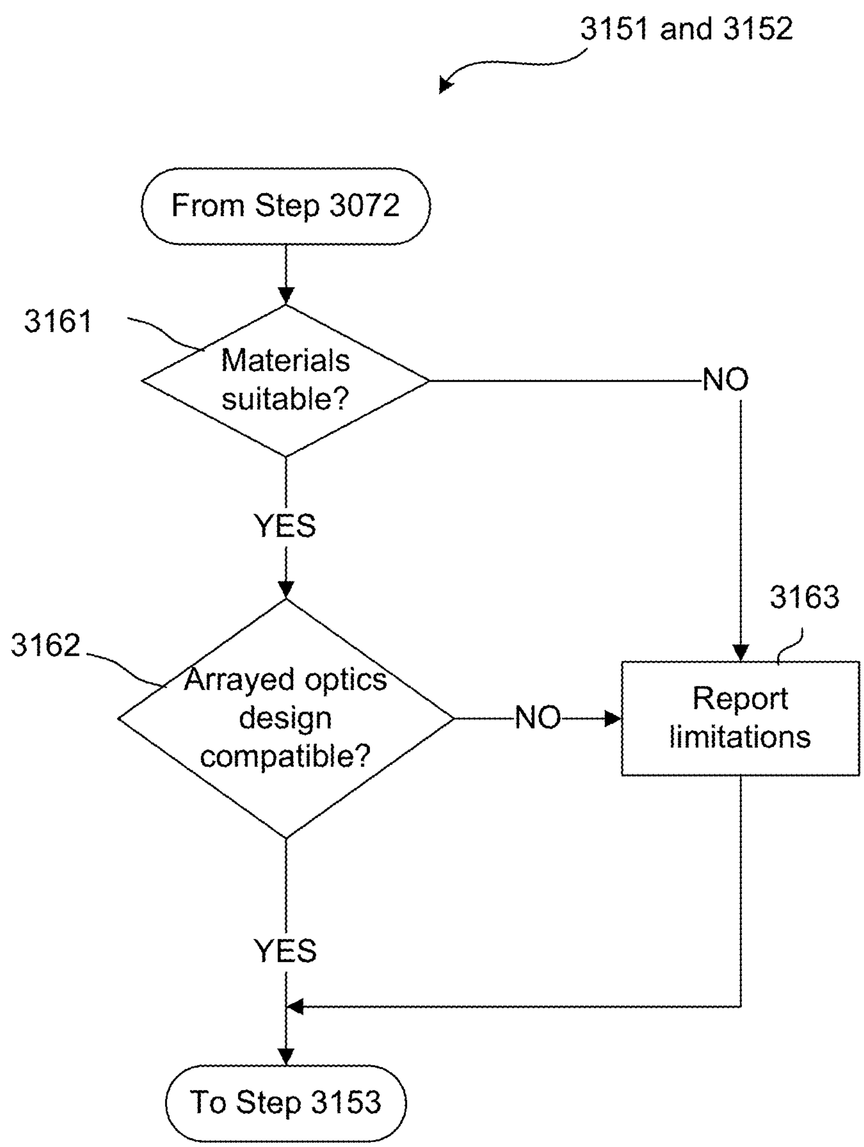
FIG. 104 is a flowchart showing further details of the process of FIG. 103.

FIG. 104 is a flowchart showing additional details of step 3151 for evaluating replication process feasibility. As shown in FIG. 104, in a decision 3161, it is determined whether materials intended for replicating the optical elements are suitable for the imaging system; suitability of a given material may be evaluated in terms of, for instance, material properties such as viscosity, refractive index, curing time, adhesion and release properties, scattering, shrinkage and translucency of a given material at wavelengths of interest, ease of handling and curing, compatibility with other materials used in the imaging system and robustness of the resulting optical element. Another example is evaluating a glass transition temperature and whether it is suitably above the replication process temperatures and operating and storage temperatures of the optics subsystem design. If an ultraviolet light ("UV") curable polymer, for example, has a transition temperature of roughly room temperature, then this material is likely not feasible for use in a layered optical element design which may be subject to temperatures of 100° C. as part of the detector soldering fabrication step.

If the output of decision 3161 is YES, the material is suitable for replication of optical elements therewith, then the process progresses to a decision 3162, where a determination is made as to whether the arrayed optics design is compatible with the material selected at step 3161. Determination of arrayed optics design compatibility may include, for instance, examination of the curing procedure, specifically from which side of a common base arrayed optics are cured. If the arrayed optics are cured through the previously formed optics, then curing time may be significantly increased and degradations or deformations of the previously formed optics may result. While this effect may be acceptable in some designs with few layers and materials that are insensitive to over-curing and temperature increases, it may be unacceptable in designs with many layers and temperature-sensitive materials. If either decision 3161 or 3162 indicates that the intended replication process is outside of acceptable limits, then a report is generated at step 3163.

Figure 105:
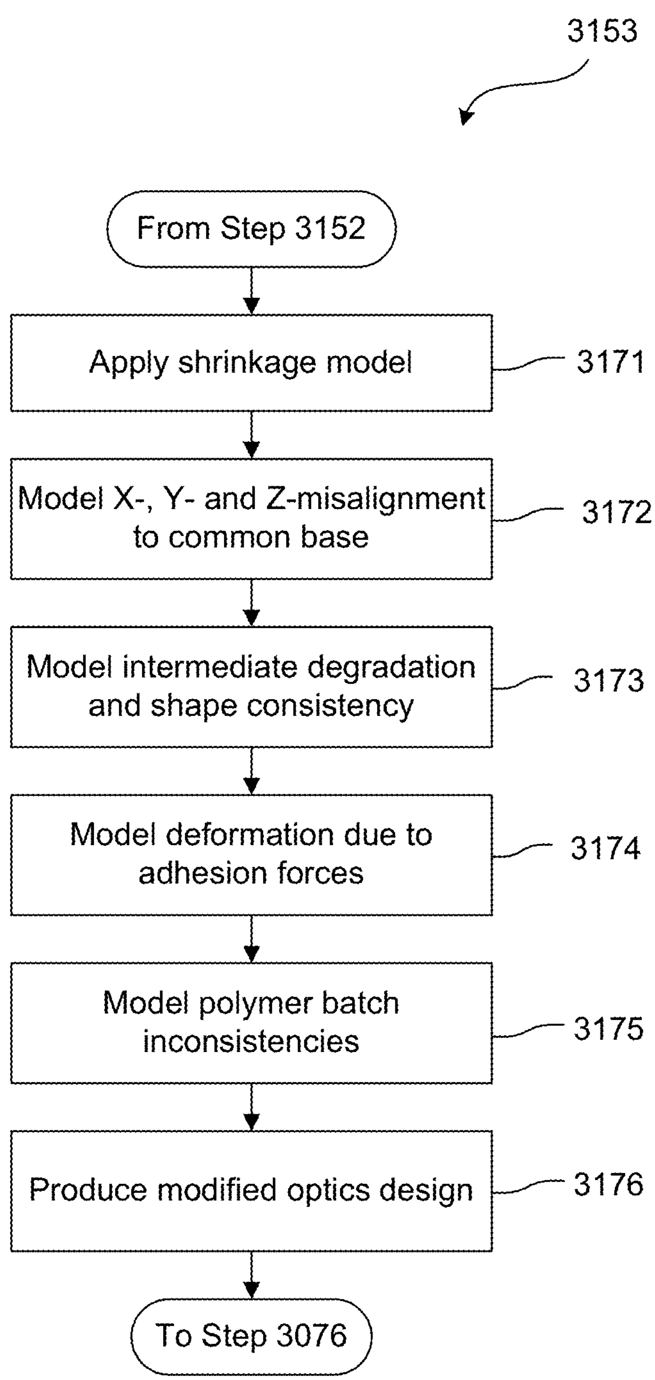
FIG. 105 is a flowchart showing an exemplary process for generating a modified optics design, considering shrinkage effects, according to an embodiment.

FIG. 105 is a flowchart showing additional details of step 3153 (FIG. 103) for generating a modified optics design. As shown in FIG. 105, at step 3171, a shrinkage model is applied to the fabricated optics. Shrinkage may alter the surface shape of a replicated optical element, thereby affecting potential aberrations present in the optics subsystem. These aberrations may introduce negative effects (e.g., defocus) to the performance of the assembled, arrayed imaging systems. Next, in step 3172, X-, Y- and Z-axis misalignments with respect to the common base are taken into consideration. The intermediate degradation and shape consistency are then taken into account, at step 3173. Next, at step 3174, the deformation due to adhesion forces is modeled. Finally, polymer batch inconsistencies are modeled, at step 3175 to yield a modified optics design in step 3176. All of the parameters discussed in this paragraph are the principal replication issues that can cause arrayed imaging systems to perform worse than they are designed to. The more these parameters are minimized and/or taken into account in the design of the optics subsystem, the closer the optics subsystem will perform to its specification.

Figure 106:
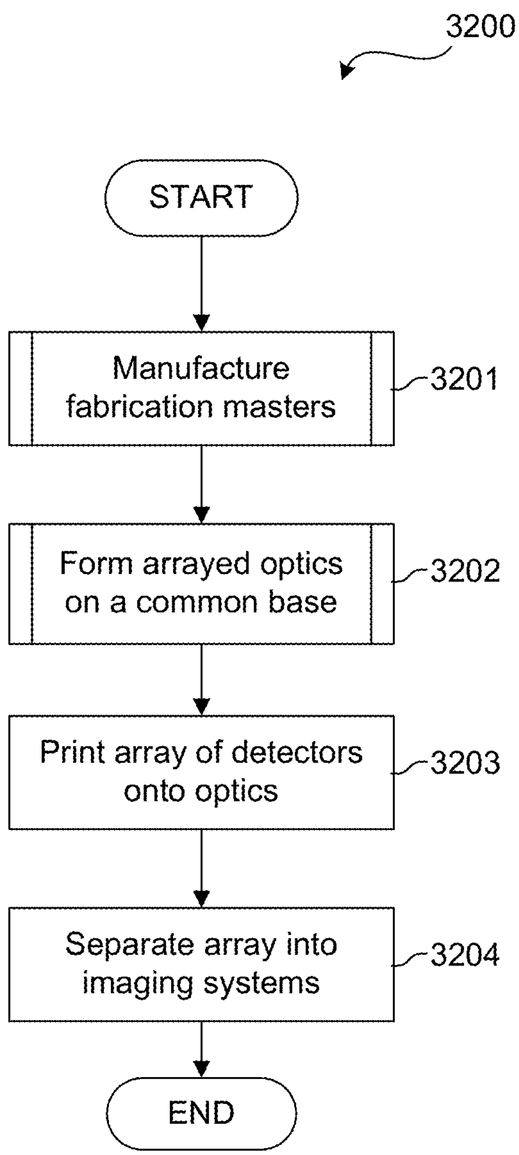
FIG. 106 is a flowchart showing an exemplary process for fabricating arrayed imaging systems based upon the ability to print or transfer detectors onto optical elements, according to an embodiment.

FIG. 106 is a flowchart showing an exemplary process 3200 for fabricating arrayed imaging systems based upon an ability to print or transfer the detectors onto optics. As shown in FIG. 106, initially, at a step 3201, the fabrication masters are manufactured. Next, arrayed optics are formed onto a common base, using the fabrication masters, at a step 3202. At a step 3203, an array of detectors is printed or transferred onto the arrayed optics (details of the detector printing processes are later discussed at an appropriate point in the disclosure). Finally, at a step 3204, the common base and arrayed optics may be separated into a plurality of imaging systems.

Figure 107:
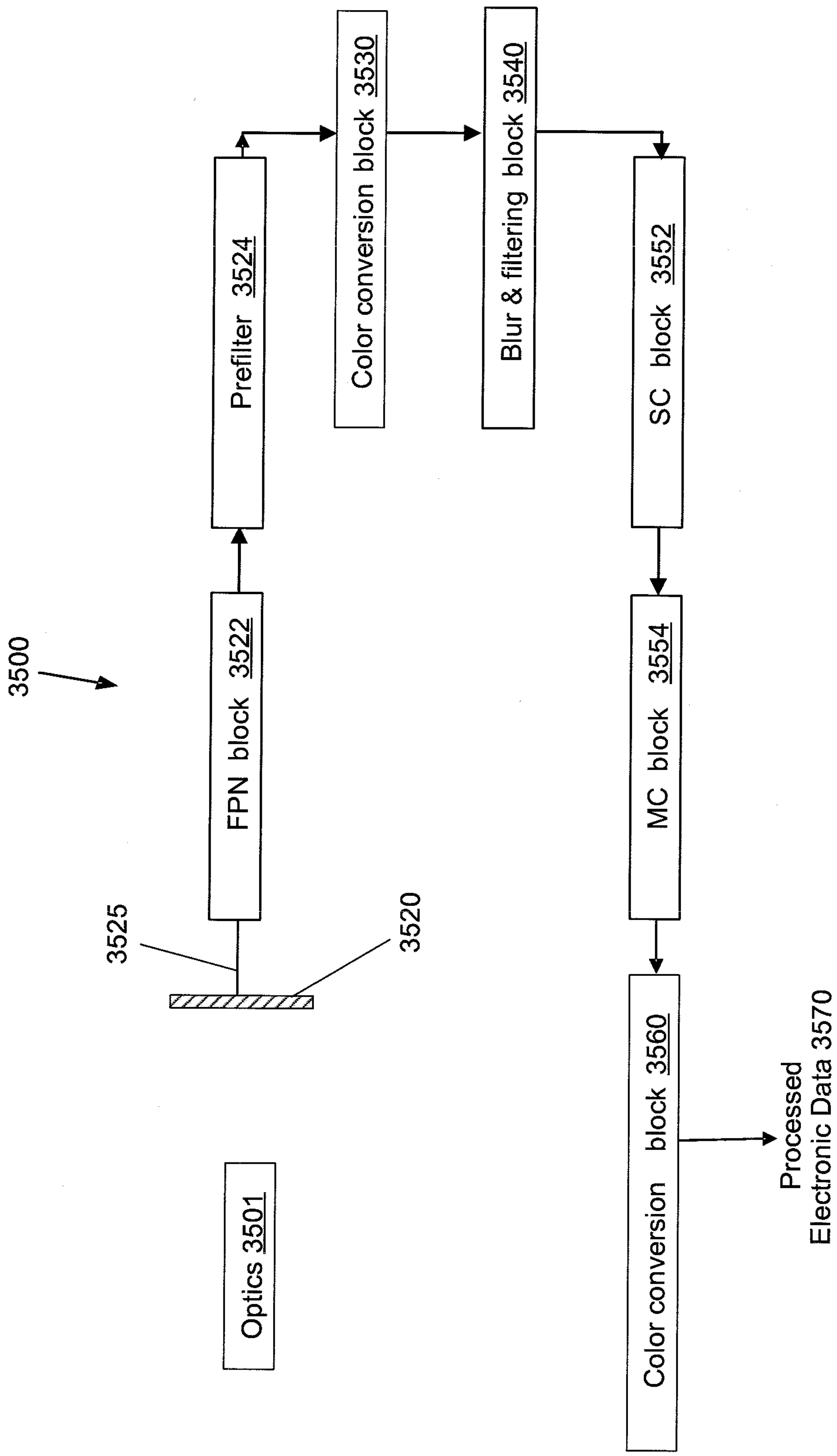
FIG. 107 is a schematic diagram of an imaging system processing chain, according to an embodiment.

FIG. 107 illustrates an imaging system processing chain. System 3500 includes optics 3501 that cooperate with a detector 3520 to form electronic data 3525. Detector 3520 may include buried optical elements and sub-wavelength features. In particular, electronic data 3525 from detector 3520 is processed by a series of processing blocks 3522, 3524, 3530, 3540, 3552, 3554 and 3560 to produce a processed image 3570. Processing blocks 3522, 3524, 3530, 3540, 3552, 3554 and 3560 represent image processing functionality that may be, for example, implemented by electronic logic devices that perform the functions described herein. Such blocks may be implemented by, for example, one or more digital signal processors executing software instructions; alternatively, such blocks may include discrete logic circuits, application specific integrated circuits ("ASICs"), gate arrays, field programmable gate arrays ("FPGAs"), computer memory and portions or combinations thereof.

Processing blocks 3522 and 3524 operate to preprocess electronic data 3525 for noise reduction. In particular, a fixed pattern noise ("FPN") block 3522 corrects for fixed pattern noise (e.g., pixel gain and bias, and nonlinearity in response) of detector 3520; a prefilter 3524 further reduces noise from electronic data 3525 and/or prepares electronic data 3525 for subsequent processing blocks. A color conversion block 3530 converts color components (from electronic data 3525) to a new colorspace. Such conversion of color components may be, for example, individual red (R), green (G) and blue (B) channels of a red-green-blue ("RGB") colorspace to corresponding channels of a luminance-chrominance ("YUV") colorspace; optionally, other colorspaces such as cyan-magenta-yellow ("CMY") may also be utilized. A blur and filtering block 3540 removes blur from the new colorspace images by filtering one or more of the new colorspace channels. Blocks 3552 and 3554 operate to post-process data from block 3540, for example, to again reduce noise. In particular, single channel ("SC") block 3552 filters noise within each single channel of electronic data using knowledge of digital filtering within block 3540; multiple channel ("MC") block 3554 filters noise from multiple channels of data using knowledge of the digital filtering within blur and filtering block 3540. Prior to processed electronic data 3570, another color conversion block 3560 may for example convert the colorspace image components back to RGB color components.

Figure 108:
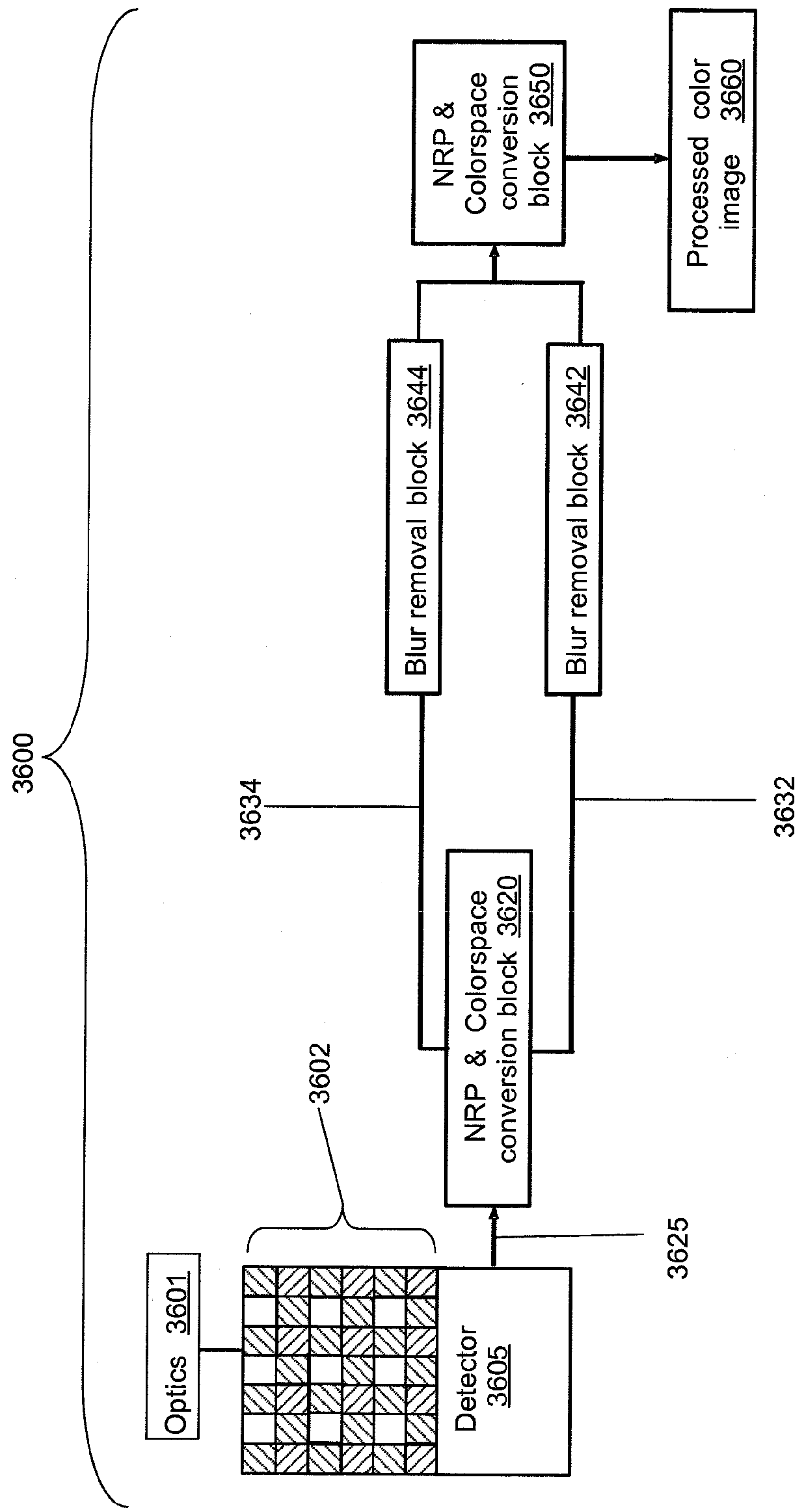
FIG. 108 is a schematic diagram of an imaging system with color processing, according to an embodiment

FIG. 108 schematically illustrates an imaging system 3600 with color processing. Imaging system 3600 produces a processed three-color image 3660 from captured electronic data 3625 formed at a detector 3605, which includes a color filter array 3602. Color filter array 3602 and detector 3605 may include buried optical elements and sub-wavelength features. Imaging system 3600 employs optics 3601, which may include a phase modifying element to code phase of a wavefront of electromagnetic energy transmitted through optics 3601 to produce captured electronic data 3625 at detector 3605. An image represented by captured electronic data 3625 includes a phase modification effected by the phase modifying element in optics 3601. Optics 3601 may include one or more layered optical elements. Detector 3605 generates captured electronic data 3625 that is processed by noise reduction processing ("NRP") and colorspace conversion block 3620. NRP functions, for example, to remove detector nonlinearity and additive noise, while the colorspace conversion functions to remove spatial correlation between composite images to reduce an amount of logic and/or memory resources required for blur removal processing (which will be later performed in blocks 3642 and 3644). Output from NRP and colorspace conversion block 3620 is in the form of electronic data that is split into two channels: 1) a spatial channel 3632; and 2) one or more color channels 3634. Channels 3632 and 3634 are sometimes called "data sets" of an electronic data herein. Spatial channel 3632 has more spatial detail than color channels 3634. Accordingly, spatial channel 3632 may require the majority of blur removal within a blur removal block 3642. Color channels 3634 may require substantially less blur removal processing within blur removal block 3644. After processing by blur removal blocks 3642 and 3644, channels 3632 and 3634 are again combined for processing within NRP & colorspace conversion block 3650. NRP & colorspace conversion block 3650 further removes image noise accentuated by blur removal and transforms the combined image back into RGB format to form processed three-color image 3660. As above, processing blocks 3620, 3642, 3644 and 3650 may include one or more digital signal processors executing software instructions, and/or discrete logic circuits, ASICs, gate arrays, FPGAs, computer memory and portions or combinations thereof.

Figure 109:
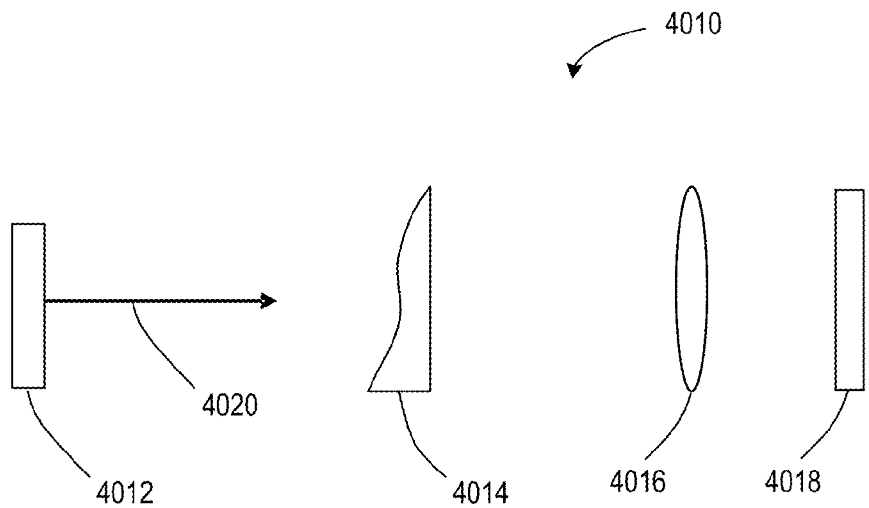
FIG. 109 is a diagrammatic illustration of a prior art imaging system including a phase modifying element, such as that disclosed in the aforementioned ’371 patent.

FIG. 109 shows an extended depth of field ("EDoF") imaging system utilizing a predetermined phase modification, such as wavefront coding disclosed in the '371 patent. EDoF imaging system 4010 includes an object 4012 imaged through a phase modifying element 4014 and an optical element 4016 onto a detector 4018. Phase modifying element 4014 is configured for encoding a wavefront of electromagnetic energy 4020 from object 4012 to introduce a predetermined imaging effect into a resulting image at detector 4018. This imaging effect is controlled by phase modifying element 4014 such that, in comparison to a traditional imaging system without such a phase modifying element, misfocus-related aberrations are reduced and/or depth of field of EDoF imaging system 4010 is extended. Phase modifying element 4014 may be configured, for example, to introduce a phase modulation that is a separable, cubic function of spatial variables x and y in the plane of the phase modifying element surface (as discussed in the '371 patent).

As used herein, a non-homogeneous or multi-index optical element is understood as an optical element having properties that are customizable within its three dimensional volume. A non-homogeneous optical element may have, for instance, a non-uniform profile of refractive index or absorption through its volume. Alternatively, a non-homogeneous optical element may be an optical element that has one or more applied or embedded layers having non-uniform refractive index or absorption. Examples of non-uniform refractive index profiles include graded index (GRIN) lenses, or GRADIUM® material available from LightPath Technologies. Examples of layers with non-uniform refractive index and/or absorption include applied films or surfaces that are selectively altered, for example, utilizing photolithography, stamping, etching, deposition, ion implantation, epitaxy or diffusion.

Figure 110:
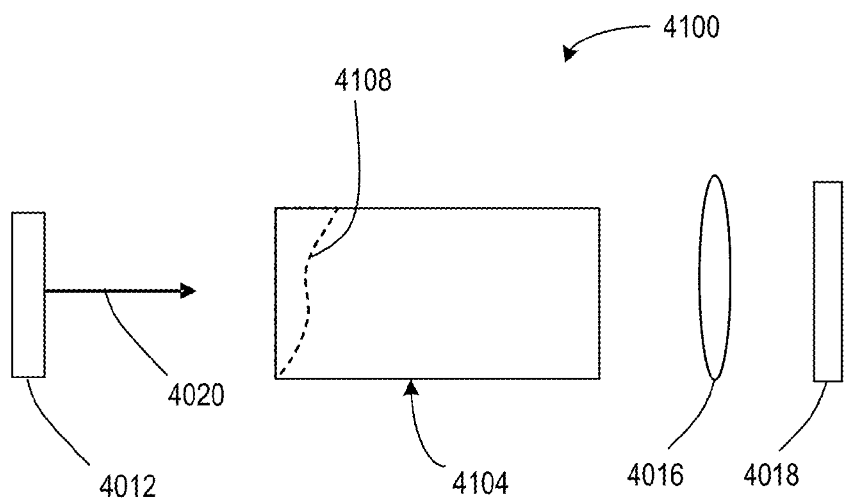
FIG. 110 is a diagrammatic illustration of an imaging system including a multi-index optical element, according to an embodiment.

FIG. 110 shows an imaging system 4100, including a non-homogeneous phase modifying element 4104. Imaging system 4100 resembles EDoF imaging system 4010 (FIG. 109) except that phase modifying element 4104 provides a prescribed phase modulation, replacing phase modifying element 4014 (FIG. 109). Phase modifying element 4104 may be, for instance, a GRIN lens including an internal refractive index profile 4108 for effecting a predetermined phase modification of electromagnetic energy 4020 from object 4012. Internal refractive index profile 4108 is for example designed to modify the phase of electromagnetic energy transmitted therethrough to reduce misfocus-related aberrations in the imaging system. Phase modifying element 4104 may be, for example, a diffractive structure such as a layered diffractive element, a volume hologram or a multi-aperture element. Phase modifying element 4104 may also be a three-dimensional structure with a spatially random or varying refractive index profile. The principle illustrated in FIG. 110 may facilitate implementation of optical designs in compact, robust packages.

Figure 111:
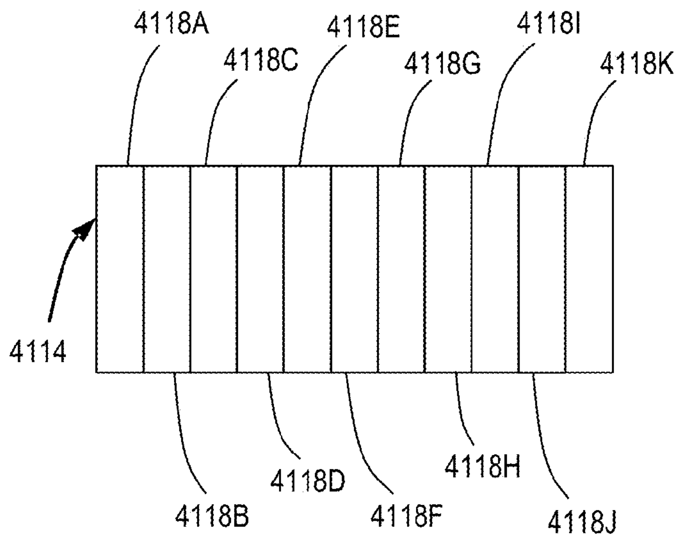
FIG. 111 is a diagrammatic illustration of a multi-index optical element suitable for use in an imaging system, according to an embodiment.

FIG. 111 shows an example of a microstructure configuration of a non-homogeneous phase modifying element 4114. It will be appreciated that the microstructure configuration shown here resembles the configurations shown in FIGS. 3 and 6. Phase modifying element 4114 includes a plurality of layers 4118A-4118K, as shown. Layers 4118A-4118K may be, for example, layers of materials exhibiting different refractive indices (and therefore phase functions) configured such that, in total, phase modifying element 4114 introduces a predetermined imaging effect into a resulting image. Each of layers 4118A-4118K may exhibit a fixed refractive index or absorption (e.g., in the case of a cascade of films) and, alternatively or in addition, the refractive index or absorption of each layer may be made spatially non-uniform within the layer by, for example, lithographic patterning, stamping, oblique evaporation, ion implantation, etching, epitaxy, or diffusion. The combination of layers 4118A-4118K may be configured using, for example, a computer running modeling software to implement a predetermined phase modification on electromagnetic energy transmitted therethrough. Such modeling software was discussed in detail with reference to FIGS. 88-106.

Figure 112:
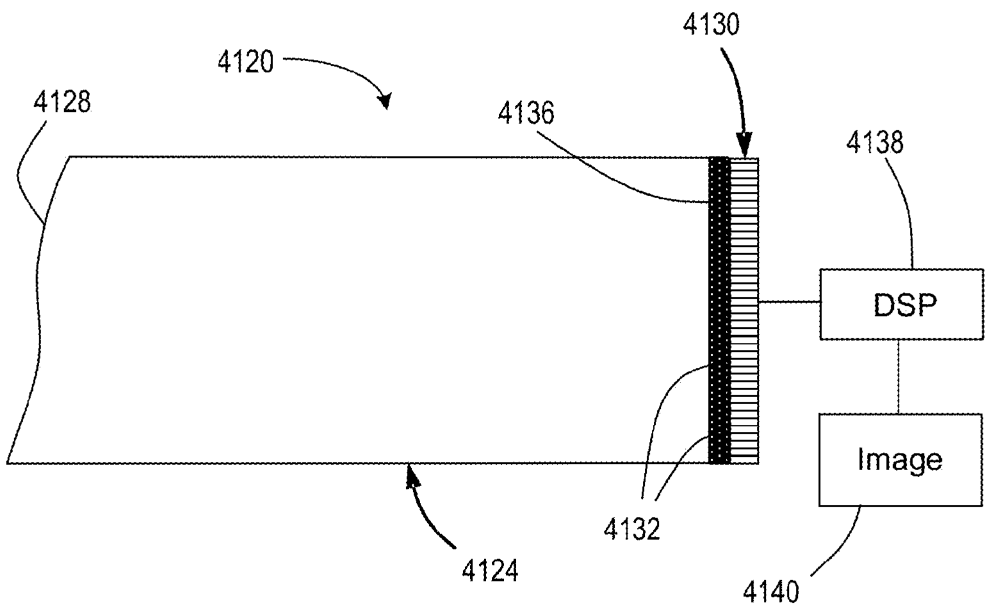
FIG. 112 is a diagrammatic illustration showing a multi-index optical element affixed directly onto a detector, the imaging system further including a digital signal processor (DSP), according to an embodiment.
Figure 113:
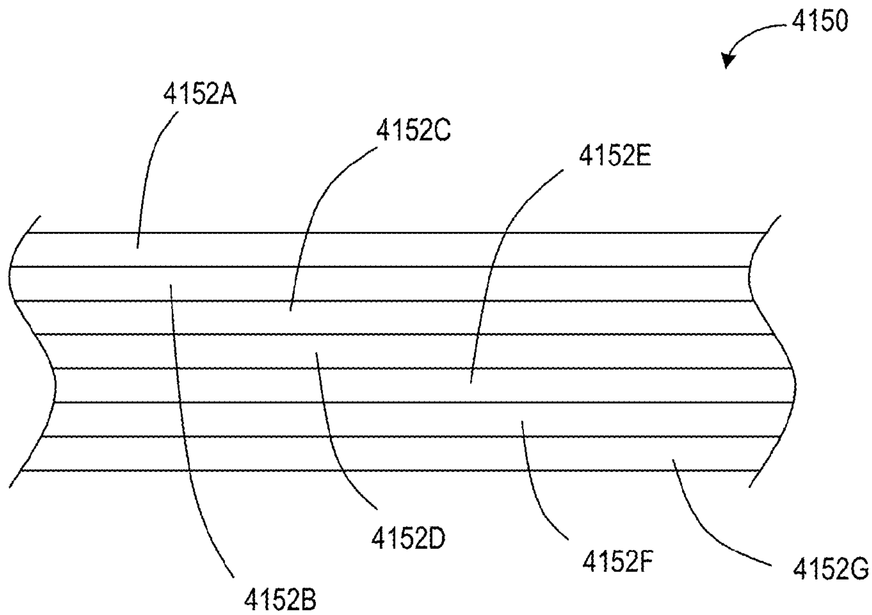
FIGS. 113-117 are a series of diagrammatic illustrations showing a method, in which multi-index optical elements of the present disclosure may be manufactured and assembled, according to an embodiment.

FIG. 112 shows a camera 4120 including non-homogeneous phase modifying elements. Camera 4120 includes a non-homogeneous phase modifying element 4124 having a front surface 4128 with a refractive index profile integrated thereon. In FIG. 112, front surface 4128 is shown to include a phase modifying surface for controlling aberrations and/or reducing sensitivity of captured images to misfocus-related aberrations. Alternatively, front surface 4128 may be shaped to provide optical power. Non-homogeneous phase modifying element 4124 is affixed to a detector 4130, which includes a plurality of detector pixels 4132. In camera 4120, non-homogeneous phase modifying element 4124 is directly mounted on detector 4130 with a bonding layer 4136. Image information captured at detector 4130 may be sent to a digital signal processor ("DSP") 4138, which performs post-processing on the image information. DSP 4138 may, for example, digitally remove imaging effects produced by the phase modification of the image information to produce an image 4140 with reduced misfocus-related aberrations.

The exemplary, non-homogeneous phase modifying element configuration shown in FIG. 112 may be particularly advantageous because non-homogeneous phase modifying element 4124 is, for example, designed to direct input electromagnetic energy over a range of angles of incidence onto detector 4130 while having at least one flat surface that may be directly attached to detector 4130. In this way, additional mounting hardware for the non-homogeneous phase modifying element becomes unnecessary while the non-homogeneous phase modifying element may be readily aligned with respect to detector pixels 4132. For example, camera 4120 including non-homogeneous phase modifying element 4124 sized to approximately 1 millimeter diameter and approximately 5 millimeter length may be very compact and robust (due to the lack of mounting hardware for optical elements, etc.) in comparison to existing camera configurations.

Figure 114:
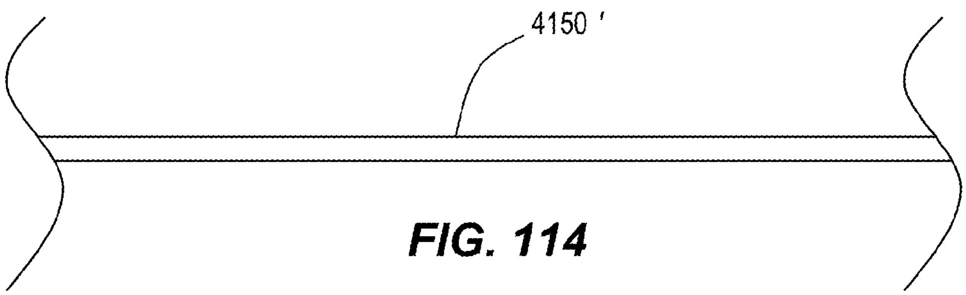
Figure 115:
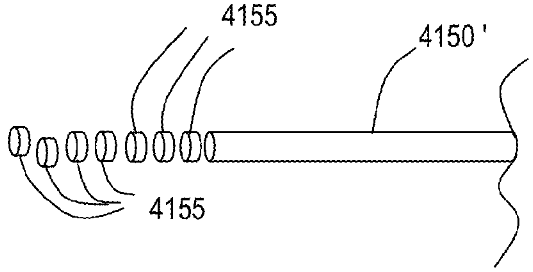
Figure 116:
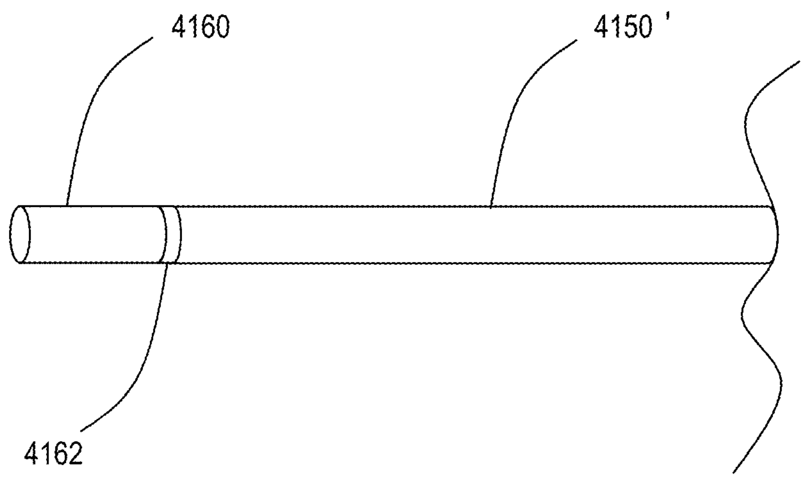
Figure 117:
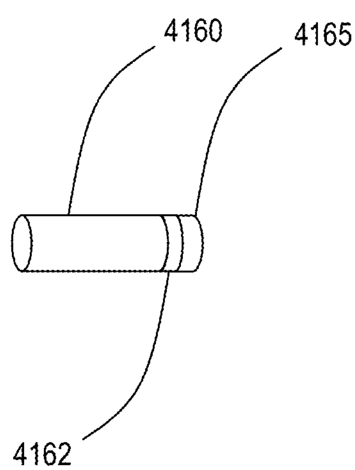

FIGS. 113-117 illustrate a possible fabrication method for non-homogeneous phase modifying elements such as described herein. In a manner analogous to the fabrication of optical fibers or GRIN lenses, a bundle 4150 includes a plurality of rods 4152A-4152G with different refractive indices. Individual values of refractive index for each of rods 4152A-4152G may be configured to provide an aspheric phase profile in cross-section. Bundle 4150 may then be heated and pulled to produce a composite rod 4150' with an aspheric phase profile in cross-section, as shown in FIG. 114. As shown in FIG. 115, composite rod 4150' may then be separated into a plurality of wafers 4155, each with an aspheric phase profile in cross-section with a thickness of each wafer 4155 being determined according to an amount of phase modulation required in a particular application. The aspheric phase profile may be tailored to provide a desired predetermined phase modification for a specific application and may include a variety of profiles such as, but not limited to, a cubic phase profile. Alternatively, a component 4160 (e.g., a GRIN lens or another optical component or any other suitable element for accepting input electromagnetic energy) may be first affixed to composite rod 4150' by a bonding layer 4162, as shown in FIG. 116. A wafer 4165 of a desired thickness (according to an amount of phase modulation desired), as shown in FIG. 117 may be subsequently separated from the rest of composite rod 4150'.

FIGS. 118-130 show numerical modeling configurations and results for a prior art GRIN lens, and FIGS. 131-143 show numerical modeling configurations and results for a non-homogeneous phase modifying element designed in accordance with the present disclosure.

Figure 118:
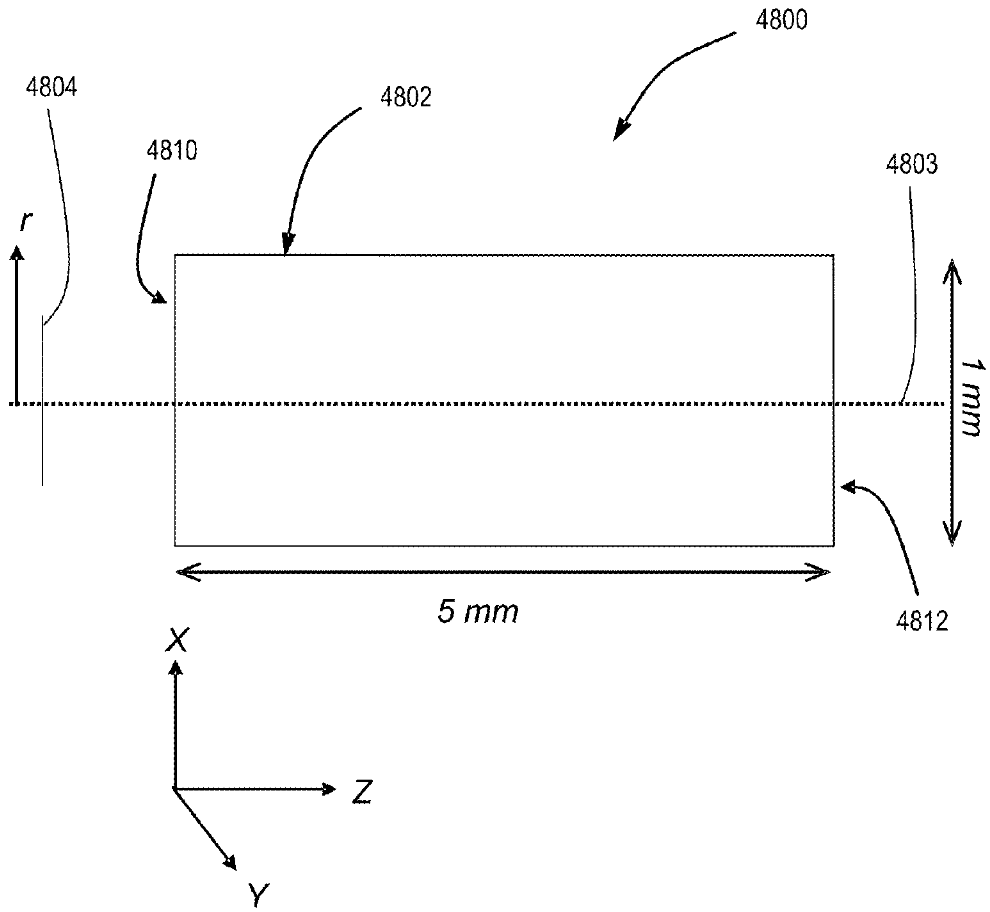
FIG. 118 shows a prior art graded index (“GRIN”) lens.

FIG. 118 shows a prior art GRIN lens configuration 4800. Thru-focus PSFs and MTFs characterizing configuration 4800 are shown in FIGS. 119-130. In configuration 4800, GRIN lens 4802 has a refractive index that varies as a function of radius r from an optical axis 4803, for imaging an object 4804. Electromagnetic energy from object 4804 transmits through a front surface 4810 and focuses at a back surface 4812 of GRIN lens 4802. An XYZ coordinate system is also shown for reference in FIG. 118. Details of numerical modeling, as performed on a commercially available optical design program, are described in detail immediately hereinafter.

GRIN lens 4802 has the following 3D index profile:

$$I=1.8+[-0.8914r^2-3.0680\cdot10^{-3}r^3+1.0064\cdot10^{-2}r^4-4.6978\cdot10^{-3}r^5] \quad \text{Eq. (5)}$$

and has focal length=1.76 mm, F/#=1.77, diameter=1.00 mm and length=5.00 mm.

FIGS. 119-123 show PSFs for GRIN lens 4802 for electromagnetic energy at a normal incidence and for different values of misfocus (that is, object distance from best focus of GRIN lens 4802) ranging from −50 μm to +50 μm. Similarly, FIGS. 124-128 show PSFs for GRIN lens 4802 for the same range of misfocus but for electromagnetic energy at an incidence angle of 5°. TABLE 41 shows the correspondence between PSF values, incidence angle and reference numerals of FIGS. 119-128.

TABLE 41

| Misfocus | Reference Numeral for Normal Incidence PSF | Reference Numeral for 5° Incidence PSF |
|---|---|---|
| −50 μm | 4250 | 4260 |
| −25 μm | 4252 | 4262 |
| 0 μm | 4254 | 4264 |
| +25 μm | 4256 | 4266 |
| +50 μm | 4258 | 4268 |

Figure 130:
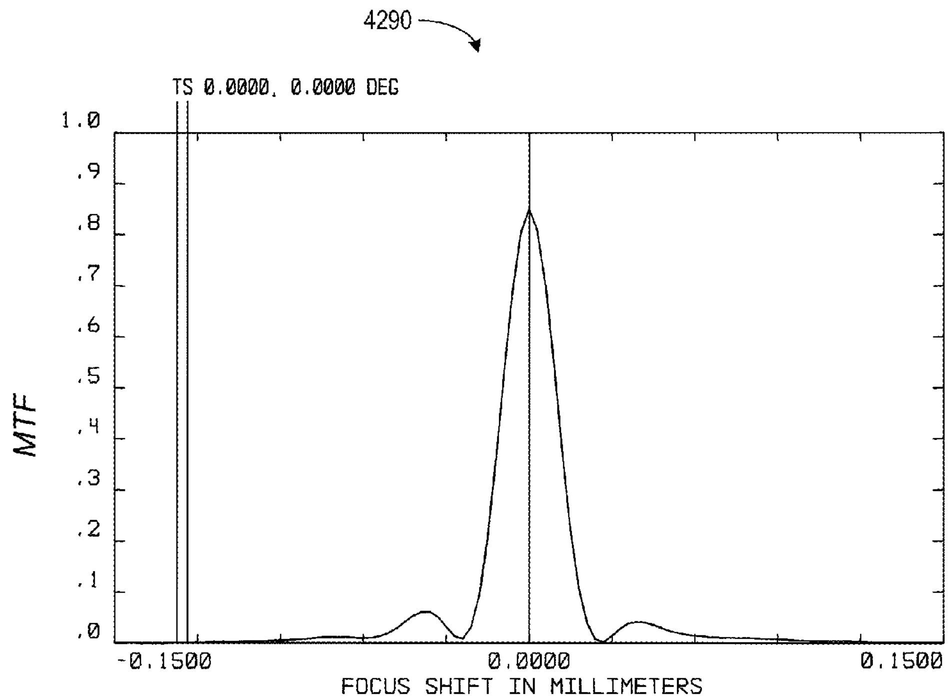
FIG. 130 is a plot showing a thru-focus MTF as a function of focus shift in millimeters, at a spatial frequency of 120 cycles per millimeter, for the GRIN lens of FIG. 118.

As may be seen by comparing FIGS. 119-128, sizes and shapes of PSFs produced by GRIN lens 4802 vary significantly for different values of incidence angle and misfocus. Consequently, GRIN lens 4802, having only focusing power, has performance limitations as an imaging lens. These performance limitations are further illustrated in FIG. 129, which shows MTFs for the range of misfocus and the incidence angles of the PSFs shown in FIGS. 119-128. In FIG. 129, a dashed oval 4282 indicates an MTF curve corresponding to a diffraction limited system. A dashed oval 4284 indicates MTF curves corresponding to a zero-micron (i.e., in focus) imaging system corresponding to PSFs 4254 and 4264. Another dashed oval 4286 indicates MTF curves for, for example, PSFs 4250, 4252, 4256, 4258, 4260, 4262, 4266 and 4268. As may be seen in FIG. 129, the MTFs of GRIN lens 4802 exhibit zeros (i.e., has a value of zero) at certain spatial frequencies, indicating an irrecoverable loss of image information at those particular spatial frequencies. FIG. 130 shows a plot 4290 of a thru-focus MTF of GRIN lens 4802 as a function of focus shift in millimeters for a spatial frequency of 120 cycles per millimeter. Again, zeroes in the MTF in FIG. 130 indicate irrecoverable loss of image information.

Certain non-homogeneous phase modifying element refractive profiles may be considered as a sum of two polynomials and a constant index, $n_0$:

$$I = n_0 + \sum_i A_i X^{L_i} Y^{M_i} Z^{N_i} + \sum_j B_j r^j, \quad \text{Eq. (6)}$$

where $r=\sqrt{(X^2+Y^2)}$.

Thus, the variables X, Y, Z and r are defined in accordance with the same coordinate system as shown in FIG. 118. In Eq. 6, the polynomial in r may be used to specify focusing power in a GRIN lens, and the trivariate polynomial in X, Y and Z may be used to specify a predetermined phase modification such that a resulting exit pupil exhibits characteristics that lead to reduced sensitivity to misfocus and misfocus-related aberrations. In other words, a predetermined phase modification may be implemented by an index profile of a GRIN lens. Thus, in this example, the predetermined phase modification is integrated with the GRIN focusing function and extends through the volume of the GRIN lens.

Figure 131:
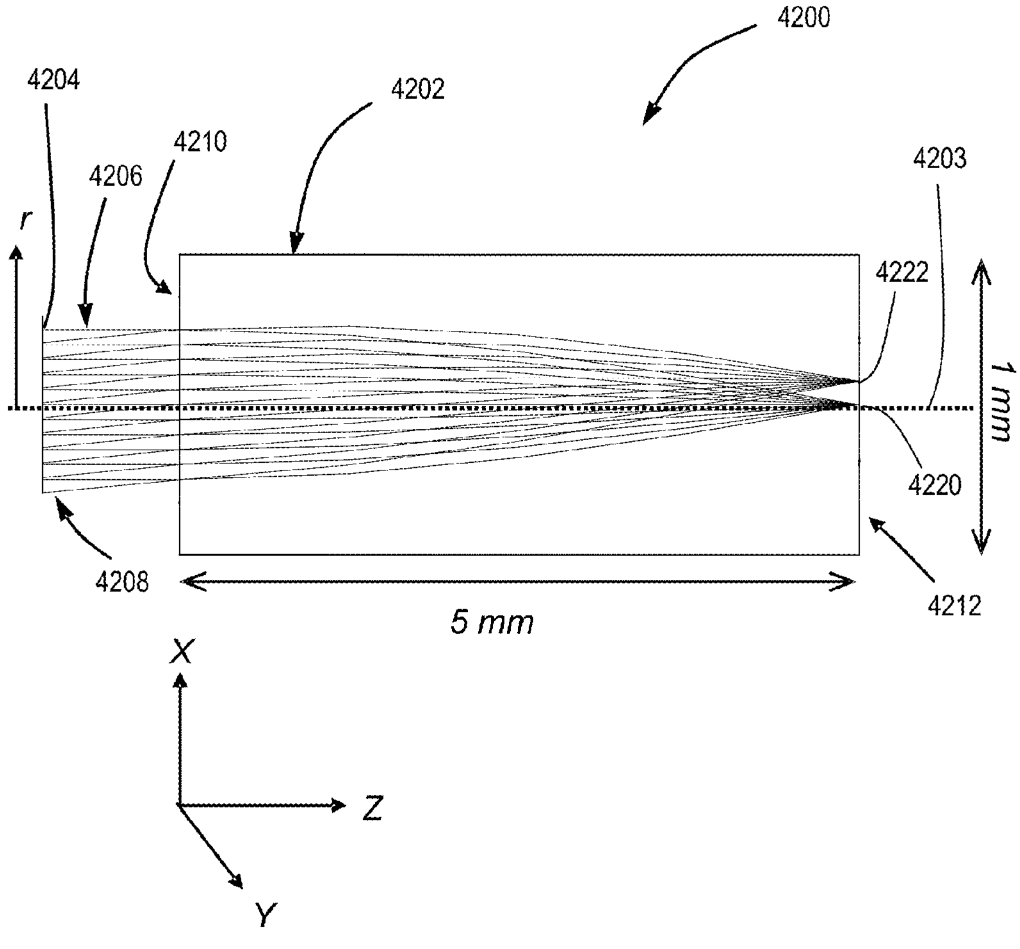
FIG. 131 shows a raytrace model of a multi-index optical element, illustrating ray paths for different angles of incidence, according to an embodiment.
Figure 132:
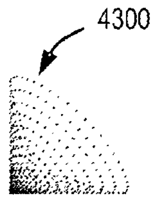
FIGS. 132-136 are a series of PSFs for normal incidence and for different values of misfocus for the element of FIG. 131.
Figure 133:
Figure 134:
Figure 135:
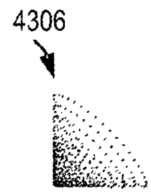
Figure 136:
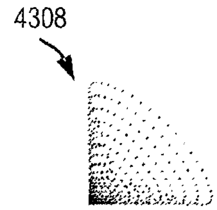
Figure 137:
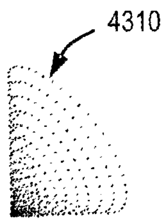
FIGS. 137-141 are a series of through-focus PSFs for various values of misfocus for electromagnetic energy 5° away from normal, for the element of FIG. 131.
Figure 138:
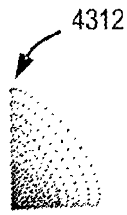
Figure 139:
Figure 140:
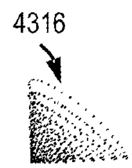
Figure 141:
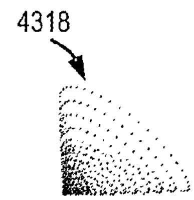

FIG. 131 shows non-homogeneous multi-index optical arrangement 4200, in an embodiment. An object 4204 is imaged through a multi-index, phase modifying optical element 4202. Normally incident electromagnetic energy rays 4206 (electromagnetic energy rays incident on phase modifying element 4202 at normal incidence at a front surface 4210 of phase modifying element 4202) and off-axis electromagnetic energy rays 4208 (electromagnetic energy rays incident at 5° from normal at front surface 4210 of phase modifying element 4202) are shown in FIG. 131. Normally incident electromagnetic energy rays 4206 and off-axis electromagnetic energy rays 4208 are transmitted through phase modifying element 4202 and brought to a focus at a back surface 4212 of phase modifying element 4202 at spots 4220 and 4222, respectively.

Phase modifying element 4202 has the following 3D index profile:

$$I=1.8+[-0.8914r^2-3.0680\cdot10^{-3}r^3+1.0064\cdot10^{-2}r^4-4.6978\cdot10^{-3}r^5]+[1.2861\cdot10^{-2}(X^3+Y^3)-5.5982\cdot10^{-3}(X^5+Y^5)], \quad \text{Eq. (7)}$$

where, like GRIN lens 4802, r is radius from optical axis 4203 and X, Y and Z are as shown. In addition, like GRIN lens 4802, phase modifying element 4202 has focal length=1.76 mm, F/#=1.77, diameter=1.00 mm and length=5.00 mm.

FIGS. 132-141 show PSFs characterizing phase modifying element 4202. In the numerical modeling of phase modifying element 4202 illustrated in FIGS. 132-141, a phase modification effected by the X and Y terms in Eq. (4) is uniformly accumulated through phase modifying element 4202. FIGS. 132-136 show PSFs for phase modifying element 4202 for normal incidence and for different values of misfocus (that is, object distance from best focus of phase modifying element 4202) ranging from −50 μm to +50 μm. Similarly, FIGS. 137-141 show PSFs for phase modifying element 4202 for the same range of misfocus, but for electromagnetic energy at an incidence angle of 5°. TABLE 42 shows the correspondence between PSF values, incidence angle and reference numerals of FIGS. 132-141.

TABLE 42

| Misfocus | Reference Numeral for Normal Incidence PSF | Reference Numeral for 5° Incidence PSF |
|---|---|---|
| −50 μm | 4300 | 4310 |
| −25 μm | 4302 | 4312 |
| 0 μm | 4304 | 4314 |
| +25 μm | 4306 | 4316 |
| +50 μm | 4308 | 4318 |

Figure 142:
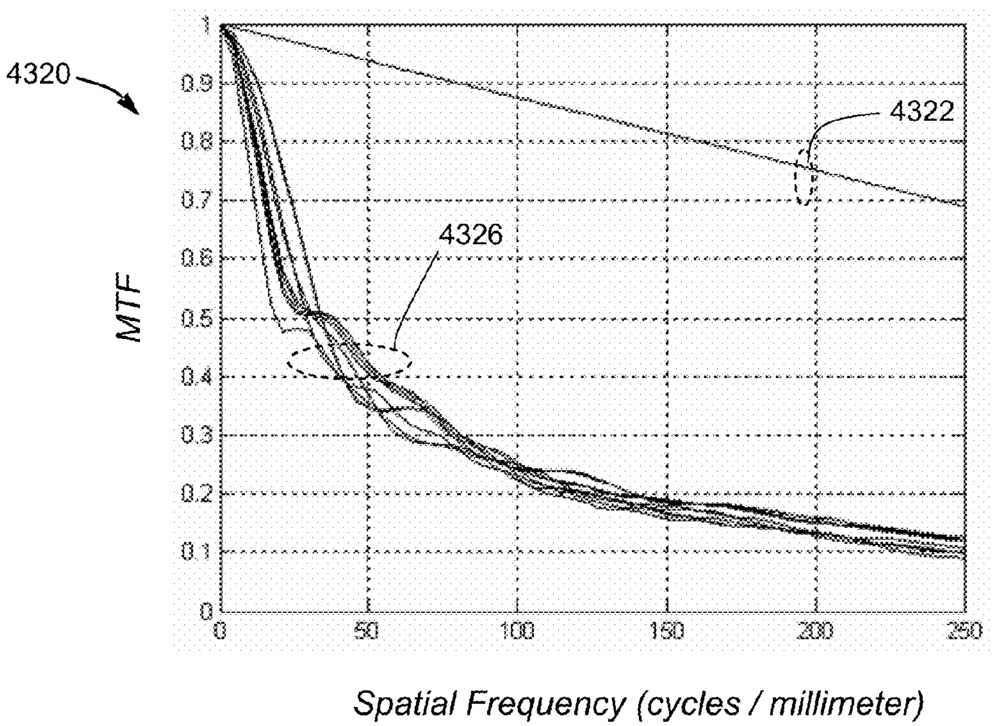
FIG. 142 is a plot showing a series of MTFs for the phase modifying element of FIG. 131.

FIG. 142 shows a plot 4320 of MTF curves characterizing element 4202. A predetermined phase modification effect corresponding to a diffraction limited case is shown in a dashed oval 4322. A dashed oval 4326 indicates MTFs for the misfocus values corresponding to the PSFs shown in FIGS. 132-141. MTFs 4326 are all similar in shape and exhibit no zeros for the range of spatial frequencies shown in plot 4320.

As may be seen in comparing FIGS. 132-141, PSF forms for phase modifying element 4202 are similar in shape. In addition, FIG. 142 shows that the MTFs for different values of misfocus are generally well above zero. As compared to the PSFs and MTFs shown in FIGS. 119-130, the PSFs and MTFs of FIGS. 132-143 show that phase modifying element 4202 has certain advantages. Furthermore, while its three-dimensional phase profile makes the MTFs of phase modifying element 4202 different from the MTF of a diffraction limited system, it is appreciated that the MTFs of phase modifying element 4202 are also relatively insensitive to misfocus aberration as well as aberrations that may be inherent to phase modifying element 4202 itself.

Figure 143:
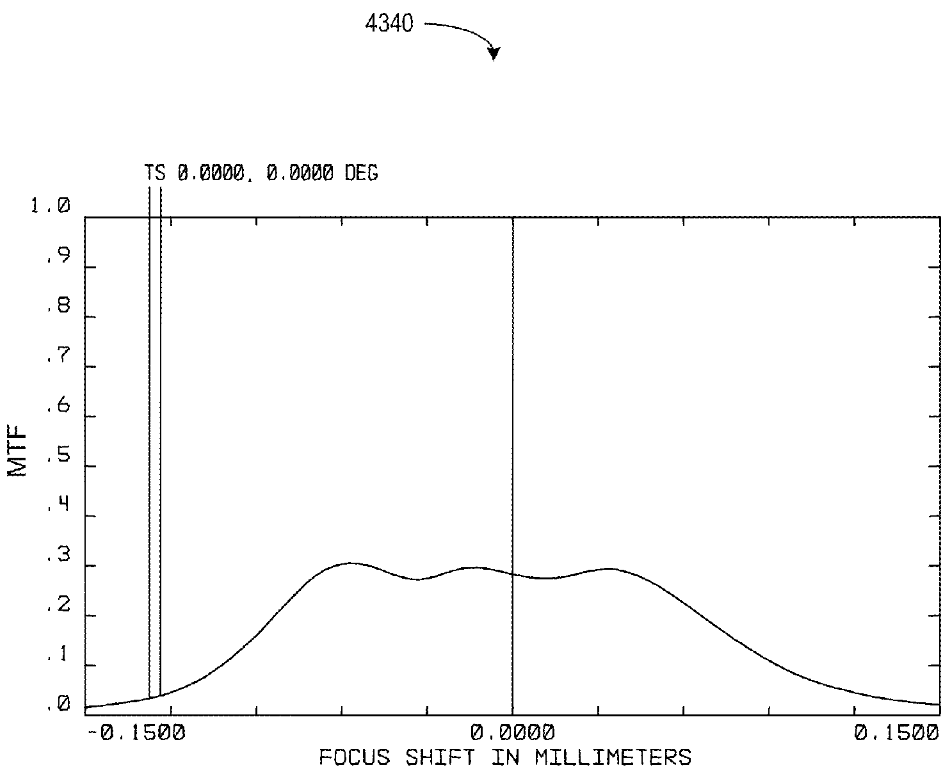
FIG. 143 is a plot showing a thru-focus MTF as a function of focus shift in millimeters, at a spatial frequency of 120 cycles per millimeter, for the element with predetermined phase modification as discussed in relation to FIGS. 131-141.

FIG. 143 shows a plot 4340 that further illustrates that the normalized, thru-focus MTF of optics 4200 is broader in shape, with no zeroes over the range of focus shift shown in plot 4340, as compared to the MTF of GRIN lens 4802 (FIG. 130). Utilizing a measure of full width at half maximum ("FWHM") to define a range of misfocus aberration insensitivity, plot 4340 indicates that optics 4200 have a range of misfocus aberration insensitivity of about 5 mm, while plot 4290, FIG. 130, shows that GRIN lens 4802 has a range of misfocus aberration insensitivity of only about 1 mm.

Figure 144:
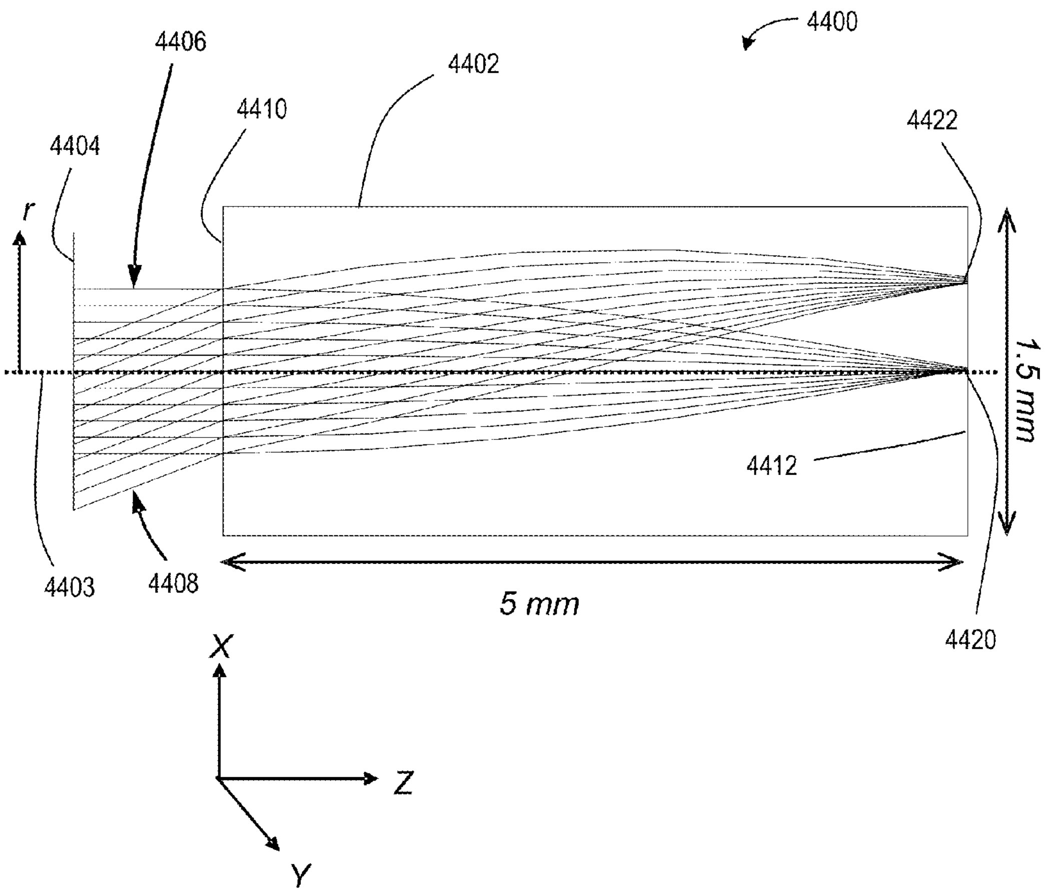
FIG. 144 shows a raytrace model of multi-index optical elements, according to an embodiment, illustrating the accommodation of electromagnetic energy having normal incidence and having incidence of 20° from normal.

FIG. 144 shows non-homogeneous multi-index optical arrangement 4400 including a non-homogeneous, phase modifying element 4402. As shown in FIG. 144, an object 4404 is imaged through phase modifying element 4402. Normally incident electromagnetic energy rays 4406 (electromagnetic energy rays incident on phase modifying element 4402 at normal incidence at a front surface 4410 of phase modifying element 4402) and off-axis electromagnetic energy rays 4408 (electromagnetic energy rays incident at 20° from the normal at front surface 4410 of phase modifying element 4402) are shown in FIG. 144. Normally incident electromagnetic energy rays 4406 and off-axis electromagnetic energy rays 4408 are transmitted through phase modifying element 4402 and brought to a focus at a back surface 4412 of phase modifying element 4402 at spots 4420 and 4422, respectively.

Phase modifying element 4402 implements a predetermined phase modification utilizing a refractive index variation that varies as a function of position along a length of phase modifying element 4402. In phase modifying element 4402, a refractive profile is described by the sum of two polynomials and a constant index, $n_0$, as in phase modifying element 4202, but in phase modifying element 4402, a term corresponding to the predetermined phase modification is multiplied by a factor which decays to zero along a path from front surface 4410 to back surface 4412 (e.g., from left to right as shown in FIG. 144):

$$I = n_0 + \left[1 - \left(\frac{Z}{Z_{max}}\right)^P\right]\sum_i A_i X^{L_i} Y^{M_i} Z^{N_i} + \sum_j B_j r^j, \qquad \text{Eq. (8)}$$

where r is defined as in Eq. (6), and $Z_{max}$ is the maximum length of phase modifying element 4402 (e.g., 5 mm).

In Eq. (5)-(8), the polynomial in r is used to specify focusing power in phase modifying element 4402, and a trivariate polynomial in X, Y and Z is used to specify the predetermined phase modification. However, in phase modifying element 4402, the predetermined phase modification effect decays in amplitude over the length of phase modifying element 4402. Consequently, as indicated in FIG. 144, wider field angles are captured (e.g., 20° away from normal in the case illustrated in FIG. 144) while imparting a similar predetermined phase modification to each field angle. For phase modifying element 4402, focal length=1.61 mm, F/#=1.08, diameter=1.5 mm and length=5 mm.

Figure 145:
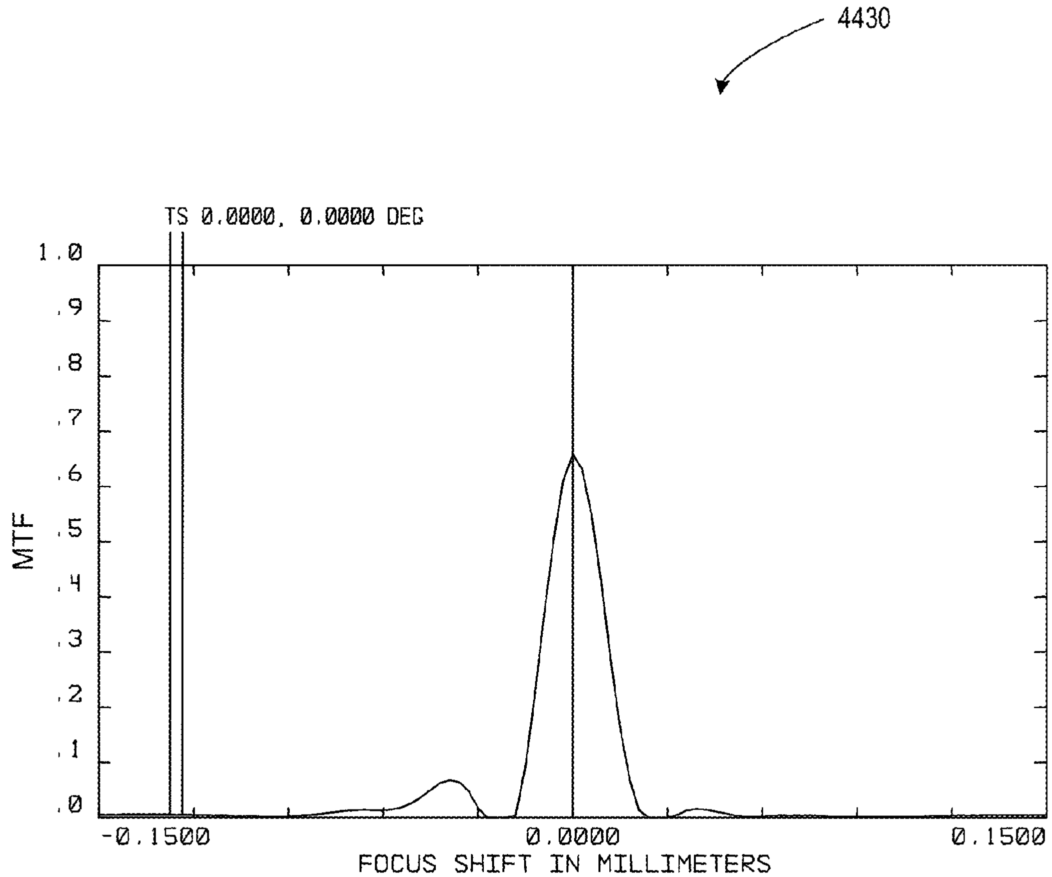
FIG. 145 is a plot showing a thru-focus MTF as a function of focus shift in millimeters, at a spatial frequency of 120 cycles per millimeter, for the same non-homogeneous element without predetermined phase modification as discussed in relation to FIG. 143.

FIG. 145 shows a plot 4430 of a thru-focus MTF of a GRIN lens (having external dimensions equal to those of phase modifying element 4402) as a function of focus shift in millimeters, for a spatial frequency of 120 cycles per millimeter. As in FIG. 130, zeroes in plot 4430 indicate irrecoverable loss of image information.

Figure 146:
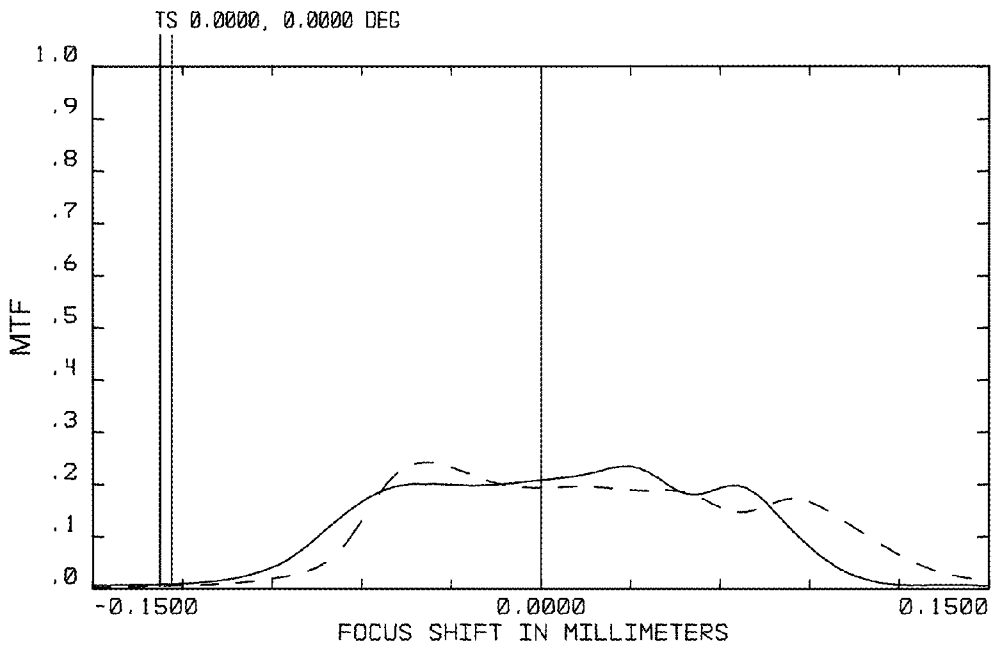
FIG. 146 is a plot showing a thru-focus MTF as a function of focus shift in millimeters, at a spatial frequency of 120 cycles per millimeter, for the same non-homogeneous element with predetermined phase modification as discussed in relation to FIGS. 143-144.

FIG. 146 shows a plot 4470 of a thru-focus MTF of phase modifying element 4402. Similar to the comparison of FIG. 142 to FIG. 130, the MTF curve of plot 4470 (FIG. 146) has a lower intensity but is broader than the MTF curve of plot 4430 (FIG. 145).

Figure 147:
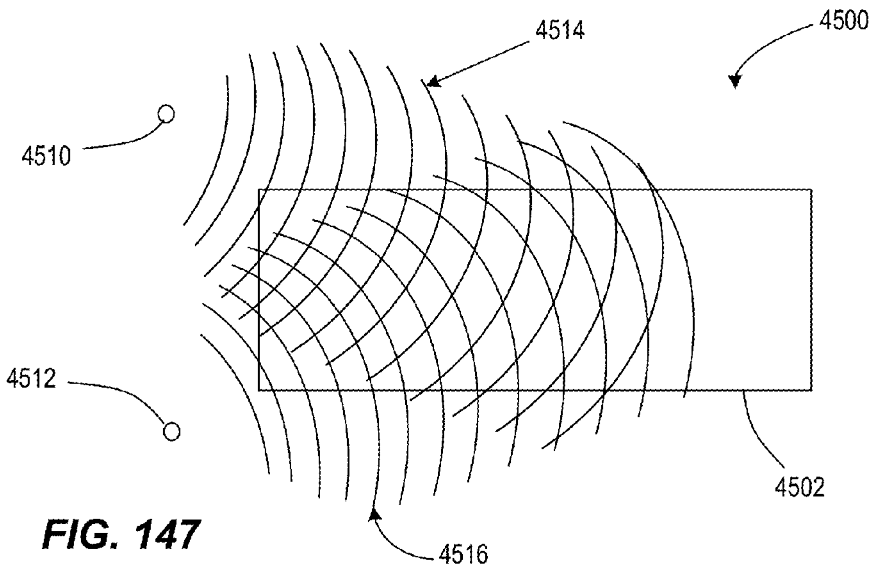

FIG. 147 shows another configuration for implementing a range of refractive indices within a single optical material. In FIG. 147, a phase modifying element 4500 may be, for example, a light sensitive emulsion or another optical material that reacts with electromagnetic energy. A pair of ultraviolet light sources 4510 and 4512 is configured to shine electromagnetic energy onto an emulsion 4502. The electromagnetic energy sources are configured such that the electromagnetic energy emanating from these sources interferes within the emulsion, thereby creating a plurality of pockets of different refractive indices within emulsion 4502. In this way, emulsion 4502 is endowed with three-dimensionally varied refractive indices throughout.

Figure 148:
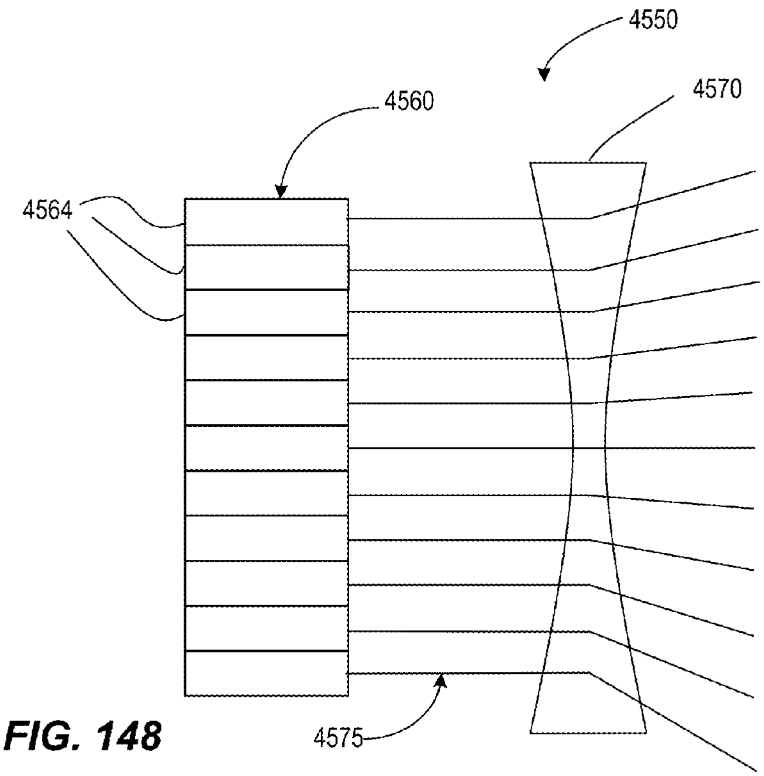

FIG. 148 shows an imaging system 4550 including a multi-aperture array 4560 of GRIN lenses 4564 combined with a negative optical element 4570. System 4550 may effectively act as a GRIN array “fisheye”. Since the field of view (FOV) of each GRIN lens 4564 is tilted to a slightly different direction by negative optical element 4570, imaging system 4550 works like a compound eye (e.g., as common among arthropods) with a wide, composite field of view.

Figure 149:
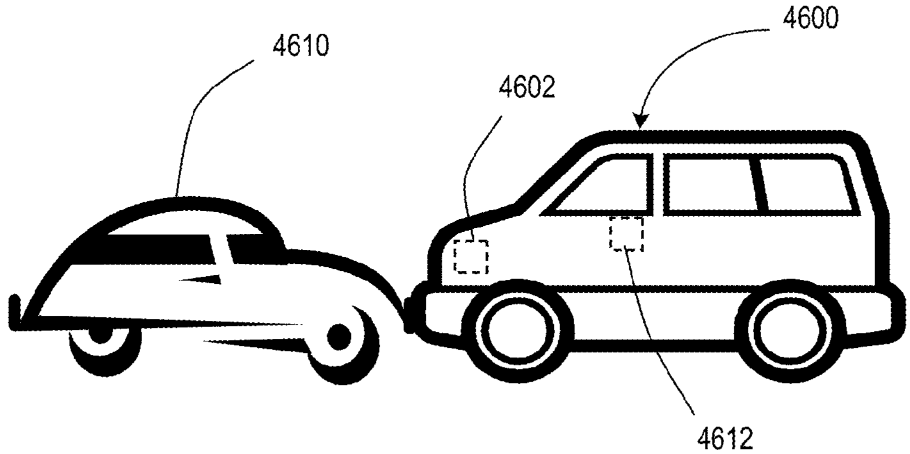

FIG. 149 shows an automobile 4600 having an imaging system 4602 mounted near the front of automobile 4600. Imaging system 4602 includes a non-homogeneous phase modifying element as discussed above. Imaging system 4602 may be configured to digitally record images whenever automobile 4600 is running such that in case of, for example, a collision with another automobile 4610, imaging system 4602 provides an image recording of the circumstances of the collision. Alternatively, automobile 4600 may be equipped with a second imaging system 4612, including a non-homogeneous phase modifying element as discussed above. System 4612 may perform image recognition of fingerprints or iris patterns of authorized users of automobile 4600, and may be utilized in addition to, or in place of, an entry lock of automobile 4600. An imaging system including a non-homogeneous phase modifying element may be advantageous in such automotive applications due to compactness and robustness of the integrated construction, and due to reduced sensitivity to misfocus provided by the predetermined phase modification, as discussed above.

Figure 150:
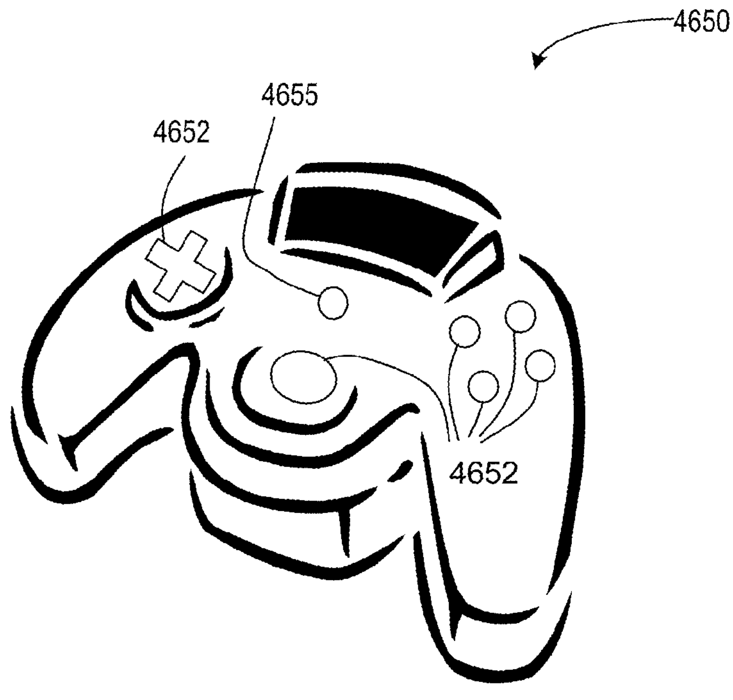

FIG. 150 shows a video game control pad 4650 with a plurality of game control buttons 4652 as well as an imaging system 4655 including non-homogeneous phase modifying elements. Imaging system 4655 may function as a part of a user recognition system (e.g., through fingerprint or iris pattern recognition) for user authorization. Also, imaging system 4655 may be utilized within the video game itself, for example by providing image data for tracking motion of a user, to provide input or to control aspects of the video game play. Imaging system 4655 may be advantageous in game applications due to the compactness and robustness of the integrated construction, and due to the reduced sensitivity to misfocus provided by the predetermined phase modifications, as discussed above.

Figure 151:
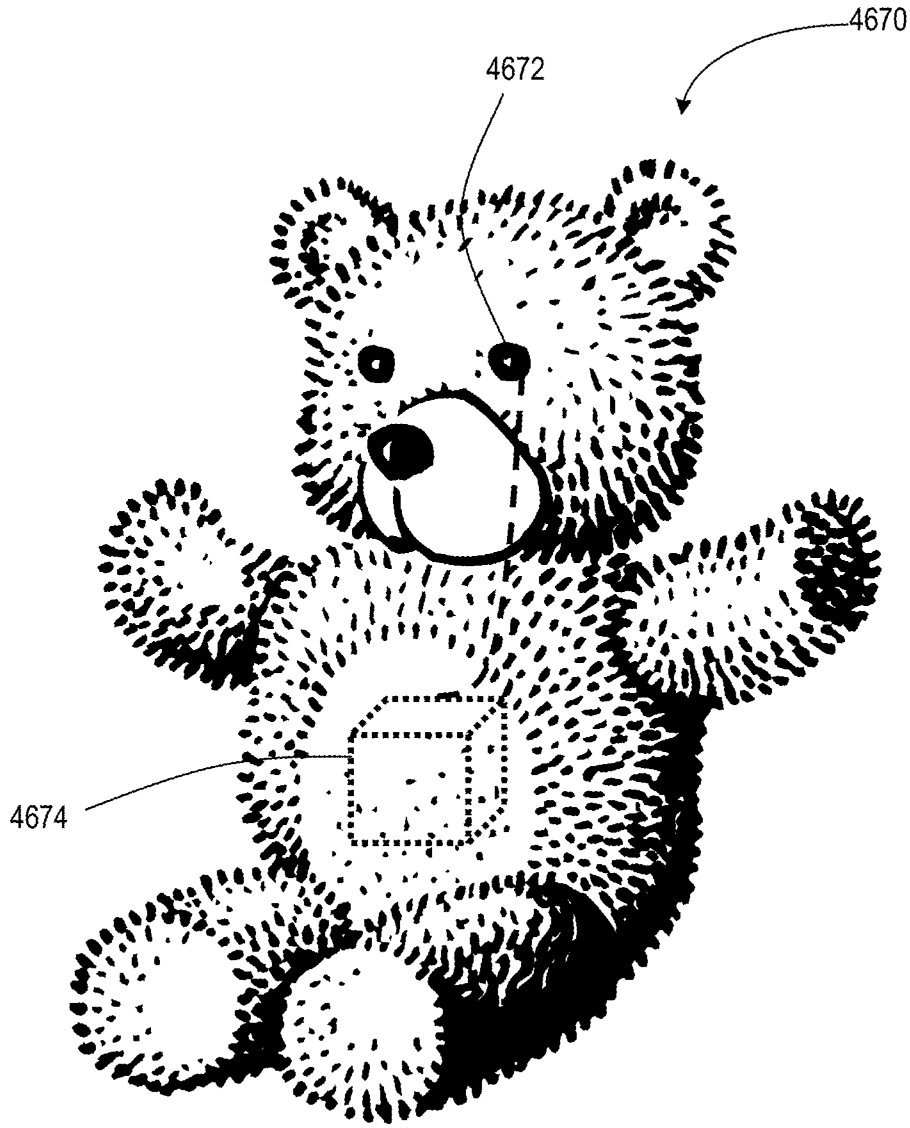

FIG. 151 shows a teddy bear 4670 including an imaging system 4672 disguised as (or incorporated into) an eye of the teddy bear. Imaging system 4672 in turn includes multi-index optical elements Like imaging systems 4612 and 4655 discussed above, imaging system 4672 may be configured for user recognition purposes such that, when an authorized user is recognized by imaging system 4672, a voice recorder system 4674 connected with imaging system 4672 may respond with a customized user greeting, for instance.

Figure 152:
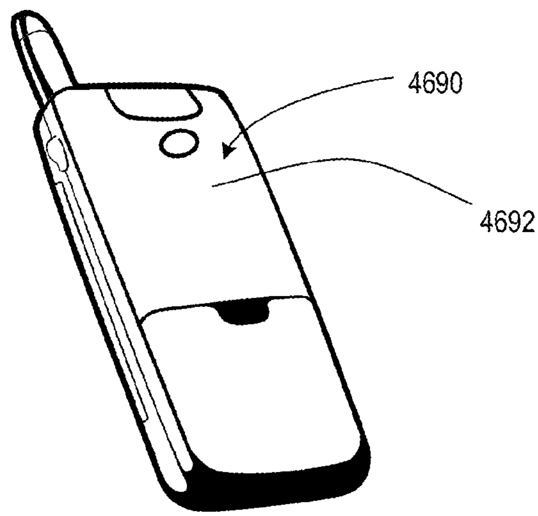

FIG. 152 shows a cell phone 4690. Cell phone 4690 includes a camera 4692 with a non-homogeneous phase modifying element. As in the applications discussed above, compact size, rugged construction and insensitivity to misfocus are advantageous attributes of camera 4692.

Figure 153:
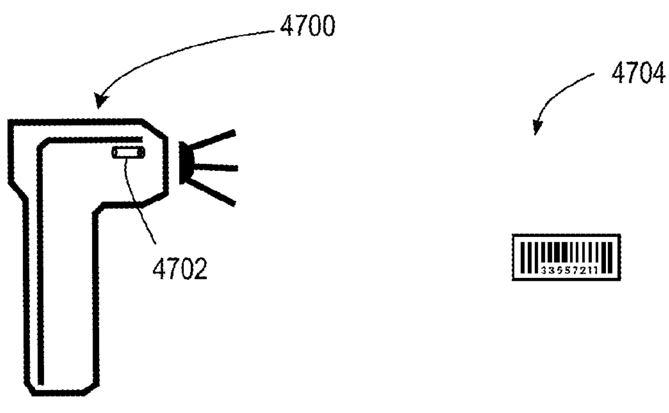
Figure 154:
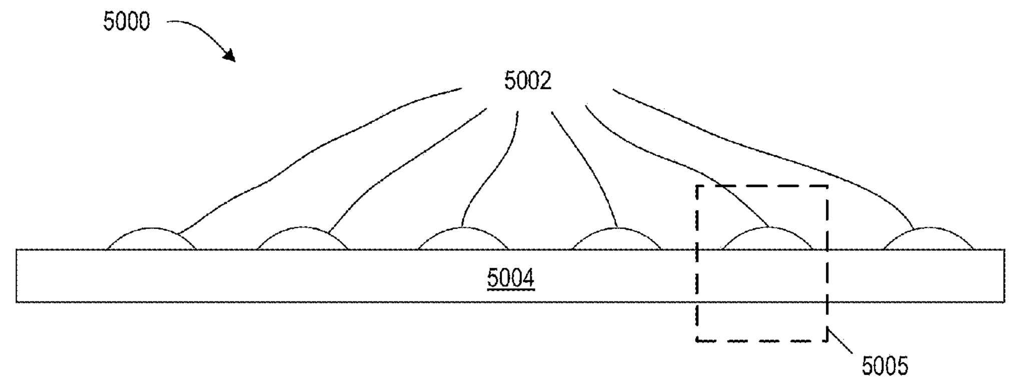
Figure 155:
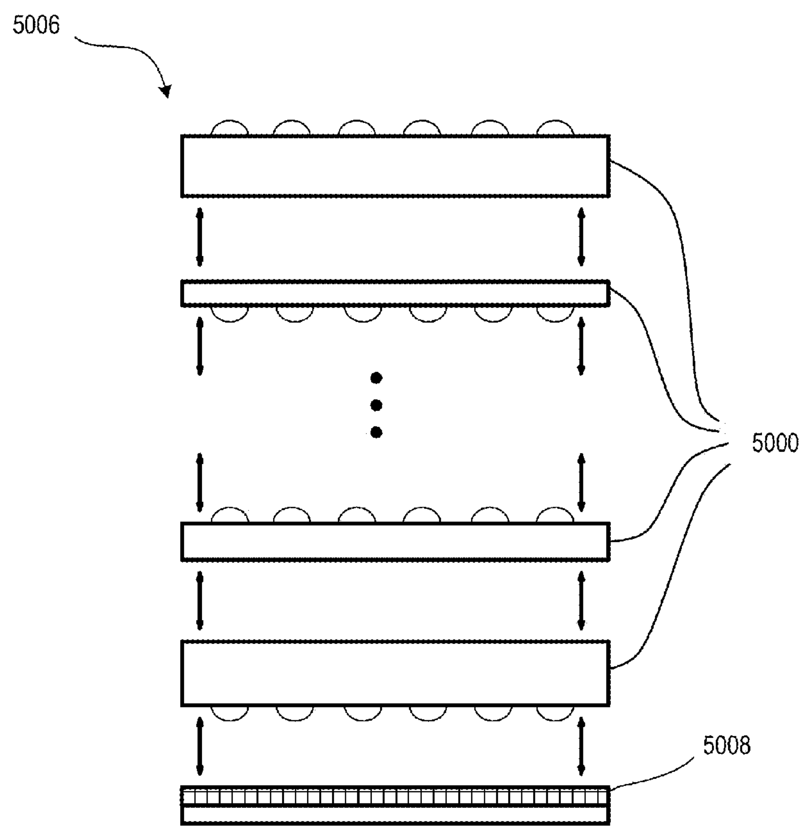

FIG. 153 shows a barcode reader 4700 including a non-homogeneous phase modifying element 4702 for image capture of a barcode 4704.

In the examples illustrated in FIGS. 149-153, use of a non-homogeneous phase modifying element in imaging systems 4602, 4612, 4655, 4672, 4692 and 4700 is advantageous because it allows the imaging system to be compact and robust. That is, the compact size of the components as well as the robust nature of the assembly (e.g., secure bonding of a flat surface to a flat surface without extra mounting hardware) make each imaging system, including its associated non-homogeneous phase modifying element, ideal for use in demanding, potentially high impact applications such as those described above. Furthermore, incorporation of a predetermined phase modification enables these imaging systems to provide high quality images with reduced misfocus-related aberrations in comparison to other compact imaging systems currently available. Moreover, when digital signal processing is added to each of the imaging systems (see, for example, FIG. 112), further image enhancement may be performed depending on requirements of a specific application. For example, when an imaging system with a non-homogeneous phase modifying element is used as cell phone camera 4692, post-processing performed on an image captured at a detector thereof may remove misfocus-related aberrations from a final image, thereby providing a high quality image for viewing. As another example, in imaging system 4602 (FIG. 149), post-processing may include, for instance, object recognition that alerts a driver to a potential collision hazard before a collision occurs.

The multi-index optical elements of the present disclosure may in practice be used in systems that contain both homogeneous optics, as in FIG. 109, and elements that are non-homogeneous (e.g., multi-index). Thus, aspheric phase and/or absorption components may be implemented by a collection of surfaces and volumes within the same imaging system. Aspheric surfaces may be integrated into one of the surfaces of a multi-index optical element or formed on a homogeneous element. Collections of such multi-index optical elements may be combined in WALO-style structures, as discussed in detail immediately hereinafter.

WALO structures may include two or more common bases (e.g., glass plates or semiconductor wafers) having arrays of optical elements formed thereon. The common bases are aligned and assembled, according to presently disclosed methods, along an optical axis to form short track length imaging systems that may be kept as a wafer-scale array of imaging systems or, alternatively, separated into a plurality of imaging systems.

The disclosed instrumentalities are advantageously compatible with arrayed imaging system fabrication techniques and reflow temperatures utilized in chip scale packaging (CSP) processes. In particular, optical elements of the arrayed imaging systems described herein are fabricated from materials that can withstand the temperatures and mechanical deformations possible in CSP processing, e.g., temperatures well in excess of 200° C. Common base materials used in the manufacture of the arrayed imaging systems may be ground or shaped into flat (or nearly flat) thin discs with a lateral dimension capable of supporting an array of optical elements. Such materials include certain solid state optical materials (e.g., glasses, silicon, etc.), temperature stabilized polymers, ceramic polymers (e.g., sol-gels) and high temperature plastics. While each of these materials may individually be able to withstand high temperatures, the disclosed arrayed imaging systems may also be able to withstand variation in thermal expansion between the materials during the CSP reflow process. For example, expansion effects may be avoided by using a low modulus adhesive at the bonding interface between surfaces.

Figure 156:
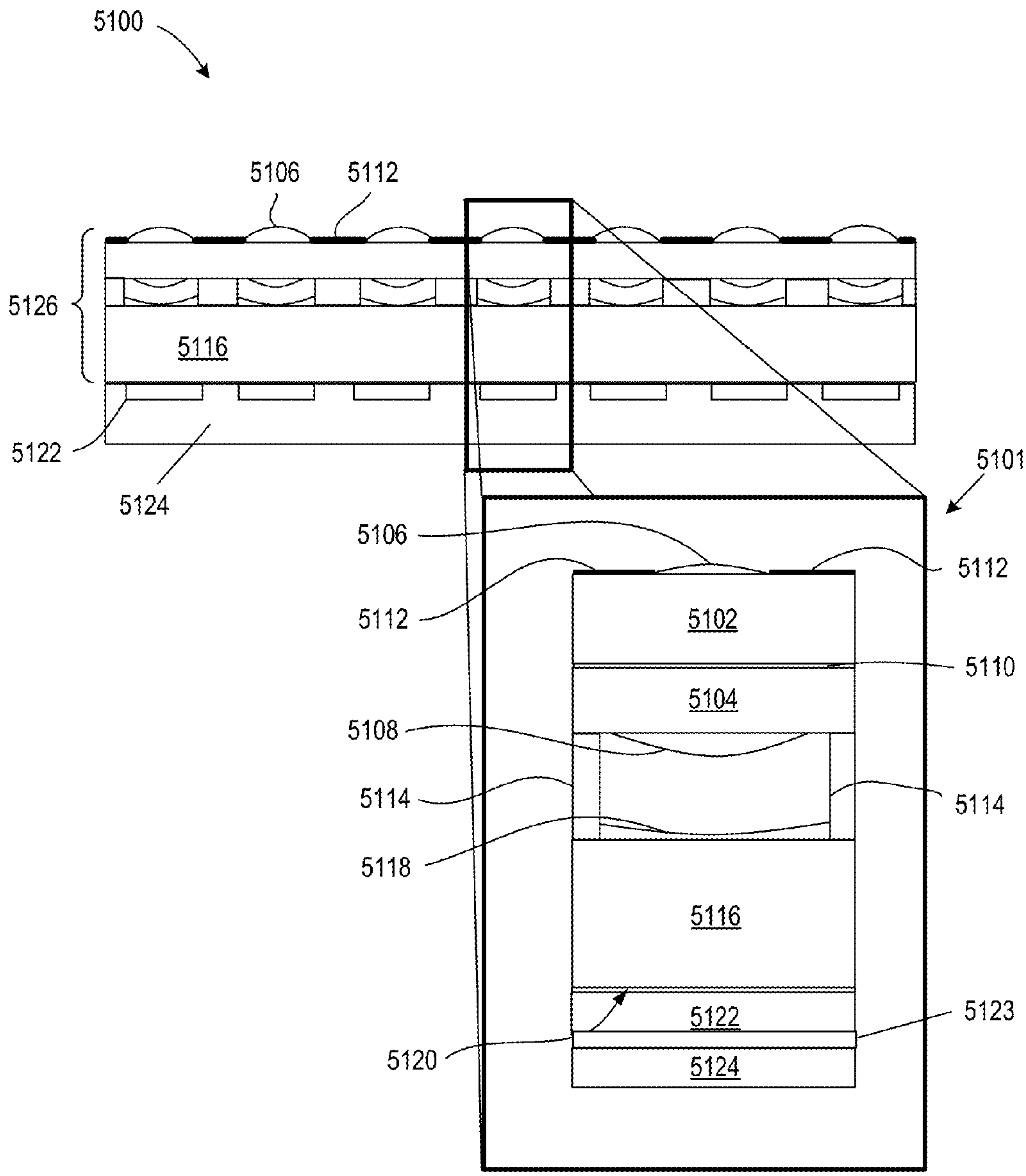

FIGS. 156 and 157 illustrate an array 5100 of imaging systems and singulation of array 5100 to form an individual imaging system 5101. Arrayed imaging systems and singulation thereof were also illustrated in FIG. 3A, and similarities between array 5100 and array 60 will be apparent. Although described herein below with respect to singulated imaging system 5101 it should be understood that any or all elements of imaging system 5101 may be formed as arrayed elements such as shown in array 5100. As shown in FIG. 157, common bases 5102 and 5104, which have two plano-convex optical elements (i.e., optical elements 5106 and 5108, respectively) formed thereon, are bonded back-to-back with a bonding material 5110, such as an index matching epoxy. An aperture 5112 for blocking electromagnetic energy is patterned in the region around optical element 5106. A spacer 5114 is mounted between common bases 5104 and 5116, and a third optical element 5118 is included on common base 5116. In this example, a plano surface 5120 of common base 5116 is used to bond to a cover plate 5122 of a detector 5124. This arrangement is advantageous in that the bonding surface area between detector 5124 and optics of imaging system 5101, as well as the structural integrity of imaging system 5101, are increased by the plano-plano orientation. Another feature demonstrated in this example is the use of at least one surface with negative optical curvature (e.g., optical element 5118) to enable correction of, for instance, field curvature at the image plane. Cover plate 5122 is optional and may not be used, depending on the assembly process. Thus, common base 5116 may simultaneously serve as a support for optical element 5118 and as a cover plate for detector 5124. An optics-detector interface 5123 may be defined between detector 5124 and cover plate 5122.

An example analysis of imaging system 5101 is shown in FIGS. 158-162. The analysis shown in FIGS. 158-162 assumes a 400×400 pixel resolution of detector 5124 with a 3.6 μm pixel size. All common base thicknesses used in this analysis were selected from a list of stock 8" glass types such as sold by Schott Corporation under the trade name "AF45." Common bases 5102 and 5104 were assumed to be 0.4 mm thick, and common base 5116 was assumed to be 0.7 mm thick. Selection of these thicknesses is significant as the use of commercially available common bases may reduce manufacturing costs, supply risk and development cycle time for imaging system 5101. Spacer 5114 was assumed to be a stock, 0.400 mm glass component with patterned thru-holes at each optical element aperture. If desired, a thin film filter may be added to one or more of optical elements 5106, 5108 and 5118 (FIG. 157) or one or more of common bases 5102, 5104 and 5116 in order to block near infrared electromagnetic energy. Alternatively, an infrared blocking filter may be positioned upon a different common base such as a front cover plate or detector cover plate. Optical elements 5106, 5108 and 5118 (FIG. 157) may be described by even asphere coefficients, and the prescription for each optical element is given in TABLE 43. In this example, each optical element was modeled assuming an optically transparent polymer with a refractive index of $n_d$=1.481053 and an Abbe number ($V_d$)=60.131160.

TABLE 43

| | Semi-diameter (mm) | Common base thickness (mm) | Radius of curvature (ROC) (mm) | K | A1 ($r^2$) | A2 ($r^4$) | A3 ($r^6$) | A4 ($r^8$) | A5 ($r^{10}$) | Sag (μm) |
|---|---|---|---|---|---|---|---|---|---|---|
| Optical element 5106 | 0.380 | 0.400 | 1.227 | 2.741 | — | 0.1617 | 0.1437 | −9.008 | −16.3207 | 64.22 |
| Optical element 5108 | 0.620 | 0.400 | 1.181 | −16.032 | — | −0.6145 | 1.5741 | −0.2670 | −0.5298 | 111.26 |
| Optical element 5118 | 0.750 | 0.700 | −652.156 | −2.587 | — | −0.2096 | 0.1324 | 0.0677 | −0.2186 | −48.7 |

The exemplary design, as shown in FIGS. 157-158 and specified in TABLE 43, meets all of the intended minimum specifications given in TABLE 44.

TABLE 44

| Optical Specifications | Target | Embodiment shown in FIG. 158 |
|---|---|---|
| Avg. MTF @ Nyquist/2, on axis | >0.3 | 0.718 |
| Avg. MTF @ Nyquist/2, horizontal | >0.2 | 0.274 |
| Avg. MTF @ Nyquist/4, on axis | >0.4 | 0.824 |
| Avg. MTF @ Nyquist/4, horizontal | >0.4 | 0.463 |

TABLE 44-continued

| Optical Specifications | Target | Embodiment shown in FIG. 158 |
|---|---|---|
| Avg. MTF @ 35 lp/mm, on axis | >0.5 | 0.869 |
| Avg. MTF @ 35 lp/mm, horizontal | >0.5 | 0.577 |
| Avg. MTF @ Nyquist/2, corner | >0.1 | 0.130 |
| Relative Illumination @ corner | >45% | 50.5% |
| Max Optical Distortion | ±5% | −3.7% |
| Total Optical Track (TOTR) | <2.5 mm | 2.48 mm |
| Working F/# | 2.5-3.2 | 2.82 |
| Effective Focal Length | — | 1.447 |
| Full Field of View (FFOV) | >70° | 73.6° |

The key constraints on imaging system 5101 from TABLE 44 are a wide full field of view ("FFOV">70°), a small total optical track ("TOTR"<2.5 mm) and a maximum chief ray angle constraint (e.g., CRA at full image height<30°). Due to the small total optical track and low chief ray angle constraints as well as the fact that imaging system 5101 has a relatively small number of optical surfaces, imaging system 5101's imaging characteristics are significantly field-dependent; that is, imaging system 5101 images much better in the center of the image than at a corner of the image.

FIG. 158 is a raytrace diagram of imaging system 5101. The raytrace diagram illustrates propagation of electromagnetic energy rays through a three-group imaging system that has been mounted at the plano side of common base 5116 to cover plate 5122 and detector 5124. As used herein in relation to WALO structures, a "group" refers to a common base having at least one optical element mounted thereon.

Figure 159:
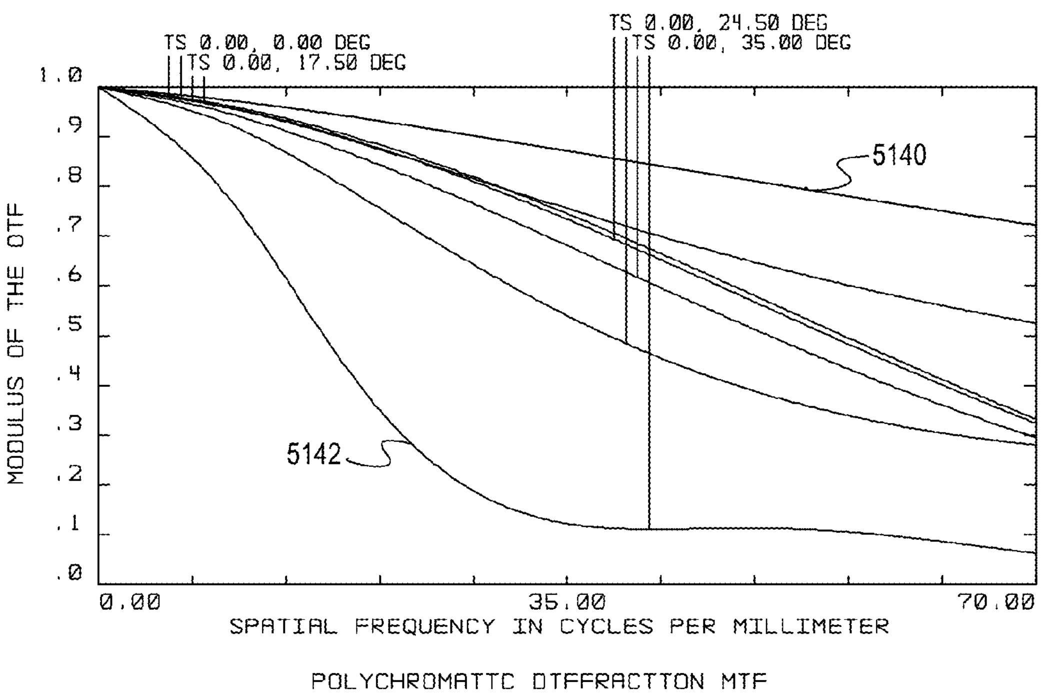

FIG. 159 shows MTFs of imaging system 5101 as a function of spatial frequency to ½ Nyquist (which is the detector cutoff for a Bayer pattern detector) at a plurality of field points ranging from on-axis to full field. Curve 5140 corresponds to the on-axis field point, and curve 5142 corresponds to the sagittal full field point. As can be observed from FIG. 159, imaging system 5101 performs better on-axis than at full field.

Figure 160:
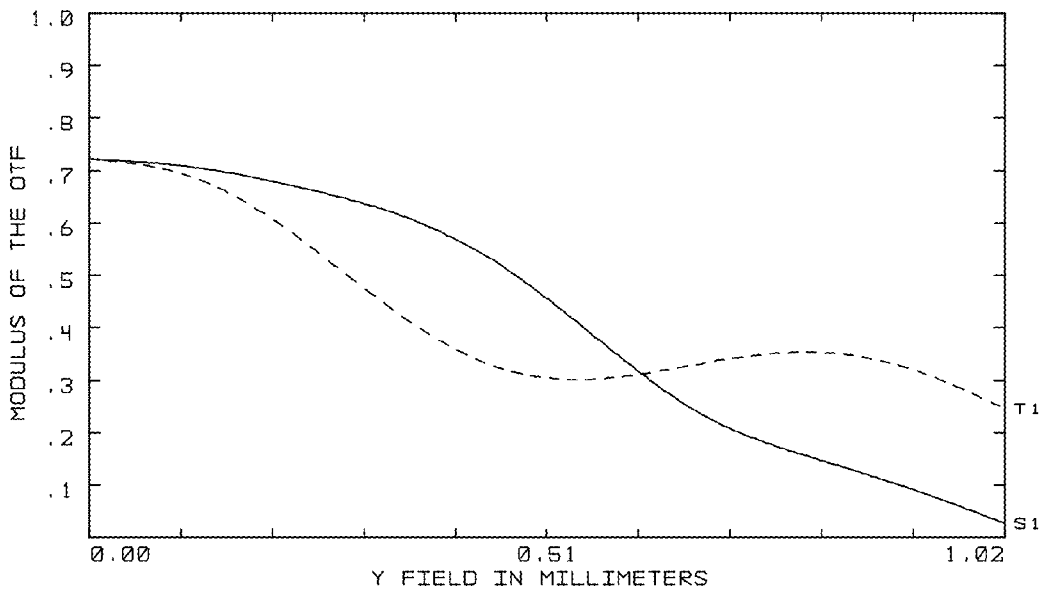

FIG. 160 shows MTFs of imaging system 5101 as a function of image height for 70 line-pairs per millimeter (lp/mm), the ½ Nyquist frequency for a 3.6 micron pixel size. It may be seen in FIG. 160 that, due to the existing aberrations, the MTFs at this spatial frequency degrade by over a factor of six across the image field.

Figure 161:
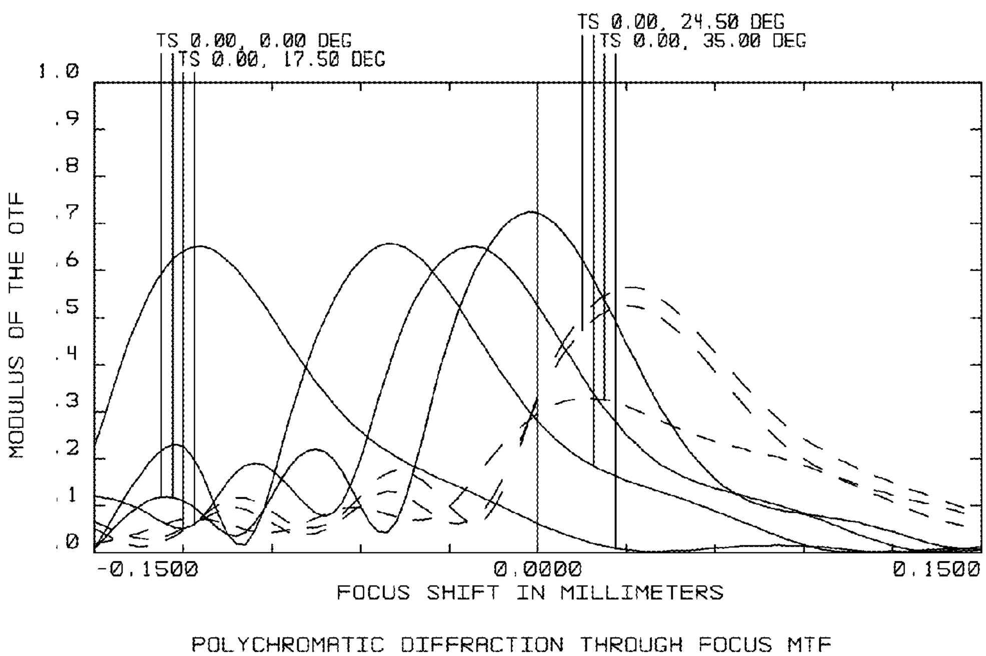
Figure 162:
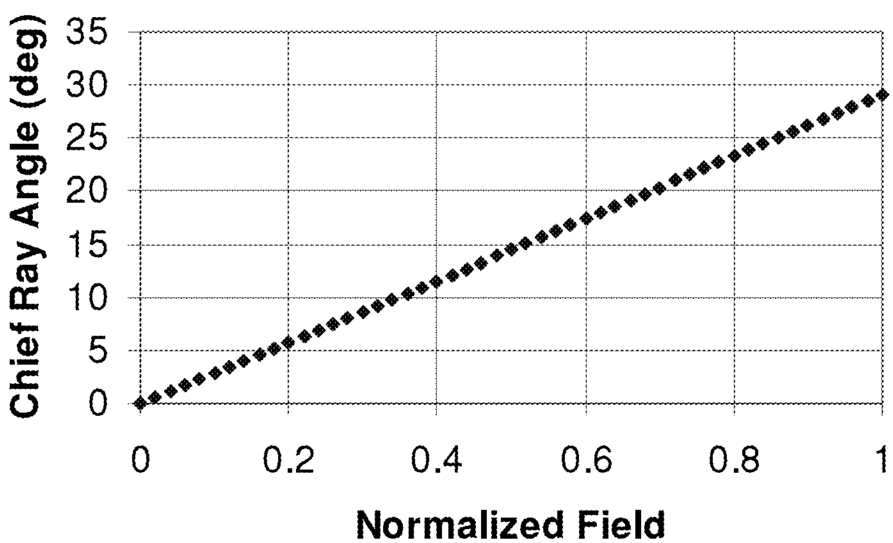

FIG. 161 shows thru-focus MTFs of imaging system 5101, FIG. 127, for several field positions. Multiple arrays of optical elements, each array formed on a common base with thickness variations and containing potentially thousands of optical elements, may be assembled to form arrayed imaging systems. The complexity of this assembly and the variations therein make it critical for wafer-scale imaging systems that the overall design MTF is optimized to be as insensitive as possible to defocus. FIG. 162 shows linearity of a CRA as a function of normalized field height. Linearity of the CRA in an imaging system is a preferred characteristic since it allows for a deterministic illumination roll-off in an optics-detector interface, which may be compensated for a detector layout.

FIG. 163 shows an imaging system 5200. The configuration of imaging system 5200 includes a double-sided optical element 5202 patterned onto a single common base 5204. Such a configuration offers a cost reduction and decreases the need for bonding, relative to the configuration shown in FIG. 157, because the number of common bases in the system is reduced by one.

Figure 164:
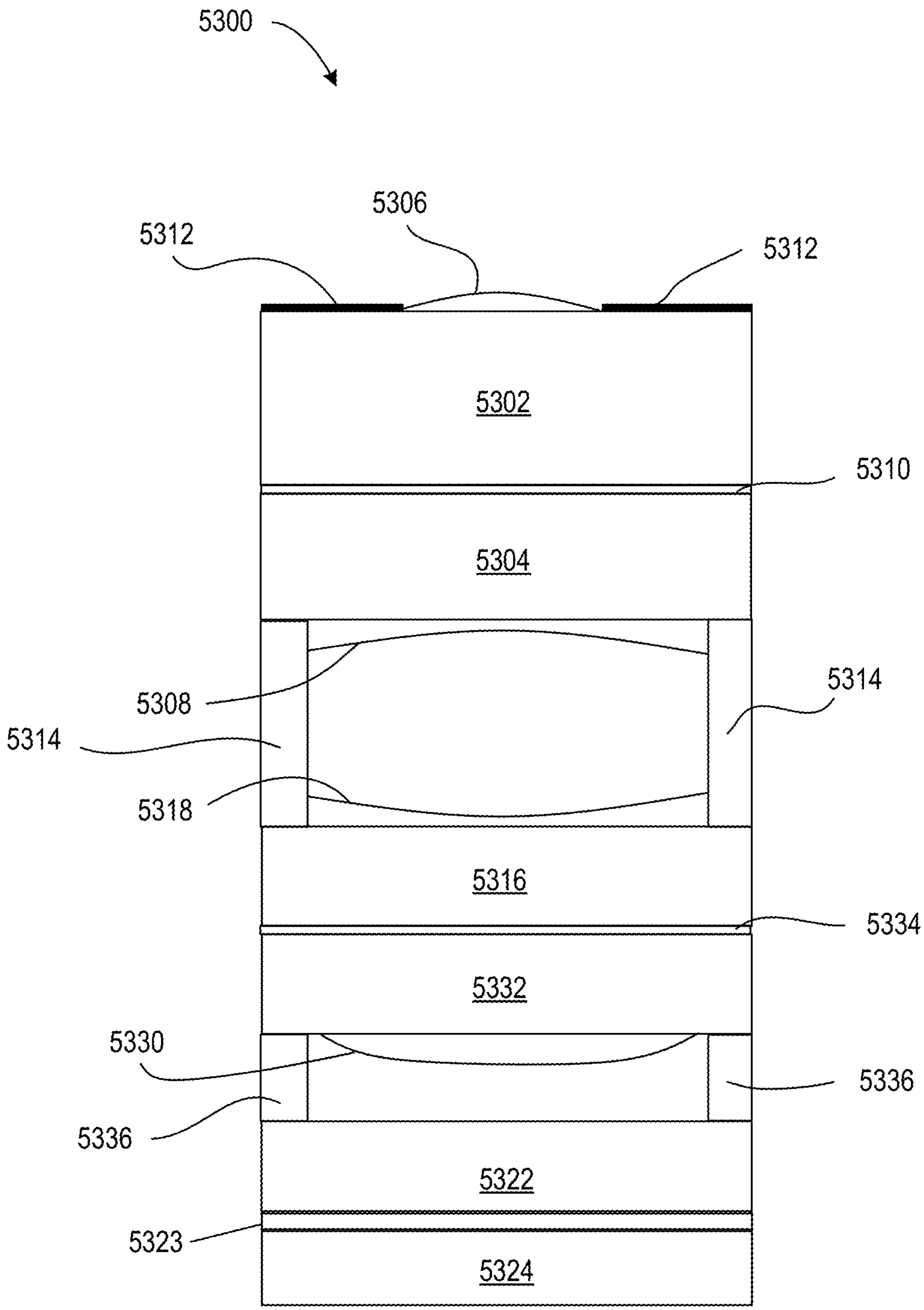

FIG. 164 shows a four-optical element design for a wafer-scale imaging system 5300. In this example, an aperture mask 5312 for blocking electromagnetic energy is disposed on the outermost surface (i.e., furthest from detector 5324) of the imaging system. One key feature of the example shown in FIG. 164 is that two concave optical elements (i.e., optical element 5308 and optical element 5318) are oriented to oppose each other. This configuration embodies a wafer-scale variant of a double Gauss design that enables a wide field of view with minimal field curvature. A modified version of imaging system 5300 FIG. 164, is shown in FIG. 165 as imaging system 5400. The embodiment shown in FIG. 165 provides an additional benefit in that concave optical elements 5408 and 5418 are bonded via a standoff feature that eliminates the need for use of a spacer 5314, FIG. 164.

A feature that may be added to the designs of imaging systems 5300 and 5400 is the use of a chief ray angle corrector ("CRAC") as a part of the third and/or fourth optical element surface (e.g., optical element 5418(2) or 5430(2), FIG. 166). The use of a CRAC enables imaging systems with short total tracks to be used with detectors (e.g., 5324, 5424) which may have limitations on an allowable chief ray angle. A specific example of CRAC implementation is shown as imaging system 5400(2) in FIG. 166. The CRAC element is designed to have little optical power near the center of the field where the chief ray is well matched to the numerical aperture of the detector. At the edges of the field, where the CRA approaches or exceeds the allowable CRA of the detector, the surface slope of the CRAC increases to skew the rays back into the acceptance cone of the detector. A CRAC element may be characterized by a large radius of curvature (i.e., low optical power near an optical axis) coupled with large deviation from sphere at the periphery of the optical element (reflected by large high-order aspheric polynomials). Such a design may minimize field dependent sensitivity roll-off, but may add significant distortion near a perimeter of the resulting image. Consequently, such a CRAC should be tailored to match the detector with which it is intended to be optically coupled. In addition, a CRA of the detector may be jointly designed to work with the CRAC of the imaging system. In imaging system 5300, an optics-detector interface 5323 may be defined between a detector 5324 and a cover plate 5322. Similarly for imaging system 5400, an optics-detector interface 5423 may be defined between a detector 5424 and a cover plate 5422.

TABLE 45

| | Semi-diameter (mm) | Sub thickness (mm) | ROC (mm) | K | A1 (r2) | A2 (r4) | A3 (r6) | A4 (r8) | Sag (μ, P-V) |
|---|---|---|---|---|---|---|---|---|---|
| Optical element 5406 | 0.285 | 0.300 | 0.668 | −0.42 | 0.0205 | −0.260 | 6.79 | −40.1 | 64 |
| Optical element 5408 | 0.400 | 0.300 | 2.352 | 25.3 | −0.0552 | 0.422 | −2.65 | 5.1 | 40 |

TABLE 45-continued

| | Semi-diameter (mm) | Sub thickness (mm) | ROC (mm) | K | A1 (r2) | A2 (r4) | A3 (r6) | A4 (r8) | Sag (μ, P-V) |
|---|---|---|---|---|---|---|---|---|---|
| Optical element 5418(2) | 0.425 | 0.300 | −4.929 | 129.3 | 0.2835 | −1.318 | 7.26 | −36.3 | 26 |
| Optical element 5430(2) | 0.710 | 0.300 | −22.289 | −25.9 | 0.1175 | 0.200 | −0.63 | −0.86 | 61 |

FIGS. 167-171 illustrate analysis of exemplary imaging system 5400(2) shown in FIG. 166. The four optical element surfaces used in this example may be described by even asphere polynomials given in TABLE 45 and are designed using an optical polymer with a refractive index of $n_d$=1.481053 and an Abbe number ($V_d$)=60.131160, but other materials may be easily substituted with resultant subtle variation to the optical design. The glasses used for all common bases are assumed to be stock eight-inch AF45 Schott glass. The edge spacing (spacing between common bases provided by spacers or standoff features) at the gap between optical element 5408 and 5418(2) in this design is 175 μm and between optical element 5430(2) and cover plate 5422 is 100 μm. If necessary, a thin film filter to block near infrared electromagnetic energy may be added at any of optical elements 5406, 5408, 5418(2) and 5430(2) or, for example, on a front cover plate.

Figure 167:
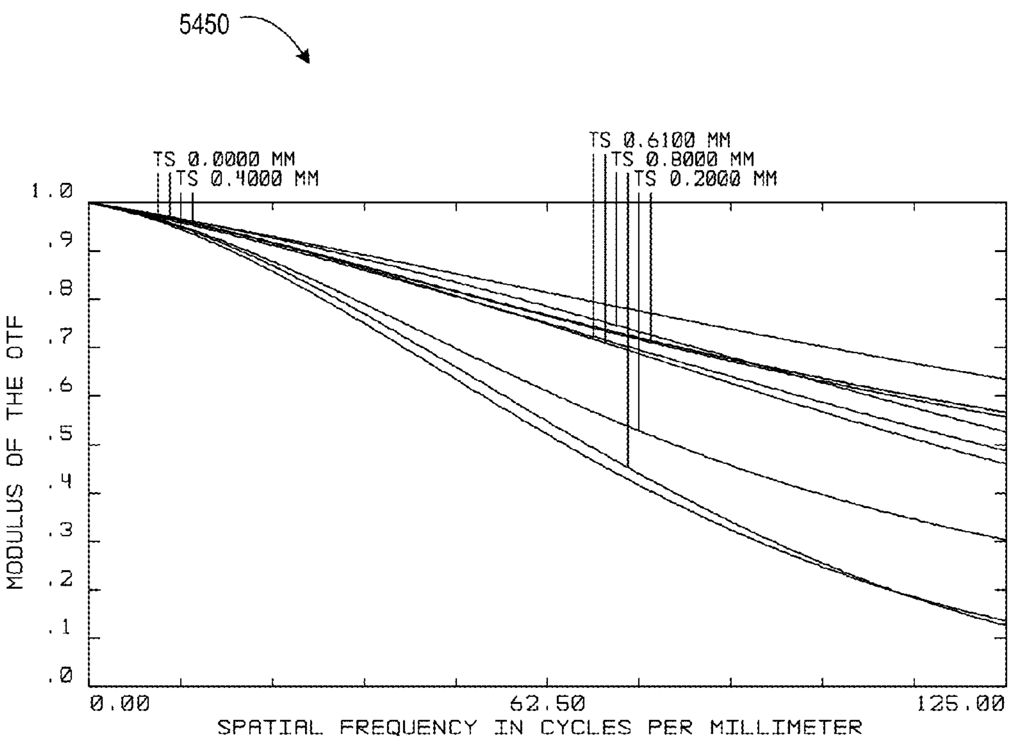
Figure 168:
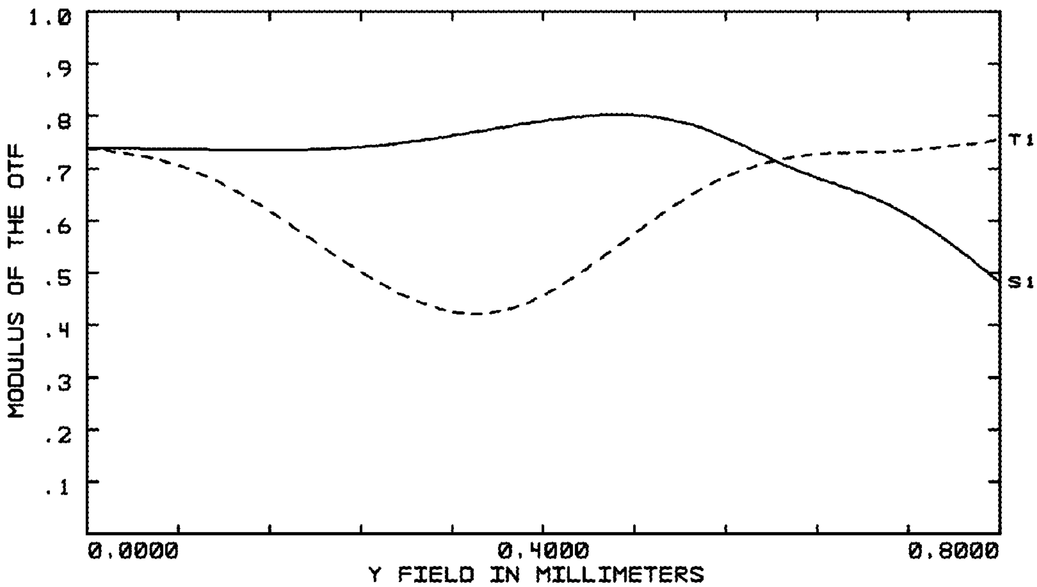
Figure 169:
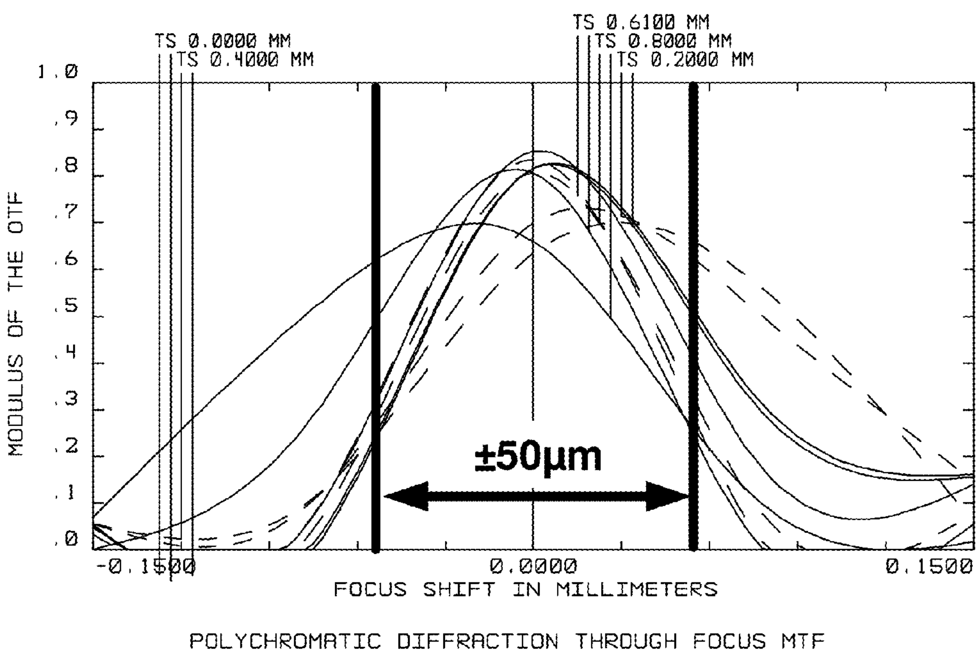
Figure 170:
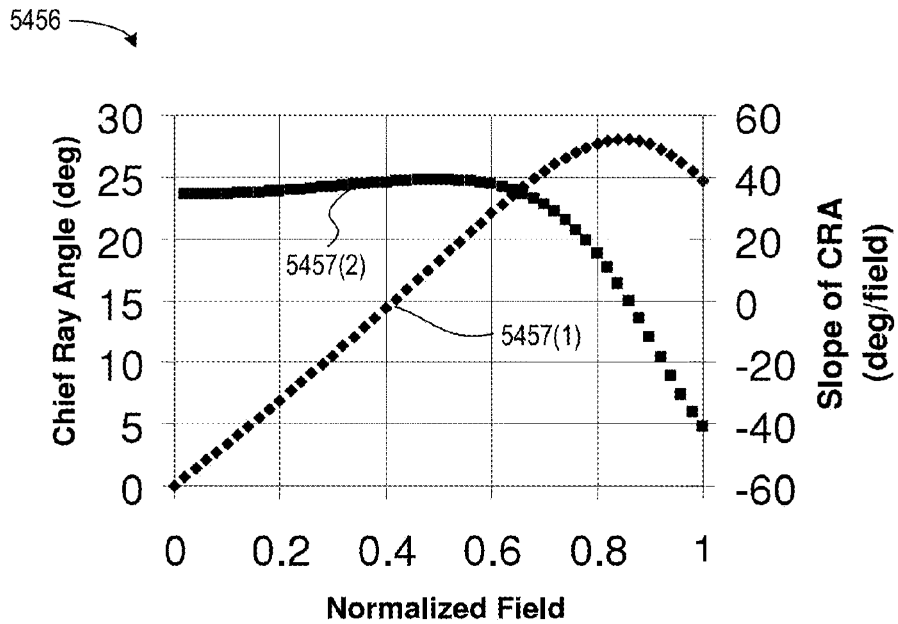

FIG. 166 shows a raytrace diagram for imaging system 5400(2) using a VGA resolution detector with a 1.6 mm diagonal image field. FIG. 167 is a plot 5450 of the modulus of the OTF of imaging system 5400(2) as a function of spatial frequency up to ½ Nyquist frequency (125 lp/mm) for a detector with 2.0 μm pixels. FIG. 168 shows an MTF 5452 of imaging system 5400(2) as a function of image height. MTF 5452 has been optimized to be roughly uniform, on average, through the image field. This feature of the design allows the image to be "windowed" or sub-sampled anywhere in the field without a dramatic change in image quality. FIG. 169 shows a thru-focus MTF distribution 5454 for imaging system 5400(2), which is large relative to the expected focus shift due to wafer-scale manufacturing tolerances. FIG. 170 shows a plot 5456 of the slope of the CRA (represented by dotted line 5457(1)) and the chief ray angle (represented by solid line 5457(2)) both as functions of normalized field in order to demonstrate the CRAC. It may be observed in FIG. 170 that the CRA is almost linear up to approximately 60% of the image height where the CRA begins to exceed 25°. The CRA climbs to a maximum of 28° and then falls back down below 25° at the full image height. The slope of the CRA is related to the required lenslet and metal interconnect positional shifts with respect to the photosensitive regions of each detector.

Figure 171:
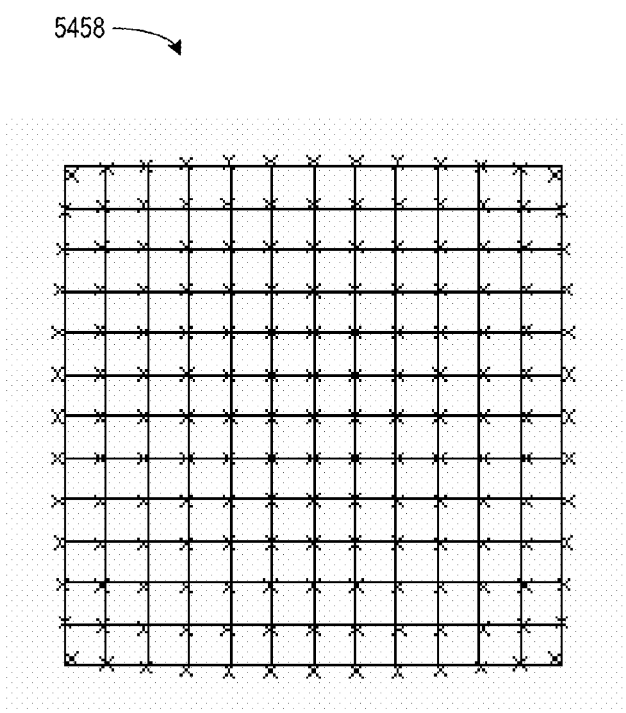

FIG. 171 shows a grid plot 5458 of the optical distortion inherent in the design due to the implementation of CRAC. Intersection points represent optimal focal points, and X's indicate estimated actual focal points for respective fields traced by the grid. Note that the distortion in this design meets a target optical specification shown in TABLE 46. However, the distortion may be reduced by the wafer-scale integration process, which allows for compensation of the optical design in the layout of detector 5424 (e.g., by shifting active photodetection regions). The design may be further improved by adjusting spatial and angular geometries of a pixels/microlens/color filter array within detector 5424 to match the intended distortion and CRA profiles of the optical design. Optical performance specifications for imaging system 5400 (2) are given in TABLE 46.

TABLE 46

| Optical Specifications | Target | On axis |
|---|---|---|
| Avg. MTF @ 125 lp/mm, on axis | >0.3 | 0.574 |
| Avg. MTF @ 125 lp/mm, horizontal | >0.3 | 0.478 |
| Avg. MTF @ 88 lp/mm, on axis | >0.4 | 0.680 |
| Avg. MTF @ 88 lp/mm, horizontal | >0.4 | 0.633 |
| Avg. MTF @ 63 lp/mm, on axis | >0.5 | 0.768 |
| Avg. MTF @ 63 lp/mm, horizontal | >0.5 | 0.747 |
| Avg. MTF @ 125 lp/mm, corner | >0.1 | 0.295 |
| Relative Illumination @ corner | >45% | 90% |
| Max Optical Distortion | ±5% | −3.02% |
| Total Optical Track | <2.5 mm | 2.06 mm |
| Working F/# | 2.5-3.2 | 3.34 |
| Effective Focal Length | — | 1.39 |
| Diagonal Field of View | >60° | 60° |

FIG. 172 shows an exemplary imaging system 5500 wherein use of double-sided, wafer-scale optical elements 5502(1) and 5502(2) reduces the number of required common bases to a total of two (i.e., common base 5504 and 5516), thereby reducing complexity and cost in bonding and assembling. An optics-detector interface 5523 may be defined between a detector 5524 and a cover plate 5522.

FIGS. 173A and 173B show cross-sectional and top views, respectively, of an optical element 5550 having a convex surface 5554 and an integrated standoff 5552. Standoff 5552 has a sloped wall 5556 that joins with convex surface 5554. Element 5550 may be replicated into an optically transparent material in a single step, with improved alignment relative to the use of spacers (e.g., spacers 5114 of FIGS. 157 and 163; spacers 5314 and 5336 of FIG. 164; spacers 5436 of FIG. 165; and spacers 5514 and 5536 of FIG. 172), which have dimensions that are limited in practice by the time required to harden the spacer material. Optical element 5550 is formed on a common base 5558, which may also be formed from an optically transparent material. Replicated optics with standoffs 5552 may be used in all of the previously described designs to replace the use of spacers, thereby reducing manufacturing and assembly complexity and tolerances.

Replication methods for the disclosed wafer-scale arrays are also readily adapted for implementation of non-circular aperture optical elements, which have several advantages over traditional circular aperture geometry. Rectangular aperture geometry eliminates unnecessary area on an optical surface, which, in turn, maximizes a surface area that may be placed in contact in a bonding process given a rectilinear geometry without affecting the optical performance of an imaging system. Additionally, most detectors are designed such that a region outside the active area (i.e., the region of the detector where the detector pixels are located) is minimized to reduce package dimensions and maximize an effective die count per common base (e.g., silicon wafer). Therefore, the region surrounding the active area is limited in dimension. Circular aperture optical elements encroach into the region surrounding the active area with no benefit to the optical performance of the imaging module. The implementation of rectangular aperture modules thus allows a detector active area to be maximized for use in bonding of an imaging system.

FIGS. 174A and 174B provide a comparison of image area 5560 (bounded by a dashed line) in imaging systems having circular and non-circular aperture optical elements. FIG. 174A shows a top view of the imaging system originally described with reference to FIG. 166, which includes a circular aperture 5562 with sloped wall 5556. The imaging system shown in FIG. 174B is identical to that in FIG. 174A with the exception that optical element 5430(2) (FIG. 166) has a rectangular aperture 5566. FIG. 174B shows an example of increased bonding area 5564 facilitated by a rectangular aperture optical element 5566. The system has been defined such that the maximum field points are at the vertical, horizontal and diagonal extents of a 2.0 μm pixel VGA resolution detector. In the vertical dimension, slightly more than 500 μm (259 μm on each side of the optical element) of useable bonding surface is recovered in the modification to a rectilinear geometry. In the horizontal dimension, slightly more than 200 μm is recovered. Note that rectangular aperture 5566 should be oversized relative to circular aperture 5562 to avoid vignetting in the image corners. In this example, the increase in optical element size at the corner is 41 μm at each diagonal. Again, since the active area and chip dimensions are typically rectangular, the reduction of area in the vertical and horizontal dimensions outweighs the increase in the diagonal dimension when considering package size. Additionally, it may be advantageous for ease of mastering and/or manufacturing to round the corners of the square bas geometry of the optical element.

FIG. 175 shows a top view raytrace diagram 5570 of certain elements of the exemplary imaging system of FIG. 165, shown here to illustrate a design with a circular aperture for each optical element. As can be observed in FIG. 175, optical element 5430 encroaches into a region 5572 surrounding an active area 5574 of VGA detector 5424; such encroachment reduces surface area available for bonding common base 5432 to cover plate 5422 via spacers 5436.

In order to reduce encroachment of an optical element having a circular aperture into the region 5572 surrounding active area 5574 of VGA detector 5424, such an optical element may be replaced with an optical element having a rectangular aperture. FIG. 176 shows a top view raytrace diagram 5580 of certain elements of the exemplary imaging system of FIG. 165 wherein optical element 5430 has been replaced with optical element 5482 having a rectangular aperture that fits within active area 5574 of VGA detector 5424. It should be understood that an optical element should be adequately oversized to insure that no electromagnetic energy within the image area of the detector is vignetted, represented in FIG. 176 by a bundle of rays of the vertical, horizontal and diagonal fields. Accordingly, surface area of common base 5432 available for bonding to cover plate 5422 is maximized.

The numerous constraints of systems with short optical track lengths with controlled chief ray angles, of the type needed for practical wafer-scale imaging systems, has led to imaging systems that may not image as well as desired. Even when fabricated and assembled with high accuracy, the image quality of such short imaging systems is not necessarily as high as is desired due to various aberrations that are fundamental to short imaging systems. When optics are fabricated and assembled according to prior art wafer-scale methods, potential errors in fabrication and assembly further contribute to optical aberrations that reduce imaging performance.

Consider an imaging system 5101, shown in FIG. 158, for example. This imaging system 5101, although meeting all design constraints, may suffer unavoidably from aberrations inherent in the design of the system. In effect, there are too few optical elements to suitably control the imaging parameters to ensure the highest quality imaging. Such unavoidable optical aberrations may act to reduce the MTF as a function of image location or field angle, as shown in FIGS. 158-160. Similarly, imaging system 5400, as shown in FIG. 165, may exhibit such field dependent MTF behavior. That is, the MTF on-axis may be much higher relative to the diffraction limit than the MTF off-axis due to field dependent aberrations.

When wafer-scale arrays such as those shown in FIG. 177 are considered, additional non-ideal effects may influence fundamental aberrations of an imaging system and, consequently, its image quality. In practice, common base surfaces are not perfectly flat; some waviness or warping is always present. This warping may cause tilting of individual optical elements and height variations within each imaging system within the arrayed imaging systems. Additionally, common bases are not always uniformly thick, and the act of combining common bases into an imaging system may introduce additional thickness variations that may vary across the arrayed imaging systems. For example, bonding layers (e.g., 5110 of FIGS. 157; 5310 and 5334 of FIGS. 164; and 5410 and 5434 of FIG. 165), spacers (e.g., spacers 5114 of FIGS. 157 and 163; spacers 5314 and 5336 of FIG. 164; spacers 5436 of FIG. 165; and spacers 5514 and 5536 of FIG. 172) and standoffs may vary in thickness. These numerous variations of practical wafer-scale optics may lead to relatively loose tolerances on the thickness and XYZ locations of the individual optical elements within an assembled arrayed imaging systems as illustrated in FIG. 177.

FIG. 177 shows an example of non-ideal effects that may be present in a wafer-scale array 5600 having a warped common base 5616 and a common base 5602 of an uneven thickness. Warping of common base 5616 results in tilting of optical elements 5618(1), 5618(2) and 5618(3); such tilting as well as the uneven thickness of common base 5602 may result in aberrations of imaged electromagnetic energy detected by detector 5624. Reduction of these tolerances may lead to serious fabrication challenges and higher costs. A relaxation of the tolerances and design of the entire imaging system with the particular fabrication method, tolerances and costs as integral components of the design process is desirable.

Consider the imaging system block diagram of FIG. 178 showing an imaging system 5700, which has similarities to system 40 shown in FIG. 1B Imaging system 5700 includes a detector 5724 and a signal processor 5740. Detector 5724 and signal processor 5740 may be integrated into the same fabrication material 5742 (e.g., silicon wafer) in order to provide a low cost, compact implementation. A specialized phase modifying element 5706, detector 5724 and signal processor 5740 may be tailored to control the effects of fundamental aberrations that typically limit performance of short track length imaging systems, as well as control the effects of fabrication and assembly tolerance of wafer-scale optics.

Specialized phase modifying element 5706 of FIG. 178 forms an equally specialized exit pupil of the imaging system, such that the exit pupil forms images that are insensitive to focus-related aberrations. Examples of such focus-related aberrations include, but are not limited to, chromatic aberration, astigmatism, spherical aberration, field curvature, coma, temperature related aberrations and assembly related aberrations. FIG. 179 shows a representation of the exit pupil 5750 from imaging system 5700. FIG. 180 shows a representation of the exit pupil 5752 from imaging system 5101 of FIG. 157, which has a spherical optical element 5106. Exit pupil 5752 does not need to form an image 5744. Instead, exit pupil 5752 forms a blurred image, which may be manipulated by signal processor 5740, if so desired. As imaging system 5700 forms an image with a significant amount of object information, removal of the induced imaging effect may not be required for some applications. However, post-processing by signal processor 5740 may function to retrieve the object information from the blurred image in such applications as bar code reading, location and/or detection of objects, biometric identification, and very low cost imaging where image quality and/or image contrast is not a major concern.

The only optical difference between imaging system 5700, FIG. 178 and imaging system 5101, FIG. 158 is between specialized phase modifying element 5706 and optical element 5106, respectively. While, in practice, there are very few choices of configurations for the optical elements of imaging system 5101 due to the system constraints, there are a great number of different choices for each of the various optical elements of imaging system 5700. While a requirement of imaging system 5101 may be, for example, to create a high quality image at an image plane, the only requirement of imaging system 5700 is to create an exit pupil such that the formed images have a high enough MTF so that information content is not lost through contamination with detector noise. While an MTF in the example of imaging system 5700 is constant over field, the MTF is not required to be constant over parameters such as field, color, temperature, assembly variation and/or polarization. Each optical element may be typical or unique depending on a particular configuration chosen to produce an exit pupil that achieves the MTF and/or image information at the image plane for a given application.

In comparison to imaging system 5101, consider imaging system 5700 FIG. 181 is a schematic cross-sectional diagram illustrating ray propagation through imaging system 5700 for different chief ray angles. FIGS. 182-183 show the performance of imaging system 5700 without signal processing for illustrative purposes. As demonstrated in FIG. 182, imaging system 5700 exhibits MTFs 5750 that change very little as a function of field angle compared to the data shown in FIG. 159. FIG. 183 also shows that MTF as a function of field angle at 70 lp/mm changes only by about a factor of ½. This change is approximately twelve times less in performance at this spatial frequency over the image than the system illustrated in FIGS. 158-160. Depending on the particular design of the system of FIG. 178, the range of MTF change may be made larger or smaller than in this example. In practice, actual imaging system designs are determined as a series of compromises between desired performance, ease of fabrication and amount of signal processing required.

A ray-based illustration of how addition of a surface for effecting a predetermined phase modification near an aperture stop 5712 of imaging system 5700 affects the system is shown in FIGS. 184 and 185, which show a comparison of ray caustic through field. FIG. 184 is a raytrace analysis of imaging system 5101 of FIG. 156-157 near detector 5124. FIG. 184 shows rays extending past image plane 5125 to show variation in distance from image plane 5125 when the highest concentration of electromagnetic energy (indicated by arrows 5760) is achieved. The location along an optical axis (Z axis) where a width of ray bundles 5762, 5764, 5766 and 5768 is a minimum is one measure of the best focus image plane for a ray bundle. Ray bundle 5762 represents the on-axis imaging condition, while ray bundles 5764, 5766 and 5768 represent increasingly larger off-axis field angles. The highest concentration of electromagnetic energy 5760 for the on-axis bundle 5762 is observed to be before image plane 5125. The concentrated area of electromagnetic energy 5760 moves towards and then beyond image plane 5125 as the field angle increases, demonstrating a classic combination of field curvature and astigmatism. This movement leads to a MTF drop as a function of field angle for imaging system 5101. FIGS. 184 and 185, in essence, show that a best focus image plane for imaging system 5101 varies as a function of image plane location.

In comparison, ray bundles 5772, 5774, 5776 and 5778 in the vicinity of image plane 5725 for imaging system 5700 are shown in FIG. 185. Ray bundles 5772, 5774, 5776 and 5778 do not converge to a narrow width. In fact, it is difficult to find a highest concentration of electromagnetic energy for these ray bundles, as a minimum width of the ray bundles appears to exist over a broad range along the Z-axis. There is also no noticeable change in a width of ray bundles 5772, 5774, 5776 and 5778, or location of minimum width as a function of field angle. Ray bundles 5772-5778 of FIG. 185 show similar information to FIGS. 182 and 183; namely, that there is little field dependent performance of the system of FIG. 178. In other words, a best focus image plane for imaging system 5700 is not a function of image plane location.

Specialized phase modifying element 5706 may be a form of a rectangularly separable surface profile that may be combined with the original optical surface of optical element 5106. A rectangularly separable form is given by Eq. (9):

$$P(x, y)=p_x(x)*p_y(y), \tag{9}$$

where $p_x=p_y$ in this example. The equation of $p_x(x)$ for specialized phase modifying element 5706 shown in FIG. 178 is given by Eq. (10):

$$p_x(x)=-564x^3+3700x^5-(1.18\times10^4)x^7-(5.28\times10^5)x^9, \qquad \text{Eq. (10)}$$

where the units of $p_x(x)$ are in microns and the spatial parameter x is a normalized, unitless spatial parameter related to the (x, y) coordinates of optical element 5106 when used in units of mm Many other types of specialized surface forms may be used including non-separable and circularly symmetric.

As seen from the exit pupils of FIGS. 179 and 180, this specialized surface adds about thirteen waves to a peak-to-valley exit pupil optical path difference ("OPD") of imaging system 5700 compared to imaging system 5101. FIGS. 186 and 187 show contour maps of the 2D surface profile of optical element 5106 and specialized phase modifying element 5706 from imaging systems 5101 and 5700, respectively. In the cases illustrated in FIGS. 186 and 187, the surface profile of specialized phase modifying element 5706 (FIG. 178) is only slightly different from that of optical element 5106 (FIG. 158). This fact implies that the overall height and degree of difficulty in forming fabrication masters for specialized phase modifying element 5706 of FIG. 178 is not much greater than that of 5106 from FIG. 158. If a circularly symmetric exit pupil were to be used, then forming a fabrication master for specialized phase modifying element 5706 of FIG. 178 would be easier still. Depending on a type of wafer-scale fabrication masters used, different forms of exit pupils may be desired.

Actual assembly tolerances of wafer-scale optics may be large compared to those of traditional optics assembly. For example, thickness variation of common bases, such as common bases 5602 and 5616 shown in FIG. 177, may be 5 to 20 microns at least, depending on the cost and size of the common bases. Each bonding layer may have a thickness variation on the order of 5 to 10 microns. Spacers may have additional variation on the order of tens of microns, depending on the type of spacer used. Bowing or warping of common bases may easily be hundreds of microns. When added together, a total thickness variation of a wafer-scale optic may reach 50 to 100 microns. If complete imaging systems are bonded to complete detectors, then it may not be possible to refocus each individual imaging system. Without a refocusing step, such large variations in thickness may drastically degrade image quality.

FIGS. 188 and 189 illustrate an example of image degradation due to assembly errors in the system of FIG. 157 when 150 microns of assembly error resulting in misfocus is introduced into imaging system 5101. FIG. 188 shows MTFs 5790 and 5792 when no assembly errors are present in imaging system 5101. MTFs 5790 and 5792 are a subset of curves 5140 and 5142 shown in FIG. 159. FIG. 189 shows MTFs 5794 and 5796 in the presence of 150 microns of assembly error, modeled as movement of the image plane in imaging system 5101 by 150 microns. With such a large error, a severe misfocus is present and MTFs 5796 display nulls. Such large errors in a wafer-scale assembly process for the imaging system of FIG. 157 would lead to extremely low yield.

The effects of assembly errors on imaging system 5700 may be reduced through implementation of a specialized phase modifying element, as demonstrated by imaging system 5700 of FIG. 178 and related improved MTFs as shown in FIGS. 190 and 191. FIG. 190 shows MTFs 5798 and 5800, before and after signal processing respectively, when no assembly errors are present in the imaging system. MTFs 5798 are a subset of the MTFs shown in FIG. 182. It may be observed in FIG. 190 that, after signal processing, MTFs 5800 from all image fields are high. FIG. 191 shows MTFs 5802 and 5804, before and after signal processing respectively, in the presence of 150 microns of assembly error. It may be observed that MTFs 5802 and 5804 decrease by a small amount compared to MTFs 5798 and 5800. Images 5744 from imaging system 5700 of FIG. 178 would therefore be only trivially affected by large assembly errors inherent in wafer-scale assembly. Thus, the use of specialized, phase modifying elements and signal processing in wafer-scale optics may provide an important advantage. Even with large wafer-scale assembly tolerances, the yield of imaging system 5700 of FIG. 178 may be high, suggesting that the image resolution from this system will generally be superior to that of imaging system 5101, even with no fabrication error.

As discussed above, signal processor 5740 of imaging system 5700 may perform signal processing to remove an imaging effect, such as a blur, introduced by specialized phase modifying element 5706, from an image. Signal processor 5740 may perform such signal processing using a 2D linear filter. FIG. 192 shows a 3D contour plot of one 2D linear filter. The 2D linear digital filter has such small kernels that it is possible to implement all of the signal processing needed to produce the final image on the same silicon circuitry as the detector, as shown in FIG. 178. This increased integration allows the lowest cost and most compact implementation.

The same filter illustrated in FIG. 192 was used for signal processing characterized by MTFs 5800 and 5804 shown in FIGS. 190 and 191. Use of only one filter for every imaging system in a wafer-scale array is not required. In fact, it may be advantageous in certain situations to use a different set of signal processing for different imaging systems in an array. Instead of a refocusing step, as is done now with conventional optics, a signal processing step may be used. This step may entail different signal processing from specialized target images for example. The step may also include selection of specific signal processing for a given imaging system depending on errors of that particular system. Test images may again be used to determine which of the different signal processing parameters or sets to use. By selecting signal processing for each wafer-scale imaging system, after singulation, depending on the particular errors of that system, overall yield may be increased beyond that possible when signal processing is uniform over all systems on a common base.

The reason the imaging system 5700 is more insensitive to assembly errors than the imaging system 5101 is described with reference to FIGS. 193 and 194. FIG. 193 shows thru-focus MTFs 5806 at 70 lp/mm for imaging system 5101 of FIG. 157. FIG. 194 shows the same type of thru-focus MTFs 5808 for imaging system 5700 of FIG. 178. Peak widths of thru-focus MTFs 5806 for imaging system 5101 are narrow with regard to even a 50 micron shift. In addition, the thru-focus MTFs shift as a function of image plane position. FIG. 193 is another demonstration of the field curvature that is shown in FIGS. 159 and 184. With only 50 microns of image plane movement, the MTFs of imaging system 5101 change significantly and produce a poor quality image. Imaging system 5101 thus has a large degree of sensitivity to image plane movement and to assembly errors.

FIG. 194 shows that thru-focus MTFs 5808 from imaging system 5700, in comparison, are very broad. For 50, 100, even 150 micron image plane shifts, or assembly error, it may be seen that MTFs 5808 change very little. Field curvature is also at a very low value, as are chromatic aberration and temperature related aberrations (although the later two phenomena are not shown in FIG. 193). By having broad MTFs, the sensitivity to assembly errors is greatly decreased. A variety of different exit pupils, besides exit pupil 5750 shown in FIG. 179, may produce this type of insensitivity. Numerous specific optical configurations may be used to produce these exit pupils. Imaging system 5700, represented by the exit pupil of FIG. 179 is just one example. Several configurations exist that balance desired specifications and a resulting exit pupil to achieve high image quality over a large field and over assembly errors commonly found in wafer-scale optics.

As discussed in prior sections, wafer-scale assembly includes placing layers of common bases containing multiple optical elements on top of each other. The imaging system so assembled may also be directly placed on top of a common base containing multiple detectors, thereby providing a number of complete imaging systems (e.g., each system including optics and detectors) which are separated during a separating operation.

This approach, however, suffers from the need for elements designed to control the spacing between individual optical elements and, possibly, between the optical assembly and the detector. These elements are usually called spacers and they usually (but not necessarily always) provide an air gap between optical elements. The spacers add cost, and reduce the yield and the reliability of the resulting imaging systems. The following embodiments remove the need for spacers, and provide imaging systems that are physically robust, easy to align and that present a potentially reduced total track length and higher imaging performance due to the higher number of optical surfaces that may be implemented. These embodiments provide the optical system designer with a wider range of distances between optical elements that may be precisely achieved.

FIG. 195 shows a cross-sectional view of assembled wafer-scale optical elements 5810(1) and 5810(2) where spacers have been replaced by bulk material 5812 located on either side (or both sides) of the assembly. Bulk material 5812 must have a refractive index that is substantially different from a refractive index of a material used to replicate optical elements 5810, and its presence should be taken into account when optimizing an optical design using software tools, as previously discussed. Bulk material 5812 acts as a monolithic spacer, thus eliminating a need for individual spacers between elements. Bulk material 5812 may be spin-coated over a common base 5814 containing optical elements 5810 for high uniformity and low cost manufacturing. The individual common bases are then placed in direct contact with each other, simplifying the alignment process, making it less susceptible to failure and procedural errors, and increasing a total manufacturing yield. Additionally, bulk material 5812 is likely to have a refractive index that is substantially larger than that of air, potentially reducing the total track of the complete imaging system. In an embodiment, a replicated optical elements 5810 and bulk material 5812 are polymers of similar coefficients of thermal expansion, stiffness and hardness, but of different refractive indices.

FIG. 196 shows one section from a wafer-scale imaging system. The section includes a common base 5824 having replicated optical elements 5820 enclosed by bulk materials 5822. One or both surfaces of common base 5824 may include replicated optical elements 5820 with or without bulk material 5822. Replicated elements 5820 may be formed onto or into a surface of common base 5824. Specifically, if surface 5827 defines a surface of common base 5824, then elements may be considered as formed into common base 5824. Optionally, if surface 5826 defines a surface of common base 5824, then elements 5820 may be considered as being formed onto surface 5826 of common base 5824. Replicated optical elements may be created using techniques known to those of skill in the art, and they may be converging or diverging elements depending upon their shapes and a difference in refractive indices between materials. Replicated optical elements may also be conic, wavefront coding, rotationally asymmetric, or they may be optical elements of arbitrary shape and form, including diffractive elements and holographic elements. Replicated optical elements may also be isolated (e.g., 5810(1)) or joined (e.g., 5810(2)). Replicated optical elements may also be integrated into a common base, and/or they may be an extension of the bulk material, as shown in FIG. 196. In an embodiment, a common base is made of glass, transparent at visible wavelengths but absorptive at infrared and possibly ultraviolet wavelengths.

The above described embodiments do not require the use of spacers between elements. Instead, spacing is controlled by thicknesses of several components that constitute the optical system. Referring back to FIG. 195, the spacing between elements in the system is controlled by thickness $d_s$ (of common base 5814), $d_1$ (of bulk material overlapping optical elements 5810(2)), $d_c$ (of a base of replicated optical elements 5810(2)) and $d_2$ (of a bulk material overlapping optical elements 5810(1)). Note that distance $d_2$ may also be represented as a sum of individual thicknesses $d_a$ and $d_b$, a thickness of optical elements 5810(1) and a thickness of bulk material 5812 over optical elements 5810, respectively. Moreover, the thicknesses here represented are exemplary of different thicknesses that may be controlled, and do not necessarily represent an exhaustive list of all possible thicknesses that may be used for total spacing control. Any one of the constituent elements may be split into two elements, for example, providing a designer with extra control over thicknesses. Additional accuracy in vertical spacing between elements may be achieved by the use of controlled diameter spheres, columns or cylinders (e.g., fibers) embedded into the high and low refractive index materials, as known to those of skill in the art.

FIG. 197 shows an array 5831 of wafer-scale imaging systems, including detectors 5838, showing that a removal of spacers may be extended throughout the imaging systems to a common base 5834(2) that supports detectors 5838. In FIG. 195, spacing between replicated optical elements 5810 is controlled by thickness $d_s$, of a common base 5814. FIG. 197 shows an alternative embodiment, in which the nearest vertical spacing that can occur atop optical elements 5830 is controlled by a thickness $d_2$ of a bulk material 5832. It may be noted that multiple permutations of an order of elements in FIG. 197 are possible, and that isolated optical elements 5810(1) and 5830 were used in the examples of FIGS. 195 and 197, but joined elements, such as optical elements 5810(2) of FIG. 195, may also be used, and a thickness of common base 5834(1) may be used to control spacing. It may be further noted that the optical elements present in the imaging system may include a CRAC element, such as shown in FIG. 166 and described earlier herein. Finally, optical element 5830, bulk material 5832 or common base 5834 does not necessarily need to be present at any of the wafer-scale elements. One or more of these elements may be eliminated depending upon the needs of the optical design.

FIG. 198 shows an array 5850 of wafer-scale imaging systems including detectors 5862 formed on a common base 5860. Array 5850 does not require the use of spacers. Optical elements 5854 are formed on a common base 5852, and regions between optical elements 5854 are filled with a bulk material 5856. Thickness $d_2$ of bulk material 5856 controls a distance from a surface of optical elements 5854 to detectors 5862.

Use of replicated optical polymers further enables novel configurations in which, for example, no air gaps are required between optical elements. FIGS. 199 and 200 illustrate configurations in which two polymers with different refractive indices are formed to create an imaging system with no air gaps. Materials used for the alternating layers may be selected such that a difference between their refractive indices is large enough to provide the required optical power of each surface, with care given to minimizing Fresnel loss and reflections at each interface. FIG. 199 shows a cross-sectional view of an array 5900 of wafer-scale imaging systems. Each imaging system includes layered optical elements 5904 formed on a common base 5903. An array of layered optical elements 5904 may be formed sequentially (e.g., layered optical element 5904(1) firstly, and layered optical element 5904(7) lastly) on common base 5903. Layered optical elements 5904 and common base 5903 may then be bonded to detectors formed upon a common base (not shown). Alternatively, common base 5903 may be a common base including an array of detectors. Layered optical element 5904(5) may be a meniscus element, elements 5904(1) and 5904(3) may be biconvex elements and elements 5902 may be diffractive or Fresnel elements. Additionally, element 5904(4) may be a plano/plano element whose only function is to allow for adequate optical path length for imaging. Alternatively, layered optical element 5904 may be formed in reverse order (e.g., optical element 5904(7) firstly, and optical element 5904(1) lastly) directly upon a common base 5906.

FIG. 200 shows a cross-sectional illustration of a single imaging system 5910 that may have been formed as part of arrayed imaging systems. Imaging system 5910 includes layered optical elements 5912 formed upon common base 5914, which includes a solid state image detector, such as a CMOS imager. Layered optical elements 5912 may include any number of individual layers of alternative refractive index. Each layer may be formed by sequential formation of optical elements starting from optical elements closest to common base 5914. Examples of optical assemblies in which polymers having different refractive indices are assembled together include layered optical elements, including those discussed above with respect to FIGS. 1B, 2, 3, 5, 6, 11, 12, 17, 29, 40, 56, 61, 70, and 79. Additional examples are discussed immediately hereinafter with respect to FIGS. 201 and 206.

A design concept illustrated in FIGS. 199 and 200 is shown in FIG. 201. In this example, two materials are selected to have refractive indices of $n_{hi}$=2.2 and $n_{lo}$=1.48 and Abbe numbers of $V_{hi}$=$V_{lo}$=60. The value of 1.48 for $n_{lo}$ is commercially available for optical quality UV curable sol-gels and may be readily implemented into designs in which layer thicknesses range from one to several hundred microns, with low absorption and high mechanical integrity. The value of 2.2 for $n_{hi}$ was selected as a reasonable upper limit consistent with literature reports of high index polymers achieved by embedding $TiO_2$ nanoparticles in a polymer matrix. Imaging system 5920 shown in FIG. 201 contains eight refractive index transitions between individual layers 5924(1) to 5924(8). Aspheric curvatures of these transitions are described using the coefficients listed in TABLE 47. Layered optical elements 5924(1)-5924(8) are formed on common base 5925, which may be utilized as a cover plate for detector 5926. Notice that a first surface, on which an aperture stop 5922 is placed, has no curvature; consequently, imaging system 5920 has a fully rectangular geometry, which may facilitate packaging. Layer 5924(1) is a primary focusing element in imaging system 5920. Remaining layers 5924(2)-5924(7) allow for improved imaging by enabling field curvature correction, chief ray control and chromatic aberration control, among other effects. In the limit that each layer could be infinitesimally thin, such a structure could approach a continuously graded index allowing very accurate control of image characteristics and, perhaps, even telecentric imaging. The choice of a low index material for layer 5924(3) allows for more rapid spreading of the fan of rays within a field of view to match an area of image detector 5926. In this sense, the use of a low index material here allows greater compressibility of the optical track.

FIGS. 202 through 205 show numerical modeling results of various optical performance metrics for imaging system 5920 shown in FIG. 201, as will be described in more detail immediately hereinafter. TABLE 48 highlights some key optical metrics. Specifically, the wide field of view (70°), short optical track (2.5 mm) and low f/# (f/2.6) make this system ideal for camera modules used in, for example, cell phone applications.

TABLE 48-continued

| Optical Specifications | Target | On axis |
|---|---|---|
| Relative Illumination @ corner | >45% | 52.8% |
| Max Optical Distortion | ±5% | −5.35% |
| Total Optical Track | <2.5 mm | 2.50 mm |
| Working F/# | 2.5-3.2 | 2.60 |
| Effective Focal Length | — | 1.65 |
| Diagonal Field of View | >70° | 70.0° |
| Max Chief Ray Angle (CRA) | <30° | 30° |

Figure 202:
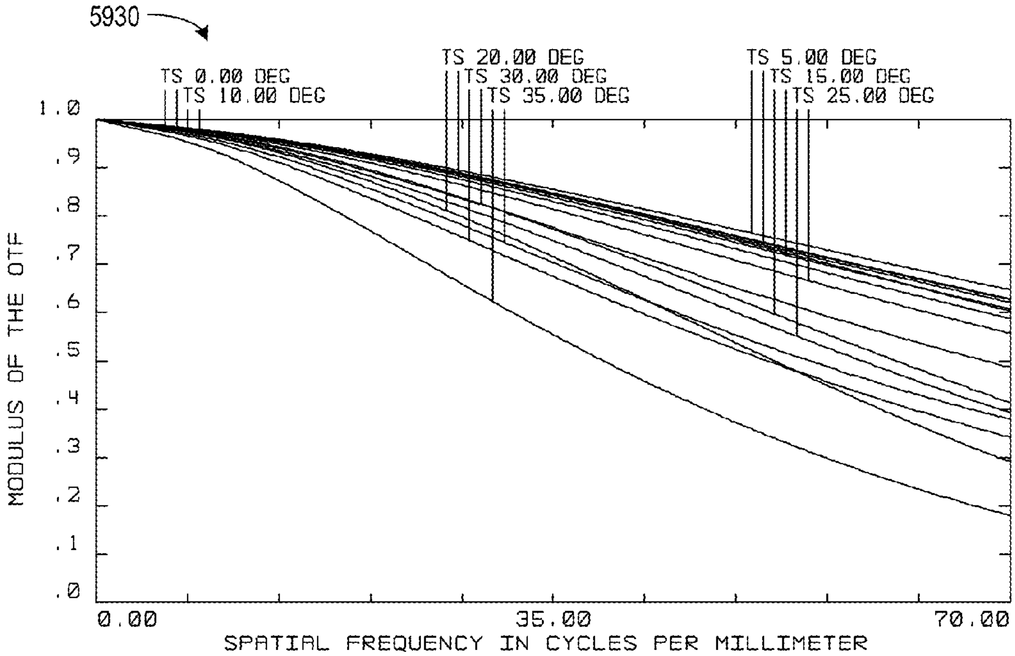
Figure 203:
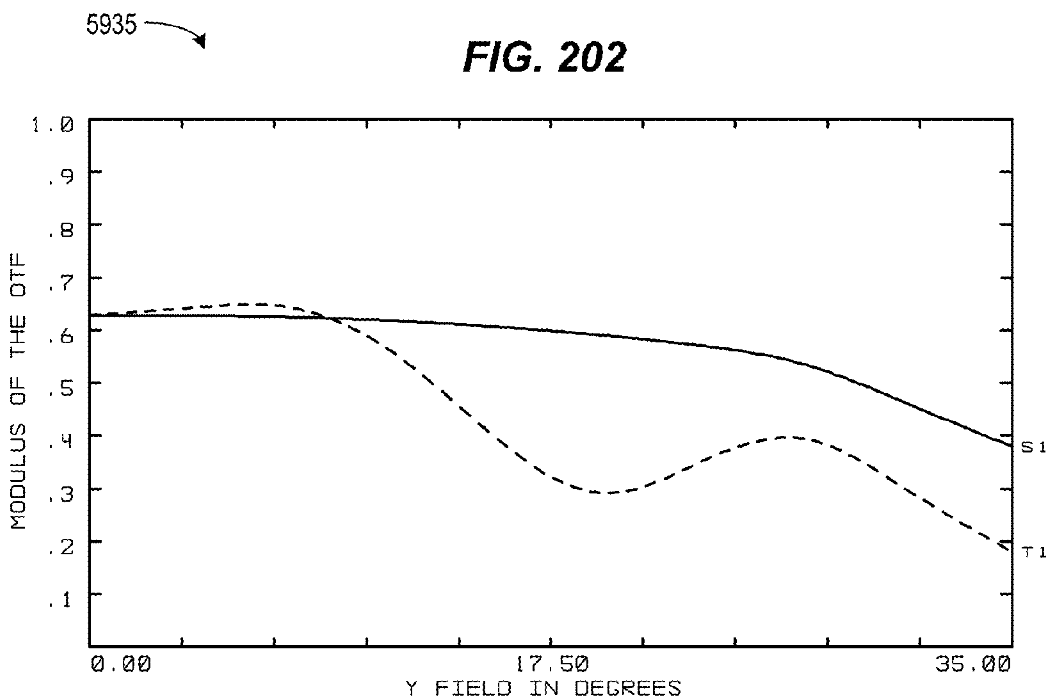
Figure 204:
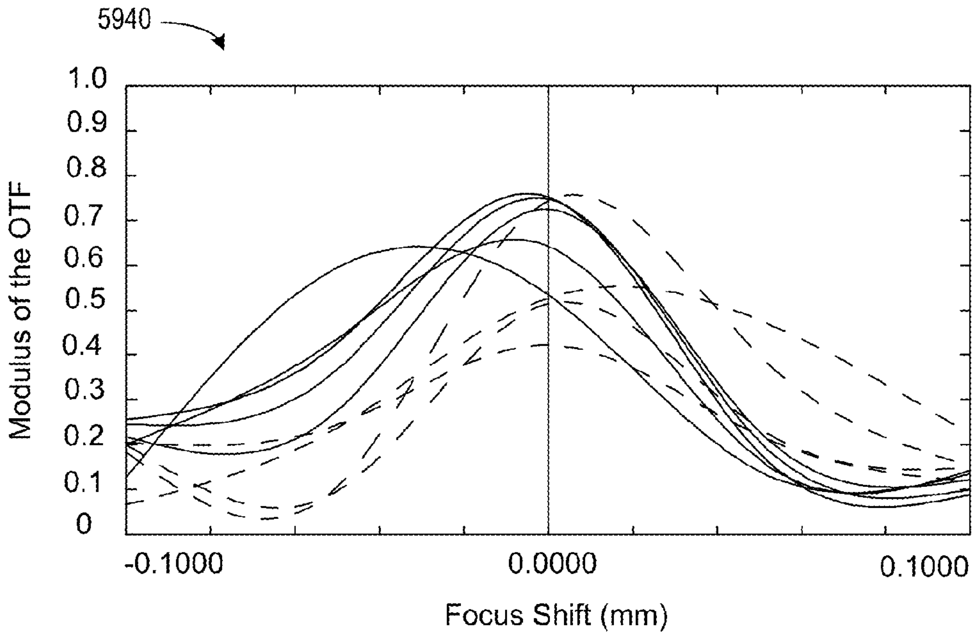
Figure 205:
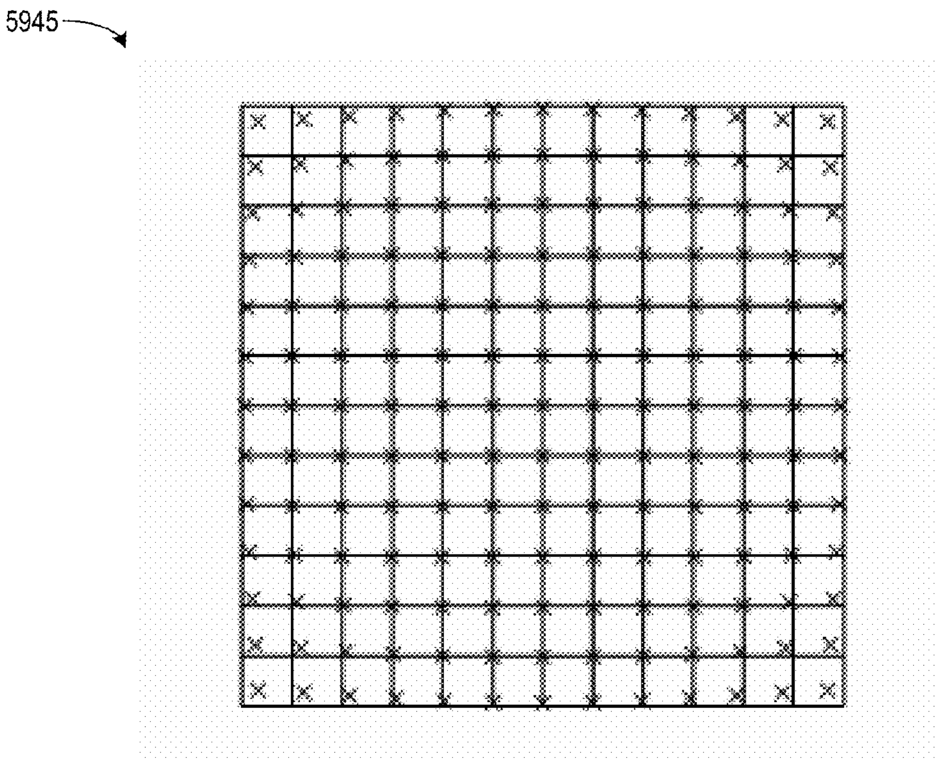

FIG. 202 shows a plot 5930 of MTFs of imaging system 5920. A spatial frequency cutoff was chosen to be consistent with the Bayer cutoff (i.e., half of the grayscale Nyquist frequency) using a 3.6 μm pixel size. Plot 5930 shows that the spatial frequency response of imaging system 5920 is superior to the comparable response, shown in FIG. 159, of imaging system 5101 of FIG. 158. The improved performance may be assigned primarily to ease of implementation of a higher number of optical surfaces using the fabrication method associated with FIG. 201 than may be achieved with the method of using assembled common bases in which there is a fundamental constraint on the minimum thickness of a common base that may be used due to mechanical integrity of large diameter, thin common bases, as in imaging system 5101. FIG. 203 shows a plot 5935 of variation of the MTF through-field for imaging system 5920. FIG. 204 shows a plot 5940 of thru-focus MTF and FIG. 205 shows a map 5945 of grid distortion of imaging system 5920.

As described previously, an advantage of selecting polymers with large differences in refractive index is the minimal curvature that is required in each surface. However, drawbacks exist to using materials with large Δn, including large Fresnel losses at each interface and high absorption typical of polymers with a refractive index exceeding 1.9. Low loss, high index polymers exist with refractive index values between 1.4 and 1.8. FIG. 206 shows an imaging system 5960 in which the materials used have refractive indices of $n_{lo}$=1.48 and $n_{hi}$=1.7. Imaging system 5960 includes an aperture stop 5962 formed on a surface of a layer 5964(1) of layered optical element 5964. Layered optical element 5964 includes eight individual layers of optical elements 5964(1)-5964(8) formed on a common base 5966 which may be utilized as a cover plate for a detector 5968. Aspheric curvatures of these optical elements are described using the coefficients listed in TABLE 49 and specifications for imaging system 5960 are listed in TABLE 50.

It may be observed in FIG. 206 that curvatures of transition interfaces are greatly exaggerated relative to those in FIG. 201. Furthermore, there is a slight reduction in the MTFs shown in a through-field MTF plot 5970 of FIG. 207 and a thru-focus MTF plot 5975 of FIG. 208, relative to MTFs in

TABLE 47

| | Refractive index | Semi diameter (mm) | Layer Center thickness (mm) | A1 ($r^2$) | A2 ($r^4$) | A3 ($r^6$) | A4 ($r^8$) | A5 ($r^{10}$) | Sag (μm, P-V) |
|---|---|---|---|---|---|---|---|---|---|
| 5924(1) | 1.48 | 0.300 | 0.110 | 0 | 0 | 0 | 0 | 0 | 0 |
| 5924(2) | 2.2 | 0.377 | 0.095 | 0.449 | 0.834 | −1.268 | −5.428 | −35.310 | 73 |
| 5924(3) | 1.48 | 0.381 | 1.224 | 0.035 | 0.370 | 1.288 | −10.063 | −52.442 | 9 |
| 5924(4) | 2.2 | 0.593 | 0.135 | 0.077 | −0.572 | −0.535 | −0.202 | −3.525 | 90 |
| 5924(5) | 1.48 | 0.673 | 0.290 | −0.037 | 0.109 | −0.116 | −0.620 | 0.091 | 29 |
| 5924(6) | 2.2 | 0.821 | 0.059 | −0.009 | 0.057 | 0.088 | −0.004 | −0.391 | 16 |
| 5924(7) | 1.48 | 0.821 | 0.128 | 0.019 | −0.071 | −0.115 | −0.101 | 0.057 | 67 |
| 5924(8) | 2.2 | 0.890 | 0.025 | −0.178 | 0.091 | 0.093 | 0.006 | 0 | 54 |

TABLE 48

| Optical Specifications | Target | On axis |
|---|---|---|
| Avg. MTF @ Nyquist/2, on axis | >0.3 | 0.624 |
| Avg. MTF @ Nyquist/2, horizontal | >0.3 | 0.469 |
| Avg. MTF @ Nyquist/4, on axis | >0.4 | 0.845 |
| Avg. MTF @ Nyquist/4, horizontal | >0.4 | 0.780 |
| Avg. MTF @ Nyquist/2, corner | >0.1 | 0.295 |

plots 5930 and 5935 of FIGS. 202 and 203. However, imaging system 5960 provides a marked improvement in imaging performance over imaging system 5101 of FIG. 158.

It is notable that the designs of imaging systems 5920 and 5960 are compatible with wafer-scale replication technologies. Use of layered materials with alternating refractive indices allows for a full imaging system with no air gaps. Use of replicated layers further allows for thinner and more dynamic aspheric curvatures in the elements created than would be possible with the use of glass common bases. Note that there is no limitation to a number of materials used, and it might be advantageous to select refractive indices that further reduce chromatic aberration from dispersion through the polymers.

TABLE 49

| | Refract. index | Semi-diam. (mm) | Layer center thick. (mm) | A1 ($r^2$) | A2 ($r^4$) | A3 ($r^6$) | A4 ($r^8$) | A5 ($r^{10}$) | A6 ($r^{12}$) | A7 ($r^{14}$) | A8 ($r^{16}$) | Sag (μm, P-V) |
|---|---|---|---|---|---|---|---|---|---|---|---|---|
| 5964(1) | 1.48 | 0.300 | 0.043 | 0.050 | −0.593 | −2.697 | −7.406 | 230.1 | 2467 | 6045 | −2.7e5 | 0 |
| 5964(2) | 1.7 | 0.335 | 0.191 | 0.375 | 0.414 | 3.859 | −10.22 | −520.8 | −4381 | 1.55e4 | 2.8e5 | 73 |
| 5964(3) | 1.48 | 0.354 | 0.917 | −0.538 | −1.22 | 2.58 | −17.15 | −260.5 | −1207 | 2529 | −9.96e4 | 9 |
| 5964(4) | 1.7 | 0.602 | 0.156 | −0.323 | 0.023 | −0.259 | −2.57 | 1.709 | 8.548 | 7.905 | −19.1 | 90 |
| 5964(5) | 1.48 | 0.614 | 0.174 | −0.674 | 0.125 | −0.038 | 0.308 | −3.03 | −7.06 | 3.07 | 45.76 | 29 |
| 5964(6) | 1.7 | 0.708 | 0.251 | 0.0716 | −0.0511 | −0.568 | 0.182 | 1.074 | 0.159 | −0.981 | −7.253 | 16 |
| 5964(7) | 1.48 | 0.721 | 0.701 | −0.491 | 0.019 | 0.124 | −0.061 | 0.103 | −0.735 | −0.296 | 1.221 | 67 |
| 5964(8) | 1.7 | 0.859 | 0.025 | −1.028 | 0.731 | 0.069 | 0.037 | −0.489 | 0.132 | 0.115 | 0.161 | 54 |

TABLE 50

| Optical Specifications | Target | On axis |
|---|---|---|
| Avg. MTF @ Nyquist/2, on axis | >0.3 | 0.808 |
| Avg. MTF @ Nyquist/2, horizontal | >0.3 | 0.608 |
| Avg. MTF @ Nyquist/4, on axis | >0.4 | 0.913 |
| Avg. MTF @ Nyquist/4, horizontal | >0.4 | 0.841 |
| Avg. MTF @ Nyquist/2, corner | >0.1 | 0.234 |
| Relative Illumination @ corner | >45% | 73.4% |
| Max Optical Distortion | ±5% | −12.7% |
| Total Optical Track | <2.5 mm | 2.89 mm |
| Working F/# | 2.5-3.2 | 2.79 |
| Effective Focal Length | — | 1.72 |
| Diagonal Field of View | >70° | 70.0° |
| Max Chief Ray Angle (CRA) | <30° | 30° |

FIG. 209 illustrates the use of electromagnetic energy blocking or absorbing layers 5980(1)-5980(9) which could be used as nontransparent baffles and/or apertures in an imaging system 5990 to control stray electromagnetic energy as well as artifacts in an image that originate from electromagnetic energy emitted or reflected from objects outside a field of view. The composition of these layers could be metallic, polymeric or dye-based. Each of layers 5980(1)-5980(9) would attenuate reflection or absorb unwanted stray light from out of field objects (e.g., the sun) or reflections from prior surfaces.

A variable diameter may be incorporated into any of imaging systems 5101, 5400(2), 5920, 5960 and 5990 by exploiting variable transmittance materials. One example of this configuration would be to use, for example, an electrochromic material (for example, a combination of tungsten oxide ($WO_3$) or Prussian blue (PB)) at an aperture stop (e.g., element 5962 of FIG. 206) which would have a variable transmittance in the presence of an electric field. In the presence of an applied field $WO_3$, for example, will begin to absorb heavily through most of the red and green bands, creating a blue material. A circular electric field could be applied to a layer of the material at the aperture stop. Strength of the applied field would determine the diameter of the aperture stop. In bright light conditions, a strong field would reduce the diameter of a transmitting region, which would have the effect of reducing the aperture stop, thereby increasing image resolution. In a low light environment, the field could be depleted to allow maximum aperture stop diameter, thereby maximizing a light gathering capacity of an imager. Such field depletion would reduce image sharpness, but such an effect is typically expected in low lighting conditions as the same phenomenon happens in the human eye. Also, since an edge of the aperture stop would now be soft (as opposed to a sharp transition that would occur with a metal or dye), the aperture stop would be somewhat apodized, which would minimize image artifacts due to diffraction around the aperture stop.

In the fabrication of arrayed imaging systems such as those described above, it may be desirable to fabricate a plurality of features for forming optical elements (i.e., templates) as, for example, an array on a face of a fabrication master, such as an eight-inch or twelve-inch fabrication master. Examples of optical elements that may be incorporated into a fabrication master include refractive elements, diffractive elements, reflective elements, gratings, GRIN elements, subwavelength structures, anti-reflection coatings and filters.

FIG. 210 shows an exemplary fabrication master 6000 including a plurality of features for forming optical elements (e.g., templates for forming optical elements), a portion of which are identified by a dotted rectangle 6002. FIG. 211 provides additional detail with respect to features for forming optical elements within the rectangle 6002. A plurality of features 6004 for forming optical elements may be formed on fabrication master 6000 in an extremely precise row-column relationship. In one example, positional alignments of features 6004 may vary from ideal precision by no more than tens of nanometers in the X-, Y- and/or Z-directions as defined below.

FIG. 212 shows a general definition of axes of motion relative to fabrication master 6000. For a fabrication master surface 6006, X- and Y-axes correspond to linear translation in a plane parallel to fabrication master surface 6006. A Z-axis corresponds to a linear translation in a direction orthogonal to fabrication master surface 6006. Additionally, an A-axis corresponds to rotation about the X-axis, a B-axis corresponds to rotation about the Y-axis, and a C-axis corresponds to rotation about the Z-axis.

FIGS. 213 to 215 show a conventional diamond turning configuration that may be used to machine features for forming a single optical element on a substrate. Specifically, FIG. 213 shows a conventional diamond turning configuration 6008 including a tool tip 6010 on a tool shank 6012 configured for fabricating a feature 6014 on a substrate 6016. A dashed line 6018 indicates the rotational axis of substrate 6016 while a line 6020 indicates the path of tool tip 6010 taken in forming feature 6014. FIG. 214 shows details of a tool tip cutting edge 6022 of tool tip 6010. For tool tip cutting edge 6022, a primary clearance angle Θ (see FIG. 215) limits the steepness of possible features that may be cut using tool tip 6010. FIG. 215 shows a side view of tool tip 6010 and a portion of tool shank 6012.

A diamond turning process that utilizes a configuration as shown in FIGS. 213 to 215 may be used for the fabrication of, for example, a single, on-axis, axially symmetric surface such as a single refractive element. As mentioned in the Background section, one known example of an eight-inch fabrication master is formed by forming a partial fabrication master with one or a few (e.g., three or four) such optical elements, then using the partial fabrication master to "stamp" an array of features for forming optical elements across the entire eight-inch fabrication master. However, such prior art techniques only yield fabrication precision and positioning tolerance on the order of multiples of microns, which is insufficient for achieving optical tolerance alignment for wafer-scale imaging systems. In practice, it may be difficult to adapt the process to the fabrication of a plurality of features for forming an array of optical elements across a fabrication master. For example, it is difficult to index the fabrication master accurately to achieve adequate positioning accuracy of the features with respect to each other. When attempting to fabricate features away from the center of the fabrication master, the fabrication master is not balanced on the chuck that holds and rotates the fabrication master. This effect of the unbalanced load on the chuck may exacerbate positional accuracy problems and reduce fabrication precision of the features. Using these techniques, it is only possible to achieve positioning accuracy, determined as the features with respect to each other and on the fabrication master, on the order of tens of microns. Required precision in the manufacture of features for forming optical elements is on the order of tens of nanometers (e.g., on the order of a wavelength of the electromagnetic energy of interest). In other words, it not possible to populate a large (e.g., eight-inches or larger) fabrication master with positioning accuracy and fabrication precision at optical tolerances across the entire fabrication master using conventional techniques. However, it is possible to improve the precision of manufacture according to the instrumentalities described herein.

The following description provides methods and configurations for manufacturing a plurality of features for forming optical elements on a fabrication master, in accordance with various embodiments. Wafer-scale imaging systems (e.g., those shown in FIG. 3A) generally require multiple optical elements layered in a Z-direction and distributed across a fabrication master in X- and Y-directions (also called a "regular array"). See, for example, FIG. 212 for a definition of the X-, Y- and Z-directions with respect to a fabrication master. The layered optical elements may be formed on, for example, single sided glass wafers, double sided glass wafers and/or as a group with sequentially layered optical elements. Improved precision of providing a large number of features for forming optical elements on a fabrication master may be provided by use of a high precision fabrication master, as described below. For instance, a variation in the Z-direction of ±4 microns (corresponding to a four sigma variation, assuming a zero mean) in each of four layers would result in a Z-variation of ±16 microns for the group. When applied to an imaging system with small pixels (e.g., less than 2.2 microns) and fast optics (e.g., f/2.8 or faster), such a Z-variation would result in loss of focus for a large fraction of wafer-scale imaging systems assembled from four layers. Such focus loss is difficult to correct in wafer-scale cameras. Similar problems of yield and image quality result from fabrication tolerance issues in the X- and Y-dimensions.

Prior fabrication methods for wafer-scale assemblies of optical elements do not allow assembly at optical precision required to achieve high image quality; that is, while current fabrication systems allow assembly at mechanical tolerances (measured in multiples of wavelengths), they do not allow fabrication and assembly at optical tolerances (on the order of a wavelength) that are required for arrayed imaging systems such as an array of wafer-scale cameras.

It may be advantageous to directly fabricate a fully populated fabrication master that includes features thereon for forming a plurality of optical elements to eliminate, for example, the need for a stamping process to populate the fabrication master. Furthermore, it may be advantageous to fabricate all of the features for forming optical elements in one setup, so that positioning of the features with respect to one another is controlled to a high degree (e.g., nanometers). It may be further advantageous to produce higher yield fabrication masters in less time than is possible utilizing current methods.

In the following disclosure, the term "optical element" is utilized interchangeably to denote the final element that is to be formed through utilization of a fabrication master, and the features on the fabrication master itself. For example, references to "optical elements formed on a fabrication master" do not literally mean that optical elements themselves are on the fabrication master; such references denote the features intended to be utilized to form the optical elements.

The axes as defined in a conventional diamond turning process are shown in FIG. 216 for an exemplary multi-axis machining configuration 6024. Multi-axis machining configuration 6024 may for example be used with a slow tool servo ("STS") method and a fast tool servo ("FTS") method. The slow tool servo or fast tool servo ("STS/FTS") method may be accomplished on a multi-axis diamond turning lathe (e.g., a lathe as shown in FIG. 216, with controllable motion in the X-, Z-, B- and/or C-axes). An example of a slow tool servo is described, for instance, in U.S. Pat. No. 7,089,835 to Bryan entitled "SYSTEM AND METHOD FOR FORMING A NON-ROTATIONALLY SYMMETRIC PORTION OF A WORKPIECE".

A workpiece may be mounted on a chuck 6026, which is rotatable about the C-axis while being actuated in the X-axis on a spindle 6028. In the mean time, a cutting tool 6030 is mounted and rotated on a tool post 6032. Conversely, chuck 6026 may be mounted in place of tool post 6032 and actuated in the Z-axis while cutting tool 6030 is placed and rotated on spindle 6028. Additionally, each of chuck 6026 and cutting tool 6030 may be rotated and positioned about the B-axis.

Referring now to FIG. 218 in conjunction with FIG. 217, a fabrication master 6034 includes a front surface 6036, on which a plurality of features 6038 for forming optical elements is fabricated. Cutting tool 6030 sweeps and scoops across each feature 6038 and fabricates the plurality of features 6038 on front surface 6036 as fabrication master 6034 is rotated about a rotation axis (indicated by a dash-dot line 6040). A fabrication procedure for features 6038 across the entire front surface 6036 of fabrication master 6034 may be programmed as one freeform surface. Alternatively, one of each type of feature 6038 to be formed upon fabrication master 6034 may be defined separately, and fabrication master 6034 may be populated by specifying coordinates and angular orientation for each feature 6038 to be formed. In this way, all of features 6038 are manufactured in one setup, such that position and orientation of each feature 6038 is maintainable on a nanometer level. Although fabrication master 6034 is shown to include a regular array (i.e., evenly spaced in two dimensions) of feature 6038, it should be understood that irregular arrays (e.g., unevenly spaced in at least one dimension) of features 6038 may be simultaneously or alternately included on fabrication master 6034.

Details of an inset 6042 (indicated by a dashed circle) in FIG. 217 are shown in FIGS. 218 and 219. Cutting tool 6030, including a tool tip 6044 supported on a tool shank 6046, may be repeatedly swept in a direction 6048 along gouge tracks 6050 so as to form each feature 6038 in fabrication master 6034.

Use of a STS/FTS, according to an embodiment may yield a good surface finish on the order of 3 nm Ra. Moreover, single point diamond turning (SPDT) cutting tools for STS/FTS may be inexpensive and have sufficient tool life to cut an entire fabrication master. In an exemplary embodiment, an eight-inch fabrication master 6034 may be populated with over two thousand features 6038 in one hour to three days, depending on Ra requirements that are specified during the design process, as shown in FIGS. 94-100. In some applications, tool clearance may limit the maximum surface slope of off-axis features.

In an embodiment, multi-axis milling/grinding may be used to form a plurality of features for forming optical elements on a fabrication master 6052, as shown in FIGS. 220A-220C. In the example of FIGS. 220A-200C, a surface 6054 of fabrication master 6052 is machined using a rotating cutting tool 6056 (e.g., a diamond ball end mill bit and/or a grinding bit). Rotating cutting tool 6056 is actuated relative to surface 6054 in the X-, Y- and Z-axes in a spiral shaped tool path, thus creating a plurality of features 6058. While a spiral shaped tool path is shown in FIGS. 220B and 220C, other tool path shapes, such as a series of S-shapes or radial tool paths, may also be used.

The multi-axis milling process illustrated in FIGS. 220A-220C may allow machining of steep slopes up to 90°. Although interior corners of a given geometry may have a radius or fillet equal to that of a tool radius, multi-axis milling allows creation of non-circular or free-form geometries such as, for example, rectangular aperture geometries Like the use of STS or FTS, features 6058 are fabricated in one setup, so multi-axis positioning is maintained to a nanometer level. However, multi-axis milling may take generally longer than using STS or FTS to populate an eight-inch fabrication master 6052.

Comparing use of STS/FTS and multi-axis milling, the STS/FTS may be better suited for fabrication of shallow surfaces with low slopes, while multi-axis milling may be more suitable for fabrication of deeper surfaces and/or surfaces with higher slopes. Since surface geometry directly relates to tool geometry, optical design guidelines may encourage the specification of more effective machining parameters.

Although each of the aforedescribed embodiments have been illustrated with various components having particular respective orientations, it should be understood that the embodiments as described in the present disclosure may take on a variety of specific configurations with the various components being located in a variety of positions and mutual orientations and still remain within the spirit and scope of the present disclosure. For example, before an actual feature for forming an optical element is machined, a shape resembling the feature may be "roughed in" using, for instance, conventional cutting methods other than diamond turning or grinding. Further, cutting tools other than diamond cutting tools (e.g., high speed steel, silicon carbide, and titanium nitride) may be used.

As another example, a rotating cutting tool may be tailored to a desired shape of a feature for forming an optical element to be fabricated; that is, as shown in FIGS. 221A and 221B, a specialized form tool may be used to fabricate each feature (e.g., in a process also known as "plunging"). FIG. 221A shows a configuration 6060 illustrating the forming of a feature 6062 for forming an optical element on front surface 6066 of a fabrication master 6064. Feature 6062 is formed on front surface 6066 of fabrication master 6064 using a specialized form tool 6068. In configuration 6060, specialized form tool 6068 is rotated about an axis 6070. As may be seen in FIG. 221B (a top view, in partial cross-section, of configuration 6060), specialized form tool 6068 includes a non-circular cutting edge 6072 supported on a tool shank 6074 such that, upon application of specialized form tool 6068 on front surface 6066 of fabrication master 6064, feature 6062 is formed thereon, in relief, having a non-spherical shape. By tailoring cutting edge 6072 a variety of customized features 6062 may be formed in this manner. Furthermore, the use of specialized form tools may reduce cutting time over other fabrication methods and allow cutting slopes of up to 90°.

As an example of the "rough in" procedure described above, a commercially available cutting tool with an appropriate diameter may be used to first machine a best-fit spherical surface, then a custom cutting tool with a specialized cutting edge (such as cutting edge 6072 may be used to form feature 6062. This "rough in" process may decrease processing time and tool wear by reducing an amount of material that must be cut by a specialized form tool.

Figure 222A:
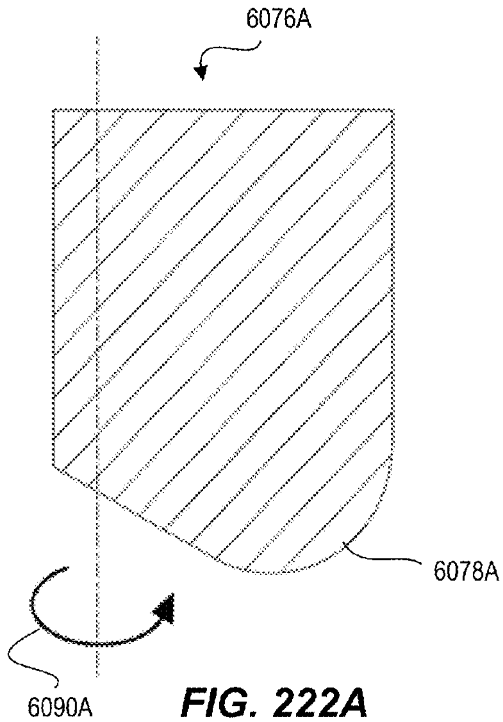
Figure 222B:
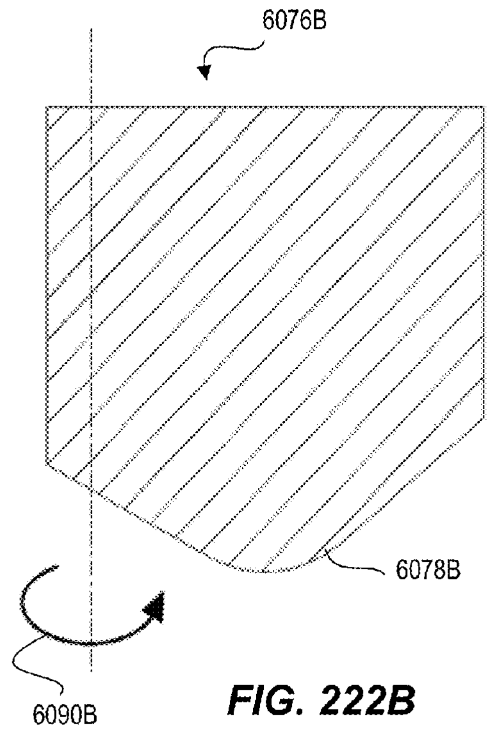
Figure 222C:
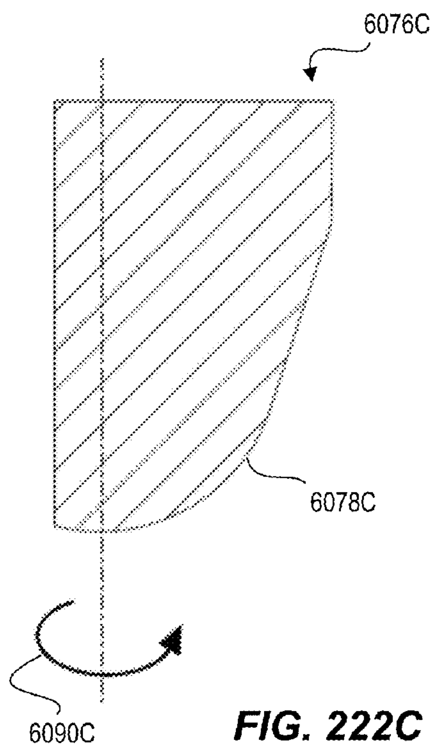
Figure 222D:
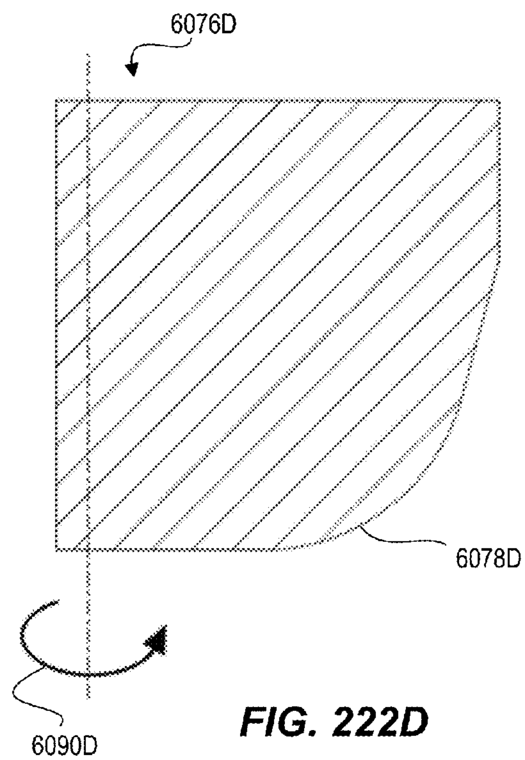
Figure 222E:
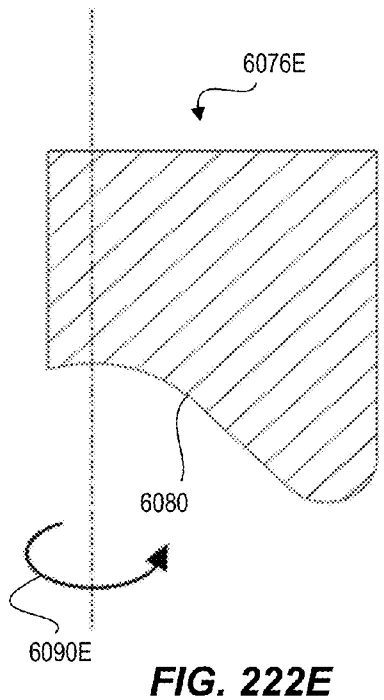
Figure 222F:
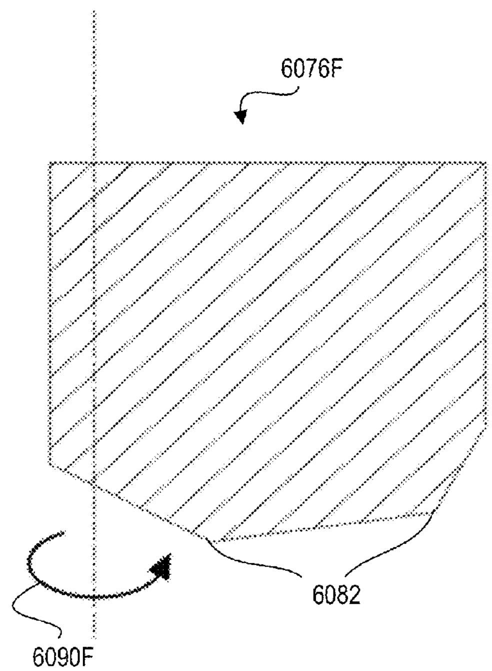
Figure 222G:
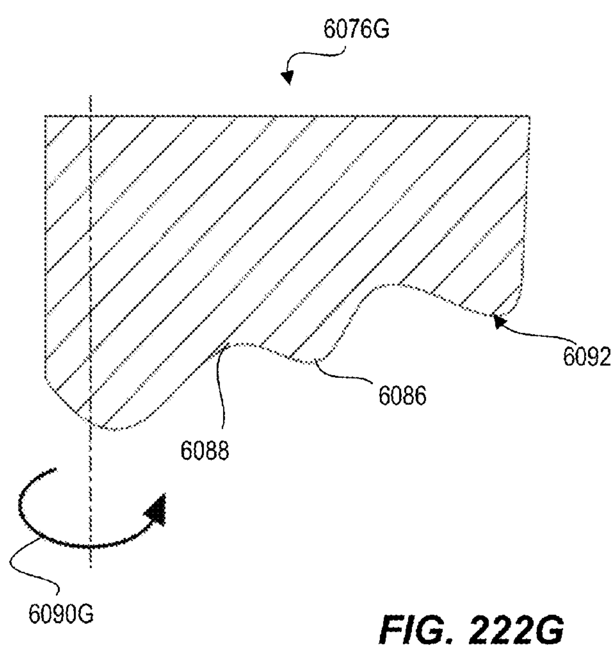

Aspheric optical element geometry may be generated with a single plunge of a cutting tool if a form tool having an appropriate geometry is used. Presently available technologies in tool fabrication allow approximation of true aspheric shapes using a series of line and arc segments. If a geometry of a given form tool does not exactly follow a desired aspheric optical element geometry, it may be possible to measure a cut feature and then shape it on a subsequent fabrication master to account for deviation. While other optical element assembly variables, such as layer thickness of a molded optical element, may be altered to accommodate deviation in the form tool geometry, it may be advantageous to use a non-approximated, exact form tool geometry. Present diamond shaping methods limit a number of line and arc segments; that is, form tools having more than three line or arc segments may be difficult to manufacture due to the likelihood of error with one of the segments. FIGS. 222A-222D show examples of form tools 6076A-6076D, respectively, that include convex cutting edges 6078A-6078D, respectively. FIG. 222 E shows an example of a form tool 6076 E including a concave cutting edge 6080. Current limitations in tool fabrication technology may impose a minimum radius of approximately 350 microns for concave cutting edges, although such limitations may be eliminated with improvements in fabrication technology. FIG. 222F shows a form tool 6076F including angled cutting edges 6082. Tools having a combination of concave and convex cutting edges are also possible, as shown in FIG. 222G. A form tool 6076G includes a cutting edge 6092 including a combination of convex cutting edges 6086 and concave cutting edges 6088. In each of FIGS. 222A-222G, the corresponding axis of rotation 6090A to 6090G of the form tool is indicated by a dash-dot line and a curved arrow.

Each one of form tools 6076A-6076G incorporates only a portion (e.g., half) of the desired optical element geometry, as the tool rotation 6090A to 6090G creates a complete optical element geometry. It may be advantageous for the edge quality of form tools 6076A-6076G to be sufficiently high (e.g., 750× to 1000× edge quality) such that optical surfaces may be cut directly, without requiring post processing and/or polishing. Typically, form tools 6076A-6076G may be rotated on the order of 5,000 to 50,000 revolutions per minute (RPM) and plunged at such a rate that a 1 micron thick chip may be removed with each revolution of the tool; this process may allow for the creation of a complete feature for forming an optical element in a matter of seconds and a fully populated fabrication master in two or three hours. Form tools 6076A-6076G may also present the advantage that they do not have a surface slope limitation; that is, optical element geometries including slopes up to 90° may be achieved. Further, tool life for form tools 6076A-6076G may be greatly extended by the selection of an appropriate fabrication master material for the fabrication master. For example, tools 6076A-6076G may create tens of thousands to hundreds of thousands of features for forming individual optical elements in a fabrication master made of a material such as brass.

Form tools 6076A-6076G may be shaped, for example, with Focused Ion Beam (FIB) machining. Diamond shaping processes may be used to obtain true aspheric shapes having multiple changes in curvature (e.g., convex/concave), such as cutting edge 6092 of form tool 6076G. The expected curvature over edge 6092 may be, for example, less than 250 nanometers (peak to valley).

The surfaces of features for forming optical elements manufactured by direct fabrication may be enhanced with the inclusion of intentional tool marks on the feature surfaces. For example, in the C-axis mode cutting (e.g., Slow Tool Servo), an anti-reflection (AR) grating may be fabricated on the machined surface by utilizing a modified cutting tool. Further details of fabricating intentional machining marks on the machined features for affecting electromagnetic energy are described with reference to FIGS. 223-224.

FIG. 223 shows a close-up view, in partial elevation, of a portion 6094 of a fabrication master 6096. Fabrication master 6096 includes a feature 6098 for forming an optical element with a plurality of intentional machining marks 6100 formed on its surface. The dimensions of intentional machining marks 6100 may be designed such that, in addition to the electromagnetic energy directing function of feature 6098, intentional machining marks 6100 provide functionality (e.g., anti-reflection). General descriptions of anti-reflection layers may be found in, for example, U.S. Pat. No. 5,007,708 to Gaylord et al., U.S. Pat. No. 5,694,247 to Ophey et al. and U.S. Pat. No. 6,366,335 to Hikmet et al., each incorporated herein by reference. Integrated formation of such intentional machining marks during formation of the features for forming optical elements is for example obtained by the use of a specialized tool tip, such as that shown in FIG. 224.

FIG. 224 shows a partial view 6102, in elevation, of a tool tip 6104 that has been modified to form a plurality of notches 6106 on a cutting edge 6108. A diamond cutting tool may be shaped in such a manner using, for instance, FIB methods or other appropriate methods known in the art. As an example, tool tip 6104 is configured such that, during fabrication of feature 6098, cutting edge 6108 forms the overall shape of feature 6098 while notches 6106 intentionally form tooling marks 6100 (see FIG. 223). A spacing (i.e., period 6110) of notches 6106 may be, for example, approximately half (or smaller) of the wavelength of the electromagnetic energy to be affected. A depth 6121 of notches 6106 may be, for instance, approximately one fourth of the same wavelength. While notches 6106 are shown as having rectangular cross-sections, other geometries may be used to provide similar anti-reflection properties. Furthermore, either the entire sweep of cutting edge 6108 may be modified to provide notches 6106 or, alternately, B-axis positioning capability of the machining configuration may be used for tool normal machining, wherein the same portion of tool tip 6104 is always in contact with the surface being cut.

FIGS. 225 and 226 illustrate fabrication of another set of intentional machining marks for affecting electromagnetic energy. In C-axis mode cutting (e.g., using a STS method), AR gratings (as well as Fresnel-like surfaces) may be formed by using a tool commonly called a "half radius tool." FIG. 225 shows a close-up view, in partial elevation, of a portion 6114 of a fabrication master 6116. Fabrication master 6116 includes a feature 6118 for forming an optical element with a plurality of intentional machining marks 6120 included on its surface. Intentional machining marks 6120 may be formed at the same time as optical element 6118 by a specialized tool tip, such as that shown in FIG. 226.

FIG. 226 shows a partial view 6122, in elevation, of a cutting tool 6124. Cutting tool 6124 includes a tool shank 6126 supporting a tool tip 6128. Tool tip 6128 may be, for instance, a half radius diamond insert with a cutting edge 6130 having dimensions that match intentional machining marks 6120 (FIG. 225). Spacing and depth of intentional machine marks 6120 may be, for example, approximately half of a wavelength in period and a quarter of a wavelength in height for a given wavelength of electromagnetic energy to be affected.

FIGS. 227-230 illustrate a cutting tool suitable for the fabrication of other intentional machining marks in both multi-axis milling and C-axis mode milling. FIG. 227 shows a cutting tool 6128 including a tool shank 6130 configured for rotation about an axis of rotation 6132. Tool shank 6130 supports a tool tip 6134 that includes a cutting edge 6136. Cutting edge 6136 is part of a diamond insert 6138 with a protrusion 6140. FIG. 228 shows a cross-sectional view of a portion of the tool tip 6134.

An anti-reflection grating may be created using cutting tool 6128 in multi-axis milling, as shown in FIG. 229. A portion 6142 of a feature 6144 for forming an optical element includes a spiral tool path 6146 which, when combined with the rotation of cutting tool 6128, creates complex spiral marks 6148. Inclusion of one or more notches and/or protrusions 6140 on tool tip 6134 (shown in FIG. 227) may be used to create a pattern of positive and/or negative marks on the surface. A spatial average period of these intentional machining marks may be approximately half of a wavelength of electromagnetic energy to be affected, while depth is approximately a quarter of the same wavelength.

Referring now to FIGS. 227 to 228 in conjunction with FIG. 230, cutting tool 6128 may be used in a C-axis mode milling or machining (e.g., Slow Tool Servo with a rotating cutting tool in place of a SPDT). In this case, modifying cutting edge 6136 with one or more notches or protrusions 6140 may create intentional machining marks that may serve as an anti-reflection grating. A portion of another feature 6150 for forming an optical element is shown in FIG. 230. Feature 6150 includes linear tool paths 6152 and spiral marks 6154. The spatial average period of these intentional machining marks may be approximately half of a wavelength while the depth is approximately a quarter of a wavelength of electromagnetic energy to be affected.

FIGS. 231-233 illustrate an example of a populated fabrication master fabricated, according to an embodiment. As shown in FIG. 231, a fabrication master 6156 forms a surface 6158 with a plurality of features 6160 for forming optical elements fabricated thereon. Fabrication master 6156 may further include identification marks 6162 and alignment marks 6164 and 6166. All of features 6160, identification marks 6162 and alignment marks 6164 and 6166 may be directly machined onto surface 6158 of fabrication mater 6156. For instance, alignment marks 6164 and 6166 may be machined during the same setup as the creation of features 6160 to preserve alignment relative to features 6160. Identification marks 6162 may be added by a variety of methods such as, but not limited to, milling, engraving and FTS, and may include such identifying features as a date code or a serial number. Furthermore, areas of fabrication master 6156 can be left unpopulated (such as a void area 6168 indicated by a dashed oval) for the inclusion of additional alignment features (e.g., kinematic mounts). Also, a scribed alignment light 6170 may also be included; such alignment features may facilitate alignment of the populated fabrication master relative to other apparatus used in, for example, subsequent replication processes. Furthermore, one or more mechanical spacers may also be directly fabricated on the fabrication master at the same time as features 6160.

FIG. 232 shows further details of an inset 6172 (indicated in FIG. 231 by a dashed circle) of fabrication master 6156. As may be seen in FIG. 232, fabrication master 6156 includes a plurality of features 6160 formed thereon in an array configuration.

FIG. 233 shows a cross-sectional view of one feature 6160. As shown in FIG. 233, some additional features may be incorporated into the shape of feature 6160 to aid in the subsequent replication process of creating "daughters" of fabrication master 6156 (a "daughter" of a fabrication master is hereby defined as a corresponding article that is formed by use of a fabrication master). These features may be created concurrently with features 6160 or during a secondary machining process (e.g., flat end mill bit machining). In the example shown in FIG. 233, feature 6160 forms a concave surface 6174 as well as a cylindrical feature 6176 for use in the replication process. While a cylindrical geometry is shown in FIG. 233, additional features (e.g., ribs, steps, etc.) may be included (e.g., for establishing a seal during the replication process).

It may be advantageous for an optical element to include a non-circular aperture or free form/shape geometry. For instance, a square aperture may facilitate mating of an optical element to a detector. One way to accomplish this square aperture is to perform a milling operation on the fabrication master in addition to generating a concave surface 6174. This milling operation may occur on some diameter less than the entire part diameter and may remove a depth of material to leave bosses or islands containing the desired square aperture geometry. FIG. 234 shows a fabrication master 6178 whereupon square bosses 6180 have been formed by milling away material between the square bosses 6180, thereby leaving only square bosses 6180 and an annulus 6182, which is shown to extend about the perimeter of fabrication master 6178. While FIG. 234 shows square bosses 6180, other geometries (e.g., round, rectangular, octagonal and triangular) are also possible. While it may be possible to perform this milling with a diamond milling tool having sub-micron level tolerance and optical quality surface finish; the milling process may intentionally leave rough machining marks if a rough, non-transmissive surface is desired.

A milling operation to create bosses 6180 may be performed prior to creation of features for forming optical elements, although the processing order may not affect the quality of the final fabrication master. After the milling operation is performed, the entire fabrication master may be faced, thereby cutting the boss tops and annulus 6182. After the facing of fabrication master 6178, the desired optical element geometry may be directly fabricated using one of the earlier described processes, allowing for optical precision tolerances between annulus 6182 and the optical element height. Additionally, stand off features may be created between bosses 6180 that would facilitate Z alignment relative to a replication apparatus if desired. FIG. 235 shows a further processed state of fabrication master 6178; a fabrication master 6178' includes a plurality of modified square bosses 6180' with convex surfaces 6184, 6186 formed thereon.

A moldable material, such as a UV curable polymer, may be applied to fabrication master 6178' to form a mating daughter part. FIG. 236 shows a mating daughter part 6188 formed from fabrication master 6178' of FIG. 235. Molded daughter part 6188 includes an annulus 6190 and a plurality of features 6192 for forming optical elements. Each of features 6192 includes a concave feature 6194 that is recessed into a generally square aperture 6196.

Although plurality of features 6192 are shown to be uniform in size and shape, concave features 6194 may be altered by altering the shape of modified square bosses 6178' of fabrication master 6178'. For example, a subset of modified square bosses 6180' may be machined to differing thicknesses or shapes by altering the milling process. In addition, a fill material (e.g., a flowable and curable plastic) may be added after modified square bosses 6180' have been formed to further adjust the height of modified square bosses 6180'. Such fill material may be, for example, spun on to achieve acceptable flatness specifications. Convex surfaces 6184 may additionally or alternately have varied surface profiles. This technique may be beneficial for directly machining convex optical element geometry in a large array since raised bosses 6180' provide enhanced tool clearance.

Machining of a fabrication master may take into account material characteristics of the fabrication master. Relevant material characteristics may include, but are not limited to, material hardness, brittleness, density, cutting ease, chip formation, material modulus and temperature. Characteristics of machining routines may also be considered in light of the material characteristics. Such machining routine characteristics may include, for instance, tool material, size and shape, cutting rates, feed rates, tool trajectories, FTS, STS, fabrication master revolutions per minute ("RPM") and programming (e.g., G-code) functionality. Resulting characteristics of a surface of the finished fabrication master are dependent on the fabrication master material characteristics as well as the characteristics of the machining routine. Surface characteristics may include surface Ra, cusp size and shape, presence of burrs, corner radii and/or a shape and size of a fabricated feature for forming an optical element, for example.

When machining non-planar geometries (as often found in optical elements), the dynamics and interactions of a cutting tool and a machine tool may give rise to problems that may affect the optical quality and/or fabrication speed of populated fabrication masters. One common issue is that impact of the cutting tool with the surface of the fabrication master may cause mechanical vibration, which may result in errors in the surface shape of the resulting features. One solution to this problem is described in association with FIGS. 237-239, which show a series of illustrations of a portion of a fabrication master at various states in a process for forming a feature for forming an optical element using a negative virtual datum process, according to an embodiment.

FIG. 237 shows a cross-sectional illustration of a portion of a fabrication master 6198. Fabrication master 6198 includes a first region 6200 of material that will not be machined and a second region 6202 of material that will be machined away.

An outline of the desired shape of a demarcation line 6204 separates the first and second regions 6200, 6202. Demarcation line 6204 includes a portion 6208 of a desired shape of an optical element. In the example shown in FIG. 237, a virtual datum plane 6206 (represented by a heavy dashed line) is defined as coplanar with part of line 6204. Virtual datum plane 6206 is defined as lying within fabrication master 6198, such that a cutting tool following demarcation line 6204 is always in contact with fabrication master 6198. Since the cutting tool is constantly biased against fabrication master 6198 in this case, impacts and vibration due to the tool intermittently making contact with fabrication master 6198 are substantially eliminated.

FIG. 238 shows the result of a machining process, utilizing virtual datum plane 6206, which has created portion 6208, as desired, but leaves excess material 6210, 6210' relative to a desired final surface 6212 (indicated by a heavy dashed line). Excess material 6210, 6210' may be faced off (e.g., by grinding, diamond turning or lapping) to achieve the desired sag value.

FIG. 239 shows the final state of a modified first region 6200' of fabrication master 6198 including a final feature 6214. The sag of feature 6214 may be additionally adjusted by altering the amount of material removed during the facing operation. Corners 6216 formed at upper edges of feature 6214 may be sharp, since this feature is formed at the intersection of the cutting operation utilized to create portion 6208 (see FIG. 237 and FIG. 238) and the facing operation utilized to create final surface 6212. The sharpness of corner 6216 may exceed that of corresponding corners formed by a single machine tool, alone, that must repeatedly contact fabrication master 6198 and therefore may vibrate or "chatter" each time that the material of fabrication master 6198 contacts the tool.

Turning now to FIGS. 240-242, processing of a fabrication master using a variety of positive virtual datum surfaces is described. In fabricating a feature for forming an optical element on a fabrication master 6218 during normal operation, a cutting tool may follow along or parallel to a top surface 6220 of fabrication master 6218. When a sharp trajectory change (e.g., a large or discontinuous change in slope of a tool trajectory relative to a surface of the fabrication master 6218) is approached, a fabrication machine may automatically reduce the RPM of fabrication master 6218 due to "look ahead" functions in the controller anticipating a sharp trajectory change and slowing rotation to attempt to reduce accelerations that may result from the sharp trajectory change (as indicated by dashed circles 6228, 6230 and 6232, respectively).

Continuing to refer to FIGS. 240-242, a virtual datum technique (e.g., as described with respect to FIGS. 237-FIG. 239) may be applied in the examples shown in FIGS. 240-242 in order to alleviate effects of sharp trajectory changes. In the examples shown in FIGS. 240-242, a virtual datum plane 6234 is defined above top surface 6220 of fabrication master 6218; in such a case, virtual datum 6234 may be referred to as a positive virtual datum. FIG. 240 includes an exemplary tool trajectory 6222, which is less abrupt in a transition to a curved, feature surface 6236 than if the cutting tool was following top surface 6220 instead of virtual datum plane 6234. FIG. 241 shows another exemplary tool trajectory 6224, which transitions more sharply than tool trajectory 6222 from virtual datum plane 6234 toward feature surface 6236. FIG. 242 shows a discretized version 6226 of tool trajectory 6222 shown in FIG. 240.

Use of a positive virtual datum, as shown in FIGS. 240-242 may decrease severity of tool impact dynamics and inhibit a machine tool from slowing RPM of rotating fabrication master 6218. Consequently, fabrication master 6218 may be machined in less time (e.g., 3 hours rather than 14 hours) in comparison to fabrication without the use of the positive virtual datum. Tool trajectories 6222, 6224 and 6226, as defined in the positive virtual datum technique, may interpolate a trajectory of the tool from along virtual datum plane 6234 to feature surface 6236. Tool trajectories 6222, 6224 and 6226, outside of feature surface 6236, may be expressed in any appropriate mathematical form including, but not limited to, tangent arcs, splines and polynomials of any order. Use of a positive virtual datum may eliminate the need for facing of a part that may be required during use of a negative virtual datum, as was illustrated in FIGS. 237-239, while still achieving a desired sag of a feature. Furthermore, use of a positive virtual datum permits programming of virtual tool trajectories that reduce occurrence of sharp tool trajectory changes.

In defining tool trajectory in implementing the virtual datum technique, it may be advantageous for interpolated virtual trajectories to have smooth, small and continuous derivatives to minimize acceleration (second derivative of a trajectory) and impulses (third and higher derivatives of the trajectory). Minimizing such abrupt changes in tool trajectory may result in surfaces with improved finish (e.g., lower Ra's) and better conformity to a desired feature sag. Furthermore, FTS machining may be employed in addition to (or instead of) the use of STS. FTS machining may provide a greater bandwidth (e.g., ten times larger or more) than STS, as it oscillates much less weight along the Z-axis (e.g., less than one pound instead of greater than one hundred pounds), although with a potential drawback of reduced finish quality (e.g., higher Ra's). However, with FTS machining, tool impact dynamics are considerably different because of the faster machining speed, and a tool may respond to sharp changes in trajectory with greater ease.

As shown in FIG. 242, tool trajectory 6226 may de discretized into a series of individual points (represented by dots along trajectory 6226). A point may be represented as an XYZ Cartesian coordinate triplet or a similar cylindrical $(r,\theta,z)$ or spherical $(\rho,\theta,\phi)$ coordinate representation. Depending upon a density of discretization, the tool trajectory 6226 for a complete freeform fabrication master 6218 may have millions of points defined thereon. For example, an eight inch diameter fabrication master discretized into 10×10 micron squares may include approximately 300 million trajectory points. A twelve-inch fabrication master at higher discretization may include approximately one billion trajectory points. The large size of such data sets may cause problems for a machine controller. It may be possible in some cases to address this data set size issue by adding more memory or remote buffering to the machine controller or computer.

An alternative is to reduce the number of trajectory points that are used by decreasing the resolution of the discretization. The reduced resolution in the discretization may be compensated by altering the trajectory interpolation of the machine tool. For example, linear interpolation (e.g., G-code G01) typically requires a large number of points to define a general aspheric surface. By using a higher order parameterization, such as cubic spline interpolation (e.g., G-code G01.1) or circular interpolation (e.g., G-code G02/G03), fewer points may be required to define the same tool trajectory. A second solution is to consider the surface of the fabrication master not as a single freeform surface but as a surface discretized into an array or arrays of similar features for forming optical elements. For example, a fabrication master upon which a plurality of one type of optical element is to be formed may be seen as an array of that one type of element with proper translations and rotations applied. Therefore, only that one type of element is required to be defined. Using this surface discretization, the size of the data set may be reduced; for instance, on a fabrication master with one thousand features each requiring one thousand trajectory points, the data set includes one million points, while utilizing the discretization and linear transformations approach requires the equivalent of only three thousand points (e.g., one thousand for the feature and two thousand for translation and rotation triplets).

A machining operation may leave tool marks on the surface of the machined part. For optical elements, certain types of tooling marks may increase scattering and result in deleterious electromagnetic energy loss, or cause aberrations. FIG. 243 shows a cross-section of a portion of a fabrication master 6238 with a feature 6240 for forming an optical element defined thereon. A surface 6244 of feature 6240 includes scallop-like tool marks. A subsection of surface 6244 (indicated by a dashed circle 6246) is magnified in FIG. 244.

FIG. 244 shows a magnified view of a portion of surface 6244 in the area within dashed circle 6246. Utilizing certain approximations, a shape of surface 6244 may be defined by the following tool and machine equations and parameters:

$$h = \frac{w^2}{8R_t} = \frac{f^2}{8R_t(RPM)^2}; \quad \text{Eq. (11)}$$

$$w = \frac{f}{RPM}; \quad \text{Eq. (12)}$$

$$t = \frac{x_{max}}{f}; \quad \text{Eq. (13)}$$

and $$f = 2RPM\sqrt{2hR_t}, \quad \text{Eq. (14)}$$

where:

- $R_t$=single point diamond turning (SPDT) tool tip radius=0.500 mm;
- h=peak-to-valley cusp/scallop height ("tool imprint")=10 nm;
- $x_{max}$=radius of feature 6240=100 mm;
- RPM=estimated spindle speed=150 rev/min (estimated spindle speed);
- f=cross feed speed across the feature (not directly controlled in STS mode), defined in mm/min;
- w=scallop spacing (i.e., cross feed per spindle revolution), defined in mm; and
- t=minutes (cutting time).

Continuing to refer to FIG. 244, a cusp 6248 may be irregularly formed, and may additionally contain a plurality of burrs 6250 resulting from overlapping tool paths and deformation rather than removal of material from fabrication master 6238. Buns 6250 and irregularly-shaped cusps 6248 may increase the Ra of surface 6244, and negatively affect optical performance of optical elements formed therewith. Surface 6244 of feature 6240 may be made smoother by removal of burrs 6250 and/or rounding of cusps 6248. As an example, a variety of etching processes may be used to remove burrs 6250. Buns 6250 are high surface area ratio (i.e., surface area divided by enclosed volume) features compared to the other portions of surface 6244 and will therefore etch faster. For a fabrication master 6238 formed of aluminum or brass, an etchant such as ferric chloride, ferric chloride with hydrochloric acid, ferric chloride with phosphoric and nitric acids, ammonium persulfate, nitric acid or a commercial product, such as Aluminum Etchant Type A from Transene Co. may be used. As another example, if fabrication master 6238 is formed of or coated with nickel, an etchant formed from, for instance, a mixture such as 5 parts $HNO_3$+5 parts $CH_3COOH$+2 parts $H_2SO_4$+28 parts $H_2O$ may be used. Additionally, an etchant may be used in combination with agitation to ensure isotropic etching action (i.e., etch rate is equal in all directions). Subsequent cleaning or desmutting operations may be required for some metals and etches. A typical desmutting or brightening etch may be, for example, a diluted mixture of nitric acid, hydrochloric acid and hydrofluoric acid in water. For plastic and glass fabrication masters, burrs and cusps may be processed by mechanical scraping, flame polishing and/or thermal reflow. FIG. 245 shows a cross-section of FIG. 244 after etching; it may be seen that burrs 6250 have been removed. Although wet etching processes may be more commonly used for etching metals, dry etching processes such as plasma etching processes may also be used.

Performance of fabricated features for forming optical elements may be evaluated by measurement of certain characteristics of the features. Fabrication routines for such features may be tailored, utilizing the measurements, to improve quality and/or accuracy of the features. Measurements of the features may be performed by using, for instance, white light interferometry. FIG. 246 is a schematic diagram of a populated fabrication master 6252, shown here to illustrate how features may be measured and corrections to a fabrication routine may be determined. Selected features 6254, 6256, 6258, 6260, 6262, 6264, 6266, 6268 (collectively referred to as features 6254-6268) of an actually fabricated master were measured to characterize their optical quality and, consequently, performance of the machining methods employed. FIGS. 247-254 show contour plots 6270, 6272, 6274, 6276, 6278, 6280, 6282 and 6284 of measured surface errors (i.e., deviation from an intended surface height) of respective features 6254-6268. Heavy black arrows 6286, 6288, 6290, 6292, 6294, 6296, 6298 and 6300 on the respective contour plots indicate vectors pointing from a center of fabrication master rotation to feature positions on fabrication master 6252; that is, a tool used to fabricate features 6254-6258 moved across each feature in a direction orthogonal to this vector. As may be seen in FIGS. 247-254, the areas of greatest surface error are at tool entry and exit, corresponding to a diameter orthogonal to the vectors indicated by the heavy black arrows. Each contour line represents a contour level shift of approximately 40 nm; measured features 6254-6268, as shown in FIGS. 247-254, have sag deviations with ranges of approximately 200 nm from the expected values. Associated with each contour plot is a root-mean square ("RMS") value (indicated above each contour plot) of the measured surface with respect to the ideal surface. The RMS values vary from approximately 200 nm to 300 nm in the examples shown in FIGS. 247-254.

FIGS. 247-254 indicate at least two systematic effects related to the machining processes. First, the deviations of the fabricated features are generally symmetric about the direction of cut (i.e., the deviations may be said to "clock with" direction of the cut). Second, while lower than achievable with other currently available fabrication methods, the RMS values indicated in these figures are still larger than those that may be desired in a fabrication master. Furthermore, these figures show that both the RMS values and symmetries appear to be sensitive to a radial and azimuthal location of the corresponding feature with respect to the fabrication master. The symmetries and the RMS values of the surface error are examples of characteristics of the fabricated features that may be measured, and the resulting measurements utilized to calibrate or correct the fabrication routine producing the features.

These effects may impair performance of the fabricated features to require rework (e.g., facing) or scrap of a populated fabrication master. While reworking of fabrication masters may not be possible since realignment is extremely difficult, scrapping of a fabrication master may be wasteful in terms of time and cost.

To alleviate the systematic effects illustrated in FIGS. 247-254, it may be advantageous to measure the features during fabrication and implement calibrations or corrections for such effects. For example, in order to measure the features during fabrication (in situ), additional capabilities may be added to a machine tool. Referring now to FIG. 255 in conjunction with FIG. 216, a modification of machining configuration 6024 is shown. A multi-axis machine tool 6302 includes an in situ measurement subsystem 6304 that may be used for metrology and calibration. Measurement subsystem 6304 may be mounted to move in a coordinated way with, for example, tool 6030 mounted on tool post 6032. Machine tool 6302 may be used to perform a calibration of the location of the subsystem 6304 relative to tool post 6032.

As an example of a calibration process, execution of a fabrication routine may be suspended in order to measure cut features for verification of geometry. Alternatively, such measurements may be performed while the fabrication routine continues. Measurements may then be used to implement a feedback process, to correct the fabrication routine as needed for the remaining features. Such a feedback process may, for example, compensate for cutting tool wear and other process variables that may affect yield. Measurements may be performed by, for example, a contact stylus (e.g., a Linear Variable Differential Transformer (LVDT) probe) that is actuated relative to the surface to be measured and performs single or multiple sweeps across the fabrication master. As an alternative, measurements may be performed across the aperture of a feature with an interferometer. Measurements may be performed concurrently with the cutting process, for instance, by utilizing an LVDT probe that contacts features already created, at the same time that the cutting tool is creating new features.

FIG. 256 shows an exemplary integration of an in situ measurement system into multi-axis machine tool 6302 of FIG. 255. In FIG. 256, tool post 6032 is not shown for clarity. While tool 6030 forms a feature (e.g., for forming an optical element therewith) on a fabrication master 6306, measurement subsystem 6304 (enclosed in dashed box) measures other features (or portions thereof) previously formed by tool 6030 on fabrication master 6306. As shown in FIG. 256, measurement subsystem 6304 includes an electromagnetic energy source 6308, a beam splitter 6310 and a detector arrangement 6311. A mirror 6312 may optionally be added, for example, to redirect electromagnetic energy scattered from fabrication master 6306.

Continuing to refer to FIG. 256, electromagnetic energy source 6308 produces a collimated beam 6314 of electromagnetic energy that propagates through beam splitter 6310, and is thereby partially reflected as a reflected portion 6316 and a transmitted portion 6318. In a first method, reflected portion 6316 serves as a reference beam while transmitted portion 6318 interrogates fabrication master 6306 (or a feature thereon). Transmitted portion 6318 is altered by interrogation of fabrication master 6306, which scatters part of transmitted portion 6318 back through beam splitter 6310 and toward mirror 6312. Mirror 6312 redirects this part of transmitted portion 6318 as a data beam 6320. Reflected portion 6316 and data beam 6320 then interfere to produce an interferogram that is recorded by detector arrangement 6311.

Still referring to FIG. 256, in a second method, beam splitter 6310 is rotated by 90° clockwise or counter-clockwise such that no reference beam is created, and measurement subsystem 6304 captures information only from transmitted portion 6318. In this second method, mirror 6312 is not required. The information captured using the second method may include only amplitude information, or may include interferometric information if fabrication master 6306 is transparent.

Since the C-axis (and other axes) is encoded into the fabrication routine, a position of a feature relative to a center axis of measurement subsystem 6304 is known, or may be determined. Measurement subsystem 6304 may be triggered to measure fabrication master 6306 at a specific location or may be set to continuously sample fabrication master 6306. For instance, to allow continuous processing of fabrication master 6306, measurement subsystem 6304 may use a suitably fast pulsed (e.g., chopped or stroboscopic) laser or a flashlamp having a few microseconds duration, to effectively freeze motion of fabrication master 6306 relative to measurement subsystem 6304.

Analysis of information recorded by measurement system 6304 about characteristics of fabrication master 6306 may be performed by, for instance, pattern matching to a known result or by correlations between multiple features of the same type on fabrication master 6306. Suitable parameterization of the information and the associated correlations or pattern matching merit functions may permit control and adjustment of the machining operation using a feedback system. A first example involves measuring characteristics of a spherical concave feature in a metal fabrication master. Disregarding diffraction, an image of electromagnetic energy reflected from such a feature should be of uniform intensity and circularly bounded. If the feature is elliptically distorted, then an image at detector arrangement 6311 will show astigmatism and be elliptically bounded. Therefore, intensity and astigmatism, or lack thereof, may indicate certain characteristics of fabrication master 6306. A second example regards surface finish and surface defects. When surface finish is poor, intensity of the images may be reduced due to scattering from surface defects and an image recorded at detector arrangement 6311 may be non-uniform. Parameters that may be determined from the information recorded by measurement system 6304 and used for control include, for instance, intensities, aspect ratios, and uniformity of captured data. Any of these parameters may then be compared between two different features, between two different measurements on the same feature or between a fabricated feature and a predetermined reference parameter (such as one based upon a prior computational simulation of the feature) to determine characteristics of fabrication master 6306.

In an embodiment, combination of information from two different sensors or from an optical system at two different wavelengths assists in converting many relative measurements into absolute quantities. For example, the use of an LVDT in association with an optical measurement system can help provide a physical distance (e.g., from a fabrication master to the optical measurement system) that may be used to determine proper scaling for captured images.

In employing the fabrication master to replicate features therefrom, it may be important that the populated fabrication master is aligned precisely with respect to a replication apparatus. For example, alignment of a fabrication master in manufacturing layered optical elements, may determine alignment of different features with respect to one another and the detector. The fabrication of alignment features on the fabrication master itself may facilitate precise alignment of the fabrication master with respect to the replication apparatus. For instance, the high precision fabrication methods described above, such as diamond turning, may be used to create these alignment features simultaneously with, or during the same fabrication routine as, the features on the fabrication master. Within the context of the present application, an alignment feature is understood as a feature on the surface of the fabrication master configured to cooperate with a corresponding alignment feature on a separate object to define or indicate a separation distance, a translation and/or a rotation between the surface of the fabrication master and the separate object.

Alignment features may include, for example, features or structures that mechanically define relative position and/or orientation between the surface of the fabrication master and the separate object. Kinematic alignment features are examples of alignment features that may be fabricated using the above described methods. True kinematic alignment may be satisfied between two objects when the number of axes of motion and the number physical constraints applied between the objects total six (i.e., three translations and three rotations). Pseudo-kinematic alignment results when there are less than six axes and so alignment is constrained. Kinematic alignment features have been shown to have alignment repeatability at optical tolerances (e.g., on the order of tens of nanometers). Alignment features may be fabricated on the populated fabrication master itself but outside of the area populated by features for forming optical elements. Additionally or optionally, alignment features may include features or structures that indicate relative placement and orientation between the surface of the fabrication master and the separate object. For instance, such alignment features may be used with vision systems (e.g., microscopes) and motion systems (e.g., robotics) to relatively position the surface of the fabrication master and the separate object to enable automated assembly of arrayed imaging systems.

FIG. 257 shows a vacuum chuck 6322 with a fabrication master 6324 supported thereon. Fabrication master 6324 may be formed of, for instance, glass or other material that is translucent at some wavelength of interest. Vacuum chuck 6322 includes cylindrical elements 6326, 6326' and 6326" acting as a part of a combination of pseudo-kinematic alignment features. Vacuum chuck 6322 is configured to mate with a fabrication master 6328 (see FIG. 258). Fabrication master 6328 includes convex elements 6330, 6330' and 6330" that form a complementary part of the pseudo-kinematic alignment features to mate with cylindrical elements 6326, 6326' and 6326" on vacuum chuck 6322. Cylindrical elements 6326, 6326' and 6326" and convex elements 6330, 6330' and 6330" provide pseudo-kinematic alignment rather than true kinematic alignment since, as shown, rotational motion between the vacuum chuck 6322 and fabrication master 6328 is not fully constrained. A true kinematic arrangement would have cylindrical elements 6326, 6326' and 6326" aligned radially with respect to the cylindrical axis of vacuum chuck 6322 (i.e., all cylindrical elements would be rotated by 90°). Convex elements 6330, 6330' and 6330" may each be, for instance, semi-spheres that are machined onto fabrication master 6328, or precision tooling balls that are placed into precisely bored holes. Other examples of combinations of kinematic alignment features include, but are not limited to, spheres nesting in cones and spheres nesting in spheres. Alternatively, cylindrical elements 6326, 6326' and 6326" and/or convex elements 6330, 6330' and 6330" are local approximations of continuous rings formed about a perimeter of vacuum chuck 6322 and/or fabrication master 6328. These kinematic alignment features may be formed using, for example, an ultra-precision diamond turning machine.

Different combinations of alignment features are shown in FIGS. 259-261. FIG. 259 is a cross-sectional view of chuck 6322, showing a cross-section of cylindrical elements 6326. FIGS. 260 and 261 show alternative configurations of kinematic alignment features that may be suitable for use in place of the combination of cylindrical elements 6326 and convex elements 6330. In FIG. 260, a vacuum chuck 6332 includes a v-notch 6334 configured to mate with convex element 6330. In FIG. 261, convex elements 6330 mate with a vacuum chuck 6336 at a planar surface 6338. The configurations of kinematic alignment features shown in FIGS. 260 and 261 both allow control of Z-direction height (i.e., normal to the plane of fabrication master 6328) between vacuum chucks 6332 and 6336 and fabrication master 6328. Convex elements 6330 may be, for example, formed in the same setup as the array of features for forming optical elements formed on fabrication master 6328, consequently, Z-direction alignment between vacuum chucks 6332 and 6336 and fabrication master 6328 may be controlled with sub-micron tolerances.

Returning to FIGS. 257 and 258, the formation of additional alignment features is contemplated. For example, while the combination of pseudo-kinematic alignment features shown in FIGS. 257 and 258 may assist in alignment of fabrication master 6328 with respect to vacuum chuck 6322, and consequently fabrication master 6324, with respect to Z-direction translation, vacuum chuck 6322 and fabrication master 6328 may remain rotatable with respect to each other.

As one solution, rotational alignment may be achieved by the use of additional fiducials on fabrication master 6328 and/or vacuum chuck 6322. Within the context of the present application, fiducials are understood to be features formed on a fabrication master to indicate alignment of the fabrication master with respect to a separate object. These fiducials may include, but are not limited to, scribed radial lines (e.g., lines 6340 and 6340', see FIG. 258), concentric rings (e.g., ring 6342, FIG. 258) and verniers 6344, 6346, 6348 and 6350 (see FIG. 257 and FIG. 258). Radial line features 6340 may be created, for instance, with a diamond cutting tool by dragging the tool across fabrication master 6328 in a radial line at a depth of ~0.5 μm while the spindle is held fixed (no rotation). Verniers 6344 and 6348, which are respectively located on an outer periphery of vacuum chuck 6322 and fabrication master 6328, may be created with a diamond cutting tool by repeatedly dragging the tool across vacuum chuck 6322 or fabrication master 6328 in an axial line at a depth of ~0.5 μm while the spindle is held fixed; then disengaging the tool and rotating the spindle. Verniers 6346 and 6350, which are respectively located on mating surfaces of vacuum chuck 6322 and fabrication master 6328, may be created with a diamond cutting tool by repeatedly dragging the tool across fabrication master 6328 in a radial line at a depth of ~0.5 μm while the spindle is held fixed; then disengaging the tool and rotating the spindle. Concentric rings may be created by plunging a cutting tool into the fabrication master by a very small amount (~0.5 μm) while rotating the spindle supporting fabrication master 6328. The tool is then backed out from fabrication master 6328, leaving a fine, circular line. Intersections of these radial and circular lines may be recognized using a microscope or interferometer. Alignment using fiducials may be facilitated by, for instance, using either a transparent chuck or a transparent fabrication master.

The alignment feature configurations illustrated in FIGS. 257-261 are particularly advantageous since position and function of the alignment elements are independent of fabrication master 6324 and, as a result, certain physical dimensions and characteristics (e.g., thickness, diameter, flatness and stress) of fabrication master 6324 become inconsequential to alignment. A gap between the surface of fabrication master 6324 and fabrication master 6328 larger than the tolerance on fabrication master 6324's thickness may be intentionally formed by adding additional height to alignment elements such as ring 6342. A replication polymer may then simply fill in this thickness if the fabrication master deviates from the nominal thickness.

FIG. 262 shows a cross-sectional view of an exemplary embodiment of a replication system 6352, shown here to illustrate the alignment of various components during replication of optical elements onto a common base. A fabrication master 6354, a common base 6356, and a vacuum chuck 6358 are aligned with respect to each other by the combination of alignment elements 6360, 6362 and 6364. Vacuum chuck 6358 and fabrication master 6354 may be pressed together using, for instance, a force sensing servo press 6366. By finely controlling a clamping force, repeatability of system 6352 is on the order of a micron in X-, Y- and Z-directions. Once properly aligned and pressed, a replication material, such as a UV-curable polymer, may be injected into volumes 6368 defined between fabrication master 6354 and common base 6356; alternatively, the replication material may be injected between fabrication master 6354 and common base 6356 prior to alignment and pressing together. Subsequently, a UV-curing system 6370 may expose the polymer to UV electromagnetic energy and solidify the polymer into daughter optical elements. Following solidification of the polymer, fabrication master 6354 may be moved away from vacuum chuck 6358 by releasing the force applied by press 6366.

Multiple differing machine tool configurations may be used to manufacture fabrication masters for the formation of optical elements. Each machine tool configuration may have certain advantages that facilitate the formation of certain types of features on fabrication masters. Additionally, certain machine tool configurations permit the utilization of specific types of tools that may be employed in the formation of certain types of features. Furthermore, the use of multiple tools and/or certain machine tool configurations facilitate the ability to do all machining operations required for the formation of a fabrication master at very high accuracy and precision without requiring the removal of a given fabrication master from the machine tool.

Advantageously to maintain optical precision, forming a fabrication master including features for forming an array of optical elements using a multi-axis machine tool may include the following sequence of steps: 1) mounting the fabrication master to a holder (such as a chuck or an appropriate equivalent thereof); 2) performing preparatory machining operations on the fabrication master; 3) directly fabricating on a surface of the fabrication master features for forming the array of optical elements; and 4) directly fabricating on the surface of the fabrication master at least one alignment feature; wherein the fabrication master remains mounted to the fabrication master holder during the performing and directly fabricating steps. Additionally or optionally, preparatory machining operations of a holder for supporting the fabrication master may be performed prior to mounting the fabrication master thereon. Examples of preparatory machining operations are to turn the outside diameter or to "face" (machine flat) the fabrication master to minimize any deflection/deformation induced by the chucking forces (and the resulting "springing" when the part comes off).

Figure 263:
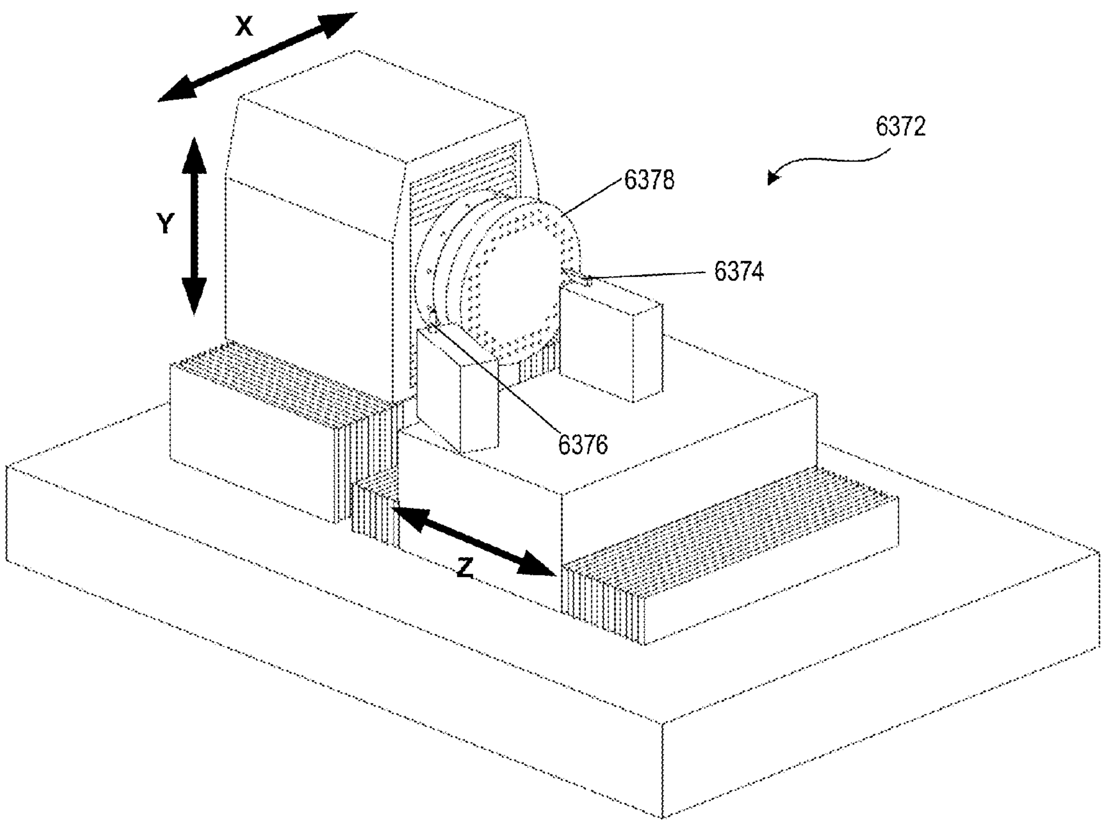

FIGS. 263-266 show exemplary multi-axis machining configurations, which may be used in the fabrication of features for forming optical elements. FIG. 263 shows a configuration 6372 including multiple tools. First and second tools 6374 and 6376 are shown although additional tools may be included depending upon the sizes of each tool and the configuration of the Z-axis stage. First tool 6374 has degrees of motion in axes XYZ, as shown by arrows labeled X, Y and Z. As shown in FIG. 263, first tool 6374 is positioned for forming features on a surface of fabrication master 6378 utilizing, for example, a STS method. Second tool 6376 is positioned for turning the outside diameter (OD) of fabrication master 6378. First and second tools 6374 and 6376 may both be SPDT tools or either tool may be of a differing type such as high-speed steel for forming larger, less precise features such as island boss elements, discussed herein above in association with FIGS. 234 and 235.

Figure 264:
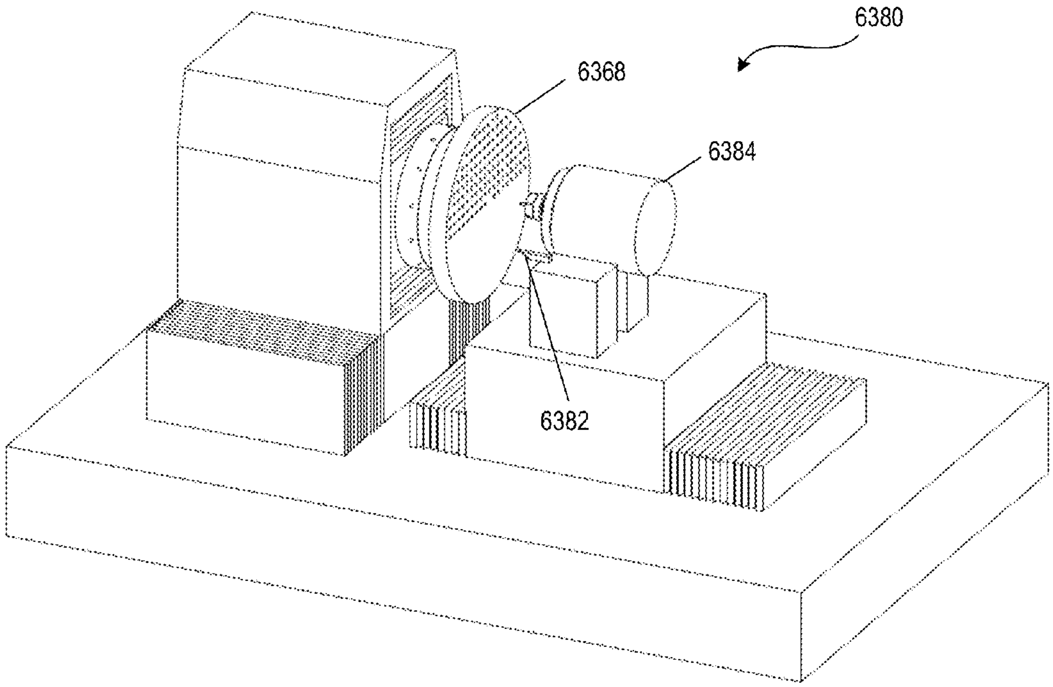

FIG. 264 shows a machine tool 6380 including a tool 6382 (e.g., a SPDT tool) and a second spindle 6384. Machine tool 6380 is the same as machine tool 6372 (FIG. 263) except for the exchange of one of the tools for second spindle 6384. Machine tool 6380 is advantageous for machining operations that include both milling and turning. For example, tool 6382 may surface fabrication master 6368 or cut intentional machining marks or alignment verniers; whereas, second spindle 6384 may utilize a form tool or ball endmill for producing steep or deep features on a surface of fabrication master 6368 for forming optical elements. Fabrication master 6368 may be mounted onto the first spindle or second spindle 6384 or onto a mounting item such as an angle plate. Second spindle 6384 may be a high-speed spindle rotating at 50,000 or 100,000 RPM. A 100,000 RPM spindle provides less accurate spindle motion but faster material removal. Second spindle 6384 complements tool 6382 since spindle 6384 is able to, for example, machine freeform steep slopes and utilize form tools whereas tool 6382 may be used, for example, to form alignment marks and fiducials.

Figure 265:
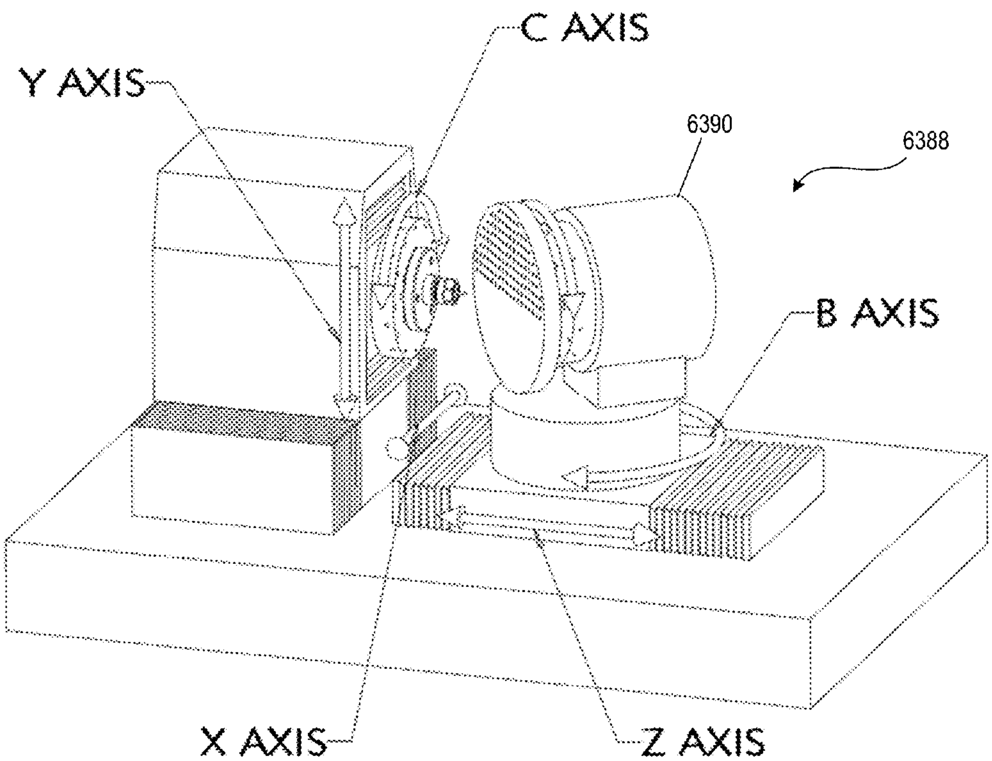

FIG. 265 shows a machine tool 6388 including second spindle 6390 and B-axis rotational motion. Machine tool 6388 may be advantageously used, for example, to rotate the non-moving center of a cutting tool outside of the surface of a fabrication master being machined and for discontinuous faceting of convex surfaces with a fly cutter or flat endmill. As shown, second spindle 6390 is a low speed 5,000 or 10,000 RPM spindle that is suitable for mounting of a fabrication master. Alternatively, a high-speed spindle such as shown attached to machine tool 6380 of FIG. 264 may be used.

Figure 266:
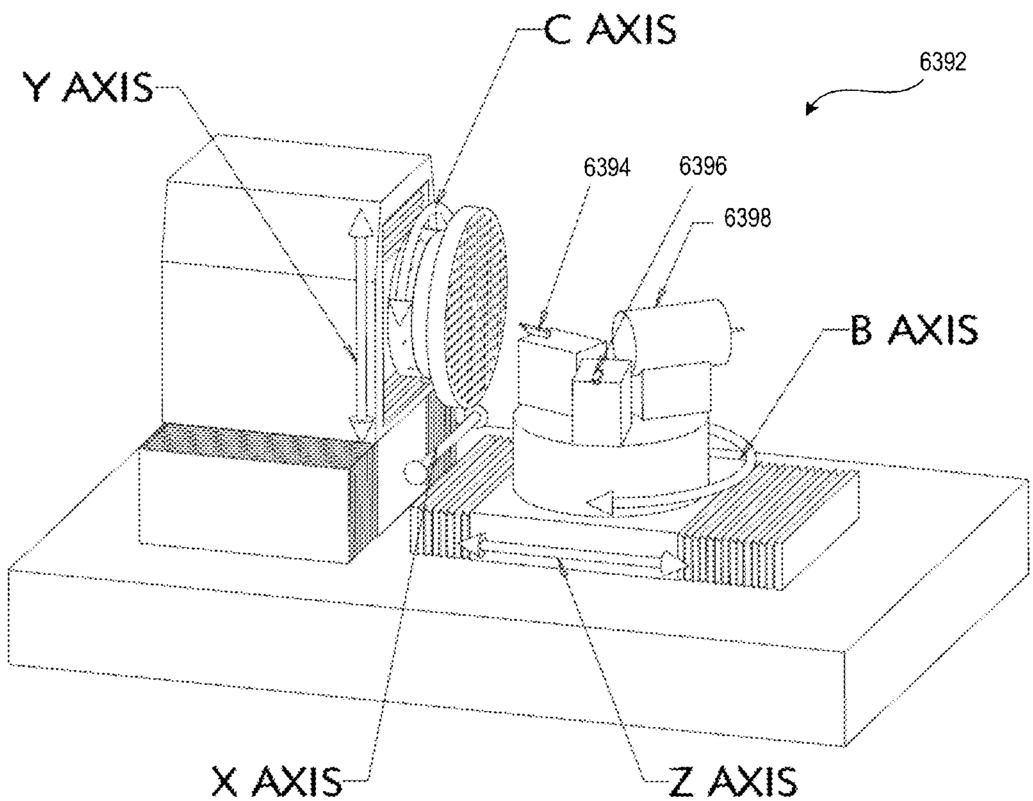

FIG. 266 shows a machine tool 6392 including B-axis motion, multiple tool posts 6394 and 6396, and a second spindle 6398. Tool posts 6394 and 6396 may be used to fixture SPDTs, high-speed steel cutting tools, metrology systems and/or any combination thereof. Machine tool 6392 may be used for more complex machining operations that require, for example, turning, milling, metrology, SPDT, rough turning or milling. In one embodiment, machine tool 6392 includes a SPDT tool (not shown) affixed to tool post 6394, an interferometer metrology system (not shown) affixed to tool post 6396 and a form tool (not shown) chucked to spindle 6398. Rotation of the B-axis may provide additional space to accommodate additional tool posts or a greater range of tools and tool positions than may be provided by not using the B-axis.

Although uncommon today, machine tools incorporating cantilevered spindles that hang vertically over a workpiece may be utilized. In a cantilevered configuration, a spindle is suspended from XY axes via an arm and a workpiece is mounted upon a Z-axis stage. A machine tool of this configuration may be advantageous for milling very large fabrication masters. Furthermore, when machining large workpieces, it may be important to measure and characterize straightness and deviations (straightness error) of axis slides. Slide deviations may typically be less than a micron but are also affected by temperature, workpiece weight, tool pressure and other stimuli. This may not be a concern for short travels; however, if machining large parts, a lookup table with a correction value may be incorporated into the software or a controller for any axis either a linear axis or a rotational axis. Hysteresis may also cause deviations in machine movements. Hysteresis may be avoided by operating an axis uni-directionally during a complete machining operation.

Multiple tools may be positionally related by performing a series of machining operations and measurements of the features formed. For example, for each tool: 1) an initial set of machine coordinates is set; 2) a first feature, such as a hemisphere, is formed on a surface using the tool; and 3) a measurement arrangement, such as an on-tool or off-tool interferometer, may be used to determine a shape of the formed test surface and any deviations therefrom. For example, if a hemisphere was cut then any deviations from a prescription (e.g., a deviation in radius and/or depth) of the hemisphere may be related to an offset between the initial set of machine coordinates and "true" machine coordinates of the tool. Using analysis of the deviation, a corrected set of machine coordinates for the tool may be determined and then set. This procedure may be performed for any number of tools. Utilizing the G-code command G92 ("coordinate system set"), coordinate system offsets may be stored and programmed for each tool. On-tool measurement subsystems, such as subsystem 6304 of FIG. 255, may also be positionally related to any tool by utilizing the on-tool measurement subsystem instead of an off-tool interferometer to determine the shape of the formed test surface. For machine configurations with more than one spindle, such as a C-axis spindle and a second spindle mounted upon a B or Z axis, the spindles or workpieces mounted thereon may be positionally (e.g., coaxially) related by measuring a total indicated runout ("TIR") while rotating either spindle upon its axis and subsequently moving the C-axis in XY. The methods described above may result in determining positional relationships between machine tool subsystems, axes and tool to better than 1 micron in any direction.

FIG. 267 shows an exemplary fly-cutting configuration 6400 suitable for forming one machined surface, including intentional machining marks. Fly-cutting configuration 6400 may be realized by selecting a two spindle machine configuration such as configuration 6388 of FIG. 265. Fly cutting tool 6402 is attached to a C-axis spindle and is engaged and rotated against a fabrication master 6404. The rotation of fly-cutting tool 6402 against fabrication master 6404 results in a series of grooves 6406 on a surface of fabrication master 6404. Fabrication master 6404 may be rotated on a second spindle 6408 by a first 120° and then a second 120° and the grooving operation may be performed each time. A resulting groove pattern is shown in FIG. 268. In addition to forming grooved patterns, a fly-cutting configuration may be advantageously used for making fabrication master surfaces flat and normal to spindle axes.

FIG. 268 shows an exemplary machined surface 6410 in partial elevation, formed by using the fly-cutting configuration of FIG. 267. By clocking the second spindle 120° each time, a triangular or hexagonal series of intentional machining marks 6412 may be formed upon a surface. In one example, intentional marks 6412 may be used to form an AR relief pattern in an optical element formed from a fabrication master. For example, a SPDT with a 120 nm radius cutting tip may be used for cutting grooves that are approximately 400 nm apart and 100 nm deep. The formed grooves form an AR relief structure that when formed into a suitable material, such as a polymer, will provide an AR effect for wavelengths from approximately 400 to 700 nm.

Another fabrication process that may be useful in the fabrication of optical elements on a fabrication master is Magnetorheological Finishing (MRF®) from QED Technologies, Inc. Moreover, the fabrication master may be marked with additional features other than the optical elements such as, for example, marks for orientation, alignment and identification, using one of the STS/FTS, multi-axis milling and multi-axis grinding approaches or another approach altogether.

The teachings of the present disclosure allow direct fabrication of a plurality of optical elements on, for example, an eight-inch fabrication master or larger. That is, optical elements on a fabrication master may be formed by direct fabrication rather than requiring, for instance, replication of small sections of the fabrication master to form a fully populated fabrication master. The direct fabrication may be performed by, for example, machining, milling, grinding, diamond turning, lapping, polishing, flycutting and/or the use of a specialized tool. Thus, a plurality of optical elements may be formed on a fabrication master to sub-micron precision in at least one dimension (such as at least one of X-, Y- and Z-directions) and with sub-micron accuracy in their relative positions with respect to each other. The machining configurations of the present disclosure are flexible such that a fabrication master with a variety of rotationally symmetric, rotationally non-symmetric, and aspheric surfaces may be fabricated with high positional accuracy. That is, unlike prior art methods of manufacturing a fabrication master, which involve forming one or a group of a few optical elements and replicating them across a wafer, the machining configurations disclosed herein allow the fabrication of a plurality of the optical elements as well as a variety of other features (e.g., alignment marks, mechanical spacers and identification features) across the entire fabrication master in one fabrication step. Additionally, certain machining configurations in accordance with the present disclosure provide surface features that affect electromagnetic energy propagation therethrough, thereby providing an additional degree of freedom to the designer of the optical elements to incorporate intentional machining marks into the design of the optical elements. In particular, the machining configurations disclosed herein include C-axis positioning mode machining, multi-axis milling, and multi-axis grinding, as described in detail above.

FIGS. 269-272 show three distinct methods of fabrication of illustrative layered optical elements. It should be noted that, while the layered optical elements used for illustration include three or fewer layers, there is no upper limit to a number of layers that may be generated using these methods.

FIG. 269 describes a process flow 8000 in which a common base is patterned with alternating layers of high and low index material to form layered optical elements on a common base. As stated above, a layered optical element includes at least one optical element optically connected to a section of a common base. FIG. 269 shows the formation of two layers 8014A and 8014B of a layered optical element for illustrative clarity; however, process flow 8000 can be (and likely would be) used for forming an array of layered optical elements on a common base 8006. Common base 8006 may be, for example, an array of CMOS detectors formed upon a silicon wafer; in this case, combination of the array of layered optical elements and the array of detectors would form arrayed imaging systems. Process flow 8000 begins with common base 8006 and a fabrication master 8008A that could be treated with adhesion or surface release agents respectively. In process flow 8000, a bead of moldable material 8004A is deposited onto fabrication master 8008A or common base 8006. Moldable material 8004A, which may be any one of the moldable materials disclosed herein, is selected for conformally filling fabrication master 8008A, but should be able to be cured or hardened after processing. For example, moldable material 8004A may be a commercially available optical polymer that is curable by exposure to ultraviolet electromagnetic energy or high temperature. Moldable material 8004A may also be degassed by vacuum action before it is applied to the common base, in order to mitigate a potential for optical defects that may be caused by entrained bubbles.

FIG. 269 illustrates a process flow 8000 for fabricating layered optical elements in accordance with one embodiment. In step 8002, moldable material 8004A (e.g., a UV-curable polymer) is deposited between common base 8006, which may be a silicon wafer including an array of CMOS detectors, and wafer-scale fabrication master 8008A. Fabrication master 8008A is machined under precise tolerances to present features for defining an array of layered optical elements that may be molded by use of moldable material 8004A. Engaging fabrication master 8008A with common base 8006 forms moldable material 8004A into a predetermined shape by design of interior spaces or features for defining an array of optical elements of fabrication master 8008A. Moldable material 8004A may be selected to provide a desired refractive index and other material properties, such as viscosity, adhesiveness and Young's Modulus, related to design considerations in an uncured or cured state of material 8004A. A micropipette array or controlled volume jetting dispenser (not shown) may be used to deliver precise quantities of moldable material 8004A where required. Although described herein in association with moldable materials and related curing steps, processes of forming optical elements may be performed by utilizing techniques such as hot embossing of moldable materials.

Step 8010 entails curing moldable material 8004A with fabrication master 8008A engaging common base 8006 under precise alignment using such techniques as have generally been described herein. Moldable material 8004A may be optically or thermally curable to harden moldable material 8004A as shaped by fabrication master 8008A. Depending upon a reactivity of moldable material 8004A, an activator such as ultraviolet lamp 8012 may, for example, be used as a source for ultraviolet electromagnetic energy, which may be transmitted through a translucent or transparent fabrication master 8008A. Translucent and/or transparent fabrication masters will be discussed herein below. It will be appreciated that a chemical reaction initiated by curing moldable material 8004A may cause moldable material 8004A to shrink isotropically or anisotropically in volume and/or linear dimension. For example, many common UV-curable polymers exhibit 3% to 4% linear shrinkage upon curing. Accordingly, fabrication master 8008A may be designed and machined to provide additional volume that accommodates this shrinkage. A resultant cured moldable material retains a shape of predetermined design according to fabrication master 8008A. As shown in step 8016, cured moldable material remains on common base 8006 after fabrication master 8008A is disengaged to form a first optical element 8014A of a layered optical element 8014.

In step 8018, fabrication master 8008A is replaced with a second fabrication master 8008B. Fabrication master 8008B may differ from fabrication master 8008A in predetermined shape of features for defining an array of layered optical elements. A second moldable material 8004B is deposited upon first optical element 8014A of the layered optical element or upon fabrication master 8008B. Second moldable material 8004B may be selected to yield different material properties, such as refractive index, than are provided by moldable material 8004A. Repeating steps 8002, 8010, 8016 for this layer "B" yields a cured moldable material layer forming a second optical element 8014B of the layered optical element 8014. This process may be repeated for as many layers of optical elements as are necessary to define all optics (optical elements, spacers, apertures, etc.) in a layered optical element of predetermined design.

Moldable materials are selected with regard to both optical characteristics of the materials after hardening and mechanical properties of the materials, both during and after hardening. In general, a material, when used for an optical element, should have high transmittance, low absorbance and low dispersion through a wavelength band of interest. If used for forming apertures or other optics, such as spacers, a material may have high absorbance or other optical properties not normally suitable for use with transmissive optical elements. Mechanically, a material should also be selected such that expansion of the material through an operating temperature and humidity range of an imaging system does not reduce imaging performance beyond acceptable metrics. A material should be selected for acceptable shrinkage and out-gassing during a curing process. Furthermore, a material should be able to withstand processes such as solder reflow and bump-bonding that may be used during packaging of an imaging system.

Once all individual layers of the layered optical elements have been patterned, if necessary, a layer may be applied to a top layer (e.g., the layer represented by optical element 8014B) that has protective properties and may be a desired surface on which to pattern an electromagnetic energy blocking aperture. This layer may be a rigid material, such as a glass, metal or ceramic material, or could be an encapsulating material to facilitate better structural integrity of the layered optical elements. Where a spacer is used, an array of spacers may be bonded with the common base or with a yard region of any layers of the layered optical element, with care given to insure that thru-holes in the array of spacers are properly aligned with the layered optical elements. Where an encapsulant is used, the encapsulant may be dispensed in a liquid form around the layered optical elements. The encapsulant would then be hardened and could be followed by a planarizing layer if necessary.

FIGS. 270A and 270B provide a variant of process 8000 shown in FIG. 269. Process 8020 commences in step 8022 with a fabrication master, a common base and a vacuum chuck being configured for extremely precise alignment. This alignment may be provided by passive or active alignment features and systems. Active alignment systems include vision systems and robotics for positioning the fabrication master, the common base and the vacuum chuck. Passive alignment systems include kinematic mounting arrangements. Alignment features formed upon the fabrication master, common base and vacuum chuck may be used to position these elements with respect to each other in any order or may be used to position these elements with respect to an external coordinate system or reference. The common base and/or fabrication master may be processed by performing actions such as treating the fabrication master with a surface release agent in step 8024, patterning an aperture or alignment features onto the common base (or any optical elements formed thereupon) in step 8026, and conditioning the common base with an adhesion promoter in step 8028. Step 8030 entails depositing moldable material, such as curable polymer material onto either or both of the fabrication master and the common base. The fabrication master and the common base are precisely aligned in step 8032 and engaged in step 8034 using a system that assures precise positioning.

An initiation source, such as an ultraviolet lamp or heat source, cures in step 8036 the moldable material to a state of hardness. The moldable material may be, for example, a UV-curable acrylic polymer or copolymer. It will be appreciated that the moldable material may also be deposited and/or formed of plastic melt resin that hardens upon cooling, or from a low temperature glass. In the case of the low temperature glass, the glass is heated prior to deposition and is hardened upon cooling. The fabrication master and common base are disengaged in step 8038 to leave the moldable material on the common base.

Step 8040 is a check to determine whether all layers of layered optical elements have been fabricated. If not, antireflection coating layers, apertures or light blocking layers may be optionally applied in step 8042 to the layer of layered optical elements that was last formed, and the process proceeds in step 8044 with the next fabrication master or other process. Once the moldable material has been hardened and bonded onto the common base, the fabrication master is disengaged from the common base and/or vacuum chuck. The next fabrication master is selected, and the process is repeated until all intended layers have been created.

As will be described in more detail below, it may be useful to produce imaging systems that have air gaps or moving parts, in addition to the layered optical elements described immediately above. In such instances, it is possible to use an array of spacers to accommodate the air gaps or moving parts. If step 8040 determines that all layers have been fabricated, then it is possible to determine a spacer type in step 8046. If no spacer is desired, then there is a yield in step 8048 of a product (i.e., an array of layered optical elements). If a glass spacer is desired, then an array of glass spacers is bonded in step 8050 to the common base, and an aperture may be placed in step 8052 atop the layered optical elements, if required, to yield a product in step 8048. If a polymer spacer is required, then a fill polymer may be deposited in step 8054 atop the layered optical elements. The fill polymer is cured in step 8056 and may be planarized in step 8058. An aperture may be placed 8060 atop the layered optical elements, if required, to yield a product 8048.

FIGS. 271A-C illustrate a fabrication master geometry for a process in which outer dimensions of sequential layers of a layered optical element are designed so that they may be successively formed with each formed layer decreasing in potential surface contact with each employed fabrication master as well as permitting available yard regions for each successive layer. Although fabrications masters are shown in FIGS. 271A-C as located "on top of" a layered optical element, a common base and a vacuum chuck, it may be advantageous to invert this arrangement. The inverted arrangement is particularly suitable for use with low viscosity polymers which, when uncured, may be retained within a recessed portion of the fabrication master.

FIGS. 271A-271C show a series of cross-sections portraying the formation of an array of layered optical elements, each layered optical element including three layers of optical elements forming a "layer cake" design where each subsequently formed optical element has an outside diameter that is smaller than the preceding optical element. Configurations such as shown in FIGS. 273 and 274, differing in cross-section from the layer cake design, may be formed by the same process as that which forms the layer cake configuration. A resultant cross-section of a configuration may be associated with certain changes in yard features, as described herein. A common base 8062, which may be an array of detectors, is mounted upon a vacuum chuck 8064 that includes kinematic alignment features 8065A and 8065B, as have been previously described. To facilitate precise alignment with any of fabrication masters 8066A, 8066B and 8066C, common base 8062 may be precisely aligned first with respect to vacuum chuck 8064. Subsequently, kinematic alignment features 8067A, 8067B, 8067C, 8067D, 8067E and 8067F of fabrication masters 8066A, 8066B and 8066C, engage with the kinematic features of vacuum chuck 8064 to place vacuum chuck 8064 in precise alignment with the fabrication masters; thereby precisely aligning any of fabrication masters 8066A, 8066B and 8066C and common base 8062. Following the formation of layered optical elements 8068, 8070 and 8072; regions between the layered optical elements may be filled with a curable polymer or other material that is used for planarization, light blocking, electromagnetic interference ("EMI") shielding or other uses. Accordingly, a first deposition forms layer of optical elements 8068 atop common base 8062. A second deposition forms layer of optical elements 8070 atop optical elements 8068, and a third deposition forms layer of optical elements 8072 atop optical elements 8070. It will be appreciated that the molding process may push small amounts of excess material into open space 8074, outside of the clear aperture (within the yard regions). Break lines 8076 and 8078 are illustrated to show that the elements shown in FIGS. 271A-271C are not drawn to scale, may be of any dimension, and may include an array of any number of layered optical elements.

Figure 272A:
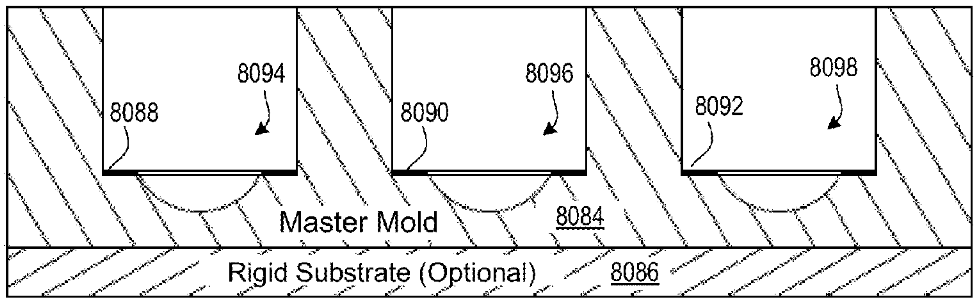
Figure 272B:
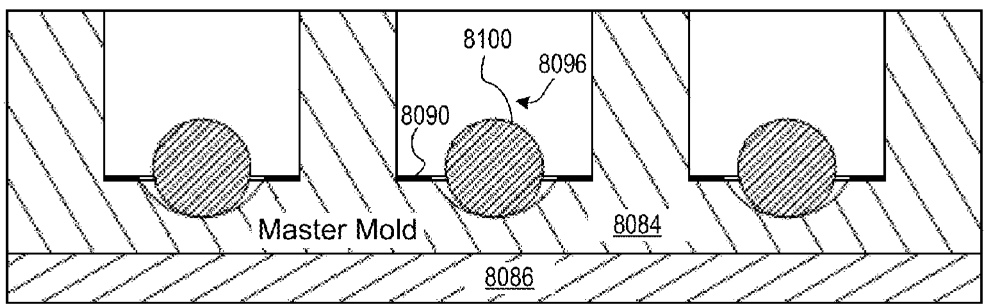
Figure 272C:
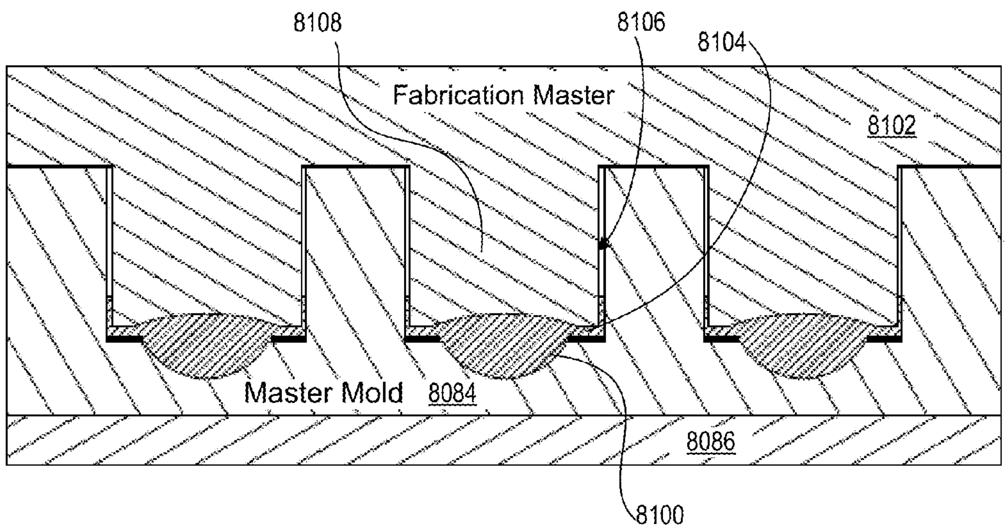
Figure 272D:
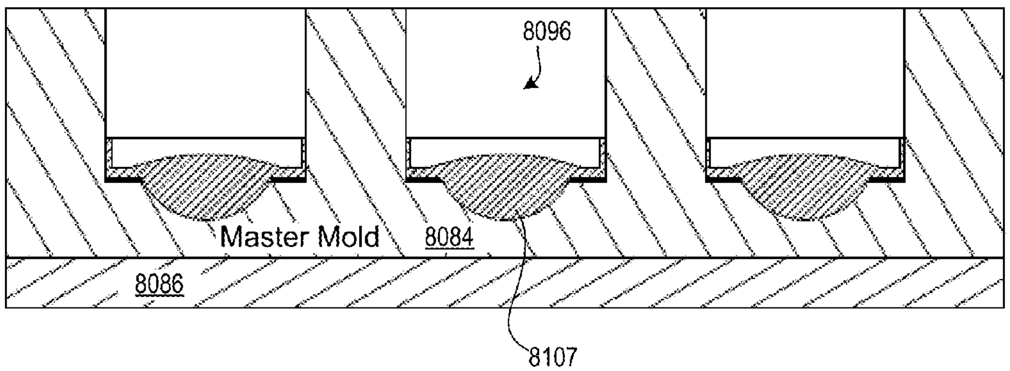
Figure 272E:
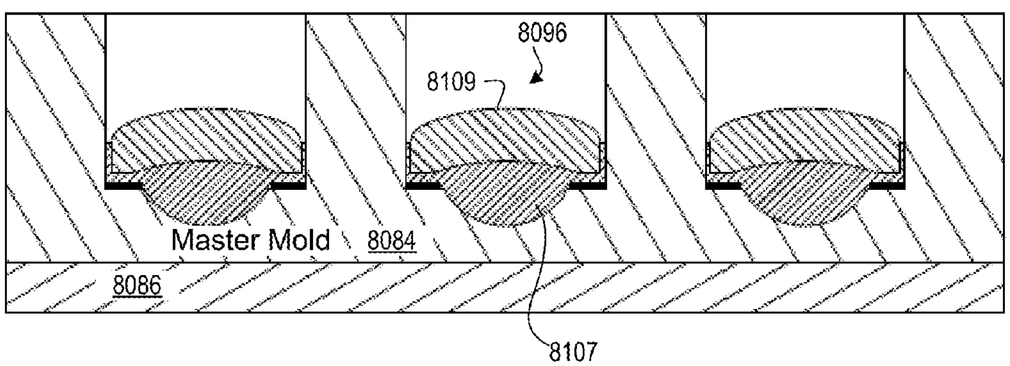

FIGS. 272A through 272E illustrate an alternative process for forming an array of layered optical elements. A moldable material is deposited into a cavity of a master mold, a fabrication master is then engaged with the master mold and the moldable material is formed to the cavity, thereby forming a first layer of a layered optical element. Once the fabrication master is engaged, the moldable material is cured and subsequently the fabrication master is disengaged from the structure. The process is then repeated for a second layer as shown in FIG. 272E. A common base (not shown) may be applied to a last formed layer of optical elements, thereby forming an array of layered optical elements. Although FIGS. 272A through 272E show formation of an array of three, two-layer, layered optical elements, the process illustrated in FIGS. 272A through 272E may be used to form an array of any quantity of any number of layers of layered optical elements.

In one embodiment, a master mold 8084 is used in combination with an optional rigid substrate 8086 to stiffen master mold 8084. For example, a master mold 8084 formed of PDMS may be supported by a metal, glass or plastic substrate 8086. As shown in FIG. 272A, ring apertures 8088, 8090 and 8092 of an opaque material, such as a metal or electromagnetic energy absorbing material, are placed concentrically in each of wells 8094, 8096, 8098. As illustrated with respect to well 8096 in FIG. 272B, a predetermined quantity of moldable material 8100 may be placed by micropipetting or controlled volume jet dispensing within well 8096. As shown in FIG. 272C, a fabrication master 8102 is precisely positioned with well 8096. Engagement of fabrication master 8102 with master mold 8084 shapes moldable material 8100 and forces excess material 8104 into an annular space 8106 between fabrication master feature 8108 and master mold 8084. Curing of moldable material 8100, for example, by the action of UV electromagnetic energy and/or thermal energy, with subsequent disengagement of fabrication master 8102 from master mold 8084 leaves cured optical element 8107 shown in FIG. 272D. A second moldable material 8109 (e.g., a liquid polymer) is deposited atop optical element 8107, as shown in FIG. 272E, to prepare for molding with use of a second fabrication master (not shown). This process of forming additional layered optical elements in an array of layered optical elements may be repeated any number of times.

For illustrative, non-limiting purposes, the exemplary layered optical element configurations shown in FIGS. 273 and 274 are used to provide a comparison between layered optical elements configuration resulting from the alternative methodologies of FIGS. 271A-271C and FIGS. 272A-272E. It may be understood that any fabrication method described herein, or combinations of portions thereof, may be used for fabrication of any layered optical element configuration, or portion thereof. FIG. 273 corresponds to the methodology illustrated in FIGS. 271A-271C, and FIG. 274 to that of FIGS. 272A-272E. Although the molding techniques produce very different overall layered optical element configurations 8110 and 8112, structure 8114 within lines 8116 and 8116' is identical. Lines 8116 and 8116' define a clear open aperture of respective layered optical element configurations 8110 and 8112, whereas material that is radially outboard of lines 8116 and 8116' constitutes the excess material or yard. As shown in FIG. 273, layers 8118, 8120, 8121, 8122, 8124, 8126 and 8128 are numbered in their successive order of formation to indicate that they have been sequentially deposited to a common base. Adjacent ones of these layers may be provided, for example, with refractive indices ranging from 1.3 to 1.8. Layered optical element configuration 8110 varies from the "layer cake" design of FIGS. 3 and 271 in that successive layers are formed with staggered diameters rather than sequentially smaller diameters. Different designs of yard regions of layered optical elements may be useful for coordination with processing parameters such as optical element size and moldable material properties. In contrast, in layered optical element configuration 8112 as shown in FIG. 274, successive numbering of layers 8130, 8132, 8134, 8136, 8138, 8140 and 8142 indicates that layer 8130 was first formed according to the methodology of FIGS. 272A-272E. Layered optical element configuration 8112 may be preferable in cases where diameters of the optical elements closest to the image area of a detector are smaller in diameter than those farther from the detector. Additionally, layered optical element configuration 8112, if formed according to the methodology of FIGS. 272A-272E may provide a convenient method for patterning of apertures such as aperture 8088. Although the exemplary configurations described immediately above are associated with certain orders of formation of layers of layered optical elements, it should be understood that these orders of formation may be modified such as by order reversal, renumbering, substitution and/or omission.

FIG. 275 shows, in perspective view, a section of a fabrication master 8144 that contains a plurality of features 8146 and 8148 for forming phase modifying elements that may be used in wavefront coding applications. As shown, each feature's surface has eight-fold symmetry "oct form" faceted surfaces 8150 and 8152. FIG. 276 is a cross-sectional view of fabrication master 8144 taken along line 276-276' of FIG. 275 and shows further details of phase modifying element 8148 including faceted surface 8152 circumscribed by a yard forming surface 8154.

Figure 277A:
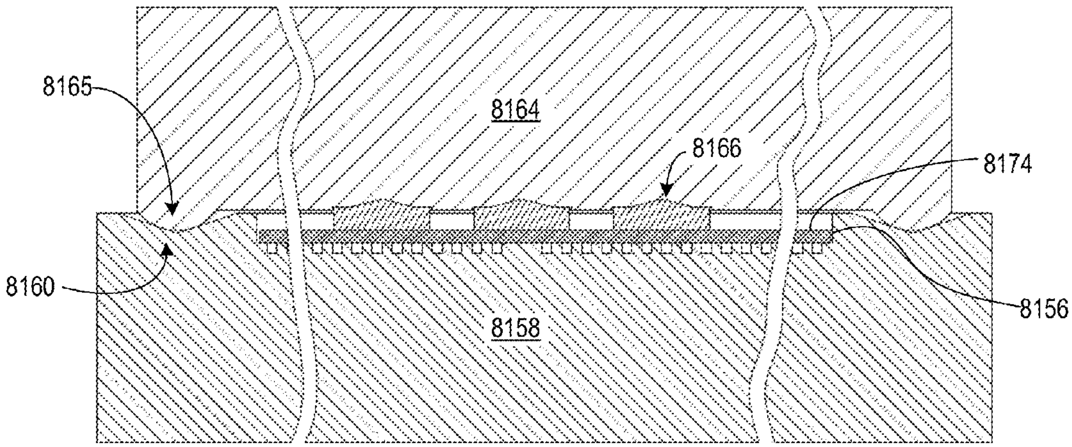
Figure 277B:
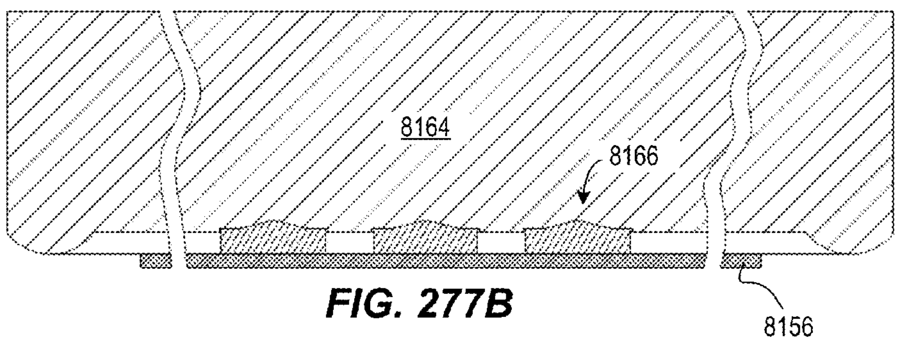
Figure 277C:
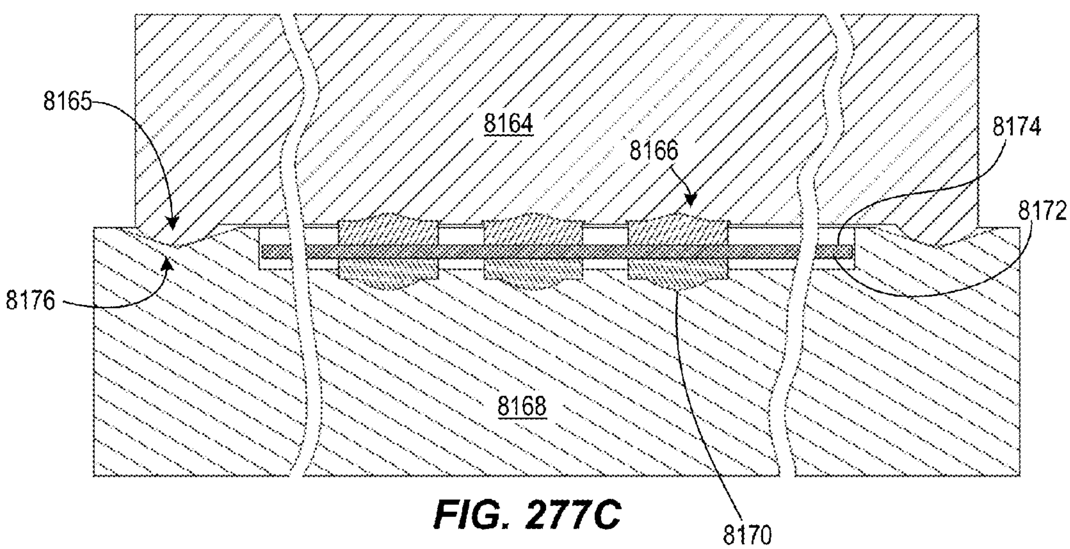
Figure 277D:
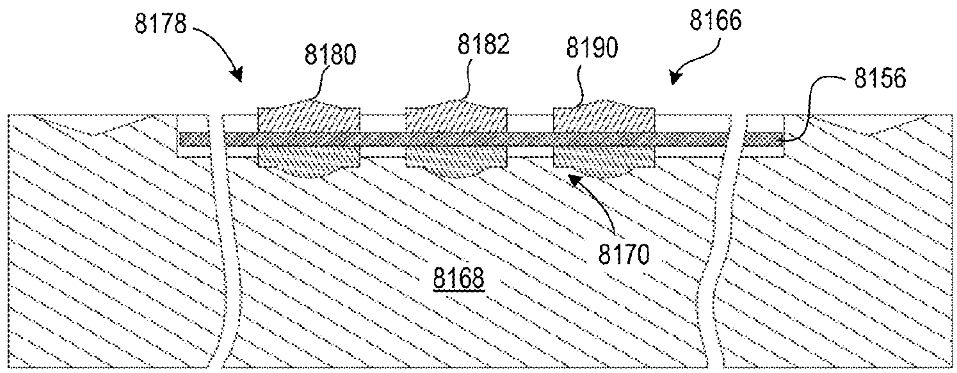

FIGS. 277A-277D show a series of cross-sectional views relating to forming layered optical elements 8180, 8182 and 8190 on one or two sides of a common base 8156. Such layered optical elements may be referred to as single or double sided WALO assemblies, respectively. FIG. 277A shows common base 8156 that has been processed in like manner as common base 8062 shown in FIG. 271A. Common base 8156, which may be a silicon wafer including an array of detectors including lenslets, is mounted upon a vacuum chuck 8158 that includes kinematic alignment features 8160 as have been previously described. Kinematic alignment features 8165 of a fabrication master 8164 engage with corresponding features 8160 of vacuum chuck 8158 to position common base 8156 in precise alignment with fabrication master 8164. The regions between the replicated layered optical elements may be filled with a cured polymer or other material that is used for planarization, light blocking, EMI shielding or other uses. A first deposition forms layer of optical elements 8166 on one side 8174 of common base 8156. Regions between optical elements 8166 may be filled with a cured polymer or other material that is used for planarization, light blocking, EMI shielding or other uses. FIG. 277B shows common base 8156 with vacuum chuck 8158 disengaged where common base 8156 is also retained within fabrication master 8164. In FIG. 277C, a second deposition uses fabrication master 8168 to form a layer of optical elements 8170 on a second side 8172 of common base 8156. This second deposition is facilitated by the use of kinematic alignment features 8176. Kinematic alignment features 8176, in cooperation with corresponding kinematic alignment feature 8165, also define the distance between the surfaces of layers 8166 and 8170 and therefore thickness variation or thickness tolerance of common base 8156 may be compensated for with kinematic alignment features 8176 and 8165. FIG. 277D shows a resultant structure 8178 on common base 8156 with fabrication master 8164 disengaged. A layer of optical elements 8166 includes optical elements 8180, 8182 and 8190. Additional layers may be formed on top of either or both layers of optical elements 8166 and 8170. Since common base 8156 and one or more of layers 8166 and 8170 remain mounted to either vacuum chuck 8158 or one of fabrication masters 8164 and 8168, alignment of common base 8156 may be maintained with respect to kinematic alignment features 8176 and 8165.

FIG. 278 shows a spacer array 8192 including a plurality of cylindrical openings 8194, 8196 and 8198 formed therethrough. Spacer array 8192 may be formed of glass, plastic or other suitable materials and may have a thickness of approximately 100 microns to 1 mm or more. FIG. 279A shows and array structure 8199 including spacer array 8192 aligned and positioned with respect to resultant structure 8178 of FIG. 277D and attached to common base 8156. FIG. 279B shows a second common base 8156' attached to the top of spacer array 8192. An array of optical elements may have been previously formed on second common base 8156' using a procedure similar to that described in FIGS. 277A-277D.

FIG. 280 shows a resultant array 8204 of layered optical elements including common bases 8156 and 8156' connected with spacer 8192. Layered optical elements 8206, 8208 and 8210 are each formed of optical elements and an air gap. For example, layered optical elements 8206 is formed of optical elements 8180, 8180', 8207 and 8207' that are constructed and arranged to provide an air gap 8212. Air gaps may be used to improve optical power of their respective imaging systems.

FIGS. 281 to 283 show cross-sections of wafer scale zoom imaging systems that may be formed from collections of optics with use of a spacer element (such as spacer array 8192, FIG. 278) to provide room for movement of one or more optics. Each set of optics of the imaging system may have one or more optical elements on both sides of a common base.

FIGS. 281A-281B show an imaging system 8214 with two moving double-sided WALO assemblies 8216 and 8218. WALO assemblies 8216 and 8218 are utilized as the center and first moving groups of a zoom configuration. Center and first group movement is governed by the utilization of proportional springs 8220 and 8222 such that motion of WALO assemblies 8216 and 8218 can be described by changes in displacement Δ(X1) and Δ(X2) respectively, where Δ(X1)/Δ(X2) is a constant proportional to X1/X2. Zoom movement is achieved by relative movement adjusting the distances X1, X2 caused by the action of a force F (represented by a large arrow) on WALO assembly 8218.

FIGS. 282A, 282B, 283A and 283B show cross-sectional views of a wafer scale zoom imaging system utilizing a center group formed from a double-sided WALO assembly 8226. In FIGS. 282A-282B, in the wafer scale zoom imaging system, at least a portion of a WALO assembly 8226 is impregnated with ferromagnetic materials such that electromotive force from a solenoid 8228 is capable of moving WALO assembly 8226 between a first position 8230 in a first state 8224, as shown in FIG. 282A, and a second position 8232 in a second state 8224', as shown in FIG. 282B. In FIGS. 283A-283B, a WALO assembly 8236 separates reservoirs 8238 and 8240 which are coupled with respective orifices 8242 and 8244 permitting inflow 8246 and 8248 and outflow 8250 and 8252. Consequently, WALO assembly 8236 may be moved from a first state 8234 to a second state 8234' by, for example, hydraulic or pneumatic action.

FIG. 284 shows an elevation view of an alignment system 8254 including a vacuum chuck 8256, a fabrication master 8258 and a vision system 8260. A ball and cylinder feature 8262 includes a spring-biased ball mounted inside a cylindrical bore within mounting block 8264 affixed to vacuum chuck 8256. In one method of controlled engagement, ball and cylinder feature 8262 contacts an abutment block 8266 attached to fabrication master 8258, as fabrication master 8258 and vacuum chuck 8256 are positioned relative to one another in the θ direction before engagement between fabrication master 8258, and vacuum chuck 8256. This engagement may be sensed electronically, whereupon vision system 8260 determines relative positional alignments between indexing mark 8268 on fabrication master 8258 and indexing mark 8270 on vacuum chuck 8256. Indexing marks 8268 and 8270 may also be verniers or fiducials. Vision system 8260 produces a signal that is sent to a computer processing system (not shown) which interprets the signal to provide robotic positional control. The interpretation results drive a pseudo-kinematic alignment in the Z and θ directions (as described herein, radial R alignment may be controlled by annular pseudo-kinematic alignment features formed upon vacuum chuck 8256 and fabrication master 8258). In the example described immediately above, passive mechanical alignment features and vision systems are used cooperatively for positioning fabrication master 8258 and vacuum chuck 8256. Alternatively, passive mechanical alignment features and vision systems may be used individually for the positioning. FIG. 285 is a cross-sectional view that shows a common base 8272 with an array of layered optical elements 8274 being formed between fabrication master 8258 and vacuum chuck 8256.

FIG. 286 shows a top view of alignment system 8254 to illustrate the use of transparent or translucent system components. Certain normally hidden features, in the case of a non-transparent or non-translucent fabrication master 8258, are shown as dashed lines. Circular dashed lines denote features of common base 8272 including a circumference with an indexing mark 8278 and layered optical elements 8274. Fabrication master 8258 has at least one circular feature 8276 and presents indexing mark 8268 that may be used for alignment. Vacuum chuck 8256 presents indexing mark 8270. Indexing mark 8278 is aligned with indexing mark 8270 as common base 8272 is positioned in vacuum chuck 8256. Vision system 8260 senses the alignment of indexing marks 8268 and 8270 to nanometer scale precision to drive alignment by θ rotation. Although shown in FIG. 286 to be oriented in a plane perpendicular to the normal of the surface of common base 8272, vision system 8260 may be oriented is other ways to be able to observe any necessary alignment or indexing marks.

FIG. 287 shows an elevated view of a vacuum chuck 8290 with a common base 8292 mounted thereon. Common base 8292 includes an array of layered optical elements 8294, 8296 and 8298. (Not all layered optical elements are labeled to promote illustrative clarity.) Although layered optical elements 8294, 8296 and 8298 are shown as having three layers, it may be understood that an actual common base may hold layered optical elements with more layers. As an example, approximately two thousand layered optical elements suitable for VGA resolution CMOS detectors may be formed on a common base of eight inches in diameter. Vacuum chuck 8290 has frusto-conical features 8300, 8302 and 8304 forming a part of a kinematic mount. FIG. 288 is a cross-sectional view of common base 8292 mounted in vacuum chuck 8290 with ball 8306 providing alignment between frusto-conical features 8304 and 8310 that respectively reside upon vacuum chuck 8290 and fabrication master 8313.

FIGS. 289 and 290 show two alternative methods of construction of a fabrication master that may include transparent, translucent or thermally conductive regions for use in association with system 8254 shown in FIG. 286. FIG. 289 is a cross-sectional view of a fabrication master 8320 that contains a transparent, translucent or thermally conductive material 8322 affixed to a different encircling feature 8324 that has defined upon its surface kinematic features 8326. Material 8322 includes features 8334 for forming arrayed optical elements. Material 8322 may be glass, plastic or other transparent or translucent material. Alternatively, material 8322 may be a high thermal conductivity metal. Encircling feature 8324 may be formed of a metal, such as brass, or a ceramic. FIG. 290 is a cross-sectional view of a fabrication master 8328 formed of a three-part construction. A cylindrical insert 8330 may be glass that supports a lower modulus material 8332, such as PDMS, incorporating features 8334 for forming array optical elements.

Material 8332 may be machined, molded or cast. In one example, material 8332 is molded in a polymer using a diamond-machined master. FIG. 291A shows cross-sections of a diamond-machined master 8336 and of a three-part master 8338 prior to the inserting and molding of a third part (not shown) of a three-part master 8338. An encircling feature 8340 surrounds a cylindrical insert 8342. A moldable material 8343 is added to volume 8346, and diamond-machined master 8336 is engaged with moldable material 8343 and three-part master 8338 as shown in FIG. 291B, utilizing kinematic alignment features 8348. Disengagement of diamond-master 8336 leaves daughter-copy pattern 8350 of diamond master 8336 as shown in FIG. 291C.

FIG. 292 shows a fabrication master 8360 in top perspective view. Fabrication master 8360 contains a plurality of organized arrays of features for forming optical elements. One such array 8361 is selected by a dashed outline. Although in many instances arrayed imaging systems may be singulated into individual imaging systems, certain arrangements of imaging systems may be grouped together and not singulated. Accordingly, fabrication masters may be adapted to support non-singulated imaging systems.

FIG. 293 shows a separated array 8362 including a 3×3 array of layered optical elements, including elements 8364, 8366 and 8368 that have been formed in association with array 8361 of features for forming optical elements of fabrication master 8360 of FIG. 292. Each layered optical element of separated array 8362 may be associated with an individual detector or, alternatively, each layered optical element may be associated with a portion of a common detector. Space 8370 between the respective optical elements have been filled, thus adding strength to separated array 8362, which has been separated from a larger array of layered optical elements (not shown) by sawing or cleaving. The array forms a "super camera" structure in which any one of the optical elements, such as optical elements 8364, 8366 and 8368, may differ from one another, or may have the same structure. These differences are illustrated in the cross-sectional view shown in FIG. 294, wherein layered optical elements 8366, 8364 and 8268 all differ from each other. Layered optical elements 8364, 8366 and 8368 may contain any of the optical elements described herein. Such a super camera module may be useful for having multiple zoom configurations without the involvement of mechanical movement of optics, thereby simplifying imaging system design. Alternatively, a super camera module may be useful for stereoscopic imaging and/or ranging.

The embodiments described herein offer advantages over existing electromagnetic detection systems, and methods of fabrication thereof, by using materials and methods that are compatible with existing fabrication processes (e.g., CMOS processes) for the manufacture of optical elements buried within detector pixels of a detector. That is, in the context of the present disclosure, "buried optical elements" are understood to be features that are integrated into a detector pixel structure for redistributing electromagnetic energy within the detector pixel in predetermined ways and are formed of materials and using procedures that may used in the fabrication of the detector pixels themselves. The resulting detectors have the advantages of potentially lower cost, higher yield and better performance. In particular, improvements in performance may be possible because the optical elements are designed with knowledge of the pixel structure (e.g., positions of metal layers and photosensitive regions). This knowledge allows a detector pixel designer to optimize an optical element specifically for a given detector pixel, thereby allowing, for example, pixels for detecting different colors (e.g., red, green and blue) to be customized for each specific color. Additionally, the integration of the buried optical element fabrication with the detector fabrication processes may provide additional advantages such as, but not limited to, better process control, less contamination, less process interruption and reduced fabrication cost.

Attention is directed to FIG. 295, showing a detector 10000 including a plurality of detector pixels 10001, which were also discussed with reference to FIG. 4A. Customarily, a plurality of detector pixels 10001 is created simultaneously to form detector 10000 by known semiconductor fabrication processes, such as CMOS processes. Details of one of detector pixels 10001 of FIG. 295 are illustrated in FIG. 296. As may be seen in FIG. 296, detector pixel 10001 includes a photosensitive region 10002 integrally formed with a common base 10004 (e.g., a crystalline silicon layer). A support layer 10006, formed of a conventional material used in semiconductor manufacturing such as plasma enhanced oxide ("PEOX"), supports therein a plurality of metal layers 10008 as well as buried optical elements. As shown in FIG. 296, the buried optical elements in detector pixel 10001 include a metalens 10010 and a diffractive element 10012. In the context of the present disclosure, a metalens is understood to be a collection of structures that are configured for affecting the propagation of electromagnetic energy transmitted therethrough, where the structures are smaller in at least one dimension than certain wavelengths of interest. Diffractive element 10012 is shown to be integrally formed along with the deposition of a passivation layer 10014 disposed at the top of detector pixel 10001. Passivation layer 10014, and consequently diffractive element 10012, may be formed of a conventional material commonly used in semiconductor manufacturing such as, for instance, silicon nitride ("$Si_3N_4$") or plasma enhanced silicon nitride ("PESiN"). Other suitable materials include, but are not limited to, silicon carbide (SiC), tetraethyl orthosilicate ("TEOS"), phosphosilicate glass ("PSG"), borophosphosilicate glass ("BPSG"), fluorine doped silicate glass (FSG) and BLACK DIAMOND® ("BD").

Continuing to refer to FIG. 295, buried optical elements 10010 and 10012 are formed during the detector pixel manufacture using the same fabrication processes (e.g., photolithography) used to form, for example, photosensitive region 10002, support layer 10006, metal layers 10008 and passivation layer 10014. Buried optical elements 10010 and 10012 may also be integrated into detector pixel 10001 by shaping another material, such as silicon carbide, within support layer 10006. For instance, the buried optical elements 10010 and 10012 may be formed lithographically during the fabrication process of detector pixel 10001, thereby eliminating additional fabrication processes that are required for adding optical elements after the detector pixels have been formed. Alternatively, buried optical elements 10010 and 10012 may be formed by blanket deposition of layer structures. In an example, buried optical element 10010 may be configured as a metalens, while buried optical element 10012 may be configured s a diffractive element. Buried optical elements 10012 may cooperate to perform, for instance, chief ray angle correction of electromagnetic energy incident thereon. A combination of PESiN and PEOX may be particularly attractive in the present context because they present a large refractive index differential, which is advantageous in the fabrication of, for example, thin film filters, as will be described in detail at an appropriate point hereinafter with reference to FIG. 303.

Figure 297:
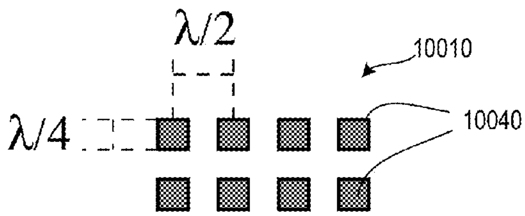

FIG. 297 shows further details of metalens 10010 used with detector pixel 10001 of FIGS. 295 and 296. Metalens 10010 may be formed by a plurality of subwavelength structures 10040. As one example, for a given target wavelength λ, each one of subwavelength structures 10040 may be a cube having a length of λ/4 a side and being spaced apart by λ/2. Metalens 10010 may also include periodic dielectric structures that collectively form photonic crystals. Subwavelength structures 10040 may be formed of, for example, PESiN, SiC, or a combination of the two materials.

Figure 298:
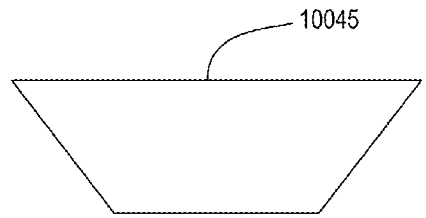
Figure 299:
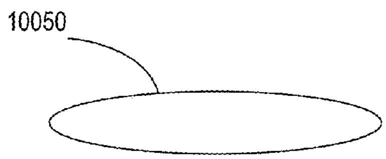
Figure 300:
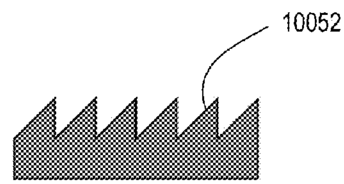
Figure 301:
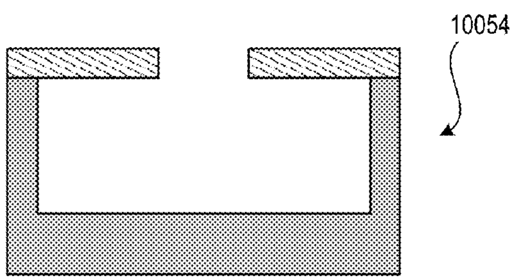
Figure 302:
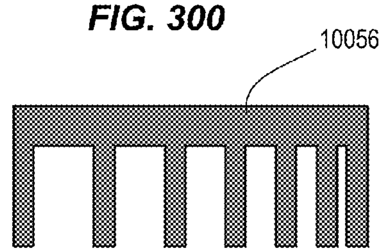
Figure 303:
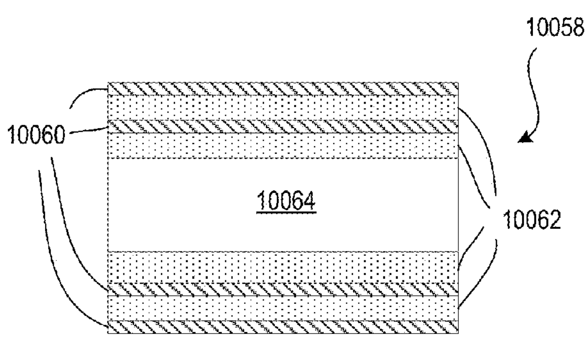
Figure 304:
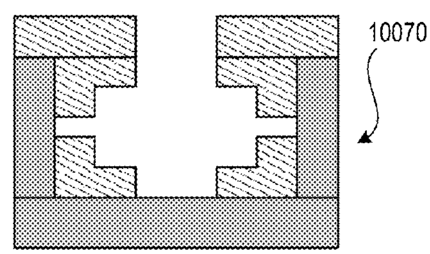

FIGS. 298-304 illustrate additional optical elements suitable for inclusion in detector pixels 10001 as buried optical elements, in accordance with the present disclosure. FIG. 298 shows a trapezoidal element 10045. FIG. 299 shows a refractive element 10050. FIG. 300 shows a blazed grating 10052. FIG. 301 shows a resonant cavity 10054. FIG. 302 shows a subwavelength, chirped grating 10056. FIG. 303 shows a thin film filter 10058 including a plurality of layers 10060, 10062 and 10064 configured, for instance, for wavelength selective filtering. FIG. 304 shows an electromagnetic energy containment cavity 10070.

FIG. 305 shows an embodiment of a detector pixel 10100 including a waveguide 10110 for directing incoming electromagnetic energy 10112 toward photosensitive region 10002. Waveguide 10110 is configured such that a refractive index of the material forming waveguide 10110 varies radially outward in a direction r from a center line 10115; that is, the refractive index n of waveguide 10110 is dependent on r such that refractive index n=n(r). Refractive index variation may be produced, for example, by implantation and thermal treatment of the material forming waveguide 10110, or, for example, by methods previously described for the manufacture of non-homogeneous optical elements (FIGS. 113-115, 131 and 144). Waveguide 10110 presents an advantage that electromagnetic energy 10112 may be more efficiently directed towards photosensitive region 10002, where electromagnetic energy is converted into an electronic signal. Furthermore, waveguide 10110 allows photosensitive region 10002 to be placed deep within detector pixel 10001 allowing, for example, the use of a larger number of metal layers 10008.

FIG. 306 shows another embodiment of a detector pixel 10120 including a waveguide 10122. Waveguide 10122 includes a high index material 10124 surrounded by a low index material 10126 configured to cooperate with each other so as to direct incoming electromagnetic energy 10112 toward photosensitive region 10002, similar to a core and cladding arrangement in an optical fiber. A void space may be used in place of low index material 10126. This embodiment, as the previous one, presents the advantage that electromagnetic energy 10112 is efficiently directed towards photosensitive region 10002, even if the photosensitive region is buried deep within detector pixel 10001.

FIG. 307 shows still another embodiment of a detector pixel 10150, this time including first and second sets of metalenses 10152 and 10154, respectively, which cooperate to form a relay configuration. Since metalenses may exhibit strongly wavelength-dependent behavior, a combination of first and second sets of metalenses 10152 and 10154 may be configured for effective wavelength-dependent filtering. Although metalenses 10152 and 10154 are shown as arrays of individual elements, these elements may be formed from a single unified element. For example, FIG. 308 shows a cross-section of electric field amplitude for a wavelength of 0.5 μm at photosensitive region 10002 along a spatial s-axis, shown as a dashed, double-headed arrow in FIG. 307. As is evident in FIG. 308, the electric field amplitude is centered about a center of photosensitive region 10002 (FIG. 307) at this wavelength. In contrast, FIG. 309 shows a cross-section of the electric field amplitude at a wavelength of 0.25 μm at photosensitive region 10002 along the s-axis; this time, due to the wavelength dependence of first and second sets of metalenses 10152 and 10154, the electric field amplitude of electromagnetic energy transmitted through this relay configuration exhibits a null around the center of photosensitive region 10002. Accordingly, by tailoring size and spacing of sub-wavelength structures forming metalenses 10152 and 10154, the relay may be configured to perform color filtering. Moreover, multiple optical elements may be relayed and their combined effect may be used to improve a filtering operation or to increase its functionality. For example, filters with multiple passing bands may be configured by combining relayed optical elements with complementary filtering passing bands.

FIG. 310 shows a dual-slab approximation configuration 10200 for use as a buried optical element in accordance with the present disclosure (for example, as diffractive element 10012 in FIGS. 295 and 296). The dual-slab configuration approximates a trapezoid optical element 10210 with a height h and bottom and top widths $b_1$ and $b_2$, respectively, by using a combination of first and second slabs 10220 and 10230, respectively. To optimize the dual-slab geometry, the slab heights may be varied in order to optimize power coupling. A dual-slab configuration with widths $W_1=(3b_1+b_2)/4$ and $W_2=(3b_2+b_1)/4$, respectively, with heights $h_1=h_2=h/2$ is numerically evaluated in terms of power coupling.

FIG. 311 shows analytical results of power coupling for a trapezoidal optical element as a function of height h and top width $b_2$ for wavelengths between 525 nm and 575 nm. All optical elements have a 2.2 μm base-width. It may be seen in FIG. 311 that a trapezoidal optical element with top width $b_2$=1600 nm delivers more electromagnetic energy to the photosensitive region (element 10002) than trapezoidal optical elements with top widths of 1400 nm and 1700 nm. This data indicates that a trapezoidal optical element with a top width between these two values may provide a local maximum in coupling efficiency.

It is possible to take the multi-slab configuration further and replace a conventional lenslet with, for example, a dual-slab. As each one of a plurality of detector pixels is characterized by a pixel sensitivity, a multi-slab configuration may be further optimized for improved sensitivity at a wavelength of operation of a given detector pixel. A comparison of the power coupling efficiencies for a lenslet and dual-slab configurations over a range of wavelengths is shown in FIG. 312. Dual-slab geometries for various colors are summarized in TABLE 51. An optimum trapezoidal optical element for each wavelength band may be used to determine the slab widths, according to the expression for $W_1$ and $W_2$, above. A dual-slab optical element may be optimized further by varying the height to maximize power coupling. For example, $W_1$ and $W_2$ calculated for green wavelengths may correspond to the geometry as shown in FIG. 310, but the height may not necessarily be ideal.

TABLE 51

| | Blue | Green | Red |
|---|---|---|---|
| Width 1 (nm) | 1975 | 2050 | 1950 |
| Width 2 (nm) | 1525 | 1750 | 1450 |
| Height (nm) | 120 | 173 | 213 |

FIG. 313 shows an example of chief ray angle correction using a shifted embedded optical element and a relaying metalens. A system 10300 includes a detector pixel 10302 (indicated by a box boundary), metal layers 10308 and first and second buried optical elements 10310 and 10312, respectively, that are offset with respect to a center line 10314 of detector pixel 10302. First buried optical element 10310 in FIG. 313 is an offset variation of diffractive element 10012 of FIG. 296 or diffractive element 10045 as shown in FIG. 298. Second buried optical element 10312 is shown as a metalens. Electromagnetic energy 10315 traveling in a direction indicated by an arrow 10317 encounters first buried optical element 10310 and, consequently, metal layers 10308 and second buried optical element 10312 such that, emerging from the metalens, electromagnetic energy 10315' traveling in a direction 10317' is now normally incident on a bottom surface 10320 of detector pixel 10302 (on which a photosensitive region would be positioned. In this way, the combination of first and second buried optical elements 10310 and 10312 consequently increases the sensitivity of detector pixel 10302 over the sensitivity of a similar pixel without buried optical elements 10310 and 10312.

An embodiment of the detector system may include additional thin film layers, as shown in FIG. 314, configured for wavelength selective filtering specific to different colored pixels. These additional layers may be formed, for instance, by blanket deposition over the entire wafer. Lithographic masks may be used to define upper layers (i.e., customized, wavelength selective layers), and additional wavelength selective structures, such as metalenses, may be additionally included as buried optical elements.

FIG. 315 shows numerical modeling results for the wavelength selective thin film filter layers, optimized for different wavelength ranges. The results shown in plot 10355 of FIG. 315 assume seven common layers (constituting a partially-reflective mirror) topped by three or four wavelength selective layers, depending on color. Plot 10355 includes only the effects of the layered structures formed at the top of the detector pixels; that is, the effects of the buried metalenses are not included in the calculations. A solid line 10360 corresponds to transmission as a function of wavelength for a layered structure configured for transmitting in the red wavelength range. A dashed line 10365 corresponds to transmission as a function of wavelength for a layered structure configured for transmitting in the green wavelength range. Finally, a dotted line 10370 corresponds to transmission as a function of wavelength for a layered structure configured for transmitting in the blue wavelength range.

The embodiments here represented may be used individually or in combination. For example, one may use an embedded lenslet and enjoy the benefits of improved pixel sensitivity while still using conventional color filters, or one may use a thin film filter for IR-cut filtering overlaid by a conventional lenslet. However, when conventional color filters and lenslets are replaced by buried optical elements, the additional advantage of potentially integrating all steps of detector fabrication into a single fabrication facility is realized, thereby reducing the handling of detectors and possible particle contamination and, consequently, potentially increasing fabrication yields.

The embodiments of the present disclosure also present an advantage that final packaging of a detector is simplified by an absence of external optical elements. In this regard, FIG. 316 shows an exemplary wafer 10375 including a plurality of detectors 10380, also showing a plurality of separating lanes 10385, along which the wafer would be cut in order to separate the plurality of detectors 10380 into individual devices. That is, each of the plurality of detectors 10380 already includes buried optical elements, such as lenslets and wavelength selective filters, such that the detectors may be simply separated along the separating lanes to yield complete detectors without requiring additional packaging. FIG. 317 shows one of detectors 10380, shown from the bottom where a plurality of bonding pads 10390 may be seen. In other words, bonding pads 10390 may be prepared at the bottom of each detector 10380 such that additional packaging steps to provide electrical connections would not be required, thereby potentially reducing production costs. FIG. 318 shows a schematic diagram of a portion 10400 of detector 10380. In the embodiment shown in FIG. 318, portion 10400 includes a plurality of detector pixels 10405, each including at least one buried optical element 10410 and a thin film filter 10415 (formed of materials compatible with the fabrication of detector pixels 10405). Each detector pixel 10405 is topped with a passivation layer 10420, and then the entire detector is coated with a planarization layer 10425 and a cover plate 10430. In one example of this embodiment, passivation layer 10420 may be formed of PESiN; the combination of passivation layer 10420, planarization layer 10425 and the cover plate 10430 performs to, for instance, further protect detector 10380 from environmental effects and allow the detector to be separated and directly used without additional packaging steps. Planarization layer 10425 may only be required when, for instance, the top surface of detector 10380 is not level. In addition, passivation layer 10425 may not be required if cover plate 10430 is used.

FIG. 319 shows a cross-sectional view of a detector pixel 10450 including a set of buried optical elements 10472, 10476 and 10478 acting as a metalens 10470. A photosensitive region 10455 is fabricated into or onto a semiconductor common base 10460. Semiconductor common base 10460 may be formed from, for example, crystalline silicon, gallium arsenide, germanium or organic semiconductors. A plurality of metal layers 10465 provide electrical contact between elements of the detector pixel such as between photosensitive region 10455 and readout electronics (not shown). Detector pixel 10450 includes a metalens 10470 including outer, middle and inner elements 10472, 10476, and 10478. In the example illustrated in FIG. 319, outer, middle and inner elements 10472, 10476 and 10478 are symmetrically arranged; in particular, outer, middle and inner elements 10472, 10476 and 10478 all have the same height and are formed of the same material in metalens 10470. Outer, middle and inner elements 10472, 10476 and 10478 may be made from a CMOS processing-compatible material such as PESiN. Outer, middle and inner elements 10472, 10476 and 10478 may be defined, for example, using a single mask step followed by etching and then a deposition of the desired material. Additionally, a chemical-mechanical polishing may be applied after the deposition. Although metalens 10470 is shown in a specific position, the metalens may be modified to achieve similar performance and be positioned, for example, similarly to metalens 10010 in FIG. 296. Since elements 10472, 10476 and 10478 of metalens 10470 are all of the same height, they all simultaneously abut the interface of a layer group 10480. Therefore, layer group 10480 may be added directly during further processing without added processing steps such as planarization steps. Layer group 10480 may include portions or layers that provide for metallization, passivation, filtering, or mounting of external components. Symmetry of metalens 10470 provides azimuthally uniform direction of electromagnetic energy regardless of polarization. In the context of FIG. 319, the azimuth is defined as the angular orientation about an axis that is normal to the photosensitive region 10455 of detector pixel 10450. Electromagnetic energy is incident onto the detector pixel in the direction generally shown by arrow 10490. Additionally, simulated results of electromagnetic power density 10475 (shaded region indicated by a dashed oval) as directed by metalens 10470 is shown. As may be seen in FIG. 319, electromagnetic power density 10475 is directed by metalens 10470 away from metal layers 10465 to a center of photosensitive region 10455.

FIG. 320 shows a top view of one embodiment 10500 for use as detector pixel 10450 as shown in FIG. 319. Embodiment 10500 includes outer, middle and inner elements 10505, 10510 and 10515, respectively, which are symmetrically organized about a center of embodiment 10500. Outer, middle and inner elements 10505, 10510 and 10515 correspond to elements 10472, 10476 and 10478 respectively of FIG. 319. In the example shown in FIG. 320, outer, middle and inner elements 10505, 10510, and 10515 are made from PESiN and have a common height of 360 nm. Inner element 10515 is 490 nm wide, and middle elements 10510 are symmetrically positioned proximate to each edge of and are coplanar with inner element 10515. Straight segments of middle element 10510 are 220 nm in width. Straight segments of outer element 10505 are 150 nm in width.

FIG. 321 shows a top view of another embodiment 10520 of detector pixel 10450 from FIG. 319. In contrast to elements 10505, 10510 and 10515 of FIG. 320, elements 10525, 10530 and 10535 are arrayed structures. However, it is noted that the configurations illustrated in FIGS. 320 and 321 are substantially equivalent in their effects on electromagnetic energy transmitted therethrough. Since feature size of these elements is smaller with respect to a wavelength of the electromagnetic energy of interest, diffractive effects (that would result if the minimum feature sizes of the elements were not smaller than half the wavelength of interest) are negligible. Relative sizes and locations of the elements in FIGS. 320 and 321 may be defined, for instance, by an inverse parabolic mathematical relationship. For example, dimensions of element 10525 may be inversely proportional to the square of the distance from the center of element 10535 to the center of element 10525.

FIG. 322 shows a cross-section of a detector pixel 10540 including a multilayered set of buried optical elements acting as a metalens 10545. Metalens 10545 includes two rows of elements. The first row includes elements 10555 and 10553. The second row includes elements 10550, 10560 and 10565. In the example illustrated in FIG. 322, each of these rows of elements is half as thick as the equivalent structure shown in FIG. 319 as metalens 10470. Two-layered metalens 10545 exhibits equivalent electromagnetic energy directing performance as metalens 10470. Since metalens 10470 may be simpler to construct, metalens 10470 may be more cost effective in many situations. However, metalens 10545, with its higher complexity, has more parameters for adaptation for specific uses and therefore provides more degrees of freedom for use in certain applications. Metalens 10545 may be adapted, for example, to provide specific wavelength-dependent behavior, chief ray angle correction, polarization diversity or other effects.

FIG. 323 shows a cross-section of a detector pixel 10570 including an asymmetric set of buried optical elements 10580, 10585, 10590, 10595 and 10600 acting as a metalens 10575. Metalens designs using asymmetric sets of elements, such as metalens 10575, have a much larger design parameter space than symmetric designs. By varying the properties of the metalens in relationship to its position in a detector pixel array, the array may be corrected for chief ray angle variation or other spatially (e.g., across the array) varying aspects of the imaging system that may be used with the detector pixel array. Each element 10580, 10585, 10590, 10595 and 10600 of metalens 10575 may be described by a prescription of its spatial, geometric, material and optical index parameters.

TABLE 52

| Element | Location | Material | Index | Shape | Orientation | Length | Width | Height |
|---|---|---|---|---|---|---|---|---|
| 10625 (10715) | −1.0 | PESiN | 1.7 | Square | Aligned | 0.2 | 0.2 | 0.6 |
| 10630 (10720) | 0.0 | PESiN | 1.7 | Square | Aligned | 0.2 | 0.2 | 0.7 |
| 10635 (10725) | 1.0 | PESiN | 1.7 | Square | Aligned | 0.2 | 0.2 | 0.55 |

FIGS. 324 and 325 show a top view and a cross-sectional view of a set of buried optical elements 10605. A set of axes (indicated by lines 10610 and 10615) are superimposed on buried optical elements 10605. The prescriptions of left, center and right elements 10625, 10630, and 10635, respectively, may be defined relative to origin 10620, as shown in TABLE 52 (location, length, width and height are shown in normalized units). Although this example uses an orthogonal Cartesian axis system, other axis systems such as cylindrical or spherical may be used. While axes 10610 and 10615 are shown to intersect at an origin 10620 located at a center of center element 10630, the origin may be placed at other relative locations such as an edge or corner of buried optical elements 10605.

A cross-sectional view of a portion of buried optical elements 10605 is shown in FIG. 325. Arrows 10645 and 10650 indicate the differences in height between left, center and right elements 10625, 10630 and 10635. It is noted that, although left, center and right elements 10625, 10630 and 10635, respectively, are shown as being square and aligned to the axes, they may take any shape (circle, triangle, etc.) and may be oriented at any angle with respect to the axes.

Figure 327:
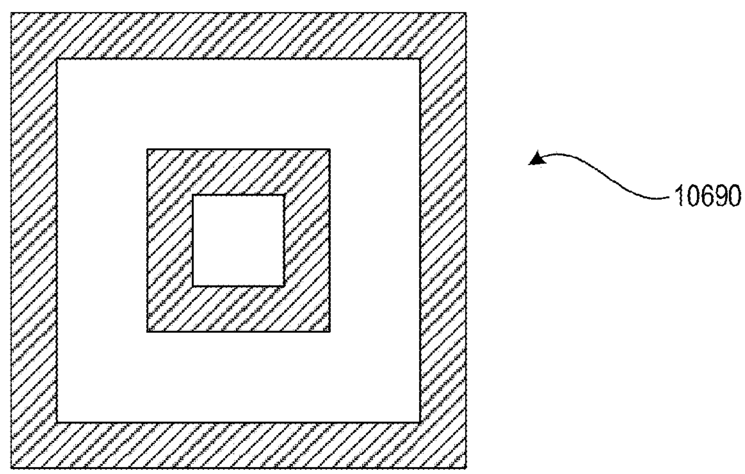
Figure 328:
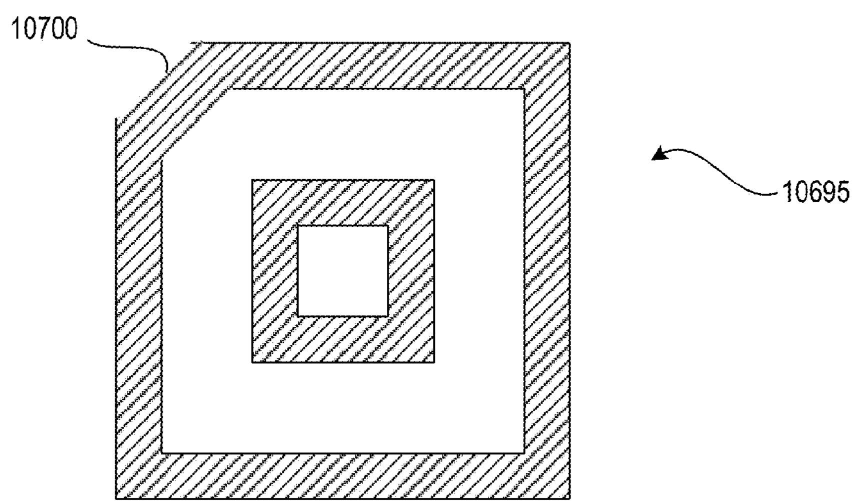

FIGS. 326-330 show alternative 2D projections of buried optical elements similar to FIG. 320. A buried optical element 10655 includes elements 10665, 10675, 10680 and 10685 having circular symmetry. These elements are shown to be coaxially symmetric. A region 10670 may also be defined within the boundary 10660 of the metalens. In this example, elements 10670, 10675 and 10685 may be made of TEOS and elements 10665 and 10680 may be made of PESiN. In FIG. 327, a buried optical element 10690 includes a metalens configuration equivalent to buried optical element 10655 that uses a coaxially symmetric set of square elements. In FIG. 328, a buried optical element 10695 includes a boundary 10700 of the metalens that is asymmetrically modified to perform a specific type of directing of electromagnetic energy or to match the irregular boundary of the photosensitive region of the associated detector pixel.

Figure 329:
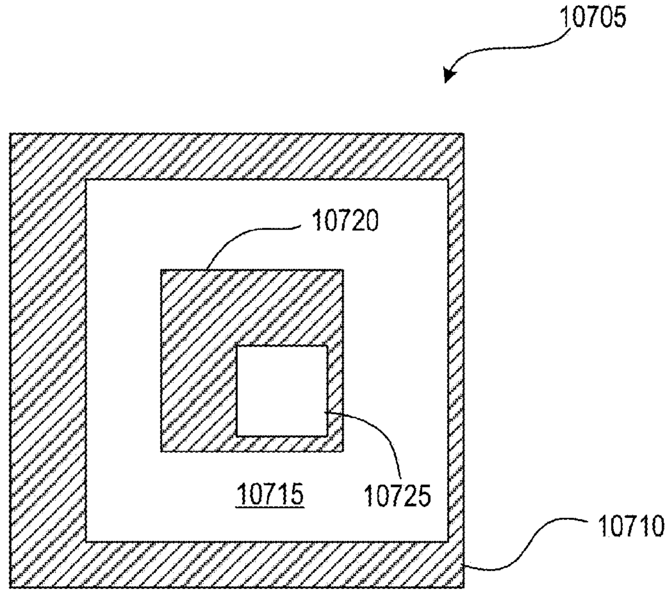
Figure 330:
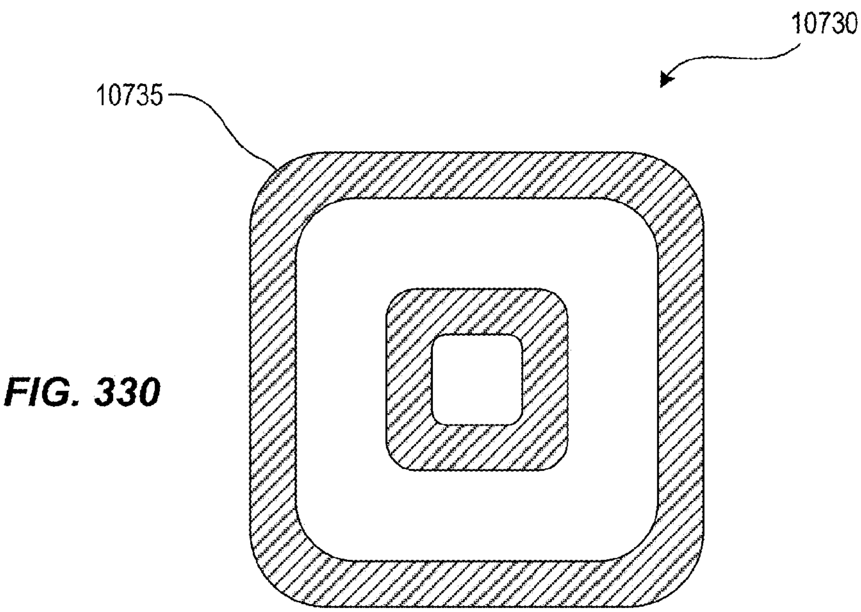

FIG. 329 shows a buried optical element 10705 including a generalized metalens configuration with mixed symmetry. Elements 10710, 10715, 10720, and 10725 all have square cross-sections but are not fully coaxially symmetric, such as in buried optical element 10690 shown in FIG. 327. Elements 10710 and 10720 are aligned and coaxial, whereas elements 10715 and 10725 are asymmetric in at least one direction. An asymmetricor mixed-symmetry metalens is useful for directing electromagnetic energy in specific wavelengths, directions, or angles to correct for design parameters such as chief ray angle variation or angular dependent color variation that may arise from the use of wavelength-selective filtering, such as shown in FIG. 314. As an additional consideration, although a desired configuration of a metalens may be a square shape with sharp edges, as shown in FIG. 327, due to practicalities of actual manufacturing processes, the corners may be rounded. An example of a buried optical element 10730 with rounded corners is shown in FIG. 330. In this case, a boundary 10735 may not exactly match the boundary of the photosensitive region of the detector pixel, but the overall effect on electromagnetic energy incident thereon is substantially equivalent to that of buried optical element 10690.

FIG. 331 shows a cross-section of a detector pixel 10740 similar to that of FIG. 307 with additional features for effective chief ray angle correction and filtering. In addition to or in combination with elements previously discussed in relation to FIG. 307, detector pixel 10740 may include a chief ray angle corrector (CRAC) 10745, a filtering layer group 10750 and a filtering layer group 10755. Chief ray angle corrector 10745 may be used to correct for an incident angle of a chief ray 10760 of incident electromagnetic energy. If not corrected for its non-normal incidence with respect to an entrance surface of photosensitive region 10002, chief ray 10760 and associated rays (not shown) will not enter photosensitive region 10002 and will not be detected. The non-normal incidence of chief ray 10760 and associated rays also alters the wavelength-dependent filtering of filtering layer groups 10750 and 10755. As is commonly known in the art, non-normal incident electromagnetic energy causes "blue shifting" (i.e., a reduction of the center operation wavelength of the filter) and may cause the filter to become sensitive to the polarization state of incident electromagnetic energy. The addition of chief ray angle corrector 10745 may mitigate these effects.

Filter layer group 10750 or 10755 may be a red-green-blue (RGB) type of color filter as shown in FIG. 339 or may be a cyan-magenta-yellow (CMY) filter as shown in FIG. 340. Alternatively, filter layer group 10750 or 10755 may include an IR-cut filter with transmission performance as shown in FIG. 338. Filter layer group 10755 may also include an anti-reflection coating filter as discussed below in relation to FIG. 337. Filter layer groups 10750 and 10755 may combine the effects and features of one or more of the previously noted types of filters into a multifunction filter such as, for example, IR-cut and RGB color filtering. Filter layer groups 10750 and 10755 may be jointly optimized with regard to their filtering functions with respect to any or all other electromagnetic energy directing, filtering, or detecting elements in the detector pixel. Layer group 10755 may include a buffer or stop layer that assists in isolation of photosensitive region 10002 from electron, hole and/or ionic donor migration. A buffer layer may be positioned at interface 10770 between layer group 10755 and photosensitive region 10002.

When a thin film wavelength-selective filter such as layer group 10750 is superimposed by a subwavelength CRAC 10745, the CRAC modifies the CRA of an input beam, generally making it closer to normal incidence. In this case, the thin film filter (layer group 10750) may be nearly the same for every detector pixel (or every detector pixel of the same color, in the case when the thin film filter is used as a color-selective filter), and only the CRAC changes spatially across an array of detector pixels. Correcting CRA variation in this way presents the advantages of 1) improving the detector pixel sensitivity, because the detected electromagnetic energy travels towards the photosensitive region 10002 at an angle closer to normal incidence and, therefore, less of it is blocked by the conductive metal layers 10008, and 2) the detector pixel becomes less sensitive to the polarization state of the electromagnetic energy because the angle of incidence of the electromagnetic energy is closer to normal.

Alternatively, CRA variations in the wavelength-dependent filtering of filtering layer groups 10750 and 10755 may be mitigated by spatially varying the color correction based on the color filter response for each detector pixel. Lim, et al. in "Spatially Varying Color Correction Matrices for Reduced Noise" from the Imaging Systems Laboratory at HP Laboratories detail an application of spatially varying correction matrices to permit color correction based upon a variety of factors. The spatially varying CRA leads to a spatially varying color mixing. Since this spatially varying color mixing may be static for any one detector pixel, a static color correction matrix designed for that detector pixel may be applied using spatially coordinated signal processing.

Figure 332:
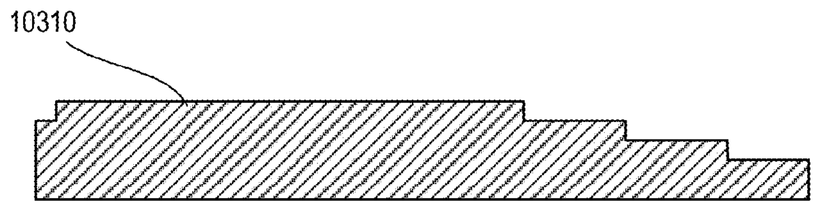
Figure 333:
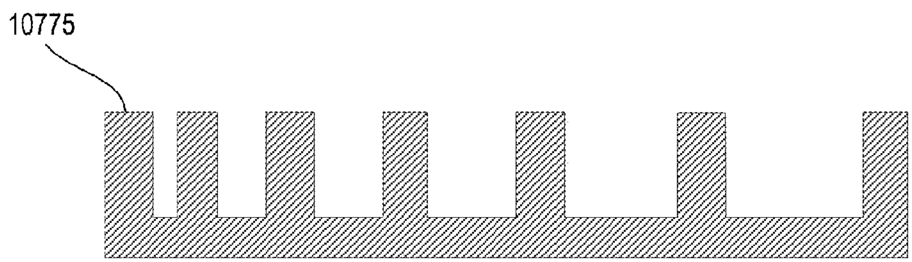
Figure 334:
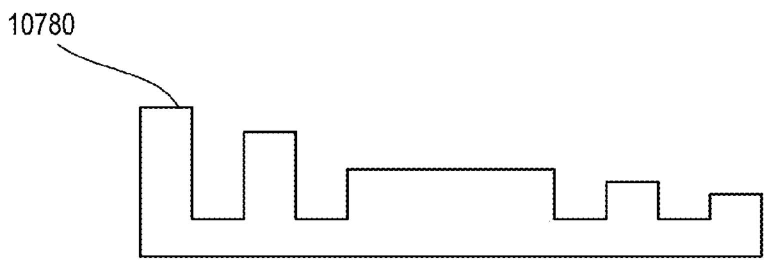
Figure 335:
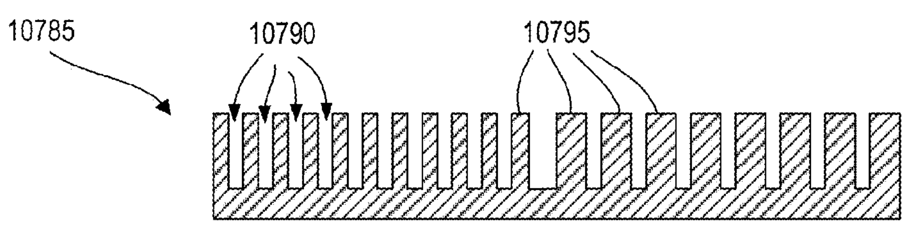

FIGS. 332-335 show a plurality of different optical elements that may be used as CRACs. Optical element 10310 of FIG. 332 is an offset or asymmetric diffractive type of optical element from FIG. 313. An optical element 10775 of FIG. 333 is a subwavelength, chirped grating structure that, because of its spatially varying pitch, may provide angle-of-incidence-dependent chief ray angle correction. An optical element 10780 combines some features of optical elements 10310 and 10775 into a complex element that may provide a combination of diffractive and refractive effects for wavelengths and angles of interest. CRA corrector 10780 of FIG. 334 may be described as a combination of a subwavelength optical element with a prism; the prism results from a spatially-varying height of subwavelength pillars, and it performs CRA correction by presenting a tilted effective index that modifies a direction of propagation of incoming electromagnetic energy according to Snell's Law. Analogously, the subwavelength optical element 10780 is formed by an effective index profile that causes incoming electromagnetic energy to focus towards the photosensitive region of a pixel. In FIG. 335, a buried optical element 10785 that may be constructed to modify the optical index of a layer or layers is shown. Buried optical element 10785 may be designed into detector pixel 10740 shown in FIG. 331 in place of or in combination with filter 10750. Buried optical element 10785 includes two types of materials 10790 and 10795 that may be integrated into a composite structure and produce a modified optical index. Material 10795 may be a material such as silicon dioxide and material 10790 may be a higher optical index material such as silicon nitride or a lower index material such as BD or a physical gap or void. Material layer 10795 may be deposited as a blanket layer then masked and etched to produce a set of sub-features that are then filled with material 10790. The Bruggeman effective medium approximation states that when two different materials are mixed the resultant dielectric function $\in_{eff}$ is defined by:

$$\varepsilon_{eff} = \frac{\varepsilon_1\varepsilon_2 + 2\varepsilon_1^2 + 2\varepsilon_1\varepsilon_2 f - 2\varepsilon_1^2 f}{\varepsilon_2 + 2\varepsilon_1 - \varepsilon_2 f + \varepsilon_1 f} \quad \text{Eq. (15)}$$

wherein $\in_1$ is the dielectric function of the first material and $\in_2$ is the dielectric function of the second material. A new effective optical index is given by the positive square root of $\in_{eff}$. Variable f is the fractional part of the mixed material that is of the second material characterized by dielectric function $\in_2$. A mixing ratio of the materials is given by the ratio (1−f/f. The use of subwavelength mixed composite material layers or structures allows for spatially varying the effective index in a given layer or structure using lithographic techniques, wherein the mixing ratio is determined by the pitch of the sub-features. The use of lithographic techniques for determining a spatially-varying effective index is very powerful because even a single lithographic mask provides enough degrees of freedom in a spatially varying plane to allow for: 1) changing wavelength selectivity (color filter response) from detector pixel to detector pixel; and 2) spatially correcting for chief ray angle variations from a center detector pixel (e.g., CRA=0°) to an edge detector pixel (e.g., CRA=25°). Moreover, this spatial variation of the effective index may be done with as little as a single lithographic mask per layer. Although discussed herein with respect to modification of a single layer, multiple layers may be simultaneously modified by etching through a series of layers followed by multiple depositions.

Turning now to FIG. 336, a cross-section 10800 of two detector pixels 10835 and 10835' that include asymmetric features that may be used for chief ray angle correction is shown. A chief ray 10820 (whose direction is represented by the orientation of an arrow and an angle 10825) incident onto detector pixel 10835 may be corrected to normal or near normal incidence by the action of chief ray angle corrector 10805 individually or in cooperation with metalens 10810. Chief ray angle corrector 10805 may be positioned asymmetrically (offset) with respect to a center normal axis 10830 of photosensitive region 10002 of detector pixel 10835. A second chief ray angle corrector 10805' associated with a detector pixel 10835' may be used to correct the direction of a chief ray 10820' (whose direction is represented by the orientation of an arrow and angle 10825'). Chief ray angle corrector 10805' may be positioned asymmetrically (offset) with respect to a center normal axis 10830' of photosensitive region 10002' of detector pixel 10835'.

The relative positions of chief ray angle corrector 10805 (10805'), metalens 10810 (10810') and metal traces 10815 (10815') to axis 10830 (10830') may independently spatially vary within an arrayed set of detector pixels. For example, for each detector pixel in an array these relative positions may have a circularly symmetric and radially varying value with respect to the center of the detector pixel array.

FIG. 337 shows a plot 10840 comparing the reflectances of uncoated and anti-reflection (AR) coated silicon photosensitive regions of a detector pixel. Plot 10840 has wavelength in nanometers as the abscissa and reflectance in percent on the ordinate. A solid line 10845 corresponds to the reflectance of an uncoated silicon photosensitive region when the electromagnetic energy enters the photosensitive region from plasma enhanced oxide (PEOX). A dotted line 10850 corresponds to the reflectance of a silicon photosensitive region improved by the addition of an anti-refection coating layer group as shown by layer group 10755 in FIG. 331. Design information for the filter represented by line 10850 is detailed in TABLE 53. Low reflectance from a photosensitive region allows more electromagnetic energy to be detected by that photosensitive region thereby increasing the sensitivity of the detector pixel that is associated with that photosensitive region.

TABLE 53 shows layer design information for an AR coating in accordance with the present disclosure. TABLE 53 includes the layer number, the layer material, the material refractive index, the material extinction coefficient, the layer full wave optical thickness (FWOT), and the layer physical thickness. These values are for the design wavelength range of 400-900 nm. Although TABLE 53 describes specific materials used in six layers, greater or fewer numbers of layers may be used and materials may be substituted, for example, BLACK DIAMOND® may be substituted for PEOX and the thicknesses changed accordingly.

TABLE 53

| Layer | Material | Refractive Index | Extinction Coefficient | Optical Thickness (FWOT) | Physical Thickness (nm) | Lock | Minimum Physical Thickness |
|---|---|---|---|---|---|---|---|
| Medium | PEOX | 1.45450 | 0 | | | | |
| 1 | PESiN | 1.94870 | 0.00502 | 0.04944401 | 13.96 | No | 0.00 |
| 2 | PEOX | 1.45450 | 0 | 0.54392188 | 205.68 | No | 0.00 |
| 3 | PESiN | 1.94870 | 0.00502 | 0.47372846 | 133.70 | No | 0.00 |
| 4 | PEOX | 1.45450 | 0 | 0.20914491 | 79.09 | No | 0.00 |
| 5 | PESiN | 1.94870 | 0.00502 | 0.19365435 | 54.66 | No | 0.00 |
| 6 | PEOX | 1.45450 | 0 | 0.02644970 | 10.00 | Yes | 10.00 |
| Common base | Si (crystal) | 4.03555 | 0.1 | | | | |
| | | | | 1.49634331 | 497.08 | | |

FIG. 338 shows a plot of transmission characteristics of an IR-cut filter designed in accordance with the present disclosure. A plot 10855 has wavelength in nanometers as the abscissa and transmission in percent on the ordinate. A solid line 10860 shows results of a numerical simulation of the filter design information shown in TABLE 54. Line 10860 shows the desired result of high transmission from 400-700 nm and low transmission from 700-1100 nm. IR-cut designs may be limited to wavelengths below 1100 nm due to a low response of silicon-based photodetectors at longer wavelengths. A white (i.e., gray-scale) detector pixel may be produced by using the IR-cut filter alone without an RGB or CMY color filter. A gray-scale detector pixel may be combined with RGB or CMY color filtered detector pixels to create red-green-blue-white ("RGBW") or cyan-magenta-yellow-white ("CMYW") systems.

TABLE 54 shows the layer design information for an IR-cut filter in accordance with the present disclosure. TABLE 54 includes the layer number, the layer material, the material refractive index, the material extinction coefficient, the layer full wave optical thickness (FWOT), and the layer physical thickness. An IR-cut filter may be incorporated into a detector pixel such as that shown in FIG. 331 as layer group 10750.

TABLE 54

| Layer | Material | Refractive Index | Extinction Coefficient | Optical Thickness (FWOT) | Physical Thickness (nm) |
|---|---|---|---|---|---|
| Medium | Air | 1.00000 | 0 | | |
| 1 | BD | 1.40885 | 0.00023 | 0.15955076 | 62.29 |
| 2 | SiC | 1.93050 | 0.00025 | 0.32929623 | 93.82 |
| 3 | BD | 1.40885 | 0.00023 | 0.37906600 | 147.98 |
| 4 | SiC | 1.93050 | 0.00025 | 0.34953615 | 99.58 |
| 5 | BD | 1.40885 | 0.00023 | 0.34142968 | 133.29 |
| 6 | SiC | 1.93050 | 0.00025 | 0.35500331 | 101.14 |
| 7 | BD | 1.40885 | 0.00023 | 0.35788610 | 139.71 |
| 8 | SiC | 1.93050 | 0.00025 | 0.35536138 | 101.24 |
| 9 | BD | 1.40885 | 0.00023 | 0.36320577 | 141.79 |
| 10 | SiC | 1.93050 | 0.00025 | 0.36007781 | 102.59 |
| 11 | BD | 1.40885 | 0.00023 | 0.35506681 | 138.61 |
| 12 | SiC | 1.93050 | 0.00025 | 0.34443494 | 98.13 |
| 13 | BD | 1.40885 | 0.00023 | 0.34401518 | 134.30 |
| 14 | SiC | 1.93050 | 0.00025 | 0.35107128 | 100.02 |
| 15 | BD | 1.40885 | 0.00023 | 0.35557636 | 138.81 |
| 16 | SiC | 1.93050 | 0.00025 | 0.40616019 | 115.72 |
| 17 | BD | 1.40885 | 0.00023 | 0.48739873 | 190.28 |
| 18 | SiC | 1.93050 | 0.00025 | 0.07396945 | 21.07 |
| 19 | BD | 1.40885 | 0.00023 | 0.03382620 | 13.21 |
| 20 | SiC | 1.93050 | 0.00025 | 0.39837959 | 113.50 |
| 21 | BD | 1.40885 | 0.00023 | 0.42542942 | 166.08 |
| 22 | SiC | 1.93050 | 0.00025 | 0.37320789 | 106.33 |
| 23 | BD | 1.40885 | 0.00023 | 0.40488690 | 158.06 |
| 24 | SiC | 1.93050 | 0.00025 | 0.45969232 | 130.97 |

TABLE 54-continued

| Layer | Material | Refractive Index | Extinction Coefficient | Optical Thickness (FWOT) | Physical Thickness (nm) |
|---|---|---|---|---|---|
| 25 | BD | 1.40885 | 0.00023 | 0.49936328 | 194.95 |
| 26 | SiC | 1.93050 | 0.00025 | 0.42641059 | 121.48 |
| 27 | BD | 1.40885 | 0.00023 | 0.41200720 | 160.84 |
| 28 | SiC | 1.93050 | 0.00025 | 0.42563653 | 121.26 |

TABLE 54-continued

| Layer | Material | Refractive Index | Extinction Coefficient | Optical Thickness (FWOT) | Physical Thickness (nm) |
|---|---|---|---|---|---|
| 29 | BD | 1.40885 | 0.00023 | 0.47972623 | 187.28 |
| 30 | SiC | 1.93050 | 0.00025 | 0.47195352 | 134.46 |
| 31 | BD | 1.40885 | 0.00023 | 0.43059570 | 168.10 |
| 32 | SiC | 1.93050 | 0.00025 | 0.42911097 | 122.25 |
| 33 | BD | 1.40885 | 0.00023 | 0.46369294 | 181.02 |
| 34 | SiC | 1.93050 | 0.00025 | 0.48956915 | 139.48 |
| 35 | BD | 1.40885 | 0.00023 | 0.46739998 | 182.47 |
| 36 | SiC | 1.93050 | 0.00025 | 0.44564062 | 126.96 |
| Common base | BD | 1.40885 | 0.00023 | | |
| | | | | 13.60463515 | 4589.08 |

FIG. 339 shows a plot 10865 of transmission characteristics of a red-green-blue (RGB) color filter designed in accordance with the present disclosure. In plot 10865, solid lines represent the filter performance at normal incidence (i.e., 0° incident angle) and dotted lines represent filter performance (assuming mean polarization) at an incidence angle of 25°. Lines 10890 and 10895 show the transmission of a blue-wavelength selective filter. Lines 10880 and 10885 show the transmission of a green-wavelength selective filter. Lines 10870 and 10875 show the transmission of a red-wavelength selective filter. An RGB filter such as that represented by plot 10865 (or a CMY filter as discussed below) may be optimized to have minimum dependence upon chief ray angle of incidence variation. This optimization may be accomplished by, for instance, iterating and optimizing a filter design that uses an angle of incidence value that is intermediate to the limits for the chief ray angle variation. For example, if the chief ray angle varies from 0 to 20° an initial design angle of 10° may be used. In a manner similar to chief ray angle corrector 10805 discussed above in relation to FIG. 336, an RGB filter (such as represented by plot 10865 and shown as layer group 10750 in FIG. 331) may be asymmetrically positioned with respect to an associated photosensitive region.

TABLES 55-57 show layer design information for an RGB filter in accordance with the present disclosure. TABLES 55-57 include the layer number, the layer material, the material refractive index, the material extinction coefficient, the layer full wave optical thickness (FWOT), and the layer physical thickness. The individual red (TABLE 56), green (TABLE 55) and blue (TABLE 57) color filters may be jointly designed and optimized to provide for efficient and cost-effective manufacturing by limiting the number of uncommon layers. For example in TABLE 55 layers 1-5 are the layers that may be specifically optimized for a green color filter. These layers are denoted in the "Lock" column of TABLE 55 by a "No" designation. During the design and optimization process, these layers are permitted to vary in thickness. Layers 6-19 are layers that may be common to all three individual filters of the RGB filter. These layers are denoted in the "Lock" column of TABLE 55 by a "Yes" designation. In this example, layer 19 represents a 10 nm buffer or isolation layer of PEOX. Layers 14-18 of TABLE 55 represent common layers that are used as an AR coating for the photosensitive region of the detector pixel.

TABLE 55

| Layer | Material | Refractive Index | Extinction Coefficient | Optical Thickness (FWOT) | Physical Thickness (nm) | Lock | Minimum Physical Thickness |
|---|---|---|---|---|---|---|---|
| Medium | Air | 1.00000 | 0.00000 | | | | |
| 1 | BD | 1.40885 | 0.00023 | 0.74842968 | 292.18 | No | 0.00 |
| 2 | PESiN | 1.94870 | 0.00502 | 0.20512538 | 57.89 | No | 0.00 |
| 3 | BD | 1.40885 | 0.00023 | 0.22456184 | 87.67 | No | 0.00 |
| 4 | PESiN | 1.94870 | 0.00502 | 0.20988185 | 59.24 | No | 0.00 |
| 5 | BD | 1.40885 | 0.00023 | 0.52762161 | 205.98 | No | 0.00 |
| 6 | PESiN | 1.94870 | 0.00502 | 0.21796433 | 61.52 | Yes | 0.00 |
| 7 | BD | 1.40885 | 0.00023 | 0.22733524 | 88.75 | Yes | 0.00 |
| 8 | PESiN | 1.94870 | 0.00502 | 0.22283590 | 62.89 | Yes | 0.00 |
| 9 | BD | 1.40885 | 0.00023 | 0.22522496 | 87.93 | Yes | 0.00 |
| 10 | PESiN | 1.94870 | 0.00502 | 0.40188690 | 113.43 | Yes | 0.00 |
| 11 | BD | 1.40885 | 0.00023 | 0.34653670 | 135.28 | Yes | 0.00 |
| 12 | PESiN | 1.94870 | 0.00502 | 0.42388198 | 119.64 | Yes | 0.00 |
| 13 | PEOX | 1.45450 | 0.00000 | 7.91486037 | 2992.90 | Yes | 0.00 |
| 14 | PESiN | 1.94870 | 0.00502 | 0.04985349 | 14.07 | Yes | 0.00 |
| 15 | PEOX | 1.45450 | 0.00000 | 0.55014658 | 208.03 | Yes | 0.00 |
| 16 | PESiN | 1.94870 | 0.00502 | 0.47678155 | 134.57 | Yes | 0.00 |
| 17 | PEOX | 1.45450 | 0.00000 | 0.21139733 | 79.94 | Yes | 0.00 |
| 18 | PESiN | 1.94870 | 0.00502 | 0.19542167 | 55.16 | Yes | 0.00 |
| 19 | PEOX | 1.45450 | 0.00000 | 0.02644970 | 10.00 | Yes | 10.00 |
| Common base | Si (crystal) | 4.03555 | 0.10000 | | | | |
| | | | | 13.40619706 | 4867.05 | | |

TABLE 56

| Layer | Material | Refractive Index | Extinction Coefficient | Optical Thickness (FWOT) | Physical Thickness (nm) | Lock | Minimum Physical Thickness |
|---|---|---|---|---|---|---|---|
| Medium | Air | 1.00000 | 0.00000 | | | | |
| 1 | BD | 1.40885 | 0.00023 | 0.00724416 | 2.83 | No | 0.00 |
| 2 | PESiN | 1.94870 | 0.00502 | 0.20071884 | 56.65 | No | 0.00 |
| 3 | BD | 1.40885 | 0.00023 | 0.22509108 | 87.87 | No | 0.00 |

TABLE 56-continued

| Layer | Material | Refractive Index | Extinction Coefficient | Optical Thickness (FWOT) | Physical Thickness (nm) | Lock | Minimum Physical Thickness |
|---|---|---|---|---|---|---|---|
| 4 | PESiN | 1.94870 | 0.00502 | 0.21322830 | 60.18 | No | 0.00 |
| 5 | BD | 1.40885 | 0.00023 | 0.20495078 | 80.01 | No | 0.00 |
| 6 | PESiN | 1.94870 | 0.00502 | 0.21796433 | 61.52 | Yes | 0.00 |
| 7 | BD | 1.40885 | 0.00023 | 0.22733524 | 88.75 | Yes | 0.00 |
| 8 | PESiN | 1.94870 | 0.00502 | 0.22283590 | 62.89 | Yes | 0.00 |
| 9 | BD | 1.40885 | 0.00023 | 0.22522496 | 87.93 | Yes | 0.00 |
| 10 | PESiN | 1.94870 | 0.00502 | 0.40188690 | 113.43 | Yes | 0.00 |
| 11 | BD | 1.40885 | 0.00023 | 0.34653670 | 135.28 | Yes | 0.00 |
| 12 | PESiN | 1.94870 | 0.00502 | 0.42388198 | 119.64 | Yes | 0.00 |
| 13 | PEOX | 1.45450 | 0.00000 | 7.91486037 | 2992.90 | Yes | 0.00 |
| 14 | PESiN | 1.94870 | 0.00502 | 0.04985349 | 14.07 | Yes | 0.00 |
| 15 | PEOX | 1.45450 | 0.00000 | 0.55014658 | 208.03 | Yes | 000 |
| 16 | PESiN | 1.94870 | 0.00502 | 0.47678155 | 134.57 | Yes | 0.00 |
| 17 | PEOX | 1.45450 | 0.00000 | 0.21139733 | 79.94 | Yes | 0.00 |
| 18 | PESiN | 1.94870 | 0.00502 | 0.19542167 | 55.16 | Yes | 0.00 |
| 19 | PEOX | 1.45450 | 0.00000 | 0.02644970 | 10.00 | Yes | 10.00 |
| Common base | Si (crystal) | 4.03555 | 0.10000 | | | | |
| | | | | 12.34180987 | 4451.64 | | |

TABLE 57

| Layer | Material | Refractive Index | Extinction Coefficient | Optical Thickness (FWOT) | Physical Thickness (nm) | Lock | Minimum Physical Thickness |
|---|---|---|---|---|---|---|---|
| Medium | Air | 1.00000 | 0.00000 | | | | |
| 1 | BD | 1.40885 | 0.00023 | 0.00541313 | 2.11 | No | 0.00 |
| 2 | PESiN | 1.94870 | 0.00502 | 0.27924960 | 78.82 | No | 0.00 |
| 3 | BD | 1.40885 | 0.00023 | 0.24751375 | 96.63 | No | 0.00 |
| 4 | PESiN | 1.94870 | 0.00502 | 0.08224837 | 23.21 | No | 0.00 |
| 5 | PESiN | 1.94870 | 0.00502 | 0.21796433 | 61.52 | Yes | 0.00 |
| 6 | BD | 1.40885 | 0.00023 | 0.22733524 | 88.75 | Yes | 0.00 |
| 7 | PESiN | 1.94870 | 0.00502 | 0.22283590 | 62.89 | Yes | 0.00 |
| 8 | BD | 1.40885 | 0.00023 | 0.22522496 | 87.93 | Yes | 0.00 |
| 9 | PESiN | 1.94870 | 0.00502 | 0.40188690 | 113.43 | Yes | 0.00 |
| 10 | BD | 1.40885 | 0.00023 | 0.34653670 | 135.28 | Yes | 0.00 |
| 11 | PESiN | 1.94870 | 0.00502 | 0.42388198 | 119.64 | Yes | 0.00 |
| 12 | PEOX | 1.45450 | 0.00000 | 7.91486037 | 2992.90 | Yes | 0.00 |
| 13 | PESiN | 1.94870 | 0.00502 | 0.04985349 | 14.07 | Yes | 0.00 |
| 14 | PEOX | 1.45450 | 0.00000 | 0.55014658 | 208.03 | Yes | 0.00 |
| 15 | PESiN | 1.94870 | 0.00502 | 0.47678155 | 134.57 | Yes | 0.00 |
| 16 | PEOX | 1.45450 | 0.00000 | 0.21139733 | 79.94 | Yes | 0.00 |
| 17 | PESiN | 1.94870 | 0.00502 | 0.19542167 | 55.16 | Yes | 0.00 |
| 18 | PEOX | 1.45450 | 0.00000 | 0.02644970 | 10.00 | Yes | 10.00 |
| Common base | Si (crystal) | 4.03555 | 0.10000 | | | | |
| | | | | 12.10500155 | 4364.87 | | |

FIG. 340 shows a plot 10900 of the reflectance characteristics of a cyan-magenta-yellow (CMY) color filter designed in accordance with the present disclosure. Plot 10900 has wavelength in nanometers as the abscissa and reflectance in percent on the ordinate. A solid line 10905 represents the reflectance characteristics of a filter designed for yellow wavelengths. A dashed line 10910 represents the reflectance characteristics of a filter designed for magenta wavelengths. A dotted line 10915 represents the reflectance characteristics of a filter designed for cyan wavelengths. TABLES 58-60 show layer design information for a CMY filter in accordance with the present disclosure. TABLES 58-60 include the layer number, the layer material, the material refractive index, the material extinction coefficient, the layer full wave optical thickness (FWOT), and the layer physical thickness. The individual cyan (TABLE 58), magenta (TABLE 59) and yellow (TABLE 60) color filters may be jointly designed and optimized to provide for efficient and cost-effective manufacturing by limiting the number of uncommon layers.

TABLE 58

| Layer | Material | Refractive Index | Extinction Coefficient | Optical Thickness (FWOT) | Lock |
|---|---|---|---|---|---|
| Medium | Air | 1.00000 | 0.00000 | | |
| 1 | PESiN | 1.94870 | 0.00502 | 0.36868504 | No |
| 2 | BD | 1.40885 | 0.00023 | 0.27238572 | No |
| 3 | PESiN | 1.94870 | 0.00502 | 0.29881664 | No |
| 4 | BD | 1.40885 | 0.00023 | 0.33657477 | No |
| 5 | PESiN | 1.94870 | 0.00502 | 0.24127519 | No |
| 6 | BD | 1.40885 | 0.00023 | 0.34909899 | No |
| 7 | PESiN | 1.94870 | 0.00502 | 0.27084130 | No |

TABLE 58-continued

| Layer | Material | Refractive Index | Extinction Coefficient | Optical Thickness (FWOT) | Lock |
|---|---|---|---|---|---|
| 8 | BD | 1.40885 | 0.00023 | 0.31788644 | No |
| 9 | PESiN | 1.94870 | 0.00502 | 0.34908992 | No |
| Common base | PEOX | 1.45450 | 0.00000 | | |
| | | | | 2.80465401 | |

TABLE 59

| Layer | Material | Refractive Index | Extinction Coefficient | Optical Thickness (FWOT) | Lock |
|---|---|---|---|---|---|
| Medium | Air | 1.00000 | 0.00000 | | |
| 1 | PESiN | 1.94870 | 0.00502 | 0.68763199 | No |
| 2 | BD | 1.40885 | 0.00023 | 0.30382166 | No |
| 3 | PESiN | 1.94870 | 0.00502 | 0.16574009 | No |
| 4 | BD | 1.40885 | 0.00023 | 0.32146259 | No |
| 5 | PESiN | 1.94870 | 0.00502 | 0.22127414 | No |
| 6 | BD | 1.40885 | 0.00023 | 0.70844036 | No |
| 7 | PESiN | 1.94870 | 0.00502 | 0.22350715 | No |
| 8 | BD | 1.40885 | 0.00023 | 0.32083548 | No |
| 9 | PESiN | 1.94870 | 0.00502 | 0.67496963 | No |
| Common base | PEOX | 1.45450 | 0.00000 | | |
| | | | | 3.62768309 | |

TABLE 60

| Layer | Material | Refractive Index | Extinction Coefficient | Optical Thickness (FWOT) | Lock |
|---|---|---|---|---|---|
| Medium | Air | 1.00000 | 0.00000 | | |
| 1 | PESiN | 1.94870 | 0.00502 | 0.10950665 | No |
| 2 | BD | 1.40885 | 0.00023 | 0.19960789 | No |
| 3 | PESiN | 1.94870 | 0.00502 | 0.18728215 | No |
| 4 | BD | 1.40885 | 0.00023 | 0.22017928 | No |
| 5 | PESiN | 1.94870 | 0.00502 | 0.18424423 | No |
| 6 | BD | 1.40885 | 0.00023 | 0.20640656 | No |
| 7 | PESiN | 1.94870 | 0.00502 | 0.15680853 | No |
| 8 | BD | 1.40885 | 0.00023 | 0.18277888 | No |
| 9 | PESiN | 1.94870 | 0.00502 | 0.16546678 | No |
| Common base | PEOX | 1.45450 | 0.00000 | | |
| | | | | 1.61228094 | |

FIG. 341 shows a cross-section 10920 of two detector pixels 10935 and 10935' that have features allowing for customization of a layer optical index. Detector pixel 10935 (10935') includes a layer that has its optical index modified 10930 (10930') and a layer that assists in modification 10925 (10925'). Layers 10930 and 10930' may include one or more layers of any of the previously discussed filters or buried optical elements. Layers 10925 and 10925' may include single or multiple layers of materials such as, but not limited to, photoresist (PR) and silicon dioxide. Layers 10925 and 10925' may become part of a final structure of a detector pixel, or they may be removed after modifications are made to layers 10930 and 10930'. Layers 10925 and 10925' may provide for the same or different modifications to layers 10930 and 10930' respectively. In one example, layers 10925 and 10925' may be formed from photoresist. Layers 10930 and 10930' are made from silicon dioxide or PEOX. Layers 10930 and 10930' may be modified by subjecting a wafer that includes detector pixels 10935 and 10935' to an ion implantation process. As is known in the art, ion implantation is a semiconductor manufacturing process wherein ions, such as, but not limited to, nitrogen, boron, and phosphorous, are implanted into a material under specific energy, ionic charge, and dose conditions. Ions from the process pass through and may be partially blocked and slowed by layers 10925 and 10925'.

Variations in thickness, density or material composition of layers 10925 and 10925' may result in variation of the amount and depth of ion implantation into layers 10930 and 10930'. Varied implantation results in changes to an optical index of a modified material layer. For example implantation of nitrogen into layers 10930 and 10930' made of silicon dioxide results in the silicon dioxide ($SiO_2$) being converted to silicon oxynitride ($SiO_xN_y$). In the example shown in FIG. 341, when layer 10925' is thinner than layer 10925, an optical index of layer 10930' will be modified more than an optical index of layer 10930. Depending upon the amount of implanted nitrogen, the optical index may be increased. In some cases, increases in optical index of 8% or more (from ~1.45 to ~1.6) may be achieved. An ability to modify continuously and/or smoothly the index of layers such as 10930 and 10930' permit the filters previously discussed to be fabricated according to rugate designs rather than lamellar designs. Rugate filter designs have a continuously varying optical index rather than discrete changes in materials. Rugate designs may be more cost effective to manufacture and may provide improved filter designs.

FIGS. 342-344 show a series of cross-sections related to semiconductor processing steps that yield a non-planar (tapered) surface that may be incorporated as part of optical elements. In prior art current semiconductor fabricating processes, these types of non-planar features are seen as problems; however, in association with optical element designs in accordance with the present disclosure, these non-planar features may be used advantageously to produce desired elements. As shown in FIG. 342, an initial layer 10860 is formed with a planar upper surface 10940. Initial layer 10860 is lithographically masked and etched to be reshaped as a modified layer 10955 including an etched area 10950, as shown in FIG. 343. Etched area 10950 is then at least partially filled by the deposition of a non-planarizing, conformal material layer 10960, as shown in FIG. 344. Initial layer 10860, modified layer 10955 and conformal material layer 10960 may be made of the same or different materials. Although the described example shows a symmetric tapered feature, additional masking, etching, and deposition steps may be used to create non-symmetric, sloped and other generalized tapered or non-planar features using known semiconductor material processing methods. A non-planar feature such as described above may be used to create chief ray angle correctors. Filters with specialized wavelength-dependencies may be formed of or on top of these non-planar features.

FIG. 345 shows a block diagram 10965 illustrating an optimization method that may use a given parameter, such as a merit function, in order to optimize the design of buried optical elements in accordance with the present disclosure. FIG. 345 is substantially identical to FIG. 1 of co-pending and co-owned U.S. patent application Ser. No. 11/000,819 of E. R. Dowski, Jr., et al., and is shown here to illustrate an approach to optical and digital system design optimization as adapted for buried optical element design. Design optimizing system 10970 may be used to optimize an optical system design 10975. By way of example, optical system design 10975 may be an initial definition of a buried optical element in relation to a detector pixel design, such as those shown in FIGS. 295-307, 313-314, 318-338 and 341.

Continuing to refer to FIG. 345, optical system design 10975 and user defined goals 10980 are fed into design optimizing system 10970. Design optimizing system 10970 includes an optical system model 10985 for providing a computational model in accordance with optical system design 10975 and other inputs provided therein. Optical system model 10985 produces first data 10990 that are fed into an analyzer 10995 within design optimizing system 10970. First data 10990 may include, for example, descriptions of optical elements, materials and related geometries of various components of optical system design 10975, and calculated results such as a matrix of energy densities of an electromagnetic field within a previously defined volume, such as a detector pixel. Analyzer 10995 uses first data 10990, for instance, to evaluate one or more metrics 11000 to generate second data 11005. One example of metrics is a merit function calculation comparing the coupling of electromagnetic energy into a photosensitive region relative to a pre-specified value. Second data 11005 may include, for example, a percentage coupling value or a score characterizing the performance of optical system design 10975 relative to the merit function.

Second data 11005 is fed into an optimizing module 11010 within design optimizing system 10970. Optimizing module 11010 compares second data 11005 to goals 11015, which may include user defined goals 10980, and provides a third data 11020 back to optical system model 10985. For example, if optimizing module 11010 concludes that second data 11005 does not meet goals 11015, third data 11020 prompts refinements of optical system model 10985; that is, third data 11020 may prompt adjustment of certain parameters of optical system model 10985 to result in alteration of first data 10990 and second data 11005. Design optimizing system 10970 evaluates a modified optical system model 10985 to generate new second data 11005. Design optimizing system 10970 continues to modify optical system model 10985 iteratively until goals 11015 are met, at which point design optimizing system 10970 generates an optimized optical system design 11025 that is based on optical system design 10975 as modified in accordance with third data 11020 from optimizing module 11010. One of goals 11015 may be, for example, to achieve a certain coupling value of incident electromagnetic energy into a given optical system. Design optimizing system 10970 may also generate a predicted performance 11030 that, for example, summarizes calculated performance capabilities of optimized optical system design 11025.

FIG. 346 is a flowchart showing an exemplary optimizing process 11035 for performing a system-wide joint optimization. Optimizing process 11035 considers a trade space 11040, taking into account a variety of factors including, in the example shown, object data 11045, electromagnetic energy propagation data 11050, optics data 11055, detector data 11060, signal processing data 11065 and output data 11070. Design restrictions on the variety of factors considered within trade space 11040 are jointly considered as a whole such that tradeoffs may be imposed on the variety of factors in a plurality of feedback routes 11075 to optimize the design of the system as a whole.

For example, in a detector system including buried optical elements described earlier, field angle and f/# of a particular set of imaging optics (contributing to optics data 11055) may be taken into account in designing CRAC and color filters (contributing to detector data 11060) for use with that particular set of imaging optics and, furthermore, processing of information obtained at a detector (contributing to signal processing data 11065) may be modified to complement a resulting combination of imaging optics and detector designs. Other aspects of design, such as electromagnetic energy propagation from an object through optics, may be taken into account as well. For instance, a requirement of a wide field of interest (contributing to object data 11045) and a low f/# (part of optics data 11055) lead to a need to handle incident electromagnetic energy rays with high incident angles. Consequently, optimizing process 11035 may require configuration of a CRAC to be matched to a worst case or a probabilistic distribution of incident electromagnetic energy. In other cases, some imaging systems may contain optics (contributing to optics data 11055) that purposefully distort or "remap" field points (such as classic fish-eye lenses or 360-degree panoramic lenses) so as to present unique CRAC requirements. A CRAC (and corresponding detector data 11060) for such distorted systems may be designed in conjunction with an expected remapping function corresponding to distortion represented by optics data 11055. Additionally, electromagnetic energy of different wavelengths may be distorted differently by the optics, thereby adding a wavelength-dependent component to optics data 11055. Hence color filters and CRAC or energy guiding features of the detector (part of detector data 11060) may be taken into account within trade space 11040 to account for various system characteristics pertaining to wavelength. Color filters and CRACs and energy guiding features may be combined in pixel designs (and, therefore, detector data 11060) based on the available processing (i.e., signal processing data 11065) of the sampled imagery. For instance, signal processing data 11065 may include color correction that varies spatially. Spatially varying processing including color correction and distortion correction (part of signal processing data 11065), design of the imaging optics (part of optics data 11055), and intensity and CRA variation (part of electromagnetic energy propagation data 11050) may all be jointly optimized within trade space 11040 of optimizing process 11035 so as to yield an optimized design 11080.

FIG. 347 shows a flowchart for a process 11085 for generating and optimizing thin film filter set designs suitable for use with a detector system including buried optical elements in accordance with the present disclosure. Since a particular filter set may include two or more distinct filters, optimization of a filter set design may require simultaneous optimization of two or more distinct filter designs. For example, red-green-blue (RGB) and cyan-magenta-yellow (CMY) filter set designs require optimization of three filter designs each, while a red-green-blue-white (RGBW) filter set design necessitates optimization of four filter designs.

Continuing to refer to FIG. 347, process 11085 starts with a preparation step 11090, wherein any necessary setup and configuration of computational systems containing process 11085 may be performed. Additionally, in step 11090, a variety of requirements 11095 may be defined to be considered during process 11085. Requirements 11095 may include, for instance, constraints 11100, performance goals 11105, merit functions 11110, optimizer data 11115 and design limitations 11120 related to one or more of the filter designs. Additionally, requirements 11095 may include one or more parameters 11125 that are allowed to be modified during process 11085. Examples of constraints 11100 that may be specified as a part of requirements 11095 include constraints imposed by the manufacturing processes on material type, material thickness range, material refractive index, number of common layers, number of processing steps, number of masking operations, and number of etching steps that may be employed in the fabrication of the final filter design. Performance goals 11105 may include, for instance, percentage goals for transmission, absorption and reflection and tolerance goals for absorption, transmission and reflection. Merit functions 11110 may include chi-squared sums, weighted chi-squared sums and sums of absolute differences. Examples of optimizer data 11115 that may be specified in requirements 11095 include simulated annealing optimization routines, simplex optimization routines, conjugate-gradients optimization routines and swarm optimization routines. Design limitations 11120 that may be specified as a part of the requirements include, for example, available manufacturing processes, allowed materials and thin film layer sequencing. Parameters 11125 may include, for instance, layer thicknesses, materials composing the various layers, layer refractive indices, layer transmissivity, optical path difference, layer optical thickness, layer count, and layer ordering.

Requirements 11095 may be defined by user input or selected automatically from a database by the computational system based upon a set of rules. In some cases, the various requirements may be interrelated. For example, while a layer thickness may be subject to a manufacturing limitation of a range of maximum and minimum thickness as well as a user-defined thickness range constraint, the layer thickness value used during the optimization process may be modified by an optimizer using a merit function to optimize a performance goal.

After step 11090, process 11085 advances to a step 11130 where unconstrained thin film filter designs 11135 are generated. Within the context of the present disclosure, an unconstrained thin film filter design is understood to be thin film filter designs that do not take into account constraints 11100 as specified in requirements 11095 but do consider at least some of design limitations 11120 defined in step 11090. For example, design limitations 11120, such as defining certain layers as silicon dioxide layers, may be included in the generation of unconstrained thin film filter design 11135, whereas the actual thickness of the layers of silicon dioxide may be left a freely variable parameter in step 11130. Unconstrained thin film filter design 11135 may be generated with the assistance of a thin film design program such as ESSENTIAL MACLEOD®. For example, a set of materials and a defined number of layers (i.e., design limitations 11120) from which to generate a thin film filter design may be specified in a thin film design program. The thin film design program then optimizes a selected parameter (i.e., from parameters 11125), such as thicknesses of the selected materials in each defined layer, such that a calculated transmission performance of a filter design approaches a previously defined performance goal for that filter design (i.e., performance goals 11105). Unconstrained thin film filter designs 11135 may have taken into account a variety of factors such as, for example, limitations associated with available materials, thin film layer sequencing (e.g., sequencing of high index and low index materials in a thin film filter) and sharing of a common number of layers among a set of thin film filters. Material selection and layer number definition operations may be iterated via feedback loop 11140 to provide alternative, unconstrained thin film filter designs. Additionally, the thin film design program may be set to independently optimize at least some of the alternative, unconstrained thin film filter designs. The term “unconstrained designs” generally refers to designs in which parameters of thin film layers, such as a thickness, a refractive index, or a transmission of the layers may be set to any value required to optimize performance of the design. Each of unconstrained designs 11135 generated in step 11130 may be represented by an ordered listing of materials and their associated thicknesses in the unconstrained design, as will be discussed in more detail at an appropriate juncture hereinafter.

Still referring to FIG. 347, in a step 11145, constrained thin film filter designs 11150 are generated by applying constraints 11100 to unconstrained thin film filter designs 11135. Constraints 11100 may be applied automatically by thin film design software or selectively specified by a user. Constraints 11100 may be applied iteratively, sequentially or randomly such that progressively constrained designs continue to meet at least a portion of requirements 11095 for the design.

Next, in a step 11155, one or more of constrained thin film filter designs 11150 are optimized to produce optimized thin film filter designs 11160 that better meet requirements 11095 in comparison to unconstrained thin film filter designs 11135 and constrained thin film filter designs 11150.

As an example, process 11085 may be used to simultaneously optimize two or more thin film filters in a variety of configurations. For instance, multiple thin film filter designs may be optimized to perform a collective function, such as color selective filtering in a CMY detector wherein different thin film filters provide filtering for the different colors. Once optimized thin film filter designs 11160 have been generated, the process ends with a step 11165. Process 11085 may be applied to the generation and optimization of thin film filter designs for a variety of functions such as, but not limited to, bandpass filtering, edge filtering, color filtering, high-pass filtering, low-pass filtering, anti-reflection, notch filtering, blocking filtering and other wavelength selective filtering.

FIG. 348 shows a block diagram of an exemplary thin film filter set design system 11170. Thin film filter set design system 11170 includes a computational system 11175, which in turn includes a processor 11180 containing software or firmware programs 11185. Programs 11185 suitable for use in thin film filter set design system 11170 may include, but are not limited to, such software tools as ZEMAX®, MATLAB®, ESSENTIAL MACLEOD® and other optical design and mathematical analysis programs. Computational system 11175 is configured to receive inputs 11190, such as requirements 11095 of process 11085, to generate outputs 11195, such as unconstrained thin film filter designs 11135, constrained thin film filter designs 11150 and optimized thin film filter designs 11160 of FIG. 347. Computational system 11175 performs operations such as, but not limited to, selecting layers, defining layer sequence, optimizing layer thicknesses and pairing layers.

FIG. 349 shows a cross-sectional illustration of a portion 11200 of an exemplary detector pixel array. Portion 11200 includes first, second and third detector pixels 11205, 11220 and 11235 (indicated by double headed arrows), respectively. First, second and third detector pixels 11205, 11220 and 11235 include first, second and third photosensitive regions 11210, 11225 and 11240, respectively, integrally formed with first, second, and third support layers 11215, 11230 and 11245, respectively. First, second and third support layers 11215, 11230 and 11245 may be formed of distinct materials or of a continuous layer of a single material. First, second and third photosensitive regions 11210, 11225 and 11240 may be formed of identical materials and dimensions or, alternatively, may each be configured for detection of a specific wavelength range. Further, first, second and third detector pixels 11205, 11220 and 11235 respectively include first, second and third thin film filters 11250, 11255 and 11260 (the layers forming each being indicated by dashed ovals), which together form a filter set 11265 (enclosed by a dashed rectangle). Each of first, second and third thin film filters 11250, 11255 and 11260 includes a plurality of layers acting as color filters for a specific wavelength range. In portion 11200, first thin film filter 11250 is configured to act as a cyan filter, second thin film filter 11255 is designed to perform as a yellow filter and third thin film filter 11260 is configured to act as a magenta filter, such that filter set 11265 acts as a CMY filter. First, second and third thin film filters 11250, 11255 and 11260, as shown in FIG. 349, are formed from 11-layer combinations of alternating high index layers (as indicated by cross-hatching) and low index layers (i.e., layers with no cross-hatching). Suitable materials for use in the low index layers are, for example, a low loss material, such as Black Diamond®, that is compatible with existing CMOS silicon processes. Similarly, the high index layers may be formed of a low loss, high index material compatible with existing CMOS silicon processes, such as SiN.

FIG. 350 shows further details of an area 11270 (indicated by a dashed rectangle) of FIG. 349. Area 11270 includes portions of first and second thin film filters 11250 and 11255 (again indicated by dashed ovals). As shown in FIG. 350, a first layer pair 11275 and a second layer pair 11276, consisting of the lowest two layers of first and second thin film filters 11250 and 11255, respectively, are common layers. That is, the pair of layers 11277 and 11289 is made of a common material with the same thickness and, similarly, the pair of layers 11278 and 11290 is formed of another common material with the same thickness. A first layer group 11279 (i.e., layers 11280-11288) and a second layer group 11300 (i.e., layers 11291-11299) may have corresponding layers with a common thickness (e.g., layers 11281 and 11292) as well as corresponding layers with differing thickness (e.g., layers 11282 and 11293) in correspondingly indexed layers. The combination of layers in each of first and second layer groups 11279 and 11300 has been optimized for cyan and yellow filtering, respectively, while first and second layer pairs 11275 and 11276 provide extra design flexibility in the optimization of the filter design as described with respect to portion 11200 of FIG. 349.

A thin film filter design may be described, for instance, by a design table, which lists materials used, ordering of the materials in the filter and thickness of each layer of the filter. A design table for an optimized thin film filter may be generated by optimizing, for instance, the ordering of the materials and the thickness of each layer in a given thin film filter. Such a design table may be generated for each of first, second and third thin film filters 11250, 11255 and 11260 of FIG. 349, for instance.

TABLE 61

| Design: Layer | Material | Cyan | Magenta | Yellow |
|---|---|---|---|---|
| | | Physical Thickness (nm) | | |
| 1 | PESiN | 230.15 | 198.97 | 164.03 |
| 2 | BD | 117.10 | 95.59 | 104.3 |
| 3 | PESiN | 106.72 | 70.55 | 26.28 |
| 4 | BD | 98.07 | 113.62 | 116.07 |
| 5 | PESiN | 104.8 | 62.19 | 34.39 |
| 6 | BD | 300.7 | 278.34 | 107.01 |
| 7 | PESiN | 93.65 | 52.85 | 24.05 |
| 8 | BD | 130.26 | 132.37 | 105.4 |
| 9 | PESiN | 104.15 | 76 | 161.66 |

TABLE 61 is a design table for an exemplary CMY filter set design, in which the designs for first, second and third thin film filters 11250, 11255 and 11260 (FIG. 349) have been individually optimized (i.e., without joint optimization between the different filters in the filter set). A simulated performance plot 11305 of the three individual filter designs is shown in FIG. 351. A dashed line 11310 represents transmission by first thin film filter 11250 acting as a cyan filter that has been individually optimized. A dotted line 11315 represents transmission by second thin film filter 11255 acting as an individually optimized, magenta filter. A solid line 11320 presents transmission by third thin film filter 11260 acting as a yellow filter that has been individually optimized. The specifics of the designs used in generating plot 11305 were derived from the information shown in TABLE 61. It may be seen in FIG. 351 that all three colors CMY produce satisfactory performance for their respective design wavelength ranges; that is, all pass bands are near 90% transmission, all stop bands are near 10% transmission and all band edges are around the wavelengths 500 nm and 600 nm.

Using thin film filter design principles known in the art, it was determined that a nine-layer thin film filter with alternating high ("H") and low ("L") refractive index layers (i.e., HLHLHLHLH) would produce a satisfactory set of CMY filters, individually satisfying requirements 11095 (FIG. 347). Other configurations for layer sequencing that utilize two or more materials in any number of layers are also possible. For example, a Fabry-Perot like structure may be formed from three different materials with a sequence such as HLHL-M-LHLH, wherein "M" is a medium index material. Selection of a number of different materials and a type of sequencing may depend upon the requirements of the filter or the experience of the designer. For the example shown in TABLE 61, suitable materials selected from an available manufacturing palette of materials are high refractive index PESiN material ($n \approx 2.0$) and low refractive index (BD) material ($n \approx 1.4$). Since each thin film filter has the same number of layers, the layers may be correspondingly indexed. For example, in TABLE 61, indexed layer 1 lists corresponding PESiN thin film layer thicknesses of 232.78, 198.97 and 162.958 nm respectively for the cyan, magenta and yellow filters.

An exemplary process for joint optimization of the different thin film filters in a given thin film filter set, and thereby the generation of the optimized design tables that meet requirements 11095 while providing specific correlations between the different thin film filters, is described in detail immediately hereinafter.

Referring to FIG. 352 in conjunction with FIGS. 347 and 349, generation of a thin film filter set design using process 11085 requires specification of a set of requirements 11095. Some specific examples of requirements 11095 for an exemplary magenta filter are discussed with reference to FIG. 352. FIG. 352 shows a plot 11325 of performance goals and tolerances for optimizing an exemplary magenta color filter, such as thin film filter 11260 of FIG. 349. A dotted curve 11330 shows a representative wavelength-dependent sensitivity for third detector pixel 11235. Sensitivity of the detector pixel may be a function of, for instance, any buried optical elements and filters (such as IR-cut filters and AR filters) incorporated into the detector pixel as well as a configuration of a photosensitive region associated therewith. Given such detector pixel sensitivity, an effective magenta filter should pass electromagnetic energy in the red and blue regions of the electromagnetic spectrum while blocking electromagnetic energy near green wavelengths. One exemplary definition of a performance goal (e.g., one of performance goals 11105, FIG. 347) is for a thin film filter to pass 90% or more of the electromagnetic energy in the wavelength bands of 400 to 490 and 610 to 700 nm (i.e., pass bands). In FIG. 352, solid lines 11335 and 11340 represent the 90% threshold transmission goal for the pass bands of the filter (e.g., in the red and blue wavelength ranges). Correspondingly, at 500 and 600 nm an exemplary performance goal may be for the filter to be 25 to 65% transmissive at the band edges. Vertical lines 11345 indicate the corresponding performance goal for the band edges in plot 11325. Finally, another performance goal may be to have a transmission of less than 10% in a stop band region (e.g., 510 to 590 nm in wavelength). A line 11350 denotes the stop band performance goal in the exemplary plot of FIG. 352.

Continuing to refer to FIGS. 349 and 352, a thin solid line 11355 denotes an idealized magenta filter response that satisfies the exemplary performance goals indicated above. Correspondingly, a merit function that may be used during optimization of a filter design to satisfy these performance goals may incorporate wavelength-dependent functions such as, but not limited to, quantum efficiency of a photosensitive region, photopic response of the human eye, tristimulus response curves and spectral dependence of the detector pixel sensitivity. Furthermore, an exemplary manufacturing constraint specified as a part of requirements 11095 may be that there must be no more than five masking operations during the fabrication of the thin film filter.

In designing a filter set using process 11085 of FIG. 347, a thin film design program such as ESSENTIAL MACLEOD® may be utilized as a tool in calculating the various thin film filter designs based on requirements 11095, such as selected materials, number of layers in each thin film filter, layer material (i.e., high and low index) ordering and initial values for each parameter. The thin film filter design program may be instructed to optimize each thin film filter by varying, for example, the thicknesses of at least some of the thin film layers. While ESSENTIAL MACLEOD® and other similar programs known in the art are proficient at optimizing single thin film filters to a single goal, it should be noted that such programs are simply calculation tools; in particular, these programs are not designed to jointly optimize multiple thin film filters to different requirements nor are they designed to accommodate complex constraints, sequential additions of constraints or layer pairings within or across designs. The present disclosure enables such joint optimization to generate correlated thin film filter set designs.

FIG. 353 is a flowchart showing further details of step 11145 of FIG. 347. As shown in FIG. 353, an exemplary sequential process for hierarchically applying constraints is discussed in the context of an exemplary CMY filter set design. Step 11145 begins with the reception of unconstrained thin film filter designs 11135 from step 11130 of FIG. 347. In a step 11365, commonality is assigned to the low index layers (i.e., the layers with no cross-hatching in FIGS. 349 and 350). That is, the thicknesses and/or material compositions of at least some of the corresponding layers (e.g., layers 11278 and 11290, layers 11281 and 11292, etc.) in the unconstrained designs are set to common values. For example, in optimizing the exemplary CMY filter set shown in FIG. 349, the material type and thicknesses of low index layers of first and second thin film filters 11250 and 11255 are set equal to the corresponding material and thickness values of corresponding layers of third thin film filter 11260 (e.g., as shown in TABLE 61). The magenta filter design is selected as a reference (i.e., the filter design to which the low index layer materials and thickness of the other filter designs will be matched) due to its complexity in comparison to the cyan and yellow filter designs. That is, as illustrated in FIG. 352, the magenta filter is designed as a notch filter with two sets of boundary conditions (one for each band edge as indicated by vertical lines 11345). In contrast, the cyan and yellow filter designs each require only one band edge, and therefore have less complicated requirements for their thin film filter structures. The magenta filter design also represents the requirements in the middle wavelengths for the filter set design and, in conforming the thin film filter sets to the magenta filter, a symmetry may be achieved in the final filter set design. This selection of the magenta filter as a reference is one example of the aforementioned hierarchical application of a constraint. In an exemplary filter set design process, the selection of the magenta filter as a reference may be applied as the highest ranked application of a constraint.

TABLE 62

| Layer | Material | Physical Thickness (nm) | | | Pair Differences (nm) CM | MY | CY |
|---|---|---|---|---|---|---|---|
| 1 | PESiN | 232.78 | 198.97 | 162.95 | 33.81 | 36.02 | 69.83 |
| 2 | BD | 95.59 | 95.59 | 95.59 | | | |
| 3 | PESiN | 103.32 | 70.55 | 28.18 | 32.77 | 42.37 | 75.14 |
| 4 | BD | 113.62 | 113.62 | 113.62 | | | |
| 5 | PESiN | 101.19 | 62.19 | 32.98 | 39 | 29.21 | 68.21 |
| 6 | BD | 278.34 | 278.34 | 278.34 | | | |
| 7 | PESiN | 96.16 | 52.85 | 28.83 | 43.31 | 24.02 | 67.33 |
| 8 | BD | 132.37 | 132.37 | 132.37 | | | |
| 9 | PESiN | 100.08 | 76 | 158.62 | 24.08 | 82.62 | 58.54 |

Continuing to refer to FIG. 353, in a step 11370, the high index layers are independently re-optimized in an attempt to better meet requirements 11095 while preserving the commonality of the low index layers. For example, all of the high index layers in first, second and third thin film filters 11250, 11255 and 11260 (FIG. 349) may be independently re-optimized in accordance with requirements 11095 (FIG. 347) associated with the respective filter designs. TABLE 62 shows the associated design thickness values for an exemplary CMY filter set design after re-optimization during step 11370 of FIG. 353. It is specifically noted that the low index layers (i.e., Black Diamond® layers 2, 4, 6 and 8) are set to common values for all three thin film filters. The simulated performance of the filter set design of TABLE 62 is shown in a plot 11400 in FIG. 354. Similar to FIG. 351, cyan filter performance is represented by a dashed line 11405, magenta filter performance is shown by a dotted line 11410, and yellow filter performance is represented by a solid line 11415. As may be seen in comparing FIG. 354 with FIG. 351, a slight decrease in performance in comparison to the individually optimized filter set is evidenced by the decrease in transmission and a rise in the stop band transmission. However, the design simulated in plot 11400 does represent a simplification in the overall filter set design due to the commonalties established for the low index layers.

Returning to FIG. 353, a pairing procedure may be performed in a step 11375 on at least some of the layers. In the example shown in FIG. 353, a pairing procedure is performed on pairs of high index layers. The pairing procedure in step 11375 includes calculation of thickness differences between the corresponding high index layer pairs of filters (e.g., the thickness differences between corresponding layers in the cyan and magenta filters are indicated under a heading labeled "CM"; the thickness differences between corresponding layers in the magenta and yellow filters are indicated in a column labeled "MY"; and the thickness differences between corresponding high index layers in the cyan and yellow filters are indicated under a heading "CY" in TABLE 62). The smallest difference is selected for each layer (e.g., the CM value 33.81 nm for layer 1 is smaller than the corresponding MY and CY values for the same layer 1). In this way, a set of thickness differences for the different high index layers is assembled (i.e., 33.81 nm for layer 1, 32.77 nm for layer 3, 29.21 nm for layer 5, 24.02 nm for layer 7 and 24.08 nm for layer 9).

From this set of selected smallest thickness differences developed in step 11375, the largest "smallest difference" pair and its associated layer are then selected (i.e., 33.81 nm for layer 1, in the example shown in TABLE 62) in a step 11380. In the present example, the selection of thickness difference value 33.81 nm for layer 1 further restricts layer 1 from the cyan and magenta filter designs to be fixed as a paired set of layers. This pairing procedure performed in steps 11375 and 11380 is another example of a hierarchically ordered procedural step. It has been determined that the pairing of the smallest differences rather than the pairing of the largest differences presents a smaller impact on the optimized performance of the filter design set.

Still referring to FIG. 353, a further independent optimization process is performed in a step 11385, to jointly optimize the thickness of the paired layers, with all other parameters fixed, according to requirements of the associated cyan and magenta filter designs. As previously described, a thickness of the paired layers may be modified by an optimizer program to produce cyan and magenta filter designs with performances that jointly and most closely match requirements 11095.

TABLE 63

| Design: Layer | Material | Cyan | Magenta | Yellow |
|---|---|---|---|---|
| | | Physical Thickness (nm) | | |
| 1 | PESiN | 214 | 214 | 162.95 |
| 2 | BD | 95.59 | 95.59 | 95.59 |
| 3 | PESiN | 106.74 | 50.17 | 28.18 |
| 4 | BD | 113.62 | 113.62 | 113.62 |
| 5 | PESiN | 101 | 75 | 32.98 |
| 6 | BD | 278.34 | 278.34 | 278.34 |
| 7 | PESiN | 96.6 | 51.33 | 28.83 |
| 8 | BD | 132.37 | 132.37 | 132.37 |
| 9 | PESiN | 96.09 | 67.96 | 158.62 |

Next, in a step 11390 the thicknesses of the remaining high index layers are optimized for each filter design to better achieve the filter design's performance goal(s), while retaining the optimized paired layer thickness determined in step 11385. TABLE 63 shows the design thickness information for the exemplary CMY filter set design following the completion of step 11390. It may be seen in TABLE 63 that the paired layer thickness for layer 1 of the cyan and magenta filter designs was determined to be 214 nm. FIG. 355 shows a plot 11420 of simulated performance of the exemplary CMY filter set design with common low index layers and a paired high index layer (e.g., layer 1 in TABLE 63) after step 11390. A dashed line 11425 represents the transmission performance of the cyan filter from TABLE 63. A dotted line 11430 represents the transmission performance of the magenta filter as specified in TABLE 63. A solid line 11435 represents the transmission performance of the yellow filter from TABLE 63. As may be seen by comparing plot 11420 with plot 11400 of FIG. 354, the performance of the cyan and yellow filters has been further altered due to the application of further constraints in step 11390 of FIG. 353.

Returning to FIG. 353, after step 11390, a decision 11395 is made as to whether there are more layers left to be paired and optimized. If the answer to decision 11395 is "YES", there are more layers to be paired, then process 11145 returns to step 11375. If the answer to decision 11395 is "NO" there are no more layers to be paired, then process 11145 generates constrained designs 11150 and proceeds to step 11155 of FIG. 347. As shown in TABLE 63, the exemplary CMY filter set design includes five triplets of corresponding high index layers. Each time that steps 11375 through 11390 are performed, one of the triplets is reduced to a set of paired layers and a singlet. That is, for example, after a first pass through steps 11375 through 11390, four layer triplets remain to be paired and optimized.

TABLE 64

| Design: Layer | Material | Cyan | Magenta | Yellow |
|---|---|---|---|---|
| | | Physical Thickness (nm) | | |
| 1 | PESiN | 214 | 214 | 160.35 |
| 2 | BD | 95.59 | 95.59 | 95.59 |
| 3 | PESiN | 106.69 | 42.94 | 42.94 |
| 4 | BD | 113.62 | 113.62 | 113.62 |
| 5 | PESiN | 90 | 90 | 22.39 |
| 6 | BD | 278.34 | 278.34 | 278.34 |
| 7 | PESiN | 100.7 | 32 | 32 |
| 8 | BD | 132.37 | 132.37 | 132.37 |
| 9 | PESiN | 95.93 | 95.93 | 158.16 |

TABLE 64 shows the design thickness information for the exemplary CMY filter set design following the completion of five pairing and optimization cycles of steps 11375 through 11390. FIG. 356 shows a plot 11440 of the transmission characteristics of the exemplary set of cyan, magenta and yellow (CMY) color filters with common low index layers and multiple paired high index layers as defined in TABLE 64. A dashed line 11445 represents the transmission performance of the cyan filter. A dotted line 11450 represents the transmission performance of the magenta filter. A solid line 11455 represents the transmission performance of the yellow filter. The performance of the cyan and yellow filters has again been altered slightly from those shown in FIGS. 354 and 355.

TABLE 65

| | | Physical thickness (Angstroms) | | | | | | |
|---|---|---|---|---|---|---|---|---|
| | | Cyan | | | Yellow | | | |
| Layer | Material | | ref # | Magenta | | ref # | Difference | Mask# |
| 1 | PESiN | 1101.4 | 11288 | 410 | 410 | 11299 | 691.4 | 5 |
| 2 | BD | 878.7 | 11287 | 878.7 | 878.7 | 11298 | | |
| 3 | PESiN | 1055.5 | 11286 | 1055.5 | 421.5 | 11297 | 634 | 4 |
| 4 | BD | 900.8 | 11285 | 900.8 | 900.8 | 11296 | | |
| 5 | PESiN | 1073.3 | 11284 | 542.7 | 542.7 | 11295 | 530.6 | 3 |
| 6 | BD | 807.6 | 11283 | 807.6 | 807.6 | 11294 | | |
| 7 | PESiN | 1135.8 | 11282 | 1135.8 | 547.5 | 11293 | 588.3 | 2 |
| 8 | BD | 694.7 | 11281 | 694.7 | 694.7 | 11292 | | |

TABLE 65-continued

| Layer | Material | Physical thickness (Angstroms) Cyan | ref # | Magenta | Yellow | ref # | Difference | Mask# |
|---|---|---|---|---|---|---|---|---|
| 9 | PESiN | 1111.2 | 11280 | 414.8 | 414.8 | 11291 | 696.4 | 1 |
| 10 | BD | 972 | 11278 | 972 | 972 | 11290 | | |
| 11 | PESiN | 948.9 | 11277 | 948.9 | 948.9 | 11289 | | |
| Common base | PEOX 11K | | 11215 | | | 11230 | | |
| Total Thickness | | 10679.9 | | 8761.5 | 7539.2 | | | |

Returning briefly to FIG. 347 in conjunction with FIG. 353, constrained designs 11150 (generated in step 11145 as illustrated in FIG. 347) are then optimized in step 11155 to generate optimized thin film filter designs 11160. Optionally, as part of the final optimization in step 11155, corrections or modifications such as 1) additional layers to improve filtering contrast and 2) corrections accounting for CRAs larger than zero may also be taken into account. For instance, it is known that when the CRA of incident electromagnetic energy is greater than zero, the filter performance varies from that predicted at normal incidence. As known to those skilled in the art, a non-normal incidence angle results in a blue-shift of the filter transmission spectrum. Therefore, to compensate for this effect the final filter design may be appropriately red-shifted, which may be achieved by slightly increasing the thickness of every layer. If the resulting red-shift is small enough, the overall filter spectrum may be shifted without otherwise adversely affecting the filter set performance.

An exemplary, optimized CMY filter set design, generated in accordance with the process illustrated in FIGS. 347 and 353 of the present disclosure, is shown in TABLE 65. FIG. 357 shows a plot 11460 of the transmission characteristics of the cyan, magenta and yellow color filters with common low index layers and multiple paired high index layers as described by TABLE 65. The optimized CMY filter set design as shown in TABLE 65 and FIG. 357 does take into account off-normal CRAs by adding a thickness increase to 1% of every layer. A dashed line 11465 represents transmission performance of the cyan filter. A dotted line 11470 represents transmission performance of the magenta filter. A solid line 11475 represents transmission performance of the yellow filter. Performance of the individual cyan, magenta and yellow filters represents an optimized trade-off between performance goals and applied constraints. It may be noted, in comparing plot 11460 with the plots shown in FIGS. 351 and 354-356, that while plot 11460 does not achieve the same performance as the individually optimized filter set demonstrated in FIG. 351, it does demonstrate comparable performance with the added advantage of improved manufacturability due to pairing of several of the layers forming the thin film filters.

Although process 11085 (FIG. 347) is shown to end with step 11165, it should be understood that, dependent upon factors such as complexity of a design, a number of constraints and a number of filters in a design set, process 11085 may include additional looping pathways, additional process steps and/or modified process steps. For example, when jointly optimizing a filter set that contains more than three filters, it may be necessary to alter any steps associated with pairing operations or paired layers of FIG. 353. A pairing operation or a reference to paired layers may be replaced by a similar "n-tuple" operation or reference. An "n-tuple" may be defined as a grouping of integer n items (e.g., triplet, sextet). As an example, when jointly optimizing a filter set that contains four filters all pairing operations may be duplicated such that four correspondingly indexed layers are divided into two pairs rather than one pair and a singlet as was done in the exemplary process for the CMY filter.

Furthermore, in the exemplary process illustrated in FIG. 353, the ordering of steps 11365 through 11395 has been determined by taking into account expert knowledge and experimentation to determine and rank the impact of processing the filter set design in accordance with each step. While steps 11365 through 11395 of FIG. 353 are explained in the context of one example, it should be appreciated that such steps may vary in type, repetition and order from those shown in FIG. 353. For example, instead of assigning commonality to low index layers in step 11365, high index layers may be selected instead. Independent optimization of paired layer thicknesses, as in step 11385, may be performed for paired layers instead of on independent layers. Alternatively, rather than selecting paired layers on the basis of the largest "smallest difference" pair as shown in step 11380, other criteria might be used. In addition, although the exemplary CMY filter set design optimization process as shown in FIG. 353 seeks to optimize the physical thicknesses of the thin film layers in the filters, it may be understood by those skilled in the art that the optimization may vary, for example, optical thickness instead. As is known in the art, optical thickness is defined as the product of the physical thickness and the refractive index of a given material at a specific wavelength. To optimize the optical thickness, the optimization process may vary the material(s) or refractive index of the materials to achieve the same or a similar result as would an optimizer varying only the physical thickness of the layers.

Turning now to FIG. 358, a flowchart for a manufacturing process 11480 for thin film filters is shown. Process 11480 starts with a preparation step 11485 wherein any setup and initialization processes such as, but not limited to, materials preparation and equipment break-in and validation are performed. Step 11485 may also include any processing of a detector pixel array prior to the addition of the thin film filters. In a step 11490, one or more layers of material are deposited. Next, in a step 11500, the layer(s) deposited during step 11490 are lithographically or otherwise patterned and then etched, thereby selectively modifying the deposited layers. In a step 11505, a decision is made if more layers should be deposited and/or modified. If the answer to decision 11505 is "YES" more layers should be deposited and/or modified, then process 11480 returns to step 11490. If the answer to decision 11505 is "NO" no more layers are to be deposited and/or modified, then process 11480 ends with a step 11510.

TABLE 66

| Step # | Description | Material | Thickness (Angstroms) Deposition | Etch depth | Mask # |
|---|---|---|---|---|---|
| 1 | Blanket deposition | UV SiN | 948.9 | | |
| 2 | Blanket deposition | BD7800 | 972 | | |
| 3 | Blanket deposition | UV SiN | 696.4 | | |
| 4 | Spin coat | Photoresist | | | |
| 5 | Masked exposure | | | | 1 |
| 6 | Plasma etch | | | 696.4 | |
| 7 | Remove photoresist | | | | |
| 8 | Blanket deposition | UV SiN | 414.8 | | |
| 9 | Blanket deposition | BD7800 | 694.7 | | |
| 10 | Blanket deposition | UV SiN | 588.3 | | |
| 11 | Spin coat | Photoresist | | | |
| 12 | Masked exposure | | | | 2 |
| 13 | Plasma etch | | | 588.3 | |
| 14 | Remove photoresist | | | | |
| 15 | Blanket deposition | UV SiN | 547.5 | | |
| 16 | Blanket deposition | BD7800 | 807.6 | | |
| 17 | Blanket deposition | UV SiN | 530.6 | | |
| 18 | Spin coat | Photoresist | | | |
| 19 | Masked exposure | | | | 3 |
| 20 | Plasma etch | | | 530.6 | |
| 21 | Remove photoresist | | | | |
| 22 | Blanket deposition | UV SiN | 542.7 | | |
| 23 | Blanket deposition | BD7800 | 900.8 | | |
| 24 | Blanket deposition | UV SiN | 634 | | |
| 25 | Spin coat | Photoresist | | | |
| 26 | Masked exposure | | | | 4 |
| 427 | Plasma etch | | | 634 | |
| 28 | Remove photoresist | | | | |
| 29 | Blanket deposition | UV SiN | 421.5 | | |
| 30 | Blanket deposition | BD 7800 | 878.7 | | |
| 31 | Blanket deposition | UV SiN | 691.4 | | |
| 32 | Spin coat | Photoresist | | | |
| 33 | Masked exposure | | | | 5 |
| 34 | Plasma etch | | | 691.4 | |
| 35 | Remove photoresist | | | | |
| 36 | Blanket deposition | UV SiN | 410 | | |

TABLE 67

| Step # | Description | Material | Thickness (Angstroms) Deposition | Etch depth | Mask # |
|---|---|---|---|---|---|
| 1 | Blanket deposition | UV SiN | 948.9 | | |
| 2 | Blanket deposition | BD7800 | 972 | | |
| 3 | Blanket deposition | UV SiN | 1111.2 | | |
| 4 | Spin coat | Photoresist | | | |
| 5 | Masked exposure | | | | 1 |
| 6 | Plasma etch | | | 696.4 | |
| 7 | Remove photoresist | | | | |
| 8 | Blanket deposition | BD7800 | 694.7 | | |
| 9 | Blanket deposition | UV SiN | 1135.8 | | |
| 10 | Spin coat | Photoresist | | | |
| 11 | Masked exposure | | | | 2 |
| 12 | Plasma etch | | | 588.3 | |
| 13 | Remove photoresist | | | | |
| 14 | Blanket deposition | BD7800 | 807.6 | | |
| 15 | Blanket deposition | UV SiN | 1073.3 | | |
| 16 | Spin coat | Photoresist | | | |
| 17 | Masked exposure | | | | 3 |
| 18 | Plasma etch | | | 530.6 | |
| 19 | Remove photoresist | | | | |
| 20 | Blanket deposition | BD7800 | 900.8 | | |
| 21 | Blanket deposition | UV SiN | 1055.5 | | |
| 22 | Spin coat | Photoresist | | | |
| 23 | Masked exposure | | | | 4 |
| 24 | Plasma etch | | | 634 | |
| 25 | Remove photoresist | | | | |

TABLE 67-continued

| Step # | Description | Material | Thickness (Angstroms) Deposition | Etch depth | Mask # |
|---|---|---|---|---|---|
| 26 | Blanket deposition | BD 7800 | 878.7 | | |
| 27 | Blanket deposition | UV SiN | 1101.4 | | |
| 28 | Spin coat | Photoresist | | | |
| 29 | Masked exposure | | | | 5 |
| 30 | Plasma etch | | | 691.4 | |
| 31 | Remove photoresist | | | | |

TABLES 66 and 67 list process sequences for two exemplary methods for manufacturing thin film color filters, such as the exemplary CMY filter set described in TABLE 64. Individual semiconductor process steps listed in TABLES 66 and 67 are well known in the art of semiconductor processing. Dielectric materials such as SiN and BLACK DIAMOND® may be deposited using known processes such as, for instance, plasma-enhanced chemical vapor deposition (PECVD). Photoresist may be spin coated on equipment designed for these functions. Masked exposure of the photoresist may be performed on commercially available lithography equipment. Photoresist removal, also known as "photoresist stripping" or "ashing" may be performed on commercially available equipment. Plasma etching may be performed using known wet or dry chemical processes.

The two process sequences defined in TABLES 66 and 67 differ in the way that plasma etching is utilized in each sequence. In the sequence listed in TABLE 66, high index layers of individual color filters that include paired thicknesses are deposited in two steps, with intervening masking and etching operations. Material is deposited to a thickness equal to a difference between a paired layer thickness and an unpaired layer thickness. Then the deposited layer is selectively masked. Where a selected thin film layer is unprotected from etching, the layer may be removed down to its interface with an underlying layer, using a selective etching process that etches the selected layer at a greater rate than the underlying layer. If the layer is removed down to its interface with an underlying layer then, due to a selectivity of the etching processes, the underlying layer remains substantially unetched. Substantially unetched means that only a negligible amount of the underlying layer is removed in the etching process. This negligible amount may be measured in terms of an absolute thickness or a relative percentage of the thickness of a layer. To maintain acceptable performance of a filter, typical values for excess etching may be as high as a few nanometers or 10%; in some cases, much less. A second deposition may then be performed to add enough material to establish the thickness of the thickest layer within a corresponding layer triplet. In a process associated with the exemplary CMY filter set design, SiN is the material that is being etched and BD is acting as a stop layer. This "etch stop" process may be performed, for example, using known $CF_4/O_2$ plasma etch processes or by the methods and apparatus discussed in, for instance, U.S. Pat. No. 5,877,090 entitled "Selective plasma etching of silicon nitride in presence of silicon or silicon oxides using mixture of $NH_3$ or $SF_6$ and HBr and $N_2$" of Padmapani, et al. Optionally, wet chemical etching incorporating hot phosphoric acid, $H_3PO_4$, for selectively etching SiN, or HF or buffered oxide etchant ("BOE") for selectively etching BD/$SiO_2$ may also be used.

The process sequence listed in TABLE 67 illustrates a process wherein the maximum thickness of a corresponding layer triplet is deposited, and then controlled etching thins, but may not fully remove, certain layers within the triplet.

TABLE 68

| Mask | Pixels protected by mask | | | |
| --- | --- | --- | --- | --- |
| # | Cyan | Magenta | Yellow | Notes |
| 1 | P | 0 | 0 | Masks 1, 3 and 5 are identical to each other. |
| 2 | P | P | 0 | Masks 2 and 4 are identical to each other. |
| 3 | P | 0 | 0 | Masks 1, 3 and 5 are identical to each other. |
| 4 | P | P | 0 | Masks 2 and 4 are identical to each other. |
| 5 | P | 0 | 0 | Masks 1, 3 and 5 are identical to each other. |

TABLE 68 lists a sequence of masking operations and specific filter(s) that are protected by each mask at each sequence step in the processes described in TABLES 66 and 67. In the exemplary CMY design, for instance, the cyan filter is always protected by the mask, the yellow filter is never protected by the mask and the magenta filter is protected during alternating masking operations.

FIG. 359 is a flowchart of a manufacturing process 11515 for forming non-planar optical elements. Manufacturing process 11515 starts with a preparation step 11520 wherein any setup and initialization processes such as, but not limited to, materials preparation and equipment break-in and validation are performed. Step 11520 may also include any processing of a detector pixel array prior to the addition of the non-planar optical elements. In a step 11525, one or more layers of material are deposited on, for example, a common base. In a step 11530, the layer(s) deposited during step 11525 are lithographically or otherwise patterned and then etched, thereby selectively modifying the deposited layers. In a step 11535, one or more layers of material are further deposited. In an optional step 11540, an uppermost surface of the deposited and etched layer(s) may be planarized by a chemical-mechanical polishing process. Utilizing a set of looping pathways 11545, the steps forming manufacturing process 11515 may be reordered or repeated as required. Process 11515 ends with a step 11550. It is appreciated that process 11515 may be preceded or followed by other processes, in order to implement the non-planar optical elements in combination with other features.

Figure 364:
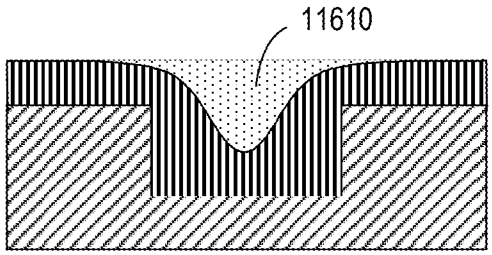

FIGS. 360-364 show a series of cross-sectional views of a non-planar optical element, shown here to illustrate manufacturing process 11515 of FIG. 359. Referring to FIGS. 360-364 in conjunction with FIG. 359, a first material is deposited in step 11525 to form a first layer 11555. First layer 11555 is then etched in step 11530 to form, for example, a relieved area 11560 including substantially planar surfaces 11565. In the context of the present disclosure, a relieved area is understood to be an area that extends below the uppermost surface of a given layer such as first layer 11555. In addition, a substantially planar surface is understood to be a surface that has a radius of curvature that is large in comparison to a dimension of that surface. Relieved area 11560 may be formed by, for example, anisotropic etching. In step 11535, a second material is conformally deposited over first layer 11555 and within relieved area 11560 to form a second layer 11570. Within the context of the present disclosure, conformal deposition is understood to be a deposition process wherein similar thicknesses of material may be deposited onto all surfaces receiving the deposition regardless of the orientation of the surfaces. Second layer 11570 includes at least one non-planar feature 11575 formed in relation to relieved area 11560. A non-planar feature may be a feature that has at least one surface that has a radius of curvature that is similar in size to a dimension of the feature. Second layer 11570 may also include a planar region 11580. The radii of curvature, width, depth and other geometric properties of non-planar feature 11575 may be modified by modifying an aspect ratio (depth-to-width ratio) of relieved area 11560 and/or by modifying chemical, physical or rate or deposition properties of a material being deposited to form second layer 11570. A third material is conformally deposited over layer 11570 at least partially filling non-planar feature 11575 to form a third layer 11585. That is, non-planar feature 11575 is completely filled when the lowest area of an upper surface 11595 of third layer 11585 is at or above a datum 11605 (indicated by a dashed line) that is aligned with planar region 11580 of second layer 11570. When a non-planar feature 11590 is below datum 11605, non-planar feature 11575 is considered to be partially filled. Third layer 11585 includes at least one non-planar feature 11590 formed in relation to non-planar feature 11575. Other areas (e.g., area 11600) of an upper surface of third layer 11585 may be substantially planar. Optionally, third layer 11585 may be planarized to define a filled non-planar feature 11610, as shown in FIG. 364. The first, second and third materials forming layers 11555, 11570 and 11585 may be the same or different materials. An optical element is formed when a refractive index of at least one of the materials forming the non-planar feature differs (for at least one wavelength of electromagnetic energy) from the other materials. Optionally, if not removed by planarization, non-planar feature 11590 and modifications thereto by such processes as etching may be utilized to form additional non-planar features.

FIG. 365 shows an alternative process for depositing the third layer of material. A filled non-planar feature 11630 is formed during the deposition of a third layer 11615. Third layer 11615 includes non-planar surfaces 11620 as well as substantially planar surfaces 11625. Third layer 11615 may be formed, for instance, by a non-conformal deposition (e.g., by depositing a liquid or slurry material using a spin-on process, and later curing the material so that it becomes a solid or semisolid). If the material forming the third layer differs (for at least one wavelength of electromagnetic energy) from the material of the second layer, filled non-planar feature 11630 forms an optical element.

FIGS. 366-368 illustrate an alternative manufacturing process shown in FIG. 359. A first material is deposited to form a layer 11635 and then etched to form relieved areas 11640 and a protrusion 11650 that may have substantially planar surfaces. A protrusion may be defined to be an area that extends above a local surface 11645 of a layer such as layer 11635 after etching. Relieved areas 11640 and protrusion 11650 may be formed by anisotropic etching. A second material is conformally deposited over layer 11635 and within relieved areas 11640 to form a layer 11655. Portion 11665 of a surface of layer 11655 is non-planar and forms an optical element. Another portion 11660 of the surface is substantially planar.

FIGS. 369-372 show the steps of another alternative manufacturing process in accordance with process 11515 of FIG. 359. A first material is deposited to form a layer 11670 and then etched to form a relieved area 11675 that may have substantially non-planar surfaces. Relieved area 11675 may be formed, for example, by isotropic etching. A second material is conformally deposited over layer 11670 and within relieved area 11675 to form a layer 11680. Layer 11680 may define a non-planar region 11685 that may be used to create an additional non-planar element. Alternatively, layer 11680 may be planarized to create a non-planar element 11690 whose upper surface is substantially co-planar with an upper surface of layer 11670. An alternate process for forming layer 11680 may include a non-conformal deposition similar to that used to form third layer 11615 of FIG. 365.

FIG. 373 shows a single, detector pixel 11695 including non-planar optical element 11700 and element array 11705. Non-planar optical elements 11700, 11710 and 11715 may be used for directing electromagnetic energy within detector pixel 11695 toward photosensitive region 11720. The ability to include non-planar optical elements into detector pixel designs adds an extra degree of design freedom that may not be possible with only planar elements. Singlets or pluralities of optical elements may be disposed directly adjacent to other singlets or pluralities of optical elements so that a composite surface of the group of optical elements may approximate a curved profile such as that of a spherical or aspheric optical element or a sloped profile such as that of a trapezoid or conical section.

For example, trapezoidal optical element 10210 of FIG. 310, which may be approximated by dual-slab configuration 10200, as earlier discussed, may alternatively be approximated by using one or more non-planar optical elements rather than the depicted planar optical elements. Non-planar optical elements may also be used to form, for instance, metalenses, chief ray angle correctors, diffractive elements, refractive elements and/or other structures similar to those described above in association with FIGS. 297-304.

TABLE 69

| Layer | Material | Refractive Index | Extinction Coefficient | Optical Thickness (FWOT) | Physical Thickness (nm) |
|---|---|---|---|---|---|
| Medium | Air | 1.00000 | 0.00000 | | |
| 1 | SiO2 | 1.45654 | 0.00000 | 0.58508249 | 261.10 |
| 2 | Ag | 0.07000 | 4.20000 | 0.00288746 | 26.81 |
| 3 | SiO2 | 1.45654 | 0.00000 | 0.30649839 | 136.78 |
| 4 | Ag | 0.07000 | 4.20000 | 0.00356512 | 33.10 |
| 5 | SiO2 | 1.45654 | 0.00000 | 0.33795733 | 150.82 |
| 6 | Ag | 0.07000 | 4.20000 | 0.00186378 | 17.31 |
| 7 | SiO2 | 1.45654 | 0.00000 | 0.31612296 | 141.07 |
| 8 | Ag | 0.07000 | 4.20000 | 0.00159816 | 14.84 |
| Common base | Glass | 1.51452 | 0.00000 | | |
| | | | | 1.55557570 | 781.83 |

FIG. 374 shows a plot 11725 of simulated transmission characteristics of a magenta color filter formed using layers of silver and silicon dioxide. Plot 11725 has wavelength in nanometers as the abscissa and transmission in percent on the ordinate. A solid line 11730 represents transmission performance of a magenta filter whose design table is shown by TABLE 69. Although silver may not be considered a material that is customarily associated with processes used to make detector pixel arrays, it may be employed to form filters that may be integrally formed with detector pixels if certain conditions are met. These conditions may include but are not limited to 1) use of low temperature processes for deposition of the silver and any subsequent processing of the detector pixels and 2) use of suitable passivation and protective layers for the detector pixels. If high temperatures and unsuitable protective layers are used, the silver may migrate or diffuse into and damage a photosensitive region of a detector pixel.

TABLE 70

| Parameter Name | Reference # | Dimensions | Notes |
|---|---|---|---|
| Pixel | 11735 | $4.4 \times 10^{-6}$ m | Assumes one detector pixel (2.2 microns wide) with two half-pixels on either side |
| Air | 11750 | $5 \times 10^{-8}$ m | Assumes electromagnetic energy incident from air |
| FOC | 11755 | $2.498 \times 10^{-7}$ m | |
| ARC | | $6 \times 10^{-8}$ m | |
| Nitride | | $2 \times 10^{-7}$ m | |
| $SiO_2$ | | $3.0877 \times 10^{-6}$ m | |
| junctionOxide | | $3.5 \times 10^{-8}$ m | |
| junctionNitride | | $4 \times 10^{-8}$ m | |
| Si | | $6 \times 10^{-6}$ m | |
| junctionWidth | | $1.6 \times 10^{-6}$ m | |
| Gaussian beam diameter ($1/e^2$) | | 3000 nm | |
| Wavelengths of interest | | 455 nm, 535 nm, 630 nm | |

FIG. 375 shows a schematic diagram, in partial cross-section, of a prior art detector pixel 11735 overlain with simulated results of electromagnetic power density therethrough. Various specifications of prior art detector pixel 11735 are summarized in TABLE 70. Electromagnetic energy 11740 (indicated by a large arrow) is assumed incident on detector pixel 11735 from air 11750 at normal incidence. As shown in FIG. 375, detector pixel 11735 includes a plurality of layers corresponding to layers present in commercially available detectors. Electromagnetic energy 11740 is transmitted through detector pixel 11735 with electromagnetic power density as indicated by the contour outlines. As may be seen in FIG. 375, metal traces 11745 within pixel 11735 impede transmission of electromagnetic energy 11740 through detector pixel 11735. That is, a power density at a photosensitive region 11790 without a lenslet is quite diffuse.

FIG. 376 shows one embodiment of another prior art detector pixel 11795, this time including a lenslet 11800. Lenslet 11800 is configured for focusing electromagnetic energy 11740 therethrough such that electromagnetic energy 11740, while traveling through detector pixel 11795, avoids metal traces 11745 and is focused with greater power density at photosensitive region 11790. However, prior art detector pixel 11795 requires separate fabrication and alignment of lenslet 11800 onto a surface of detector pixel 11795 following fabrication of the other components of detector pixel 11795.

FIG. 377 shows an exemplary embodiment of a detector pixel 11805 including buried optical elements functioning as a metalens 11810 for focusing electromagnetic energy at photosensitive region 11790. In the example shown in FIG. 377, metalens 11810 is formed as patterned layers of passivation nitride, which is compatible with existing processes used in forming the rest of detector pixel 11805. Metalens 11810 includes a symmetric design of a wide central pillar flanked by two smaller pillars.

It may be seen in FIG. 377 that, while providing a similar focusing effect as lenslet 11800 (FIG. 376), metalens 11810 includes additional advantages inherent in buried optical elements. In particular, since metalens 11810 is formed of materials compatible with detector pixel fabrication processes, it may be integrated into the design of the detector pixel itself without requiring additional fabrication steps necessary to add a lenslet after the fabrication of the detector pixel.

FIG. 378 shows a prior art detector pixel 11815 and propagation of off-normal electromagnetic energy 11820 therethrough. It may be noted that metal traces 11841 have been shifted in comparison to metal traces 11745 in FIGS. 375-377, which were centered with respect to photosensitive region 11790, in an attempt to accommodate the off-normal incidence angle of off-normal electromagnetic energy 11820. As shown in FIG. 378, off-normal electromagnetic energy 11820 is partly blocked by metal traces 11845 and mostly misses photosensitive region 11790.

FIG. 379 shows another prior art detector pixel 11825, this time including a lenslet 11830. It may be noted that both lenslet 11830 and metal traces 11841 have been shifted with respect to photosensitive region 11790 in an attempt to accommodate the off-normal incidence angle of off-normal electromagnetic energy 11820. As shown in FIG. 379, while more concentrated than without the presence of lenslet 11830, off-normal electromagnetic energy is still concentrated at an edge of photosensitive region 11790. Furthermore, prior art detector pixel 11825 requires the additional consideration of assembly complication imposed by the need to position lenslet 11830 at a location that is offset from photosensitive region 11790.

FIG. 380 shows an exemplary embodiment of a detector pixel 11835 including buried optical elements functioning as a metalens 11840 for directing off-normal electromagnetic energy 11820 at photosensitive region 11790. Metalens 11840 has a non-symmetric, three-pillar design with a single wide pillar and a pair of smaller pillars that are slightly off-set with respect to photosensitive region 11790. Unlike lenslet 11830 of FIG. 379, however, metalens 11840 is integrally formed with detector pixel 11835 along with photosensitive region 11790 and metal traces 11841 such that location of metalens 11840 with respect to photosensitive region 11790 and metal traces 11845 may be determined with high precision associated with lithographic processes. That is, metalens 11840 provides comparable, if not superior, electromagnetic energy directing performance with higher precision than prior art detector pixel 11825 including lenslet 11830.

FIG. 381 shows a flowchart of a design process 11845 for designing and optimizing a metalens, such as metalens 11810 and 11840 shown in FIGS. 377 and 380. Design process 11845 begins with a start step 11850, in which a variety of preparation steps, such as initiation of software, may be included. Then, in a step 11855, general geometry of a detector pixel is defined. For instance, refractive indices and thicknesses of various components of the detector pixel, location and geometry of a photosensitive region, and ordering of various layers forming the detector pixel are specified in step 11855.

An exemplary definition of detector pixel geometry is summarized in TABLE 71 (dimensions in meters unless noted):

TABLE 71

| | | |
|---|---|---|
| pixelWidth: | $2.2 \times 10^{-6}$ | Pixel width |
| pixel: | $4.4 \times 10^{-6}$ | one 2.2 micron detector pixel with two half-pixels on each side |
| air: | $5 \times 10^{-8}$ | launch electromagnetic energy through the air |
| FOC: | $2.498 \times 10^{-7}$ | EM energy incident on a planarization layer, n = 1.58 |
| ARC: | $6 \times 10^{-8}$ | Next layer = anti-reflection coating, n = 1.58 |
| nitride: | $2 \times 10^{-7}$ | Next layer = silicon nitride layer |
| SiO2: | $3.0877 \times 10^{-6}$ | Next layer = silicon dioxide layer |
| junctionOxide: | $3.5 \times 10^{-8}$ | Next layer = first anti-reflection coating layer |
| junctionNitride: | $4 \times 10^{-8}$ | Next layer = second anti-reflection coating layer |
| Si: | $6 \times 10^{-6}$ | Silicon layer supporting the photosensitive region |
| junctionXY: | $[1.6 \times 10^{-6}\ 3.5 \times 10^{-7}]$ | Dimensions of the photosensitive region |
| junctToFarMetalEdge: | $2.687 \times 10^{-6}$ | Distance from photosensitive region to far metal trace edge (aluminum) |
| junctToCloseMetalEdge:: | $1.588 \times 10^{-6}$ | Distance from photosensitive region to close metal trace edge |
| FarMetalWidthHeightLeftEdge: | $[4.09 \times 10^{-7}\ 6.5 \times 10^{-7}\ -1.302 \times 10^{-6}]$ | Far metal trace geometry and location |
| CloseMetalWidthHeightLeftEdge: | $[5.97 \times 10^{-7}\ 3.5 \times 10^{-7}\ -1.396 \times 10^{-6}]$ | Close metal trace geometry and location |

In a step 11860, input parameters and design goals, such as electromagnetic energy incidence angle, process run time and design constraints are specified. An exemplary set of input parameters and design goals is summarized in TABLE 72:

TABLE 72

| | |
|---|---|
| FEM: $5 \times 10^{-9}$ | Minimum separation of objects in finite element model |
| TempMaxMin: $[1\ 1 \times 10^{-10}]$ | Temperature range in simulated annealing optimizer [Optimizer stops when T < Tmin] |

TABLE 72-continued

| | |
|---|---|
| Hours: 8 | Number of hours simulation should take |
| trombone: 0 | Choose whether to vary $SiO_2$ width in optimization |
| SiO2widthMin: $2.612 \times 10^{-6}$ | Minimum geometrically allowed width |
| SiO2widthMax: $7 \times 10^{-6}$ | Maximum $SiO_2$ width for optimizer guess |
| minFeature: $1.1 \times 10^{-7}$ | Minimum feature size allowed by fabrication processes |
| maxLensHeightFab: $7 \times 10^{-7}$ | Maximum optical element height allowed by fabrication processes |
| minLensHeight: $4 \times 10^{-8}$ | Minimum optical element height allowed by fabrication process, as dictated by the optical element material |
| offset = | Offset values due to non-zero CRA |
| SiBase: $3.8 \times 10^{-6}$ | Silicon base location in finite element model |
| intrinsic: $2.5 \times 10^{-7}$ | Distance between silicon/oxide interface and photosensitive region |
| lens: 0<br>beam: 0<br>junction: 0 | offset.lens . . . offset.bottom denote offsets due to non-zero chief ray angles. These values may be adjusted to allow for alter EM energy propagation through the detector pixel to the photosensitive region (i.e., "junction") |
| traceTop: 0 | |
| traceBottom: 0 | |
| CRAairDeg: 0 | Chief ray angle from air |
| Min: $5.5 \times 10^{-7}$ | Minimum wavelength |
| Max: $5.5 \times 10^{-7}$ | Maximum wavelength |
| Points: 3 | # of wavelength points |

In a step 11865, an initial guess for the metalens geometry is specified. An exemplary geometry is summarized in TABLE 73:

TABLE 73

| | | |
|---|---|---|
| Metalens.height1 | $124 \times 10^{-9}$ | Total height for Mask 1 |
| Metalens.height2 | $124 \times 10^{-9}$ | Total height for Mask 2, if used |
| Metalens.pillars.widths1 | [606 514 66]*1 $\times 10^{-9}$ | Pillar width numbers correspond to [center right left], assuming three pillars |
| Metalens.pillars.edges1 | [300 1580 −2.4]*1 $\times 10^{-9}$ | Pillar locations |
| Metalens material: | passivation nitride | |

In a step 11870, an optimizer routine modifies the metalens design in order to increase power delivered through the detector pixel to the photosensitive region. In a step 11875, performance of the modified metalens design is evaluated to determine whether the design goals, specified in step 11860, have been met. In a decision 11880, a determination is made as to whether or not the design goals have been met. If the answer to decision 11880 is YES, design goals have been met, then design process 11845 is ended in a step 11883. If the answer to decision 11880 is NO, design goals have not been met, then steps 11870 and 11875 are repeated. An exemplary evaluation of coupled power (in arbitrary units) as a function of chief ray angle (in degrees) is shown in FIG. 382, which shows a plot 11885 comparing the power coupling performance of a detector pixel including a lenslet, such as those shown in FIGS. 376 and 379, compared to that of a detector pixel including a three-pillar metalens integrated therein, such as those shown in FIGS. 377 and 380. As may be seen in FIG. 382, the three-pillar metalens design, optimized using design process 11845, consistently provides comparable or superior power coupling performance at the photosensitive region as the detector pixel system including a lenslet over a range of CRA values.

Another approach for providing CRA correction integrated within a detector pixel structure as a buried optical element is the use of a subwavelength prism grating (SPG). In the context of the present disclosure, a subwavelength grating is understood to be a grating with a grating period that is smaller than a wavelength, i.e., $$\frac{\Delta}{\lambda} < \frac{1}{2n_1},$$

where $\Delta$ is a grating period, $\lambda$ is a design wavelength and $n_1$ is a refractive index of the material forming the subwavelength grating. A subwavelength grating generally transmits only the zero-th diffraction order, while all other orders are effectively evanescent. By modifying the duty cycle (defined as $W/\Delta$, where W is a width of a pillar within the grating) across the subwavelength grating, effective medium theory may be used to design a subwavelength grating that functions as a lens, a prism, a polarizer, etc. For purposes of CRA correction in a detector pixel, a subwavelength prism grating (SPG) may be particularly advantageous.

FIG. 383 shows an exemplary SPG 11890 suitable for use in a detector pixel configuration as a buried optical element. SPG 11890 is formed of a material with a refractive index $n_1$. SPG 11890 includes a series of pillars 11895 having different pillar widths $W_1$, $W_2$, etc. and grating period $\Delta_1$, $\Delta_2$, etc., such that the duty cycle (i.e., $W_1/\Delta_1$, $W_2/\Delta_2$, etc.) varies across SPG 11890. The performance of such SPGs may be characterized using methods described by, for example, Farn, "Binary gratings with increased efficiency," Appl. Opt., vol. 31, no. 22, pp. 4453-4458, and Prather, "Design and application of subwavelength diffractive elements for integration with infrared photodetectors," Opt. Eng., vol. 38, no. 5, pp. 870-878. In the present disclosure, design of SPGs specifically for CRA correction in a detector pixel with particular manufacturing limitations is considered.

FIG. 384 shows an array of SPGs 11900 integrated into a detector pixel array 11905. Detector pixel array 11905 includes a plurality of detector pixels 11910 (each indicated by a dashed rectangle). Each one of detector pixels 11910 includes a photosensitive region 11915, formed on or within a common base 11920, and a plurality of metal traces 11925, which may be shared between adjacent detector pixels. Electromagnetic energy 11930 (indicated by an arrow) incident on one of detector pixels 11910 is transmitted through array of SPGs 11900, which directs electromagnetic energy 11930 toward photosensitive region 11915 for detection thereon. It may be noted, in FIG. 384, that metal traces 11925 have been shifted to accommodate $\theta_{out}$ values of 16° or less within detector pixel 11910.

In the example shown in FIG. 384, certain manufacturing constraints have been taken into account. Particularly, electromagnetic energy 11930 is assumed to be incident from air (with a refractive index $n_{air}$=1.0) onto array of SPGs 11900 (formed of $Si_3N_4$ with a refractive index $n_1$=2.0) and transmitted through a support material 11935 (formed of $SiO_2$ with a refractive index $n_0$=1.45). In addition, the minimum pillar width and the minimum distance between pillars is assumed to be 65 nm, with a maximum aspect ratio (i.e., the ratio of pillar height to pillar width) of ten. These materials and geometries are readily available in CMOS lithographic processes today.

FIG. 385 shows a flowchart summarizing a design process 11940 for designing an SPG suitable for use as a buried optical element within a detector pixel. Design process 11940 begins with a step 11942. In a step 11944, a variety of design goals are specified; design goals may include, for instance, desired range of input and output angle values (i.e., CRA correction performance required from the SPG) and output power at a photosensitive region of the detector pixel. In a step 11946, a geometrical optics analysis is performed to generate a geometrical optics design; that is, using a geometrical optics approach, the characteristics of an equivalent conventional prism capable of providing the CRA correction performance (as specified in step 11944) are determined. In a step 11948, the geometrical optics design is translated into an initial SPG design using an approach based on coupled-wave analysis. While the initial SPG design provides the properties of an ideal SPG, such designs may not be manufacturable using currently available manufacturing techniques. Therefore, in a step 11950, a variety of manufacturing constraints are specified; relevant manufacturing constraints may include, for example, minimum pillar width, maximum pillar height, maximum aspect ratio (i.e., the ratio of the pillar height to the pillar width) and materials to be used to form the SPG. Then, in a step 11952, the initial SPG design is modified, according to the manufacturing constraints specified in step 11950, to produce a manufacturable SPG design. In a step 11954, performance of the manufacturable SPG design is evaluated with respect to the design goals specified in step 11944. Step 11954 may include, for example, simulating the performance of the manufacturable SPG design in a commercial software package such as FEMLAB®. Then, a decision 11956 is made as to whether or not the manufacturable SPG design meets the design goals of step 11944. If the result of decision 11956 is "NO—the manufacturable SPG design does not meet the design goals," then design process 11940 is returned to step 11952 to again modify the SPG design. If the result of decision 11956 is "YES—the manufacturable SPG design meets the design goals," then the manufacturable SPG design is designated as a final SPG design, and design process 11940 ends with a step 11958. Each of the steps in design process 11940 is discussed in further detail immediately hereinafter.

FIG. 386 shows a schematic diagram of a geometric construct used in the design of an SPG in steps 11944 and 11946 of design process 11940 shown in FIG. 385. In steps 11944 and 11946, one may begin by identifying the characteristics of a conventional prism 11960 that performs the desired amount of CRA correction. The parameters defined by prism 11960 are:

$\theta_{in}$=incident angle of electromagnetic energy at a first surface of the prism;

$\theta_{out}$=output angle of electromagnetic energy at an imaginary SPG surface;

$\theta'_{out}$=output angle of electromagnetic energy exiting a second surface of the prism;

$\theta_A$=apex angle of prism;

$n_1$=refractive index of prism material;

$n_0$=refractive index of the support material;

α=a first intermediate angle; and

β=a second intermediate angle.

Continuing to refer to FIG. 386, it may be shown by using Snell's Law and trigonometric relations that the output angle $\theta_{out}$ may be expressed as a function of $\theta_{in}$, $\theta_A$, $n_1$ and $n_0$ as shown in Eq. (16):

$$\theta_{out}(\theta_{in}, \theta_A, n_1, n_0) = \sin^{-1}\left\{\frac{n_1}{n_0}\sin\left\{\theta_A - \sin^{-1}\left[\frac{1}{n_1}\sin(\theta_{in})\right]\right\}\right\} - \theta_A. \quad \text{Eq. (16)}$$

For example, in order to achieve an output angle of $\theta_{out}$=16° given an input angle $\theta_{in}$=35° using a prism formed of a material having a refractive index $n_1$=2.0, the apex angle of the prism should be $\theta_A$=18.3°, according to Eq. (16). That is, given these values for the various parameters, conventional prism 11960 would correct propagation of incident electromagnetic energy with input angle $\theta_{in}$=35° such that the output angle from the prism would be $\theta_{out}$=16°, which is within a cone of acceptance for a photosensitive region of, for instance, a CMOS detector. Given the apex angle of conventional prism 11960 required to achieve the necessary CRA correction, the prism height of conventional prism 11960 for a given prism base dimension is readily calculated by geometry.

Turning now to FIG. 387, a model prism 11962, on which the SPG design will be based, is shown. Model prism 11962 is formed of a material having a refractive index $n_1$. Model prism 11962 includes a prism base width of 2.2 microns, corresponding to the pixel width of common detectors. Model prism 11962 also includes a prism height H and an apex angle $\theta_A$, which may be calculated using Eq. (16) to equal 18.3° in this case. As may be seen in FIG. 387, prism height H is geometrically related to prism base width and apex angle $\theta_A$ by Eq. (17):

$$H=(2.2\ \mu m)\tan(\theta_A)=(2.2\ \mu m)\tan(18.3°)=0.68\ \mu m \quad \text{Eq. (17)}$$

Referring to FIG. 388 in conjunction with FIG. 387, a schematic diagram of a SPG 11964 including the dimensions to be calculated is illustrated. The characteristics of SPG 11964 are results of step 11948 of design process 11940 shown in FIG. 385; namely, SPG 11964 represents the result of translating a geometrical optics design (as represented by model prism 11962, FIG. 387) into an initial SPG design. The width of SPG 11964 (i.e., $S_w$) will be assumed to be the prism base width of model prism 11962 (namely, 2.2 microns), and the above calculated value for prism height H will be taken as a height of SPG pillars (i.e., $P_H$). Design calculations for SPG 11964 will assume that SPG 11964 is formed of $Si_3N_4$ and that electromagnetic energy (having a wavelength of 0.45 microns) is incident on SPG 11964 from air and exits from SPG 11964 into $SiO_2$. For simplicity, dispersion and loss in SPG 11964 are considered negligible. Consequently, the relevant parameters of SPG 11964 may be readily calculated using Eq. (18):

$$W_i = \frac{iS_W(N+1) - iS_W N}{N(N+1)} = \frac{iS_W}{N(N+1)} \quad \text{Eq. (18)}$$

where $S_W$=2.2 μm;

$P_H$=H=0.68 μm;

$$\Delta = \frac{\lambda}{2n_1} = \frac{0.45\ \mu m}{2(2)} = 0.114\ \mu m;$$

$$N = \text{number of pillars} = \frac{S_W}{\Delta} \approx 19;$$

and i=1, 2, 3, . . . , 19.

TABLE 74

| Pillar Number | Width (nm) |
|---|---|
| 1 | 5 |
| 2 | 11 |
| 3 | 16 |
| 4 | 22 |
| 5 | 27 |
| 6 | 33 |
| 7 | 38 |
| 8 | 44 |
| 9 | 49 |
| 10 | 55 |
| 11 | 60 |
| 12 | 66 |
| 13 | 71 |
| 14 | 77 |
| 15 | 82 |
| 16 | 88 |
| 17 | 93 |
| 18 | 99 |
| 19 | 104 |

The calculated values for pillar widths $W_i$ for values of i=1, 2, 3, . . . , 19 in the present example are summarized in TABLE 74. That is, the above list of relevant SPG parameters and TABLE 74 summarize the results of step 11948 in design process 11940 as shown in FIG. 385.

While the calculated values above represent characteristics of an ideal SPG, it is recognized that some of the pillar widths $W_i$ are too small to be actually manufacturable using currently available manufacturing techniques. In consideration of the manufacturability of the final design of the SPG, the minimum pillar width is set to 65 nm and the pillar height $P_H$ is set to 650 nm, since this height value represents an upper limit for currently available manufacturing processes given that the maximum aspect ratio (i.e., the ratio of the pillar height $P_H$ to the pillar width $P_W$) should be about ten. The number of pillars N and the period are accordingly modified to simplify the SPG structure while accommodating the manufacturing constraints. The imposition of these limitations is included in step 11950 of design process 11940 shown in FIG. 385.

The initial SPG structure design is then modified in accordance with the manufacturing constraints in a step 11952 of design process 11940.

TABLE 75

| Parameter | Value |
|---|---|
| $S_H$ | 200 nm |
| $P_H$ | 650 nm |
| $S_W$ | 2200 nm |
| Δ | 183 nm |
| Number of pillars | 12 |
| Minimum pillar width | 65 nm |
| Aspect ratio ($P_H/P_W$) | 4.6 |
| $n_1$ | 2.00 |
| $n_0$ | 1.45 |
| $\theta_{in}$ | 0° to 50° |
| Gaussian beam diameter (1/$e^2$) | 3000 nm |
| Wavelengths of interest | 455 nm, 535 nm, 630 nm |

TABLE 75 summarizes the parameters used in the simplification process. These parameters are then used to determine appropriate pillar widths in the manufacturable SPG.

TABLE 76

| Pillar Number | Pillar Width (nm) |
|---|---|
| 1 | 65 |
| 2 | 67 |
| 3 | 68 |
| 4 | 70.5 |
| 5 | 70.5 |
| 6 | 84.6 |
| 7 | 98.7 |
| 8 | 107.8 |
| 9 | 112.9 |
| 10 | 115.3 |
| 11 | 118.3 |
| 12 | 118.3 |

The modified pillar widths in the manufacturable SPG are summarized in TABLE 76.

Step 11954 of design process 11940 involves the evaluation of the performance of the manufacturable SPG design (e.g., as summarized in TABLES 75 and 76).

FIG. 389 shows a plot 11966 of numerical calculation results of the output angle $\theta_{out}$ as a function of input angle $\theta_{in}$ for input angles over a range of 0° to 35° for the manufacturable SPG design as shown in FIG. 388, receiving incident electromagnetic energy with s-polarization at a wavelength of 535 nm Plot 11966 was generated using FEMLAB®, taking into account the electromagnetic energy propagation through the manufacturable SPG as described by TABLE 76. It may be seen in FIG. 389 that, even at an input angle above 30°, the resulting output angle is around 16°, thereby indicating that the manufacturable SPG still provides sufficient CRA correction to bring incident electromagnetic energy of above 30° to within the cone of acceptance angles for the photosensitive region of the associated detector pixel.

FIG. 390 is a plot 11968 showing numerical calculation results of the output angle $\theta_{out}$ (i.e., as shown in FIG. 386) as a function of input angle $\theta_{in}$ (again, as shown in FIG. 386) for input angles over a range of 0° to 35° but, this time, the calculations are based on geometrical optics in the geometric construct shown in FIG. 386. It may be seen, by comparing plot 11968 with plot 11966 of FIG. 389 that, while geometrical optics predicts greater CRA correction overall than the manufacturable SPG, the slopes of the lines shown in FIGS. 389 and 390 are quite similar. Therefore, the numerical calculation results of FIGS. 389 and 390 generally agree that the manufacturable SPG provides sufficient CRA correction, while plot 11966 may provide a more reliable estimate of the expected device performance since actual manufacturing constraints are taken into consideration in a simulation model that solves Maxwell's equations in their time-harmonic form. In other words, a comparison of FIG. 389 with FIG. 390 shows that the design process of FIG. 385 (i.e., starting with a geometrical optics design to generate specifics of the SPG) provides a feasible method of generating a suitable SPG design.

FIGS. 391 and 392 show plots 11970 and 11972 of numerical calculation results for electromagnetic energy incident on the manufacturable SPG as a function of input angle $\theta_{in}$ and wavelength for s- and p-polarizations, respectively. While plots 11970 and 11972 were generated using FEMLAB®, other suitable software may be used to generate the plots as well. In comparing plots 11970 and 11972, it may be seen that the manufacturable SPG of TABLE 76 provides similar CRA correction performance over the range of wavelengths of interest as well as for different polarizations. In addition, the output angle $\theta_{out}$ is around 16° even for input angles greater than 30°. That is, the manufacturable SPG designed in accordance with the present disclosure provides manufacturability as well as uniform CRA correction performance over a range of wavelengths as well as polarization. In other words, inspection of FIGS. 389-392 (i.e., making decision 11956 of design process 11940) indicates that this manufacturable SPG design does indeed satisfy the design goals.

While FIGS. 383-392 were concerned with the design of a SPG for performing CRA correction, it is possible also to design a SPG capable of focusing incident electromagnetic energy while performing CRA correction, such as provided by the detector pixel configuration including a metalens as shown in FIG. 380. FIGS. 393 and 394 show a plot 11974 of an exemplary phase profile 11976 and a corresponding SPG 11979, respectively, for simultaneously providing CRA correction and focusing of electromagnetic energy incident thereon. Phase profile 11974 is shown as a plot of phase (in units of radians) as a function of spatial distance (in arbitrary units) and may be considered as a combination of a parabolic phase surface with a tilted phase surface. In FIG. 393, spatial distance of zero corresponds to a center of the exemplary optical element.

FIG. 394 shows an exemplary SPG 11979 providing a phase profile that is equivalent to phase profile 11976. SPG 11979 includes a plurality of pillars 11980, where the phase profile effected by SPG 11979 is proportional to the concentration and size of the pillars; that is, lower concentration of pillars corresponds to lower phase as shown in FIG. 393. In other words, in regions of lower phase, there are fewer pillars and, therefore, a reduced amount of material capable of modifying the wavefront of electromagnetic energy transmitted therethrough; conversely, regions of higher phase include a higher concentration of pillars that provide more material for affecting the wavefront phase. The design of SPG 11979 assumes pillars 11980 are formed of a material of higher index than the surrounding medium. Furthermore, in SPG 11979, the pillar widths and pitches are assumed to be less than $\lambda/(2n)$, where n is the refractive index of the material forming pillars 11980.

Although each of the aforedescribed embodiments have been described in relation to a particular set of CMOS compatible processes in association with the formation of a CMOS detector pixel array and integrally formed elements including color filters, it may be readily evident to those skilled in the art that the aforedescribed methods, systems and elements may be readily adapted by substitution to other types of semiconductor processing such as BICMOS processing, GaAs processing and CCD processing. Similarly, it may be readily understood that the aforedescribed methods, systems and elements may be readily adapted to emitters of electromagnetic energy in place of detectors and still remain within the spirit and scope of the present disclosure. Furthermore, suitable equivalents may be used in place of or in addition to the various components, the function and use of such substitute or additional components being held to be familiar to those skilled in the art and are therefore regarded as falling within the scope of the present disclosure.

A surface formed of two media having different refractive indices partially reflects electromagnetic energy incident thereon. For example, a surface formed of two adjoining optical elements (e.g., within a layered optical element) having different refractive indices will partially reflect electromagnetic energy incident on the surface.

The degree to which electromagnetic energy is reflected by a surface formed of two media is proportional to the reflectance ("R") of the surface. Reflectance is defined by Eq. (19):

$$R = \frac{(a\cos\theta + b)^2(\cos\theta - b)^2 + (\cos\theta + b)^2(a\cos\theta - b)^2}{2(\cos\theta + b)^2(a\cos\theta + b)^2} \quad \text{Eq. (19)}$$

where $a=(n_2/n_1)^2$ $b=\sqrt{a-\sin^2\theta}$, $n_1$=the refractive index of the first medium, $n_2$=the refractive index of the second medium, and $\theta$ is the incidence angle.

Thus, the greater the difference between $n_1$ and $n_2$, the greater the reflectance of the surface.

In imaging systems, reflection of electromagnetic energy at a surface is often undesirable. For example, reflection of electromagnetic energy by two or more surfaces in an imaging system may create undesirable ghost images at a detector of the imaging system. Reflections also decrease the amount of electromagnetic energy that reaches the detector. In order to prevent undesired reflection of electromagnetic energy in the imaging systems discussed above, an anti-reflection layer may be fabricated at or on any of the surfaces of the optics (e.g., layered optical elements) in the aforedescribed arrayed imaging systems. For example, in FIG. 2B above, an anti-reflection layer may be fabricated on one or more surfaces of layered optical elements 24, such as the surface defined by layered optical elements 24(1) and 24(2).

An anti-reflection layer may be fabricated at or on a surface of an optical element by applying a layer of an index matched material at or on the surface. The index matched material ideally (considering normally incident monochromatic electromagnetic energy) has a refractive index ("$n_{matched}$") equal to a refractive index, which is defined by Eq. (20):

$$n_{matched}=\sqrt{n_1 n_2}, \quad \text{Eq. (20)}$$

where $n_1$ is the refractive index of the first medium forming the surface, and $n_2$ is the refractive index of the second medium forming the surface. For example, if $n_1$=1.37 and $n_2$=1.60, then $n_{matched}$ would be equal to 1.48, and an anti-reflection layer disposed at the surface would ideally have a refractive index of 1.48.

The layer of index matched material ideally has a thickness of one quarter of the wavelength of the electromagnetic energy of interest in the index matched material. Such thickness is desirable because it results in destructive interference of the electromagnetic energy of interest reflecting from the surfaces of the matched material and thereby prevents reflection at the surface. The wavelength of the electromagnetic energy in the matched material ("$\lambda_{matched}$") is defined by Eq. (21) as follows:

$$\lambda_{matched} = \frac{\lambda_0}{n_{matched}}, \quad \text{Eq. (21)}$$

where $\lambda_0$ is the wavelength of the electromagnetic energy in a vacuum. For example, assume the electromagnetic energy of interest is green light, which has a wavelength of 550 nm in a vacuum, and the refractive index of the matched material is 1.26. The green light then has a wavelength of 437 nm in the matched material, and the matched material ideally has a thickness of one quarter of this wavelength, or 109 nm One possible matched material is a low-temperature-deposited silicon dioxide. In such case, a vapor or plasma silicon dioxide deposition system may be used to apply the matched material to a surface. Silicon dioxide may advantageously protect the surface from mechanical and/or chemical external influences in addition to serving as an anti-reflection layer.

Another possible matched material is a polymeric material. Such material may be spin coated on a surface or may be applied to a surface of an optic (e.g., a layered optical element) by molding using a fabrication master. For example, a layer of matched material may be applied to a surface of a layered optical element using the same fabrication master used to form a certain layer of the layered optical element—the fabrication master is translated the proper distance (e.g., one quarter of the wavelength of interest in the matched material) along its Z-axis (i.e., along the optical axis) to form the layer of matched material on the layered optical element. Such process is more easily applied to an optical element having a relatively low radius of curvature as compared to an optical element having a relatively high radius of curvature because curvature of an optical element results in the layer of matched material applied by the process having an uneven thickness. Alternately, a fabrication master other than the one used to form the certain layer of the layered optical element may be used to apply the layer of matched material to the layered optical element. Such a fabrication master has the necessary translation along its Z-axis (i.e., one quarter of the wavelength of interest in the matched material along the optical axis) designed into its surface features or its external alignment features.

An example of using a matched material as an anti-reflection layer is shown in FIG. 395A, which is a cross-sectional illustration 12000 of a layered optical element, formed from optical element layers 12004 and 12006 on a common base 12008. Anti-reflection layer 12002 is disposed between layers 12004 and 12006. Anti-reflection layer 12002 is a matched material, meaning it ideally has a refractive index $n_{matched}$ as defined in Eq. (20), where $n_1$ is the refractive index of layer 12004 and $n_2$ is the refractive index of layer 12006. A thickness 12014 of anti-reflection layer 12002 is equal to one quarter of a wavelength of electromagnetic energy of interest in anti-reflection layer 12002. Common base 12008 may be a detector (e.g., detector 16 of FIG. 2A) or a glass plate such as used for WALO-style optics. Two breakouts corresponding to a region 12010 of illustration 12000 are also shown in FIGS. 395B and 395C. In FIG. 395B, breakout 12010(1) illustrates antireflective layer 12002 formed of an index matched material having an index of refraction defined by Eq. (20). In FIG. 395C, breakout 12010(2) illustrates an antireflective layer 12003 being formed of two sub-layers, as discussed immediately hereinafter.

An anti-reflection layer may also be fabricated from a plurality of sub-layers, wherein the plurality of sub-layers collectively have an effective refractive index ("$n_{eff}$") ideally equal to $n_{matched}$ as defined by Eq. (20). Additionally, an anti-reflection layer may be advantageously fabricated from two sub-layers using the same materials used to fabricate two optical elements forming the surfaces. In FIG. 395C, breakout 12010(2) shows the details of elements 12004 and 12006 and anti-reflection layers 12003. Each of the first and second sub-layers 12003(1) and 12003(2), respectively, has a thickness approximately equal to 1/16 of the wavelength of electromagnetic energy of interest in the sub-layer.

TABLE 77 summarizes an exemplary design of a two layer anti-reflection layer disposed at a surface defined by a two layers (entitled "LL1" and "LL2" below) of a layered optical element such as shown in breakout 12010(2) of FIG. 395C. In this example, the anti-reflection layer includes two sub-layers entitled layers "AR1" and "AR2" fabricated of the same materials used to the fabricate layers LL1 and LL2. As may be noted in TABLE 77, first sub-layer AR1 is fabricated of the same material as layer LL2, and second sub-layer AR2 is fabricated of the same material as layer LL1. A wavelength of electromagnetic energy of interest for the purpose of TABLE 77 is 505 nm.

TABLE 77

| Layer | Material | Refractive Index | Extinction coefficient | Physical Thickness (nm) |
|---|---|---|---|---|
| LL1 | Low-index polymer | 1.37363 | 0 | |
| AR1 | High-index polymer | 1.61743 | 0 | 25.3 |
| AR2 | Low-index polymer | 1.37363 | 0 | 29.9 |
| LL2 | High-index polymer | 1.61743 | 0 | |
| | Total thickness | | | 55.2 |

FIG. 396 shows a plot 12040 of reflectance as a function of wavelength at the surface bounded by layers LL1 and LL2 of TABLE 77 with and without the anti-reflection layer specified in TABLE 77. Curve 12042 represents reflectance at the surface between layers LL1 and LL2 without the anti-reflection layer specified in TABLE 77; curve 12044 represents reflectance with the anti-reflection layer specified in TABLE 77. As can be observed from plot 12040, the anti-reflection layer reduces the reflectance at the surface bounded by layers LL1 and LL2.

An anti-reflection layer may formed on or at a surface of an optical element by fabricating (e.g., by molding or etching) subwavelength features on the surface of the optical element. Such subwavelength features for example include recesses in the surface of the optical element wherein at least one dimension (e.g., length, width, or depth) of the recesses is smaller than the wavelength of the electromagnetic energy of interest in the anti-reflection layer. The recesses are for example filled with a filler material that has a refractive index different from that of the material used to fabricate the optical element. Such filler material may be a material, such as a polymer, that is used to form another optical element directly on the existing optic. For example, if subwavelength features are formed on a first layered optical element and a second layered optical element is to be applied directly to the first layered optical element, the filler material would be the material used to fabricate the second layered optical element. Alternately, the filler material may be air (or another gas in the environment of the optical element) if the surface of the optical element does not contact another optical element. Either way, the filler material (e.g., a polymer or air) has a different refractive index than that of the material used to fabricate the optical element. Accordingly, the subwavelength features, the filler material, and the unmodified surface of the optical element (the portion of the surface of the optical element not including subwavelength features) form an effective medium layer having an effective refractive index $n_{eff}$. Such effective medium layer functions as an anti-reflection layer if $n_{eff}$ is about equal to $n_{matched}$ as defined in Eq. (20). One relationship for defining an effective refractive index from a combination of two different materials is given by the Bruggeman equation, given by Eq. (22):

$$p\frac{\varepsilon_A - \varepsilon_e}{\varepsilon_A + 2\varepsilon_e} + (1-p)\frac{\varepsilon_B - \varepsilon_e}{\varepsilon_B + 2\varepsilon_e} = 0 \quad \text{Eq. (22)}$$

where, p is the volume fraction of a first constituent material A, $\in_A$ is the complex dielectric function of first constituent material A, $\in_B$ is the complex dielectric function of second constituent material B, and $\in_e$ is the resultant complex dielectric function of the effective medium. The complex dielectric function, $\in$, is related to the refractive index, n, and the absorption constant, k, by Eq. (23):

$$\in=(n+ik)^2 \quad \text{Eq. (23)}$$

The effective refractive index is a function of the subwavelength features' sizes and geometries as well as a fill factor of the surface of the optical element, where the fill factor is defined as the ratio of the portion of the surface that is unmodified (i.e., not having subwavelength features) to the entire surface. If the subwavelength features are small enough in relation to the wavelength of electromagnetic energy of interest, and are sufficiently evenly distributed along the surface of the optical element, the effective refractive index of the effective medium layer is approximately solely a function of the refractive indices of the filler material and the material used to fabricate the optical element The subwavelength features may be periodic (e.g., a sine wave) or non-periodic (e.g., random). The subwavelength features may be parallel or non-parallel. Parallel subwavelength features may result in polarization state selection of electromagnetic energy passing through the effective medium layer; such polarization may or may not be desirable depending on the application.

As stated above, it is important that subwavelength features have at least one dimension that is smaller than a wavelength of electromagnetic energy of interest in the effective medium layer. In one embodiment, the subwavelength features have at least one dimension that is smaller than or equal to size which is defined by Eq. (24):

$$D_{max} = \frac{\lambda_0}{2n_{eff}} \quad \text{Eq. (24)}$$

where $\lambda_0$ is the wavelength of the electromagnetic energy of interest in a vacuum and $n_{eff}$ is the effective refractive index of the effective medium layer.

A subwavelength feature may be molded in a surface of an optical element using a fabrication master having a surface defining a negative of the subwavelength features; such negative is an inverse of the subwavelength features wherein raised surfaces on the negative correspond to recesses of the subwavelength features formed on the optical element. For example, FIGS. 397A and 397B illustrate a fabrication master 12070 having a surface 12072 including a negative 12076 of subwavelength features to be applied to a surface 12086 of moldable material 12078 that will be used to fabricate an optical element on common base 12080. Fabrication master 12070 is engaged with moldable material 12078 as indicated by arrow 12084 to mold the subwavelength features on the surface 12086 of the resultant optical element.

Negative 12076 is too small to be visible on surface 12072 by the naked eye. In FIG. 397B, an enlarged view of region A shows exemplary details of negative 12076. Although negative 12076 is illustrated as a sine wave in FIG. 397B, negative 12076 may be any periodic or non-periodic structure. Negative 12076 has a maximum "depth" 12082 that is smaller than the wavelength of electromagnetic energy of interest in the effective medium layer created by the subwavelength features molded surface 12086.

If an additional optical element is to be formed proximate to surface 12086, the subwavelength features molded in surface 12086 are filled with a filler material having a different refractive index than that used to fabricate an optical element from moldable material 12078. The filler material may be a material used to fabricate the additional optical element on surface 12086; otherwise, the filler material is air or another gas of the environment of surface 12086. The subwavelength features formed in moldable material 12078 when filled with a second material, collectively form an effective medium layer that operates as an anti-reflection layer.

FIG. 398 shows a numerical grid model of a subsection 12110 of machined surface 6410 of FIG. 268. It should be noted that the numerical model approximates fly-cut machined surface 6410. Subsection 12110 has been discretized to permit electromagnetic modeling. Therefore, the resultant performance plots, presented below, which are based upon the discretized model, are approximations. Machined surface 6410 of FIG. 268 may be included on a surface of a fabrication master to form a negative. For example, machined surface 6410 may form negative 12076 of fabrication master 12070 of FIG. 397. Areas of subsection 12110 where a tool has removed material from the surface of a fabrication master are represented by black blocks 12112; such areas may be referred to as recesses. Areas of subsection 12110 where the original material of the surface remains are represented by white blocks 12114; such areas may be referred to as posts. Only one recess and post are labeled in FIG. 398 for illustrative clarity.

Subsection 12110 includes an array of four unit cells that are repeated across the surface of machined surface 6410 of FIG. 268 to form a negative having a periodic structure. One unit cell in the lower left hand corner of subsection 12110 has horizontal period 12116 ("W") and vertical period 12118 ("H"). A ratio between W and H or the aspect ratio of the unit cell is defined by Eq. (25):

$$H=\sqrt{3}W \quad \text{Eq. (25)}$$

The negative defined by machined surface 6410 may be considered to have a period equal to W. It is important that at least one feature or dimension of the unit cell (e.g., Was shown in FIG. 398) be smaller than the wavelength of electromagnetic energy of interest in the effective medium layer created by a fabrication master having machined surface 6410. Each unit cell of the machined surface 6410 has the following characteristics: (1) a post fill factor ("$f_H$") of 0.444;

(2) a recess fill factor ("$f_L$") of 0.556; (3) a period (W) of 200 nm; and (4) a thickness, which is equal to depth of recesses 12112, of 104.5 nm.

FIG. 399 is a plot 12140 of reflectance as a function of wavelength of electromagnetic energy normally incident on a planar surface having subwavelength features created using a fabrication master having machined surface 6410 of FIG. 268. Dotted curve 12146 corresponds to unit cells having a period of 400 nm; dashed curve 12144 corresponds to the unit cells having a period of 200 nm; and solid curve 12142 corresponds to unit cells having a period of 600 nm. It can be observed from FIG. 399 that the surface has a reflectance of almost zero at a wavelength of around 0.5 microns if the period of unit cells is 200 nm or 400 nm. However, the reflectance of the surface increases greatly for wavelengths below about 0.525 microns when the unit cell has a period of 600 nm because at a period of these dimensions, the surface relief ceases to behave as a metamaterial and becomes a diffractive structure instead. Thus, FIG. 399 shows the importance of insuring that a period of a unit cell is sufficiently small.

FIG. 400 is a plot 12170 of reflectance as a function of angle of incidence of electromagnetic energy incident on a planar surface having subwavelength features created using a fabrication master having machined surface 6410 of FIG. 268. Plot 12170 assumes that unit cells of machined surface 6410 have a period of 200 nm Solid curve 12174 corresponds to electromagnetic energy having a wavelength of 500 nm, and dashed curve 12172 corresponds to electromagnetic energy having a wavelength of 700 nm. Comparison of curves 12172 and 12174 shows that the subwavelength features are both angle and wavelength dependant.

FIG. 401 is a plot 12200 of reflectance as a function of angle of incidence of electromagnetic energy incident on an exemplary hemispherical optical element having a radius of curvature of 500 microns. Dashed curve 12204 corresponds to an optical element having subwavelength features created using a fabrication master having machined surface 6410 of FIG. 268, and solid curve 12202 corresponds to an optical element not having subwavelength features. It can be observed that the optical element having the subwavelength features has lowered reflectance as compared to the optical element not having the subwavelength features.

As discussed above, an effective medium layer functioning as an anti-reflection layer may be formed on a surface of an optical element by molding subwavelength features in the surface of the optical element, and such subwavelength features may be molded using a fabrication master having a surface including a negative of the subwavelength features. Such negative may be formed on the fabrication master's surface using a variety of processes. Examples of such processes are discussed immediately hereafter.

A negative may be formed on a surface of a fabrication master by using a fly-cutting process, such as that discussed above with respect to FIGS. 267-268. A negative created using a fly-cutting process may be periodic. For example, subsection 12110 of FIG. 298 of machined surface 6410 of FIG. 268 may be fly-cut using a tool that is sized for a width of a unit cell. In the case of FIG. 398, if a unit cell has a width of 200 nm and a height of 340 nm, the tool may have a width of approximately 60 nm.

Another method of forming a negative on a surface of a fabrication master is by using a specialized diamond tool, such as tool tip 6104 shown in FIG. 224. The diamond tool cuts grooves in a surface (e.g., a surface of a fabrication master) such as shown in FIG. 223. However, the diamond tool may only be used to form a negative corresponding to parallel and periodic sub wavelength features. Alternatively, a negative may be formed on a surface of a fabrication master using rasterized nano-indentation patterning. Such patterning, which is a stamping process, may be used to create a periodic or non-periodic negative.

Yet another method of forming a negative on a surface of a fabrication master is by using laser ablation. Laser ablation may be used to form a periodic or non-periodic negative. High power pulsed excimer lasers, such as KrF lasers, can be mode-locked to produce pulse energies of several micro-Joules or Q-switched to produced pulse energies exceeding 1 Joule at 248 nm to perform such laser ablation on a surface of a fabrication master. For example, surface relief structures of a negative having feature sizes smaller than 300 nm can be created using excimer laser ablation using a KrF laser as follows. The laser is focused to a diffraction-limited spot using $CaF_2$ optics and rastered across the surface of the fabrication master. The laser pulse energy or number of pulses may be adjusted to ablate a feature (e.g., a pit) to the desired depth. The feature spacing is adjusted to achieve a fill factor corresponding to the negative design. Other lasers that may be suitable for laser oblation include an ArF laser and a $CO_2$ laser.

A negative may be further formed on a surface of a fabrication master using an etching process. In such process, an etchant is used to etch pits in the surface of the fabrication master. Pits are associated with the grain size and configuration of the material of the fabrication master's surface; such grain size and configuration are a function of the material of the fabrication master's surface (e.g., a metal alloy), the temperature of the material, and the mechanical processing of the material. Lattice planes and defects (e.g., grain boundaries and crystallographic dislocations) of the material will affect the rate at which pits are formed. The grain boundaries and dislocations are often randomly oriented or have low coherence; accordingly, spatial distributions and sizes of pits may also be random. The sizes of the pits depend upon such characteristics as the etch chemistry, the temperature of the fabrication master and etchant, the grain size, and the duration of the etching process. Possible etchants include caustic substances such as salts and acids. As an example, consider a fabrication master having a brass surface. An etchant consisting of a solution of sodium dichromate dihydrate and sulfuric acid may be used to etch the brass surface resulting in pits having shapes including cubic and tetragonal shapes.

If an anti-reflection layer is formed on or at a surface of an optical element, the anti-reflection layer may need to be thicker near the edges of the optical element than at the center of the optical element. Such requirement is due to an increase in angle of incidence of electromagnetic energy on the surface of the optical element near its edge due to curvature of the optical element.

Optics that are formed by molding, such as single optical elements fabricated on a common base or layered optical elements (e.g., layered optical elements 24 of FIG. 2B above) generally shrink while curing. FIG. 402 shows plot 12230, which illustrates an example of such shrinkage. Plot 12230 shows a cross-section of a mold (i.e., a portion of a fabrication master) and a cured optical element; the vertical axis represents the profile dimension of the mold and the cured optical element and the horizontal axis represents the radial dimension of the mold and the cured optical element. Dotted curve 12232 represents the cross-section of the mold, and solid curve 12234 represents the cross-section of the cured optical element. Shrinkage of the optical element due to curing can be observed by noting that solid curve 12234 is generally smaller than dotted curve 12232. Such shrinkage results in changes in height, width, and curvature of the optical element that may result in aberrations such as focus errors.

In order to avoid aberrations cause by optical element shrinkage, a mold used to form an optical element may be made larger than a desired size of the optical element in order to compensate for shrinking of the optical element during its curing. FIG. 403 shows plot 12260, which illustrates a cross-section of a mold (i.e., a portion of a fabrication master) and a cured optical element. Dashed curve 12262 represents the cross-section of the mold, and solid curve 12264 represents the cross-section of the optical element. Plot 12260 of FIG. 403 differs from plot 12230 of FIG. 402 in that the mold in FIG. 403 was sized to compensate for shrinking of the optical element during curing. Accordingly, solid curve 12264 of FIG. 403 corresponds to dotted curve 12232 of FIG. 402; therefore, the cross-section of the optical element of FIG. 403 corresponds to the intended cross-section of the optical element as represented by the mold of FIG. 402.

Shrinkage at sharply curved surfaces of an optical element, such as corners 12266 and 12268 of FIG. 403, is controlled by the viscosity and modulus of the material forming the optical element. It is desirable that corners 12266 and 12268 do not intrude on the clear aperture of the optical element; accordingly, radii of curvature of corners 12266 and 12268 may be made relatively small in the optical element mold to reduce a likelihood of corners 12266 and 12268 intruding on the clear aperture of the optical element.

Detector pixels, such as detector pixel 78 of FIGS. 4A and 4B, are commonly configured for "frontside illumination." In a frontside illuminated detector pixel, electromagnetic energy enters a front surface of the detector pixel (e.g., surface 98 of detector pixel 78), travels through a series of layers past metal interconnects (e.g., metal interconnects 96 of detector pixel 78) to a photosensitive region (e.g., photosensitive region 94 of detector pixel 78). An imaging system is commonly fabricated onto the front surface of a frontside illuminated detector pixel. Additionally, buried optics may be fabricated proximate to the support layer of a frontside illuminated pixel, as discussed above.

However, in certain embodiments herein, detector pixels may also be configured for "backside illumination", and the imaging systems discussed above may be configured for use with such backside illuminated detector pixels. In backside illuminated detector pixels, electromagnetic energy enters the backside of the detector pixel and directly impinges on the photosensitive region. Accordingly, the electromagnetic energy advantageously does not travel through the series of layers to reach the photosensitive region. The metal interconnects within the layers can undesirably inhibit electromagnetic energy from reaching the photosensitive region. Imaging systems, such as those discussed above, may be applied to the backside of back illuminated detector pixels.

A backside of a detector pixel is generally covered by a thick silicon wafer during manufacturing. Such silicon wafer must be thinned, such as by etching or grinding the wafer, in order for electromagnetic energy to be able to penetrate the wafer and reach a photosensitive region. FIGS. 404A and 404B show cross-sectional illustrations of detector pixels 12290 and 12292, respectively, including respective silicon wafers 12308 and 12310. Silicon wafers 12308 and 12310 each include a region 12306 including a photosensitive region 12298. Silicon wafer 12308, a type generally termed as a silicon on insulator ("SOI") wafer, also includes excess silicon section 12294 and buried oxide layer 12304; silicon wafer 12310 also includes excess silicon layer 12296. Excess silicon layers 12294 and 12296 must be removed such that electromagnetic energy 18 may reach photosensitive region 12298. Detector pixel 12290 will have back surface 12300 after excess silicon layer 12294 is removed, and detector pixel 12292 will have back surface 12302 after excess silicon layer 12296 is removed.

Buried oxide layer 12304, which is fabricated of silicon dioxide, may help prevent damage to region 12306 during removal of excess silicon layer 12294. It is often difficult to precisely control etching and grinding of silicon; therefore, there is a danger that region 12306 will be damaged due to the inability to precisely stop etching or grinding of silicon wafer 12308 if region 12306 is not separated from excess silicon layer 12294. Buried oxide layer 12304 provides such separation and thereby helps prevent accidental removal of region 12306 during removal of excess silicon layer 12294. Buried oxide layer 12304 may also be advantageously used for the formation of buried optical elements, as described below, proximate to surface 12300 of detector pixel 12290.

FIG. 405 shows a cross-sectional illustration of detector pixel 12330 configured for backside illumination as well as a layer structure 12338 and three-pillar metalens 12340 that may be used with detector pixel 12330. For modeling purposes, photosensitive region 12336 may be approximated as a rectangular volume in the center of region 12342. Layers (e.g., filters) may be added to detector pixel 12330 to improve its electromagnetic energy collection performance. Additionally, existing layers of detector pixel 12330 may be modified to improve its performance. For example, layer 12332 and/or layer 12234 may be modified to improve detector pixel 12330's performance, as discussed immediately hereafter.

Layers 12332 and/or 12334 may be modified to form one or more filters, such as a color filter and/or an infrared cutoff filter. In one example, layer 12334 is modified into a layered structure 12338 that acts as a color filter and/or into an infrared cutoff filter. Layers 12332 and/or 12334 may also be modified such that they help direct electromagnetic energy 18 onto photosensitive region 12336. For example, layer 12334 may be formed into a metalens that directs electromagnetic energy into photosensitive region 12336. An example of a metalens is a three-pillar metalens 12340 shown in FIG. 405. As another example, material of layers 12332 and 12334 may be replaced with film layers such that layers 12332 and 12334 collectively form a resonator that increases absorption of electromagnetic energy by photosensitive region 12336.

FIG. 406 shows a plot 12370 of transmittance as a function of wavelength for a combination color and infrared blocking filter that may be fabricated in a detector pixel configured for backside illumination. For example, the filter may be fabricated in layer 12334 of detector pixel 12330 of FIG. 405. Curve 12374, which is represented by a dashed line, represents the transmittance of cyan colored light; curve 12376, which is represented by a dotted line, represents the transmittance of yellow light; and curve 12372, which is represented by a solid line, represents the transmittance of magenta colored light. An exemplary design for an IR-cut CMY filter for a reference wavelength of 550 nm and normal incidence is summarized in TABLE 78.

TABLE 78

| | Layer Material | Refractive Index | Extinction Coeff. | Optical Thickness (FWOT) | Cyan Physical Thickness (nm) | Magenta Physical Thickness (nm) | Yellow Physical Thickness (nm) |
|---|---|---|---|---|---|---|---|
| Medium | low-n polymer | 1.35 | 0 | | | | |
| 1 | BD 2200 | 1.4066 | 0.00028 | 0.62959 | 246.18 | 246.18 | 246.18 |
| 2 | HfO2 | 1.9947 | 0.00012 | 0.39522 | 108.97 | 108.97 | 108.97 |
| 3 | BD 2200 | 1.4066 | 0.00028 | 0.35201 | 137.64 | 137.64 | 137.64 |
| 4 | HfO2 | 1.9947 | 0.00012 | 0.36016 | 99.31 | 99.31 | 99.31 |
| 5 | BD 2200 | 1.4066 | 0.00028 | 0.34139 | 133.49 | 133.49 | 133.49 |
| 6 | HfO2 | 1.9947 | 0.00012 | 0.35238 | 97.16 | 97.16 | 97.16 |
| 7 | BD 2200 | 1.4066 | 0.00028 | 0.33527 | 131.09 | 131.09 | 131.09 |
| 8 | HfO2 | 1.9947 | 0.00012 | 0.35442 | 97.72 | 97.72 | 97.72 |
| 9 | BD 2200 | 1.4066 | 0.00028 | 0.34185 | 133.67 | 133.67 | 133.67 |
| 10 | HfO2 | 1.9947 | 0.00012 | 0.34601 | 95.4 | 95.4 | 95.40 |
| 11 | BD 2200 | 1.4066 | 0.00028 | 0.34198 | 133.72 | 133.72 | 133.72 |
| 12 | HfO2 | 1.9947 | 0.00012 | 0.35069 | 96.69 | 96.69 | 96.69 |
| 13 | BD 2200 | 1.4066 | 0.00028 | 0.34120 | 133.41 | 133.41 | 133.41 |
| 14 | HfO2 | 1.9947 | 0.00012 | 0.35430 | 97.69 | 97.69 | 97.69 |
| 15 | BD 2200 | 1.4066 | 0.00028 | 0.35621 | 139.28 | 139.28 | 139.28 |
| 16 | HfO2 | 1.9947 | 0.00012 | 0.37834 | 104.32 | 104.32 | 104.32 |
| 17 | BD 2200 | 1.4066 | 0.00028 | 0.44033 | 172.18 | 172.18 | 172.18 |
| 18 | HfO2 | 1.9947 | 0.00012 | 0.47435 | 130.79 | 130.79 | 130.79 |
| 19 | BD 2200 | 1.4066 | 0.00028 | 0.07429 | 29.05 | 29.05 | 29.05 |
| 20 | HfO2 | 1.9947 | 0.00012 | 0.02243 | 6.18 | 6.18 | 6.18 |
| 21 | BD 2200 | 1.4066 | 0.00028 | 0.38451 | 150.35 | 150.35 | 150.35 |
| 22 | HfO2 | 1.9947 | 0.00012 | 0.40123 | 110.63 | 110.63 | 110.63 |
| 23 | BD 2200 | 1.4066 | 0.00028 | 0.37114 | 145.12 | 145.12 | 145.12 |
| 24 | HfO2 | 1.9947 | 0.00012 | 0.42159 | 116.24 | 116.24 | 116.24 |
| 25 | BD 2200 | 1.4066 | 0.00028 | 0.46325 | 181.14 | 181.14 | 181.14 |
| 26 | HfO2 | 1.9947 | 0.00012 | 0.49009 | 135.13 | 135.13 | 135.13 |
| 27 | BD 2200 | 1.4066 | 0.00028 | 0.44078 | 172.35 | 172.35 | 172.35 |
| 28 | HfO2 | 1.9947 | 0.00012 | 0.39923 | 110.08 | 110.08 | 110.08 |
| 29 | BD 2200 | 1.4066 | 0.00028 | 0.41977 | 164.14 | 164.14 | 164.14 |
| 30 | HfO2 | 1.9947 | 0.00012 | 0.45656 | 125.89 | 125.89 | 125.89 |
| 31 | BD 2200 | 1.4066 | 0.00028 | 0.48769 | 190.69 | 190.69 | 190.69 |
| 32 | HfO2 | 1.9947 | 0.00012 | 0.43506 | 119.96 | 119.96 | 119.96 |
| 33 | BD 2200 | 1.4066 | 0.00028 | 0.43389 | 169.66 | 169.66 | 169.66 |
| 34 | HfO2 | 1.9947 | 0.00012 | 0.45073 | 124.28 | 124.28 | 124.28 |
| 35 | BD 2200 | 1.4066 | 0.00028 | 0.49764 | 194.58 | 194.58 | 194.58 |
| 36 | HfO2 | 1.9947 | 0.00012 | 0.47635 | 131.34 | 131.34 | 131.34 |
| 37 | BD 2200 | 1.4066 | 0.00028 | 0.48420 | 189.33 | 189.33 | 189.33 |
| 38 | UV SiN | 1.9878 | 0.00041 | 0.35419 | 98 | 98 | 60.00 |
| 39 | BD 2200 | 1.4066 | 0.00028 | 0.22281 | 87.12 | 87.12 | 87.12 |
| 40 | UV SiN | 1.9878 | 0.00041 | 0.37769 | 104.5 | 104.5 | 41.74 |
| 41 | BD 2200 | 1.4066 | 0.00028 | 0.22841 | 89.31 | 89.31 | 89.19 |
| 42 | UV SiN | 1.9878 | 0.00041 | 0.38409 | 106.27 | 106.27 | 53.73 |
| 43 | BD 2200 | 1.4066 | 0.00028 | 0.20477 | 80.07 | 80.07 | 79.96 |
| 44 | UV SiN | 1.9878 | 0.00041 | 0.40646 | 112.46 | 112.46 | 54.21 |
| 45 | BD 2200 | 1.4066 | 0.00028 | 0.17615 | 68.88 | 68.88 | 68.78 |
| 46 | UV SiN | 1.9878 | 0.00041 | 0.39763 | 110.02 | 110.02 | 41.07 |
| 47 | BD 2200 | 1.4066 | 0.00028 | 0.24646 | 96.37 | 96.37 | 96.24 |
| 48 | UV SiN | 1.9878 | 0.00041 | 0.33956 | 93.95 | 93.95 | 93.95 |
| Substrate | PE-OX 11K | 1.4740 | 0 | | | | |
| Total Thickness | | | | 17.79433 | 5901.79 | 5901.79 | 5620.71 |

FIG. 407 shows a cross-sectional illustration of a detector pixel 12400 configured for backside illumination. Detector pixel 12400 includes photosensitive region 12402 having a square cross-section with sides of 1 micron in length. Photosensitive region 12402 is separated from anti-reflection layer 12420 by distance 12408 of 500 nm Anti-reflection layer 12420 consists of a silicon dioxide sub-layer having a thickness 12404 of 30 nm and a silicon nitride sub-layer having a thickness 12406 of 40 nm.

Metalens 12422 for directing electromagnetic energy 18 onto photosensitive region 12402 is disposed proximate to anti-reflection layer 12420. Metalens 12422 is fabricated of silicon dioxide with the exception of large pillar 12410 and small pillars 12412, which are each fabricated of silicon nitride. Large pillar 12410 has a width 12416 of 1 micron, and small pillars 12412 have a width 12428 of 120 nm Large pillar 12416 and small pillars 12412 have a depth 12418 of 300 nm Small pillars 12412 are separated from large pillar 12410 by a distance of 90 nm Detector pixel 12400 including metalens 12422 may have a quantum efficiency that is approximately 33% greater than that of an embodiment of detector pixel 12400 not including metalens 12422. Contours 12426 represent electromagnetic energy density in detector pixel 12400. As can be observed from FIG. 407, the contours show that normally incident electromagnetic energy 18 is directed to photosensitive region 12402 by metalens 12422.

Anti-reflection layer 12420 and metalens 12422 may be fabricated into or on detector pixel 12400 after removing an excess silicon layer from the backside of detector pixel 12400. For example, if detector pixel 12400 is an embodiment of detector pixel 12330 of FIG. 405, anti-reflection layer 12400 and metalens 12422 may be formed in layer 12334 of detector pixel 12330.

FIG. 408 is a cross-sectional illustration of a detector pixel 12450 configured for backside illumination. Detector pixel 12450 includes a photosensitive region 12452 and a two-pillar metalens 12454. Metalens 12454 is fabricated by grinding away or etching away excess silicon on a backside of detector pixel 12450 down to surface 12470. Etched regions 12456 are then further etched into the silicon of detector pixel 12450. Each etched region 12456 has a width 12472 of 600 nm and a thickness 12460 of 200 nm. Each etched region 12456 is centered a distance 12464 of 1.1 microns from a centerline of photosensitive region 12452. Etched regions 12456 are filled with a filler material, such as silicon dioxide. The filler material may also create layer 12458, which may serve as a passivation layer, having a thickness 12468 of 600 nm. Thus, metalens 12454 includes silicon un-etched areas 12474 and filled etched areas 12456. Contours 12466 represent electromagnetic energy density in detector pixel 12450. As can be observed from FIG. 408, the contours show that normally incident electromagnetic energy 18 is directed to photosensitive region 12452 by metalens 12454. FIG. 409 is a plot 12490 of quantum efficiency as a function of wavelength for detector pixel 12450 of FIG. 408. Solid curve 12492 represents detector pixel 12450 with metalens 12454, and dotted curve 12494 represents detector pixel 12450 without metalens 12454. As can be observed from FIG. 409, metalens 12454 increases the quantum efficiency of detector pixel 12450 by approximately 15%.

The changes described above, and others, may be made in the imaging systems described herein without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

The invention claimed is:

1. A method for manufacturing arrayed imaging systems, each imaging system in the arrayed imaging systems having a detector associated therewith, the method comprising:

fabricating an array of layered optical elements by sequentially applying a fabrication master, each layered optical element being part of a respective imaging system of the arrayed imaging systems and optically connected with the detector associated with that imaging system;

wherein sequentially applying the fabrication master includes aligning the fabrication master to a common base, with alignment error not exceeding than two wavelengths of electromagnetic energy detectable by the detector.

2. The method of claim 1, further comprising separating the arrayed imaging systems to form a plurality of imaging systems.

3. The method of claim 1, wherein two or more of the layered optical elements are optically connected with the detector to provide multiple fields of view with a single detector.

4. The method of claim 1, further comprising, before fabricating, producing the fabrication master such that the fabrication master includes features for defining the array of layered optical elements.

5. The method of claim 1, further comprising, before fabricating:

producing the fabrication master, the fabrication master including features for defining an array of optical elements, the array of optical elements being one layered part of the arrayed imaging systems, wherein fabricating further comprises using the fabrication master to mold a material on an array of detectors to form the array of optical elements simultaneously, each one of the optical elements being optically connected with at least one of the detectors of the arrayed imaging system.

6. The method of claim 5, wherein producing the fabrication master comprises directly fabricating the features for defining the array of optical elements on a master substrate.

7. The method of claim 6, wherein directly fabricating the features comprises forming the features using at least a selected one of a slow tool servo approach, a fast tool servo approach, a multi-axis milling approach and a multi-axis grinding approach.

8. The method of claim 6, wherein directly machining the features further comprises fabricating additional features for defining alignment marks on the master substrate.

9. The method of claim 1, further comprising:

forming a second array of layered optical elements; and positioning the second array of layered optical elements with respect to the first mentioned array of layered optical elements.

10. The method of claim 1, wherein fabricating the array of layered optical elements further comprises configuring at least one of the optical elements to predeterministically encode a wavefront of electromagnetic energy transmitted therethrough.

11. The method of claim 1, further comprising configuring at least one of the optical elements with variable focal length.

12. The method of claim 1, at least one of the detectors of the arrayed imaging system having a plurality of detector pixels formed using a set of processes, further comprising:

in at least one of the detector pixels, forming, using at least one of the processes, optics for redistributing energy within the detector pixel.

13. The method of claim 12, wherein forming the optics in at least one of the detector pixels comprises forming at least one of a chief ray corrector, a thin film filter and a metalens.

14. The method of claim 1, at least one the detectors of the arrayed imaging system having a plurality of detector pixels formed using a set of processes, further comprising:

forming an array of lenslets, each one of the lenslets being optically connected with at least one of the plurality of detector pixels.

15. The method of claim 1, wherein fabricating the array of layered optical elements comprises:

distributing a moldable material, in cooperation with the fabrication master, and curing the moldable material to shape the array of layered optical elements.

16. The method of claim 1, wherein sequentially applying the fabrication master comprises aligning the common base and the fabrication master to a chuck supporting the common base.

17. The method of claim 1, wherein sequentially applying the fabrication master comprises aligning the common base and the fabrication master using alignment features defined thereon.

18. The method of claim 1, wherein sequentially applying the fabrication master comprises aligning the common base and the fabrication master using a common coordinate system.

19. The method of claim 1, further comprising positioning an array of single optical elements with respect to the array of layered optical elements.

20. The method of claim 19, wherein positioning the array of single optical elements comprises spacing apart the array of single optical elements from the array of layered optical elements using a spacer arrangement selected as at least one of an encapsulant material, a standoff feature and a spacer plate.

21. The method of claim 19, further comprising configuring at least one of the single optical elements to be movable between at least two positions with respect to a corresponding one of the layered optical elements so as to provide variable magnification of an image at a respective detector of the arrayed imaging system in accordance with the at least two positions.

22. The method of claim 1, wherein fabricating the array of layered optical elements further comprises configuring at least one of the layered optical elements to predeterministically encode a wavefront of electromagnetic energy transmitted therethrough.

23. The method of claim 1, further comprising forming an anti-reflection layer on a surface of at least one of the layered optical elements.

24. The method of claim 23, wherein forming the anti-reflection layer comprises molding subwavelength features into the surface of the at least one of the layered optical elements.

* * * * *